US010887360B1

(12) United States Patent
Wang et al.

(10) Patent No.: US 10,887,360 B1
(45) Date of Patent: Jan. 5, 2021

(54) DIRECT NETWORK CONNECTIONS USING CLOUD INSTANCE FOR MULTIPOINT MEETING SERVICE

(71) Applicant: iCloudPatent.com LIMITED, Hong Kong (CN)

(72) Inventors: Xiaohong Wang, Hong Kong (CN); Kang Wing Leung, Hong Kong (CN)

(73) Assignee: iCloudPatent.com LTD. (a Caymans Islands company), North Point (HK)

( * ) Notice: Subject to any disclaimer, the term of this patent is extended or adjusted under 35 U.S.C. 154(b) by 0 days.

(21) Appl. No.: 15/396,347

(22) Filed: Dec. 30, 2016

Related U.S. Application Data

(60) Provisional application No. 62/272,721, filed on Dec. 30, 2015.

(51) Int. Cl.

| | |
|---|---|
| ***H04L 29/06*** | (2006.01) |
| ***G06F 21/44*** | (2013.01) |
| ***G06F 21/62*** | (2013.01) |
| ***H04N 7/15*** | (2006.01) |
| ***H04L 12/18*** | (2006.01) |
| ***H04L 12/66*** | (2006.01) |

(52) U.S. Cl.

CPC ........ *H04L 65/4038* (2013.01); *G06F 21/445* (2013.01); *G06F 21/62* (2013.01); *H04L 12/1813* (2013.01); *H04L 12/66* (2013.01); *H04L 29/06027* (2013.01); *H04L 63/08* (2013.01); *H04L 65/103* (2013.01); *H04L 65/1043* (2013.01); *H04L 65/4007* (2013.01); *H04N 7/152* (2013.01); *H04N 7/155* (2013.01)

(58) Field of Classification Search

CPC .................................................. H04L 65/4038

USPC ........................................................ 709/227

See application file for complete search history.

(56) References Cited

U.S. PATENT DOCUMENTS 6,115,646 A * 9/2000 Fiszman ................ G06Q 10/10 700/104

6,625,141 B1 * 9/2003 Glitho ................ H04L 12/6418 370/352

6,711,606 B1 * 3/2004 Leymann ................ G06F 16/10 709/203

7,899,877 B2 * 3/2011 Meaney .................... G06F 8/63 709/207

(Continued)

OTHER PUBLICATIONS

ITU-T, "Series T: Terminals for Telematic Services", "Data protocols for multimedia conferencing", 2007, p. 7 (Year: 2007).*

*Primary Examiner* — Ondrej C Vostal

(57) ABSTRACT

Direct network connections using cloud instance for multipoint meeting service is provided between two or more computers on a network to facilitate a variety of activities, including desktop sharing, web-meetings, and web-conferences. A first computer sends a request to start a multipoint meeting to a server. The server requests a computing cloud to launch a cloud instance for the first computer. A second computer uses connection information for the first computer cloud instance to send to the first computer cloud instance connection information for the second computer via direct network connection. From this point on, the first computer and the second computer exchange data for multipoint meeting via a direct network connection using the first computer cloud instance, independently of the server.

45 Claims, 208 Drawing Sheets

(56) References Cited

U.S. PATENT DOCUMENTS 8,789,043 B2* 7/2014 Biran .................. G06F 9/45558 718/1
8,949,369 B2* 2/2015 Long ....................... H04L 67/14 709/217
9,336,030 B1* 5/2016 Marr ................... G06F 9/45533
9,361,139 B1* 6/2016 Baig ....................... G06F 9/455
9,639,502 B1* 5/2017 Kumar ................ H04L 41/0893
9,753,810 B1* 9/2017 Khandelwal ........ G06F 11/1438
9,787,477 B1* 10/2017 Singal ................... H04L 9/3268
9,965,334 B1* 5/2018 Tan ....................... G06F 9/5077
10,181,990 B2* 1/2019 Ferris .................... H04L 69/329
2009/0063691 A1* 3/2009 Kalofonos ............ H04L 63/102 709/229
2010/0250744 A1* 9/2010 Hadad ................... G06F 9/4856 709/226
2010/0260178 A1* 10/2010 Huang .................... H04L 45/16 370/390
2010/0315985 A1* 12/2010 Moon ............... H04W 12/0609 370/312
2010/0322255 A1* 12/2010 Hao .................... G06F 9/45558 370/398
2011/0209064 A1* 8/2011 Jorgensen ................. G06F 9/54 715/733
2011/0283017 A1* 11/2011 Alkhatib ............... H04L 45/566 709/244
2011/0307889 A1* 12/2011 Moriki ................ G06F 9/45558 718/1
2012/0005668 A1* 1/2012 Serizawa ............ G06F 12/0866 718/1
2012/0030672 A1* 2/2012 Zygmuntowicz ......... G06F 8/60 718/1
2012/0054002 A1* 3/2012 Rotbard ................. G06Q 20/20 705/14.3
2012/0110055 A1* 5/2012 Van Biljon ............ G06Q 30/04 709/201
2012/0167086 A1* 6/2012 Lee ....................... G06F 9/4405 718/1
2012/0289147 A1* 11/2012 Raleigh .............. H04N 21/6547 455/3.06
2012/0307300 A1* 12/2012 Takano .............. H04N 1/00217 358/1.15
2013/0137511 A1 5/2013 Bae et al.
2013/0232498 A1* 9/2013 Mangtani .............. G06F 9/5072 718/104
2013/0247133 A1* 9/2013 Price ..................... G06F 21/577 726/1
2013/0291036 A1* 10/2013 Yamagishi ......... H04N 21/2747 725/109
2013/0300747 A1* 11/2013 Wong .................... G06T 11/206 345/440.2
2013/0339510 A1* 12/2013 Douglas .............. H04L 41/5077 709/223
2014/0056419 A1 2/2014 Vesques et al.
2014/0196030 A1* 7/2014 Deshpande ......... G06F 9/45558 718/1
2014/0278623 A1* 9/2014 Martinez ................ G06Q 10/06 705/7.12
2014/0280595 A1 9/2014 Mani et al.
2015/0039677 A1 2/2015 Kahol et al.
2015/0143366 A1* 5/2015 Suragi Math ......... G06F 9/5072 718/1
2015/0156266 A1* 6/2015 Gupta ..................... H04W 4/70 709/224
2015/0172066 A1* 6/2015 Gholmieh ............... H04W 4/06 370/312
2015/0288746 A1* 10/2015 Clarke ................ H04L 67/1008 709/202
2015/0358171 A1 12/2015 Rosenberg et al.
2016/0055021 A1* 2/2016 Beveridge ........... G06F 9/45558 718/1
2016/0112182 A1* 4/2016 Karnes .................. H04J 3/0697 375/362
2016/0139943 A1* 5/2016 Bezbaruah .......... G06F 9/45558 718/1
2016/0197803 A1* 7/2016 Talbot ..................... H04L 43/08 709/224
2016/0266919 A1* 9/2016 Wang .................... G06F 9/4856
2016/0323195 A1* 11/2016 Rose ....................... H04L 41/00
2017/0039120 A1* 2/2017 Ganesan ............. G06F 9/45558
2017/0060627 A1* 3/2017 Birkestrand .......... G06F 9/4856
2017/0324582 A1* 11/2017 Yang ................... H04L 12/4633

* cited by examiner (PRIOR ART 1)

| | I | II | III | IV | V | VI | VII | VIII | IX | X | XI |
|---|---|---|---|---|---|---|---|---|---|---|---|
| A | Table 1: | | | | | Maximum Attendees: | | | | | |
| B | | | 25 | 50 | 100 | 500 | 1000 | 2,500 | 10,000 | 100,000 | 1,000,000 |
| C | # of (1X)-H/W-(implemented-in- | Linear [(a)] | 1X | 2X | 4X | 20X | 40X | 100X | 400X | 4,000X | 40,000X |
| D | host-computer-cloud-instance): | Double [(b)] | 2X | 4X | 8X | 40X | 100X | 200X | 800X | 8,000X | 80,000X |
| E | | | | | ( Contact cloud vendor to pre-arrange, if >= 100X ) | | | | | | |

(a) "Linear" formula for # of (1X)-hardware-(implemented-in-cloud-instance)
= "Maximum # of attendees expected" / 25
(if fraction, round up to next integer)
(b) "Double" formula for # of (1X)-hardware-(implemented-in-cloud-instance)
= 2 * "Maximum # of attendees expected" / 25
(if fraction, round up to next integer)

| | I | II |
|---|---|---|
| A | Table 2: | |
| B | For 1X, 1X hardware is: | i. 4 GB of memory (8 GB is better) with swap enabled, and |
| | (if maximum 25 attendees join | ii. Quad-core 2.6 GHZ CPU (or faster) , and |
| | BigBlueButton multipoint meeting) | iii. 500GB of free disk space (or more) for recordings, and |
| | | iv. 100 Mbits / sec bandwidth (symmetrical) |

| | I | II |
|---|---|---|
| A | Table 3: | |
| B | For 8X, 8X hardware is: | i. 8-TIMES "4 GB of memory (8 GB is better) with swap enabled", |
| | (if maximum 200 attendees join | i.e. "32 GB of memory (64 GB is better) with swap enabled", & |
| | BigBlueButton multipoint meeting | ii. 8-TIMES "Quad-core 2.6 GHZ CPU (or faster) ", |
| | using linear formula) | i.e. EIGHT CPU's; EACH "Quad-core 2.6 GHZ CPU (or faster) ", & |
| | | iii. 8-TIMES "500GB of free disk space (or more) for recordings", |
| | | i.e. "4000 GB of free disk space (or more) for recordings", & |
| | | iv. 8-TIMES "100 Mbits / sec bandwidth (symmetrical) ", |
| | | i.e. "800 Mbits / sec bandwidth (symmetrical) ". |

FIG. 11A: BigBlueButton, (Virtualized)-(1X)-H/W-(in-Cloud-Instance), "Linear" Formula

| | I | II | III | IV | V | VI | VII | VIII | IX | X | XI |
|---|---|---|---|---|---|---|---|---|---|---|---|
| A | Table 1: | | Maximum Attendees: | | | | | | | | |
| B | | | 25 | 50 | 100 | 500 | 1000 | 2,500 | 10,000 | 100,000 | 1,000,000 |
| C | # of (1X)-H/W-(implemented-in- | Linear [(a)] | 1X | 2X | 4X | 20X | 40X | 100X | 400X | 4,000X | 40,000X |
| D | host-computer-cloud-instance): | Double [(b)] | 2X | 4X | 8X | 40X | 100X | 200X | 800X | 8,000X | 80,000X |
| E | | | | | ( Contact cloud vendor to pre-arrange, if >= 100X ) | | | | | | |

(a) "Linear" formula for # of (1X)-hardware-(implemented-in-cloud-instance)
= "Maximum # of attendees expected" / 25
(if fraction, round up to next integer)

(b) "Double" formula for # of (1X)-hardware-(implemented-in-cloud-instance)
= 2 * "Maximum # of attendees expected" / 25
(if fraction, round up to next integer)

| Table 2: | | | | | | | |
|---|---|---|---|---|---|---|---|
| | I | II | III | IV | V | VI | VII |
| A | (Virtualized) Linear-Formula (1X)-Hardware (Implemented in Cloud-Instance) and running BigBlueButton: | | | | | | |
| B | | | | (Virtualized)-(1X)-H/W-Implemented-(in-Instance): | | | |
| C | Max. # | # of (1X)-H/W | Host Computer | CPU | Memory | Disk | Bandwidth |
| D | Attendees | Implemented | Cloud Instance | (#-Core) | (GigaByte) | Space (GB) | Mbits/sec. |
| E | 25 | 1X | 1X-(H/W)-Instance | 4 | 8 | 500 | 100 |
| F | 50 | 2X | 2X-(H/W)-Instance | 8 | 16 | 1,000 | 200 |
| G | 100 | 4X | 4X-(H/W)-Instance | 16 | 32 | 2,000 | 400 |
| H | 200 | 8X | 8X-(H/W)-Instance | 32 | 64 | 4,000 | 800 |
| I | 500 | 20X | 20X-(H/W)-Instance | 80 | 160 | 10,000 | 2,000 |
| J | 1,000 | 40X | 40X-(H/W)-Instance | 160 | 320 | 20,000 | 4,000 |
| K | 2,500 | 100X | 100X-(H/W)-Instance | 400 | 800 | 50,000 | 10,000 |
| L | 10,000 | 400X | 400X-(H/W)-Instance | 1,600 | 3,200 | 200,000 | 40,000 |
| M | 100,000 | 4,000X | 4000X-(H/W)-Instance | 16,000 | 32,000 | 2,000,000 | 400,000 |
| N | 1,000,000 | 40,000X | 40000X-(H/W)-Instance | 160,000 | 320,000 | 20,000,000 | 4,000,000 |
| O | | (Contact Vendor to Pre-Arrange, if # of (1X)-H/W >= 100X) | | | | | |

FIG. 11B: BigBlueButton (Virtualized)-H/W-(in-Cloud-Instance)

| | I | II | III | IV | V | VI | VII | VIII |
|---|---|---|---|---|---|---|---|---|
| A | Increase H/W Level | (Begin) Max. # Users | (Begin) #-of-(1X)-H/W | (Begin) Host-Computer-Cloud-Instance | n-Level Increase-in-#-of-(1X)-H/W in Cloud-Instance | (Final) Host-Computer-Cloud-Instance | (Final) #-of-(1X)-H/W | (Final) Max. # Users |
| B | 1st | 25 | 1X | 1X-(H/W)-Instance | 1X | 2X-(H/W)-Instance | 2X | 50 |
| C | 2nd | 50 | 2X | 2X-(H/W)-Instance | 2X | 4X-(H/W)-Instance | 4X | 100 |
| D | 3rd | 100 | 4X | 4X-(H/W)-Instance | 4X | 8X-(H/W)-Instance | 8X | 200 |
| E | 4th | 200 | 8X | 8X-(H/W)-Instance | 12X | 20X-(H/W)-Instance | 20X | 500 |
| F | 5th | 500 | 20X | 20X-(H/W)-Instance | 20X | 40X-(H/W)-Instance | 40X | 1,000 |
| G | 6th | 1,000 | 40X | 40X-(H/W)-Instance | 60X | 100X-(H/W)-Instance | 100X | 2,500 |
| H | etc. | etc. | etc. | etc. | etc. | etc. | etc. | etc. |
| I | (n-2)th | 2,500 | 100X | 100X-(H/W)-Instance | 300X | 400X-(H/W)-Instance | 400X | 10,000 |
| J | (n-1)th | 10,000 | 400X | 400X-(H/W)-Instance | 3,600X | 4000X-(H/W)-Instance | 4,000X | 100,000 |
| K | (n)th | 100,000 | 4,000X | 4000X-(H/W)-Instance | 36,000X | 40000X-(H/W)-Instance | 40,000X | 1,000,000 |
| L | | | | | (Contact Cloud-Vendor to Customize, if #-of-(1X)-H/W >= 100X.) | | | |

FIG. 11C: (BigBlueButton)-("Not-Decrease"-or)-Increase-(Virtualized)-(1X)-H/W-(in-Instance)

| | I | II | III | IV | V | VI | VII | VIII |
|---|---|---|---|---|---|---|---|---|
| A | Not-Decr. H/W Level | (Begin) Max. # Users | (Begin) #-of-(1X)-H/W | (Begin) Host-Computer-Cloud-Instance | Keep-SAME / Not-Change #-of-(1X)-H/W in Cloud-Instance | (Final) Host-Computer-Cloud-Instance | (Final) #-of-(1X)-H/W | (Final) Max. # Users |
| B | 1st | 25 | 1X | 1X-(H/W)-Instance | 1X | 1X-(H/W)-Instance | 1X | 25 |
| C | 2nd | 50 | 2X | 2X-(H/W)-Instance | 2X | 2X-(H/W)-Instance | 2X | 50 |
| D | 3rd | 100 | 4X | 4X-(H/W)-Instance | 4X | 4X-(H/W)-Instance | 4X | 100 |
| E | 4th | 200 | 8X | 8X-(H/W)-Instance | 8X | 8X-(H/W)-Instance | 8X | 200 |
| F | 5th | 500 | 20X | 20X-(H/W)-Instance | 20X | 20X-(H/W)-Instance | 20X | 500 |
| G | 6th | 1,000 | 40X | 40X-(H/W)-Instance | 40X | 40X-(H/W)-Instance | 40X | 1,000 |
| H | etc. | etc. | etc. | etc. | etc. | etc. | etc. | etc. |
| I | (n-3)th | 2,500 | 100X | 100X-(H/W)-Instance | 100X | 100X-(H/W)-Instance | 100X | 2,500 |
| J | (n-2)th | 10,000 | 400X | 400X-(H/W)-Instance | 400X | 400X-(H/W)-Instance | 400X | 10,000 |
| K | (n-1)th | 100,000 | 4,000X | 4000X-(H/W)-Instance | 4,000X | 4000X-(H/W)-Instance | 4,000X | 100,000 |
| L | (n)th | 1,000,000 | 40,000X | 40000X-(H/W)-Instance | 40,000X | 40000X-(H/W)-Instance | 40,000X | 1,000,000 |
| M | | | | | (Contact Cloud-Vendor to Customize, if #-of-(1X)-H/W >= 100X.) | | | |

FIG. 11D: (BigBlueButton)-("Not-Decrease"-or)-Keep-SAME-(1X)-H/W-(in-Instance)

| | I | II | III | IV | V | VI | VII | VIII |
|---|---|---|---|---|---|---|---|---|
| A | Decrease H/W Level | (Begin) Max. # Users | (Begin) #-of-(1X)-H/W | (Begin) Host-Computer-Cloud-Instance | n-Level Decrease-in-#-of-(1X)-H/W in Cloud-Instance | (Final) Host-Computer-Cloud-Instance | (Final) #-of-(1X)-H/W | (Final) Max. # Users |
| B | (n)th | 1,000,000 | 40,000X | 40000X-(H/W)-Instance | 36,000X | 4000X-(H/W)-Instance | 4,000X | 100,000 |
| C | (n-1)th | 100,000 | 4,000X | 4000X-(H/W)-Instance | 3,600X | 400X-(H/W)-Instance | 400X | 10,000 |
| D | (n-2)th | 10,000 | 400X | 400X-(H/W)-Instance | 300X | 100X-(H/W)-Instance | 100X | 2,500 |
| E | etc. | etc. | etc. | etc. | etc. | etc. | etc. | etc. |
| F | 6th | 2,500 | 100X | 100X-(H/W)-Instance | 60X | 40X-(H/W)-Instance | 40X | 1,000 |
| G | 5th | 1,000 | 40X | 40X-(H/W)-Instance | 20X | 20X-(H/W)-Instance | 20X | 500 |
| H | 4th | 500 | 20X | 20X-(H/W)-Instance | 12X | 8X-(H/W)-Instance | 8X | 200 |
| I | 3rd | 200 | 8X | 8X-(H/W)-Instance | 4X | 4X-(H/W)-Instance | 4X | 100 |
| J | 2nd | 100 | 4X | 4X-(H/W)-Instance | 2X | 2X-(H/W)-Instance | 2X | 50 |
| K | 1st | 50 | 2X | 2X-(H/W)-Instance | 1X | 1X-(H/W)-Instance | 1X | 25 |
| L | | | | | (Contact Cloud-Vendor to Customize, if #-of-(1X)-H/W >= 100X.) | | | |

FIG. 11E: (BigBlueButton)-("Not-Increase"-or)-Decrease-(Virtualized)-(1X)-H/W-(in-Instance)

| | I | II | III | IV | V | VI | VII | VIII |
|---|---|---|---|---|---|---|---|---|
| A | Not-Incr. H/W Level | (Begin) Max. # Users | (Begin) #-of-(1X)-H/W | (Begin) Host-Computer-Cloud-Instance | Keep-SAME / Not-Change #-of-(1X)-H/W in Cloud-Instance | (Final) Host-Computer-Cloud-Instance | (Final) #-of-(1X)-H/W | (Final) Max. # Users |
| B | (n)th | 1,000,000 | 40,000X | 40000X-(H/W)-Instance | 40,000X | 40000X-(H/W)-Instance | 40,000X | 1,000,000 |
| C | (n-1)th | 100,000 | 4,000X | 4000X-(H/W)-Instance | 4,000X | 4000X-(H/W)-Instance | 4,000X | 100,000 |
| D | (n-2)th | 10,000 | 400X | 400X-(H/W)-Instance | 400X | 400X-(H/W)-Instance | 400X | 10,000 |
| E | (n-3)th | 2,500 | 100X | 100X-(H/W)-Instance | 100X | 100X-(H/W)-Instance | 100X | 2,500 |
| F | etc. | etc. | etc. | etc. | etc. | etc. | etc. | etc. |
| G | 6th | 1,000 | 40X | 40X-(H/W)-Instance | 40X | 40X-(H/W)-Instance | 40X | 1,000 |
| H | 5th | 500 | 20X | 20X-(H/W)-Instance | 20X | 20X-(H/W)-Instance | 20X | 500 |
| I | 4th | 200 | 8X | 8X-(H/W)-Instance | 8X | 8X-(H/W)-Instance | 8X | 200 |
| J | 3rd | 100 | 4X | 4X-(H/W)-Instance | 4X | 4X-(H/W)-Instance | 4X | 100 |
| K | 2nd | 50 | 2X | 2X-(H/W)-Instance | 2X | 2X-(H/W)-Instance | 2X | 50 |
| L | 1st | 25 | 1X | 1X-(H/W)-Instance | 1X | 1X-(H/W)-Instance | 1X | 25 |
| M | | | | | (Contact Cloud-Vendor to Customize, if #-of-(1X)-H/W >= 100X.) | | | |

FIG. 11F: (BigBlueButton)-(Not-Increase-or)-Keep-SAME-(1X)-H/W-(in-Instance)

* Come from step "A" in FIGS. 12B, 12C, 12D, 12E, 12F, 12G, 12H, or 12I.

** Go back to step "B" in SAME FIG. 12B, 12C, 12D, 12E, 12F, 12G , 12H, or 12I as in step "A" above.

(1) Number of single-(virtualized)-hardware added can be (i) computing-cloud-default to 10% of current number of single hardware (rounded up to next integer), or (ii) as illustrated in FIG. 11C.

* Go to step "A" in FIG. 12A.

** After finishing process in FIG. 12A, come back from step "B" In FIG. 12A.

* Go to step "A" in FIG. 12A.

** After finishing process in FIG. 12A, come back from step "B" in FIG. 12A.

* Go to step “A” in FIG. 12A.

** After finishing process in FIG. 12A, come back from step “B” in FIG. 12A.

* Go to step "A" in FIG. 12A.
** After finishing process in FIG. 12A, come back from step "B" in FIG. 12A.

* Go to step "A" in FIG. 12A.

** After finishing process in FIG. 12A, come back from step "B" In FIG. 12A.

* Go to step "A" in FIG. 12A.

** After finishing process in FIG. 12A, come back from step "B" in FIG. 12A.

* Go to step "A" in FIG. 12A.

** After finishing process in FIG. 12A, come back from step "B" in FIG. 12A.

* Go to step "A" in FIG. 12A.

** After finishing process in FIG. 12A, come back from step "B" in FIG. 12A.

* Come from step "C" in FIG. 13B, 13C, 13D, 13E, 13F, or 13G.

** Go back to step "D" in SAME FIG. 13B, 13C, 13D, 13E, 13F, or 13G as in step "C" above.

(1) Number of single-(virtualized)-hardware added can be (i) computing-cloud-default to 10% of current number of single hardware (rounded up to next integer), or (ii) as illustrated in FIGS. 11C.

* Go to step "C" in FIG. 13A.

** After finishing process in FIG. 13A, come back from step "D" In FIG. 13A.

* Go to step "C" in FIG. 13A.

** After finishing process in FIG. 13A, come back from step "D" In FIG. 13A.

* Go to step "C" in FIG. 13A.

** After finishing process in FIG. 13A, come back from step "D" In FIG. 13A.

* Go to step "C" in FIG. 13A.

** After finishing process in FIG. 13A, come back from step "D" In FIG. 13A.

* Go to step "C" in FIG. 13A.

** After finishing process in FIG. 13A, come back from step "D" In FIG. 13A.

* Go to step "C" in FIG. 13A.

** After finishing process in FIG. 13A, come back from step "D" In FIG. 13A.

BigBlueButton Client Check

Refresh

| Item | Result | Status |
|---|---|---|
| Java Enabled | Java is disabled in your browser | Warning |
| Browser | Firefox 38.0 | |
| Client Check Version | 0.9.0-28 | |
| Cookie Enabled | true | |
| Download Speed | 1.774 Mbps (2.273 MB in 10 seconds) | |
| Flash Version | 17.0.0.188 | |
| Is Pepper Flash | false | |
| Language | en-US | |
| Ping | 196.8 ms | |
| Port 9123 | connect | |
| RTMP BigBlueButton app | NetConnection.Connect.Success | |
| RTMP deskShare app | NetConnection.Connect.Success | |
| RTMP sip app | NetConnection.Connect.Success | |
| RTMP video app | NetConnection.Connect.Success | |
| RTMPT BigBlueButton app | NetConnection.Connect.Success | |
| RTMPT deskShare app | NetConnection.Connect.Success | |
| RTMPT sip app | NetConnection.Connect.Success | |
| RTMPT video app | NetConnection.Connect.Success | |
| Screen Size | 1440 x 900 | |
| User Agent | Mozilla/5.0 (Windows NT 6.1; WOW64; rv:38.0) Gecko/20100101 Firefox/38.0 | |
| WebRTC Echo Test | Connected | |
| WebRTC Socket Test | Connected | |
| WebRTC Supported | true | |

FIG. 16

| | Client Check Item | Client Check Result / Status | Client software-as-a-service |
|---|---|---|---|
| Case 1: | Audio | No audio (sound card missing) | Instant speech-to-text translation |
| Case 2: | Bandwidth | Below recommended | More data compression |
| Case 3: | Client OS support | Not supported | Interpretor to support non-supported OS |
| Case 4: | Client language | Client language different | Instant language translation |
| Case 5: | Non-intelligent phone | Not supported | Audio-only to GSM etc. legacy phones |
| Case 6: | Non-intelligent terminal | Not supported | Instant speech-to-text translation |

FIG. 17

* Come from step "E" in FIGS. 19B or 19C.

** Go back to step "F" in SAME FIGS. 19B or 19C as in step "E" above.

* Go to step "E" in FIG. 19A.

** After finishing process in FIG. 19A, come back from step "F" In FIG. 19A.

* Go to step "E" in FIG. 19A.

** After finishing process in FIG. 19A, come back from step "F" In FIG. 19A.

| | Is IP Address and/or URL of Host Computer Stored in Server ? | Is IP Address and/or URL of Client Computer Stored in Server ? |
|---|---|---|
| Case A | No | No |
| Case B | No | Yes |
| Case C | Yes | No |
| Case D | Yes | Yes |

FIG. 22

| | A | B | C | D | E |
|---|---|---|---|---|---|
| a | Cases I to V | Sub-Domain Address | UNIQUE ID Example * | I.P. address | URL |
| b | Case I | test.moodlecloud.com | la1B2c3 | 54.201.157.224 | us-moodlecloud-100165812.us-west-2.elb.amazonaws.com |
| c | Case II | test1.moodlecloud.com | lIX0y9z | 52.64.64.171 | au-moodlecloud-1086023927.ap-southeast-2.elb.amazonaws.com |
| d | Case III | test2.moodlecloud.com | lllm4N5 | 54.68.74.223 | us-moodlecloud-100165812.us-west-2.elb.amazonaws.com |
| e | Case IV | bigbluebutton.moodlecloud.com | lVt8U7v | 54.68.74.224 | us-moodlecloud-100165812.us-west-2.elb.amazonaws.com |
| f | Case V | moodle.moodlecloud.com | VE3f2g1 | 54.68.74.224 | us-moodlecloud-100165812.us-west-2.elb.amazonaws.com |

* The unique ID examples are examples only, and are not the same as those used by Amazon.

For ease of reading (and simpler tables) the IP / URL addresses in the Tables are without http:// .

FIG. 23A

| | A | B | C | D | E |
|---|---|---|---|---|---|
| a | Cases I to V | Sub-Domain Address | UNIQUE ID Example | I.P. address | URL |
| b | FRIENDLY ? | Yes | No | No | No |
| c | CAN CHANGE ? | NOT Change | NOT Change | CHANGE | NOT Change |
| d | UNIQUE ? | UNIQUE | UNIQUE | NOT Unique | NOT Unique |

FIG. 23B

Note: Host Helper Program 216-1 typically runs in Host Computer 205 (e.g. in FIGS. 24A, 30A, and in most other FIGS.), which are different than FIG. 26C which illustrates Host Helper Program 216-1 running in installed virtual machine (virtual machine not shown in FIG. 26C) operating in Host Computer 205 in FIG. 26C.

* FIG. 26C illustrates Host Helper Program 216-1 running in installed virtual machine (virtual machine not shown) operating in Host Computer 205 in FIG. 26C, Note: Host Helper Program 216-1 typically runs in Host Computer 205 (e.g. in FIGS. 24A, 30A, and in most other FIGS.), which are different than FIG. 26C which illustrates Host Helper Program 216-1 running in installed virtual machine (virtual machine not shown in FIG. 26C) operating in Host Computer 205 in FIG. 26C.

| | I | II | III | IV | V | VI | VII | VIII | IX | X |
|---|---|---|---|---|---|---|---|---|---|---|
| A | Table 1: | | | | | Maximum Concurrent Users: | | | | |
| B | | | 100 | 200 | 400 | 2,000 | 4,000 | 10,000 | 40,000 | 400,000 |
| C | # of hardware (implemented in | Linear[(a)] | 1X | 2X | 4X | 20X | 40X | 100X | 400X | 4,000X |
| D | host computer cloud instance): | Double[(b)] | 2X | 4X | 8X | 40X | 80X | 200X | 800X | 8,000X |
| E | | | | | (Contact Cloud Vendor to Pre-Arrange, if >= 100X.) | | | | | |

(a) "Linear" formula for # of hardware (implemented in cloud instance) =
"Maximum # of concurrent users expected" / 100
(if fraction, round up to next integer)
(b) "Double" formula for # of hardware (implemented in cloud instance)
= 2 * ( "Maximum # of concurrent users expected" / 100 )
(if fraction, round up to next integer)

| | I | II |
|---|---|---|
| A | Table 2: | |
| | For 1X, 1X hardware is: | i. 4 GB of memory (8 GB is better) with swap enabled, and |
| B | (if maximum 100 concurrent users | ii. Dual-core 2.8 GHZ CPU (or faster), and |
| | join Moodle Internet application) | iii. 80GB of free disk space (or more) SCSI drive, and |
| | | iv. 100 Mbits / sec bandwidth (symmetrical) |

| | I | II |
|---|---|---|
| A | Table 3: | |
| | For 8X, 8X hardware is: | i. 8-TIMES "4 GB of memory (8 GB is better) with swap enabled", |
| | (if maximum 800 concurrent users | i.e. "32 GB of memory (64 GB is better) with swap enabled", & |
| | join Moodle Internet application) | ii. 8-TIMES "Dual-core 2.8 GHZ CPU (or faster)", |
| B | | i.e. EIGHT CPU's; EACH "Dual-core 2.8 GHZ CPU (or faster)", & |
| | | iii. 8-TIMES "80GB of free disk space (or more) SCSI drive", |
| | | i.e. "640 GB of free disk space (or more) SCSI drive", & |
| | | iv. 8-TIMES "100 Mbits / sec bandwidth (symmetrical)", |
| | | i.e. "800 Mbits / sec bandwidth (symmetrical)". |

FIG. 39A: Moodle (Virtualized)-(1X)-H/W

| | I | II | III | IV | V | VI | VII | VIII | IX | X |
|---|---|---|---|---|---|---|---|---|---|---|
| A | Table 1: | | | | Maximum Concurrent Users: | | | | | |
| B | | | 100 | 200 | 400 | 2,000 | 4,000 | 10,000 | 40,000 | 400,000 |
| C | # of hardware (implemented in | Linear[a] | 1X | 2X | 4X | 20X | 40X | 100X | 400X | 4,000X |
| D | host computer cloud instance): | Double[b] | 2X | 4X | 8X | 40X | 80X | 200X | 800X | 8,000X |
| E | | | | | (Contact Cloud Vendor to Pre-Arrange, if >= 100X.) | | | | | |

(a) "Linear" formula for # of hardware (implemented in cloud instance) = "Maximum # of concurrent users expected" / 100 (if fraction, round up to next integer)

(b) "Double" formula for # of hardware (implemented in cloud instance) = 2 * ( "Maximum # of concurrent users expected" / 100 ) (if fraction, round up to next integer)

| Table 2: | | | | | | | |
|---|---|---|---|---|---|---|---|
| | I | II | III | IV | V | VI | VII |
| A | (Virtualized) Linear-Formula (1X)-Hardware (Implemented in Cloud-Instance) and running Moodle LMS: | | | | | | |
| B | Max. # of | # of (1X)- | | (Virtualized)-(1X)-H/W-Implemented-(in-Instance): | | | |
| C | Concurrent | Hardware- | Host Computer | CPU | Memory | Disk | Bandwidth |
| D | Users | Implemented | Cloud Instance | (#-Core) | (GigaByte) | Space (GB) | Mbits / sec. |
| E | 100 | 1X | 1X-(H/W)-Instance | 2 | 8 | 80 | 100 |
| F | 200 | 2X | 2X-(H/W)-Instance | 4 | 16 | 160 | 200 |
| G | 400 | 4X | 4X-(H/W)-Instance | 8 | 32 | 320 | 400 |
| H | 800 | 8X | 8X-(H/W)-Instance | 16 | 64 | 640 | 800 |
| I | 2,000 | 20X | 20X-(H/W)-Instance | 40 | 160 | 1,600 | 2,000 |
| J | 4,000 | 40X | 40X-(H/W)-Instance | 80 | 320 | 3,200 | 4,000 |
| K | 10,000 | 100X | 100X-(H/W)-Instance | 200 | 800 | 8,000 | 10,000 |
| L | 40,000 | 400X | 400X-(H/W)-Instance | 800 | 3,200 | 32,000 | 40,000 |
| M | 400,000 | 4,000X | 4000X-(H/W)-Instance | 8,000 | 32,000 | 320,000 | 400,000 |
| N | | (Contact Vendor to Pre-Arrange, if # of (1X)-H/W >= 100X) | | | | | |

FIG. 39B: Moodle (Virtualized)-(1X)-H/W-(in-Cloud-Instance)

| | I | II | III | IV | V | VI | VII | VIII |
|---|---|---|---|---|---|---|---|---|
| A | Increase H/W Level | (Begin) Max. # Users | (Begin) #-of-(1X)-H/W | (Begin) Host-Computer-Cloud-Instance | n-Level Increase-in-#-of-(1X)-H/W in Cloud-Instance | (Final) Host-Computer-Cloud-Instance | (Final) #-of-(1X)-H/W | (Final) Max. # Users |
| B | 1st | 100 | 1X | 1X-(H/W)-Instance | 1X | 2X-(H/W)-Instance | 2X | 200 |
| C | 2nd | 200 | 2X | 2X-(H/W)-Instance | 2X | 4X-(H/W)-Instance | 4X | 400 |
| D | 3rd | 400 | 4X | 4X-(H/W)-Instance | 4X | 8X-(H/W)-Instance | 8X | 800 |
| E | 4th | 800 | 8X | 8X-(H/W)-Instance | 12X | 20X-(H/W)-Instance | 20X | 2,000 |
| F | 5th | 2,000 | 20X | 20X-(H/W)-Instance | 20X | 40X-(H/W)-Instance | 40X | 4,000 |
| G | 6th | 4,000 | 40X | 40X-(H/W)-Instance | 60X | 100X-(H/W)-Instance | 100X | 10,000 |
| H | etc. | etc. | etc. | etc. | etc. | etc. | etc. | etc. |
| I | (n-1)th | 10,000 | 100X | 100X-(H/W)-Instance | 300X | 400X-(H/W)-Instance | 400X | 40,000 |
| J | (n)th | 40,000 | 400X | 400X-(H/W)-Instance | 3,600X | 4000X-(H/W)-Instance | 4,000X | 400,000 |
| K | | | | | (Contact Amazon to Customize, if #-of-(1X)-H/W >= 100X.) | | | |

FIG. 39C: (Moodle)-(Not-Decrease-or)-Increase-(Virtualized)-(1X)-H/W-(in-Instance)

| | I | II | III | IV | V | VI | VII | VIII |
|---|---|---|---|---|---|---|---|---|
| A | Not-Decr. H/W Level | (Begin) Max. # Users | (Begin) #-of-(1X)-H/W | (Begin) Host-Computer-Cloud-Instance | Keep-SAME / Not-Change #-of-(1X)-H/W in Cloud-Instance | (Final) Host-Computer-Cloud-Instance | (Final) #-of-(1X)-H/W | (Final) Max. # Users |
| B | 1st | 100 | 1X | 1X-(H/W)-Instance | 1X | 1X-(H/W)-Instance | 1X | 100 |
| C | 2nd | 200 | 2X | 2X-(H/W)-Instance | 2X | 2X-(H/W)-Instance | 2X | 200 |
| D | 3rd | 400 | 4X | 4X-(H/W)-Instance | 4X | 4X-(H/W)-Instance | 4X | 400 |
| E | 4th | 800 | 8X | 8X-(H/W)-Instance | 8X | 8X-(H/W)-Instance | 8X | 800 |
| F | 5th | 2,000 | 20X | 20X-(H/W)-Instance | 20X | 20X-(H/W)-Instance | 20X | 2,000 |
| G | 6th | 4,000 | 40X | 40X-(H/W)-Instance | 40X | 40X-(H/W)-Instance | 40X | 4,000 |
| H | etc. | etc. | etc. | etc. | etc. | etc. | etc. | etc. |
| I | (n-2)th | 10,000 | 100X | 100X-(H/W)-Instance | 100X | 100X-(H/W)-Instance | 100X | 10,000 |
| J | (n-1)th | 40,000 | 400X | 400X-(H/W)-Instance | 400X | 400X-(H/W)-Instance | 400X | 40,000 |
| K | (n)th | 400,000 | 4000X | 4000X-(H/W)-Instance | 4000X | 4000X-(H/W)-Instance | 4000X | 400,000 |
| L | | | | | (Contact Amazon to Customize, if #-of-(1X)-H/W >= 100X.) | | | |

FIG. 39D: (Moodle)-(Not-Decrease-or)-Keep-SAME-(Virtualized)-(1X)-H/W-(in-Instance)

| | I | II | III | IV | V | VI | VII | VIII |
|---|---|---|---|---|---|---|---|---|
| A | Decrease H/W Level | (Begin) Max. # Users | (Begin) #-of-(1X)-H/W | (Begin) Host-Computer-Cloud-Instance | n-Level Decrease-in-#-of-(1X)-H/W in Cloud-Instance | (Final) Host-Computer-Cloud-Instance | (Final) #-of-(1X)-H/W | (Final) Max. # Users |
| B | (n)th | 400,000 | 4000X | 4000X-(H/W)-Instance | 3,600X | 400X-(H/W)-Instance | 400X | 40,000 |
| C | (n-1)th | 40,000 | 400X | 400X-(H/W)-Instance | 300X | 100X-(H/W)-Instance | 100X | 10,000 |
| D | etc. | etc. | etc. | etc. | etc. | etc. | etc. | etc. |
| E | 6th | 10,000 | 100X | 100X-(H/W)-Instance | 60X | 40X-(H/W)-Instance | 40X | 4,000 |
| F | 5th | 4,000 | 40X | 40X-(H/W)-Instance | 20X | 20X-(H/W)-Instance | 20X | 2,000 |
| G | 4th | 2,000 | 20X | 20X-(H/W)-Instance | 12X | 8X-(H/W)-Instance | 8X | 800 |
| H | 3rd | 800 | 8X | 8X-(H/W)-Instance | 4X | 4X-(H/W)-Instance | 4X | 400 |
| I | 2nd | 400 | 4X | 4X-(H/W)-Instance | 2X | 2X-(H/W)-Instance | 2X | 200 |
| J | 1st | 200 | 2X | 2X-(H/W)-Instance | 1X | 1X-(H/W)-Instance | 1X | 100 |
| K | | | | | (Contact Cloud-Vendor to Customize, if #-of-(1X)-H/W >= 100X.) | | | |

FIG. 39E: (Moodle)-(Not-Increase-or)-Decrease-(Virtualized)-(1X)-H/W-(in-Instance)

| | I | II | III | IV | V | VI | VII | VIII |
|---|---|---|---|---|---|---|---|---|
| A | Not-Incr. H/W Level | (Begin) Max. # Users | (Begin) #-of-(1X)-H/W | (Begin) Host-Computer-Cloud-Instance | Keep-SAME / Not-Change #-of-(1X)-H/W in Cloud-Instance | (Final) Host-Computer-Cloud-Instance | (Final) #-of-(1X)-H/W | (Final) Max. # Users |
| B | (n)th | 400,000 | 4000X | 4000X-(H/W)-Instance | 4000X | 4000X-(H/W)-Instance | 4000X | 400,000 |
| C | (n-1)th | 40,000 | 400X | 400X-(H/W)-Instance | 400X | 400X-(H/W)-Instance | 400X | 40,000 |
| D | (n-2)th | 10,000 | 100X | 100X-(H/W)-Instance | 100X | 100X-(H/W)-Instance | 100X | 10,000 |
| E | etc. | etc. | etc. | etc. | etc. | etc. | etc. | etc. |
| F | 6th | 4,000 | 40X | 40X-(H/W)-Instance | 40X | 40X-(H/W)-Instance | 40X | 4,000 |
| G | 5th | 2,000 | 20X | 20X-(H/W)-Instance | 20X | 20X-(H/W)-Instance | 20X | 2,000 |
| H | 4th | 800 | 8X | 8X-(H/W)-Instance | 8X | 8X-(H/W)-Instance | 8X | 800 |
| I | 3rd | 400 | 4X | 4X-(H/W)-Instance | 4X | 4X-(H/W)-Instance | 4X | 400 |
| J | 2nd | 200 | 2X | 2X-(H/W)-Instance | 2X | 2X-(H/W)-Instance | 2X | 200 |
| K | 1st | 100 | 1X | 1X-(H/W)-Instance | 1X | 1X-(H/W)-Instance | 1X | 100 |
| L | | | | | (Contact Cloud-Vendor to Customize, if #-of-(1X)-H/W >= 100X.) | | | |

FIG. 39F: (Moodle)-(Not-Increase-or)-Keep-SAME-(Virtualized)-(1X)-H/W-(in-Instance)

* Come from step "A" in FIGS. 40B, 40C, 40D, 40E, 40F, or 40G.

** Go back to step "B" In SAME FIG. 40B, 40C, 40D, 40E, 40F, or 40G, as in step "A" above.

(1) Number of single-(virtualized)-hardware added can be (i) computing-cloud-default to 10% of current number of single hardware (rounded up to next integer), or (ii) as illustrated in FIGS. 39C.

* Go to step "A" in FIG. 40A.

** After finishing process in FIG. 40A, come back from step "B" In FIG. 40A.

* Go to step "A" in FIG. 40A.

** After finishing process in FIG. 40A, come back from step "B" In FIG. 40A.

* Go to step "A" in FIG. 40A.

** After finishing process in FIG. 40A, come back from step "B" In FIG. 40A.

* Go to step "A" in FIG. 40A.

** After finishing process in FIG. 40A, come back from step "B" In FIG. 40A.

* Go to step "A" in FIG. 40A.

** After finishing process in FIG. 40A, come back from step "B" In FIG. 40A.

* Go to step "A" in FIG. 40A.

** After finishing process in FIG. 40A, come back from step "B" In FIG. 40A.

* Come from step "C" in FIGS. 41B or 41C.

** Go back to step "D" In SAME FIG. 41B or 41C as in step "C" above.

(1) Number of single-(virtualized)-hardware added can be (i) computing-cloud-default to 10% of current number of single hardware (rounded up to next integer), or (ii) as illustrated in FIGS. 39C.

* Go to step "C" in FIG. 41A.

** After finishing process in FIG. 41A, come back from step "D" In FIG. 41A.

* Go to step "C" in FIG. 41A.

** After finishing process in FIG. 41A, come back from step "D" In FIG. 41A.

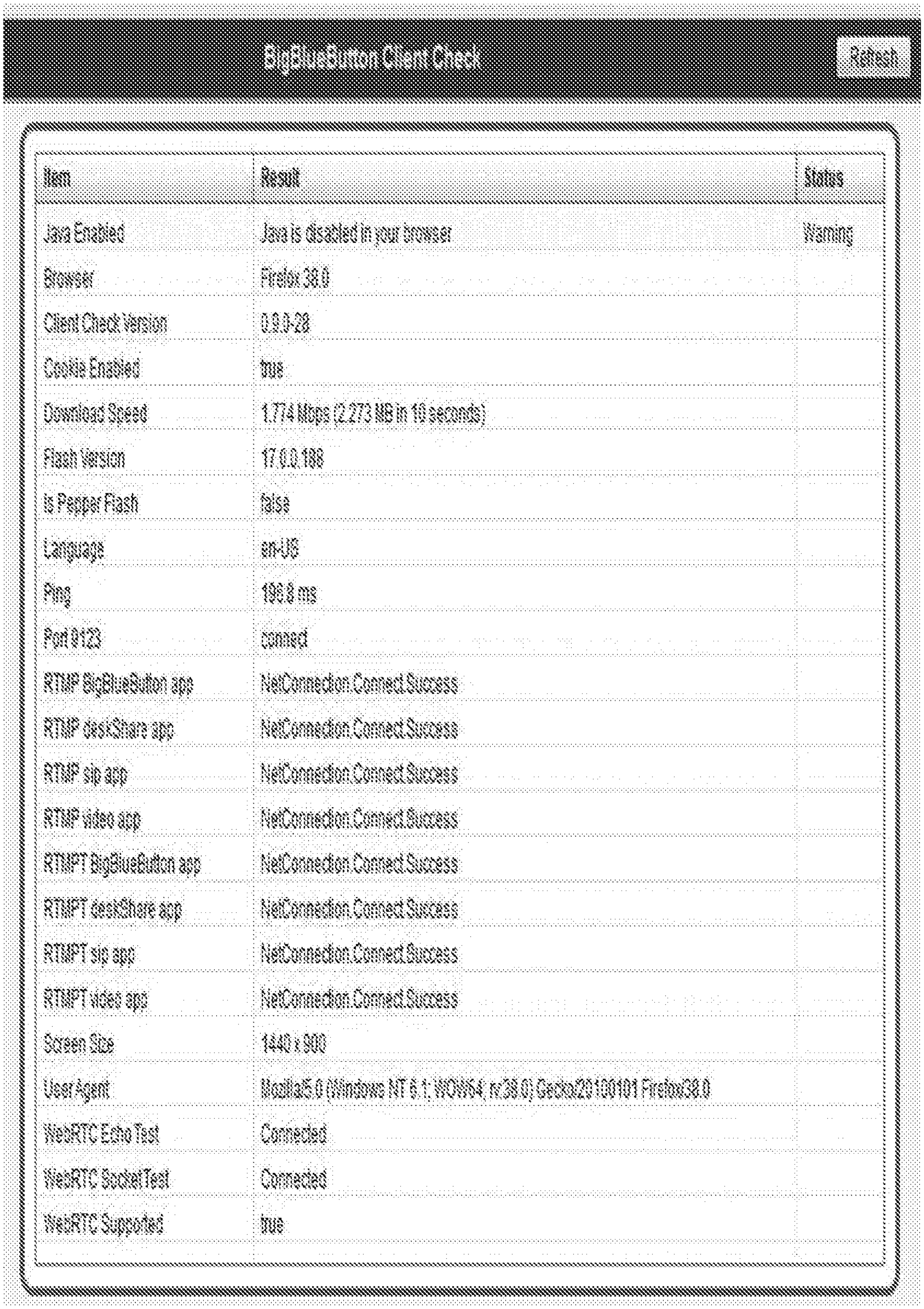

BigBlueButton Client Check

Refresh

| Item | Result | Status |
|---|---|---|
| Java Enabled | Java is disabled in your browser | Warning |
| Browser | Firefox 38.0 | |
| Client Check Version | 0.9.0-28 | |
| Cookie Enabled | true | |
| Download Speed | 1.774 Mbps (2.273 MB in 10 seconds) | |
| Flash Version | 17.0.0.188 | |
| Is Pepper Flash | false | |
| Language | en-US | |
| Ping | 196.8 ms | |
| Port 9123 | connect | |
| RTMP BigBlueButton app | NetConnection.Connect.Success | |
| RTMP deskShare app | NetConnection.Connect.Success | |
| RTMP sip app | NetConnection.Connect.Success | |
| RTMP video app | NetConnection.Connect.Success | |
| RTMPT BigBlueButton app | NetConnection.Connect.Success | |
| RTMPT deskShare app | NetConnection.Connect.Success | |
| RTMPT sip app | NetConnection.Connect.Success | |
| RTMPT video app | NetConnection.Connect.Success | |
| Screen Size | 1440 x 900 | |
| User Agent | Mozilla/5.0 (Windows NT 6.1; WOW64; rv:38.0) Gecko/20100101 Firefox/38.0 | |
| WebRTC Echo Test | Connected | |
| WebRTC Socket Test | Connected | |
| WebRTC Supported | true | |

FIG. 44

| | Client Check Item | Client Check Result / Status | Client software-as-a-service |
|---|---|---|---|
| Case 1: | Audio | No audio (sound card missing) | Instant speech-to-text translation |
| Case 2: | Bandwidth | Below recommended | More data compression |
| Case 3: | Client OS support | Not supported | Interpretor to support non-supported OS |
| Case 4: | Client language | Client language different | Instant language translation |
| Case 5: | Non-intelligent phone | Not supported | Audio-only to GSM etc. legacy phones |

FIG. 45

* Come from step "E" in FIGS. 47B or 47C.

** Go back to step "F" In SAME FIGS. 47B or 47C as in step "E" above.

* Go to step "E" in FIG. 47A.

** After finishing process in FIG. 47A, come back from step "F" In FIG. 47A.

* Go to step "E" in FIG. 47A.

** After finishing process in FIG. 47A, come back from step "F" In FIG. 47A.

| | Is IP Address and/or URL of Host Computer Stored in Server ? | Is IP Address and/or URL of Client Computer Stored in Server ? |
|---|---|---|
| Case A | No | No |
| Case B | No | Yes |
| Case C | Yes | No |
| Case D | Yes | Yes |

| | Is IP Address and/or URL of Host Computer Cloud Instance Stored in Server ? | Is IP Address and/or URL of Client Computer Stored in Server ? |
|---|---|---|
| Case E | No | No |
| Case F | No | Yes |
| Case G | Yes | No |
| Case H | Yes | Yes |

| | Is IP Address and/or URL (to forward to IP Address and/or URL of Host Computer Cloud Instance) Stored in Server ? | Is IP Address and/or URL (to forward to IP Address and/or URL of Client Computer) Stored in Server ? |
|---|---|---|
| Case I | No | No |
| Case J | No | Yes |
| Case K | Yes | No |
| Case L | Yes | Yes |

FIG. 50

| | A | B | C | D | E |
|---|---|---|---|---|---|
| a | Cases I to V | Sub-Domain Address | UNIQUE ID Example * | I.P. address | URL |
| b | Case I | test.moodlecloud.com | la1B2c3 | 54.201.157.224 | us-moodlecloud-100165812.us-west-2.elb.amazonaws.com |
| c | Case II | test1.moodlecloud.com | lIX0y9z | 52.64.64.171 | au-moodlecloud-1086023927.ap-southeast-2.elb.amazonaws.com |
| d | Case III | test2.moodlecloud.com | lIlm4N5 | 54.68.74.223 | us-moodlecloud-100165812.us-west-2.elb.amazonaws.com |
| e | Case IV | bigbluebutton.moodlecloud.com | lVt8U7v | 54.68.74.224 | us-moodlecloud-100165812.us-west-2.elb.amazonaws.com |
| f | Case V | moodle.moodlecloud.com | VE3f2g1 | 54.68.74.224 | us-moodlecloud-100165812.us-west-2.elb.amazonaws.com |

* The unique ID examples are examples only, and are not the same as those used by Amazon.

For ease of reading (and simpler tables) the IP / URL addresses in the Tables are without http:// .

FIG. 51A

| | A | B | C | D | E |
|---|---|---|---|---|---|
| a | Cases I to V | Sub-Domain Address | UNIQUE ID Example | I.P. address | URL |
| b | FRIENDLY ? | Yes | No | No | No |
| c | CAN CHANGE ? | NOT Change | NOT Change | CHANGE | NOT Change |
| d | UNIQUE ? | UNIQUE | UNIQUE | NOT Unique | NOT Unique |

FIG. 51B

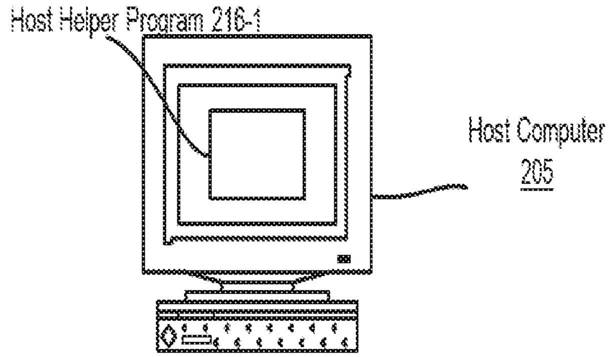
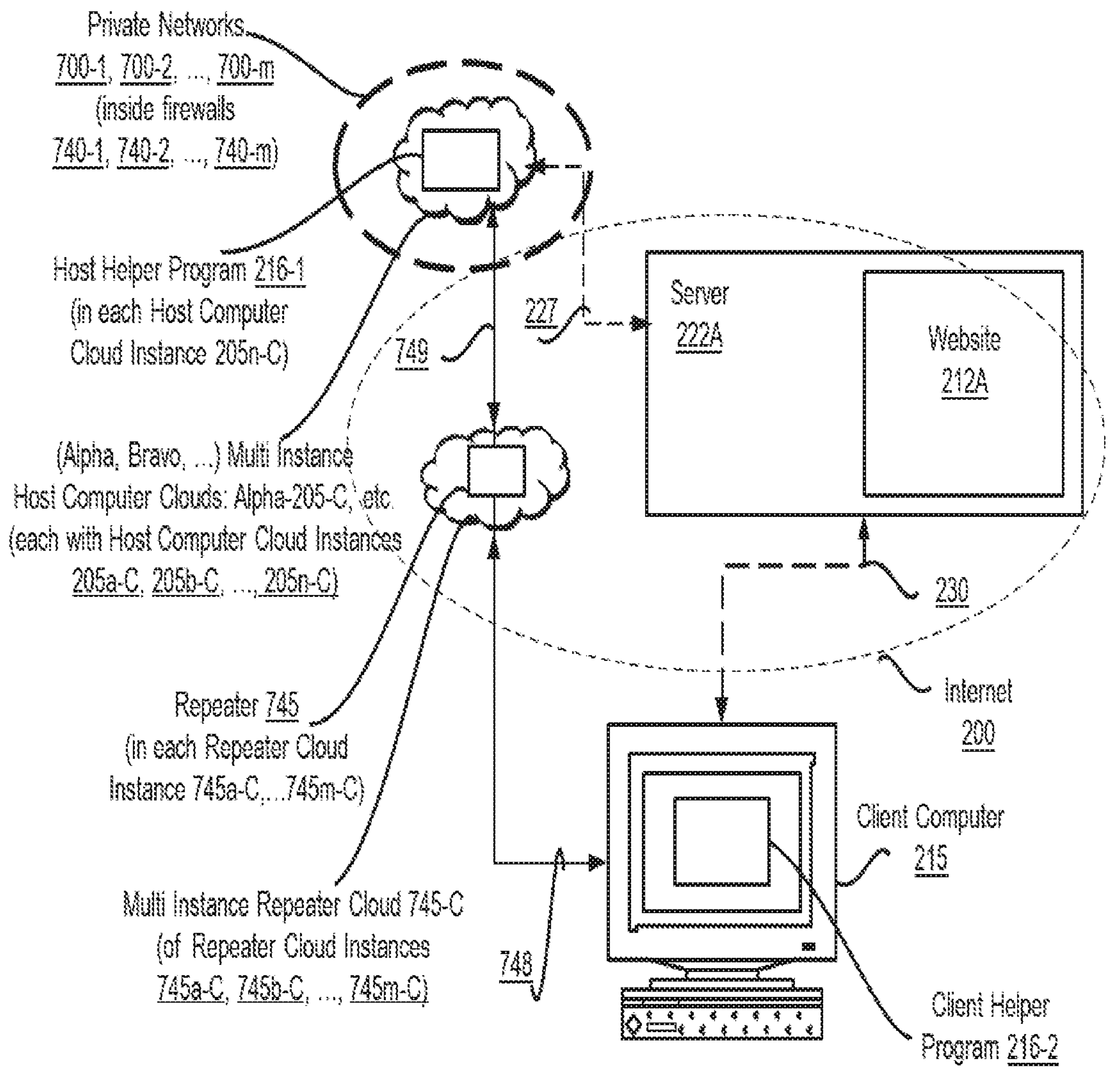
FIG. 53B

Amazon-size Cloud-Provider Example

| | I | II | III | IV | V | VI | VII | VIII | IX |
|---|---|---|---|---|---|---|---|---|---|
| | (Public Network) Multi Instance Repeater Cloud (R.C.I.) | (Public Network) Unique Public IP address | (Private Network) (Alpha, Bravo,...) Multi Instance Host Computer Clouds (Alpha,Bravo,...) 205-C | | (Private Network) Host Computer Cloud instances (H.C.C.I.) | (Private Network) Not Unique (H.C.C.I.) Private IP Address | (Private Network) Network Class under Repeater | (Private Network) Max. # of Private IP Addresses for Cloud Instance | Sub-Domain Address (if available or used) |
| | Repeater | | "Alpha" Multi Instance | a | H.C.C.I. 205a-C | 10.0.0.100 | Class A[1] | 16+ millions | test.moodlecloud.com |
| A | Cloud Instance | 54.201.157.224 | Host Computer Cloud | b | H.C.C.I. 205b-C | 172.16.0.100 | Class B[2] | 1 million | etc. |
| | 745a-C | | Alpha-205-C | n | H.C.C.I. 205n-C | 192.168.0.100 | Class C[3] | 65 thousands | etc. |
| | Repeater | | "Bravo" Multi Instance | a | H.C.C.I. 205a-C | 10.0.0.100 | Class A[1] | 16+ millions | bigbluebutton.moodlecloud.com |
| B | Cloud Instance | 54.68.74.224 | Host Computer Cloud | b | H.C.C.I. 205b-C | 172.16.0.100 | Class B[2] | 1+ million | moodle.moodlecloud.com |
| | 745b-C | | Bravo-205-C | n | H.C.C.I. 205n-C | 192.168.0.100 | Class C[3] | 65 thousands | etc. |
| C | R.C.I. 745c-C | 54.68.74.223 | Charlie-205-C | a | H.C.C.I. 205a-C | 10.0.0.100 | Class A[1] | 16+ millions | test2.moodlecloud.com |
| D | R.C.I. 745d-C | 54.69.82.86 | Delta-205-C | b | H.C.C.I. 205b-C | 172.16.0.100 | Class B[2] | 1+ million | cloud.moodlecloud.com |
| etc. | etc. | etc. | etc. | etc. | etc. | etc. | etc. | etc. | etc. |
| | Repeater | | "Mike" Multi Instance | a | H.C.C.I. 205a-C | 10.0.0.100 | Class A[1] | 16+ millions | etc. |
| M | Cloud Instance | 52.64.64.171 | Host Computer Cloud | b | H.C.C.I. 205b-C | 172.16.0.100 | Class B[2] | 1+ million | etc. |
| | 745m-C | | Mike-205-C | n | H.C.C.I. 205n-C | 192.168.0.100 | Class C[3] | 65 thousands | test1.moodlecloud.com |

1. Class A network is a 24-bit block of private IP address range: 10.0.0.0 - 10.255.255.255, and of 16,777,216 addresses.
2. Class B network is a 20-bit block of private IP address range: 172.16.0.0 - 172.31.255.255, and of 1,048,576 addresses.
3. Class C network is a 16-bit block of private IP address range: 192.168.0.0 - 192.168.255.255, and of 65,536 addresses.

For ease of reading (and simpler tables) the IP / URL addresses in the Tables are without http:// .

FIG. 54A

Amazon-size Cloud-Provider Example

| | I | II | VI | IX | X | XI |
|---|---|---|---|---|---|---|
| | (Public Network) Multi Instance Repeater Cloud (R.C.I.) | (Public Network) Unique Public IP address | (Private Network) Not Unique (H.C.C.I.) Private IP Address | Sub-Domain Address (if available or used) | URL | UNIQUE ID Example [4] |
| | Repeater | | 10.0.0.100 | test.moodlecloud.com | us-moodlecloud-100165812.us-west-2.elb.amazonaws.com | Ia1B2c3 |
| A | Cloud instance | 54.201.157.224 | 172.16.0.100 | etc. | etc. | etc. |
| | 745a-C | | 192.168.0.100 | etc. | etc. | etc. |
| | Repeater | | 10.0.0.100 | bigbluebutton.moodlecloud.com | us-moodlecloud-100165812.us-west-2.elb.amazonaws.com | fVf8U7v |
| B | Cloud instance | 54.68.74.224 | 172.16.0.100 | moodle.moodlecloud.com | us-moodlecloud-100165812.us-west-2.elb.amazonaws.com | VE3f2g1 |
| | 745b-C | | 192.168.0.100 | etc. | etc. | etc. |
| C | R.C.I. 745c-C | 54.68.74.223 | 10.0.0.100 | test2.moodlecloud.com | us-moodlecloud-100165812.us-west-2.elb.amazonaws.com | IIlm4N5 |
| D | R.C.I. 745d-C | 54.69.82.86 | 172.16.0.100 | cloud.moodlecloud.com | us-moodlecloud-100165812.us-west-2.elb.amazonaws.com | Vlw9KLz |
| etc. | etc. | etc. | etc. | etc. | etc. | etc. |
| | Repeater | | 10.0.0.100 | etc. | etc. | etc. |
| M | Cloud instance | 52.64.64.171 | 172.16.0.100 | etc. | etc. | etc. |
| | 745m-C | | 192.168.0.100 | test1.moodlecloud.com | au-moodlecloud-1086023927.ap-southeast-2.elb.amazonaws.com | IIX0y9z |

4 The unique ID examples are examples only, and are not the same as those used by the cloud-provider, e.g. Amazon.

For ease of reading (and simpler tables) the IP / URL addresses in the Tables are without http:// .

FIG. 54B

| | A | B | C | D | E | F | G |
|---|---|---|---|---|---|---|---|
| | | | Amazon-size Cloud-Provider Example | | | | |
| | | | Repeater | Host Computer | Public + | | (Assigned) |
| | | | Cloud Instance | Cloud Intance | Private I.P.: | | UNIQUE-ID |
| a | Cases I to IX | Sub-Domain Address | Public I.P. | Private I.P. | Unique? | URL | Example * |
| b | Case I | test.moodlecloud.com | 54.201.157.224 | 10.0.0.100 | Yes | us-moodlecloud-100165812.us-west-2.elb.amazonaws.com | la1B2c3 |
| c | Case II | test1.moodlecloud.com | 52.64.64.171 | 192.168.0.100 | Yes | au-moodlecloud-1086023927.ap-southeast-2.elb.amazonaws.com | IIX0y9z |
| d | Case III | test2.moodlecloud.com | 54.68.74.223 | 10.0.0.100 | Yes | us-moodlecloud-100165812.us-west-2.elb.amazonaws.com | IIIm4N5 |
| e | Case IV | bigbluebutton.moodlecloud.com | 54.68.74.224 | 10.0.0.100 | Yes | us-moodlecloud-100165812.us-west-2.elb.amazonaws.com | IVl8U7v |
| f | Case V | moodle.moodlecloud.com | 54.68.74.224 | 172.16.0.100 | Yes | us-moodlecloud-100165812.us-west-2.elb.amazonaws.com | VE3f2g1 |
| g | Case VI | None | 54.201.157.224 | 172.16.0.100 | Yes | Cloud-Provider Assigned-URL | Assigned |
| h | Case VII | None | 54.201.157.224 | 192.168.0.100 | Yes | Cloud-Provider Assigned-URL | Assigned |
| i | Case VIII | None | 54.69.82.86 | 172.16.0.100 | Yes | Cloud-Provider Assigned-URL | Assigned |
| j | Case IX | None | 52.64.64.171 | 10.0.0.100 | Yes | Cloud-Provider Assigned-URL | Assigned |

* The unique ID examples are examples only, and are not the same as those used by the cloud-provider, e.g. Amazon.

For ease of reading (and simpler tables) the IP / URL addresses in the Tables are without http:// .

FIG. 55

| | A | B | C |
|---|---|---|---|
| a | Example | URL | URL Forward |
| b | 1 | test.moodlecloud.com | us-moodlecloud-100165812.us-west-2.elb.amazonaws.com |
| c | 2 | test1.moodlecloud.com | au-moodlecloud-1086023927.ap-southeast-2.elb.amazonaws.com |
| d | 3 | moodle.moodlecloud.com | us-moodlecloud-100165812.us-west-2.elb.amazonaws.com |
| e | 4 | www.google.com | www.google.com.hk/?gfe_rd=cr&ei=KAWCV-ncPNPC8gfhbz4DA |
| f | 5 | 1drv.ms/w/s!Ak-sYjFXEtpAgxJSqb2Yyybg_Re | onedrive.live.com/view.aspx?resid=40DA12573162AC4F!402& |
| | | (Microsoft Word Document) | (cont.) ithint=file%2cdocx&app=Word&authkey=!AFKpvZjLK3GD9F4 |
| g | 6 | 1drv.ms/b/s!Ak-sYjFXEtpAgxTKHmxDUjEFHbQ | onedrive.live.com/?authkey=%21AMoebENSMQWldtA&cid= |
| | | (Adobe .pdf Document) | (cont.) 40DA12573162AC4F&id=40DA12573162AC4F% |
| | | | (cont.) 21404&parId=40DA12573162AC4F%21238&o=OneUp |

FIG. 75A

| | A | B | C |
|---|---|---|---|
| a | URL Forward Level | URL Example | URL Forward Example |
| b | 1st | (URL-1st-Level) test.moodlecloud.com | us-moodlecloud-100165812.us-west- (cont.) 2.elb.amazonaws.com |
| c | 2nd | URL-2nd-Level (no known example) | URL-3rd-Level (no known example) |
| d | 3rd | URL-3rd-Level (no known example) | URL-4th-Level (no known example) |
| e | 4th | URL-4th-Level (no known example) | URL-5th (no known example) |
| etc. | etc. | etc. | etc. |
| x-1 | (n-1)th | URL-(n-1)th-Level (no known example) | URL-nth-Level (no known example) |
| x | nth | URL-nth-Level (no known example) | URL of host computer cloud instance 205-C |

FIG. 75B

DIRECT NETWORK CONNECTIONS USING CLOUD INSTANCE FOR MULTIPOINT MEETING SERVICE

CROSS-REFERENCE TO RELATED APPLICATION

This application claims priority under 35 U.S.C. § 119(e) from co-pending U.S. Provisional Patent Application No. 62/272,721 entitled "Direct Network Connections using Cloud Instance for Multipoint Meeting Service", filed on Dec. 30, 2015, which is incorporated by reference herein in its entirety.

BACKGROUND OF THE INVENTION

1. Field of the Invention

The present invention relates to creating network connections within computer networks. More specifically, the present invention relates to creating direct network connections between computers using cloud instance via the Internet.

2. Description of the Related Art

A first computer on a network (e.g., the Internet) may host multipoint meeting with a second computer on the network, making possible many collaborative tasks. For example, a user may use the first computer to host a multipoint meeting and add a second computer as a client computer, and then to remotely access the second computer and thereby remotely perform tasks on the second computer, a concept commonly referred to as desktop sharing. As another example, a user may use a first computer to host a multipoint meeting or a conference over the network. The multipoint meeting or conference may be realized by users of one or more other computers on the network remotely joining a multipoint meeting hosted by the first computer, a realization commonly referred to as a web-meeting. However, in order for computers to do multipoint meeting with one another over a computer network, a network connection must first be created between the computers.

Referring now to FIG. 1A, a conventional three-tier architecture for creating network connections between two computers is illustrated. The conventional three-tier architecture includes a host computer 105, a client computer 115, and a multipoint meeting server 120 providing a multipoint meeting website 110. The host computer 105 is linked to the multipoint meeting server 120 by a network connection 125. The client computer 115 is also linked to the multipoint meeting server 120 by a network connection 130. The multipoint meeting server 120 acts as an intermediary between the host computer 105 and the client computer 115, with all data packets exchanged between the two computers 105, 115 passing through the server 120. Thus, the network connection between the two computers 105, 115 requires that the multipoint meeting server 120 play an active role in data transfer throughout the duration of the connection. Such a three-tier architecture has a number of undesirable drawbacks. A first drawback is the large amount of bandwidth and computing resources consumed by the multipoint meeting server 120. A second drawback is that system complexity increases rapidly as more host computers 105 and more client computers 115 access the multipoint meeting server 120. A third drawback is that the multipoint meeting server 120 represents a single point-of-failure within the system, thereby limiting system robustness. A fourth drawback is that internet protocol (IP) addresses of the host computer 105 and the client computer 115 are typically saved at the multipoint meeting server 120, raising privacy concerns and risking the host computer 105 and the client computer 115 to internet hacker attacks and security breaches.

FIG. 1B, U.S. Pat. No. 8,949,369: "Two-Tier Architecture for Remote Access Service" by Long, does not have the first three drawbacks of a conventional three-tier architecture in FIG. 1A, but still have the fourth drawback that IP address of the host computer 205 is typically saved at the remote access server 220, raising privacy concerns and risking the host computer 205 to internet hacker attacks and security breaches. FIG. 1B also introduces a fifth drawback that the bandwidth and computing resources available at the host computer 205 cannot easily change when large numbers (e.g. one thousand) of the client computers 215 attempt to remote access the host computer 205, which will significantly and adversely affect the performance of the remote access service provided by the host computer 205, because large numbers of the client computers 215 now have to share the bandwidth and computing resources available at the host computer 205.

SUMMARY OF THE INVENTION

Embodiments of the present invention include a method of providing multipoint meeting services via direct network connections using cloud instance between two or more computers on a network to facilitate a variety of activities, including multipoint meeting, desktop sharing, web-meetings, and web-conferences.

A "cloud instance"• refers to a virtual machine instance from a public or private cloud network. In cloud instance computing, single hardware is implemented into software and run on top of single-or-multiple computers. For a user, the network elements representing the provider-rendered services are invisible, as if obscured by a cloud.

In one embodiment, a first computer sends its connection information to a server. The server requests a computing cloud to launch-or-assign a cloud instance for the first computer, and receives and does not store (but may store later) the connection information for the cloud instance of the first computer. The server also sends the connection information of the first computer to the cloud instance of the first computer, which is communicatively coupled to the first computer. If a second computer wants to do multipoint meeting with the first computer, the second computer may make a request to the server. The server sends to the second computer the connection information it has received and has not stored (but may store later) for the cloud instance of the first computer. The second computer uses the connection information for the cloud instance of the first computer to send to the cloud instance of the first computer connection information for the second computer via a direct network connection. From this point on, the first computer and the second computer exchange data for multipoint meeting via direct network connections using the cloud instance of the first computer, independently of the server.

In another embodiment, the first computer may be in a private network and may not be publicly accessible over a network. However, as described below, the first computer is communicatively coupled to a cloud instance of the first computer which can be publicly accessed over the network. The first computer sends its connection information to a server. The server requests a computing cloud to launch-or-assign a cloud instance for the first computer, and receives and does not store (but may store later) the connection information for the cloud instance of the first computer. The cloud instance of the first computer is communicatively coupled to the first computer. If a second computer wants to do multipoint meeting with the first computer, the second computer may make a request to the server to connect to the first computer. The server sends to the second computer the connection information it has received and has not stored (but may store later) for the cloud instance of the first computer. The second computer uses the connection information for the cloud instance of the first computer to send to the cloud instance of the first computer connection information for the second computer via a direct network connection. From this point on, the cloud instance of the first computer and the second computer exchange data for multipoint meeting via direct network connections using the cloud instance of the first computer, independently of the server; and the cloud instance of the first computer is communicatively coupled to the first computer in the private network.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIGS. 11A-to-11F are tables of numbers of (virtualized)-hardware (implemented in host computer cloud instance) for maximum attendees, to illustrate providing direct network connections using cloud instance for multipoint meeting service over a computer network in accordance with another embodiment of the present invention.

FIG. 16 shows the results of a client check by a host helper program for a client computer before the client computer joins the multipoint meeting of a host computer.

FIG. 17 illustrates cases of client computer checks, their results, and possible client software-as-a-service provided by client computer cloud instances, to allow client computers to have better performance and user experiences.

FIG. 22 shows a table illustrating cases of storing or not storing IP addresses and/or URLs of host computer and client computer in server.

FIGS. 23A, 23B show tables illustrating cases of unique sub-domain addresses for cloud instance URLs.

FIGS. 39A-to-39F are tables of numbers of (virtualized)-hardware (implemented in host computer cloud instance) for ranges of maximum users, to illustrate providing direct network connections using cloud instance for Internet application service over a computer network in accordance with another embodiment of the present invention.

FIG. 44 shows the results of a client check by a host helper program for a client computer before the client computer joins the Internet application service of a host computer cloud instance, accordance with another embodiment of the present invention.

FIG. 45 illustrates cases of client computer checks, their results, and possible client software-as-a-service provided by client computer cloud instances, to allow client computers to have better performance and user experiences, accordance with another embodiment of the present invention.

FIG. 50 shows a table illustrating cases of storing or not storing IP addresses and/or URLs of host computer and client computer in server.

FIGS. 51A, 51B show tables illustrating cases of unique sub-domain addresses for cloud instance URLs.

FIGS. 53A, 53B are block diagrams illustrating providing direct network connections using cloud instance for Internet application service over a computer network in accordance with another embodiment of the present invention.

FIGS. 54A, 54B, 55 are tables illustrating case examples of multi-instance repeater cloud, repeater cloud instance, multi-instance host computer cloud, host computer cloud instance, sub-domain address, and unique ID (or meeting ID) for a computing-cloud-provider.

FIGS. 75A, 75B show tables illustrating URL forward or URL redirect.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Architectural Considerations

Figure 1A:
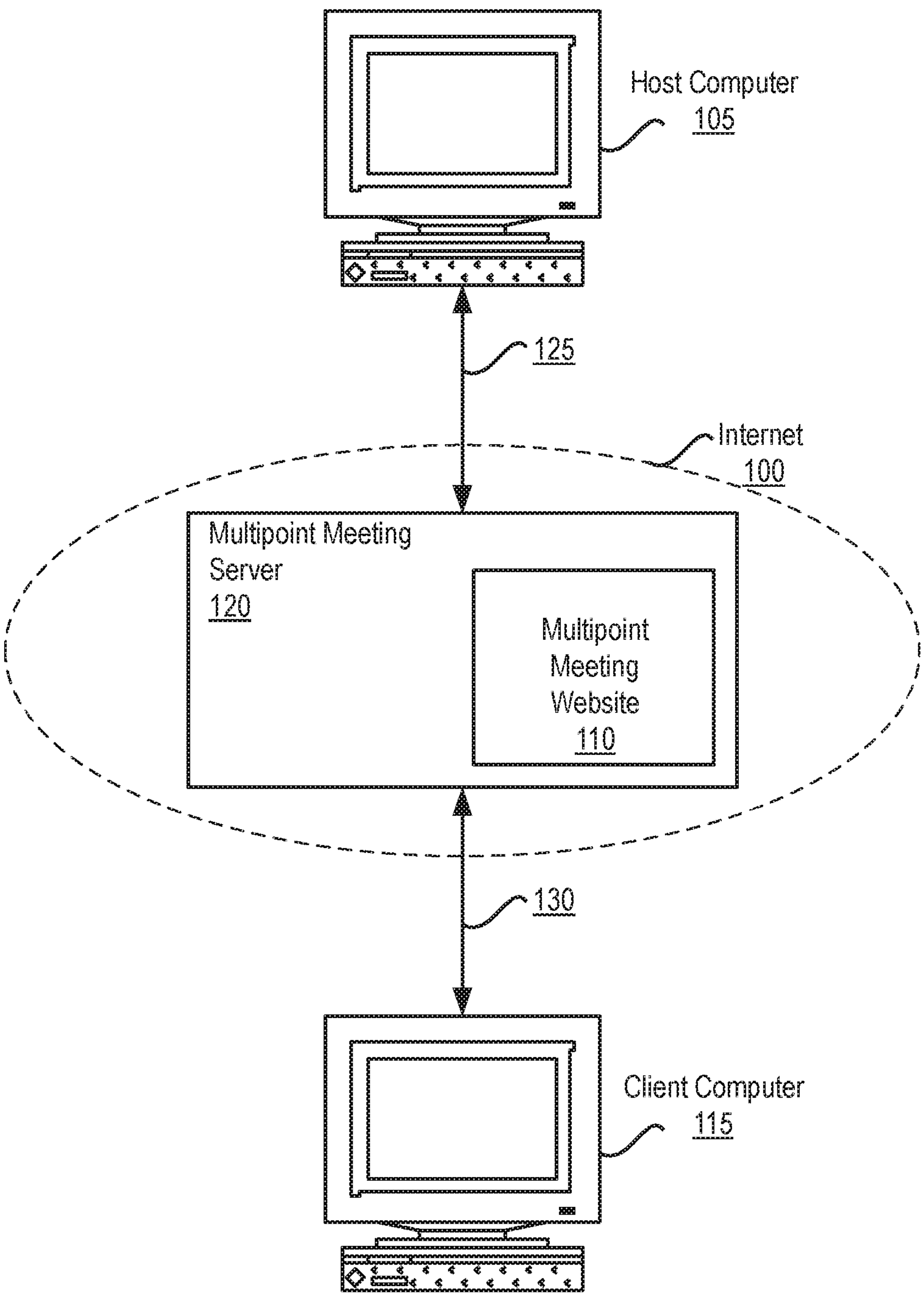
FIG. 1A is a block diagram illustrating a conventional three-tier architecture for providing network connections between computers over a computer network.
Figure 2A:
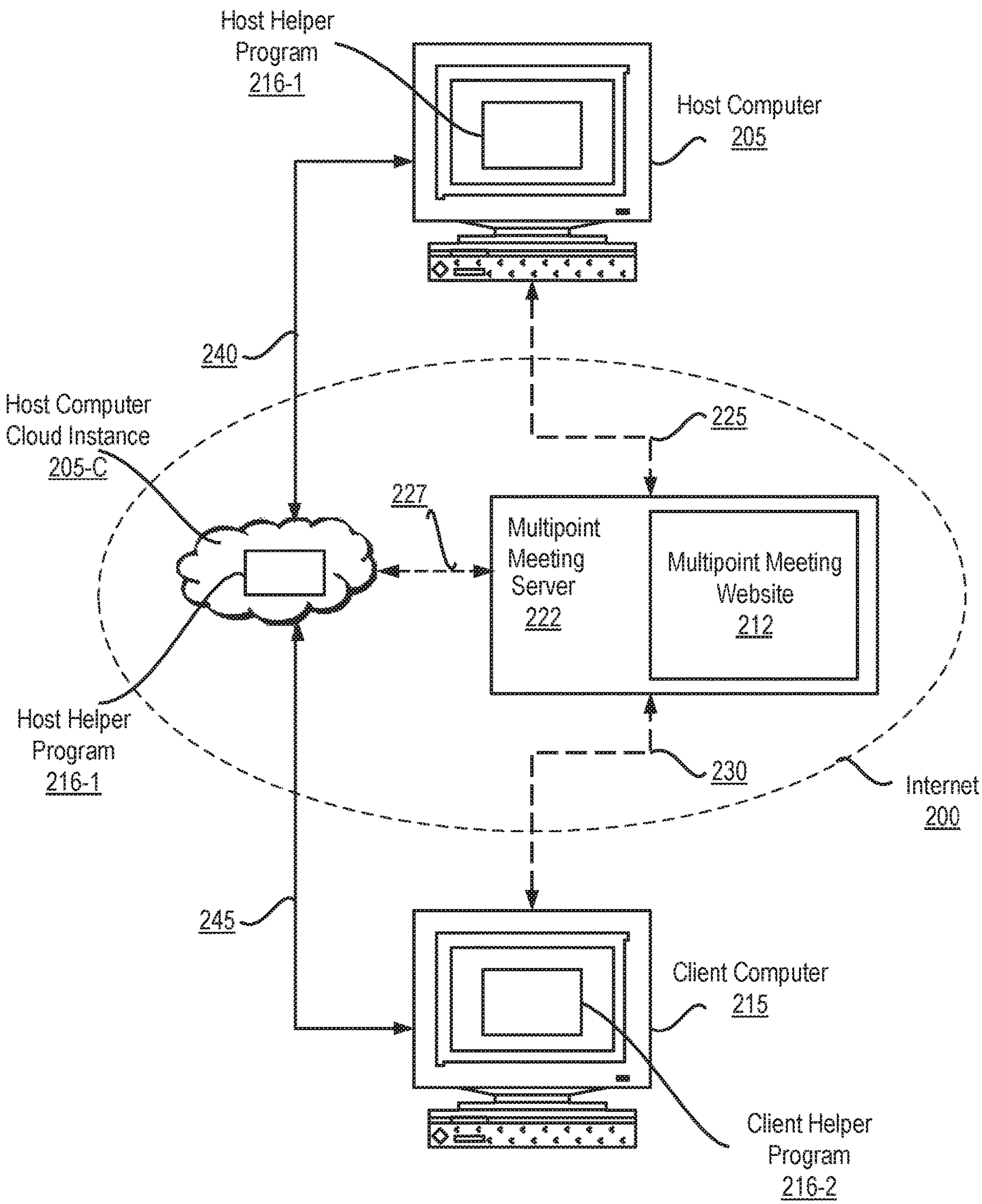
FIG. 2A is a block diagram illustrating providing direct network connections using cloud instance for multipoint meeting service over a computer network in accordance with an embodiment of the present invention.

FIG. 2A illustrates providing a network connection between two networked computers in accordance with one embodiment of the present invention. The embodiment illustrated by FIG. 2A comprises a host computer 205, a client computer 215, and a multipoint meeting server 222 hosting a multipoint meeting website 212. In one embodiment, the host computer 205, the client computer 215, and the multipoint meeting server 222 are each connected to the Internet 200. The host computer 205 runs a host helper program 216-1 and the client computer 215 runs a client helper program 216-2. In direct network connections using cloud instance, the host computer 205 and the client computer 215 exchange data via direct network connections 240, 245 using the host computer cloud instance 205-C, using the host helper program 216-1 and the client helper program 216-2 as will be explained in further detail below with reference to FIGS. 2B, 2F, 4A. 5, and 6A. Hence, unlike the conventional three-tier architecture shown in FIG. 1A, the direct network connections of FIG. 2A does not require that all data packets pass through a multipoint meeting server 222.

Figure 1B:
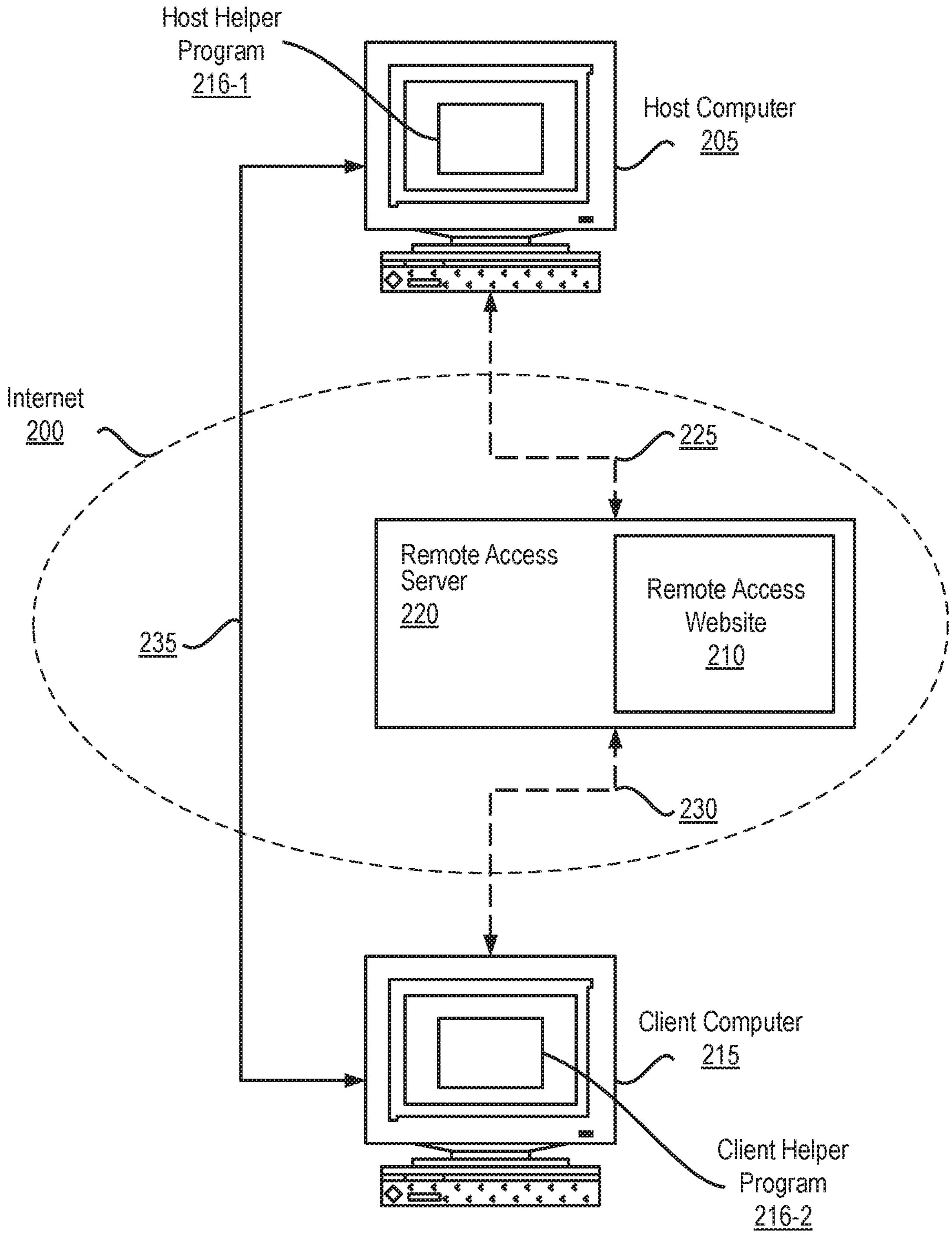
FIG. 1B is a block diagram illustrating a two-tier architecture for remote access service (U.S. Pat. No. 8,949,369).

Furthermore, while the host computer 205 shown in FIG. 1B has the drawback of not easily multiply its bandwidth and computing resources, the host computer cloud instance 205-C in FIG. 2A can dynamically or via prior planning have the almost any bandwidth and computing resources when large numbers (e.g. one thousand) of the client computers 215 are planning to establish multipoint meeting with the host computer 205.

For host and client computers 205, 215 respectively coupled to the Internet, an associated IP address provides a distinct destination to which data may be sent and from which data may be received. In prior arts, as illustrated in FIGS. 1A and 1B, two host and client computers 205, 215 respectively must somehow obtain one another's IP addresses before any data exchange between them may occur. In the embodiment depicted in FIG. 2A, the host and client computers 205, 215 respectively are each coupled to the Internet 200. The multipoint meeting server 222 hosts a multipoint meeting website 212. A user of a host or client computer 205, 215 respectively may access the multipoint meeting website 212, log in to an account (e.g., supply the website 212 with a username and an associated password), and interact with the website 212 to select from a variety of services offered by the multipoint meeting server 222.

For example, the host computer 205 accesses the multipoint meeting service website 212 and selects to act as a host computer 205 to start a new multipoint meeting. The multipoint meeting server 222 requests a computing cloud (not shown) to launch-or-assign a cloud instance 205-C for the host computer 205. The host computer cloud instance 205-C sends its IP address to the multipoint meeting server 222 via a network connection 227. The multipoint meeting server 222 receives and does not store (but may store later) the IP address of the host computer cloud instance 205-C. When a client computer 215 subsequently accesses the multipoint meeting website 212 and selects to join the multipoint meeting hosted by the host computer 205, the multipoint meeting server 222 sends to the client computer 215 the received IP address of the host computer cloud instance 205-C via a network connection 230. The IP address of the host computer is not needed to be sent to the client computer 215 to allow multipoint meeting, according to the current invention.

Please note that in embodiments of the present invention, a computing cloud (requested by a server) to launch-or-assign a cloud instance for a first (host) computer (or for a (second) client computer, e.g. in Para [0318] below) means that (i) the computing cloud may launch a new cloud instance for the first (host) computer (or for the (second) client computer), or (ii) the computing cloud may assign an existing cloud instance (that meets the requirements-in-the-request, including hardware and bandwidth requirements (if any)) for the first computer (or for the (second) client computer) . . . for example in Para [0082] and in other Para such as Para [0121], [0124], [0129], . . . , [0231D], [0291], [0318], [0445], . . . etc.

Once the client computer 215 receives the IP address of the host computer cloud instance 205-C, it may send data directly to the host computer 205 via direct network connections 240, 245 using the host computer cloud instance 205-C. The term "direct," "directly," "direct connection" or "direct network connection" in the context of network connections is used herein to refer to network connections that do not go through the multipoint meeting server 222, but is not intended to mean that the connections do not involve any intermediary components such as switches or routers to facilitate conventional network connection. Moreover, the client computer 215 sends to the host computer cloud instance 205-C the IP address of the client computer 215 itself through the direct connection 245. In other words, while the IP address of the host computer cloud instance 205-C is sent to the client computer 215 through the multipoint meeting server 222 via the indirect connections 227, 230, the IP address of the client computer 215 is sent to the host computer cloud instance 205-C via the direct connection 245 without passing through the multipoint meeting server 222. Thus, both host computer cloud instance 205-C, client computer 215 are able to obtain the other's IP address and create a direct network connection 245. Once both host computer cloud instance 205-C, client computer 215 have the other's IP address, from this point onwards the multipoint meeting server 222 is not involved, and subsequent data exchange between the host and client computers 205, 215 respectively takes place via the direct network connections 240, 245 using host computer cloud instance 205-C. Further details of a process for establishing direct network connections using cloud instance for multipoint meeting service are provided below with reference to FIGS. 4A, 5, and 6A.

In a conventional three-tier architecture depicted in FIG. 1A and in the current art shown in FIG. 1B, the host computer 105, 205 has the drawback of not easily multiply its bandwidth and computing resources. However, in the current invention, the host computer cloud instance 205-C in FIG. 2A can dynamically or via prior-planning have the almost any bandwidth and computing resources when large numbers (e.g. one thousand) of the client computers 215 are planning to establish multipoint meeting with the host computer 205.

Figure 2B:
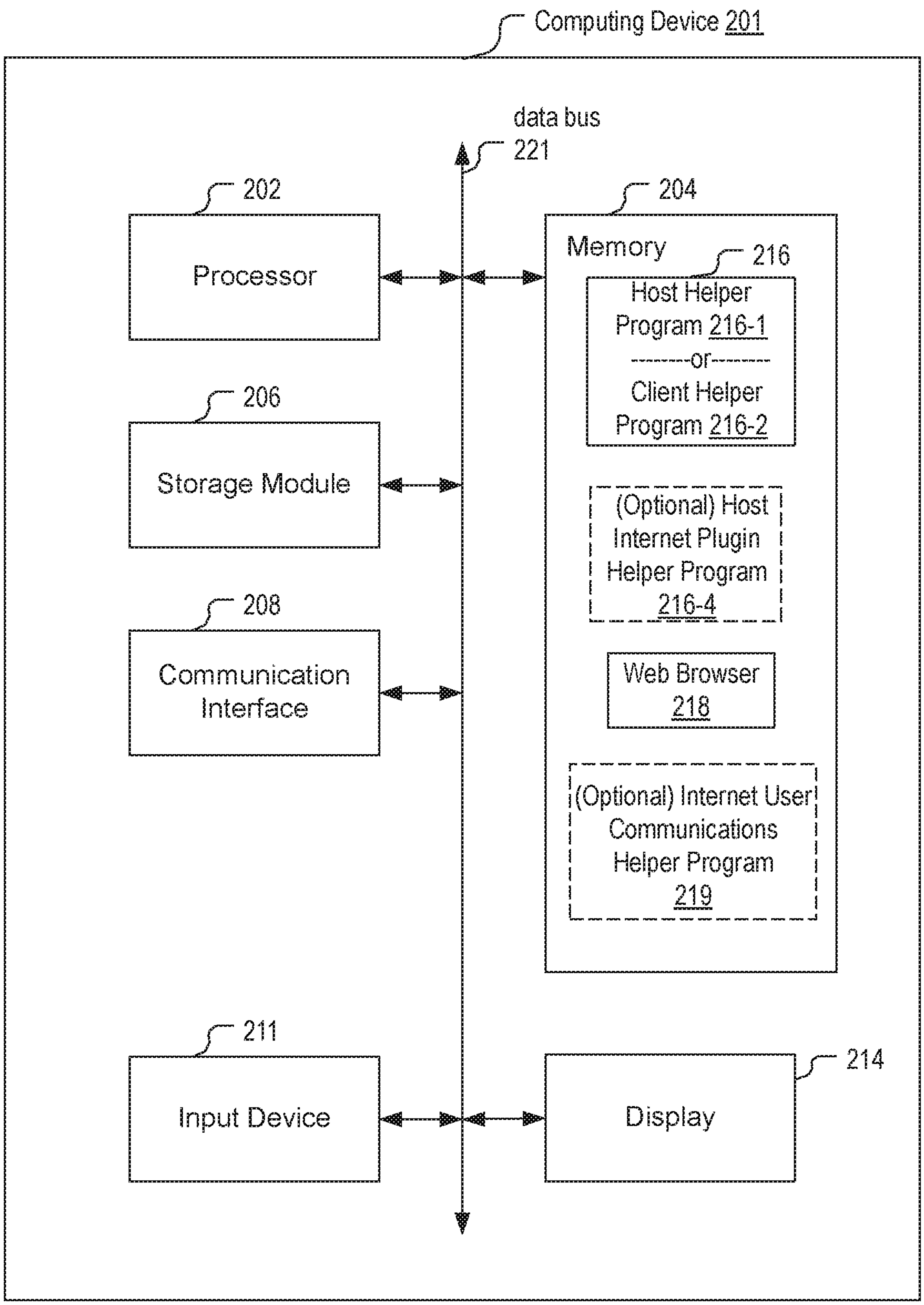
FIG. 2B is a block diagram illustrating a computer with which an embodiment of the present invention may be used.

FIG. 2B is a block diagram illustrating the hardware architecture of a computing device 201. The computing device 201 depicted in FIG. 2B may be either a host computer 205 or a client computer 215 in accordance with one embodiment of the present invention. In one embodiment, the computing device 201 is a general purpose personal computer including a processor 202, a memory 204, a storage module (e.g., hard disk drive) 206, a communication interface 208, an input device 211, and a display 214, all exchanging data with one another through a data bus 221. The memory 204 includes various application software such as a helper program 216 and a web browser 218 and an optional Internet user communications helper program 219. If the computing device 201 is a host computer 205, the helper program 216 is a host helper program 216-1. If the computing device 201 is a client computer 215, the helper program 216 is a client helper program 216-2. In some embodiments of the present invention, it is possible for a single computing device 201 to act as both a host computer 205 and a client computer 215 simultaneously, in which case both a host helper program 216-1 and a client helper program 216-2 may be included in the memory 204.

The processor 202 is a conventional processor or controller. The memory 204 is a conventional computing memory such as a random access memory (RAM). The storage module 206 is a conventional long term storage device, for example, a hard drive (e.g., magnetic hard drive) or a flash memory drive. The communication interface 208 may include one or more interfaces used to transmit and receive data over a network such as the Internet. The communication interface 208 may be an Internet interface, a serial interface, a parallel interface, a USB (Universal Serial Bus) interface, an Ethernet interface, a T1 interface, a Bluetooth interface, a WiFi (IEEE 802.11) interface, or any other type of wired or wireless communication interface. The input device 211 may be any standard device which allows a user to interact with a computing device 201, such as a keyboard or a mouse. The display 214 may be an LCD or CRT computer monitor or any other device suitable for a computer display.

The web browser 218 is a software application executing on a processor 202 to allow the computing device 201 to display and interact with content accessed via the Internet. The web browser 218 may be any conventional web browser 218 such as Internet Explorer™ from Microsoft Corporation or Firefox™ from Mozilla. The optional Internet user communications helper program 219 is a software application executing on a processor 202 to allow an Internet user to use the computing device 201 to communicate with another Internet user. The Internet user communications helper program 219 may be any conventional Internet user communications helper program 219 including instant messenger application such as Skype from Microsoft Corporation, email application such as Hotmail from Microsoft Corporation, or social networking application such as Facebook from Facebook, Inc., or website live-chat application such as Zopim or Zendesk Chat from Zendesk Singapore Pte. Ltd.

The helper program 216 is a software application executing on a processor 202 within the computing device 201. Specifically, the helper program 216 is a software application designed to provide multipoint meeting services such as desktop sharing according to embodiments of the present invention. In one embodiment, a helper program 216 executing on a computing device 201 acting as a host computer 205, referred to herein as a "host helper program 216-1" is a BigBlueButton multipoint meeting host application. In one embodiment, a helper program 216 executing on a computing device 201 acting as a client computer 215, referred to herein as a "client helper program 216-2," is a multipoint meeting client viewer application (which can be an Internet browser).

Figure 2C:
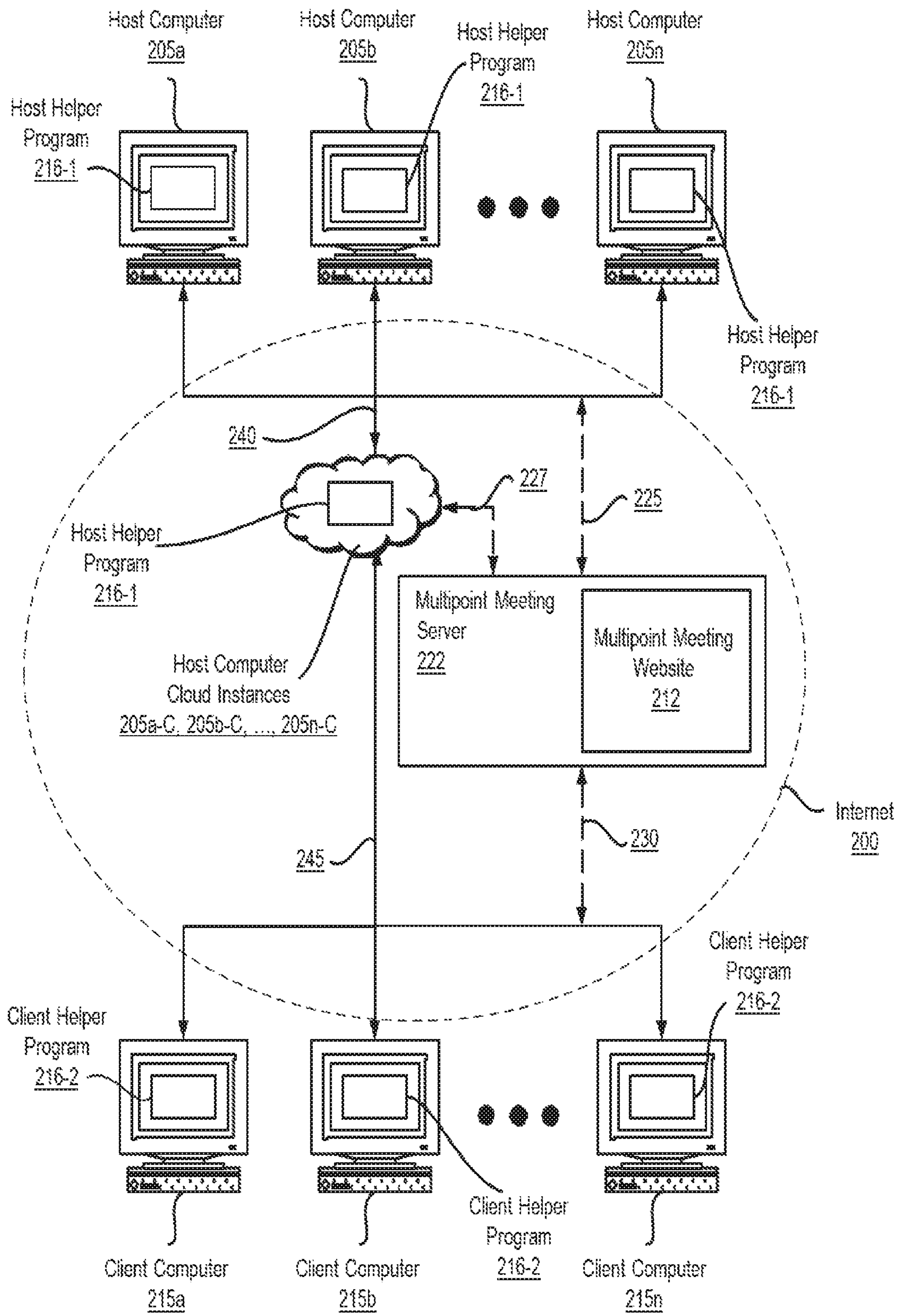
FIG. 2C is a block diagram illustrating providing direct network connections using cloud instance for multipoint meeting service over a computer network in accordance with another embodiment of the present invention.
Figure 2D:
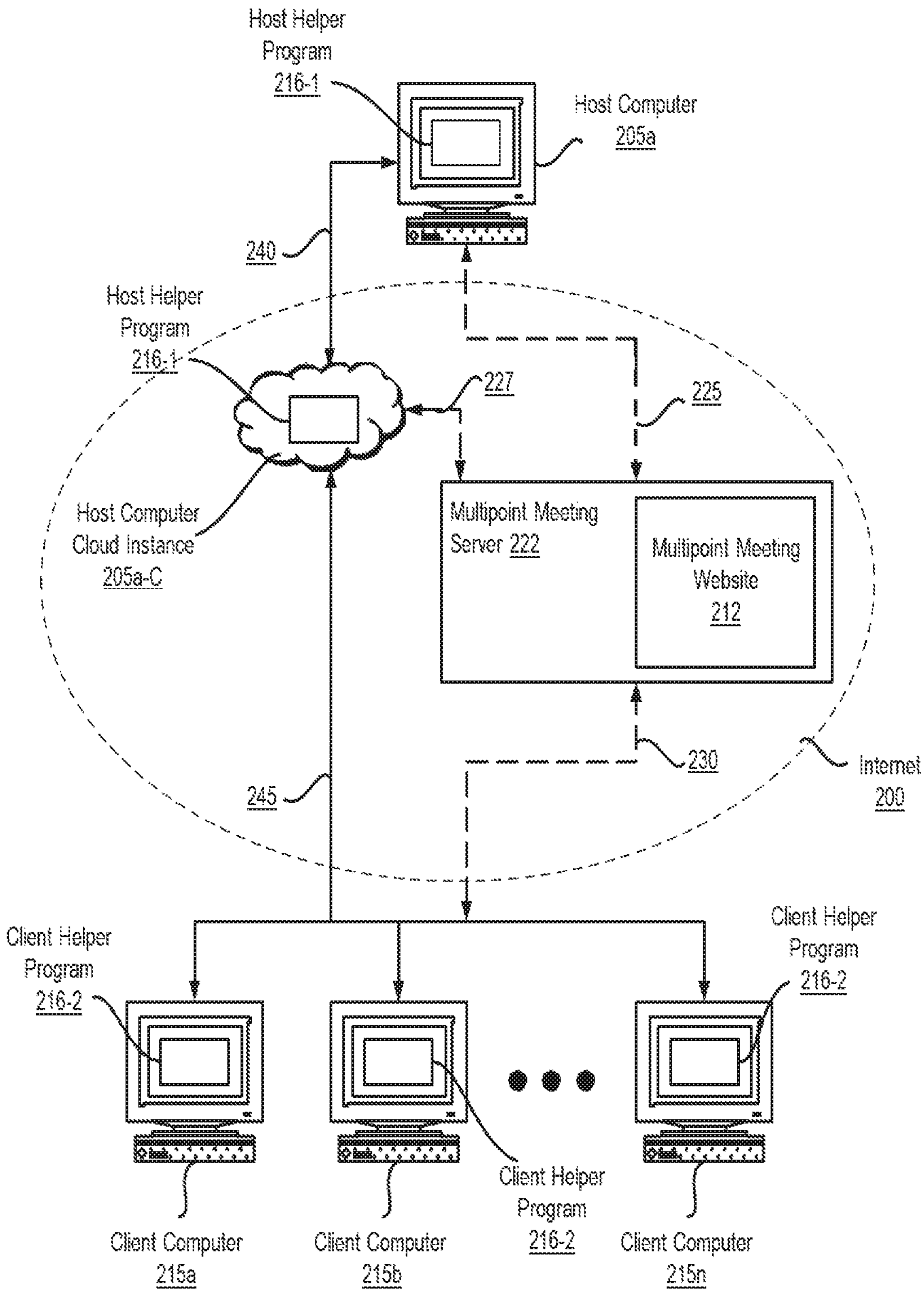
FIG. 2D is a block diagram illustrating providing direct network connections using cloud instance for multipoint meeting service over a computer network in accordance with still another embodiment of the present invention.
Figure 2E:
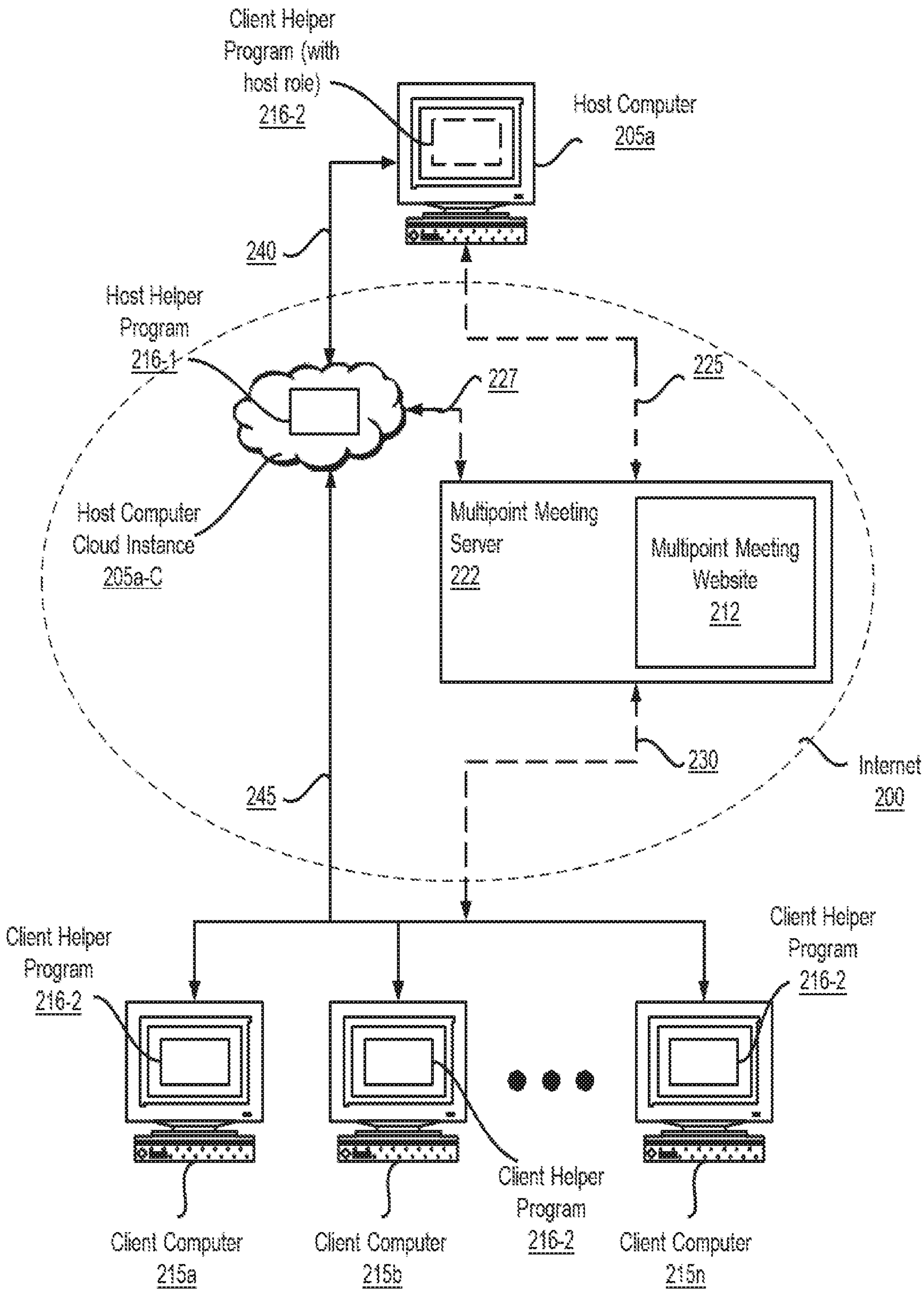
FIG. 2E is a block diagram illustrating providing direct network connections using cloud instance for multipoint meeting service over a computer network in accordance with still another embodiment of the present invention.
Figure 2F:
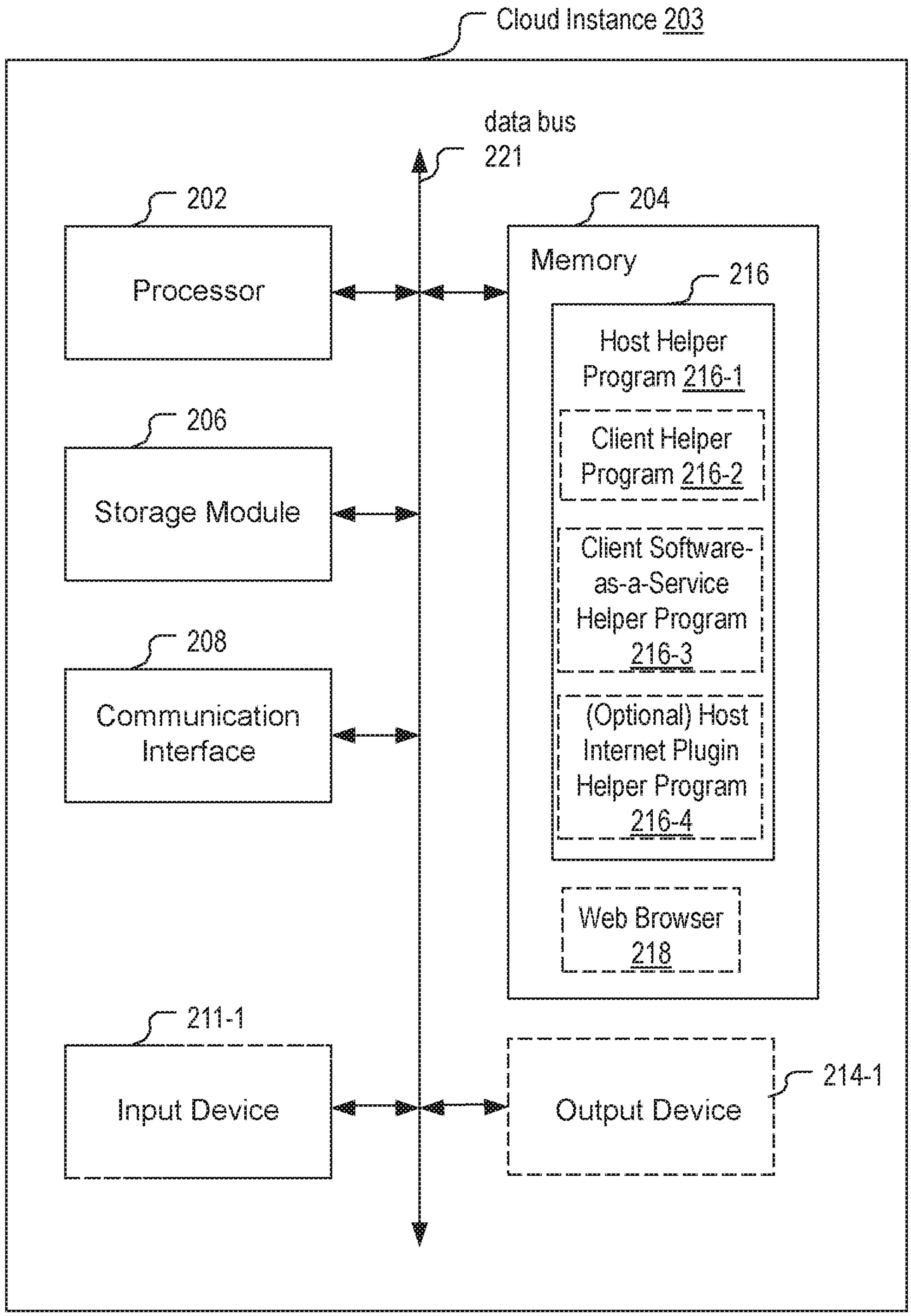
FIG. 2F is a block diagram illustrating a cloud instance with which an embodiment of the present invention may be used.

FIG. 2F is a block diagram illustrating a cloud instance 203, which is single hardware, e.g. computing device 201 in FIG. 2B, implemented into software and run on top of single or multiple computers.

A "cloud instance" refers to a virtual machine instance from a public or private cloud network. In cloud instance computing, single hardware is implemented into software and run on top of single or multiple computers. Cloud instance computing is highly dynamic, enabling users not to worry about how many virtual machines can fit on a single hardware application without causing major slowdowns during peak hours. If performance maxes out, one can simply add more computers. Resources can be freely allocated to and from other computers by the software, enabling maximum utilization and helping to prevent crashes. If the virtual machines grow beyond the limits of a single machine, cloud (instance) computing allows the cloud software to add cloud instances and/or computing clouds to run on multiple machines, whether temporarily or permanently. Cloud instance computing also reduces the downtime associated with servicing hardware. A virtual machine in the cloud can be easily moved from one physical machine to another without going down. The abstraction associated with the cloud allows hardware to seamlessly transfer all data from one point to another without the end-user having any idea that it happened. In summary, cloud instance computing is highly dynamic, can reassign resources as needed, and allows for the movement of virtual machines as they run in the cloud.

As an example of cloud instance, a commercial service, Amazon EC2 (Amazon Web Services Elastic Compute Cloud), provides a wide selection of instance types optimized to fit different use cases. Instance types comprise varying combinations of CPU, memory, storage, and networking capacity and give one the flexibility to choose the appropriate mix of resources for one's applications. Each instance type includes one or more instance sizes, allowing one to scale one's resources to the requirements of one's target workload.

The cloud instance 203 depicted in FIG. 2F is a host computer cloud instance 205-C in accordance with one embodiment of the present invention. In one embodiment, the cloud instance 203 is a general purpose personal computer implemented into software and run on top of single or multiple computer.

In FIG. 2F, a general purpose personal computer, implemented into software and run on top of single or multiple computers, includes a processor 202, a memory 204, a storage module (e.g., hard disk drive) 206, a communication interface 208, an input device 211-1, and an output device 214-1, all exchanging data with one another through a data bus 221. The memory 204 includes various application software such as a helper program 216. If the general purpose personal computer (implemented into software and run on top of single or multiple computers) is a host computer 205, the helper program 216 is a host helper program 216-1. In some embodiments of the present invention, it is possible for a general purpose personal computer (implemented into software and run on top of single or multiple computers) to act as both a host computer 205 and a client computer 215 simultaneously, in which case both a host helper program 216-1 and a client computer program 216-2 may be included in the memory 204.

In FIG. 2F, the processor 202 is a conventional processor or controller. The memory 204 is a conventional computing memory such as a random access memory (RAM). The storage module 206 is a conventional long term storage device, for example, a hard drive (e.g., magnetic hard drive) or a flash memory drive. The communication interface 208 may include one or more interfaces used to transmit and receive data over a network such as the Internet. The communication interface 208 may be an Internet interface, a serial interface, a parallel interface, a USB (Universal Serial Bus) interface, an Ethernet interface, a T1 interface, a Bluetooth interface, a WiFi (IEEE 802.11) interface, or any other type of wired or wireless communication interface. The input device 211-1, if implemented into software, may be any standard device which allows a user to interact with the cloud instance 203. The output device 214-1, if implemented into software, may be any device suitable for a computer display.

In FIG. 2F, the web browser 218, if present, is a software application executing on a processor 202 to allow the general purpose personal computer (implemented into software and run on top of single or multiple computers) to display and interact with content accessed via the Internet. The web browser 218 may be any conventional web browser 218 such as Internet Explorer™ from Microsoft Corporation or Firefox™ from Mozilla.

In FIG. 2F, the helper program 216 is a software application executing on a processor 202 within a general purpose personal computer (implemented into software and run on top of single or multiple computers). Specifically, the helper program 216 is a software application designed to provide multipoint meeting services such as desktop sharing according to embodiments of the present invention. In one embodiment, a helper program 216 executing on a general purpose personal computer (implemented into software and run on top of single or multiple computers) acting as a host computer 205, referred to herein as a "host helper program 216-1," is a BigBlueButton multipoint meeting host application. In one embodiment, a helper program 216 executing on a general purpose personal computer (implemented into software and run on top of single or multiple computers) acting as a client computer 215, referred to herein as a "client helper program 216-2," is a BigBlueButton multipoint meeting client viewer application (which can be an Internet browser).

In one embodiment, the cloud instance 203 is a powerful general purpose computer meeting the hardware and bandwidth requirements specified by the host helper program 216-1. For example, if the host helper program 216-1 is BigBlueButton 0.9.0-Beta, the hardware and bandwidth requirements are:

Ubuntu 14.04 64-bit server (operating system)
4 GB of memory (8 GB is better) with swap enabled
Quad-core 2.6 GHz CPU (or faster)
500 GB of free disk space (or more) for recordings
100 Mbits/sec bandwidth (symmetrical)

The embodiment of the present invention illustrated in FIG. 2A may be adapted to include multiple host computers 205 and/or multiple client computers 215 and/or multiple host computer cloud instance 205-C. To this effect, FIG. 2C and FIG. 2D illustrate direct network connections using one (shown) or more (not shown) cloud instance 205-C for multipoint meeting between one or more host computers 205 and multiple client computers 215 in accordance with embodiments of the present invention.

FIG. 2C is a block diagram illustrating providing direct network connections using cloud instance for multipoint meeting between computers over a computer network in accordance with another embodiment of the present invention. The embodiment illustrated by FIG. 2C comprises multiple host computers 205*a*, 205*b*, . . . 205*n*, multiple client computers 215*a*, 215*b*, . . . , 215*n*, and a multipoint meeting server 222 hosting a multipoint meeting website 212. In the embodiment illustrated by FIG. 2C, the host computers 205 and the client computers 215 exchange data via direct network connections 240, 245 using host computer cloud instances 205-C.

In one embodiment, multipoint meeting is provided for multiple host computers 205*a*, 205*b*, . . . 205*n* and multiple client computers 215*a*, 215*b*, . . . 215*n* via a process similar to that described above in reference to the embodiment of FIG. 2A. The host computers 205*a*, 205*b*, . . . 205*n* and the client computers 215*a*, 215*b*, . . . 215*n* are each individually coupled to the Internet 200, and a primary purpose of the multipoint meeting server 222 is to provide the IP addresses of the host computer cloud instances 205*a*-C, 205*b*-C, . . . 205*n*-C to the client computers 215*a*, 215*b*, . . . 215*n*. The host computers 205*a*, 205*b*, . . . 205*n* access the multipoint meeting service website 212 to request starting new multipoint meetings. The multipoint meeting server 222 requests a computing cloud (not shown) to launch-or-assign host computer cloud instances 205*a*-C, 205*b*-C, . . . 205*n*-C, which then send their respective IP addresses to the multipoint meeting server 222 via a network connection 227. The multipoint meeting server 222 receives and does not store (but may store later) the respective IP addresses of the host computer cloud instances 205*a*-C, 205*b*-C, . . . 205*n*-C. The multipoint meeting server also sends the IP addresses of the host computers 205*a*, 205*b*, . . . 205*n* to the host computer cloud instances 205*a*-C, 205*b*-C, . . . 205*n*-C, which are communicatively coupled to their respective host computers 205*a*, 205*b*, . . . 205*n* via the direct connection 240. When the client computers 215*a*, 215*b*, . . . 215*n* subsequently accesses the multipoint meeting website 212, one or more of the available host computers 205*a*, 205*b*, . . . 205*n* are specified for multipoint meetings. Once one or more host computer 205*a*, 205*b*, . . . 205*n* have been specified, the multipoint meeting server 222 sends to the client computers 215*a*, 215*b*, . . . 215*n* the received IP addresses of each specified host computer cloud instances 205*a*-C, 205*b*-C, . . . 205*n*-C via a network connection 230.

Once the client computers 215*a*. 215*b*, . . . 215*n* have the IP addresses of the specified host computer cloud instances 205*a*-C, 205*b*-C, . . . 205*n*-C, it may send data directly to the specified host computers 205*a*, 205*b*, . . . 205*n* via direct network connections 240, 245 using host computer cloud instances 205*a*-C, 205*b*-C, . . . 205*n*-C. Particularly, the client computers 215*a*. 215*b*, . . . 215*n* may send to the specified host computer cloud instances 205*a*-C, 205*b*-C, . . . 205*n*-C the IP address of the client computers 215*a*, 215*b*, . . . 215*n* themselves via the direct network connection 245. Thus, the host computer cloud instances 205*a*-C, 205*b*-C, . . . 205*n*-C, and the client computers 215*a*, 215*b*, . . . 215*n* are able to obtain one another's IP addresses and create a direct network connection 245. From this point onwards the multipoint meeting server 222 need not be involved, and all subsequent data exchange between the host computers 205*a*, 205*b*, . . . 205*n*, and client computers 215*a*, 215*b*, . . . 215*n* may take place via direct network connections 240, 245 using the host computer cloud instances 205*a*-C, 205*b*-C, . . . 205*n*-C.

FIG. 2D illustrates a direct network connection using cloud instance which facilitates multipoint meeting between a host computer 205 and multiple client computers 215 in accordance with still another embodiment of the present invention. The embodiment illustrated by FIG. 2D comprises a host computer 205*a*, multiple client computers 215*a*, 215*b*, . . . 215*n*, and a multipoint meeting server 222 hosting a multipoint meeting website 212. In the direct network connection using cloud instance depicted in FIG. 2D, the client computers 215*a*, 215*b*, . . . 215*n* are able to do multipoint meeting with the host computer 205*a* via direct network connections 240, 245 using a cloud instance 205*a*-C.

In one embodiment, multipoint meeting is facilitated using a process similar to that described in reference to the embodiment of FIG. 2D. The computers 205*a*, 215*a*, 215*b*, . . . 215*n* are each individually coupled to the Internet 200, and a primary purpose of the multipoint meeting server 222 is to provide the IP address of the host computer cloud instance 205*a*-C to the client computers 215*a*, 215*b*, . . . 215*n*. The host computer 205*a* accesses the multipoint meeting service website 212 and requests to start a multiple meeting. The multiple meeting server 222 requests a computing cloud (not shown) to launch-or-assign a host meeting cloud instance 205*a*-C, which sends its IP address to the multipoint meeting server 222 via a network connection 227. The multipoint meeting server 222 receives and does not store (but may store later) the IP address of the host computer cloud instance 205*a*-C. The multipoint meeting server also sends, via a network connection 227, the IP address of the host computer 205*a* to the host computer cloud instances 205*a*-C, which is communicatively coupled to its host computer 205*a* via the direct connection 240.

When one of the client computers 215*a*, 215*b* . . . 215*n* subsequently accesses the multipoint meeting website 212 to request joining the multipoint meeting of the host computer 205*a*, the multipoint meeting server 222 sends to the client computers 215*a*, 215*b*, . . . 215*n* the received IP address of the host computer cloud instance 205*a*-C via a network connection 230.

Once the client computers 215*a*, 215*b*, . . . 215*n* have the IP address of the host computer cloud instance 205*a*-C, it may send data directly to the host computer 205*a* via direct network connections 240, 245 using the host computer cloud instance 205*a*-C. In particular, the client computers 215*a*, 215*b*, . . . 215*n* may send to the host computer cloud instance 205*a*-C the IP address of the client computers 215*a*, 215*b*, . . . 215*n* themselves via the direct network connection 245. Thus, both host computer cloud instance 205*a*-C, and client computers 215*a*, 215*b*, . . . 215*n* are able to obtain one another's IP addresses and create a direct network connection 245. From this point onwards the multipoint meeting server 222 need not be involved, and all subsequent data exchange related to the client computers 215*a*, 215*b*, . . . 215*n* doing multipoint meeting with the host computer 205*a* may take place via the direct network connections 240, 245 using the host computer cloud instance 205*a*-C.

In additional embodiment of the present invention, the direct network connections using cloud instance illustrated in FIG. 2D and the accompanying methods described herein are adapted as illustrated in FIG. 2E. In one embodiment illustrated in FIG. 2E, the host computer cloud instance 205*a*-C is single hardware implemented into software running on top of single or multiple computers; and the single hardware is a powerful general purpose computer meeting the hardware and bandwidth requirements specified by the host helper program 216-1. For example, if the host helper program 216-1 is BigBlueButton 0.9.0-Beta, the hardware and bandwidth requirements are:

Ubuntu 14.04 64-bit server (operating system)
4 GB of memory (8 GB is better) with swap enabled
Quad-core 2.6 GHz CPU (or faster)
500 GB of free disk space (or more) for recordings
100 Mbits/sec bandwidth (symmetrical).

Typically, the client helper program 216-2 has much lower hardware and bandwidth requirements compared to the hardware and bandwidth requirements for the host helper program 216-1. Thus, as illustrated in FIG. 2E, in an embodiment, the host computer 205*a* may use the client helper program 216-2 (with host-role), allowing the host computer 205*a* to remain a host while not needing to meet the high hardware and bandwidth requirements for some host helper program 216-1. The client software-as-a-service helper program 216-3 (in FIG. 2F) is further described in detail in FIG. 18 below.

Please note that Software as a service (SaaS) is a software distribution model in which a third-party provider hosts applications and makes them available to customers over the Internet. SaaS is one of three main categories of cloud computing, alongside infrastructure as a service (IaaS) and platform as a service (PaaS).

Infrastructure as a Service (IaaS) is a form of cloud computing that provides virtualized computing resources over the Internet.

Platform as a service (PaaS) is a cloud computing model that delivers applications over the Internet. In a PaaS model, a cloud provider delivers hardware and software tools—usually those needed for application development—to its users as a service. A PaaS provider hosts the hardware and software on its own infrastructure. As a result, PaaS frees users from having to install in-house hardware and software to develop or run a new application.

Figure 2G:
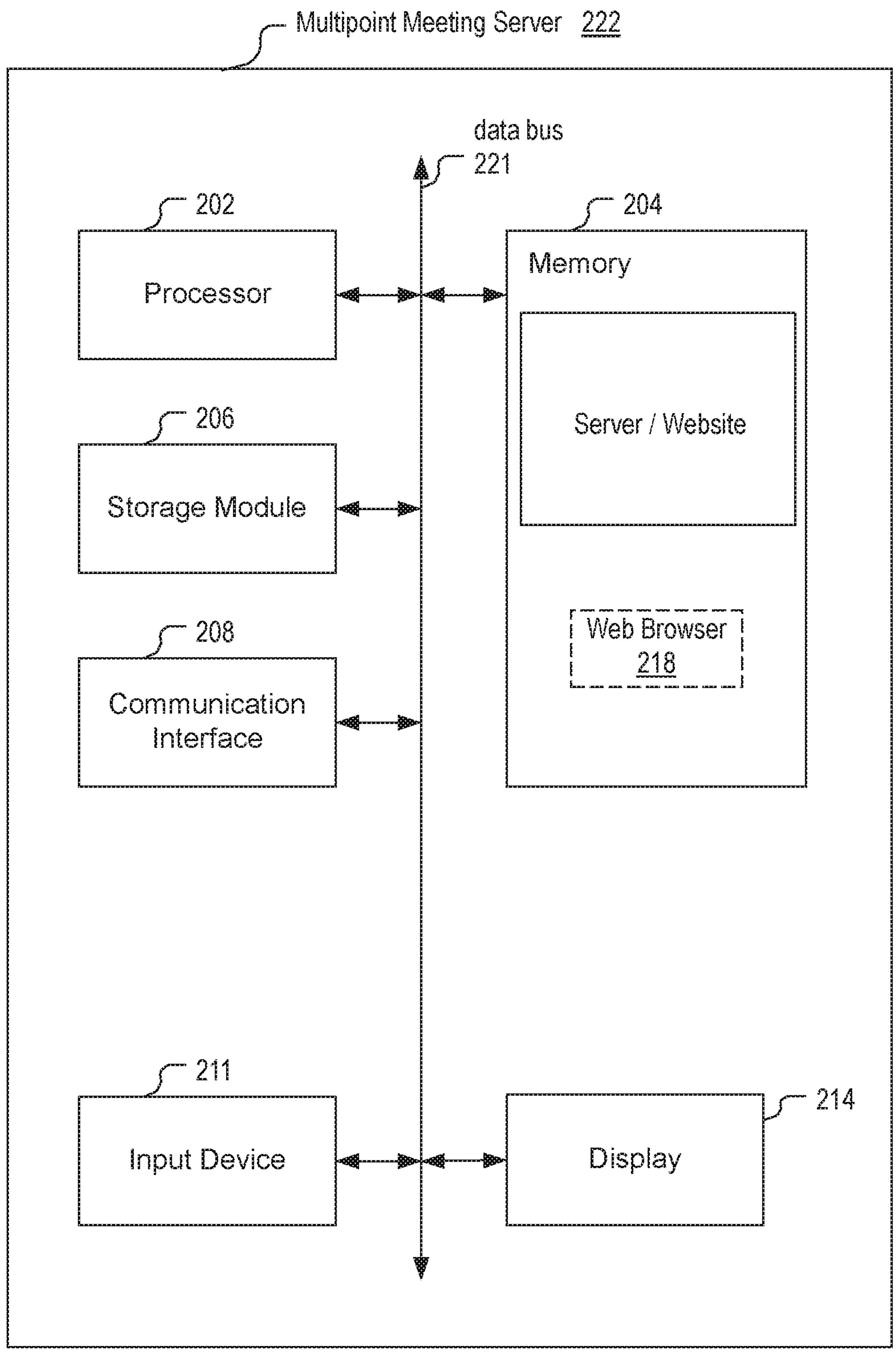
FIG. 2G is a block diagram illustrating a multipoint meeting server with which an embodiment of the present invention may be used.
Figure 2H:
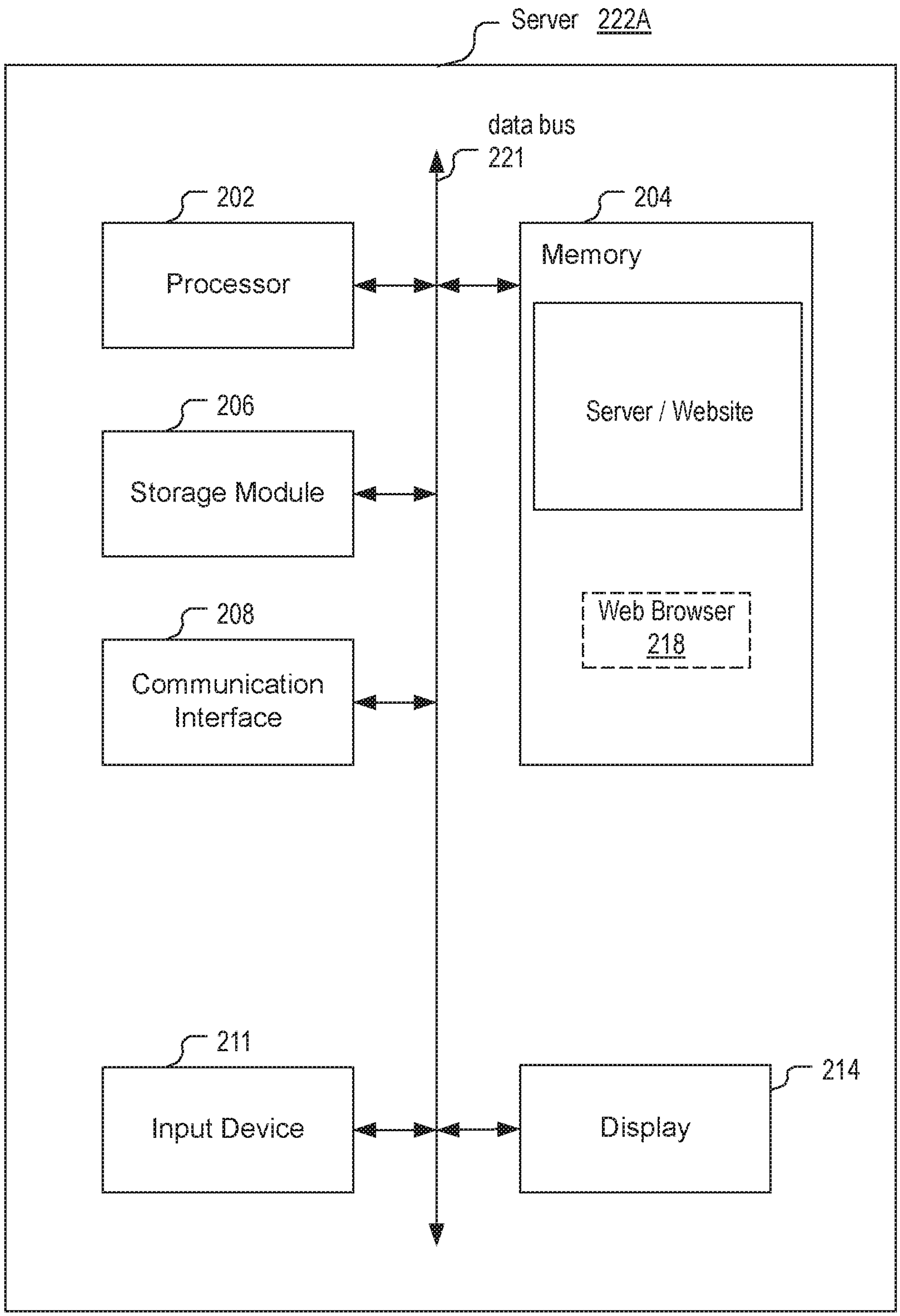
FIG. 2H is a block diagram illustrating a server with which an embodiment of the present invention may be used.

FIG. 2G is a block diagram illustrating the hardware architecture of a multipoint meeting server 222. FIG. 2G is similar to FIG. 2B depicting the computing device 201, though the multipoint meeting server 222 typically needs to support large numbers of host computers 205 and client computers 215, and hence is typically hugely more powerful and complex compared to a typical host computer 205 or a typical client computer 215. In one embodiment, the multipoint meeting server 222 is a general purpose computer including a processor 202, a memory 204, a storage module (e.g., hard disk drive) 206, a communication interface 208, an input device 211, and a display 214, all exchanging data with one another through a data bus 221. The memory 204 includes server and website application software such as a web server (e.g. Apache HTTP server), and a database (e.g. MySQL).

In additional embodiments of the present invention, the direct network connections using cloud instance illustrated in FIGS. 2D and 2E and the accompanying methods described herein can be adapted to provide desktop sharing or a web-meeting or a web conference between a host computer 205*a* and one or more client computers 215*a*, 215*b*, . . . 215*n*.

In further embodiments of the present invention, the direct network connections using cloud instance illustrated in FIGS. 2D and 2E and the accompanying methods described herein can be adapted to provide Internet application service between a host computer cloud instance 205*a*-C and one or more client computers 215*a*, 215*b*, . . . 215*n*, as described in FIGS. 25A and 25C below.

Process Considerations

Figure 3:
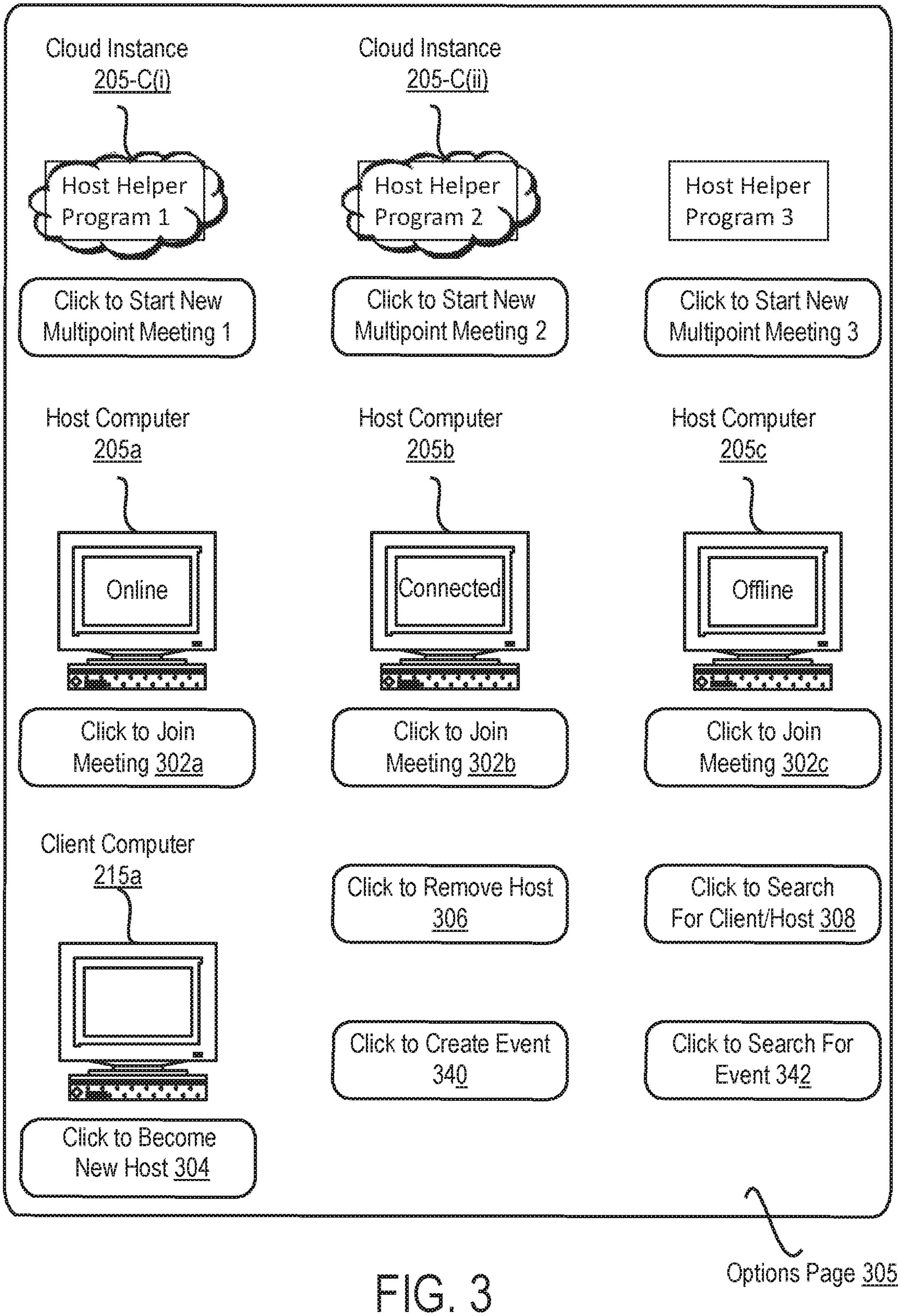
FIG. 3 is a snapshot of a web page hosted by a multipoint meeting server in accordance with an embodiment of the present invention.

In one embodiment of the present invention, a multipoint meeting website 212 provides multiple web pages which allow a user to utilize the services of a multipoint meeting server 222. When a user visits the multipoint meeting website 212 via a web browser 218, the user may log into the website 212 by providing a username and an associated password in accordance with standard Internet techniques. After logging in, the user may select to use the services provided by the multipoint meeting server 222 by interacting with an options page 305. FIG. 3 illustrates an options page 305 in accordance with one embodiment of the present invention. In one embodiment, an options page 305 comprises a file in PHP, ASPX, or HTML format.

The options page 305 provides selectable icons which correspond to services provided by the multipoint meeting server 222. In one embodiment, the options page 305 lists one or more host helper programs 216-1 that the user may click to request to start a new multipoint meeting (and becomes its host) through the direct network connections using cloud instance for multipoint meeting service according to embodiments of the present invention. In another embodiment, the options page 305 lists one or more cloud instances 205-C (running respectively one or more host helper programs 216-1) that the user may click to request to start a new multipoint meeting (and becomes its host) through the direct network connections using cloud instance for multipoint meeting service according to embodiments of the present invention. In one embodiment, the options page 305 lists one or more host computers 205 that the user may request to join their multipoint meetings through the direct network connections using cloud instance for multipoint meeting service according to embodiments of the present invention. Additionally, the options page 305 presents the status of the selectable host computers 205*a*, 205*b*, and

205*c*. In one embodiment, a host computer may have a status of connected, online, or offline. A host computer 205*c* which is presently offline may not be joined in multipoint meeting. A host computer 205*c* may be offline because it does not have Internet connection or is not running. A host computer 205*a* that is "online" may be joined in multipoint meeting using the direct network connections using cloud instance for multipoint meeting service according to embodiments of the present invention. A host computer 205*b* that is "connected" is already in a multipoint meeting using the direct network connections using cloud instance for multipoint meeting service according to embodiments of the present invention. The user of a client computer 215 may select a host computer 205*a*, 205*b* that has a status of "online" or "connected" using the corresponding icon 302*a*, 302*b* to do multipoint meeting with the host computer 205*a*, 205*b* according to the direct network connections using cloud instance for multipoint meeting in accordance with various embodiments of the present invention.

Additionally, the user may select to provide other client computers 215 multipoint meeting service with the user's computer by itself becoming a host computer 205, using icon 304. The user may also select to remove a host computer 205 from the list of accessible host computers 205 using icon 306, or select to search for a not-displayed host computer 205 using icon 308. Moreover, the user may select to create an event such as a multipoint meeting session using icon 310. The options depicted in FIG. 3 and described above are provided for illustrative purposes only and are not intending to be limiting. Additional user-selectable options may be offered by a multipoint meeting server 222 and/or presented on an options page 305 of a multipoint meeting website 212.

Figure 4A:
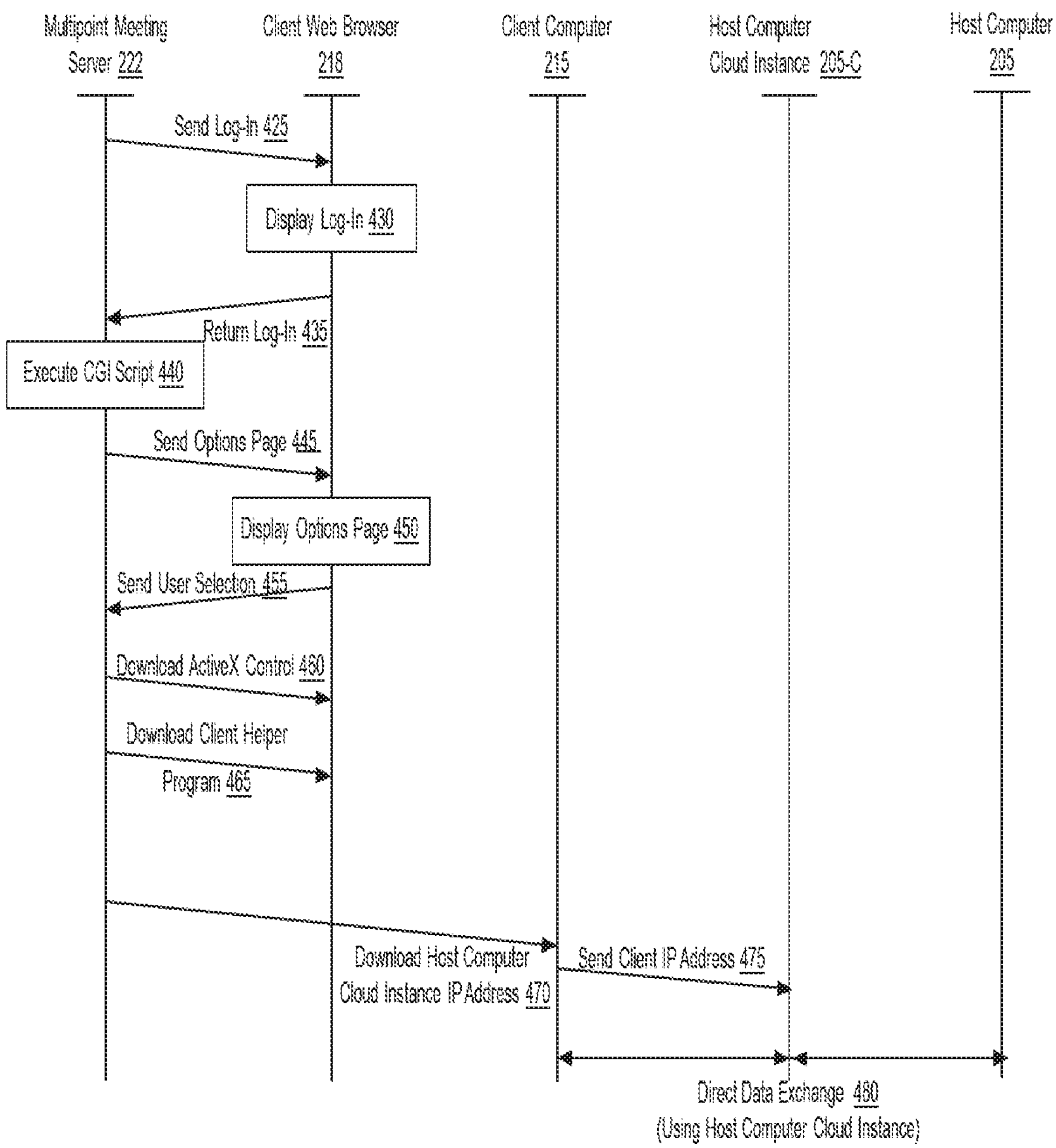
FIGS. 4A. 4B, and 4C are event diagrams illustrating process for providing direct network connections using cloud instance for multipoint meeting service over a computer network in accordance with an embodiment of the present invention

Referring now to FIG. 4A, a process corresponding to a direct network connections using cloud instance for providing multipoint meeting service between two networked computers is presented. The process illustrated in FIG. 4A corresponds to a direct network connections architecture including a host computer 205, a host computer cloud instance 205-C, a client computer 215 executing a client web browser 218, and a multipoint meeting server 222 hosting a multipoint meeting website 212 (FIG. 2A). When the client computer 215 accesses the multipoint meeting website 212 via the client web browser 218, the multipoint meeting server 222 sends 425 a log-in form to the client web browser 218. In one embodiment, the log-in form comprises a web page file in PHP, ASPX, or HTML format. The client web browser 218 then displays 430 the log-in form (not shown herein). Once the log-in form is completed, client web browser 218 returns 435 the completed log-in form to the multipoint meeting server 222.

In one embodiment, the return 435 of the completed log-in form causes the multipoint meeting server 222 to execute 440 a designated common gateway interface (CGI) script. In one embodiment, the CG script may include commands implemented in the PERL programming language which cause the multipoint meeting server 222 to send 445 an options page 305 (FIG. 3) to the client web browser 218. The client web browser 218 then displays 450 the options page 305, allowing an option to be selected. As explained above, the user of the client computer 215 may select the icon 302 to join the multipoint meeting of the host computer 205 or other icons for other options. The user selection is then sent 455 to the multipoint meeting server 222. Based on the selection, an ActiveX control is downloaded 460 to the client web browser 218 from the multipoint meeting server 222.

If the selection is to join multipoint meeting of a host computer 205, an ActiveX control will be downloaded 460 to: (i) download 465 a client helper program 216-2 to the client computer 215, (ii) download 470 the IP address of the host computer cloud instance 205-C to the client computer 215, and (iii) using the downloaded 470 IP address of the host computer cloud instance 205-C, connect a client helper program 216-2 on the client computer 215 to a host helper program 216-1 on the host computer cloud instance 205-C. Connecting the two host/client helper programs 216-1, 216-2 includes the client computer 215 sending 475 the IP address of the client computer 215 to the host computer cloud instance 205-C. Once the helper program 216-2 on the client computer 215 and the helper program 216-1 on the host computer cloud instance 205-C are connected, data may be exchanged 480 directly between the two host and client computers 205, 215 respectively via direct connections 240, 245 using host computer cloud instance 205-C, without any data passing through the multipoint meeting server 222. In some embodiments, rather than downloading 465 a client helper program 216-2 to the client computer 215, the downloaded 460 ActiveX control may activate a client helper program 216-2 already present on the client computer 215 (not shown herein). In some embodiments, the client helper program 216-2 is an Internet browser such as Internet Explorer or Firefox.

In another embodiment, if the selection is to become a new host, a process slightly different from that depicted in FIG. 4A takes place. Specifically, upon receiving the client computer 215 request to become a new host, the multipoint meeting server 222 requests a computing cloud (not shown) to launch-or-assign (not shown) a host computer cloud instance 205-C for the client computer 215. An ActiveX control is downloaded 460 to: (i) download (not shown) a host helper program 216-1 to the client computer 215, (ii) enter (not shown) a listening mode to wait for connection requests from the client helper programs 216-2 of one or more other client computers 215. At this point, the client computer 215 is now also acting as a host computer 205. Accordingly, the IP address of the client's host computer cloud instance 205-C is sent (not shown) to the multipoint meeting server 222. The multipoint meeting server 222 receives (not shown) the IP address of the client's host computer cloud instance 205-C so that it may later be provided to other client computers 215 which request it. The multipoint meeting server also sends (not shown) the IP address of the client computer 215 (now a new host computer) to the client's host computer cloud instance 205-C, which is communicatively coupled (not shown) to the client computer 215 via a direct connection.

It is noted that the IP address of the client computer 215 may be sent to the host computer 205 and/or the host computer cloud instance 205-C using indirect connection 225, 230, or indirect connection 227, 230 (instead of using direct network connection 240, 245 in FIG. 2A) in further embodiments of the current invention illustrated in FIGS. 4B and 4C respectively and described below.

Figure 4B:
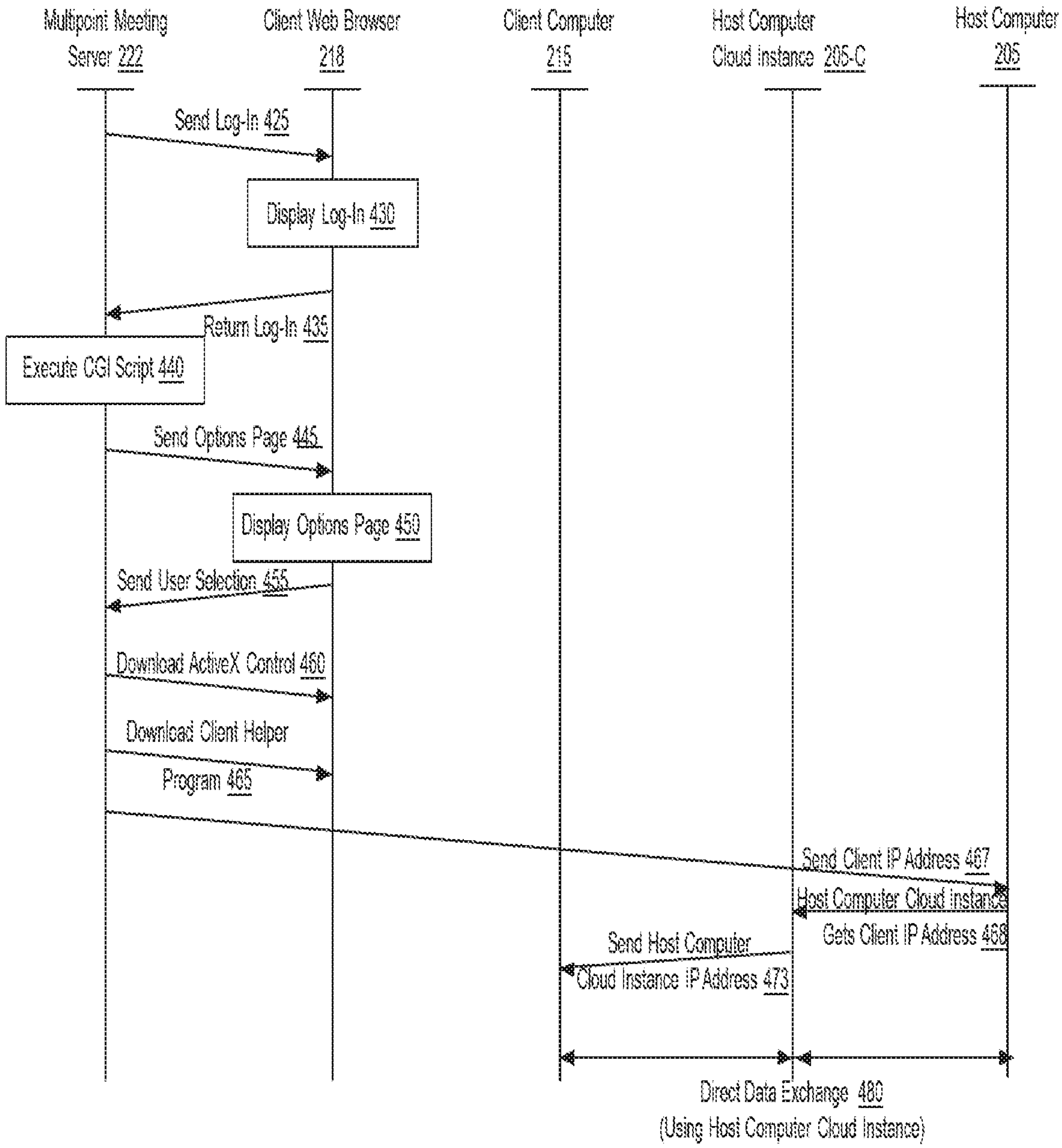

In an embodiment of the current invention illustrated in FIG. 4B, which FIG. 4B is similar to FIG. 4A, but in FIG. 4B the multipoint meeting server sends 467 (using indirect connection 225, 230 in FIG. 2A) the IP address of the client computer 215 to the host computer 205, which is communicatively coupled to the host computer cloud instance 205-C. The host computer cloud instance 205-C therefore also gets 468 the IP address of the client computer 215. The host computer cloud instance 205-C then sends 473 the host computer cloud instance IP address to the client computer 215. Direct data exchange 480 can then occur, using direct network connection 240, 245 in FIG. 2A, between the client computer 215 and the host computer 205, using the host computer cloud instance 205-C, and without going through the multipoint meeting server.

Figure 4C:
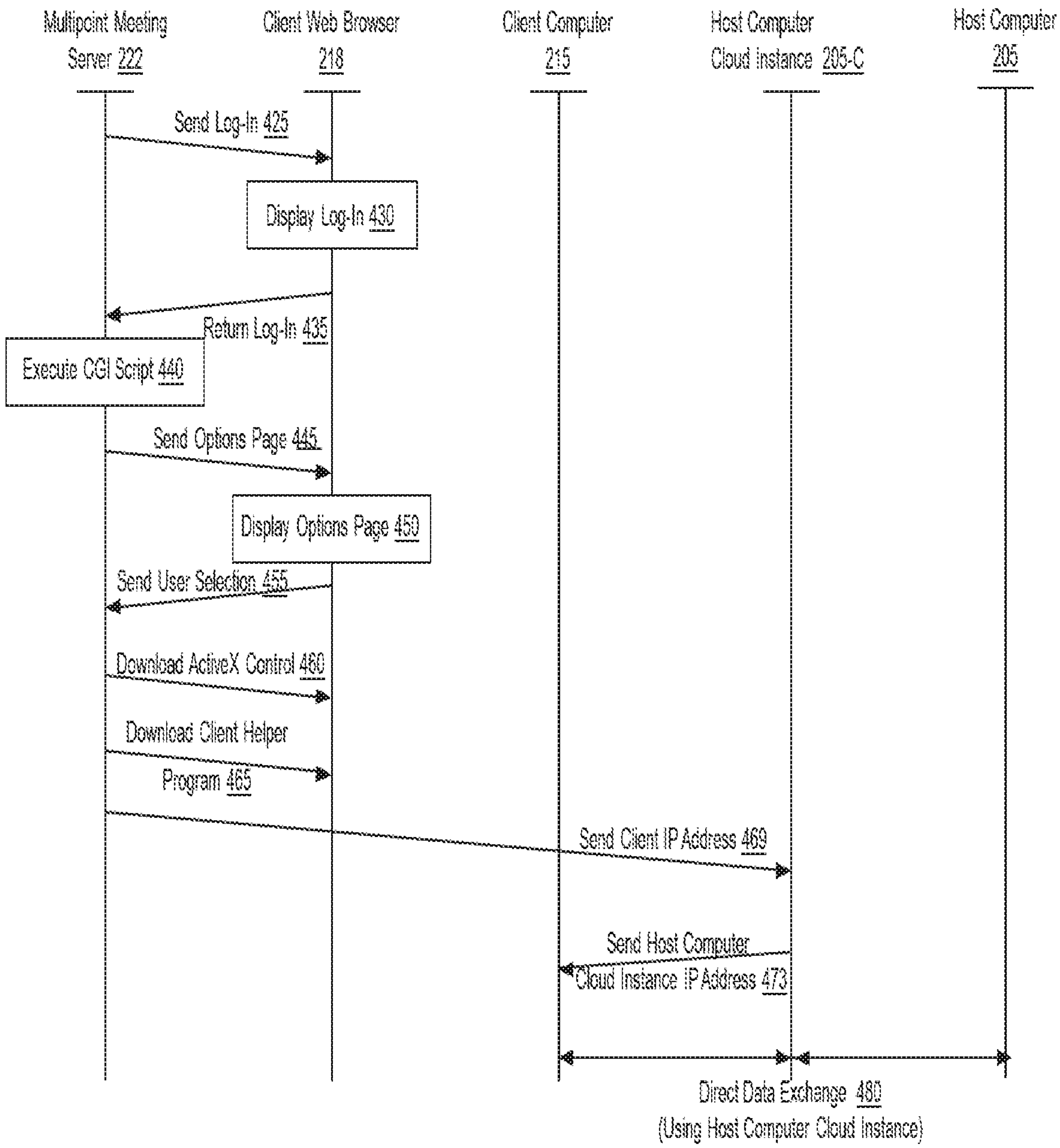

In another embodiment of the current invention illustrated in FIG. 4C, which FIG. 4C is similar to FIG. 4A, but in FIG. 4C the multipoint meeting server sends 469 (using indirect connection 227, 230 in FIG. 2A) the IP address of the client computer 215 to the host computer cloud instance 205-C, which is communicatively coupled to the host computer 205. The host computer cloud instance 205-C then sends 473 the host computer cloud instance IP address to the client computer 215. Direct data exchange 480 can then occur, using direct network connection 240, 245 in FIG. 2A, between the client computer 215 and the host computer 205, using the host computer cloud instance 205-C, and without going through the multipoint meeting server.

Figure 5:
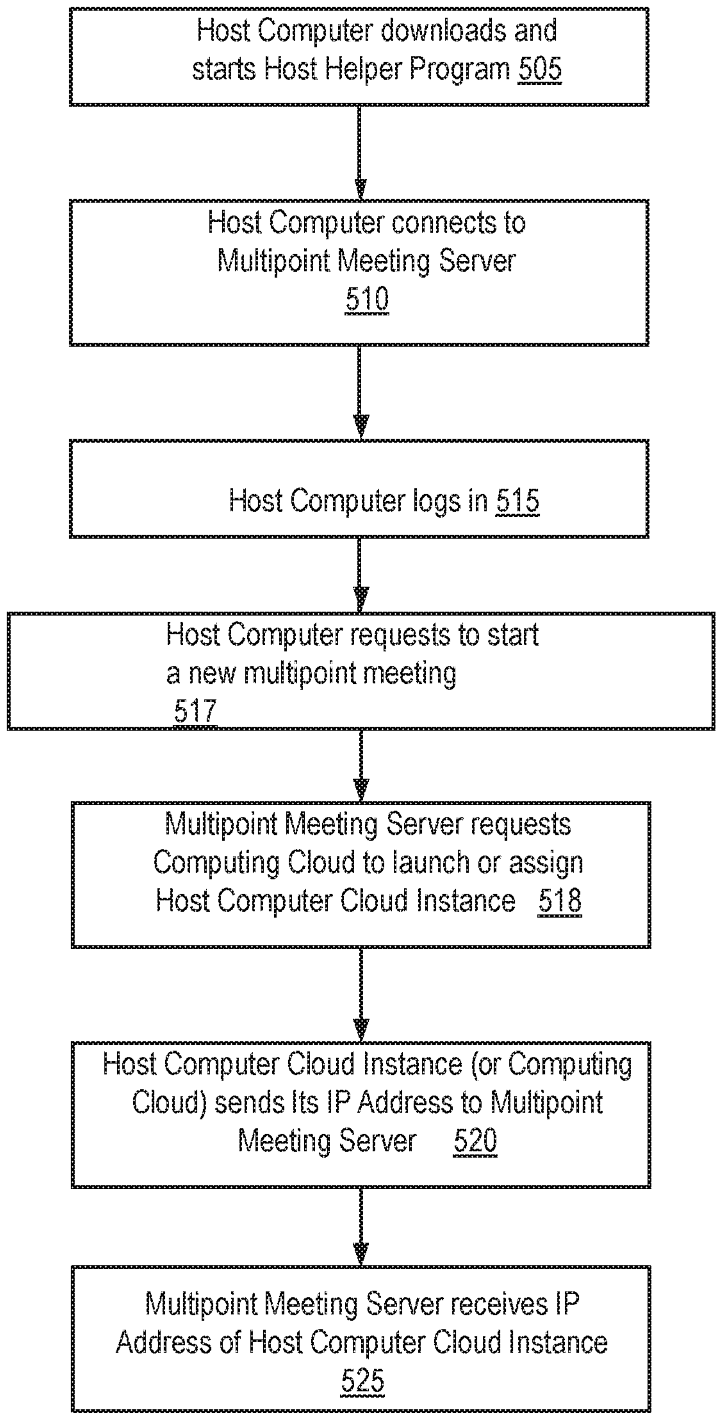
FIG. 5 is a flowchart illustrating a process performed by a host computer to provide direct network connections using cloud instance for multipoint meeting service over a computer network in accordance with an embodiment of the present invention.

FIG. 5 presents a flowchart of a process performed by a host computer 205 to provide direct network connections between computers over a computer network in accordance with an embodiment of the present invention. First, the host computer 205 downloads and starts 505 the host helper program 216-1. In one embodiment, the host helper program 216-1 is a BigBlueButton multipoint meeting host application. The host computer 205 then connects 510 to a multipoint meeting server 222.

Once the host computer 205 is connected 510 to the multipoint meeting server 222, the host computer 205 logs in 515 to a multipoint meeting website 212 hosted by the multipoint meeting server 222. The host computer 205 requests to start a new multipoint meeting in 517. The multipoint meeting server 222 then requests a computing cloud (not shown) to launch-or-assign a cloud instance 205-C for the host computer 205 in 518. The host computer cloud instance 205-C sends its IP address in 520 to the multipoint meeting server 222, which receives it in 525 for later distribution to client computers 215.

Figure 6A:
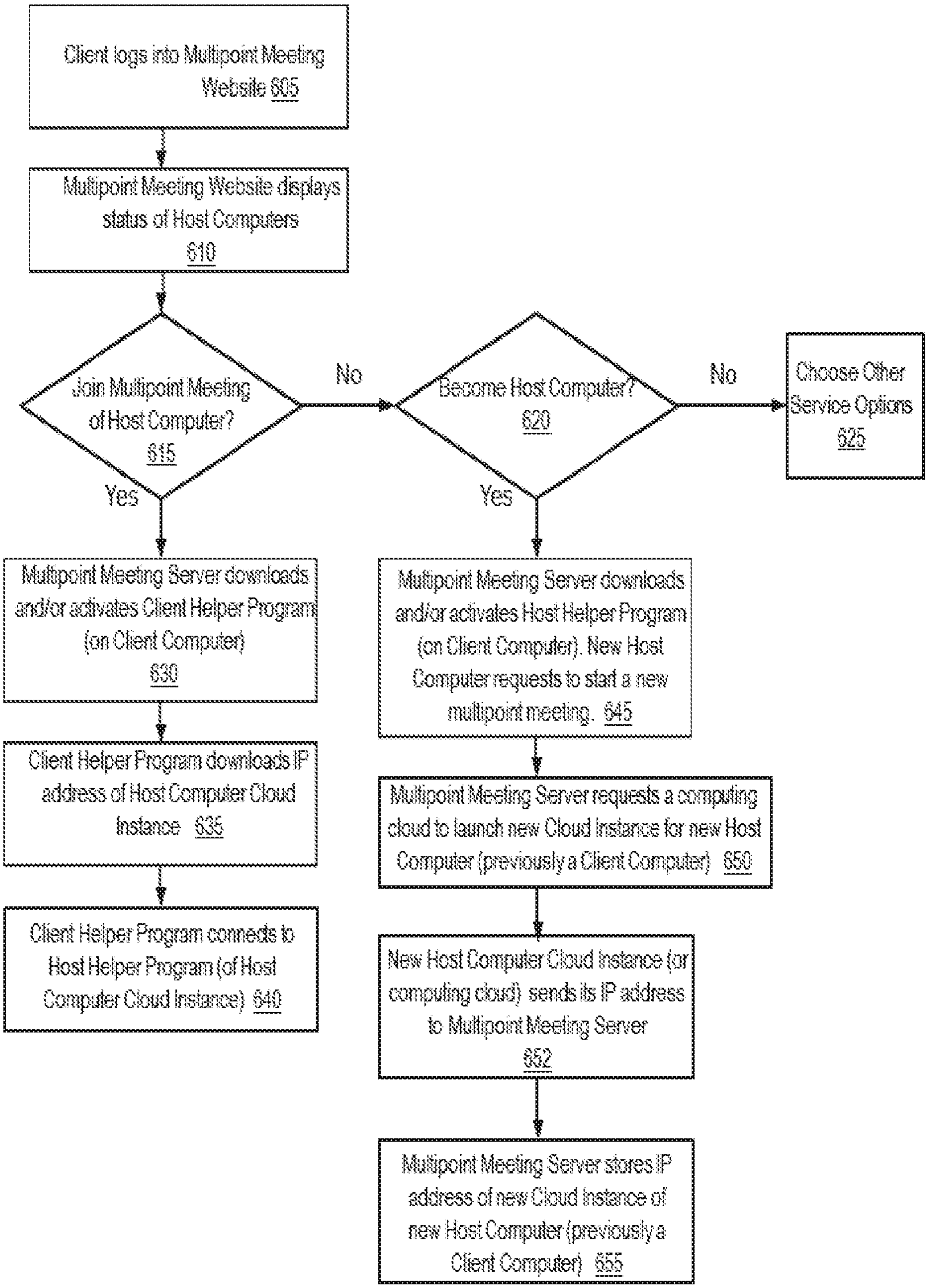
FIGS. 6A, 6B, and 6C are flowcharts illustrating process performed by a client computer to provide direct network connections using cloud instance for multipoint meeting service over a computer network in accordance with an embodiment of the present invention.

FIG. 6A presents a flowchart of a process performed by a client computer 215 to provide direct network connections between computers over a computer network in accordance with an embodiment of the present invention. The client computer 215 logs in 605 to a multipoint meeting website 212 hosted by a multipoint meeting server 222. The multipoint meeting website 212 then displays 610 the status of one or more host computers 205. In one embodiment, the status of one or more host computers 205 are displayed on an options page 305 such as that depicted in FIG. 3.

If the client computer 215 selects to join the multipoint meeting of a host computer 205 at step 615, the multipoint meeting server 222 downloads and/or activates 630 a client helper program 216-2 on the client computer 215. The client computer 215 then requests 630 to join the multipoint meeting of host computer 205. The client helper program 216-2 then downloads 635 the IP address of the selected host computer cloud instance 205-C. Using the downloaded 635 IP address of the host computer cloud instance 205-C, the client helper program 216-2 connects 640 to a host helper program 216-1 on the host computer cloud instance 205-C. Further data exchange for multipoint meeting, desktop sharing, web-conferencing or other types of web-meeting between the host computer 205 and the client computer 215 occurs via direct connection 240, 245 (FIG. 2A) using host computer cloud instance 205-C and using the two host/client helper programs 216-1, 216-2 respectively.

If the client computer 215 selects to become a host computer 205 (step 615—No and step 620—Yes), the multipoint meeting server 222 downloads and/or activates 645 a host helper program 216-1 on the client computer 215. The new host helper program 216-1 requests 645 to start a new multipoint meeting The multipoint meeting server 222 also requests a computing cloud (not shown) to launch-or-assign 650 a cloud instance 205-C for the new host computer 205 (previously a client computer 215). The host computer cloud instance 205-C then sends 650 its IP address to the multipoint meeting server 222, where it is received 655 for future distribution to one or more other client computers 215.

Finally, the user may choose 625 other service options other than joining multipoint meeting of a host computer or becoming a host computer (step 615-No, and step 620-No).

It is noted that the IP address of the client computer 215 may be sent to the host computer 205 and/or the host computer cloud instance 205-C using indirect connection 225, 230, or indirect connection 227, 230 (instead of using direct network connection 240, 245 in FIG. 2A) in further embodiments of the current invention illustrated in FIGS. 6B and 6C respectively and described below.

Figure 6B:
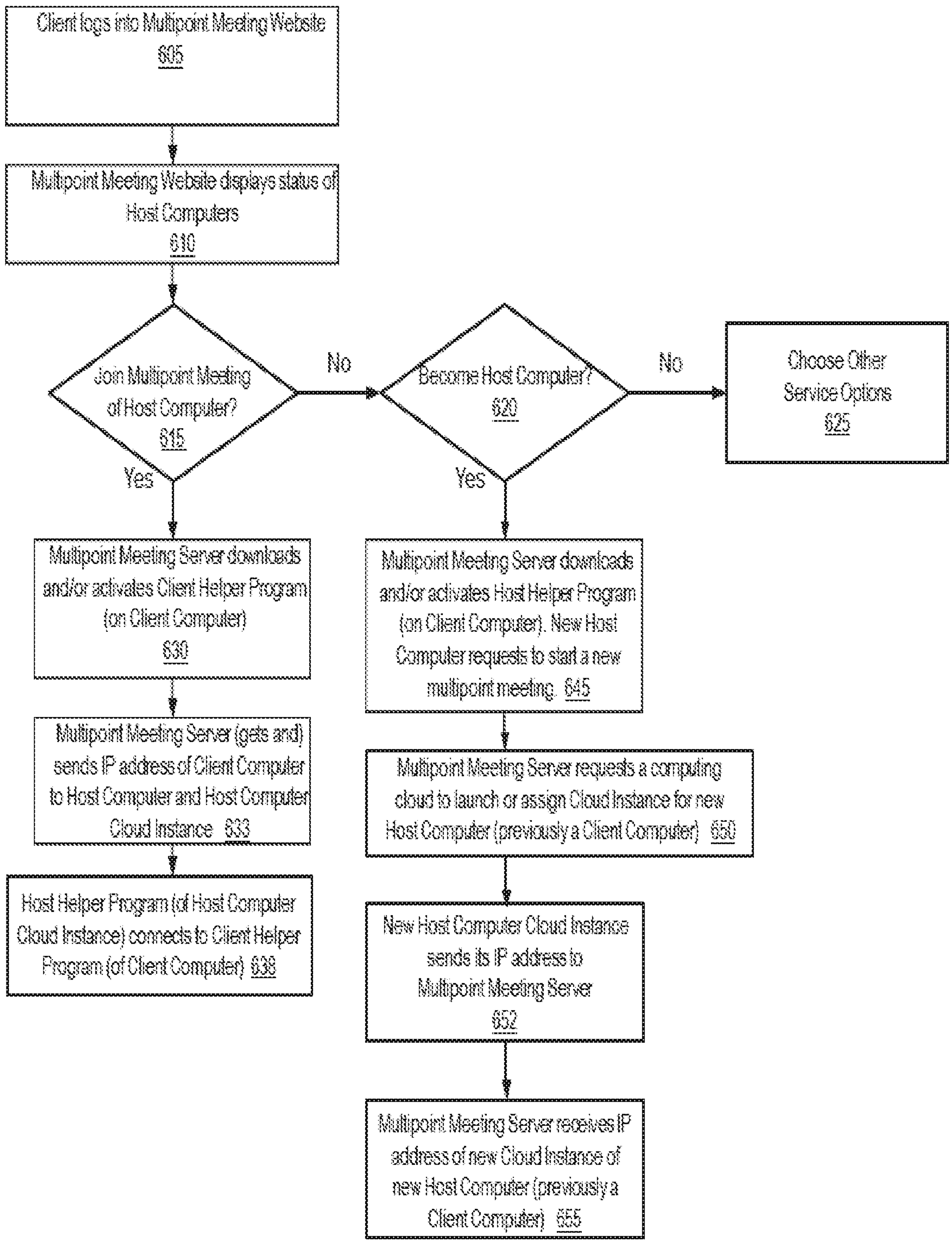

In an embodiment of the current invention illustrated in FIG. 6B, which FIG. 6B is similar to FIG. 6A, but in FIG. 6B the multipoint meeting server (gets 605 and) sends 633 (using indirect connection 225, 230 in FIG. 2A) the IP address of the client computer 215 to the host computer 205 and the host computer cloud instance 205-C, which are communicatively coupled to each other. The host helper program 216-1 (of the host computer cloud instance 205-C) then connects 638 to the client helper program 216-2 (of the client computer 215). Direct data exchange 480 in FIG. 4B can then occur, using direct network connection 240, 245 in FIG. 2A, between the client computer 215 and the host computer 205, using the host computer cloud instance 205-C, and without going through the multipoint meeting server.

Figure 6C:
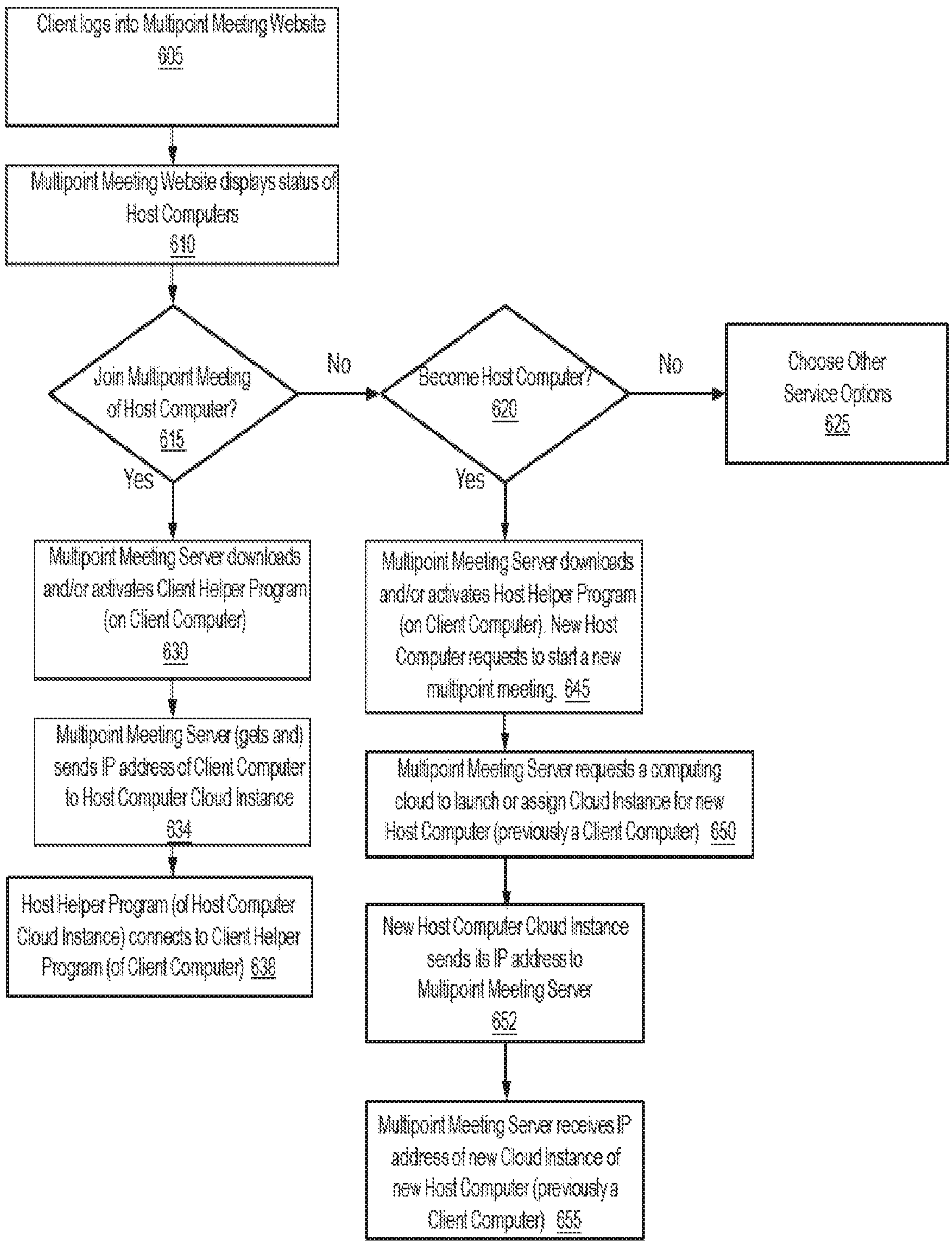

In another embodiment of the current invention illustrated in FIG. 6C, which FIG. 6C is similar to FIG. 6A, but in FIG. 6C the multipoint meeting server (gets 605 and) sends 634 (using indirect connection 227, 230 in FIG. 2A) the IP address of the client computer 215 to the host computer cloud instance 205-C, which is communicatively coupled to the host computer 205. The host helper program 216-1 (of the host computer cloud instance 205-C) then connects 638 to the client helper program 216-2 (of the client computer 215). Direct data exchange 480 in FIG. 4C can then occur, using direct network connection 240, 245 in FIG. 2A, between the client computer 215 and the host computer 205, using the host computer cloud instance 205-C, and without going through the multipoint meeting server.

In some cases, a host computer 205 may have a dynamic IP address, complicating the creation of a direct network connection using cloud instance. For example, the host computer 205 may be coupled to the Internet through an Internet service provider ("ISP"). Often, an ISP has a limited number of Internet connections and therefore a limited number of IP addresses it may allocate at any one time. Thus, when a host computer 205 connects to the Internet through an ISP, it is dynamically assigned a new IP address each time it connects. The present invention solves the problem of dynamic IP address and sends the host computer cloud instance 205-C IP address each time a host computer cloud instance 205-C is launched-or-assigned by a computing cloud upon a request by the multipoint meeting server 222.

Private Network Considerations

A host computer 205 may reside on a private network (e.g., an internal network for a company or organization).

The Internet Assigned Numbers Authority ("IANA") allocates a designated set of IP addresses for private networks, and routers on the Internet are configured to discard any data packets associated with IP addresses from that designated set. Private networks typically include a computer network security barrier, commonly called a "firewall," to prevent unauthorized intrusion into the private network. As such, the IP address of a host computer 205 on a private network is not unique (i.e., other computers on private networks elsewhere globally may have the same IP address) and not accessible from the public Internet.

Figure 7:
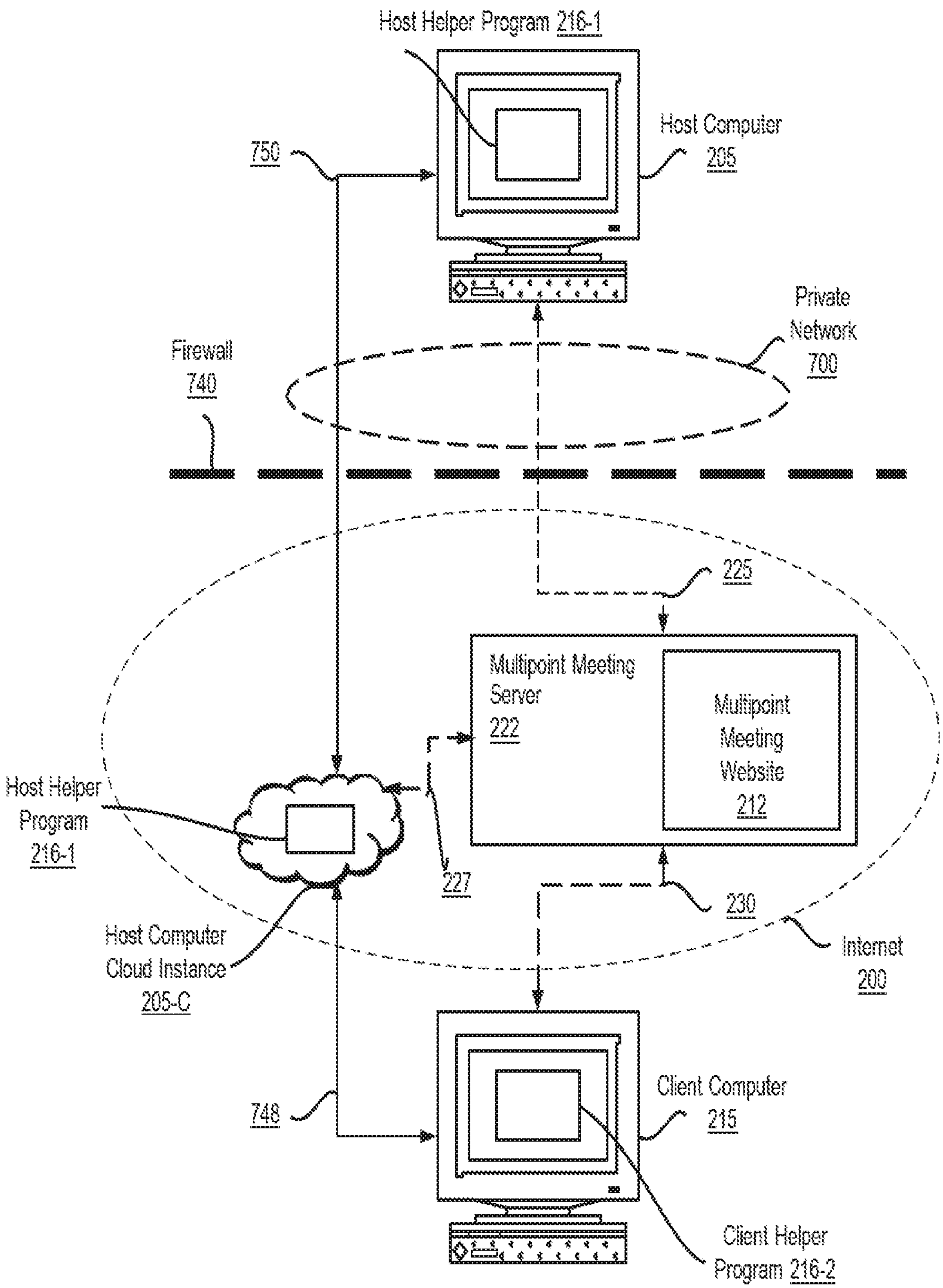
FIG. 7 is a block diagram illustrating providing direct network connections using cloud instance for multipoint meeting service over a computer network in accordance with still another embodiment of the present invention.

FIG. 7 illustrates a direct network connection using cloud instance, in accordance with one embodiment of the present invention, suitable for providing a direct network connection when one of the networked computers does not have a unique, publicly accessible IP address. The embodiment depicted in FIG. 7 includes a host computer 205, a client computer 215, a multipoint meeting server 222 hosting a multipoint meeting website 212, a firewall 740, and a host computer cloud instance 205-C. The host computer 205 is connected to the Internet 200 through a private network 700. The private network 700 is protected by the firewall 740. Thus, the host computer 205 and the client computer 215 are both connected to the Internet 200, but are separated by the firewall 740.

In one embodiment, the direct network connection using cloud instance depicted in FIG. 7 functions largely as the direct network connection using cloud instance described above in reference to FIG. 2A. Specifically, the host computer cloud instance 205-C has a unique, publicly accessible IP address. The host computer 205 may be able to access the host computer cloud instance 205-C and form a network connection 750. Thus, the host computer cloud instance 205-C double duties provides a unique, publicly accessible IP address by which a client computer 215 outside of the private network 700 may join the multipoint meeting of the host computer 205 via a direct network connection 748 using the host computer cloud instance 205-C.

In one embodiment, when the host computer 205 accesses the multipoint meeting website 212 to request starting a new multipoint meeting, the multipoint meeting server 222 requests a computing cloud (not shown) to launch-or-assign the host computer cloud instance 205-C. The host computer cloud instance 205-C is communicatively coupled to the host computer 205. When a client computer 215 subsequently accesses the multipoint meeting website 212 and selects to join the multipoint meeting of the host computer 205, the multipoint meeting server 222 sends to the client computer 215 the IP address of the host computer cloud instance 205-C via a network connection 230. Once the client computer has the IP address of the host computer cloud instance 205-C, it may send data to the host computer cloud instance 205-C via a direct network connection 748. Moreover, the client computer 215 sends to the host computer cloud instance 205-C its IP address (of the client computer 215) through the direct network connection 748. In other words, while the IP address of host computer cloud instance 205-C is sent to the client computer 215 through the multipoint meeting server 222 via the indirect connections 225, 230, the IP address of the client computer 215 is sent to the host computer cloud instance 205-C via the direct connection 748. Thus, the client computer 215 and the host computer cloud instance 205-C are able to obtain one another's IP addresses and create a direct network connection 748. From this point onwards, the multipoint meeting server 222 is not involved in communicating data between host computer 205 and client computer 215, and subsequent data exchange between the host computer 205 and the client computer 215 takes place via the direct network connections 748, 750 using the host computer cloud instance 205-C. For the purpose of clarity, further details of a process for establishing a direct network connection using cloud instance with a host computer 205 on a private network 700 are provided below with reference to FIGS. 8A, 9, and 10A.

It should be noted that the host computer cloud instance 205-C provides double duties functions related to actively hosting a multipoint meeting session, including importantly forming a bridge between the non-accessible private network 700 and the public Internet 200, to facilitate data exchange.

In some embodiments, the direct network connection using cloud instance architectures depicted by FIG. 7, FIG. 2C, FIG. 2D and FIG. 2E are adapted using the above-described techniques to provide multipoint meeting services for multiple host computers 205 on private networks and/or multiple client computers 215. In such embodiments, the host computer cloud instance 205-C may need to distinguish between multiple host computers 205 to ensure that data is transmitted only to one or more proper destinations.

The multipoint meeting server 222 may send a unique meeting ID corresponding to a multipoint meeting between the host computer 205 and the client computer 215 to the client computer 215 along with the IP address of the host computer cloud instance 205-C. The client computer 215 may then send to the host computer cloud instance 205-C the unique meeting ID along with the IP address of the client computer 215. In one embodiment, the multipoint meeting server 222 also sends the unique meeting ID to the host computer 205, which in turn sends it to the host computer cloud instance 205-C. The host computer cloud instance 205-C may store both the unique meeting ID and the associated IP address of the host computer 205 in a look-up table. Thus, when a client computer 215 sends data to a host computer 205 via the direct network connection 748 using the host computer cloud instance 205-C, as illustrated in FIG. 7, it may designate the data as corresponding to the particular meeting ID, allowing the host computer cloud instance 205-C, using the look-up table, to transmit the data to the appropriate host computer 205.

Typically, a private network with a firewall 740 will also have a SOCKS proxy executing between the client web browser 218 and the server. In such an embodiment, the CGI script executed by the server is forced to download the IP address of the SOCKS proxy rather than the IP address of the host computer 205. To resolve this issue, a name registration daemon is provided by the server which registers the IP address and port number of each host computer 205 or client computer 215. When the host/client helper programs 216-1, 216-2 start on host and client computers 205, 215 respectively, the two host/client helper programs 216-1, 216-2 connect to the daemon, allowing the daemon to register the IP address of the host and client computers 205, 215 respectively.

Figure 8A:
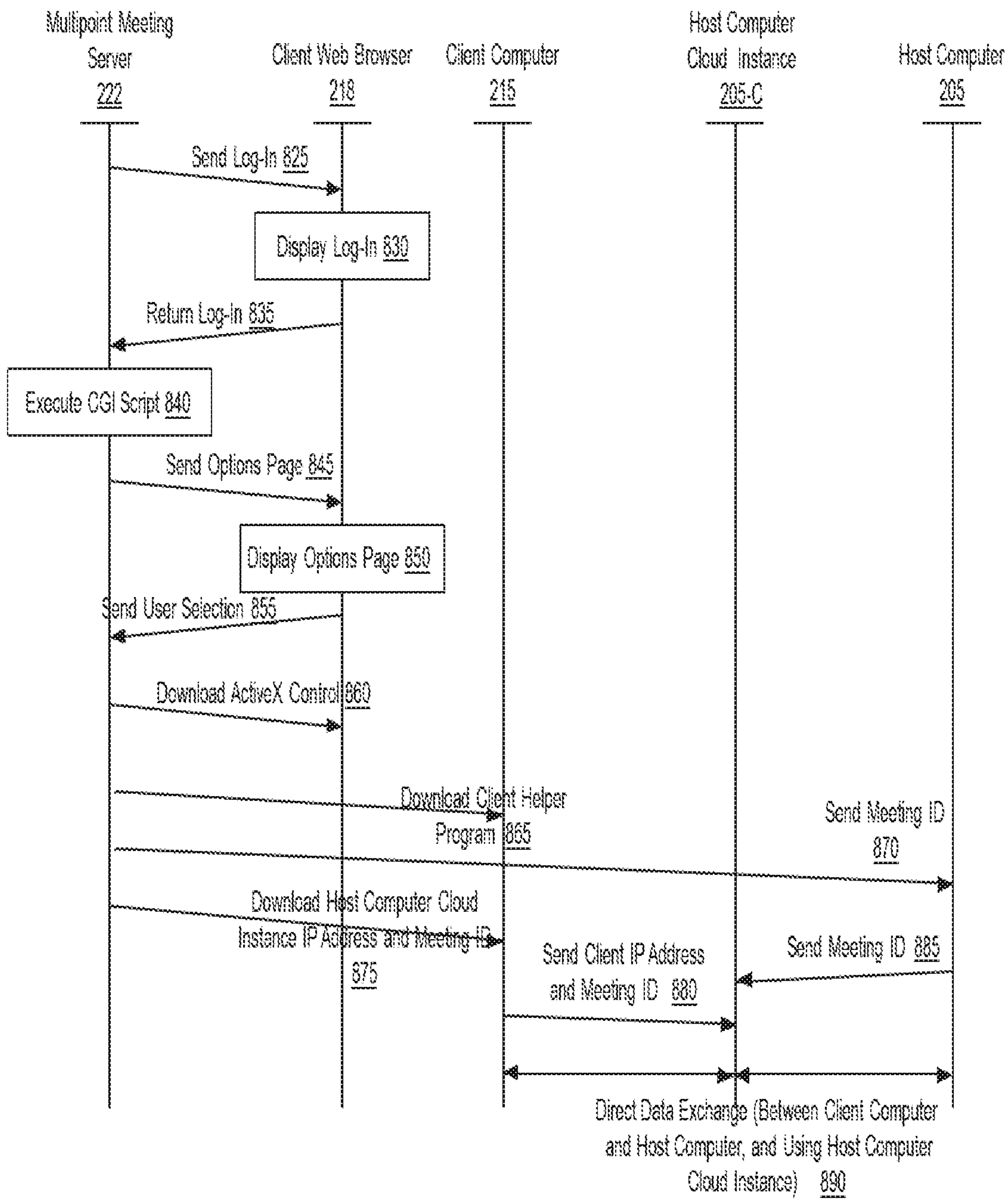
FIGS. 8A, 8B, and 8C are event diagrams illustrating process for providing direct network connections using cloud instance for multipoint meeting service over a computer network in accordance with another embodiment of the present invention.

Referring now to FIG. 8A, a process is illustrated for providing a direct network connection using cloud instance between a client computer 215 and a host computer 205 on a private network in accordance with one embodiment of the present invention. Though the process illustrated in FIG. 8A has many similarities with the process illustrated in FIG. 4A, it is worthwhile to note some of the key differences. The process steps in FIG. 8A are substantially the same as those illustrated in FIG. 4A, except steps 870, 875, 880, 885, and 890. Specifically, the event diagram of FIG. 8A corresponds to a direct network connection using cloud instance with a host computer 205 on a private network 700. When a host computer 205 is on a private network 7), a unique meeting ID is sent 870 by the multipoint meeting server 222 to the host computer 205. The unique meeting ID is also downloaded 875 from the multipoint meeting server 222 by the client computer 215 along with the IP address of the host computer cloud instance 205-C. Then, the IP address of the client computer 215 and the meeting ID are sent 880 by the client computer 215 to the host computer cloud instance 205-C, which is communicatively coupled to the host computer 205. The host computer 205 also sends 885 the meeting ID to the host computer cloud instance 205-C. From this point onwards, data may be exchanged 890 between the client computer 215 and the host computer 205 via the direct network connection 748 using the host computer cloud instance 205-C and host computer cloud instance 205-C acting as a bridge between the private network 700 and the Internet 200, and as illustrated in FIG. 7. As explained above, when client computer 215 sends data to a host computer 205, it may designate the data as corresponding to the particular meeting ID, allowing the host computer cloud instance 205-C, using the look-up table, to transmit the data to the appropriate host computer 205.

It is noted that the IP address of the client computer 215 may be sent to the host computer 205 and/or the host computer cloud instance 205-C using indirect connection 225, 230, or indirect connection 227, 230 (instead of using direct network connection 748, 750 in FIG. 7) in further embodiments of the current invention illustrated in FIGS. 8B and 8C respectively and described below.

Figure 8B:
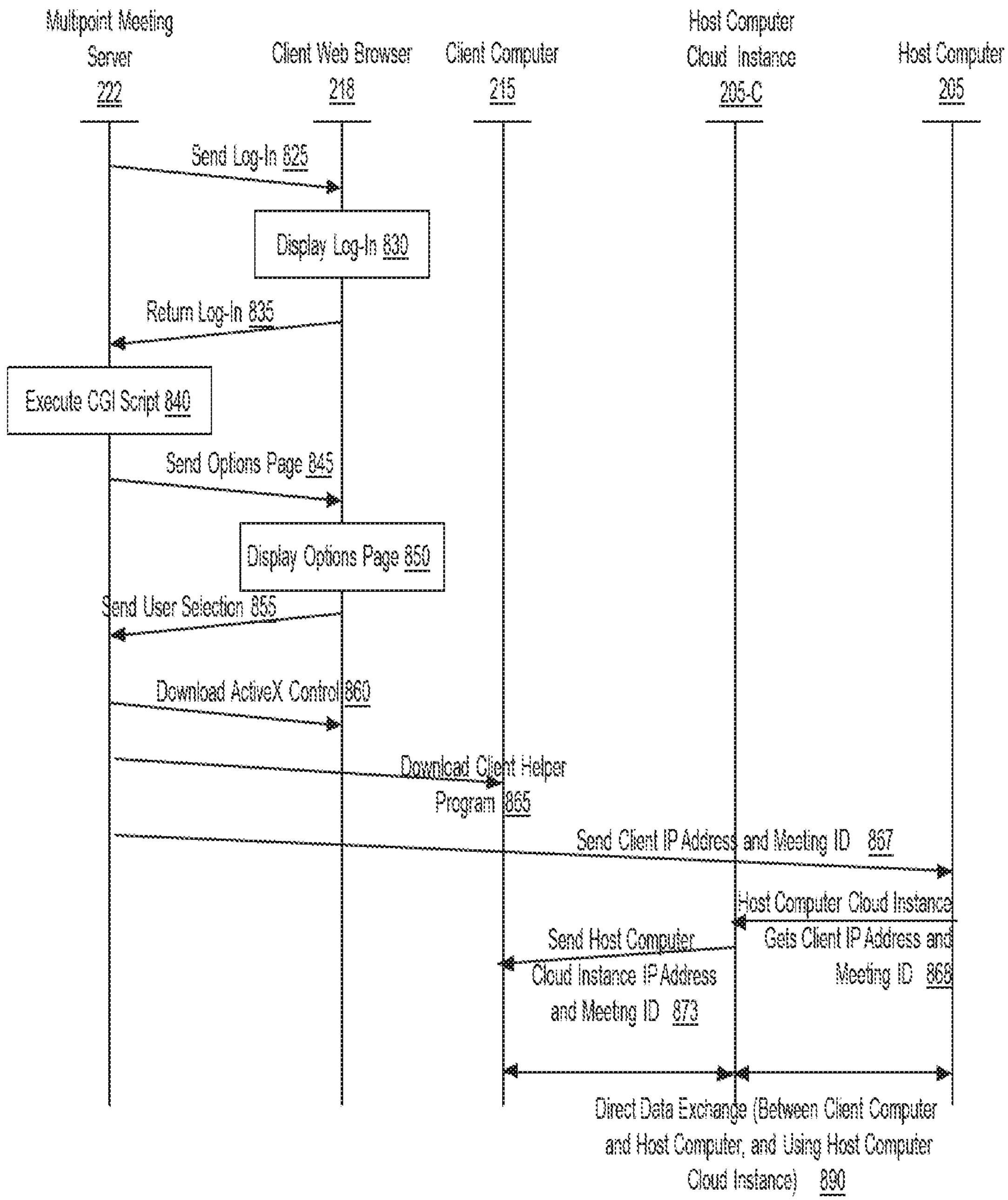

In an embodiment of the current invention illustrated in FIG. 8B, which FIG. 8B is similar to FIG. 8A, but in FIG. 8B the multipoint meeting server sends 867 (using indirect connection 225, 230 in FIG. 7) the IP address of the client computer 215 and meeting ID to the host computer 205, which is communicatively coupled to the host computer cloud instance 205-C. The host computer cloud instance 205-C therefore also gets 868 the IP address of the client computer 215 and meeting ID. The host computer cloud instance 205-C then sends 873 its IP address and the meeting ID to client computer 215. Direct data exchange 890 can then occur, using direct network connection 748, 750 in FIG. 7, between client computer 215 and host computer 205, using host computer cloud instance 205-C, and without going through multipoint meeting server.

Figure 8C:
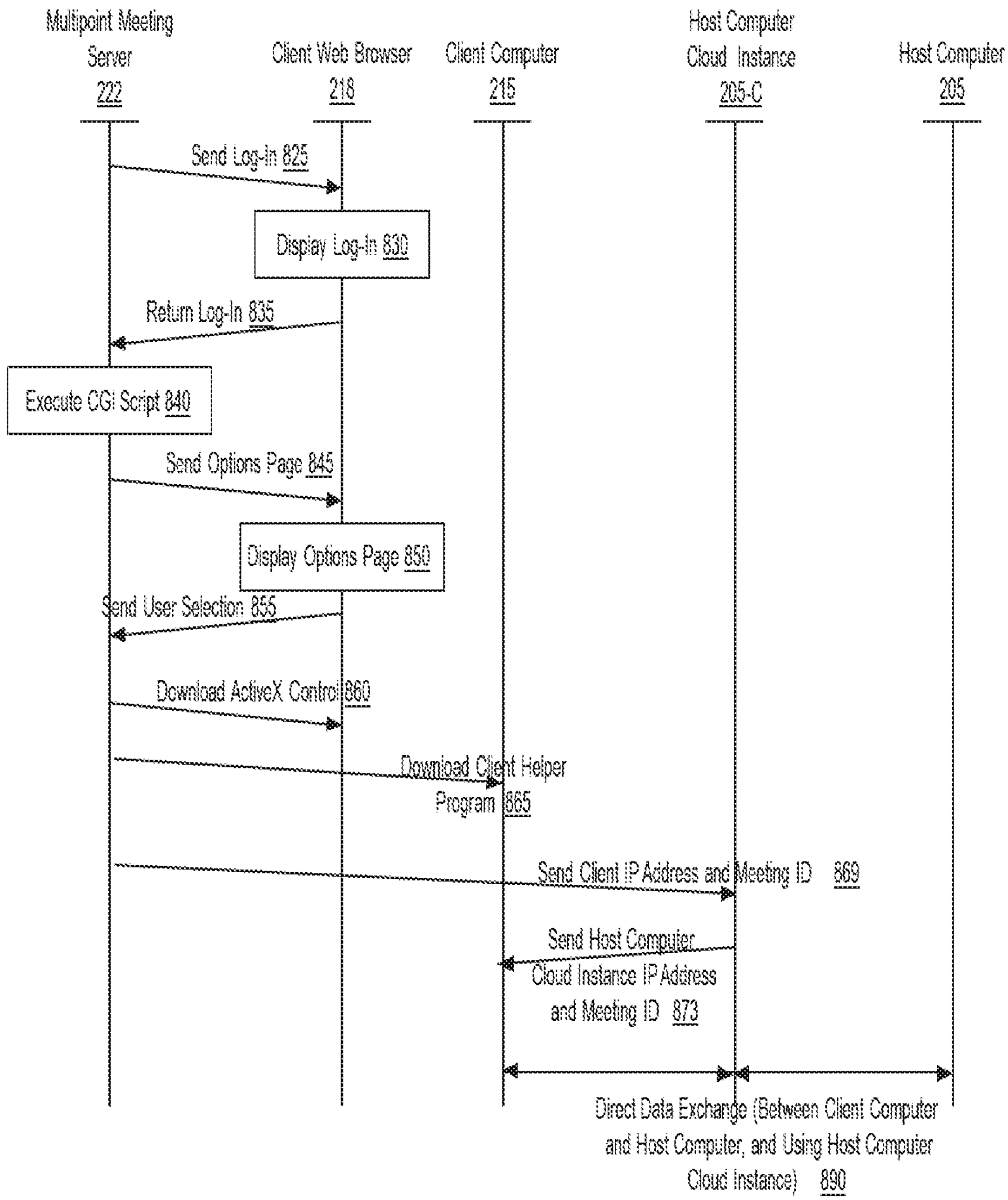

In another embodiment of the current invention illustrated in FIG. 8C, which FIG. 8C is similar to FIG. 8A, but in FIG. 8C the multipoint meeting server sends 869 (using indirect connection 227, 230 in FIG. 7) the IP address of the client computer 215 and meeting ID to the host computer cloud instance 205-C, which is communicatively coupled to the host computer 205. The host computer cloud instance 205-C then sends 873 its IP address and the meeting ID to client computer 215. Direct data exchange 890 can then occur, using direct network connection 748, 750 in FIG. 7, between client computer 215 and host computer 205, using host computer cloud instance 205-C, and without going through multipoint meeting server.

Figure 9:
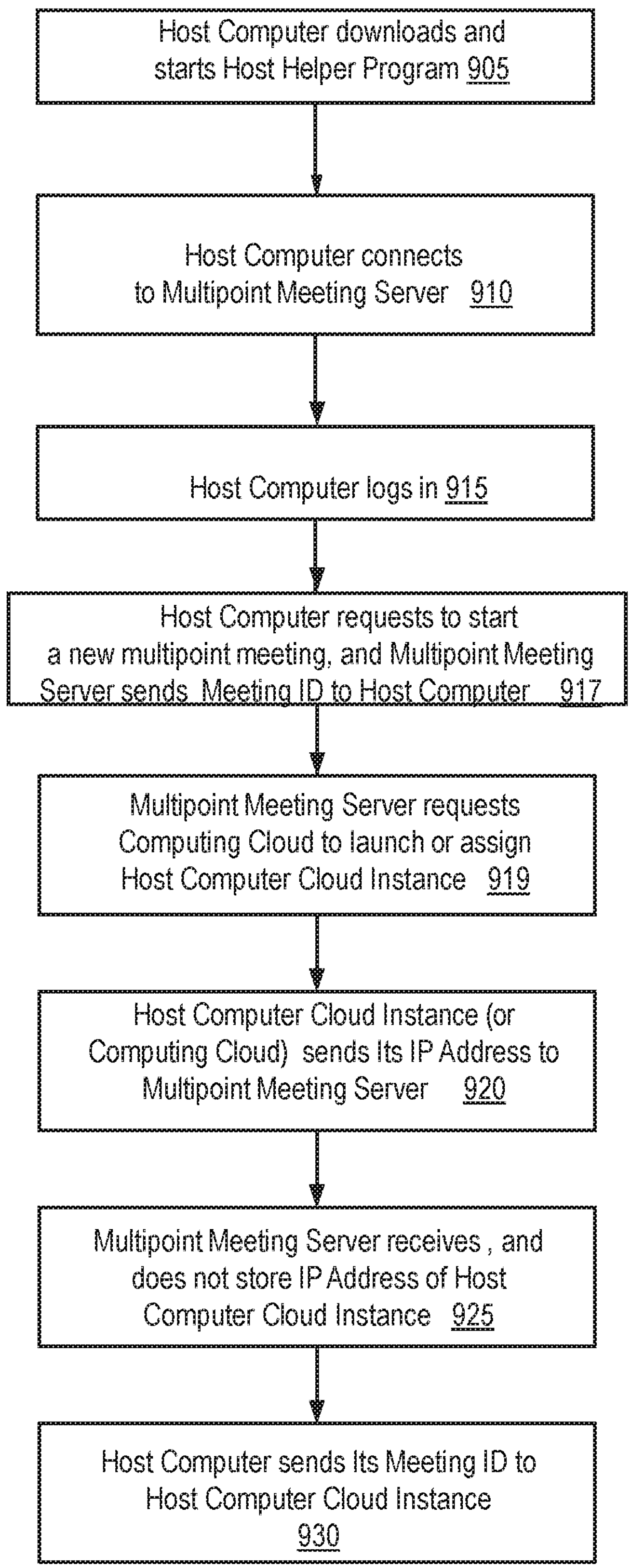
FIG. 9 is a flowchart illustrating a process performed by a host computer to provide direct network connections using cloud instance for multipoint meeting service over a computer network in accordance with another embodiment of the present invention.

FIG. 9 presents a flowchart of a process performed by a host computer 205 on a private network 700 to provide direct network connections between computers over a computer network in accordance with an embodiment of the present invention. First, the host computer 205 downloads and starts 905 the host helper program 216-1. In one embodiment, the host helper program 216-1 is a BigBlueButton multipoint meeting host application. The host computer 205 then connects 910 to the multipoint meeting server 222. This allows a multipoint meeting website 212 hosted by the multipoint meeting server 222 to accurately reflect the status of the host computer 205 on an options page 305. The host computer 205 logs-in 915 to a multipoint meeting website 212 hosted by the multipoint meeting server 222. The host computer 205 requests 917 to start a new multipoint meeting, and the multipoint meeting server 222 sends a unique meeting ID to the host computer 205. The multipoint meeting server 222 requests 919 a computing cloud (not shown) to launch-or-assign a host computer cloud instance 205-C. The host computer cloud instance 205-C sends 920 its IP address to the multipoint meeting server 222. The multipoint meeting server 222 also receives 925 and does not store 925 (but may store later, not shown) the IP address of the host computer cloud instance 205-C. Finally, the host computer 205 sends 930 its meeting ID to the host computer cloud instance 205-C.

Figure 10A:
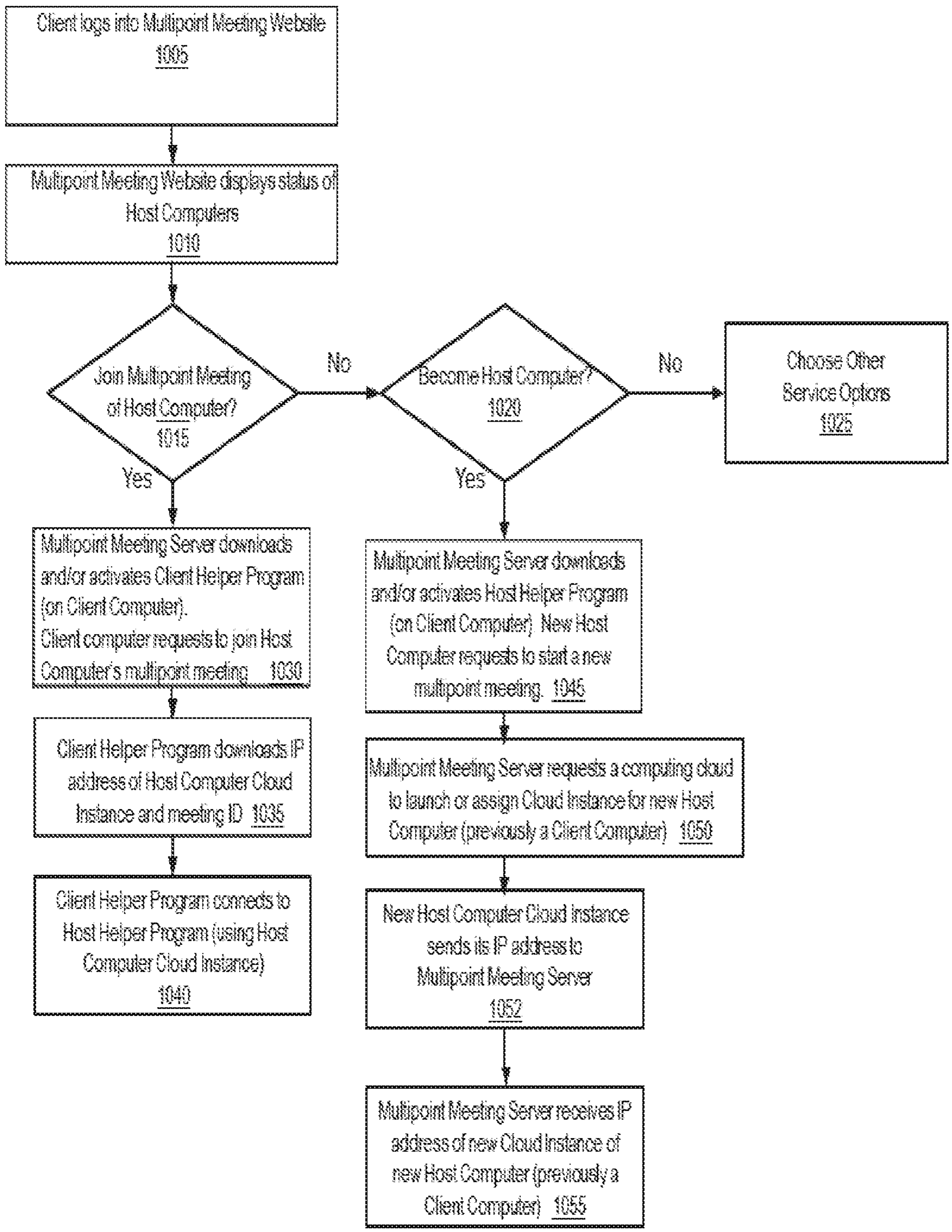
FIGS. 10A, 10B, and 10C are flowcharts illustrating process performed by a client computer to provide direct network connections using cloud instance for multipoint meeting service over a computer network in accordance with another embodiment of the present invention.

FIG. 10A presents a flowchart of a process performed by a client computer 215 to provide a network connection with a host computer 205 on a private network in accordance with an embodiment of the present invention. The process steps in FIG. 10A are substantially the same as those illustrated in FIG. 6A, except step 1035. Since the host computer 205 is in a private network communicating with the public Internet network 200 through the host computer cloud instance 205-C, when the client helper program 216-2 downloads 1035 the IP address of the host computer cloud instance 205-C, a unique meeting ID is also downloaded. As explained above, when client computer 215 sends data to a host computer 205, it may designate the data as corresponding to the unique meeting ID, allowing the host computer cloud instance 205-C, using a look-up table, to transmit the data to the appropriate host computer 205.

It is noted that the IP address of the client computer 215 may be sent to the host computer 205 and/or the host computer cloud instance 205-C using indirect connection 225, 230, or indirect connection 227, 230 (instead of using direct network connection 748, 750 in FIG. 7) in further embodiments of the current invention illustrated in FIGS. 10B and 10C respectively and described below.

Figure 10B:
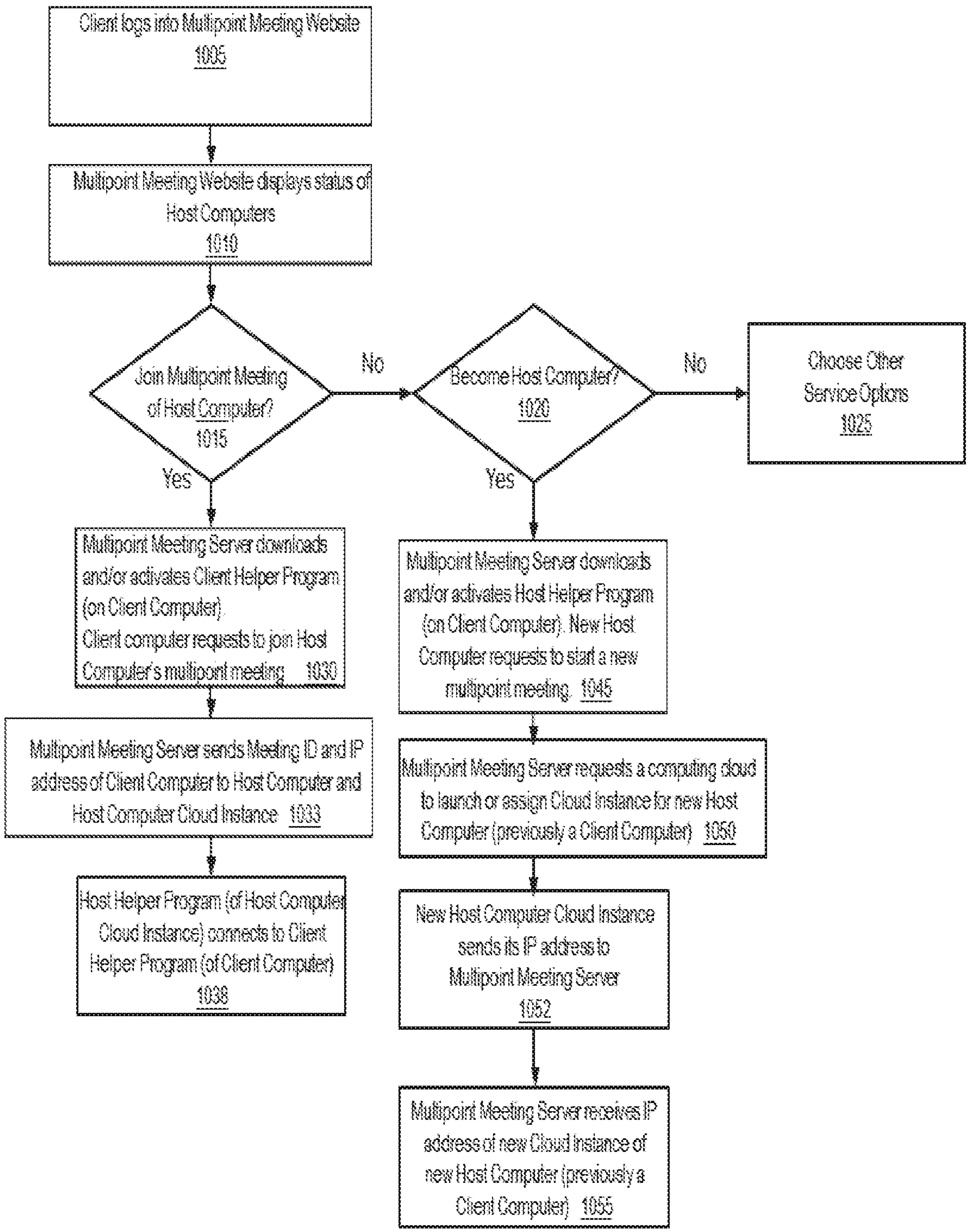

In an embodiment of the current invention illustrated in FIG. 10B, which FIG. 10B is similar to FIG. 10A, but in FIG. 10B the multipoint meeting server sends 1033 (using indirect connection 225, 230 in FIG. 7) the IP address of the client computer 215 and the meeting ID to the host computer 205 and the host computer cloud instance 205-C, which are communicatively coupled to each other. The host helper program 216-1 (of the host computer cloud instance 205-C) then connects 1038 to the client helper program 216-2 (of the client computer 215). Direct data exchange 890 (in FIG. 8B) can then occur, using direct network connection 748, 750 in FIG. 7, between the client computer 215 and the host computer 205, using the host computer cloud instance 205-C, and without going through the multipoint meeting server 222.

Figure 10C:
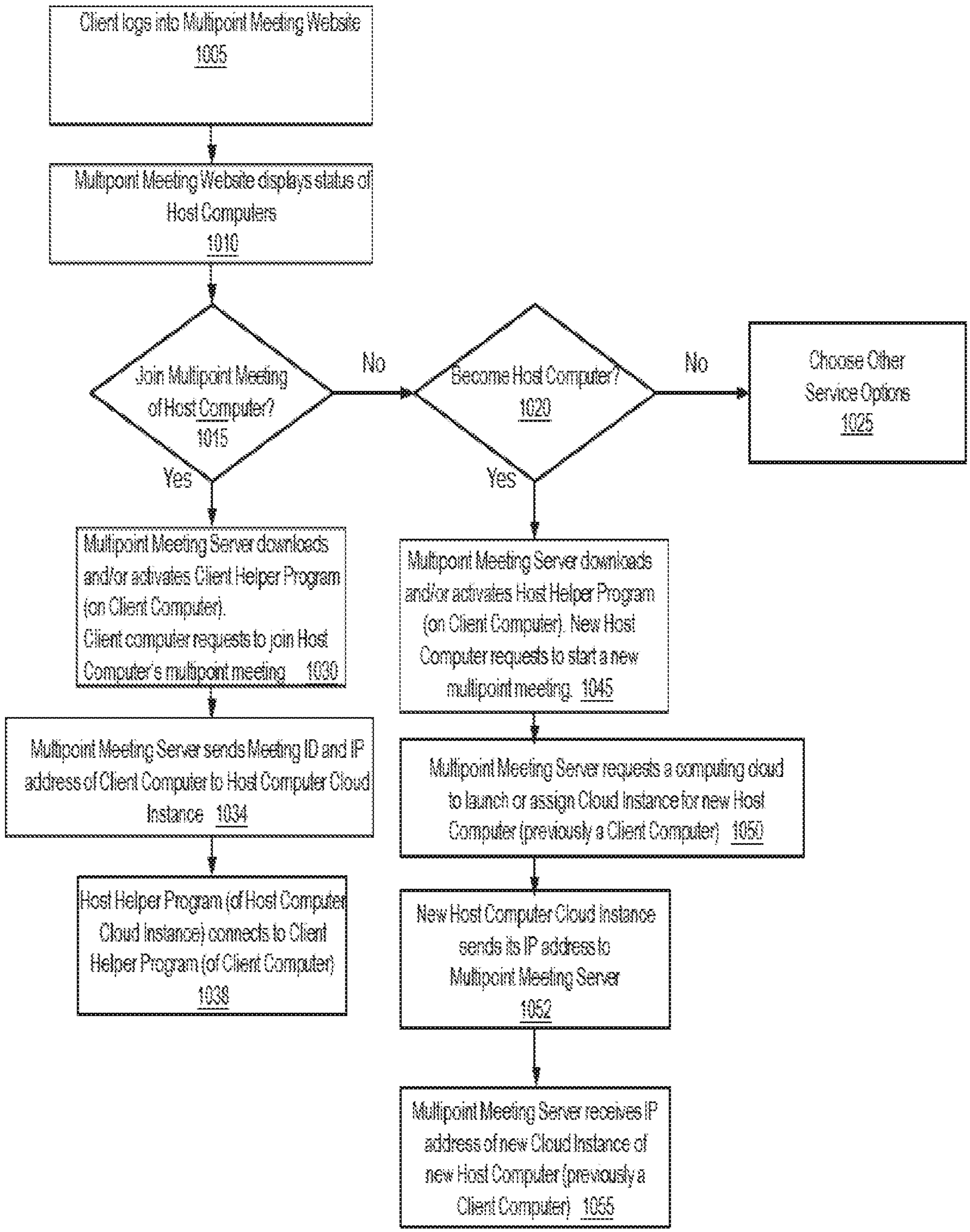

In another embodiment of the current invention illustrated in FIG. 10C, which FIG. 10C is similar to FIG. 10A, but in FIG. 10C the multipoint meeting server sends 1034 (using indirect connection 227, 230 in FIG. 2A) the IP address of the client computer 215 and the meeting ID to the host computer cloud instance 205-C, which is communicatively coupled to the host computer 205. The host helper program 216-1 (of the host computer cloud instance 205-C) then connects 1038 to the client helper program 216-2 (of the client computer 215). Direct data exchange 890 (in FIG. 8C) can then occur, using direct network connection 748, 750 in FIG. 7, between client computer 215 and host computer 205, using host computer cloud instance 205-C, and without going through multipoint meeting server 222.

"Not-Decrease"-Virtualized-Hardware (in Cloud Instance)

Para [0146C]-to-[0146K] below documents that "non-new"-("old")-matters throughout provisional application (filed on 2015 Dec. 30) and non-provisional application (filed on 2016 Dec. 30) support (in bold in Para [0146C]-to-[0146K] below) "Not-Decrease"-virtualized-hardware: (a). ("Not-Decrease"-virtualized-hardware) in FIGS. 11C-and-11D, and (b). ("Not-Decrease"-virtualized-hardware) in FIG. 11's (or (renumbered)-FIG. 11A's) Tables-1-and-2-and-3). (Support-("Not-Decrease"-virtualized-hardware))-examples include following "non-new"-("old")-matters from provisional (filed on 2015 Dec. 30) and "non-new"-("old")-matters from non-provisional (filed on 2016 Dec. 30) in Para [0146C]-to-[0146K] below.

Please note that limitation of "to not-decrease the virtualized-hardware" is (limit-to "not-decrease") to multiples-of-1X-(virtualized)-hardware (illustrated in FIG. 11's (or (renumbered)-FIG. 11A's) Table-'s row-C-and-columns-III-to-XI: examples include "1X, 2X, 4X, 20X, 100X, 400X, 4000X, 40000X" respectively. For BigBlueButton software, 1X-hardware is illustrated-(and-summarized) in FIG. 11's (or (renumbered)-FIG. 11A's) Table 2's row-B-and-column-II.)

Para [0146C]-to-[0146K] below documents that "non-new"-("old")-matters throughout provisional (filed on 2015 Dec. 30) and non-provisional (filed on 2016 Dec. 30) support (in bold in Para [0146C]-to-[0146K] below) "Not-Decrease"-virtualized-hardware.

Please note that "Not-Decrease"-(virtualize-hardware) below also means-"excluding-decrease"-(and-does-NOT-decrease)-(virtualize-hardware).

Please note that "Not-Decrease"-virtualized-(1X)-hardware in cloud-instance means-(and-its-implementation-may-use): (a) "(Not-Decrease-or)-Increase"-virtualized-(1X)-hardware (illustrated in FIG. 11C), and/or (b) "(Not-Decrease-or)-keep-SAME/Not-Change"-virtualized-(1X)-hardware (illustrated in FIG. 11D):

(i) ("non-new"-("old")-matter's) Para [0123] (lines 2-to-10) supports "Not-Decrease"-(Increase)-virtualized-hardware (e.g. in FIG. 11C) as:

("non-new"-("old")-matter's) Para [0123] (lines 2-to-10):) "In cloud instance computing, single hardware is implemented into software and run on top of multiple computers. Cloud instance computing is highly dynamic, enabling users not to worry about how many virtual machines can fit on a single hardware application without causing major slowdowns during peak hours. If performance maxes out, one can simply add more computers. Resources can be freely allocated to and from other computers by the software, enabling maximum utilization and helping to prevent crashes. If the virtual machine grows beyond the limits of a single machine, cloud instance computing allows the cloud software to be easily expanded to span multiple machines" (in Para 101231 lines 2-to-10).

(ii) ("non-new"-("old")-matter's) Para [0124] (lines 1-to-7) supports "Not-Decrease"-(Increase)-virtualized-hardware (e.g. in FIG. 11C) as:

("non-new"-("old")-matter's) Para [0124] (lines 1-to-7):) "Amazon EC2 (Amazon Web Services Elastic Compute Cloud), provides a wide selection of instance types optimized to fit different use cases. Instance types comprise varying combinations of CPU, memory, storage, and networking capacity and give one the flexibility to choose the appropriate mix of resources for one's applications. Each instance type includes one or more instance sizes, allowing one to scale one's resources to the requirements of one's target workload" (in ("non-new"-("old")-matter's) Para [0124] lines 1-to-7).

(iii) ("non-new"-("old")-matter's) Para [0185] (lines 1-to-4) supports "Not-Decrease"-(keep-SAME/Not-Changed)-virtualized-hardware (e.g. in FIG. 11D) as:

("non-new"-("old")-matter's Para [0185](lines 1-to-4):) "FIG. 12A is a flowchart illustrating how the host computer 205 can add steps 1210 to 1280 in FIGS. 12B, 12C, 12F, and 12G respectively, to request the multipoint meeting server 222 to request a computing cloud (not shown) to launch the needed number of single hardware in its host computer cloud instance" (in ("non-new"-("old")-matter's) Para [0185] lines 1-to-4).

Figure 12A:
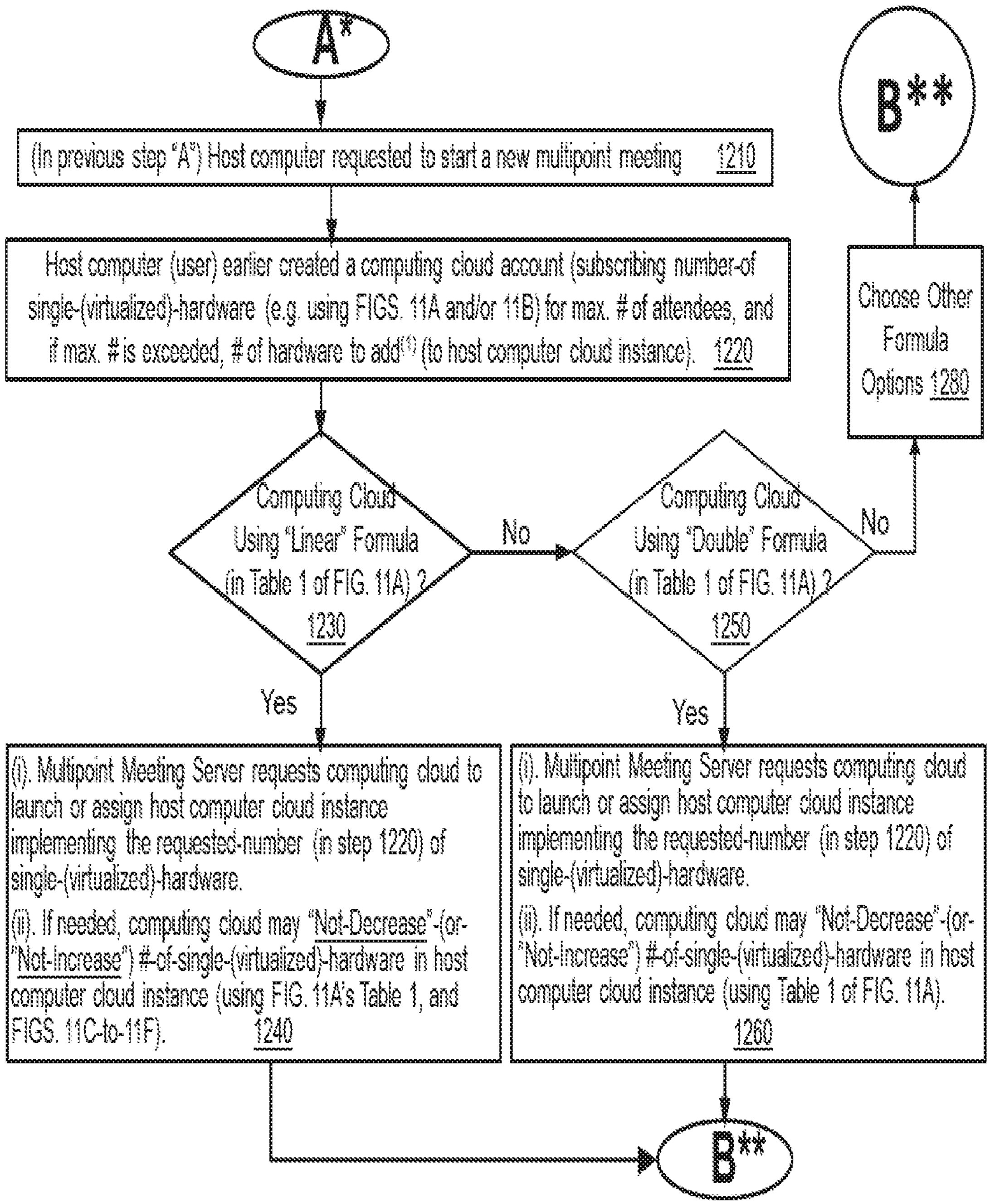
FIG. 12A is a flowchart illustrating providing direct network connections using cloud instance for multipoint meeting service over a computer network in accordance with another embodiment of the present invention.
Figure 12B:
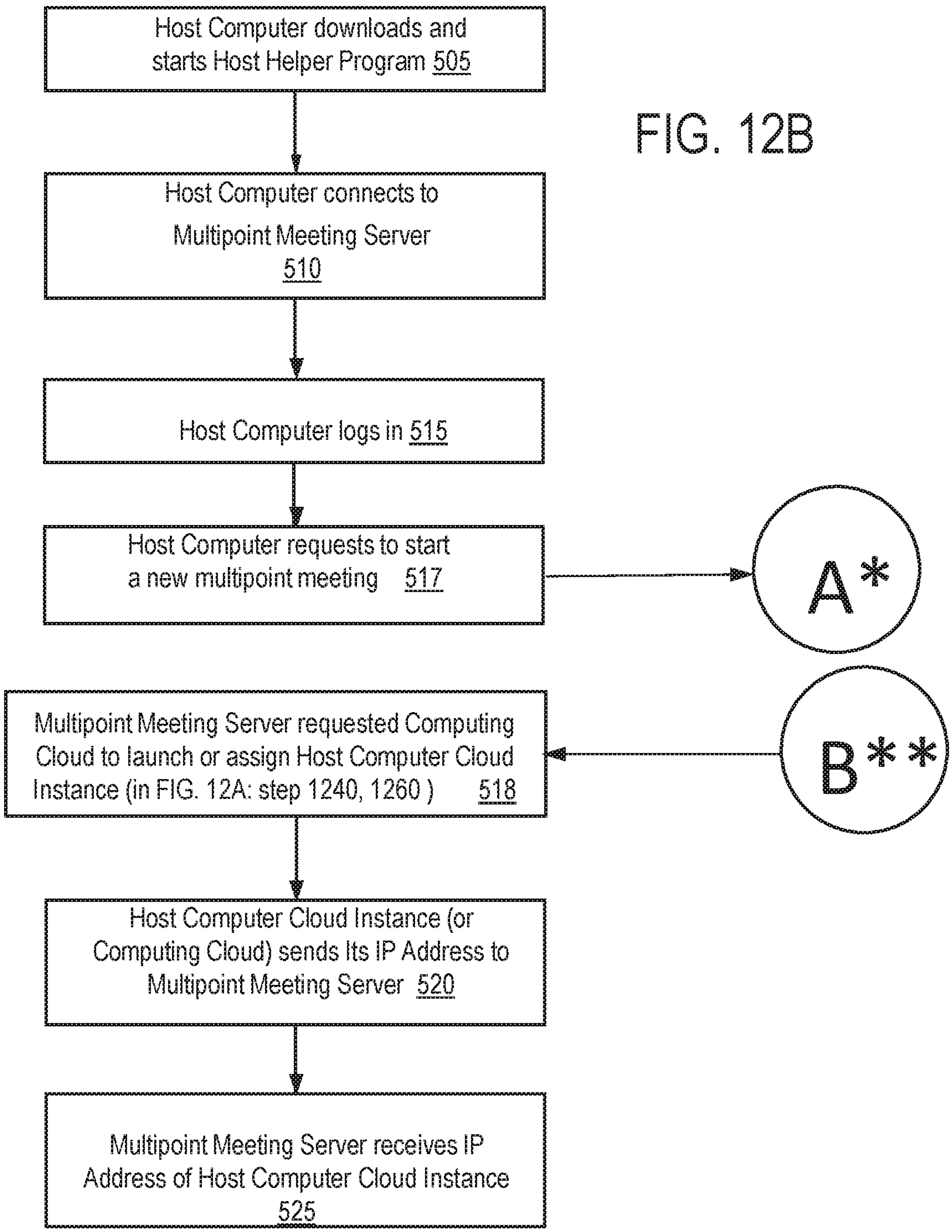
FIGS. 12B, 12C, 12D, 12E, 12F, 12G, 12H, and 12I are flowcharts illustrating providing direct network connections using cloud instance for multipoint meeting service over a computer network in accordance with another embodiment of the present invention.

(iv) ("non-new"-("old")-matter's) FIG. 12A's step-1220 supports "Not-Decrease"-(Increase)-virtualized-hardware (e.g. in FIG. 11C) as:

("non-new"-("old")-matter's FIG. 12A's step-1220's) "host computer indicates . . . if max. # is exceeded, #-of-hardware to add (to host computer cloud instance)" (in ("non-new"-("old")-matter's) FIG. 12A's step-1220)

(v) ("non-new"-("old")-matter's) Para [0186] (lines 5-to-9) supports "Not-Decrease"-(Increase)-virtualized-hardware (e.g. in FIG. 11C) as:

("non-new"-("old")-matter's Para [0186] (lines 5-to-9):) "The host computer 205 may also specify in the same step 1220 when the maximum number of attendees is exceeded, the number of single hardware (implemented in software) to add to host computer cloud instance 205-C" (in ("non-new"-("old")-matter's) Para [0186] lines 5-to-9).

(vi) ("non-new"-("old")-matter's) Para [0187] (lines 1-to-7) supports "Not-Decrease"-(Increase)-virtualized-hardware (e.g. in FIG. 11C) as:

("non-new"-("old")-matter's Para [0187] (lines 1-to-7):) "The default case is that the multipoint meeting server 222 will use the linear formula in Table (1) of FIG. 11 (or of FIG. 11A) to start with one single hardware (implemented in software) in the host computer cloud instance 205-C, and when the new attendee in step 1320 exceeds the maximum attendee number (for the then current number of single hardware), add 10% of the then current number of single hardware (rounded up-to next integer) to the host computer cloud instance 205-C, if the host computer 205 does not specify anything in step 1220 (in FIG. 12A)" (in ("non-new"-("old")-matter's) Para [0187] (lines 1-to-7).

(vii) ("non-new"-("old")-matter's) FIG. 1's (or (renumbered)-FIG. 11A's) Table-1's rows-B-and-C supports "Not-Decrease"-(Increase)-virtualized-hardware (e.g. in FIG. 11C) as:

("non-new"-("old")-matter's FIG. 11's (or (renumbered)-FIG. 11A's) Table-'s rows-B-and-C:) "# of hardware implemented (in heading in Table-'s row-C-and-column-I) increases (in #-of-hardware-(implemented) in Table-l's row-C-and-columns-Ill-to-XI: 1X, 2X, 4X, 20X, 100X, 400X, 4000X, 40000X respectively) as maximum-attendees (in heading in Table-'s row-A-and-column-III) increases (in maximum-attendees in Table-'s row-B-and-columns-III-to-XI: 25, 50, 100, 500, 1000, 2500, 10000, 100000, 1000000 respectively) in ("non-new"-("old")-matter's) FIG. 11's (or (renumbered)-FIG. 11A's) Table-'s rows-B-and-C.

(viii) ("non-new"-("old")-matter's) FIG. 11's (or (renumbered)-FIG. 11A's) Table 1's note-(a) illustrate "Not-Decrease"-(Increase)-virtualized-hardware (e.g. in FIG. 11C) as:

("non-new"-(old")-matter's FIG. 1's (or (renumbered)-FIG. 11A's) Table 1's note-(a):) "Linear" formula for # of hardware (implemented in cloud instance)="Maximum # of attendees expected"/25 (if fraction, round up to next integer) (in ("non-new"-("old")-matter's) FIG. 1*l*'s (or (renumbered)-FIG. 11A's) Table-1's note-(a)).

(ix) ("non-new"-("old")-matter's) FIG. 11's (or (renumbered)-FIG. 11A's) Tables 2-and-3 illustrate "Not-Decrease"-(Increase)-virtualized-hardware (e.g. in FIG. 11C) as:

("non-new"-("old")-matter's FIG. 11's (or (renumbered)-FIG. 11A's) Tables 2-and-3:) Table-2's 1X-hardware (for 25 attendees in Table-2's row-B-and-column-I) is "4 GB memory . . . Quad-core . . . 500 GB disk . . . 100 Mbits/sec. bandwidth , , ," (in Table 2's row-B-and-column-II), and increases to Table-3's 8X-hardware (for 200 attendees in Table-3's row-B-and-column-I) which (8X-hardware) is "32 GB memory . . . 8 CPU's (EACH Quad-core) . . . 4000 GB disk . . . , 800 Mbits/sec. bandwidth , , ," (in Table-3's row-B-and-column-II) (in ("non-new"-("old")-matter's) FIG. 11's (or (renumbered)-FIG. 11A's) Tables 2-and-3).

Please note again that "Not-Decrease"-virtualized-(1X)-hardware in cloud-instance supported-by-"non-new"-("old")-matters-in Para [0146C]-to-[0146K] above means-(and-its-implementation-may-use):

(a) "(Not-Decrease-or)-keep-SAME/Not-Change"-virtualized-(1X)-hardware (illustrated in FIG. 11D): Keep-SAME-H/W (in "Not-Decrease"-virtualized-hardware) are default-(first-step) when computing cloud 198 launches cloud instances, e.g. in step 518 in FIGS. 5 and 20C, and step 919 in FIGS. 9 and 12F, and in Para [0150E]'s lines-2-to-6: "Multipoint meeting server 222 (FIG. 2A) requests computing cloud 198 to launch-or-assign host computer cloud instance 205-C (FIG. 2A) implementing (virtualizing) the requested (and subscribed in step 1220) ("Linear" Formula) number of single-(virtualized)-hardware on software". FIG. 11D illustrates ("Not-Decrease"-or)-Keep-SAME-virtualized-hardware; and/or (b) "(Not-Decrease-or)-Increase"-virtualized-(1X)-hardware (illustrated in FIG. 11C): (After default-(first-step)-launch above Para [0146L] (a),) later (as optional-2nd-step (not shown)) "computing cloud 198 may increase-(or-decrease) (using "Linear" Formula) single-(virtualized)-hardware in host computer cloud instance 205-C" (in Para [0150E]'s lines-6-to-9), e.g. as optional-2nd-step (not shown) in step 518 in FIGS. 5 and 20C, and step 919 in FIGS. 9 and 12F, and as illustrated in FIG. 11C to "(Not-Decrease)-increase"-virtualized-hardware, or as illustrated in FIG. 1E to "(Not-Increase)-decrease"-virtualized-hardware.

FIG. 11-(or-11A) (for BigBlueButton, Virtualized-(1X)-H/W, "Linear" Formula) is "non-new"-("old")-matters from provisional application (filed on 2015 Dec. 30) and from non-provisional application (filed on 2016 Dec. 30), and support "Not-Decrease"-virtualized-hardware (described-(further) in Para [0146N], [0146P], [0146Q], and [0146R]), as Table 1's row-C uses (Table 1's)-note-(a)'s linear formula (applied-to (Table 1's)-row-B) to "Not-Decrease"-virtualized-hardware, as illustrated in following five (5) examples in [0146M] (i)-to-(v) below:

(i) as a first example (of "Not-Decrease"-virtualized-hardware): # of (1X)-H/W-(implemented-in-host-computer-cloud-instance (Table-1's row-C-and-column-I) (using (Table 1's)-note-(a)'s linear formula applied-to (Table 1's)-row-B-and-column-III of 25-max.-attendees)=25/25=1X-H/W (in-row-C-and-column-III);

(ii) as a second example (of "Not-Decrease"-virtualized-hardware): # of (1X)-H/W-(implemented-in-host-computer-cloud-instance (Table-1's row-C-and-column-I) (using (Table 1's)-note-(a)'s linear formula applied-to (Table 1's)-row-B-and-column-V of 100-max.-attendees)=100/25=4X-H/W (in-row-C-and-column-V);

(iii) as a third example (of "Not-Decrease"-virtualized-hardware): # of (1X)-H/W-(implemented-in-host-computer-cloud-instance (Table-1's row-C-and-column-I) using (Table 1's)-note-(a)'s linear formula (applied-to (Table-1's)-row-B-and-column-VII of 1,000-max.-attendees)=1000/25=40X-H/W (in-row-C-and-column-VII);

(iv) as a fourth example (of "Not-Decrease"-virtualized-hardware): # of (1X)-H/W-(implemented-in-host-computer-cloud-instance (Table-1's row-C-and-column-I) (using (Table 1's)-note-(a)'s linear formula applied-to (Table 1's)-row-B-and-column-IX of 10,000-max.-attendees)=10000/25=400X-H/W (in-row-C-and-column-IX);

(v) as a fifth example (of "Not-Decrease"-virtualized-hardware): # of (1X)-H/W-(implemented-in-host-computer-cloud-instance (Table-1's row-C-and-column-I) (using (Table 1's)-note-(a)'s linear formula applied-to (Table 1's)-row-B-and-column-XI of 1,000,000-max.-attendees) =1000000/25=40000X-H/W (in-row-C-and-column-XI).

Referring to FIG. 11B's Table 2, (it is obvious that) one-skilled-in-relevant-art (using software-and-database) may use [0146M] (and Para [0146C]-to-[0146K] and FIG. 11A's-Tables-1-and-2) to (use #-of-(1X)-H/W-implemented and) apply to "Not-Decrease"-(virtualized-hardware)-in-CPU/Memory/Disk/Bandwidth in FIG. 11B's Table-2's (rows-E-to-N-and)-columns-IV-to-VII for its (max-#-of-attendees and) host-computer-cloud-instance(s) (in (rows-E-to-N-and)-columns-I-and-III respectively), as illustrated in following five (5) examples in [0146N]-(i)-to-(v) below:

(i) as a first example, please note that one-skilled-in-relevant-art (using software-and-database) may copy 1X-hardware (data) from FIG. 11A's Table 2's row-B-and-column-II (which is "4-CPU-(core), 8-GB-memory, 500-GB-Disk, 100 Mbits/sec-Bandwidth") (to-copy)-to virtualized-1X-H/W-(in-Instance) in FIG. 11B's Table-2's row-E-and-columns-IV-to-VII (which is the same-(copied-data): "4-CPU-(core), 8-GB-memory, 500-GB-Disk, 100 Mbits/sec-Bandwidth" respectively);

(ii) as a second example, one-skilled-in-relevant-art (using software-and-database) may: (a) Apply "Linear" formula from FIG. 11A's Table 1; and (b) Multiply virtualized-1X-H/W-(in-Instance) (in FIG. 11B's Table 2's row-E-and-columns-IV-to-VII) by #-of-(1X)H/W (which is "4X"-(Four) in FIG. 11B's Table 2's row-G-and-column-II) to-be virtualized-hardware-(in-CPU/Memory/Disk/Bandwidth) in FIG. 11B's Table-2's row-G-and-columns-IV-to-VII (which is/becomes "16-CPU-(core), 32-GB-memory, 2000-GB-Disk, 400 Mbits/sec-Bandwidth" respectively);

(iii) as a third example, one-skilled-in-relevant-art (using software-and-database) may: (a) Apply "Linear" formula from FIG. 11A's Table 1; and (b) Multiply virtualized-1X-H/W-(in-Instance) (in FIG. 11B's Table 2's row-E-and-columns-IV-to-VII) by #-of-(1X)-H/W (which is "20X"-(Twenty) in FIG. 11B's Table 2's row-I-and-column-II) to-be virtualized-hardware-(in-CPU/Memory/Disk/Bandwidth) in FIG. 11B's Table-2's row-I-and-columns-IV-to-VII (which is/becomes "80-CPU-(core), 160-GB-memory, 10,000-GB-Disk, 2,000 Mbits/sec-Bandwidth" respectively);

(iv) as a fourth example, one-skilled-in-relevant-art (using software-and-database) may: (a) Apply "Linear" formula from FIG. 11A's Table 1; and (b) Multiply virtualized-1X-H/W-(in-Instance) (in FIG. 11B's Table 2's row-E-and-columns-IV-to-VII) by #-of-(1X)-H/W (which is "100X" in FIG. 11B's Table 2's row-K-and-column-II) to-be virtualized-hardware-(in-CPU/Memory/Disk/Bandwidth) in FIG. 11B's Table-2's row-K-and-columns-IV-to-VII (which is/becomes "400-CPU-(core). 800-GB-memory, 50,000-GB-Disk, 10,000 Mbits/sec-Bandwidth" respectively);

(v) as a fifth example, one-skilled-in-relevant-art (using software-and-database) may: (a) Apply "Linear" formula from FIG. 11A's Table 1; and (b) Multiply virtualized-1X-H/W-(in-Instance) (in FIG. 11B's Table 2's row-E-and-columns-IV-to-VII) by #-of-(1X)-H/W (which is "4,000X" in FIG. 11B's Table 2's row-M-and-column-II) to-be virtualized-hardware-(in-CPU/Memory/Disk/Bandwidth) in FIG. 11B's Table-2's row-M-and-columns-IV-to-VII (which is/becomes "16,000-CPU-(core), 32,000-GB-memory, 2,000,000-GB-Disk, 400.000 Mbits/sec-Bandwidth" respectively).

Referring to FIG. 11C (for ("Not-Decrease"-or)-Increase-H/W), (it is obvious that) one-skilled-in-relevant-art (using software-and-database to increase #-of-(1/X)-H/W in host-computer-cloud-instance 205-C) may use Para [0146N] (and Para [0146K] and-FIG. 11B's-Tables-1-and-2) to "Increase-H/W-Level in (Not-Decrease-or)-Increase-(Virtualized)-(1X)-H/W-(in-Instance) in FIG. 11C's rows-B-to-K-and-columns-V-to-VIII for its (max-#-of-attendees and) host-computer-cloud-instance(s) (in (rows-B-to-K-and)-column-III respectively), as illustrated in following five (5) examples in Para [0146O]-(i)-to-(v), and more examples in Para [0146O]-(vi) below:

(i) as a first example, one-skilled-in-relevant-art (using software-and-database to increase #-of-(1/X)-H/W in host-computer-cloud-instance 205-C) may: (a) Apply "Linear" formula (from FIG. 11B's Table 1), and use FIG. 12A's-step-1220 (and Para [0150C] lines 5-to-9) to add #-of-(1/X)-hardware; and (b) Multiply 1X-H/W (in FIG. 11B's Table 2's row-E-and-column-II) by 1st-Level-Increase-in-#-(of-(1X)-H/W) (which is "1X"-(H/W) in FIG. C's row-B-and-column-V) to-ADD-to "(Begin)-#-of-(1X)-H/W" in FIG. 11C's row-B-and-column-III (which is "IX"-(H/W)) to-become "(Final)-#-of-(1X)-H7/W" in FIG. 11C's row-B-and-column-VII (which is "2X"-(H/W)): and (c) then (Final)-Host-Computer-Cloud-Instance is "2X-(H/W)-Instance" for (Final)-Max-#-Users of 50 (in FIG. 11C's row-B-and-columns-VI-and-VIII respectively); and (d) "2X"-(H/W) (in-CPU/Memory/Disk/Bandwidth)="8-CPU-(core), 16-GB-memory, 1,000-GB-Disk, 200 Mbits/sec-Bandwidth" (in FIG. 11B's Table-2's row-F-and-columns-IV-to-VII):

(ii) as a second example, one-skilled-in-relevant-art (using software-and-database to increase #-of-(1/X)-H/W) in host-computer-cloud-instance 205-C) may: (a) Apply "Linear" formula (from FIG. 11B's Table 1), and use FIG. 12A's-step-1220 (and Para [0150C] lines 5-to-9) to add #-of-(1/X)-hardware; and (b) Multiply 1X-H/W (in FIG. 11B's Table 2's row-E-and-column-II) by 3rd-Level-Increase-in-#-(of-(1X)-H/W) (which is "4X"-(H/W) in FIG. 11C's row-D-and-column-V) to-ADD-to "(Begin)-#-of-(1X)-H/W" in FIG. 11C's row-D-and-column-III (which is "4X"-(H/W)) to-become "(Final-#-of-(1X)-H/W" in FIG. 11C's row-D-and-column-VI (which is "8X"-(H/W)); and (c) then (Final)-Host-Computer-Cloud-Instance is "8X-(H/W)-Instance" for (Final)-Max-#-Users of 200 (in FIG. 11C's row-D-and-columns-V-and-VIII respectively); and (d) "8X"-(H/W) (in-CPU/Memory/Disk/Bandwidth)="32-CPU-(core), 64-GB-memory, 4,000-GB-Disk, 800 Mbits/sec-Bandwidth" (in FIG. 11B's Table-2's row-H-and-columns-IV-to-VII):

(iii) as a third example, one-skilled-in-relevant-art (using software-and-database to increase #-of-(1/X)-H/W) in host-computer-cloud-instance 205-C) may: (a) Apply "Linear" formula (from FIG. 11B's Table 1), and use FIG. 12A's-step-1220 (and Para [0150C] lines 5-to-9) to add #-of-(1/X)-hardware; and (b) Multiply 1X-HLW (in FIG. 11B's Table 2's row-E-and-column-II) by 5th-Level-Increase-in-#-(of-(1X)-H/W) (which is "20X"-(H/W) in FIG. 11C's row-F-and-column-V) to-ADD-to "(Begin)-#-of-(1X)-H/W" in FIG. 11C's row-F-and-column-III (which is "20X"-(H/W)) to-become "(Final)-#-of-(1X)-H/W" in FIG. 11C's row-F-and-column-VII (which is "40X"-(H/W)); and (c) then (Final)-Host-Computer-Cloud-Instance is "40X-(H/W)-Instance" for (Final)-Max-#-Users of 1,000 (in FIG. 11C's row-F-and-columns-VI-and-VIII respectively): and (d) "40X"-(H/W) (in-CPU/Memory/Disk/Bandwidth)="160-CPU-(core), 320-GB-memory, 20,000-GB-Disk, 4,000 Mbits/sec-Bandwidth" (in FIG. 11B's Table-2's row-J-and-columns-IV-to-VII);

(iv) as a fourth example, one-skilled-in-relevant-art (using software-and-database to increase #-of-(1/X)-H/W) in host-computer-cloud-instance 205-C) may: (a) Apply "Linear" formula (from FIG. 11B's Table 1), and use FIG. 12A's-step-1220 (and Para [0150C] lines 5-to-9) to add #-of-(1/X)-hardware: and (b) Multiply 1X-H/W (in FIG. 11B's Table 2's row-E-and-column-11) by (n–2)th-Level-Increase-in-#-(of-(1X)-H/W) (which is "300X"-(H/W) in FIG. 11C's row-I-and-column-V) to-ADD-to "(Begin)-#-of-(1X)-H/W" in FIG. 11C's row-I-and-column-Ill (which is "100X"-(H/W)) to-become "(Final)-#-of-(1X)-H/W" in FIG. 11C's row-I-and-column-VII (which is "100X"-(H/W)); and (c) then (Final)-Host-Computer-Cloud-Instance is "400X-(H/W)-Instance" for (Final)-Max-#-Users of 10,000 (in FIG. 11C's row-I-and-columns-VI-and-VIII respectively): and (d) "400X"-(H/W) (in-CPU/Memory/Disk/Bandwidth)="1,600-CPU-(core), 3,200-GB-memory, 200,000-GB-Disk, 40,000 Mbits/sec-Bandwidth" (in FIG. 11B's Table-2's row-L-and-columns-IV-to-VII);

(v) as a fifth example, one-skilled-in-relevant-art (using software-and-database to increase #-of-(1/X)-H/W) in host-computer-cloud-instance 205-C) may: (a) Apply "Linear" formula (from FIG. 11B's Table 1), and use FIG. 12A's-step-1220 (and Para [0150C] lines 5-to-9) to add #-of-(1/X)-hardware: and (b) Multiply 1X-H/W (in FIG. 11B's Table 2's row-E-and-column-11) by (n)th-Level-Increase-in-#-(of-(1X)-H/W) (which is "36,000X"-(H/W) in FIG. 11C's row-K-and-column-V) to-ADD-to "(Begin)-#-of-(1X)-H/W" in FIG. 11C's row-K-and-column-Ill (which is "4,000X"-(H/W)) to-become "(Final)-#-of-(1X)-H/W" in FIG. 11C's row-K-and-column-VII (which is "40000X"-(H/W)); and (c) then (Final)-Host-Computer-Cloud-Instance is "40000X-(H/W)-Instance" for (Final)-Max-#-Users of 1,000,000 (in FIG. 11C's row-K-and-columns-VI-and-VIII respectively); and (d) "40,000X"-(H/W) (in-CPU/Memory/Disk/Bandwidth)="16,000-CPU-(core), 32,000-GB-memory, 2,000,000-GB-Disk, 400,000 Mbits/sec-Bandwidth" (in FIG. 11B's Table-2's row-N-and-columns-IV-to-VII).

(vi) as more example(s), one-skilled-in-relevant-art may use not-less-than-one-(consecutive)-rows of 1st-to-(n)th-"Increase-H/W-Level"-(rows-B-to-K in FIG. 11C) (and as-examples this Para [0146O]-(i)-to-(v)) to increase #-of-(1/X)-H/W in (H/W)-instance (in FIG. 11C's column-IV):

- e.g. use 2nd-and-3rd-"Increase-H/W-Level"-(two-consecutive-rows-C-and-D) to increase #-of-(/X)-H/W in cloud-instance from 2X-H/W (in row-C-and-column-III) to 8X-H/W (in row-D-and-column-VII);
- e.g. use 3rd-and-4th-and-5th-and-6th-"Increase-HL/W-Level"-(four-consecutive-rows-D-to-G) to increase

#-of-(1/X)-H/W in cloud-instance from 4X-H/W (in row-D-and-column-II) to 100X-H/W (in row-G-and-column-VII);

e.g. use (n−2)th-and-(n−1)th-and-(n)th-"Increase-H/W-Level"-(three-consecutive-rows-I-to-K) to increase #-of-(1/X)-H/W in cloud-instance from 100X-H/W (in row-I-and-column-III) to 40,000X-H/W (in row-K-and-column-VII);

etc.

Referring to FIG. 11D (for ("Not-Decrease"-or)-Keep-SAME-H/W)), please note that "(Not-Decrease-or)-keep-SAME/Not-Change"-virtualized-(1X)-hardware (illustrated in FIG. 11D):

Keep-SAME-(1X)-H/W (in "Not-Decrease"-virtualized-hardware) (illustrated in FIG. 11D) has: (a). same-#-of-(1X)-H/W (in columns-III-and-V-and-VII) in Begin-and-Final host-computer-cloud-instance (in columns-IV-and-VI) respectively; and (b) SAME-("#-of-(H/W)", e.g. 1X-(H/W), 2X-(H/W), . . . 40000X-(H/W), in)-INSTANCE in Begin-and-Final host-computer-cloud-instance (in columns-IV-and-VI) respectively.

Figure 12C:
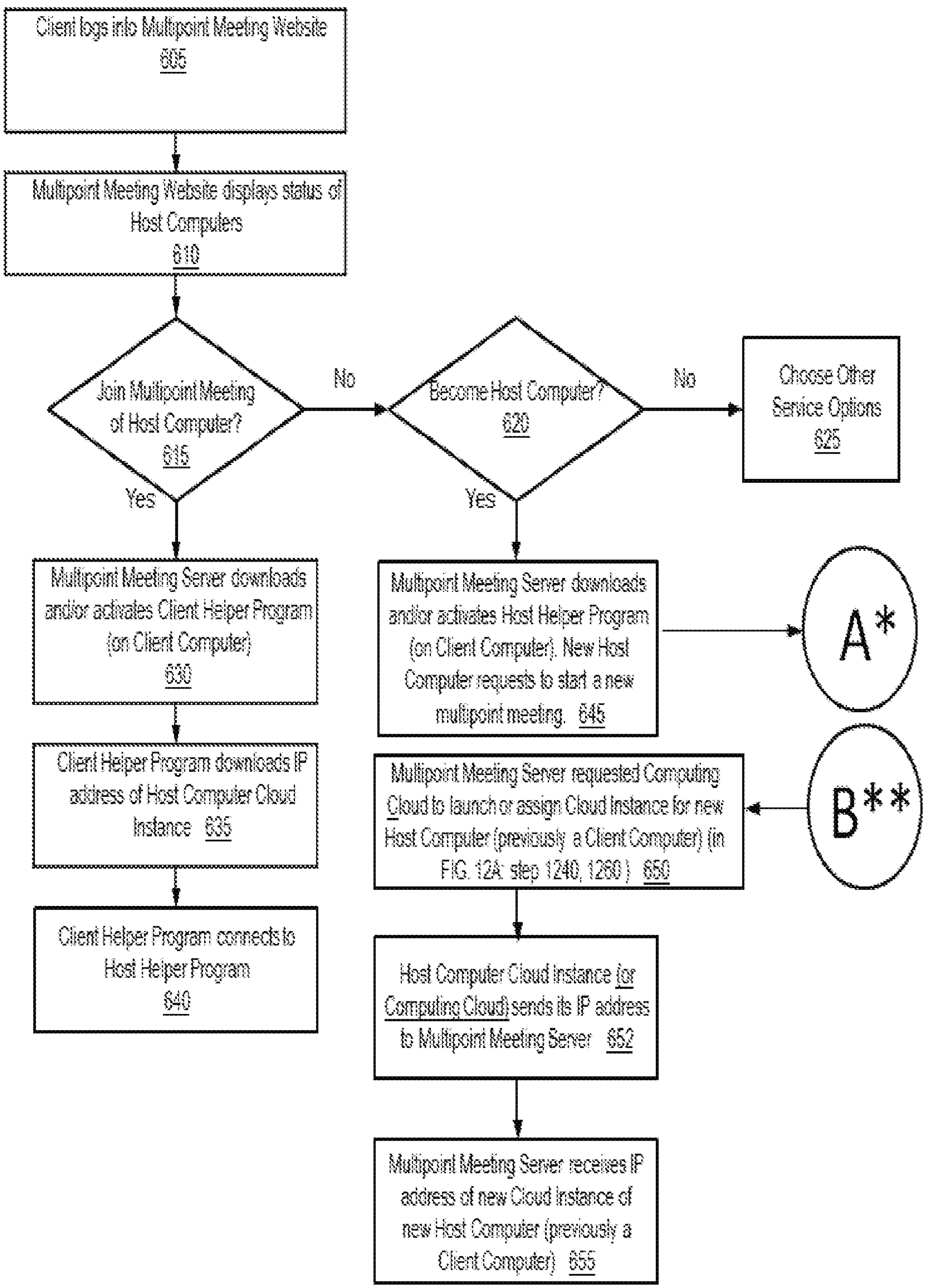
Figure 12D:
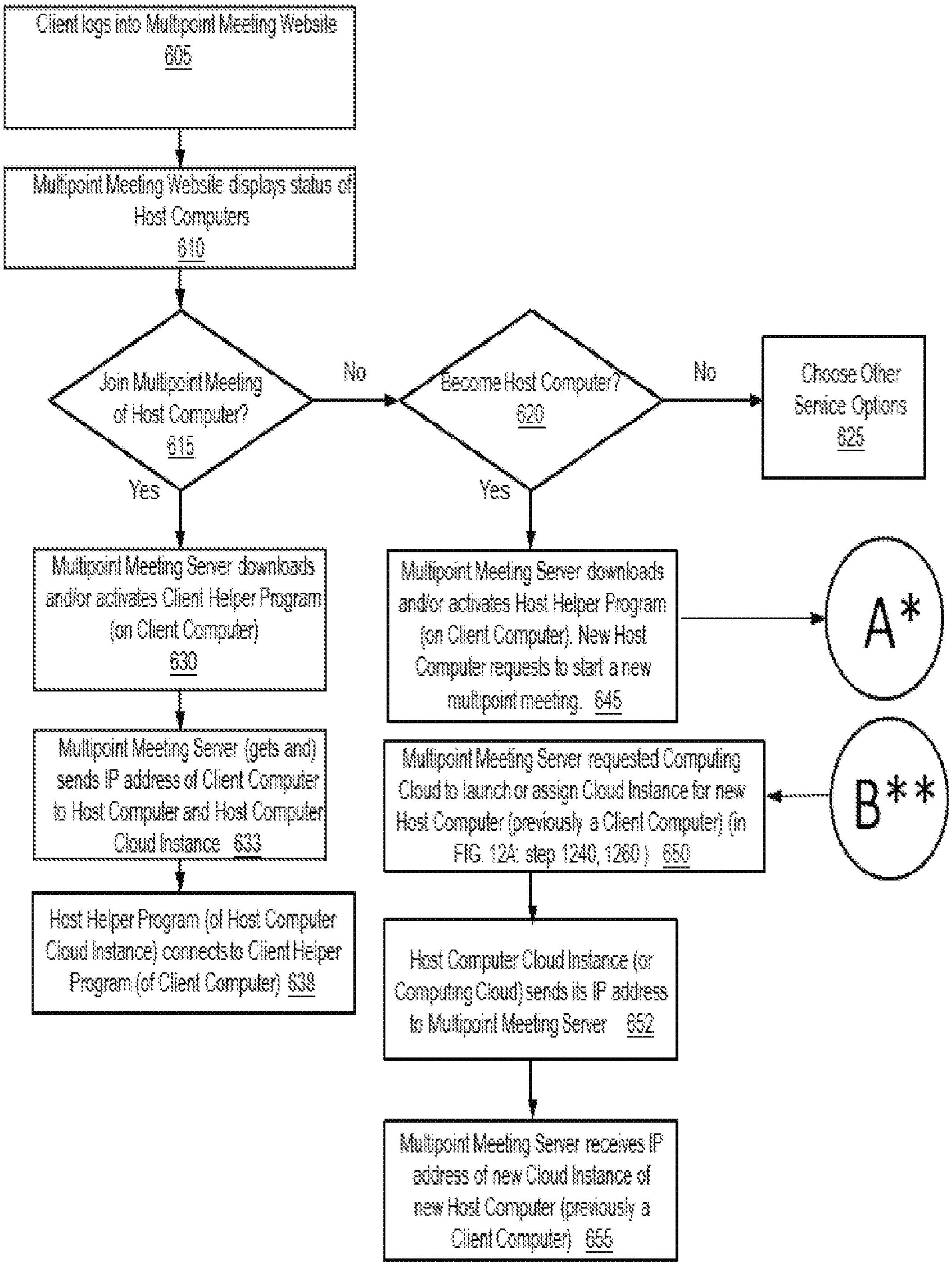
Figure 12E:
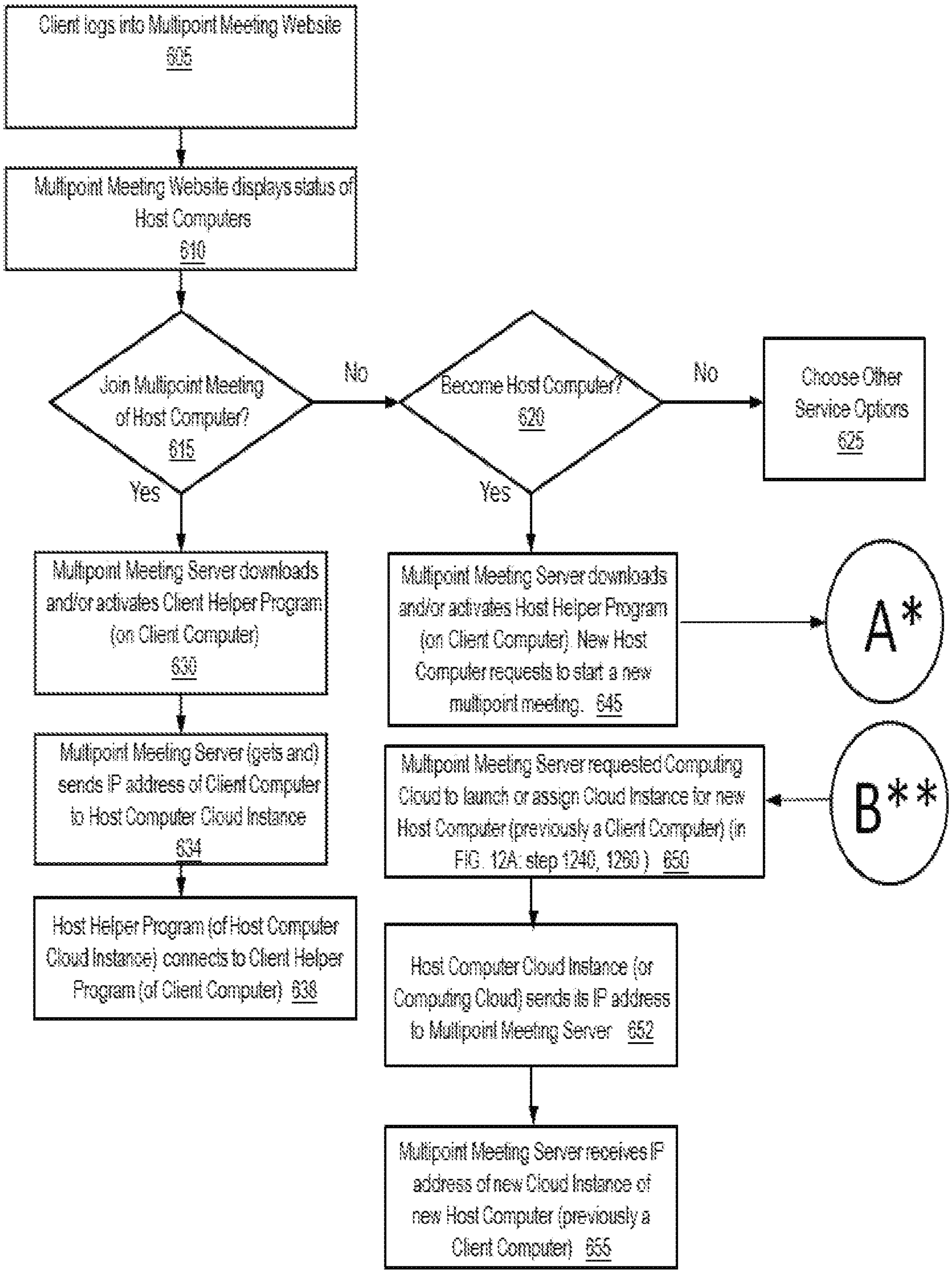
Figure 12F:
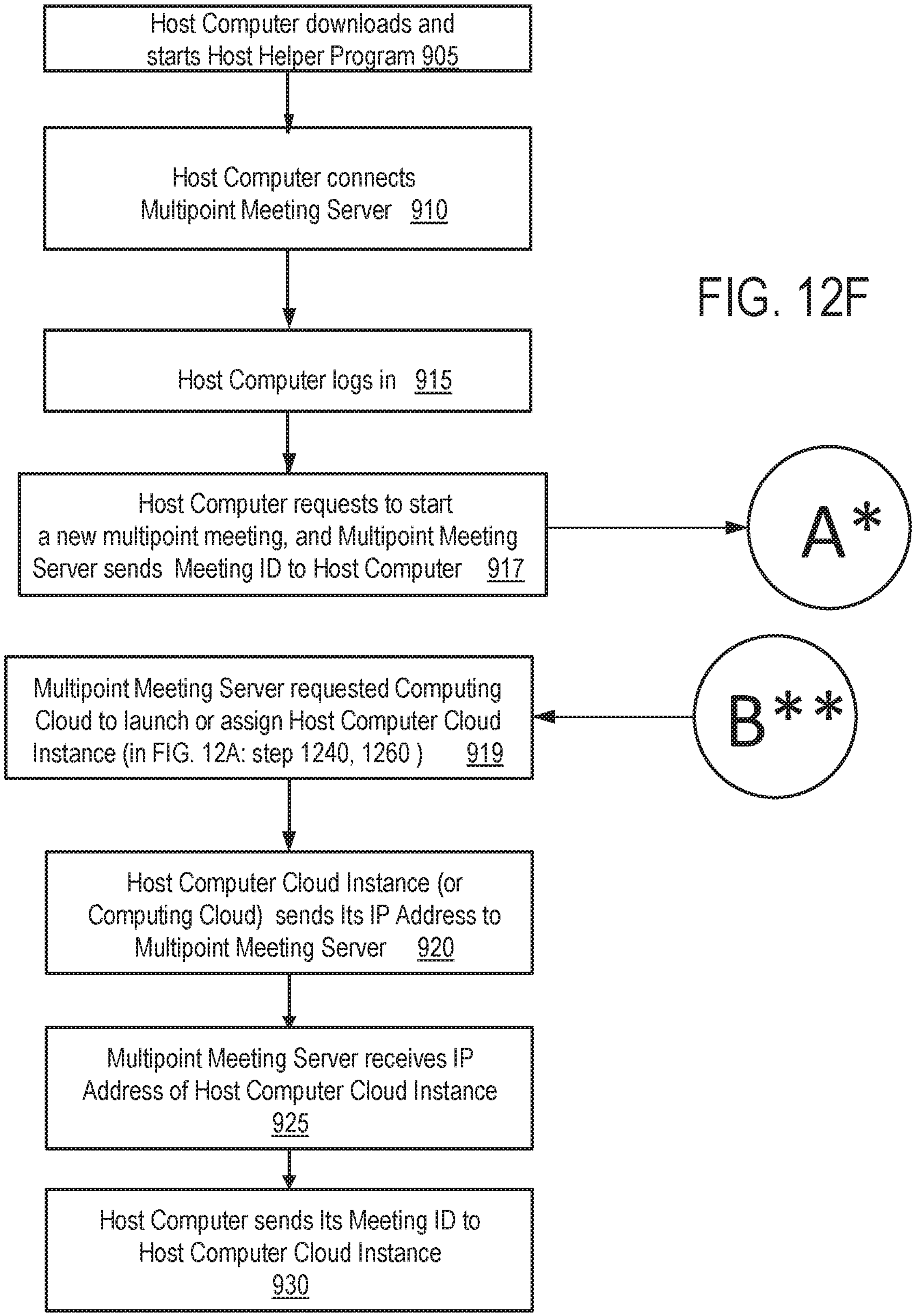
Figure 12G:
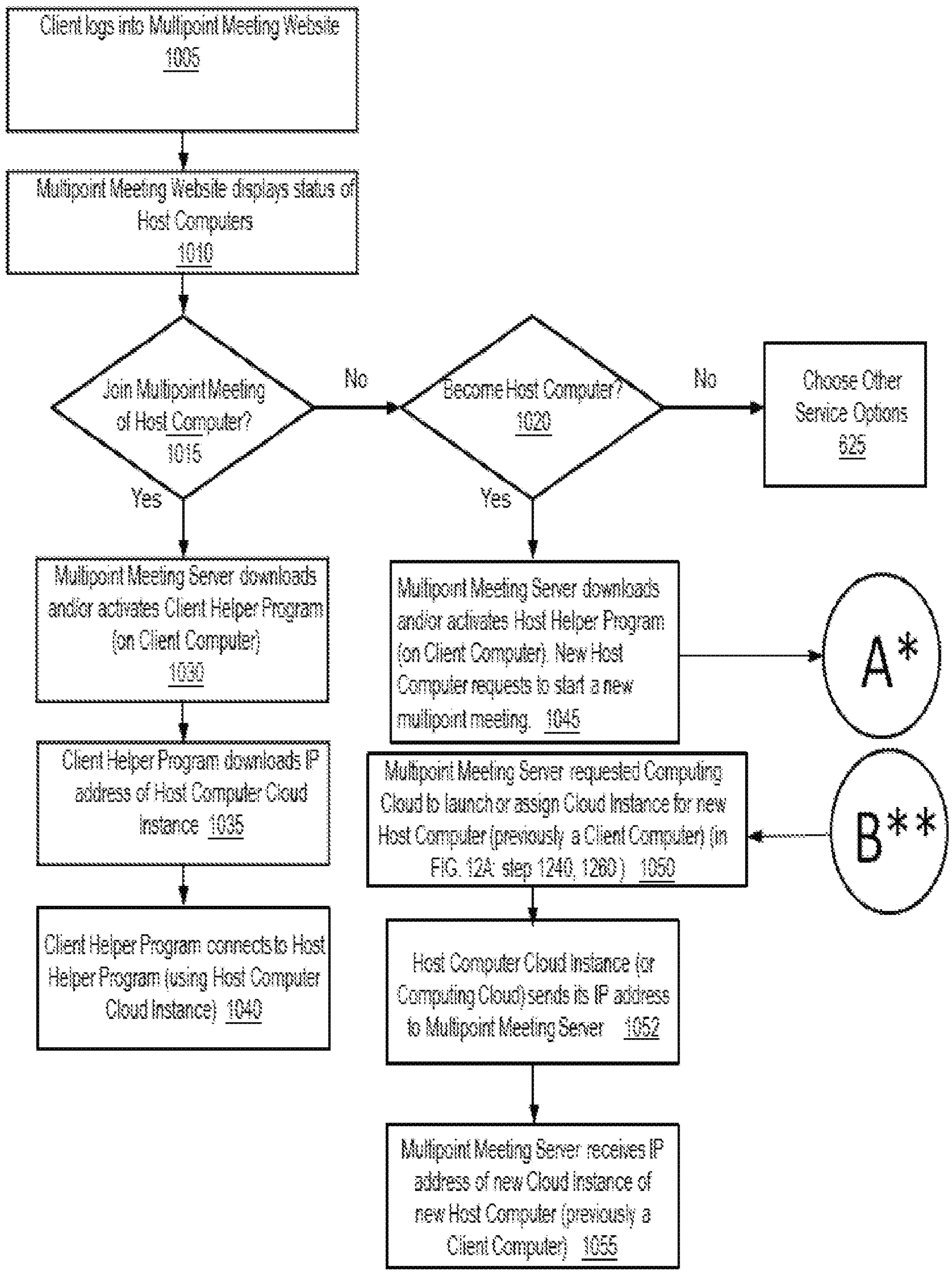
Figure 12H:
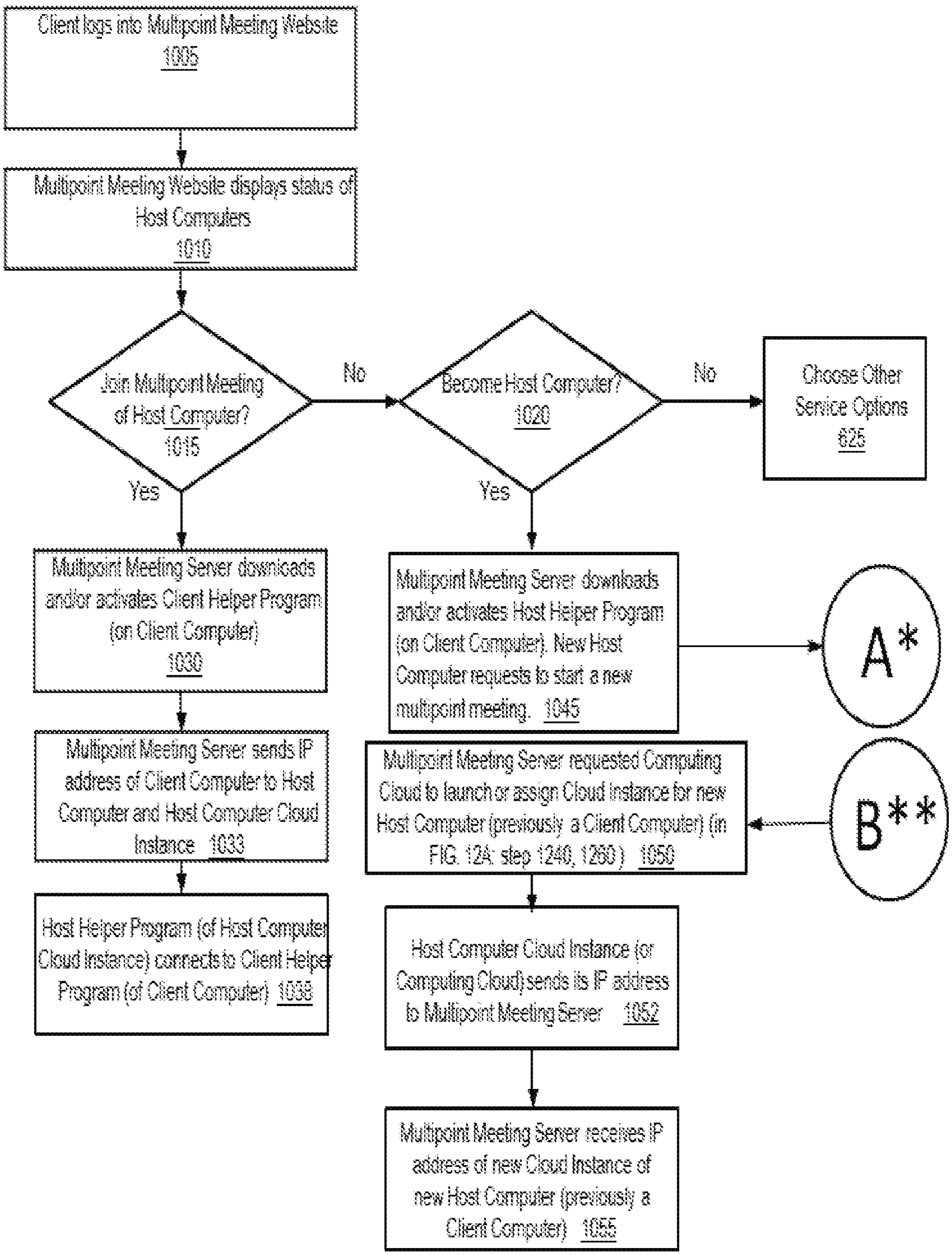
Figure 12I:
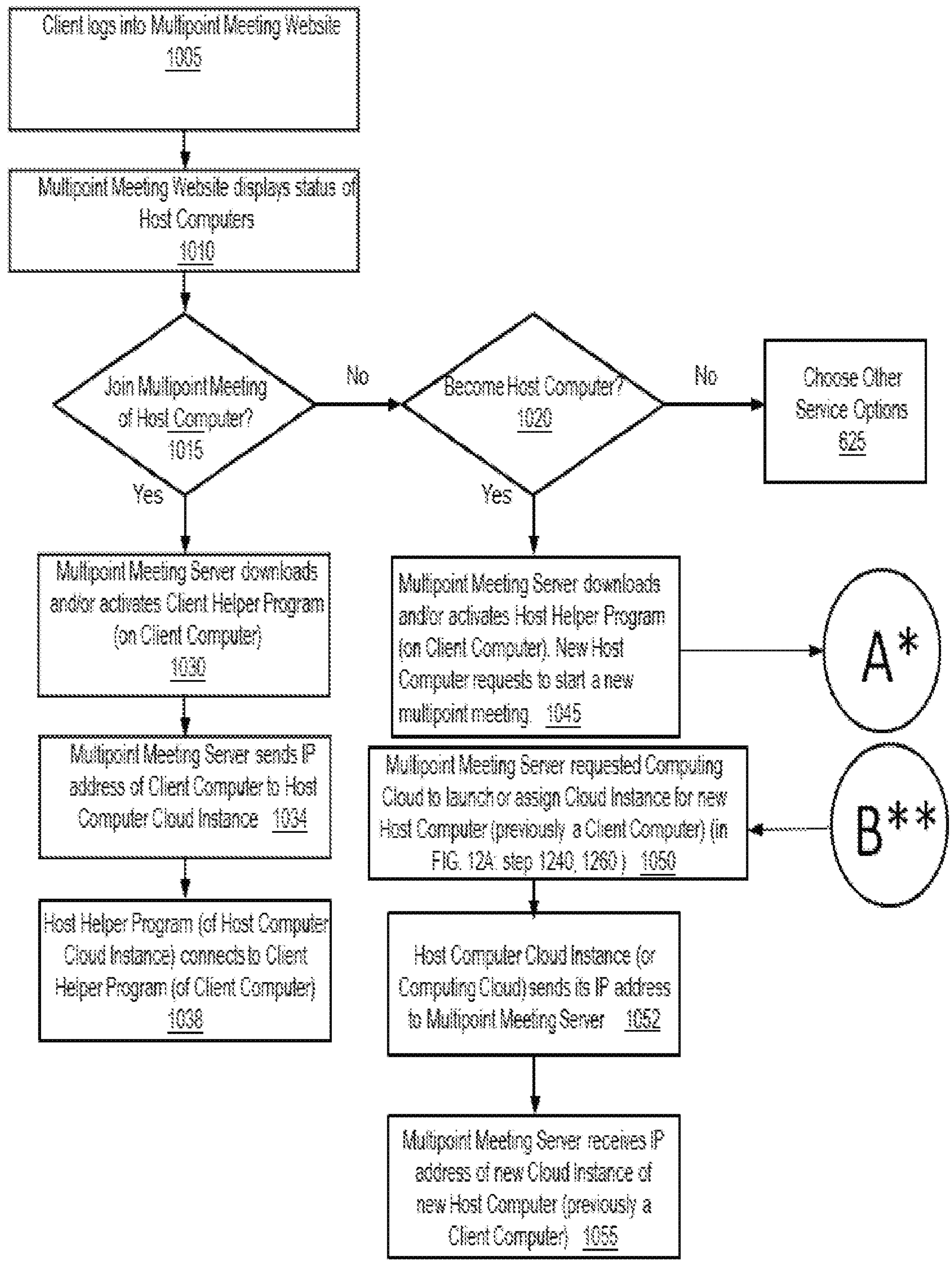
Figure 20A:
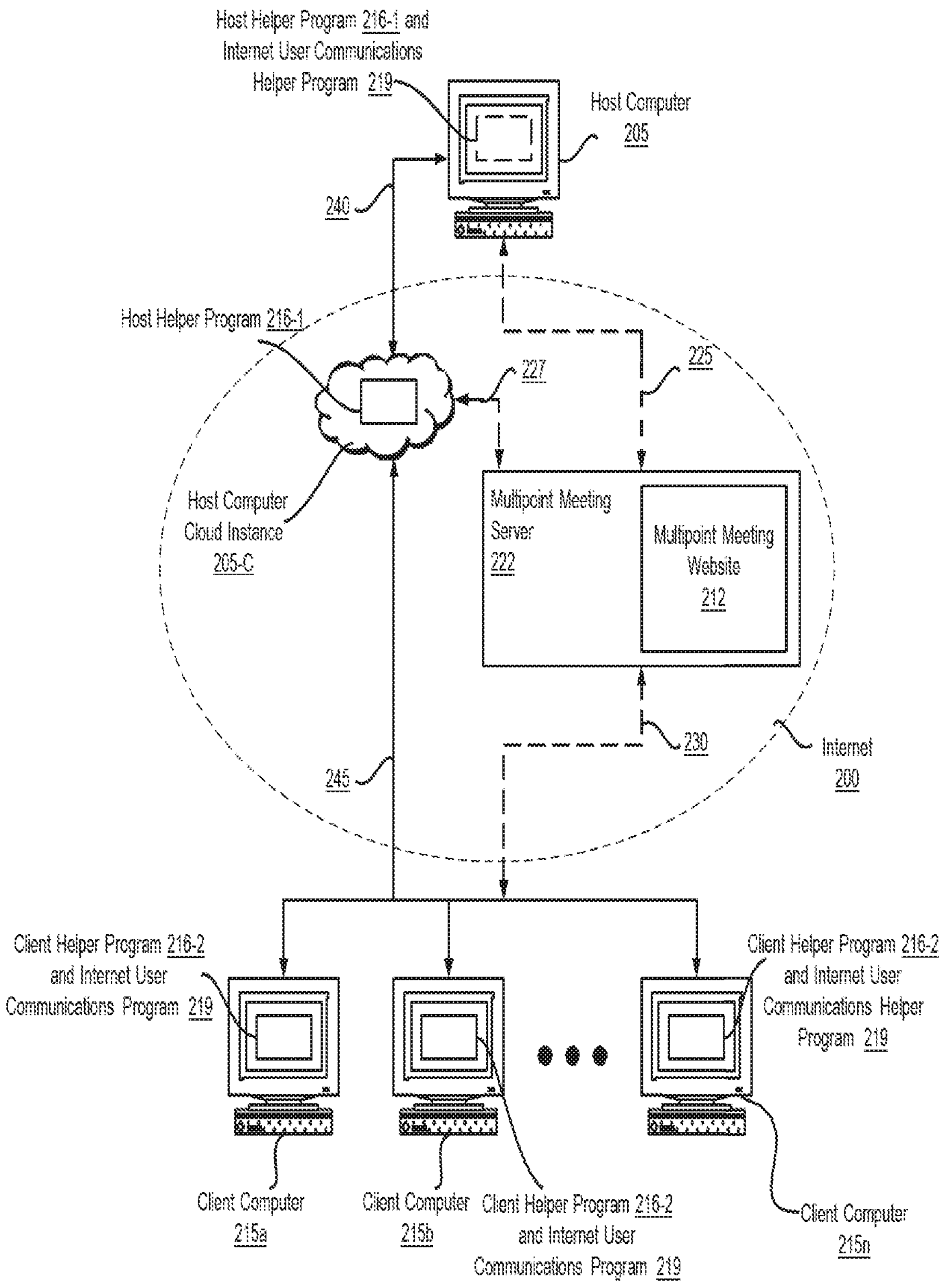
FIGS. 20A, 20B are a block diagram illustrating providing direct network connections using cloud instance for multipoint meeting service over a computer network in accordance with another embodiment of the present invention.
Figure 20B:
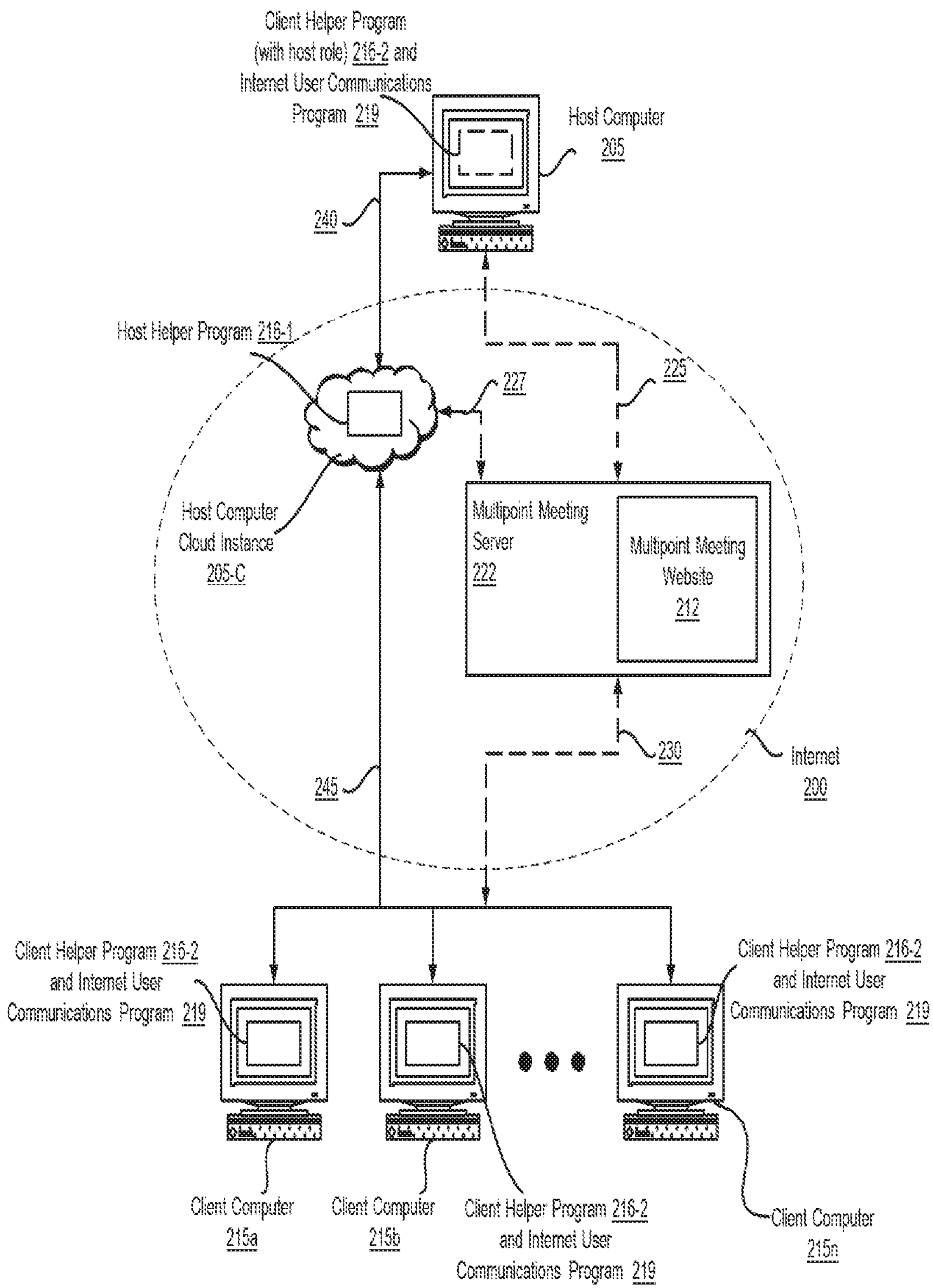
Figure 20C:
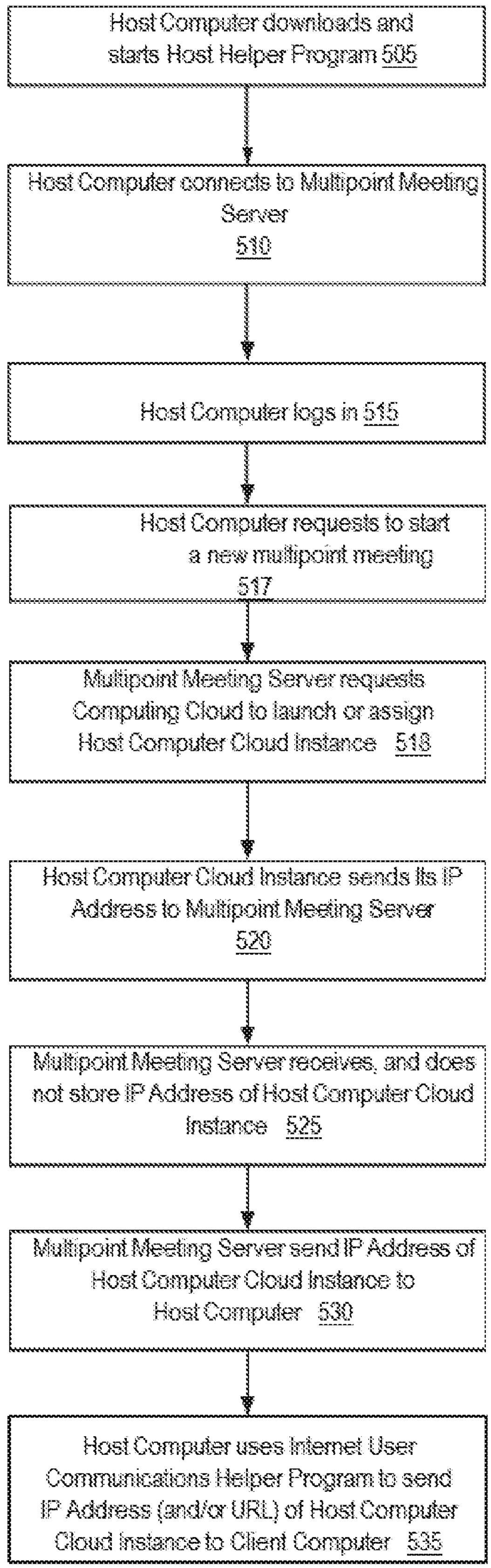
FIGS. 20C, 20D are flowcharts illustrating providing direct network connections using cloud instance for multipoint meeting service over a computer network in accordance with another embodiment of the present invention.

Keep-SAME-(1X)-H/W (in "Not-Decrease"-virtualized-hardware) (illustrated in FIG. 11D) are-(or-may-be-regarded-as) default-(first-step)-Keep-SAME-H/W, when computing cloud 198 launches cloud instances, e.g. in step 518 in FIGS. 5 and 20C, and step 919 in FIGS. 9 and 12F, and in Para [0150E]'s lines-2-to-6: "Multipoint meeting server 222 (FIG. 2A) requests computing cloud 198 to launch-or-assign host computer cloud instance 205-C (FIG. 2A) implementing-(virtualizing) the requested (and subscribed in step 1220 of FIG. 12A) ("Linear" Formula) number of single-(virtualized)-hardware on software". FIG. 11D illustrates ("Not-Decrease"-or)-Keep-SAME-virtualized-(1X)-hardware.

"Not-Increase"-Virtualized-Hardware (in Cloud Instance)

Referring to FIG. 11E (for ("Not-Increase"-or)-Decrease-HLW), one-skilled-in-relevant-art (using software-and-database to decrease #-of-(1/X)-H/W in host-computer-cloud-instance 205-C) may use-(leverage-"Increase-H/W"-disclosure-for-use-in-"Decrease-H/W"-here-in-Para-[0146Q])-and-leverage-from Para [0146N] (and Para [0146K] and-FIG. 11B's-Tables-1-and-2) to-(leverage-and) "Decrease-H/W-Level in (Not-Increase-or)-Decrease-(Virtualized)-(1X)-H/W-(in-Instance) in FIG. 11E's rows-B-to-K-and-columns-V-to-VIII for its (max-#-of-attendees and) host-computer-cloud-instance(s) (in (rows-B-to-K-and)-column-III respectively), as illustrated in following five (5) examples in [0146Q]-(i)-to-(v), and more examples in [0146Q]-(vi) below:

(i) as a first example, one-skilled-in-relevant-art (leveraging-(and-modifying/editing/changing) one's-software-and-database-(e.g.-(developed-by-one-(not-shown))-from-Para-[1460]-(i) above) to decrease #-of-(1/X)-H/W) in host-computer-cloud-instance 205-C) may: (a) Apply "Linear" formula (from FIG. 11B's Table 1), and leverage-(disclosure-of) FIG. 12A's-step-1220 (and Para [0150C] lines 5-to-9) to change-disclosure-of/from-"add"-to-"DECREASE" #-of-(1/X)-hardware (and to change "maximum-number-of-attendees is exceeded" to (minimum)-number-of-attendees is BELOW-FLOOR-number"); and (b) Multiply 1X-H/W (in FIG. 11B's Table 2's row-E-and-column-II) by (n)th-Level-Decrease-in-#-(of-(1X)-H/W) (which is "36,000X-(H/W) in FIG. 11E's row-B-and-column-V) to-DECREASE "(Begin)-#-of-(1X)-H/W" in FIG. 11E's row-B-and-column-III (which is "40,000X"-(H/W)) to-become "(Final)-#-of-(1X)-H/W" in FIG. 11E's row-B-and-column-VII (which is "4,000X"-(/W)); and (c) then (Final)-Host-Computer-Cloud-Instance is "4000X-(H/W)-Instance" for (Final)-Max-#-Users of 100,000 (in FIG. 11E's row-B-and-columns-VI-and-VIII respectively); and (d) "4,000X"-(H/W) (in-CPU/Memory-/Disk/Bandwidth)="16,000-CPU-(core), 32,000-GB-memory, 2,000,000-GB-Disk, 400,000 Mbits/sec-Bandwidth" (in FIG. 11B's Table-2's row-M-and-columns-IV-to-VII respectively).

(ii) as a second example, one-skilled-in-relevant-art (leveraging-(and-modifying/editing/changing) one's-software-and-database-(e.g.-(developed-by-one-(not-shown))-from-Para-[0146O]-(ii) above) to decrease #-of-(1/X)-H/W) in host-computer-cloud-instance 205-C) may: (a) Apply "Linear" formula (from FIG. 11B's Table 1), and leverage-(disclosure-of) FIG. 12A's-step-1220 (and Para [0150C] lines 5-to-9) to change-disclosure-of/from-"add"-to-"DECREASE" #-of-(1/X)-hardware (and to change "maximum-number-of-attendees is exceeded" to "(minimum)-number-of-attendees is BELOW-FLOOR-number"); and (b) Multiply IX-H/W (in FIG. 11B's Table 2's row-E-and-column-II) by (n−2)th-Level-Decrease-in-#-(of-(1X)-H/W) (which is "300X"-(H/W) in FIG. 1E's row-D-and-column-V) to-DECREASE "(Begin)-#-of-(1X)-H/W" in FIG. 11E's row-D-and-column-III (which is "40X"-(H/W)) to-become "(Final)-#-of-(1X)-H/W" in FIG. 11E's row-D-and-column-VII (which is "10X"-(H/W)); and (c) then (Final)-Host-Computer-Cloud-instance is "100X-(H/W)-Instance" for (Final)-Max-#-Users of 2,500 (in FIG. 11E's row-D-and-columns-VI-and-VIII respectively); and (d) "100X"-(H/W) (in-CPU/Memory/Disk/Bandwidth)="400-CPU-(core), 800-GB-memory, 50,000-GB-Disk, 10,000 Mbits/sec-Bandwidth" (in FIG. 11B's Table-2's row-K-and-columns-IV-to-VII respectively);

(iii) as a third example, one-skilled-in-relevant-art (leveraging-(and-modifying/editing/changing) one's-software-and-database-(e.g.-(developed-by-one-(not-shown))-from-Para-[0146O]-(iii) above) to decrease #-of-(1/X)-H/W) in host-computer-cloud-instance 205-C) may: (a) Apply "Linear" formula (from FIG. 11B's Table 1), and leverage-(disclosure-of) FIG. 12A's-step-1220 (and Para [0150C] lines 5-to-9) to change-disclosure-of/from-"add"-to-"DECREASE" #-of-(/X)-hardware (and to change "maximum-number-of-attendees is exceeded" to "(minimum)-number-of-attendees is BELOW-FLOOR-number"); and (b) Multiply 1X-H/W (in FIG. 11B's Table 2's row-E-and-column-II) by (5th-Level-Decrease-in-#-(of-(1X)-H/W) (which is "20X"-(H/W) in FIG. 1E's row-G-and-column-V) to-DECREASE "(Begin)-#-of-(1X)-H/W" in FIG. 11E's row-G-and-column-III (which is "40X"-(H/W)) to-become "(Final)-#-of-(1X)-H/W" in FIG. 11E's row-G-and-column-VII (which is "20X"-(H/W)); and (c) then (Final)-Host-Computer-Cloud-Instance is "20X-(H/W)-Instance" for (Final)-Max-#-Users of 500 (in FIG. 11E's row-G-and-columns-VI-and-VIII respectively); and (d) "20X"-(H/W) (in-CPU/Memory/Disk/Bandwidth)="80-CPU-(core), 160-GB-memory, 10,000-GB-Disk, 2,000 Mbits/sec-Bandwidth" (in FIG. 11B's Table-2's row--and-columns-IV-to-VII respectively):

(iv) as a fourth example, one-skilled-in-relevant-art (leveraging-(and-modifying/editing/changing) one's-software-and-database-(e.g.-(developed-by-one-(not-shown))-from-Para-[0146O]-(iv) above) to decrease #-of-(1/X)-H/W) in host-computer-cloud-instance 205-C) may: (a) Apply "Linear" formula (from FIG. 11B's Table 1), and leverage-(disclosure-of) FIG. 12A's-step-1220 (and Para [0150C] lines 5-to-9) to change-disclosure-of/from-"add"-to-"DECREASE" #-of-(1/X)-hardware (and to change "maximum-number-of-attendees is exceeded" to "(minimum)-numberof-attendees is BELOW-FLOOR-number"); and (b) Multiply 1X-H/W (in FIG. 11B's Table 2's row-E-and-column-II) by (3rd-Level-Decrease-in-#-(of-(1X)-H/W) (which is "4X"-(H/W) in FIG. 1E's row-I-and-column-V) to-DECREASE "(Begin)-#-of-(1X)-H/W" in FIG. 11E's row--and-column-Ill (which is "8X"-(H/W)) to-become "(Final)-#-of-(1X)-H/W" in FIG. 1E's row--and-column-VII (which is "4X"-(H/W)); and (c) then (Final)-Host-Computer-Cloud-Instance is "4X-(H/W)-Instance" for (Final)-Max-#-Users of 100 (in FIG. 11E's row-l-and-columns-VI-and-VIII respectively); and (d) "4X"-(H/W) (in-CPU/Memory/Disk/Bandwidth)="16-CPU-(core), 32-GB-memory, 2,000-GB-Disk, 400 Mbits/sec-Bandwidth" (in FIG. 11B's Table-2s row-G-and-columns-IV-to-VII respectively);

(v) as a fifth example, one-skilled-in-relevant-art (leveraging-(and-modifying/editing/changing) one's-software-and-database-(e.g.-(developed-by-one-(not-shown))-from-Para-[0146O]-(v) above) to decrease #-of-(1/X)-H/W) in host-computer-cloud-instance 205-C) may: (a) Apply "Linear" formula (from FIG. 11B's Table 1), and leverage-(disclosure-of) FIG. 12A's-step-1220 (and Para [0150C] lines 5-to-9) to change-disclosure-of/from-"add"-to-"DECREASE" #-of-(1/X)-hardware (and to change "maximum-number-of-attendees is exceeded" to (minimum)-number-of-attendees is BELOW-FLOOR-number"); and (b) Multiply 1X-H/W (in FIG. 11B's Table 2's row-E-and-column-II) by (st-Level-Decrease-in-#-(of-(1X)-H/W) (which is "1X"-(H/W) in FIG. 11E's row-K-and-column-V) to-DECREASE "(Begin)-#-of-(1X)-H/W" in FIG. 11E's row-K-and-column-Ill (which is "2X"-(H/W)) to-become "(Final)-#-of-(1X)-H/W" in FIG. 1E's row-K-and-column-VII (which is "IX"-(H/W)); and (c) then (Final)-Host-Computer-Cloud-Instance is "1X-(H/W)-Instance" for (Final)-Max-#-Users of 25 (in FIG. 11E's row-K-and-columns-VI-and-VIII respectively); and (d) "1X"-(H/W) (in-CPU/Memory/Disk/Bandwidth)="4-CPU-(core), 8-GB-memory, 500-GB-Disk, 100 Mbits/sec-Bandwidth" (in FIG. 11B's Table-2s row-E-and-columns-IV-to-VII respectively).

(vi) as more example(s), one-skilled-in-relevant-art may use not-less-than-one-(consecutive)-rows of (n)th-to-1st-"Decrease-H/W-Level"-(rows-B-to-K in FIG. 11E) (and as-examples this Para [0146Q]-(i)-to-(v)) to decrease #-of-(1/X)-H/W in (H/W)-instance(s) (in FIG. 11E's column-IV):

- e.g. use (n)th-and-(n−1)th-and-(n−2)th-"Decrease-H/W-Level"-(three-consecutive-rows-B-to-D) to decrease #-of-(1/X)-H/W in cloud-instance from 40,000X-H/W (in row-B-and-column-III) to 100X-H/W (in row-D-and-column-VII);
- e.g. use 6th-and-5th-and-4th-and-3rd-"Decrease-H/W-Level"-(four-consecutive-rows-F-to-I) to decrease #-of-(1/X)-H/W in cloud-instance from 100X-H/W (in row-F-and-column-III) to 4X-H/W (in row-I-and-column-VII);
- e.g. use 2nd-and-st-"Decrease-H/W-Level"-(two-consecutive-rows-J-and-K) to decrease #-of-(1/X)-H/W in cloud-instance from 4X-H/W (in row-J-and-column-III) to 1X-H/W (in row-K-and-column-VII);

etc.

Referring to FIG. 11F (for ("Not-Increase"-or)-Keep-SAME-H/W)), please note that "(Not-Increase-or)-keep-SAME/Not-Change"-virtualized-(1X)-hardware (illustrated in FIG. 11F):

Keep-SAME-(1X)-H/W (in "Not-Increase"-virtualized-hardware) (illustrated in FIG. 11F) are-(or-may-also-be-regarded-as) default-(first-step)-Keep-SAME-HL/W, when computing cloud 198 launches cloud instances, e.g. in step 518 in FIGS. 5 and 20C, and step 919 in FIGS. 9 and 12F, and in Para [0150E]'s lines-2-to-6: "Multipoint meeting server 222 (FIG. 2A) requests computing cloud 198 to launch-or-assign host computer cloud instance 205-C (FIG. 2A) implementing-(virtualizing) the requested (and subscribed in step 1220 of FIG. 12A) ("Linear" Formula) number of single-(virtualized)-hardware on software". FIG. 11F illustrates ("Not-Increase"-or)-Keep-SAME-virtualized-(1X)-hardware.

Please note again that as illustrated in Para [0146Q]-(i)-to-(v) and [0146R], for one-skilled-in-relevant-art (using software-and-database), "Not-Increase"-virtualized-(1X)-hardware in cloud-instance supported-by-"non-new"-("old")-matters-in Para [0146C]-to-[0146K] above means-(and-its-implementation-may-use):

(a) "(Not-Increase-or)-keep-SAME/Not-Change"-virtualized-(1X)-hardware (illustrated in FIG. 11F): Keep-SAME-H/W (in "Not-Increase"-virtualized-hardware) are default-(first-step)-Keep-SAME-H/W, when computing cloud 198 launches cloud instances, e.g. in step 518 in FIGS. 5 and 20C, and step 919 in FIGS. 9 and 12F, and in Para [0150E]'s lines-2-to-6: "Multipoint meeting server 222 (FIG. 2A) requests computing cloud 198 to launch-or-assign host computer cloud instance 205-C (FIG. 2A) implementing (virtualizing) the requested (and subscribed in step 1220) ("Linear" Formula) number of single-(virtualized)-hardware on software". FIG. 11F illustrates ("Not-Increase"-or)-Keep-SAME-virtualized-hardware; and/or (b) "(Not-Increase-or)-Decrease"-virtualized-(1X)-hardware (illustrated in FIG. 11E): After default-(first-step-Keep-SAME-H/W)-launch above Para [0146S]-(a), later as optional-2nd-step (not shown) "computing cloud 198 may decrease (using "Linear" Formula) single-(virtualized)-hardware in host computer cloud instance 205-C" (in Para [0150E]'s lines-6-to-9), e.g. as optional-2nd-step (not shown) in step 518 in FIGS. 5 and 20C, and step 919 in FIGS. 9 and 12F, and as illustrated in FIG. 11C to "(Not-Increase)-Decrease"-virtualized-hardware, as illustrated in FIG. 11E to "(Not-Increase)-decrease"-virtualized-(1X)-hardware.

Please note that "Not-Increase"-(virtualize-hardware) above also means-"excluding-increase"-(and-does-NOT-increase)-(virtualize-hardware).

Please note again that both Para [0146P] and [0146R] (and FIGS. 11D-(for-("Not-Decrease"-or)-Keep-SAME-H/W) and 11F-(for-("Not-Increase"-or)-Keep-SAME-H/W) respectively) describe-and-illustrate default-(first-step(s)-Keep-SAME-H/W, when computing cloud 198 launches cloud instances, e.g. in step 518 in FIGS. 5 and 20C, and step 919 in FIGS. 9 and 12F, and in Para [0150E]'s lines-2-to-6: "Multipoint meeting server 222 (FIG. 2A) requests computing cloud 198 to launch-or-assign host computer cloud instance 205-C (FIG. 2A) implementing-(virtualizing) the requested (and subscribed in step 1220 of FIG. 12A) ("Linear" Formula) number of single-(virtualized)-hardware on software".

(Now referring to FIG. 11A,) FIG. 11A shows tables of number of (virtualized)-hardware (implemented in host computer cloud instance) for maximum attendees from 25 to 1,000,000, if host helper program is BigBlueButton multipoint meeting software. FIG. 11A allows the multipoint meeting server 222 (and/or computing cloud 198 in FIG. 26C) dynamically or via prior-planning to have the needed bandwidth and computing resources for the host computer cloud instance 205-C, when varying numbers (from one to 1,000,000) of the client computers 215 are joining the multipoint meeting hosted by the host computer 205, as explained below.

It is noted that in scaling-up to support 25+ client computers 215 (to join the multipoint meeting hosted by the host computer 205, in addition to number of hardware, needed bandwidth and other computing resources (not shown)), the software (e.g. BigBlueButton) must support (and should be tested, if possible, to support) the higher number of 25+ client computers.

If the host helper program 216-1 is BigBlueButton 0.9.0-Beta, for maximum 25 attendees, the recommended single hardware (1X) is:

4 GB of memory (8 GB is better) with swap enabled
Quad-core 2.6 GHZ CPU (or faster)
500 GB of free disk space (or more) for recordings
100 Mbits/sec bandwidth (symmetrical)

As illustrated in Tables (1) and (2) of FIG. 11A, the host computer cloud instance 205-C would implement (or virtualize) above single hardware (1X) in software and run on top of single or multiple computers, for maximum attendees of 25 (including host computer 205). When the host computer 205 requests (in step 517 in FIG. 5) to start a new multipoint meeting, the multipoint meeting server 222 requests a computing cloud (not shown) to launch-or-assign (in step 518 in FIG. 5) the host computer cloud instance 205-C.

Para [0148] shows that if the host helper program 216-1 is BigBlueButton, for maximum 25 attendees, single (virtualized)-(1X)-hardware (illustrated in FIG. 11A's Table-2) is recommended and is shown as (host-computer-cloud-instance)-"1X-(H/W)-Instance" (in FIG. 11B's Table-2's row-E-and-column-III).

FIG. 11A: "Table (1), row C for 1X-to-40,000X single-(1X)-hardware" (for virtualized-(1X)-hardware implemented in host computer cloud instance 205-C, using linear formula) illustrates that as number-of-attendees increases from 25 attendees (row-B-and-column-III) to 1,000,000 attendees (row-B-and-column-XI), the number of (1X)-hardware needs to increase (using linear formula) from IX (row C and column III) to 40,000X (row-C-and-column-XI) respectively:

"Linear" formula for # of (1X)-hardware (implemented in cloud instance)="Maximum # of attendees expected"/25.

FIG. 11A's Table-'s "row-C for 1X-to-40,000X single-hardware" and "note-(a)'s 'Linear'-formula above" illustrate that the number of (1X)-hardware implemented (as virtualized-(1X)-hardware in the host computer cloud instance 205-C) needs to increase from 1X (for 25 attendees) to 40,000X (for 1,000,000 attendees), as the number-of-attendees increases beyond 25 attendees (to 1,000,000 attendees, in FIG. 11A's Table-1's "(Maximum-Attendees) row-B for 25-to-1,000,000 max.-attendees"), DELETE Para [0149D]:

FIG. 11A: "Table (1), (reverse of) row C for 1X-to-40,000X single-hardware" and above "Linear" formula also illustrate/imply the reverse that (at end of a 1,000,000-attendees-meeting) the number of hardware implemented (as virtualized-hardware in the host computer cloud instance 205-C) may DECREASE from 40,000X (for 1,000,000 max.-attendees) to (as-low-as) 1X (for 25 max.-attendees), as the number-of-max.-attendees decreases from 1,000,000 max.-attendees to 25 max.-attendees over some-time (of minutes or hour(s)), in FIG. 11A's Table-1's "(Maximum-Attendees) row-B for 25-to-1,000,000 max.-attendees"), FIG. 11B's Table-2's rows-E-to-N shows more illustrations of implementing FIG. 11A's (or FIG. 11B's) Table-'s row-C: "#-of-(1X)-H/W-(implemented-in-host-computer-cloud-instance)": "1X-to-40,000X single-(1X)-hardware" using Table-1's note-(a)-on-"Linear"-formula:

(i) in FIG. 11B's Table 2's row-E:
25 (maximum attendees); 1X (single-(1X)-H/W implemented): 1X-(H/W)-Instance (instance-name in Table-2's row-E-and-column-III, for easy-reference in patent-application): (in row-E-and-columns-I-to-III respectively).
Virtualized-H/W-Implemented: 4 CPU (core): 8 Gigabyte (Memory): 500 GB (Disk); 100 Mbits/sec. (Bandwidth); (in row-E-and-columns-IV-to-VII respectively);
=1*(1X)-H/W (in FIG. 11A's Table-2)
=1*"4 CPU (core): 8 GB (Memory); 500 GB (Disk): 100 Mbits/sec. (Bandwidth)"

(ii) in FIG. 11B's Table 2's row-F:
50 (maximum attendees); 2X (single-(1X)-H/W implemented): 2X-(H/W)-Instance (instance-name in Table-2's row-E-and-column-III, for easy-reference in patent-application): (in row-F-and-columns-I-to-III respectively).
Virtualized-H/W-Implemented: 8 CPU (core): 16 Gigabyte (Memory): 1,000 GB (Disk); 200 Mbits/sec. (Bandwidth); (in row-F-and-columns-IV-to-VII respectively);
=2*(1X)-H/W (in FIG. 11A's Table-2)
=2*"4 CPU (core): 8 GB (Memory); 500 GB (Disk): 100 Mbits/sec. (Bandwidth)"

(iii) in FIG. 11B: Table 2, row G:
100 (maximum attendees): 4X (single-(1X)-H/W implemented); 4X-(H/W)-Instance (instance-name, for easy-reference in patent-application); (in row-G-and-columns-I-to-III respectively).
Virtualized-H/W-Implemented: 16 CPU (core); 32 Gigabyte (Memory): 2,000 GB (Disk); 400 Mbits/sec. (Bandwidth); (in row-G-and-columns-IV-to-VII respectively).
=4*(1X)-H/W (in FIG. 11A's Table-2)
=4*"4 CPU (core): 8 GB (Memory); 500 GB (Disk): 100 Mbits/sec. (Bandwidth)"

(iv) in FIG. 11B: Table 2, row H:
200 (maximum attendees); 8X (single-(1X)-H/W implemented); 8X-(H/W)-Instance (instance-name, for easy-reference in patent-application): (in row-H-and-columns-I-to-III respectively).
Virtualized-H/W-Implemented: 32 CPU (core); 64 Gigabyte (Memory): 4,000 GB (Disk); 800 Mbits/sec. (Bandwidth); (in row-H-and-columns-IV-to-VII respectively).
=8*(1X)-H/W (in FIG. 11A's Table-2)
=8*"4 CPU (core); 8 GB (Memory); 500 GB (Disk): 100 Mbits/sec. (Bandwidth)"

(v) in FIG. 1B: Table 2, rows I-to-M:
500-to-1,000,000 (maximum attendees); 20X-to-40,000X (single-hardware implemented): 20X-(H/W)-Instance, . . . 400000X-(H/W)-Instance (instance-names, for easy-reference in patent-application); (in rows-"I-to-M"-and-columns-"I-to-III" respectively).
Virtualized-H/W-Implemented: 80-to-160,000 CPU (core); 160-to-320,000 Gigabyte (Memory); 10,000-to-20,000,000 GB (Disk); 2,000-to-4,000,000 Mbits/sec. (Bandwidth); (in rows-"I-to-M"-and-columns-"IV-to-VII" respectively).
=20-to-40,000*(1X)-H/W (in FIG. 11A's Table-2)
=20-to-40,000*"4 CPU (core): 8 GB (Memory), 500 GB (Disk); 100 Mbits/sec. (Bandwidth)"

(v) in FIG. 11B's Table 2, row O: Contact Vendor to Pre-Arrange, if # of (1X)-H/W>=100X.

(vi) Please note that in scaling-up to support 25+ client computers 215 (to join the multipoint meeting hosted by the host computer 205, in addition to number of hardware, needed bandwidth and other computing resources,) the software (e.g. BigBlueButton) must support (and should be tested to support) the higher number of 25+ client computers.

It is noted that the cloud-vendor may need to virtualize FIG. 11B's Table-2's column-II's #-of-(1X)-hardware (e.g. 1X-to-40,000X), and its columns-IV-to-VII on: "CPU (core); GB (Memory); GB (Disk); Bandwidth (Mbits/sec);" respectively in "substantially-equivalent"-way to comply with real-life hardware-and-software requirements (not-shown) of the computing-cloud 198.

(Para [0149K] is same-as/copied-from Para [0146O].) Referring to FIG. 11C (for ("Not-Decrease"-or)-Increase-H/W), specification Para [0146O] is repeated/copied below for one's easier-reading-and-understanding (and Para [0146O] and [0146O] (i)-to-(v) are incorporated herein by reference):

(Para [0146O]:) (It is obvious that) one-skilled-in-relevant-art (using software-and-database to increase #-of-(1/X)-H/W in host-computer-cloud-instance 205-C) may use Para [0146N] (and Para [0146K] and-FIG. 11B's-Tables-1-and-2) to "Increase-H/W-Level in (Not-Decrease-or)-increase-(Virtualized)-(1X)-H/W-(in-instance) in FIG. 11C's rows-B-to-K-and-columns-V-to-VII for its (max-#-of-attendees and) host-computer-cloud-instance(s) (in (rows-B-to-K-and)-column-III respectively), as illustrated in the five (5) examples in [0146O] (i)-to-(v) above.

(Para [0149L] is same-as/copied-from Para [0146P].) Referring to FIG. 11D (for ("Not-Decrease"-or)-Keep-SAME-H/W)), please note that "(Not-Decrease-or)-keep-SAME/Not-Change"-virtualized-(1X)-hardware (illustrated in FIG. 11D):

Keep-SAME-(1X)-H/W (in "Not-Decrease"-virtualized-hardware) (illustrated in FIG. 11D) has: (a). same-#-of-(1X)-H/W (in columns-III-and-V-and-VII) in Begin-and-Final host-computer-cloud-instance (in columns-IV-and-VI) respectively; and (b) SAME-("#-of-(H/W)", e.g. 1X-(H/W), 2X-(H/W), . . . 40000X-(H/W), in)-INSTANCE in Begin-and-Final host-computer-cloud-instance (in columns-IV-and-VI) respectively.

Keep-SAME-(1X)-H/W (in "Not-Decrease"-virtualized-hardware) (illustrated in FIG. 11D) are-(or-may-be-regarded-as) default-(first-step)-Keep-SAME-H/W, when computing cloud 198 launches cloud instances, e.g. in step 518 in FIGS. 5 and 20C, and step 919 in FIGS. 9 and 12F, and in Para [0150E]'s lines-2-to-6: "Multipoint meeting server 222 (FIG. 2A) requests computing cloud 198 to launch-or-assign host computer cloud instance 205-C (FIG. 2A) implementing-(virtualizing) the requested (and subscribed in step 1220 of FIG. 12A) ("Linear" Formula) number of single-(virtualized)-hardware on software". FIG. 11D illustrates ("Not-Decrease"-or)-Keep-SAME-virtualized-(1X)-hardware.

(Para [0149M] is same-as/copied-from Para [0146Q].) Referring to FIG. 11E (for ("Not-Increase"-or)-Decrease-H/W), one-skilled-in-relevant-art (using software-and-database to decrease #-of-(/X)-H/W in host-computer-cloud-instance 205-C) may use-(leverage-"Increase-H/W"-disclosure-for-use-in-"Decrease-H/W"-here-in-Para-[0146Q])-and-leverage-from Para [0146N] (and Para [0146K] and-FIG. 11B's-Tables--and-2) to-(leverage-and) "Decrease-H/W-Level in (Not-Increase-or)-Decrease-(Virtualized)-(1X)-H/W-(in-Instance) in FIG. 11E's rows-B-to-K-and-columns-V-to-VIII for its (max-#-of-attendees and) host-computer-cloud-instance(s) (in (rows-B-to-K-and)-column-III respectively), as illustrated in the five (5) examples in [0146Q] (i)-to-(v) above.

(Para [0149N] is same-as/copied-from Para [0146R].) Referring to FIG. 11F (for ("Not-Increase"-or)-Keep-SAME-H/W)), please note that "(Not-Increase-or)-keep-SAME/Not-Change"-virtualized-(1X)-hardware (illustrated in FIG. 11F):

Keep-SAME-(1X)-H/W (in "Not-Increase"-virtualized-hardware) (illustrated in FIG. 11F) has: (a). same-#-of-(1X)-H/W (in columns-III-and-V-and-VII) in Begin-and-Final host-computer-cloud-instance (in columns-IV-and-VI) respectively: and (b) SAME-("#-of-(H/W)", e.g. 40000X-(H/W), 4000X-(H/W), . . . , 2X-(H/W), 1X-(H/W), in)-INSTANCE in Begin-and-Final host-computer-cloud-instance (in columns-IV-and-VI) respectively.

Keep-SAME-(1X)-H/W (in "Not-Increase"-virtualized-hardware) (illustrated in FIG. 11F) are-(or-may-also-be-regarded-as) default-(first-step)-Keep-SAME-H/W, when computing cloud 198 launches cloud instances, e.g. in step 518 in FIGS. 5 and 20C, and step 919 in FIGS. 9 and 12F, and in Para [0150E]'s lines-2-to-6: "Multipoint meeting server 222 (FIG. 2A) requests computing cloud 198 to launch-or-assign host computer cloud instance 205-C (FIG. 2A) implementing-(virtualizing) the requested (and subscribed in step 1220 of FIG. 12A) ("Linear" Formula) number of single-(virtualized)-hardware on software". FIG. 11F illustrates ("Not-Increase"-or)-Keep-SAME-virtualized-(1X)-hardware.

It is noted that although the disclosure herein makes references in some embodiments to using a computing cloud to provide direct network connections for Internet application service over a computer network, the principles disclosed herein are also applicable to using more-than-one or multiple computing clouds (illustrated in FIGS. 53A, 53B and FIGS. 54A, 54B and described in Para [0363], [0364]) to provide direct network connections for Internet application service over a computer network.

FIG. 12A is a flowchart illustrating how steps 1210 to 1280 can be added to FIGS. 12B, 12C, 12D, 12E, 12F, 12G, 12H, and 12I respectively, to have the multipoint meeting server 222 to request a computing cloud (not shown) to launch or assign the host computer cloud instance 205-C:

(a). Step 1210 (FIG. 12A): In previous step "A" in FIGS. 12B, 12C, 12D, 12E, 12F, 12G, 12H, and 12I respectively, host computer 205 requested to start a new multipoint meeting (b). Step 1220 (FIG. 12A): User (not shown) of host computer 205 (FIG. 2A) previously created a computing cloud account (subscribing a number-of single-(virtualized)-hardware (described in FIGS. 11A and 11B). User may use (Tables-1-to-3 in) FIG. 11A, and/or (Tables-1-and-2 in) FIG. 11B, or similar data from computing cloud vendor).

The host computer 205 (or multipoint meeting server 222 or a computing cloud 198 (in FIG. 26D)) may specify the maximum number of attendees in step 1220, and using Table 1 of FIG. 11A, specifies the number of single hardware (implemented in software) for the multipoint meeting server 222 to request a computing cloud (not shown) to launch in the host computer cloud instance 205-C. The host computer 205 (or multipoint meeting server 222 or a computing cloud 198 (in FIG. 26D)) may also specify in the same step 1220 when the maximum number of attendees is exceeded, the number of single hardware (implemented in software) to add to host computer cloud instance 205-C.

Figure 13A:
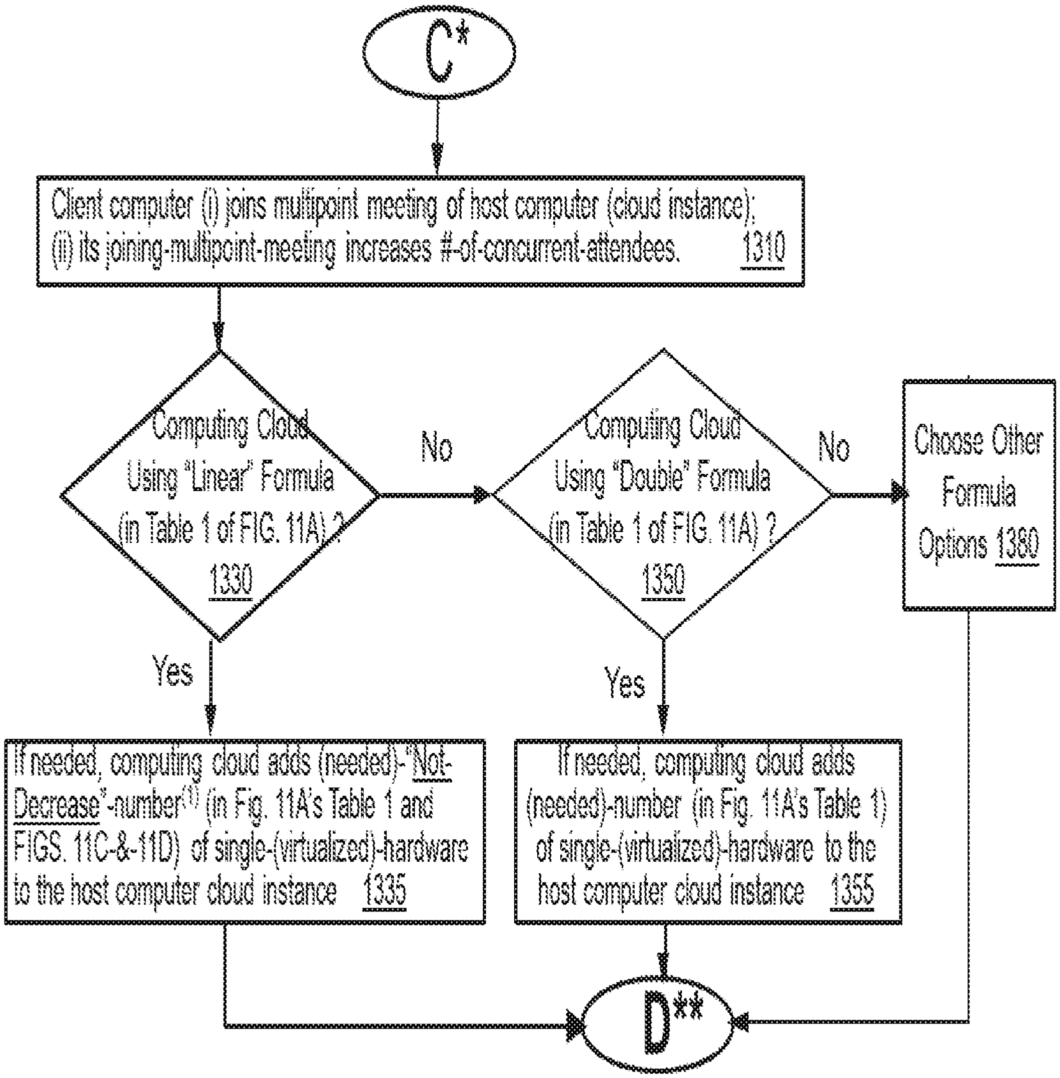
FIG. 13A is a flowchart illustrating providing direct network connections using cloud instance for multipoint meeting service over a computer network in accordance with another embodiment of the present invention.
Figure 13B:
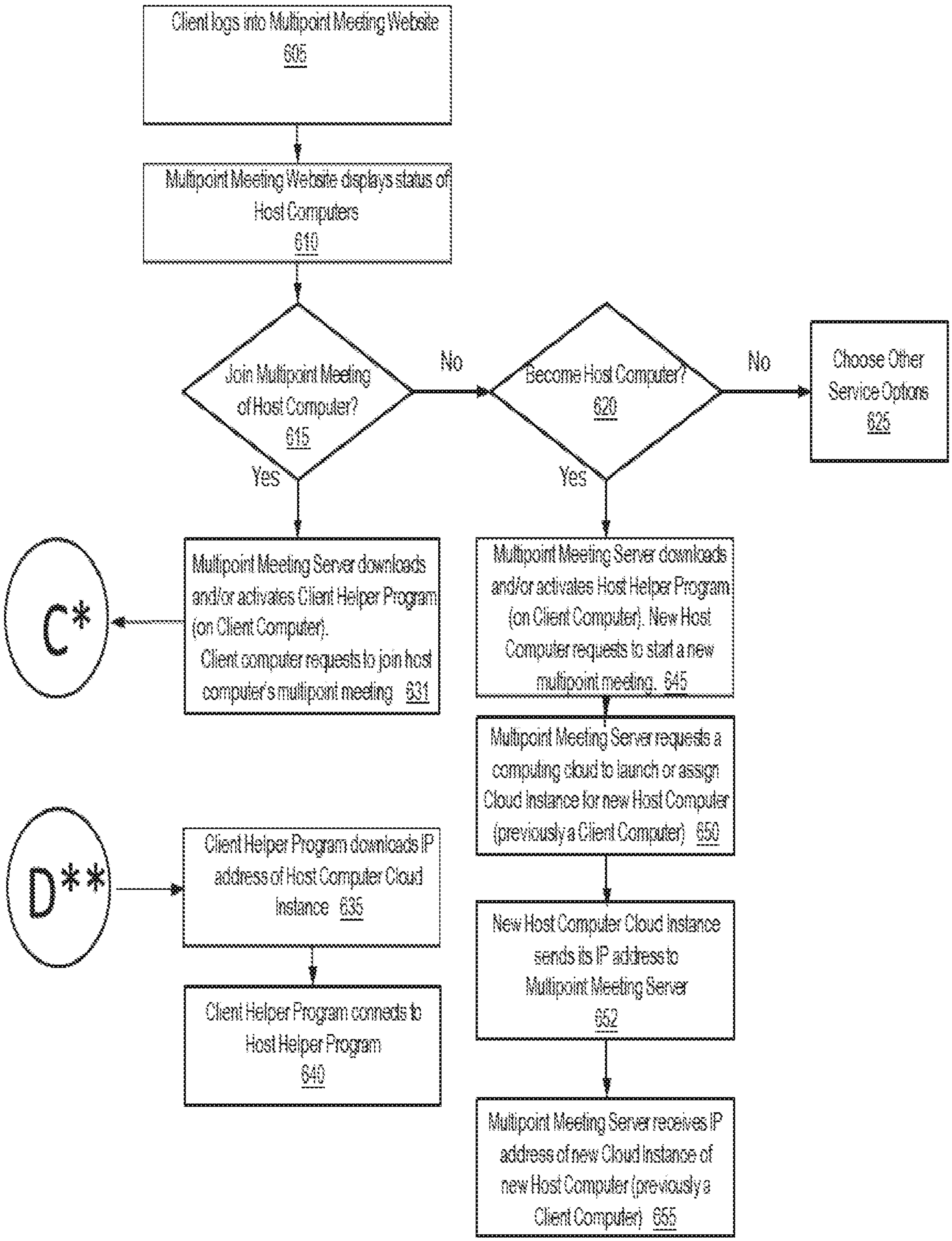
FIGS. 13B, 13C, 13D, 13E, 13F, and 13G are flowcharts illustrating providing direct network connections using cloud instance for multipoint meeting service over a computer network in accordance with another embodiment of the present invention.
Figure 13C:
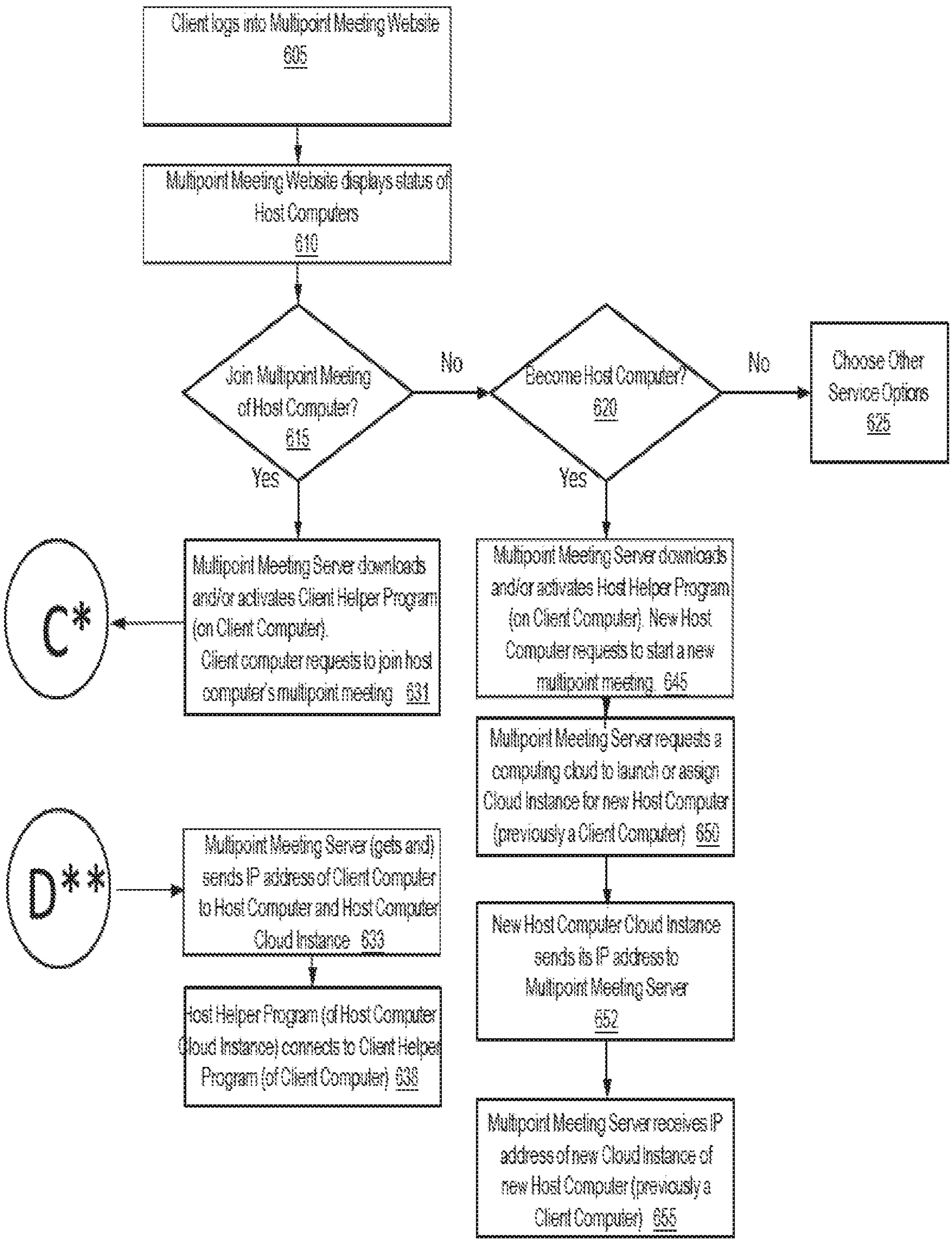
Figure 13D:
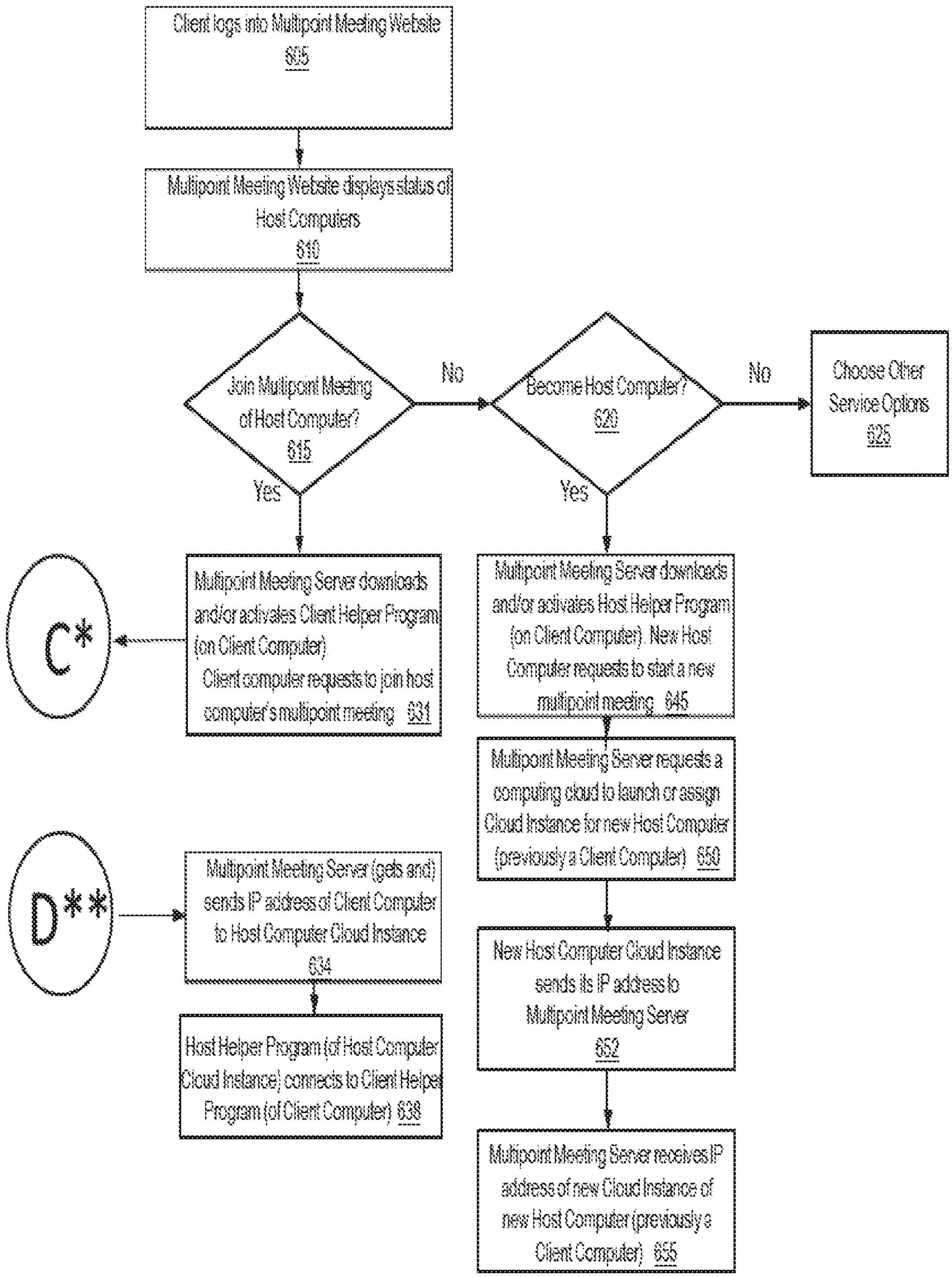

The default case is that the multipoint meeting server 222 (or a computing cloud 198 (in FIG. 26D)) will use the linear formula in Table (1) of FIG. 11A to start with one single hardware (implemented in software) in the host computer cloud instance 205-C, and when the new attendee in step 1320 (of FIG. 13A) exceeds the maximum attendee number (for the then current number of single hardware), multipoint meeting server 222 or a computing cloud 198 (in FIG. 26D) then: (i) add 10% of the then current number of single hardware (rounded up-to next integer) to the host computer cloud instance 205-C, if the host computer 205 does not specify anything in step 1220 (in FIG. 12A), or (ii) as illustrated in FIG. 11C: "(BigBlueButton)-("Not-Decrease"-or)-Increase-(Virtualized)-(1X)-H/W-(in-Instance).

(c). Step 1240 (FIG. 12A): If (in step 1230) computing cloud 198 (in FIG. 26D) uses "Linear" Formula (in Table 1 of FIG. 11A), then: (i) Multipoint meeting server 222 (FIG. 2A) requests computing cloud 198 to launch-or-assign host computer cloud instance 205-C (FIG. 2A) implementing (virtualizing) the requested (and subscribed in step 1220) ("Linear" Formula) number of single-(virtualized)-hardware on software; and (ii) (if needed) computing cloud may "Not-Decrease"-(or-"Not-Increase") #-of-single-(virtualized)-hardware in host computer cloud instance 205-C (using FIG. 11A's Table 1, and FIGS. 11C-&-11D and 11E-&-11F respectively).

(d). Step 1260 (FIG. 12A): If (in step 1250) computing cloud 198 (in FIG. 26D) uses "Double" Formula (in Table 1 of FIG. 11A), then: (i) Multipoint meeting server 222 (FIG. 2A) requests computing cloud 198 (in FIG. 26D) to launch-or-assign host computer cloud instance 205-C (FIG. 2A) implementing (virtualizing) the requested (and subscribed in step 1220) ("Double" Formula) number of single-(virtualized)-hardware on software; and (ii) (using software and database) computing cloud 198 (in FIG. 26D) may increase-(or-decrease) (not-shown) (using "Double" Formula) single-(virtualized)-hardware in host computer cloud instance 205-C.

(f). Step 1280 (FIG. 12A): Computing cloud 198 may also use other formula (not shown), other than Linear or Double Formula (to add single-(virtualized)-hardware to host computer cloud instance 205-C).

Table 1-(row-E) of FIG. 11A also shows that for very large meetings (e.g. 2500 or more attendees) requiring 100 or more single hardware (more than 100X) in year 2015, the cloud vendor should be contacted to pre-arrange the capacity, etc. When in doubt, it is wise to contact the cloud vendor or technical experts to ask questions (to make sure that the multipoint meeting attendees' high expectations of successful meetings are met), as the then current cloud technologies, e.g. in year 2015, may not be advanced enough yet to provide multipoint meeting for the requested maximum number of attendees, e.g. one million attendees in year 2015.

Figure 21A:
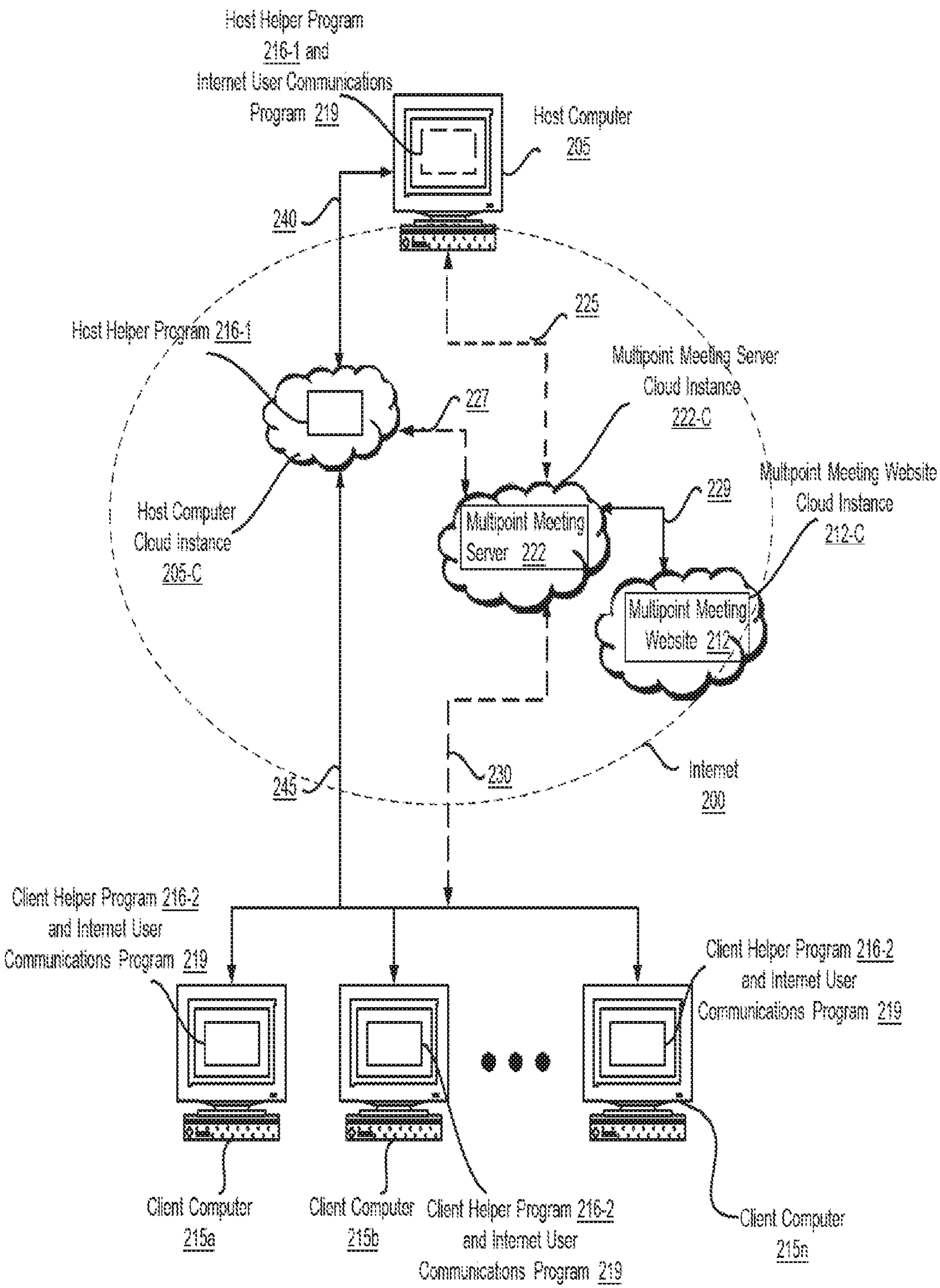
FIGS. 21A, 21B are block diagrams illustrating providing direct network connections using cloud instance for multipoint meeting service over a computer network in accordance with another embodiment of the present invention.
Figure 21B:
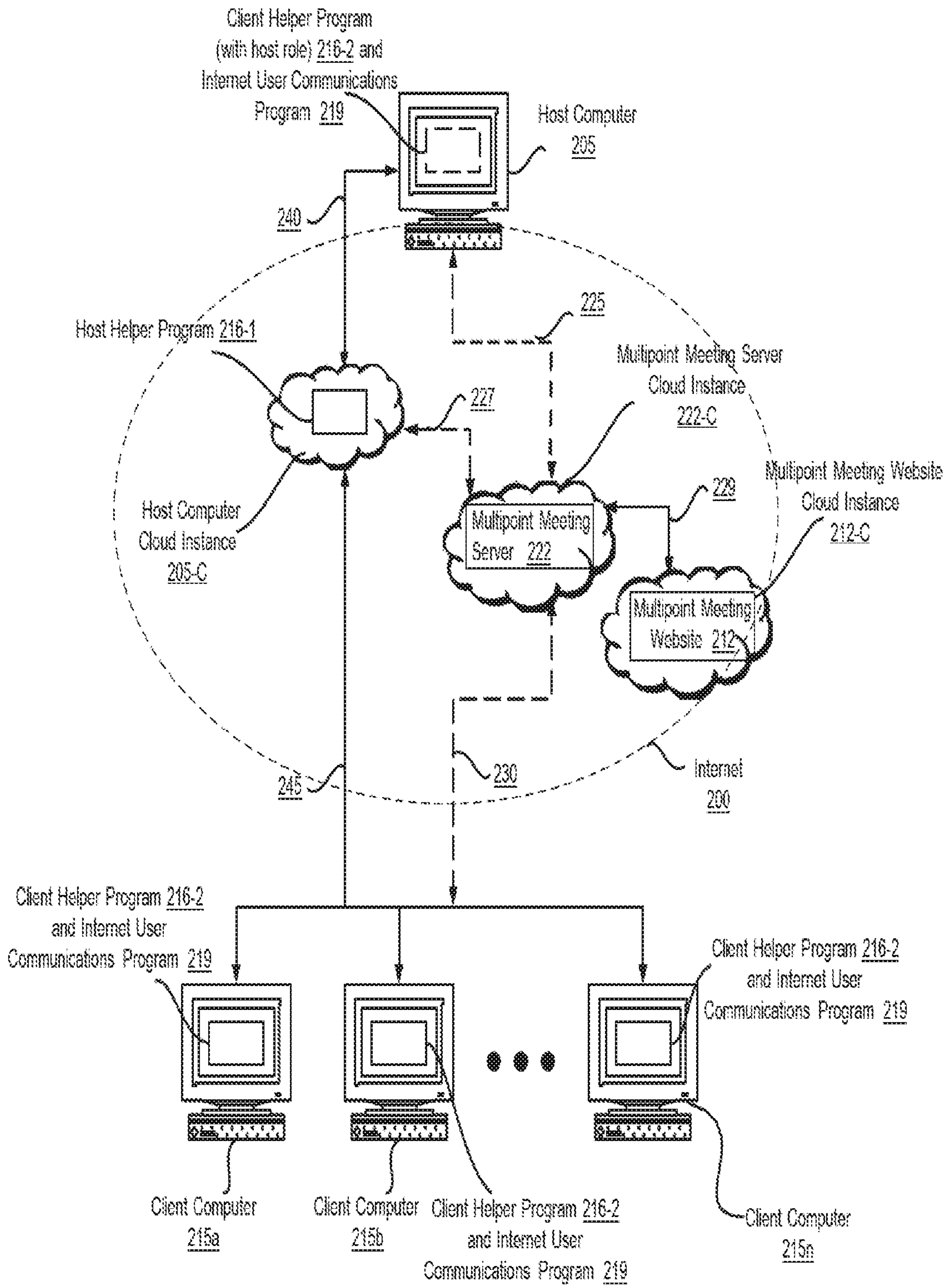

It should be noted that the server cloud instance 222-C and website cloud instance 212-C in FIGS. 21A and 21B below can also dynamically or pre-arrange to have almost any bandwidth and hardware capacity (to be implemented in software) to support large numbers of host computers 205 and client computers 215, using methods (not shown) analogous to that for host computer cloud instance 205-C detailed in FIGS. 11A, 12A, 12B to 12I, 13A, and 13B to 13G.

FIGS. 12B, 12C, 12D, 12E, 12F, 12G, 12H, and 12I are flowcharts illustrating how steps 1210 to 1280 (from FIG. 12A) may be added in FIGS. 12B, 12C, 12D, 12E, 12F, 12G, 12H, and 12I respectively, in accordance with an embodiment of the present invention.

It is noted that the IP address of the client computer 215 may be sent to the host computer 205 and/or the host computer cloud instance 205-C using indirect connection 225, 230, or indirect connection 227, 230 (instead of using direct network connection 748, 750 in FIG. 7) in further embodiments of the current invention illustrated in FIGS. 12D and 12E respectively and described below.

In an embodiment of the current invention illustrated in FIG. 12D, which FIG. 12D is similar to FIG. 12C, and the only changes in FIG. 12D from FIG. 12C are: (a) the multipoint meeting server (gets 605 and) sends 633 (using indirect connection 225, 230 in FIG. 7) the IP address of the client computer 215 to the host computer 205 and the host computer cloud instance 205-C, which are communicatively coupled to each other; (b) the host helper program 216-1 (of the host computer cloud instance 205-C) then connects 638 to the client helper program 216-2 (of the client computer 215). (c) Steps 635 and 640 in FIG. 12C are deleted in FIG. 12D.

In another embodiment of the current invention illustrated in FIG. 12E, which FIG. 12E is similar to FIG. 12C, and the only changes in FIG. 12E from FIG. 12C are: (a) the multipoint meeting server (gets 605 and) sends 634 (using indirect connection 227, 230 in FIG. 7) the IP address of the client computer 215 to the host computer cloud instance 205-C, which is communicatively coupled to the host computer 205: (b) the host helper program 216-1 (of the host computer cloud instance 205-C) then connects 638 to the client helper program 216-2 (of the client computer 215): and (c) Steps 635 and 640 in FIG. 12C are deleted in FIG. 12E.

Similar to FIG. 12A, FIGS. 13A, 13B, 13C, 13D, 13E, 13F, and 13G are flowcharts illustrating how (when client computer 215 requests to join multipoint meeting of the host computer 205,) steps 1310 to 1380 (from FIG. 13A) may be added to FIGS. 13B, 13C, 13D, 13E, 13F, and 13G respectively, to have client computer 215 (FIG. 7) to join multipoint meeting of host computer cloud instance 205-C (FIG. 7):

(a) Step 1310 (FIG. 13A): Client computer 215 (FIG. 7): (i) joins multipoint meeting of host computer (cloud instance 205-C): (ii) its joining-multipoint-meeting increases #-of-concurrent-attendees (of multipoint meeting).

(b). Step 1335 (FIG. 13A): If "Yes" in step 1330, (if needed) computing cloud 198 (in FIG. 26D) adds (needed)-"Not-Decrease"-number (in FIG. 11A's Table 1 (using "Linear" formula) and FIGS. 11C-&-11D) of single-(virtualized)-hardware to the host computer cloud instance 205-C.

(c). Step 1380 (FIG. 13A): Computing cloud 198 (in FIG. 26D) may also use other formula (not shown), other than Linear or Double Formula (in step 1355) (to add single-(virtualized)-hardware to host computer cloud instance 205-C).

It is noted that the IP address of the client computer 215 may be sent to the host computer 205 and/or the host computer cloud instance 205-C using indirect connection 225, 230, or indirect connection 227, 230 (instead of using direct network connection 748, 750 in FIG. 7) in further embodiments of the current invention.

Figure 13E:
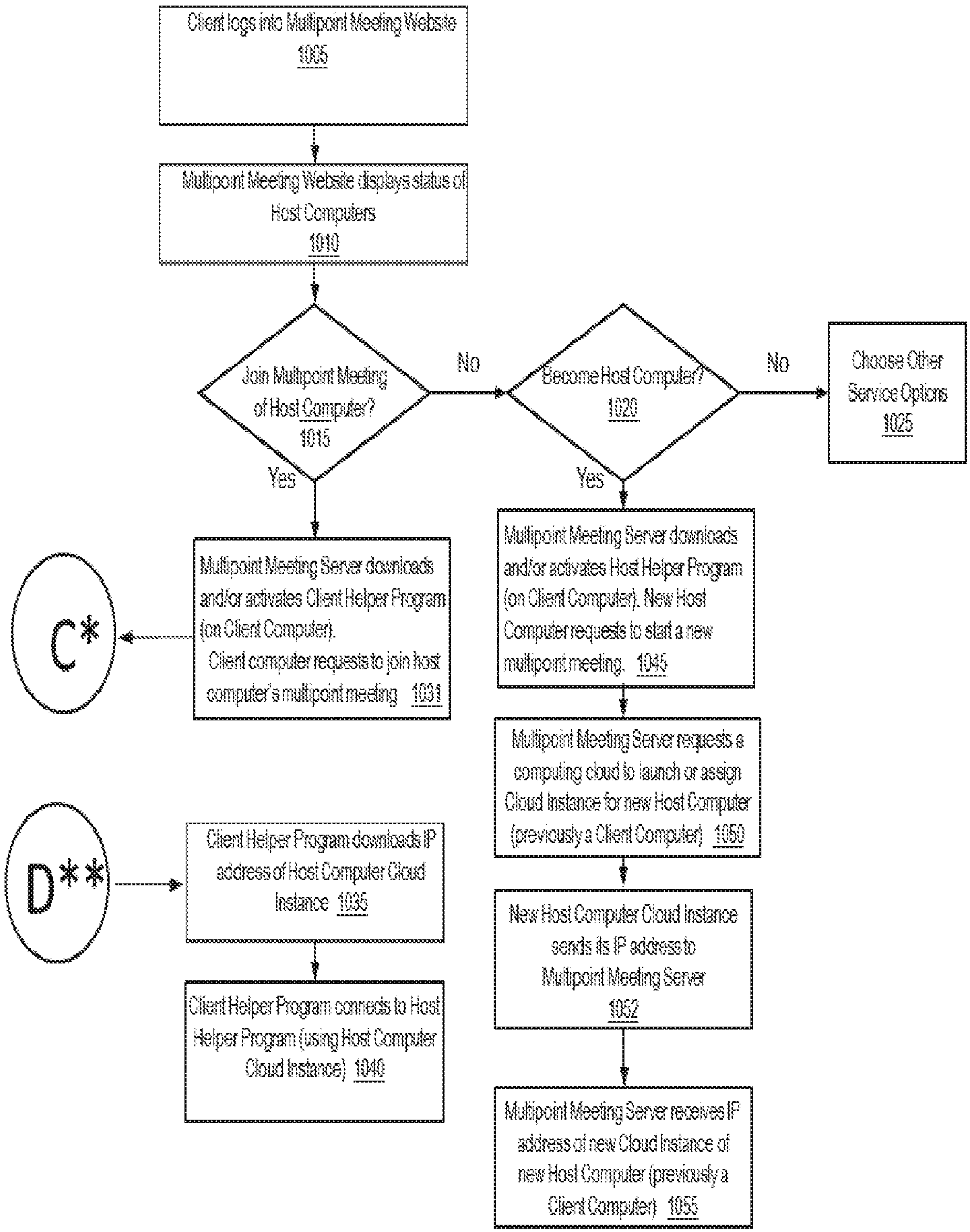
Figure 13F:
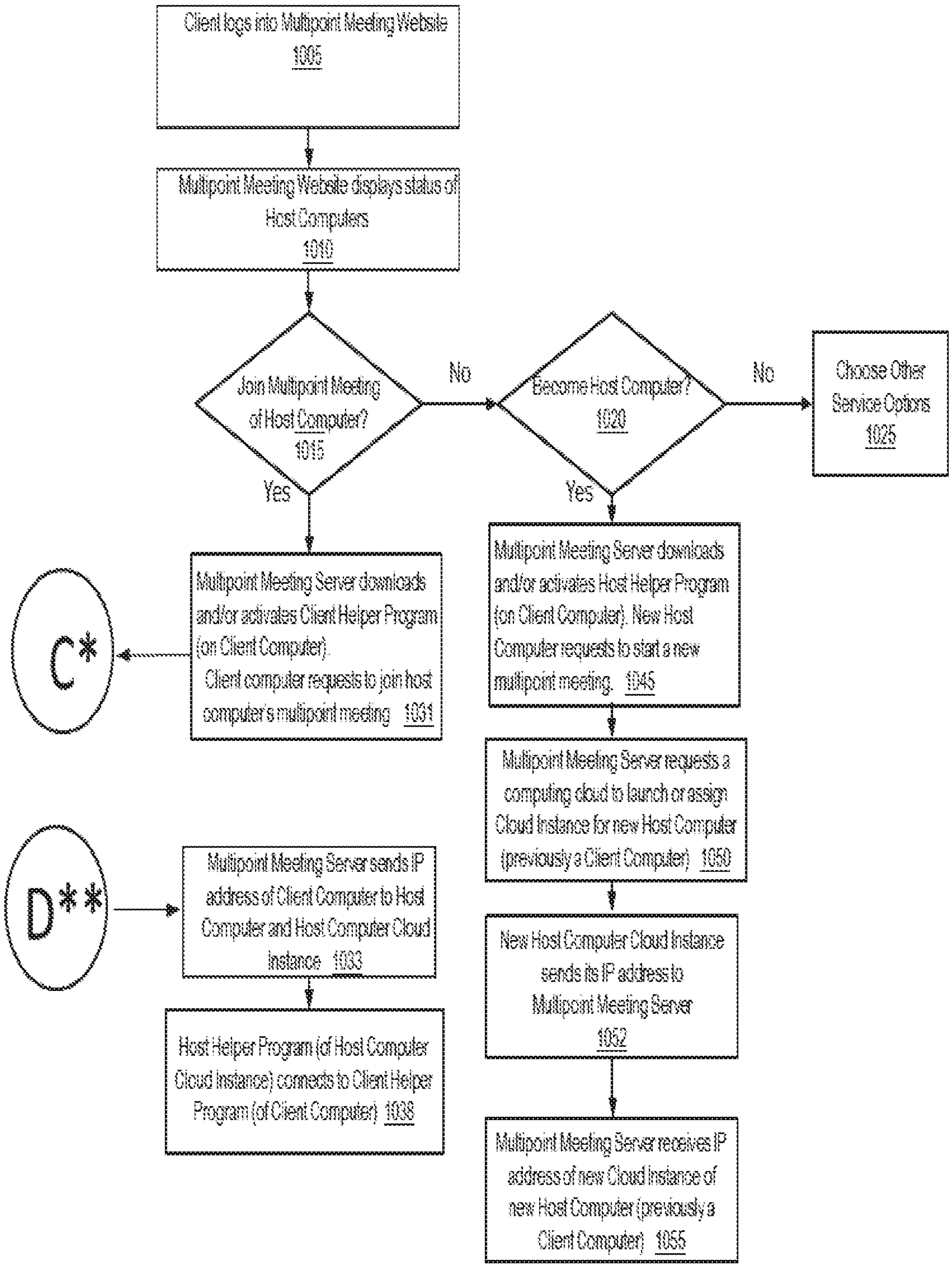

In an embodiment of the current invention illustrated in FIG. 13F, which FIG. 13F is similar to FIG. 13E, and the only changes in FIG. 13F from FIG. 13E are: (a) the multipoint meeting server sends 1033 (using indirect connection 225, 230 in FIG. 7) the IP address of the client computer 215 to the host computer 205 and the host computer cloud instance 205-C, which are communicatively coupled to each other; (b) the host helper program 216-1 (of the host computer cloud instance 205-C) then connects 1038 to the client helper program 216-2 (of the client computer 215). (c) Steps 1035 and 1040 in FIG. 13E are deleted in FIG. 13F.

Figure 13G:
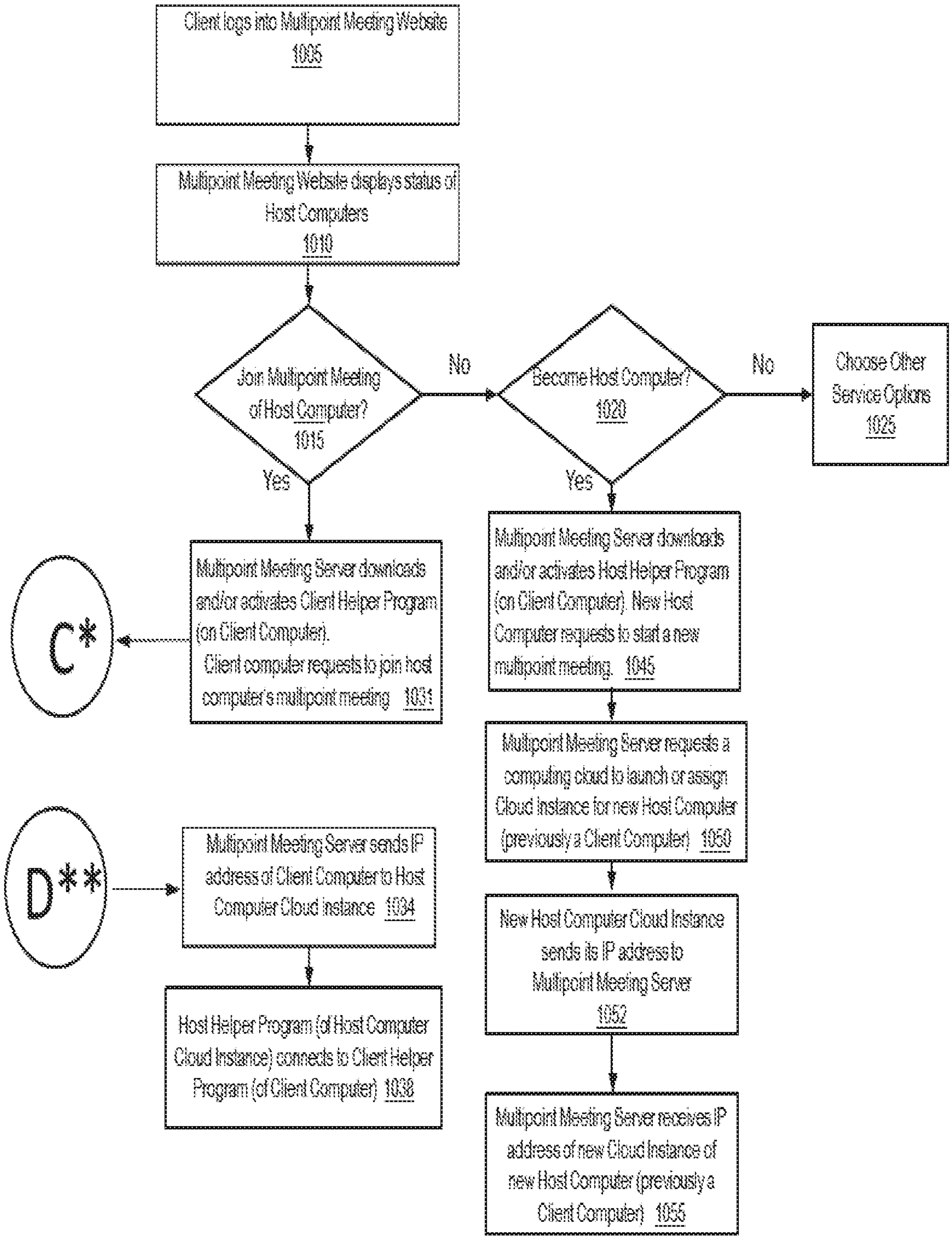

In another embodiment of the current invention illustrated in FIG. 13G, which FIG. 13G is similar to FIG. 13E, and the only changes in FIG. 13G from FIG. 13E are: (a) the multipoint meeting server sends 1034 (using indirect connection 227, 230 in FIG. 7) the IP address of the client computer 215 to the host computer cloud instance 205-C, which is communicatively coupled to the host computer 205: (b) the host helper program 216-1 (of the host computer cloud instance 205-C) then connects 1038 to the client helper program 216-2 (of the client computer 215): and (c) Steps 1035 and 1040 in FIG. 13E are deleted in FIG. 13G.

Figure 14:
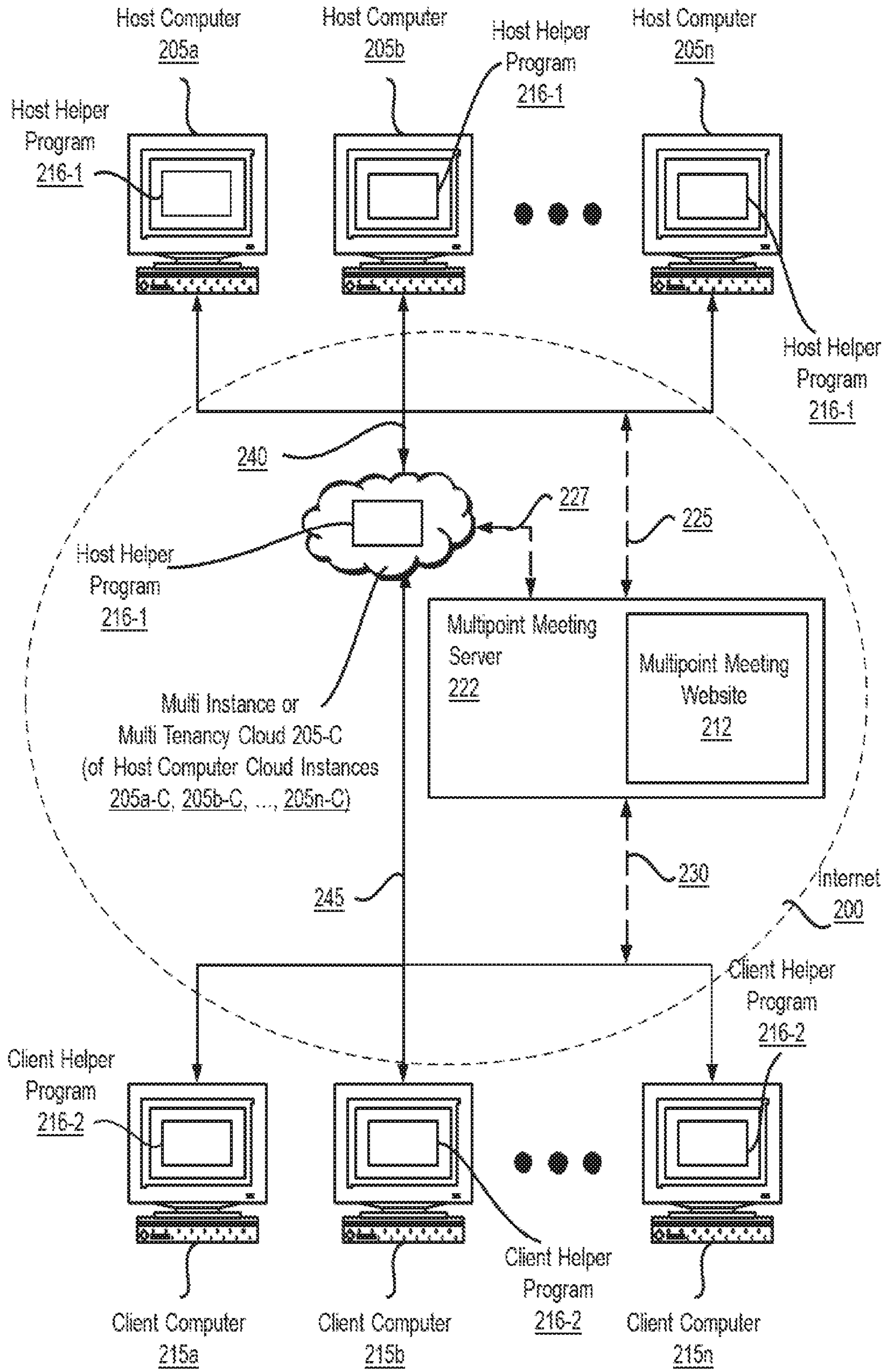
FIG. 14 is a block diagram illustrating providing direct network connections using multi instance cloud for multipoint meeting service over a computer network in accordance with another embodiment of the present invention.

FIG. 14 is a block diagram illustrating providing direct network connections using a multi instance cloud 205-C (of host computer cloud instances 205*a*-C, 205*b*-C, . . . , 205*n*-C) for multipoint meeting service over a computer network in accordance with another embodiment of the present invention. The host computer cloud instance 205-C in FIGS. 2A, 2C, 2D, 2E, and 7 may be in a single instance cloud 205-C or in a multi instance cloud 205-C.

Multi Instance Considerations

Think of the cloud as a single entity comprising the data shared across multiple (virtual) machines. The cloud juggles resources between the different machines while communicating with remote machines (e.g. client computers 215). In a multi-instance cloud, entirely separate instances (that is, separate copies of defined data items, e.g. separate copies of host computer cloud instances 205*a*-C, 205*b*-C, . . . 205*n*-C) are run parallel to one another.

Although the single-instance cloud shouldn't get bogged down while servicing requests as long as the hardware has adequate resources and speed, additional cloud instances, e.g. host computer cloud instances 205*a*-C, 205*b*-C, . . . , 205*n*-C, in the multi instance cloud 205-C in FIG. 14 can help to speed up the overhead associated with interfacing the remote machines, e.g. client computers 215, with which the cloud communicates.

In some embodiments, the direct network connection using cloud instance architectures depicted by FIG. 2A, FIG. 2C, FIG. 2D, FIG. 2E, and FIG. 7 are adapted using the above-described techniques for multiple host computers cloud instances 205*a*-C, 205*b*-C, . . . , 205*n*-C on multi instance cloud 205-C and/or multi tenancy cloud 205-C. In such embodiments, the multi instance cloud 205-C and/or multi tenancy cloud 205-C may need to distinguish between multiple host computer cloud instances 205*a*-C, 205*b*-C, . . . , 205*n*-C in FIG. 14 to ensure that data is transmitted only to one or more proper destinations. For example, the popular cloud computing offering, Amazon EC2, provides an external and internal IP address for its cloud instances, so Amazon EC2 may need to distinguish between multiple host computer cloud instances 205*a*-C, 205*b*-C, . . . , 205*n*-C in FIG. 14 to ensure that data is transmitted only to one or more proper destinations.

Figure 15A:
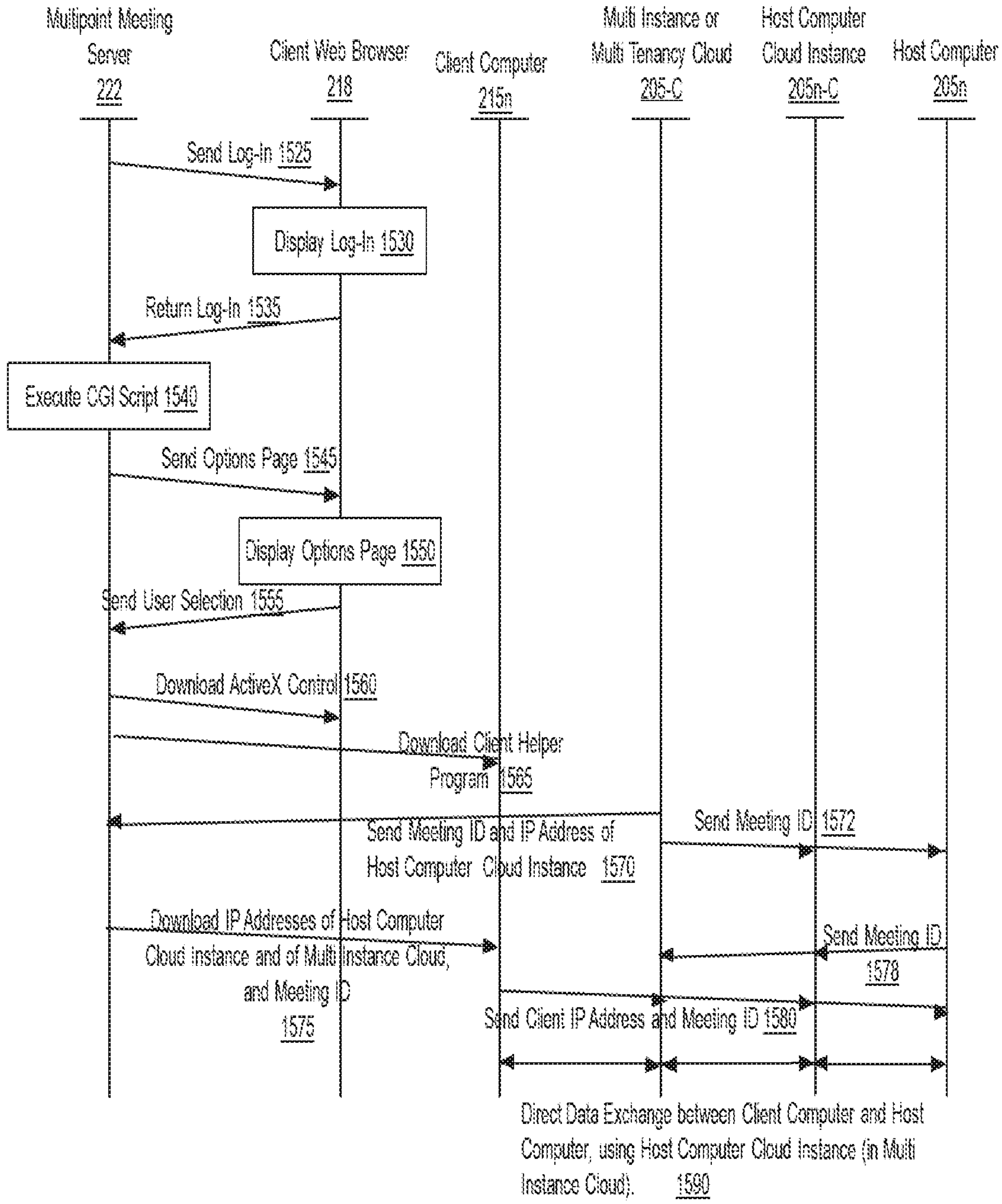
FIGS. 15A, 15B, 15C are flowcharts illustrating providing direct network connections using multi instance cloud for multipoint meeting service over a computer network in accordance with another embodiment of the present invention.

Referring to FIG. 15A, the multi instance or multi tenancy cloud 205-C assigns and sends 1570 a unique meeting ID and IP address of the host computer cloud instance 205*n*-C to the multipoint meeting server 222, which receives them. The multi instance cloud 205-C or multi tenancy cloud 205-C also sends 1572 the meeting ID to the host computer cloud instance 205*n*-C, which is communicatively coupled to the host computer 205*n*. The multipoint meeting server 222 then sends 1575 the unique meeting ID and IP address of the host computer cloud instance 205*n*-C to the client computer 215 along with the IP address of the multi instance or multi tenancy cloud 205-C (of host computer cloud instances 205*a*-C. 205*b*-C, . . . , 205*n*-C). The client computer 215*n* then sends 1580 to the multi instance cloud 205-C (or multi tenancy cloud 205-C) and the host computer cloud instance 205*n*-C the unique meeting ID along with the IP address of the client computer 215. In one embodiment, the host computer 205*n* also previously sends 1578 the unique meeting ID to the multi instance cloud 205-C (or multi tenancy cloud 205-C) and the host computer cloud instance 205*n*-C (which is communicatively coupled to the host computer 205*n*). The multi instance cloud 205-C (or multi tenancy cloud 205-C) store both the unique meeting ID and the associated IP addresses of the host computer 205*n* and of the host computer cloud instance 205*n*-C in a look-up table. Thus, when a client computer 215 sends data 1590 to the host computer cloud instance 205*n*-C (and/or the host computer 205*n*) via the direct network connection 240, 245 (in FIG. 14) using the multi instance cloud 205-C (or multi tenancy cloud 205-C), as illustrated in FIG. 14, it may designate the data as corresponding to the particular meeting ID, allowing the multi instance cloud 205-C (multi tenancy cloud 205-C), using the look-up table, to transmit the data to the appropriate host computer cloud instance 205*n*-C, which is communicatively coupled to the host computer 205*n*. From this point on, the client computer 215 and the host computer 205*n* can exchange data 1590 via a direct network connection 240, 245 using the host computer cloud instance 205*n*-C (inside the multi instance cloud 205-C or multi tenancy cloud 205-C), independently of the multipoint meeting server 222.

It is noted that the IP address of the client computer 215*n* may be sent to the host computer 205*n* and/or the host computer cloud instance 205*n*-C using indirect connection 225, 230, or indirect connection 227, 230 (instead of using direct network connection 240, 245 in FIG. 14) in further embodiments of the current invention illustrated in FIGS. 15B and 15C respectively and described below.

Figure 15B:
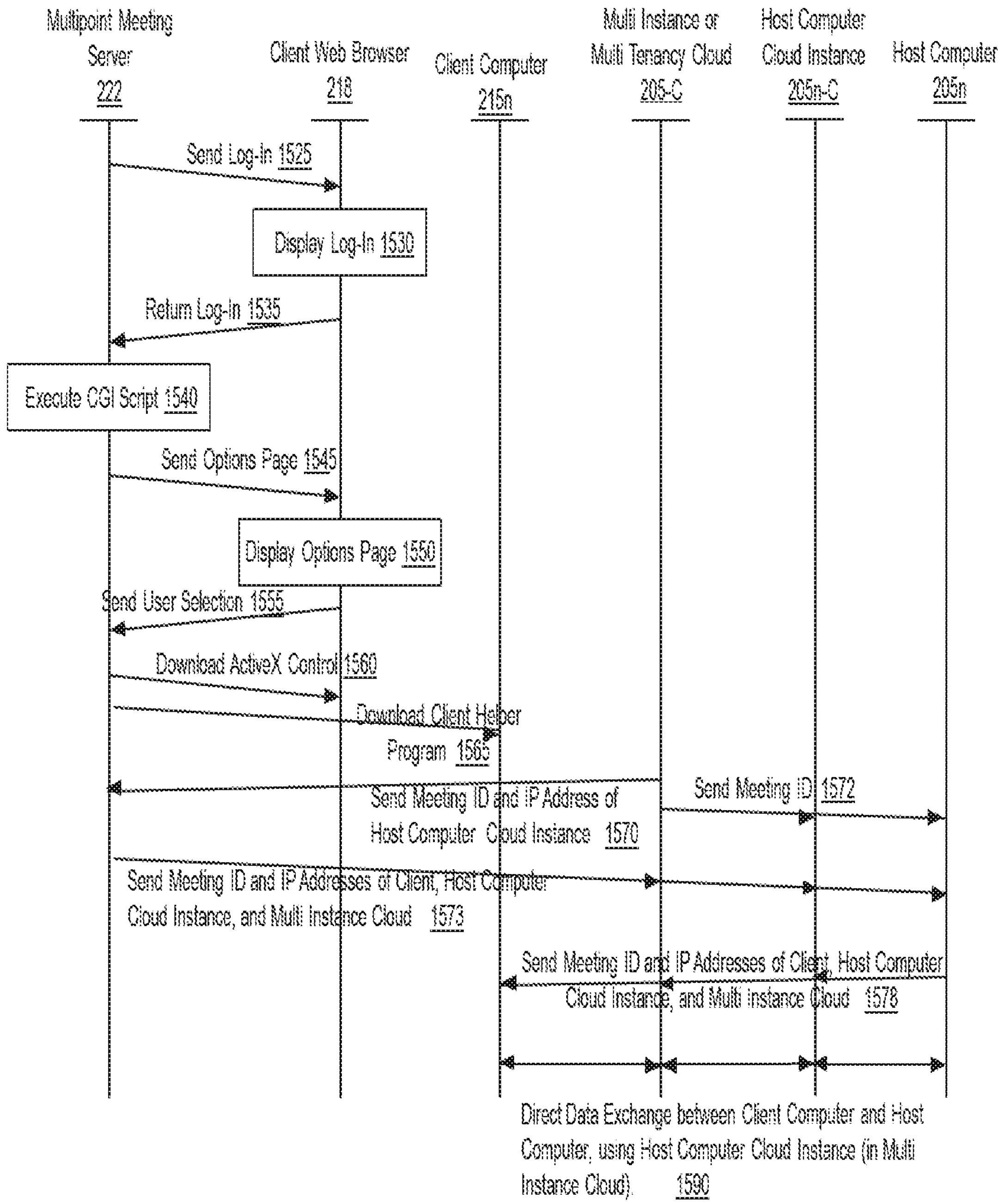

In an embodiment of the current invention illustrated in FIG. 15B, which FIG. 15B is similar to FIG. 15A, but in FIG. 15B the multipoint meeting server 222 sends 1573 (using indirect connection 225, 230 in FIG. 14) the IP address of the client computer 215*n* and meeting ID to the host computer 205*n*, which is communicatively coupled to the host computer cloud instance 205*n*-C. The host computer cloud instance 205*n*-C therefore also gets 1573 the IP address of the client computer 215*n* and meeting ID. The host computer cloud instance 205*n*-C (and/or the host computer 205*n*) then sends 1578 its IP address and the meeting ID to client computer 215. Direct data exchange 1590 can then occur, using direct network connection 245, 250 in FIG. 14, between client computer 215*n* and host computer 205*n*, using host computer cloud instance 205*n*-C (inside the multi instance cloud 205-C or multi tenancy cloud 205-C), and without going through multipoint meeting server 222.

Figure 15C:
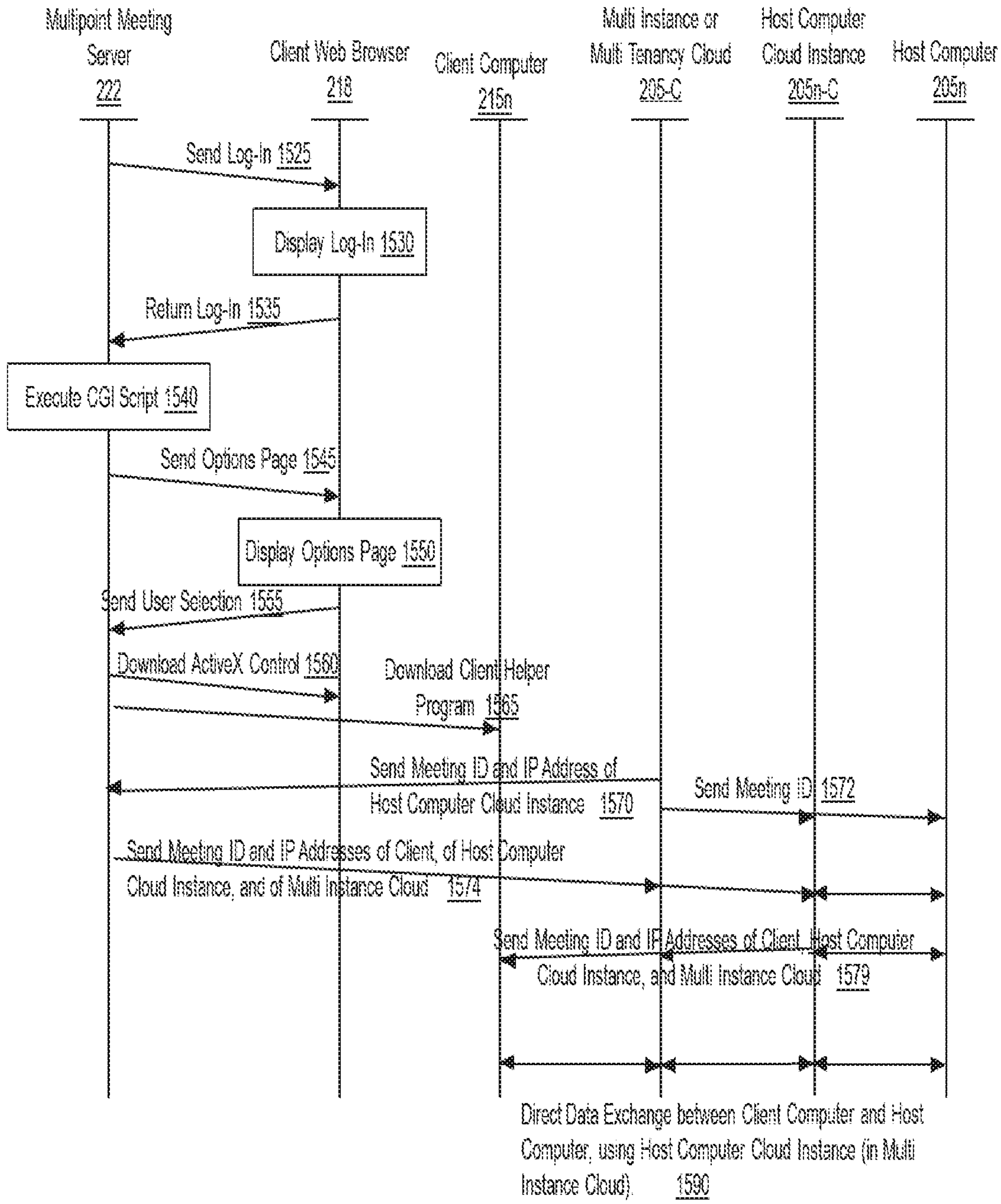

In another embodiment of the current invention illustrated in FIG. 15C, which FIG. 15C is similar to FIG. 15A, but in FIG. 15C the multipoint meeting server 222 sends 1574 (using indirect connection 227, 230 in FIG. 14) the IP address of the client computer 215*n* and meeting ID to the host computer cloud instance 205*n*-C, which is communicatively coupled to the host computer 205*n*. The host computer cloud instance 205*n*-C then sends 1579 its IP address and the meeting ID to client computer 215*n*. Direct data exchange 1590 can then occur, using direct network connection 245, 250 in FIG. 14, between client computer 215*n* and host computer 205*n*, using host computer cloud instance 205_n_-C (inside the multi instance cloud 205-C or multi tenancy cloud 205-C), and without going through multipoint meeting server 222.

Client computer 215 checks can be a feature of host computer 205 helper program 216-1 to allow client computers 215_a_, 215_b_, . . . , 215_n_ to verify that they have the needed hardware, software and bandwidth to join the multipoint meetings of the host computers 205_a_, 205_b_, . . . , 205_n_. For BigBlueButton, a client computer 215 may do client check by visiting URL: http://demo.bigbluebutton.org/check/. Other host helper programs 216-1 may have other procedures to perform their client checks, if any.

FIG. 16 illustrates the results of a client check by a host helper program 216-1, e.g. BigBlueButton host helper program 216-1, for a client computer 215, before the client computer 215 joins the multipoint meeting of a host computer 205.

For example, the items checked in FIG. 16 include Java enabled, browser, client check version, cookie enabled, download speed, flash version, etc.: and the results are "Java is disabled in your browser", Firefox 38.0, 0.9.0-28, true, "1.774 Mbps (2.273 MB in 10 seconds)", 17.0.0.188, etc., respectively: and the status includes warning for Java enabled, so that the user may take note, provide remedy to correct the status, and enable Java in its Firefox 38.0 browser, to allow proper performance and user experience when its client computer 215 joins the multipoint meeting of the host computer 205.

FIG. 17 illustrates, as non-exhaustive examples, five other cases of client computer checks, their client computer check results/status, and possible client software-as-a-service provided by client software-as-a-service helper program 216-3 (in FIG. 2F, and in client computer cloud instances 215_a_-C, 215_b_-C, . . . , 215_n_-C in FIG. 18), to allow client computers 215_a_, 215_b_, . . . , 215_n_ to have better performance and user experiences, in multipoint meetings with host computers 205_a_, 205_b_, . . . , 205_n_.

Figure 18:
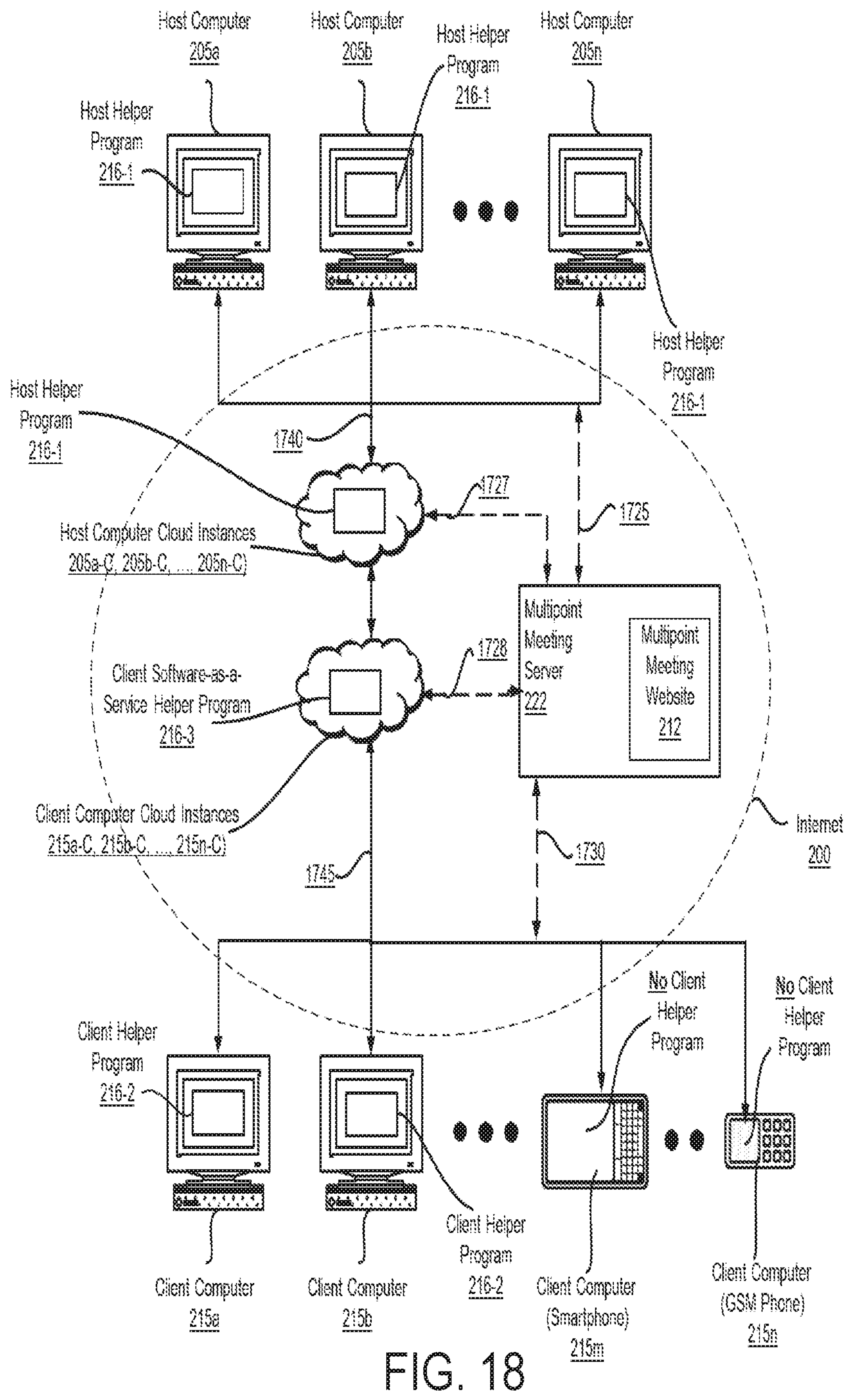
FIG. 18 is a block diagram illustrating providing direct network connections using cloud instance for multipoint meeting service over a computer network in accordance with another embodiment of the present invention.

For example, case I in FIG. 17 is client check for client computer 215_a_ in FIG. 18: the client check item is audio, and the client check result/status is "No audio (sound card missing)"; and the client software-as-a-service could be "Instant speech-to-text translation" provided by the client software-as-a-service helper program 216-3 of the client computer cloud instance 215_a_-C in FIG. 18.

As another example, cases 2 and 3 in FIG. 17 are client checks for client computer 215_b_ in FIG. 18; the client check items are bandwidth and client OS support, and the client check results/status are "Below recommended" and "Not supported" respectively: and the client software-as-a-service could be "More data compression" and "Interpreter to support non-supported OS" respectively, provided by the client software-as-a-service helper program 216-3 of the client computer cloud instance 215_b_-C in FIG. 18.

As another example, case 4 in FIG. 17 is client check for client computer 215_m_ in FIG. 18: the client check item is client language, and the client check result/status is "Client language different"; and the client software-as-a-service could be "Instant language translation" provided by the client software-as-a-service helper program 216-3 of the client computer cloud instance 215_m_-C (not shown) in FIG. 18.

As a further example, case 5 in FIG. 17 is client check for client computer (GSM phone) 215_n_ in FIG. 18, where the client computer (GSM phone) 215_n_ sends an SMS message with meeting ID and password, if any, to the multipoint meeting server 222 to join the multipoint meeting; the client check item is non-intelligent phone, and the client check result/status is "Not supported"; and the client software-as-a-service could be "Audio-only to GSM etc. legacy phones" provided by the client software-as-a-service helper program 216-3 of the client computer cloud instance 215_n_-C in FIG. 18.

Referring to FIG. 18, in still another embodiment of the invention, the client computers 215_a_, 215_b_, . . . , 215_n_ when doing their client checks reveal needs for one or more client software-as-a-service (some of which are illustrated above) in them, and thus in in their joining-multipoint-meeting requests to multipoint meeting server 222 include requests for one or more client software-as-a-service for their multipoint meetings respectively. The multipoint meeting server 222 then requests a computing cloud (not shown) to launch-or-assign client computer cloud instances 215_a_-C, 215_b_-C, . . . , 215_n_-C to provide these client software-as-a-service for these client computers 215_a_, 215_b_, . . . , 215_n_ respectively.

Figure 19A:
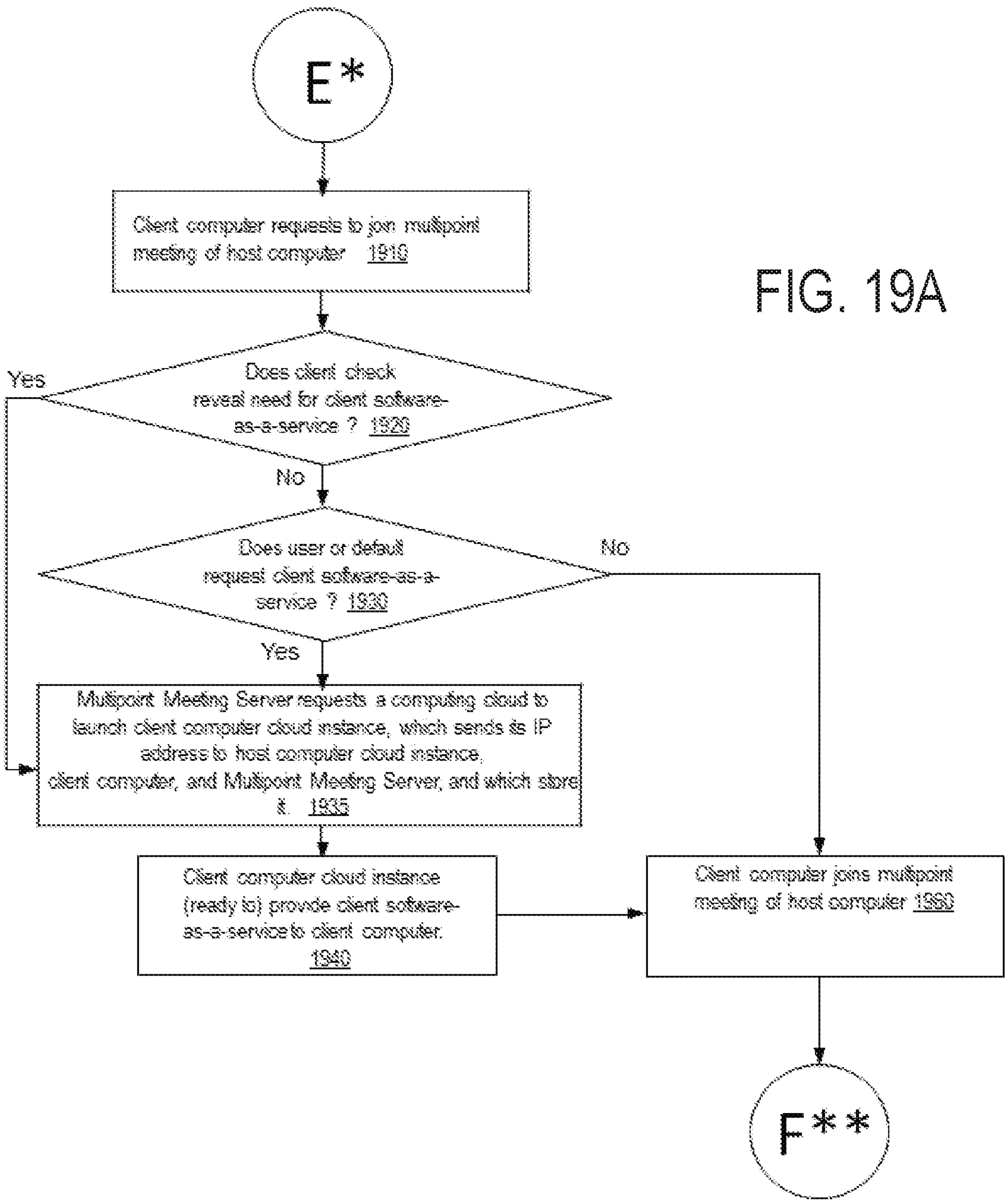
FIGS. 19A, 19B, 19C are flowcharts illustrating providing direct network connections using cloud instance for multipoint meeting service over a computer network in accordance with another embodiment of the present invention.
Figure 19B:
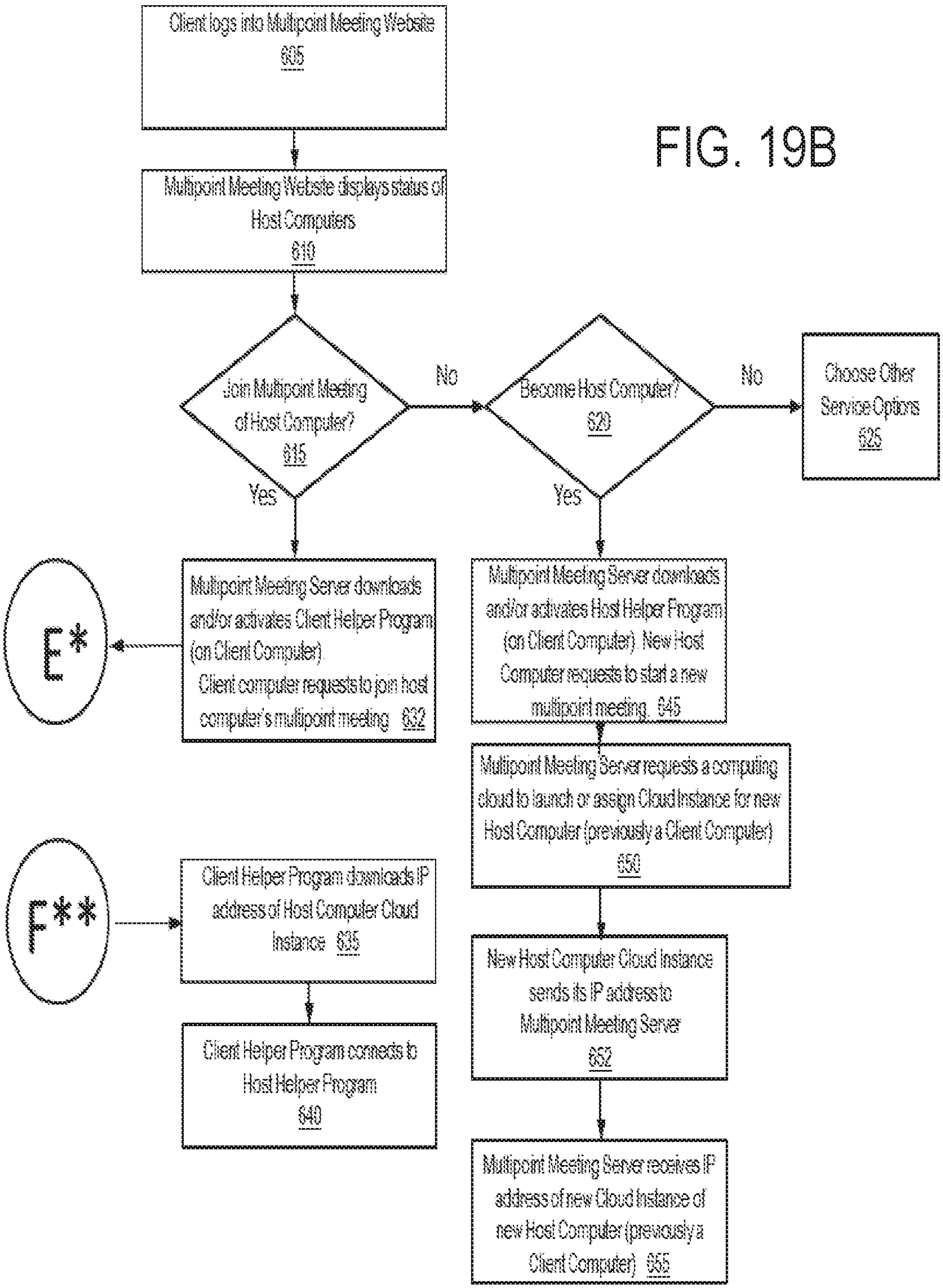
Figure 19C:
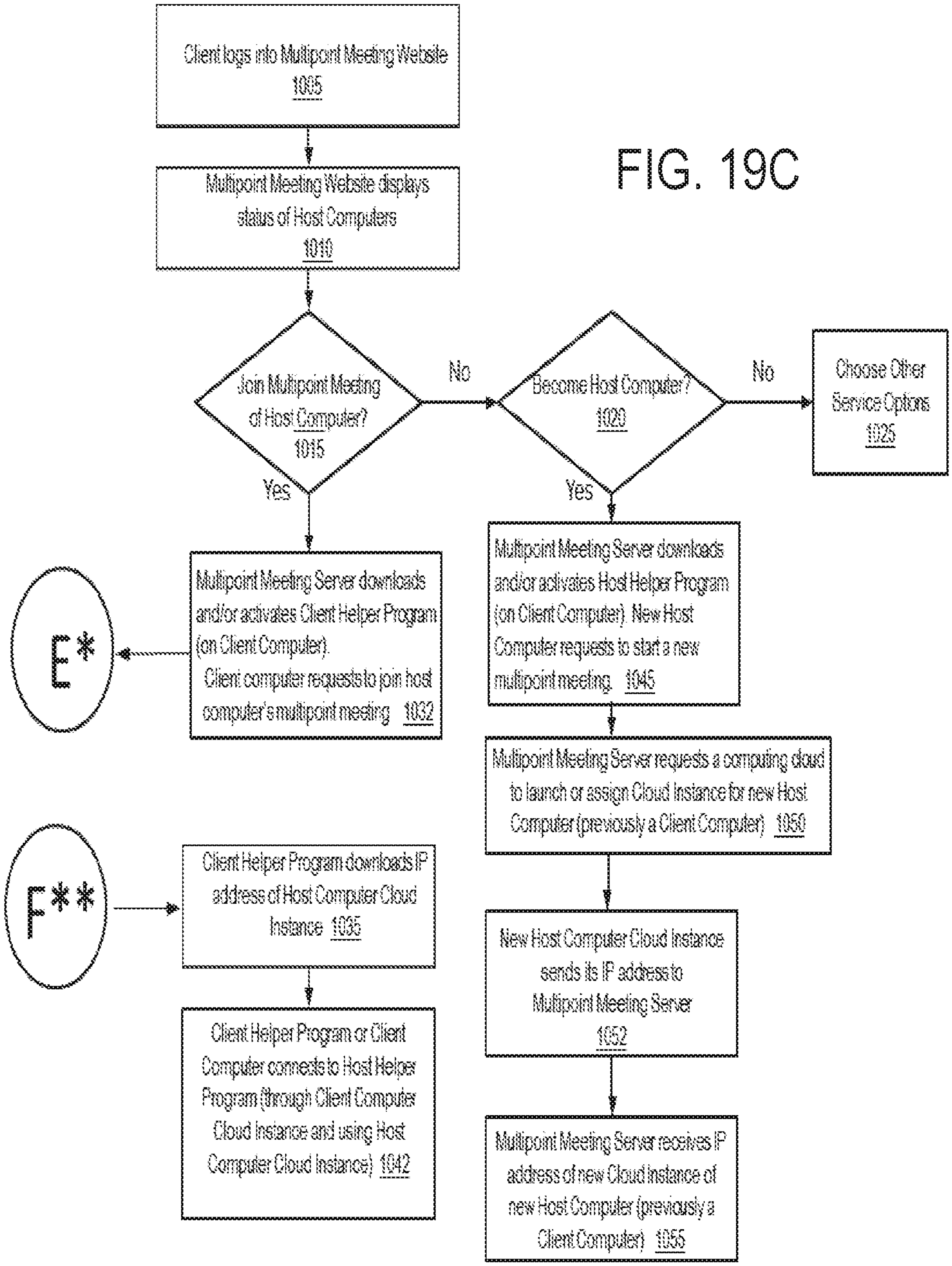

FIGS. 19A, 19B, and 19C are flowcharts illustrating how a client computer 215 can add steps 1910 to 1960 (from FIG. 19A) in FIGS. 19B, and 19C respectively, to request the multipoint meeting server 222 to request a computing cloud (not shown) to launch-or-assign a client computer cloud instance 215-C to provide one or more needed client software-as-a-service for the client computer 215, for multipoint meeting service over a computer network 200 in accordance with an embodiment of the present invention.

It is noted that the IP address of the client computer 215 may be sent to the host computer 205 and/or the host computer cloud instance 205-C using indirect connection 1725, 1730, or indirect connection 1727, 1730 (instead of using direct network connection 1740, 1745 in FIG. 18) in further embodiments of the current invention, by editing (not shown) FIGS. 19B and 19C (to use indirect connection 1725, 1730, or indirect connection 1727, 1730 to send the IP address of the client computer 215), and which editing are substantially similar to:

(a) "editing of FIG. 12C to become FIG. 12D (and described in Para. 0155 above)", and to use indirect connection 225, 230 (in FIG. 7) to send the IP address of the client computer 215 (to the host computer 205 and/or the host computer cloud instance 205-C); and (b) "editing of FIG. 12C to become FIG. 12E (and described in Para. 0156 above)", and to use indirect connection 227, 230 (in FIG. 7) to send the IP address of the client computer 215 (to the host computer 205 and/or the host computer cloud instance 205-C) respectively.

Internet User Communications Helper Program Considerations

The optional Internet user communications helper program 219 in FIG. 2B is an optional software application to allow an Internet user to use the host computer 205 or the client computer 215 to communicate with another Internet user. The Internet user communications helper program 219 may include any conventional instant messenger application, email application, online social networking service application, website live-chat application, or any Internet communications program that can send the IP address of host computer cloud instance 205-C to the client computer 215 to join the multipoint meeting. Examples include instant messenger application such as Skype from Microsoft Corporation, email application such as Hotmail from Microsoft Corporation, online social networking service application such as Facebook from Facebook. Inc., or website live-chat application such as Zopim or Zendesk Chat from Zendesk Singapore Pte. Ltd.

It should be noted that the host computer 205 and the client computer 215 may use the Internet user communications helper program 219 to communicate; and a host computer 205 may invite a client computer 215 to join its multipoint meeting by sending or forwarding, via the Internet user communications helper program 219, the IP address of its host computer cloud instance 205-C to the client computer 215, after its host computer cloud instance 205-C is started, as described below.

In additional embodiment of the present invention using the Internet user communications helper program 219, the direct network connections using cloud instance illustrated in FIGS. 2D, 2E, 4A, and 5, and the accompanying methods described herein are adapted as illustrated in FIGS. 20A to 20D and described below.

In one embodiment illustrated in FIG. 20A, the host computer 205 uses an Internet user communications helper program 219 to communicate with a client computer 215*n*. Steps 505 to 525 in FIG. 20C remain unchanged from those in FIG. 5. New steps 530, 535 are added in the flowchart in FIG. 20C (adapted from FIG. 5) wherein the multipoint meeting server 222 sends (step 530 in FIG. 20C) the IP address of host computer cloud instance 205-C to host computer 205; and the host computer 205 invites the client computer 215*n* to join its multipoint meeting by sending (step 535 in FIG. 20C), via the Internet user communications helper program 219, the IP address (and/or, as described below in an example, the uniform resource locator (URL) of the host helper program 216-1) of host computer cloud instance 205-C to the client computer 215*n*: and the IP address of the host computer cloud instance 205-C enables the client computer 215*n*, using the client helper program 216-2, to directly exchange data with the host computer 205 (using the host computer cloud instance 205-C (running the host helper program 216-1)), using direct connections 240, 245 and without passing through the multipoint meeting server 222. If needed, the host computer 205 would have sent 2072 (in FIG. 20D) download information of the client helper program 216-2, via the Internet user communications helper program 219, to the client computer 215*n* for the latter to download the client helper program 216-2 and use the IP address of the host computer cloud instance 205-C (to connect to host helper program 216-1) to join the multipoint meeting of host computer 205.

The Internet user communications helper program 219 may include any conventional instant messenger application, email application, online social networking service application, website live-chat application, or any Internet communications program that can send the IP address of host computer cloud instance 205-C to the client computer 215 to join the multipoint meeting. Examples include instant messenger application such as Skype from Microsoft Corporation, email application such as Hotmail from Microsoft Corporation, online social networking service application such as Facebook from Facebook, Inc., or website live-chat application such as Zopim or Zendesk Chat from Zendesk Singapore Pte. Ltd.

Typically, the client helper program 216-2 has much lower hardware and bandwidth requirements compared to the hardware and bandwidth requirements for the host helper program 216-1. Thus, as illustrated in FIG. 20B, in a further embodiment, the host computer 205 may use the client helper program 216-2 (with host-role), allowing the host computer 205 to remain a host while not needing to meet the high hardware and bandwidth requirements for some host helper program 216-1.

Figure 20D:
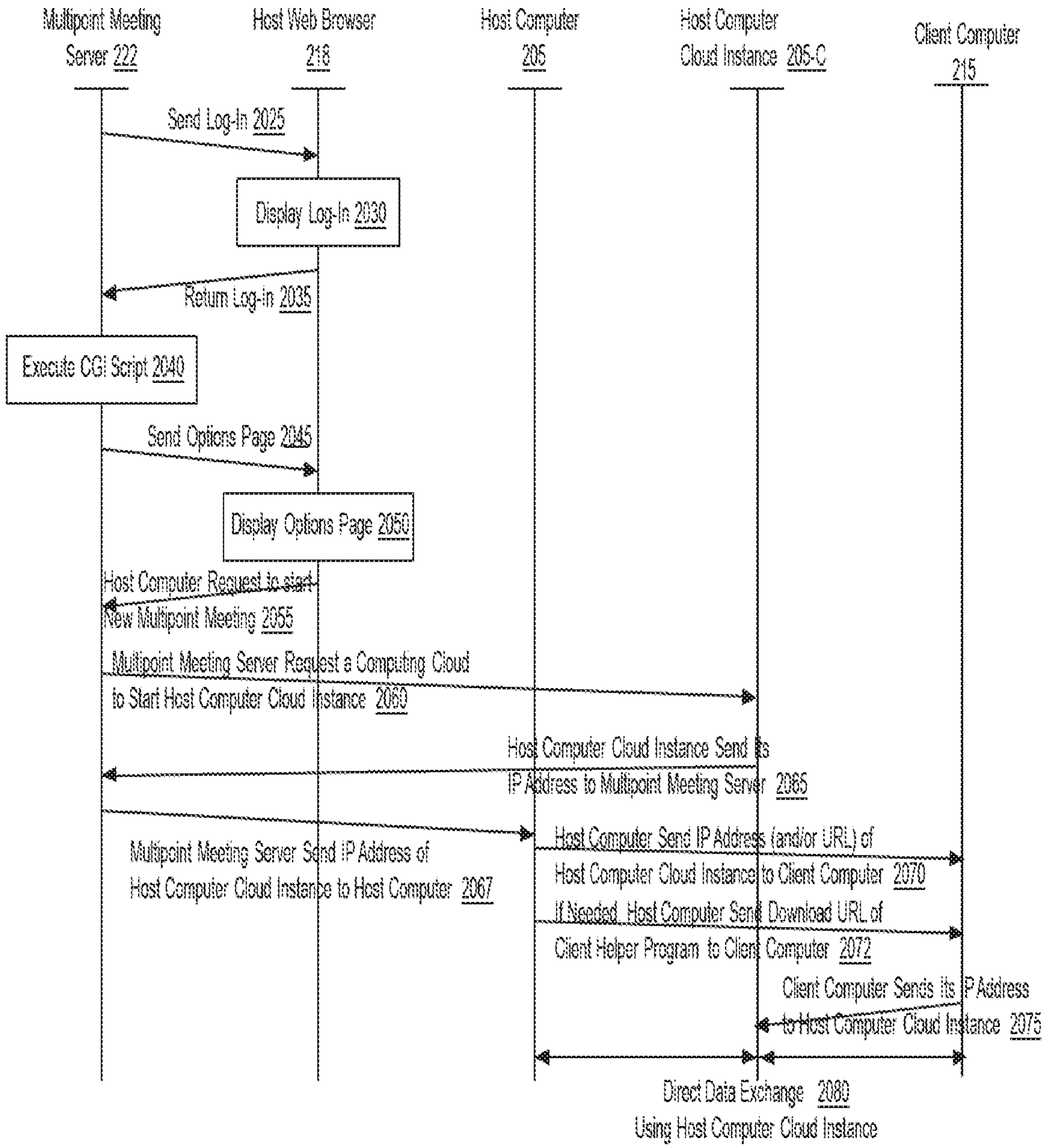

In accordance with additional embodiment of the present invention using the Internet user communications helper program 219, the event diagram in FIG. 4A (illustrating a process for providing direct network connections using cloud instance) is adapted as illustrated in FIG. 20D.

Referring to FIG. 20D, after host computer 205 logs in steps 2025 to 2050 at the multipoint meeting server 222, the host computer 205 requests 2055 the multipoint meeting server 222 to start a new multipoint meeting. The multipoint meeting server 222 requests a computing cloud (not shown) to start a host computer cloud instance 205-C; and the host computer cloud instance 205-C sends 2065 its IP address to the multipoint meeting server 222. The multipoint meeting server 222 receives 525 and does not store 525 in FIG. 20C (but may store later, not shown) the IP address of the host computer cloud instance 205-C, and then sends 2067 the latter IP address to the host computer 205. The storing or not storing of the above received IP address in the server 222A is further described in Cases E to H in FIG. 50 and Para [0342A], [0343A], [0344A], and [0345A] below.

The host computer 205 can use an Internet user communications helper program 219 to communicate with a client computer 215; and the host computer 205 invites the client computer 215 to join its multipoint meeting by sending 2070, via the Internet user communications helper program 219, the IP address (and/or, as described below in an example, the uniform resource locator (URL) of the host helper program 216-1) of host computer cloud instance 205-C to the client computer 215, which then send 2075 the latter's client computer 215 IP address to the host computer cloud instance 205-C. Using the client helper program 216-2 (and the IP address of host computer cloud instance 205-C), the client computer 215 then directly exchange data 2080 with the host computer 205 (using the host computer cloud instance 205-C (running the host helper program 216-1)), using direct connections 240, 245 and without passing through the multipoint meeting server 222.

As an example and referencing FIG. 20D, the host computer 205 can run BigBlueButton (as the host computer helper program 216-1), and uses Microsoft's Skype (as the Internet user communications helper program 219) to communicate with a client computer 215. The host computer 205 uses a Microsoft Skype instant message to invite the client computer 215 to join its BigBlueButton multipoint meeting, and sends 2070 the IP address (and/or the uniform resource locator (URL) of the host helper program 216-1) of the host computer cloud instance 205-C to the client computer 215. Please note that Internet user communications helper program 219 such as Microsoft's Skype typically uses URL (uniform resource locator) instead of IP address in its user-messages, since for a user, URL (such as http://www.MyExample.com) is more user-friendly than an IP address (such as http://101.102.103.104).

The client computer 215 uses the above URL (of the host helper program 216-1 of the host computer cloud instance 205-C, in the Skype instant message received from the host computer 205) to join the multipoint meeting of the host computer 205, and also the client computer 215 sends 2075 its IP address to the host computer cloud instance 205-C. Using an Internet browser such as Firefox (as the client helper program 216-2 for BigBlueButton) and the IP address of the host computer cloud instance 205-C, the client computer 215 then directly exchange data 2080 with the host computer 205 (using the host computer cloud instance 205-C running BigBlueButton as the host helper program 216-1), using direct connections 240, 245 and without passing through the multipoint meeting server 222.

If needed, the host computer 205 would have sent 2072 download URL information of the client helper program 216-2, via the Internet user communications helper program 219, to the client computer 215 for the latter client computer 215 to download the client helper program 216-2 and to use the IP address of the host computer cloud instance 205-C (to connect to host helper program 216-1) to join the multipoint meeting of host computer 205. If the client computer 215 can use the web browser 218 in FIG. 2B as the client helper program 216-2, e.g. in BigBlueButton multipoint meeting, the host computer 205 would not need to send download information of the client helper program 216-2, to the client computer 215.

It is noted that the IP address of the client computer 215 may be sent to the host computer 205 and/or the host computer cloud instance 205-C using indirect connection 225, 230, or indirect connection 227, 230 (instead of using direct network connection 240, 245 in FIGS. 20A and 20B) in further embodiments of the current invention, by editing (not shown) FIG. 20D (to use indirect connection 225, 230, or indirect connection 227, 230 to send the IP address of the client computer 215), and which editing are substantially similar (to).

(a) "editing of FIG. 8A to become FIG. 8B (and described in Para. 0140 above)", and to use indirect connection 225, 230 (in FIGS. 20A and 20B) to send the IP address of the client computer 215 (to the host computer 205 and/or the host computer cloud instance 205-C); and (b) "editing of FIG. 8A to become FIG. 8C (and described in Para. 0141 above)", and to use indirect connection 227, 230 (in FIGS. 20A and 20B) to send the IP address of the client computer 215 (to the host computer 205 and/or the host computer cloud instance 205-C).

Virtual Machines Considerations

A virtual machine (VM) is an emulation of a computer system. A virtual machine (VM) is an operating system OS or application environment that is installed on software which imitates dedicated hardware. The end user has the same experience using a virtual machine as they would have using dedicated hardware.

Specialized software can create virtual machines to emulate the PC host/client or server's CPU, memory, hard disk, network and other hardware resources completely, enabling the virtual machines to share the resources. Virtualization saves costs by reducing the need for physical hardware systems, and can improve system reliability when virtualization is used for hardware systems connected in a network. Virtual machines more efficiently use hardware, which lowers the quantities of hardware and associated maintenance costs, and reduces power and cooling demand.

Examples of popular specialized software for virtual machines include VMWare products from VMWare, Inc. For example, VMWare products such as VMWare player or workstation can create virtual machines to emulate completely the computing device 201 illustrated in FIG. 2B. As another example, if the host helper program 216-1 is BigBlueButton 0.9.0-Beta, VMWare products can create virtual machines to emulate the host helper program 216-1 hardware requirements:

Ubuntu 14.04 64-bit server (operating system)

4 GB of memory (8 GB is better) with swap enabled

Quad-core 2.6 GHz CPU (or faster)

500 GB of free disk space (or more) for recordings.

100 Mbits/sec bandwidth (symmetrical)

Virtual machines can be exported to and saved in computing clouds. The computing clouds can later launch (in step 518 in FIGS. 5 and 20C, and step 919 in FIGS. 9 and 12F) the saved virtual machines to run copies (of the saved virtual machines) as cloud instances for use by users. For example, VMWare virtual machines can be exported to (via Internet, and saved in special format in) Amazon's EC2 computing cloud, to later launch copies (of the saved virtual machines) and run as cloud instances (of the saved virtual machines in special format) at the users' request. As another example, if the host helper program 216-1 is BigBlueButton 0.9.0-Beta, VMWare virtual machines emulating its above hardware requirements can be exported to (via Internet, and saved in special format in) Amazon's EC2 computing cloud; an Amazon EC2 computing cloud then launches (in step 518 in FIGS. 5 and 20C, and step 919 in FIGS. 9 and 12F) a cloud instance of (a copy of) the above saved virtual machine (for the BigBlueButton 0.9.0-Beta) to start the new multipoint meeting for the user.

Multipoint Meeting Server and Website Cloud Instances

It is noted that cloud instances can be used to implement (in software) the multipoint meeting server 222 and/or multipoint meeting website 212 in accordance with another embodiment of the present invention. FIGS. 21A and 21B are block diagrams similar to FIGS. 20A and 20B, but multipoint meeting server cloud instance 222-C and/or multipoint meeting website cloud instance 212-C are used instead of multipoint meeting server 222 and/or multipoint meeting website 212 (e.g. in FIG. 20B), respectively.

The multipoint meeting server cloud instance 222-C and multipoint meeting website cloud instance 212-C (in FIGS. 21A and 21B) have advantages compared to the multipoint meeting server 222 and the multipoint meeting website 212 (e.g. in FIG. 20B), respectively; and these advantages are similar to those advantages for the host computer cloud instance 205-C compared to the host computer 205 described above.

For example, the bandwidth and computing resources available at the multipoint meeting server 222 and the multipoint meeting website 212 (e.g. in FIG. 20B) cannot easily change, when large numbers (e.g. one hundred thousands) of the host computers 205 and the client computers 215 attempt to set-up multipoint meetings, which will significantly and adversely affect the performance of the server and website services provided by the multipoint meeting server 222 and the multipoint meeting website 212, because large numbers of the host client computers 205 and the client computers 215 now have to share the limited bandwidth and computing resources available at the multipoint meeting server 222 and the multipoint meeting website 212. The multipoint meeting server cloud instance 222-C and the multipoint meeting website cloud instance 212-C in FIGS. 21A and 21B can dynamically or pre-arrange to have almost any bandwidth and hardware quantity (implemented in software) to support large numbers of the host computers 205 and the client computers 215, using methods (not shown) analogous to that for the host computer cloud instance 205-C detailed in FIGS. 11A, 12A, 12B to 12I, 13A, and 13B to 13G.

IP Address, URL, and Connection Information

It is noted that although the disclosure herein makes references in some embodiments to the IP address of the host computer cloud instance 205-C being received in the multipoint meeting server 222, the principles disclosed herein are applicable to any connection information, including IP address and uniform resource locator (URL).

As an example, in some embodiments (shown in FIGS. 2A, 2C, 2D, etc., and their associated descriptive texts above; e.g. descriptive texts above for FIG. 2A include in para [0026]: " . . . host computer cloud instance 205-C sends its IP address to the multipoint meeting server 222 via a network connection 227. The multipoint meeting server 222 receives the IP address of the host computer cloud instance 205-C . . . "), the IP address of the host computer cloud instance 205-C is used and is received in the multipoint meeting server 222.

As another example, in some other embodiments (using the same FIGS. 2A. 2C, 2D, etc., and using "URL" substituting for "IP address" in their said associated descriptive texts above; e.g. descriptive texts above in para [0026] for FIG. 2A: " . . . host computer cloud instance 205-C sends its IP address to the multipoint meeting server 222 via a network connection 227. The multipoint meeting server 222 receives the IP address of the host computer cloud instance 205-C . . . " becomes: " . . . host computer cloud instance 205-C sends its URL to the multipoint meeting server 222 via a network connection 227. The multipoint meeting server 222 receives the URL of the host computer cloud instance 205-C . . . "), the uniform resource locator (URL), in lieu of IP address, of the host computer cloud instance 205-C is used and is received in the multipoint meeting server 222.

As a further example, in still other embodiments (using the same FIGS. 2A, 2C, 2D, etc., and using "IP address and URL" substituting for "IP address" in their said associated descriptive texts above: e.g. descriptive texts above in para [0026] for FIG. 2A: " . . . host computer cloud instance 205-C sends its IP address to the multipoint meeting server 222 via a network connection 227. The multipoint meeting server 222 receives the IP address of the host computer cloud instance 205-C . . . " becomes: " . . . host computer cloud instance 205-C sends its IP address and URL to the multipoint meeting server 222 via a network connection 227. The multipoint meeting server 222 receives the IP address and URL of the host computer cloud instance 205-C . . . ") of the current invention, both the IP address and the URL of the host computer cloud instance 205-C are used and both are received in the multipoint meeting server 222 to provide direct network connections using cloud instance for multipoint meeting service over a computer network.

Host Computer and Client Computer Connection Information, and their Storage in Server It is also noted although the disclosure herein makes references in some embodiments to receiving the connection information, e.g. IP address, of the host computer cloud instance 205-C in the multipoint meeting server 222, an embodiment of the current invention may store or not store the connection information of the host computer 205 and/or client computer 215 in the multipoint meeting server 222.

FIG. 22 illustrates how an embodiment of the current invention (e.g. illustrated in FIGS. 2A, 2C, 2D, 2E, etc.) may implement the following four cases A, B, C, and D of how the connection information (i.e. IP address and/or URL) of the host computer 205 and the client computer 215 are or are not stored in the multipoint meeting server 222:

In case A in FIG. 22, the connection information (i.e. IP address and/or URL) of both the host computer 205 and the client computer 215 are not stored in the multipoint meeting server 222.

In case B, the connection information of the host computer 205 is not stored in the multipoint meeting server 222, and the connection information of the client computer 215 is stored in the multipoint meeting server 222.

In case C, the connection information of the host computer 205 is stored in the multipoint meeting server 222, and the connection information of the client computer 215 is not stored in the multipoint meeting server 222.

In case D, the connection information of both the host computer 205 and the client computer 215 are stored in the multipoint meeting server 222.

It is noted that in above case A in FIG. 22, by not storing the connection information (i.e. IP address and/or URL) of both the host computer 205 and the client computer 215 in the multipoint meeting server 222, reduces privacy concerns and reduces risk of the host computer 205 and the client computer 215 to Internet hacker attacks and security breaches. In addition, this beneficially reduces the computing requirements of the multipoint meeting server 222, particularly as additional host and client computers 205, 215 respectively utilize the multipoint meeting services offered by the multipoint meeting server 222, as described in detail below.

In a conventional three-tier architecture such as that depicted FIG. 11A, the multipoint meeting server 120 obtains and stores both the IP address of the host computer 205 and the IP address of the client computer 215. However, as described above in case A in FIG. 22, the multipoint meeting server 222 does not store the connection information (i.e. IP address and/or URL) of the host computer 205 or of the client computer 215. Rather, the connection information (i.e. IP address and/or URL) of the host computer cloud instance 205-C is received and is not stored (but may be stored later) in the multipoint meeting server 222. This beneficially reduces the computing requirements of the multipoint meeting server 222, particularly as additional host and client computers 205, 215 respectively utilize the multipoint meeting services offered by the multipoint meeting server 222. As an illustrative example, it may be assumed that each host computer 205 has multipoint-meeting with one-thousand client computers 215. If there are one-thousand host computers 205 utilizing the multipoint meeting server 222, the multipoint meeting server 222 must store one-thousand connection information (i.e. IP address and/or URL, one per host computer cloud instance 205-C). However, in a conventional three-tier architecture such as that depicted in FIG. 11A, a multipoint meeting server 120 would need to store ten-million and one thousand connection information (i.e. IP address and/or URL, for each of the one thousand host computer 205: one for the host computer 205 plus one thousand for each host computer's one thousand client computers 215). Other computing resource requirements may scale similarly to the above example, thereby making direct network connections using cloud instance in accordance with the present invention well suited to accommodating large numbers of host computers 205 and client computers 215.

Similarly in above case B and case C in FIG. 22, by not storing the connection information (i.e. IP address and/or URL) of the host computer 205 or the client computer 215 in the multipoint meeting server 222, reduce privacy concerns and reduce risk of the host computer 205 or the client computer 215 to Internet hacker attacks and security breaches. In addition, this beneficially reduces (in less amounts) the computing requirements of the multipoint meeting server 222, particularly as additional host and client computers 205, 215 respectively utilize the multipoint meeting services offered by the multipoint meeting server 222, as described above.

In above case D in FIG. 22, both the host computer 205 and the client computer 215 store their connection information (i.e. IP address and/or URL) in the multipoint meeting server 222, and both do not reduce privacy concerns and do not reduce risk of the host computer 205 and the client computer 215 to Internet hacker attacks and security breaches. In addition, both do not change the computing requirements of the multipoint meeting server 222 (compared to conventional three-tier architecture such as that depicted FIG. 11A).

Above four cases A, B, C, and D (of how the connection information, i.e. IP address and/or URL, of the host computer 205 and the client computer 215 are or are not stored in the server 222A) can be used in an embodiment of the current invention (e.g. from FIGS. 2A, 2C, 2D, 2E, etc.) to provide direct network connections using cloud instance for multipoint meeting service over a computer network.

Unique Sub-Domain Address as Alias for Cloud Instance URL

When a computing cloud launches a new cloud instance, the computing cloud assigns a cloud instance URL or an I.P. address to the cloud instance so that a user may access the cloud instance. However these URLs or I.P. addresses are not user-friendly. A user may create a CNAME record (Canonical Name record) in DNS (Domain Name System) to redirect a user-friendly and unique sub-domain address to the cloud instance URL or I.P. address. A CNAME record specifies that a domain name (e.g. a unique sub-domain address) is an alias for another domain (e.g. a cloud instance URL) or I.P. address.

In this way, a host computer 205 may specify a user-friendly and unique sub-domain address to point transparently to the host computer cloud instance 205-C, i.e. setting up a sub domain address to point transparently to the URL of the host computer cloud instance 205-C, so it isn't simply a redirection, and so that the host computer 205 may use the user-friendly and unique sub-domain address to communicate 240 with its host computer cloud instance 205-C.

For a multi instance cloud and/or a multi tenancy cloud, as explained above in some embodiments of the current invention, the multi instance cloud 205-C and/or multi tenancy cloud 205-C may need to distinguish between multiple host computer cloud instances 205*a*-C, 205*b*-C, . . . , 205*n*-C in FIG. 14 above to ensure that data is transmitted only to one or more proper destinations. For example, the popular cloud computing offering, Amazon EC2, provides an external and internal IP address for its cloud instances, so Amazon EC2 may need to distinguish between multiple host computer cloud instances 205*a*-C, 205*b*-C, . . . , 205*n*-C in FIG. 14 to ensure that data is transmitted only to one or more proper destinations. The latter data is ensured to transmit only to one or more proper destinations, in some embodiments of the current invention, by having the multipoint meeting server 222 assign 1570 (in FIG. 15A above) and send 1570 a unique meeting ID to the host computer 205*n*, and following the accompanying methods described above in steps 1570 to 1590 in FIG. 15A.

Now referring to FIG. 23A and FIG. 23B, the five examples of cases I to V illustrate the use of five unique user-friendly sub-domain addresses as aliases for the URLs of the five different host computer cloud instances 205-C (hosted by the popular Amazon computing cloud):

- As examples in cases I to V in FIGS. 23A and 23B, the sub-domain addresses are user-friendly, unique, and do not change over time.
- As an example in case I, the sub-domain address "test.moodlecloud.com" is user-friendly, unique, and unchanging alias for the I.P. address: "54.201.157.224" and the URL: "us-moodlecloud-100165812.us-west-2.elb.amazonaws.com" of a host computer cloud instance 205-C (not shown, and use unique ID example: Ia1B2c3)
- As another example in case V, the sub-domain address "moodle.moodlecloud.com" is user-friendly, unique, and unchanging alias for the I.P. address: "54.68.74.224" and the URL: "us-moodlecloud-100165812.us-west-2.elb.amazonaws.com" of another host computer cloud instance 205-C (not shown, and use unique ID example: VE3f2g1)
- As examples in cases I to V, the connection information (i.e. IP address and/or URL) of the five host computer cloud instances 205-C (not shown) are not user-friendly, not unique, and may change over time, as the computing cloud operation requirements can require their changes over time, as underlying physical hardware and network change over time.
- For example in cases IV and V, the two I.P. addresses were the same (in early September, 2015): 54.68.74.224. For example in case II, the I.P. address changed from "52.64.64.171" in early September 2015 to a different I.P. address: "54.252.168.98" by mid-September 2015. For example in cases I, III, IV, and V, Amazon uses the same URL: "us-moodlecloud-100165812.us-west-2.elb.amazonaws.com" which URL is thus not unique.
- As examples in cases I to V, the unique IDs when used with the I.P. addresses and/or the URLs allow Amazon to distinguish between cases I to V; and using unique IDs allow a computing cloud to distinguish between multiple host computer cloud instances 205*a*-C, 205*b*-C, . . . , 205*n*-C in FIG. 14 to ensure that data is transmitted only to one or more proper destinations.

Above examples of cases I to V (of using sub-domain address as alias for the connection information, i.e. IP address and/or URL, of the host computer cloud instance 205-C, and/or using unique ID for the connection information of the host computer 205 and of the host computer cloud instance 205-C) can be adapted and used in an embodiment of the current invention (e.g. from FIGS. 2A, 2C, 2D, 2E, etc.) to provide direct network connections using cloud instance for multipoint meeting service over a computer network.

Direct Network Connections Using Cloud Instance for Internet Application Services The present invention also relates to creating direct network connections for Internet application services within computer networks. More specifically, the present invention also relates to creating direct network connections for Internet application services between computers using cloud instance via the Internet.

The present invention overcomes similar drawbacks, described in Para [0003] and [0004], for conventional two-tier and three-tier architectures for creating network connections for multipoint meeting service between two computers, when similar drawbacks (for conventional two-tier and three-tier architectures for creating network connections) appear in Internet application services between two computers on the Internet.

Direct network connections using cloud instance for Internet application service is provided between two or more computers on a network to facilitate a wide variety of activities, including website service (e.g. Amazon.com), database service, business software service (e.g. Oracle Database, Adobe Media Server, etc.), desktop applications service (e.g. Microsoft Office, CoreDRAW, etc.), software infrastructure service (e.g. Cisco Cloud Services Router. LAMP Stack, etc.), developer tools service (e.g. Bitnami Cloud Hosting, etc.), etc. A first computer sends a request to publish and/or start an Internet application service to a server. The server requests a computing cloud to launch-orassign a cloud instance for the first computer. The first computer cloud instance is communicatively coupled to the first computer. The first computer cloud instance sends its connection information to the server. The server receives the connection information for the first computer cloud instance. A second computer may make a request to the server to join the Internet application service of the first computer. The server sends to the second computer the connection information it has received and has not stored (but may store later) for the first computer cloud instance. The second computer uses the connection information for the first computer cloud instance to send to the first computer cloud instance connection information for the second computer via direct network connection. From this point on, the first computer cloud instance and the second computer exchange data for the Internet application service via a direct network connection, independently of the server and independent of the first computer. The first computer is only needed to request the server to publish and/or start the Internet application service, and is not needed for the data exchange between the first computer cloud instance and the second computer.

Please note that in embodiments of the present invention, a computing cloud (requested by a server) to launch-or-assign a cloud instance for a first (host) computer (or for a (second) client computer, e.g. in Para [0318] below) means that (i) the computing cloud may launch a new cloud instance for the first computer (or for the client computer), or (ii) the computing cloud may assign an existing cloud instance (that meets the requirements-in-the-request, including hardware and bandwidth requirements (if any), of the server) for the first computer (or for the client computer) . . . for example in Para [0222] and in other Para such as Para [0082], [0121], [0124], [0129], . . . [0231D], [0291], [0318], [0445], . . . etc.

The current invention on using cloud instance for Internet application services is described in detail below.

Figure 24A:
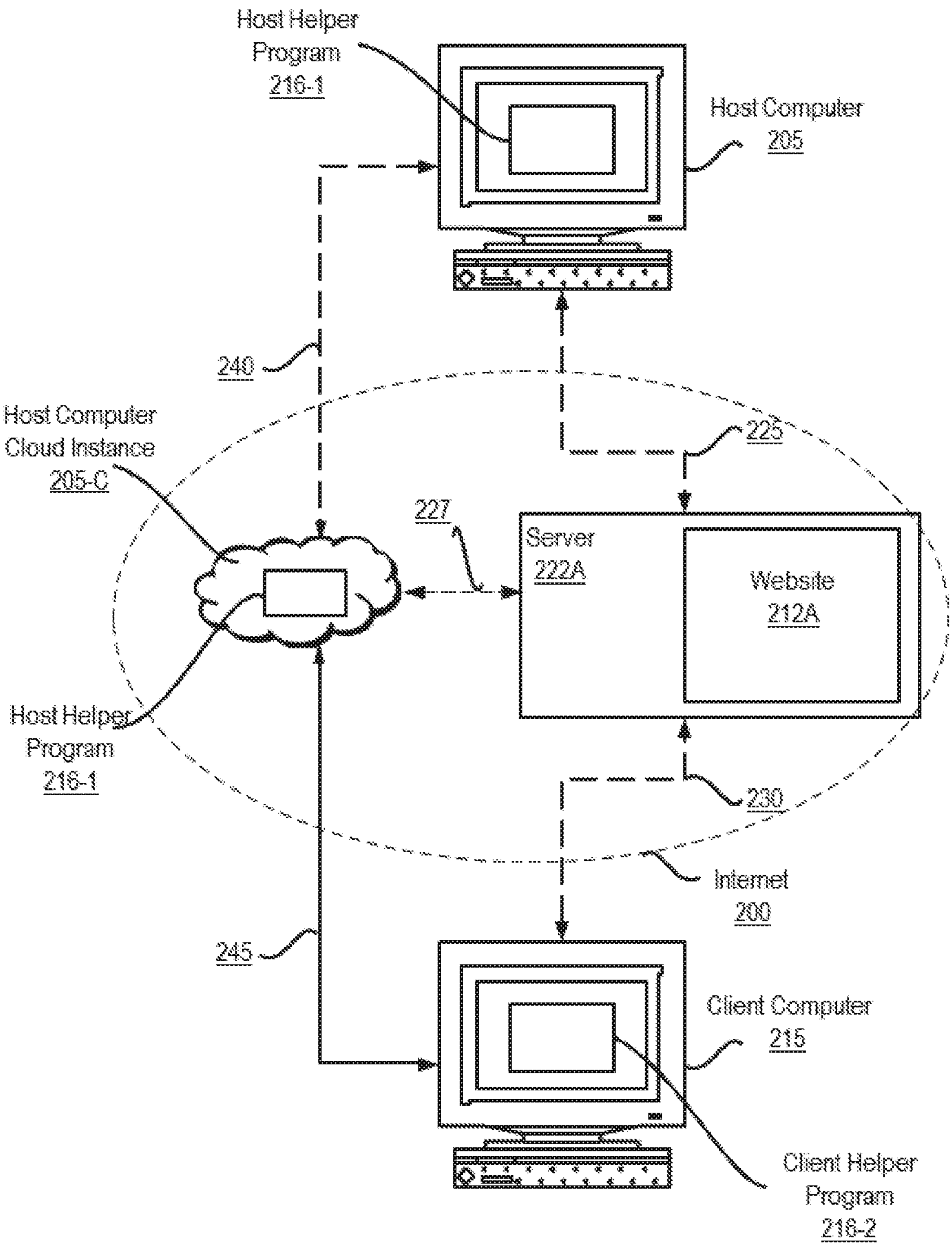
FIGS. 24A, 24B, 25A, 25B 25C, 25D are block diagrams illustrating providing direct network connections using cloud instance for Internet application service over a computer network in accordance with another embodiment of the present invention.

FIG. 24A is described below with FIGS. 27A to 29C. FIG. 25A illustrates a direct network connection using cloud instance which facilitates providing Internet application service between a host computer cloud instance 205-C and multiple client computers 215 in accordance with still another embodiment of the present invention. The embodiment illustrated by FIG. 25A is adapted from FIG. 2D, and comprises a host computer 205*a*, multiple client computers 215*a*, 215*b*, . . . 215*n*, and a server 222A hosting a website 212A. In the direct network connection using cloud instance providing Internet application service depicted in FIG. 25B, the client computers 215*a*, 215*b*, . . . 215*n* are able to join the Internet application service of the host computer cloud instance 205*a*-C via the direct network connection 245, and the host computer 205*a* is not needed.

Figure 25A:
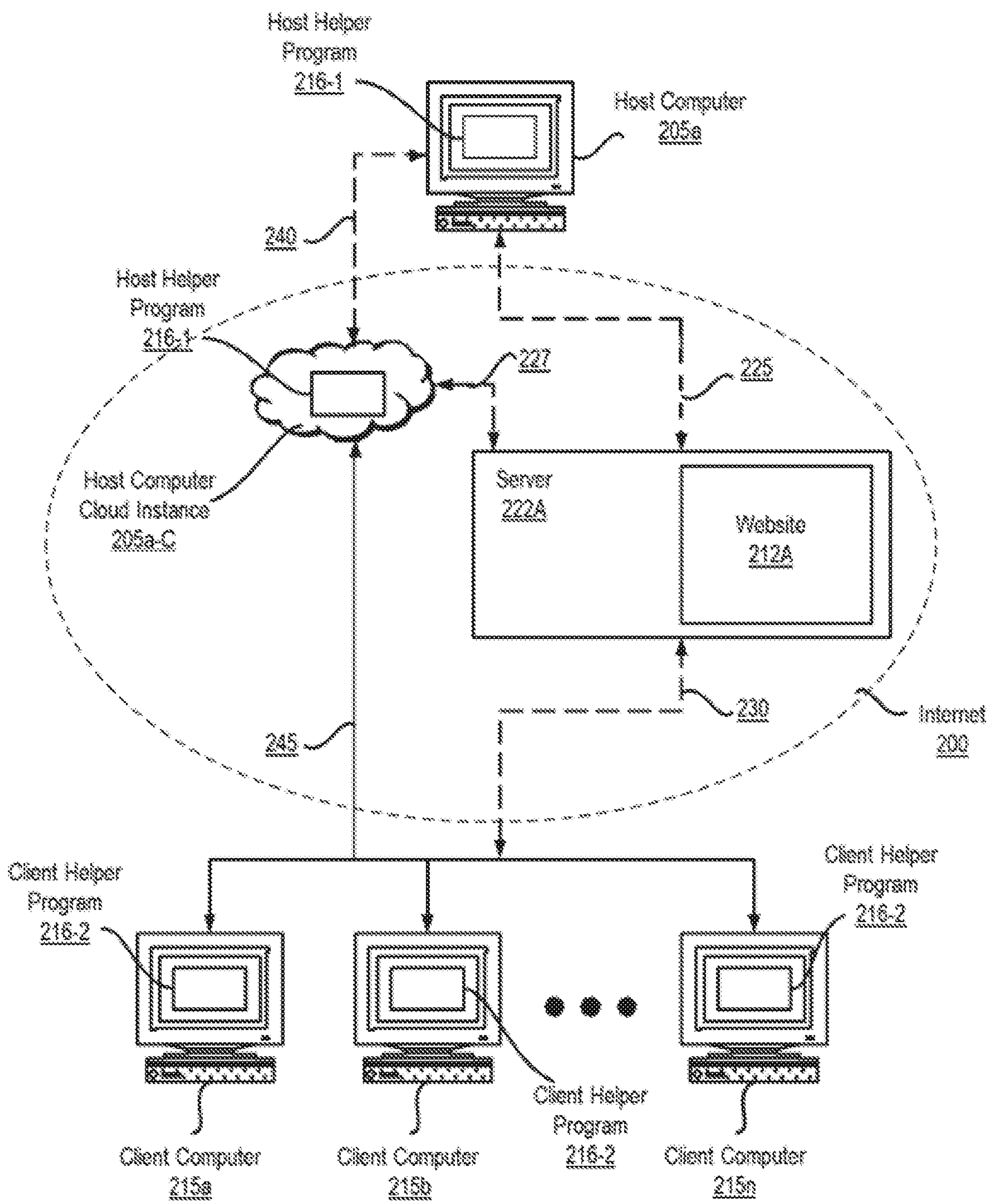

In one embodiment, providing Internet application service is facilitated using a process similar to that described in reference to the embodiment of FIG. 25A. The computers 205*a*, 215*a*, 215*b*, . . . 215*n* are each individually connected to the Internet 200, and a primary purpose of the server 222A is to provide the IP address of the host computer cloud instance 205*a*-C to the client computers 215*a*, 215*b*, . . . 215*n*. The host computer 205*a* accesses the website 212A and requests to publish and/or start an Internet application service. The server 222A requests a computing cloud (e.g. computing cloud 198 in FIG. 26C and FIG. 26D) to launch-or-assign a host meeting cloud instance 205*a*-C, which sends its IP address to the server 222A via a network connection 227. The server 222A receives the IP address of the host computer cloud instance 205*a*-C. The server 222A also sends, via a network connection 227, the IP address of the host computer 205*a* to the host computer cloud instances 205*a*-C, which is communicatively coupled to its host computer 205*a* via the direct connection 240. When the client computers 215*a*, 215*b*, . . . 215*n* subsequently accesses the website 212A to request joining the Internet application service of the host computer 205*a*, the server 222A sends to the client computers 215*a*, 215*b*, . . . 215*n* the IP address of the host computer cloud instance 205*a*-C via a network connection 230.

Once the client computers 215*a*. 215*b*, . . . 215*n* have the IP address of the host computer cloud instance 205*a*-C, it may send data directly to the host computer cloud instance 205*a*-C via the direct network connection 245. In particular, the client computers 215*a*. 215*b*, . . . 215*n* may send to the host computer cloud instance 205*a*-C the IP address of the client computers 215*a*. 215*b*, . . . 215*n* themselves via the direct network connection 245. Thus, both host computer cloud instance 205*a*-C, and client computers 215*a*, 215*b*, . . . 215*n* are able to obtain one another's IP addresses and create a direct network connection 245. From this point onwards the server 222A need not be involved, and all subsequent data exchange related to the client computers 215*a*, 215*b*, . . . 215*n* joining the Internet application service of the host computer cloud instance 205*a*-C may take place via the direct network connection 245, and the host computer 205*a* is not needed.

"Not-Decrease"-Virtualized-Hardware (in Cloud Instance)

Para [0226C]-to-[0226K] below documents that "non-new"-("old")-matters throughout provisional application (filed on 2015 Dec. 30) and non-provisional application (filed on 2016 Dec. 30) support (in bold in Para [0226C]-to-[0226K] below) "Not-Decrease"-virtualized-hardware: (a). ("Not-Decrease"-virtualized-hardware) in FIGS. 39C-and-39D, and (b). ("Not-Decrease"-virtualized-hardware) in FIG. 56's (or (renumbered)-FIG. 39A's) Tables-1-and-2-and-3). (Support-("Not-Decrease"-virtualized-hardware))-examples include following "non-new"-("old")-matters from provisional (filed on 2015 Dec. 30) and "non-new"-("old")-matters from non-provisional (filed on 2016 Dec. 30) in Para [0226C]-to-[0226K] below.

Please note that limitation of "to not-decrease the virtualized-hardware" is (limit-to "not-decrease") to multiples-of-1X-(virtualized)-hardware (illustrated in FIG. 39's (or FIG. 39A's) Table-'s row-C-and-columns-III-to-X: examples include "1X, 2X, 4X, 20X, 40X, 100X, 400X, 4000X" respectively. For Moodle software, 1X-hardware is illustrated-(and-summarized) in FIG. 39's (or FIG. 39A's) Table 2's row-B-and-column-II.)

Para [0226C]-to-[0226K] below documents that "non-new"-("old")-matters throughout provisional (filed on 2015 Dec. 30) and non-provisional (filed on 2016 Dec. 30) support (in bold in Para [0226C]-to-[0226K] below) "Not-Decrease"-virtualized-hardware. Please note that "Not-Decrease"-virtualized-(1X)-hardware in cloud-instance means-(and-its-implementation-may-use): (a) "(Not-Decrease-or)-Increase"-virtualized-(1X)-hardware (illustrated in FIG. 39C), and/or (b) "(Not-Decrease-or)-keep-SAME/Not-Change"-virtualized-(1X)-hardware (illustrated in FIG. 39D):

(i) ("non-new"-("old")-matter's) Para [0123] (lines 2-to-10) supports "Not-Decrease"-(Increase)-virtualized-hardware (e.g. in FIG. 39C) as:

("non-new"-("old")-matter's) Para [0123] (lines 2-to-10):) "In cloud instance computing, single hardware is implemented into software and run on top of multiple computers. Cloud instance computing is highly dynamic, enabling users not to worry about how many virtual machines can fit on a single hardware application without causing major slowdowns during peak hours. If performance maxes out, one can simply add more computers. Resources can be freely allocated to and from other computers by the software, enabling maximum utilization and helping to prevent crashes. If the virtual machine grows beyond the limits of a single machine, cloud instance computing allows the cloud software to be easily expanded to span multiple machines" (in Para [0123] lines 2-to-10).

(ii) ("non-new"-("old")-matter's) Para [0124] (lines 1-to-7) supports "Not-Decrease"-(Increase)-virtualized-hardware (e.g. in FIG. 39C) as:

("non-new"-("old")-matter's) Para [0124] (lines 1-to-7):) "Amazon EC2 (Amazon Web Services Elastic Compute Cloud), provides a wide selection of instance types optimized to fit different use cases. Instance types comprise varying combinations of CPU, memory, storage, and networking capacity and give one the flexibility to choose the appropriate mix of resources for one's applications. Each instance type includes one or more instance sizes, allowing one t scale one's resources to the requirements of one's target workload" (in ("non-new'-("old")-matter's) Para [0124] lines 1-to-7).

(iii) ("non-new"-("old")-matter's) Para [0408] (lines 1-to-4) supports "Not-Decrease"-(keep-SAME/Not-Changed)-virtualized-hardware (e.g. in FIG. 39D) as:

("non-new"-("old")-matter's Para [0408] (lines 1-to-4):) "FIG. 57A (or FIG. 40A) is a flowchart illustrating how the host computer 205 can add steps 5710 to 5780 in FIGS. 57B, 57E, 57C, and 57D respectively, to request the server 222A to request a computing cloud (not shown) to l the needed number of single hardware in its host computer cloud instance" (in ("non-new"-("old")-matter's) Para [0408] lines 1-to-4).

(iv) ("non-new"-("old")-matter's) FIG. 57A's (or FIG. 40A's) step-5720 supports "Not-Decrease"-(Increase)-virtualized-hardware (e.g. in FIG. 39C) as:

("non-new"-("old")-matter's FIG. 57A's (or FIG. 40A's) step-5720's) "host computer indicates . . . if max. # is exceeded. #-of-hardware to add (to host computer cloud instance)" (in ("non-new"-("old")-matter's) FIG. 57A's (or FIG. 40A's) step-5720)

(v) ("non-new"-("old")-matter's) Para [10409] (lines 5-to-9) supports "Not-Decrease"-(Increase)-virtualized-hardware (e.g. in FIG. 39C) as:

("non-new"-("old")-matter's Para [0409] (lines 5-to-9):) "The host computer 205 may also specify in the same step 5720 when the maximum number of attendees is exceeded, the number of single hardware (implemented in software) to add to host computer cloud instance 205-C" (in ("non-new"-("old")-matter's) Para 104091 lines 5-to-9).

(vi) ("non-new"-("old")-matter's) Para [0410] (lines 1-to-7) supports "Not-Decrease"-(Increase)-virtualized-hardware (e.g. in FIG. 39C) as:

("non-new"-("old")-matter's Para [0410] (lines 1-to-7):) "The default case is that the server 222A will use the linear formula in Table (1) of FIG. 56 (or of FIG. 39A) to start with one single hardware (implemented in software) in the host computer cloud instance 205-C, and when the new user in step 5820 (in FIG. 58A (or in FIG. 41A)) exceeds the maximum concurrent user number (for the then current number of single hardware), add 10% of the then current number of single hardware (rounded up-to next integer) to the host computer cloud instance 205-C, if the host computer 205 does not specify anything in step 5720 (in FIG. 57A)" (in ("non-new"-("old")-matter's) Para [0410] (lines 1-to-7).

(vii) ("non-new"-(old")-matter's) FIG. 56's (or FIG. 39A's) Table-'s rows-B-and-C supports "Not-Decrease"-(Increase)-virtualized-hardware (e.g. in FIG. 39C) as:

("non-new"-("old")-matter's FIG. 56's (or FIG. 39A's) Table-1's rows-B-and-C:) "# of hardware implemented (in heading in Table-1's row-C-and-column-I) increases (in #-of-hardware-(implemented) in Table-1's row-C-and-columns-III-to-X: examples include 1X, 2X, 4X, 20X, 40X, 100X, 400X, 4000X respectively) as maximum-concurrent users (in heading in Table-1's row-A-and-column-III) increases (in maximum-concurrent-users in Table-1's row-B-and-columns-II-to-X: examples include 100, 200, 400, 2000, 4000, 10000, 40000, 400000 respectively) in ("non-new"-("old")-matter's) FIG. 56's (or FIG. 39A's) Table-1's rows-B-and-C.

(viii) ("non-new"-("old")-matter's) FIG. 56's (or FIG. 39A's) Table 1's note-(a) illustrate "Not-Decrease"-(Increase)-virtualized-hardware (e.g. in FIG. 39C) as:

("non-new"-("old")-matter's FIG. 56's (or FIG. 39A's) Table 1's note-(a):) "Linear" formula for # of hardware (implemented in cloud instance)="Maximum # of concurrent users expected"/100 (if fraction, round up to next integer) (in ("non-new"-("old")-matter's) FIG. 56's (or FIG. 39A's) Table-1's note-(a) ).

(ix) ("non-new"-("old")-matter's) FIG. 56's (or FIG. 39A's) Tables 2-and-3 illustrate "Not-Decrease"-(Increase)-virtualized-hardware (e.g. in FIG. 39C) as:

("non-new"-("old")-matter's FIG. 56's (or FIG. 39A's) Tables 2-and-3:) Table-2's 1X-hardware (for 100 attendees in Table-2's row-B-and-column-I) is "4 GB memory . . . Dual-core . . . 80 GB disk . . . 100 Mbits/sec. bandwidth , , ," (in Table 2's row-B-and-column-II), and increases to Table-3's 8X-hardware (for 800 attendees in Table-3's row-B-and-column-I) which (8X-hardware) is "32 GB memory . . . 8 CPU's (EACH Dual-core) . . . 640 GB disk . . . 800 Mbits/sec. bandwidth , , ," (in Table-3's row-B-and-column-II) (in ("non-new"-("old")-matter's) FIG. 56's (or FIG. 39A's) Tables 2-and-3).

Figure 25B:
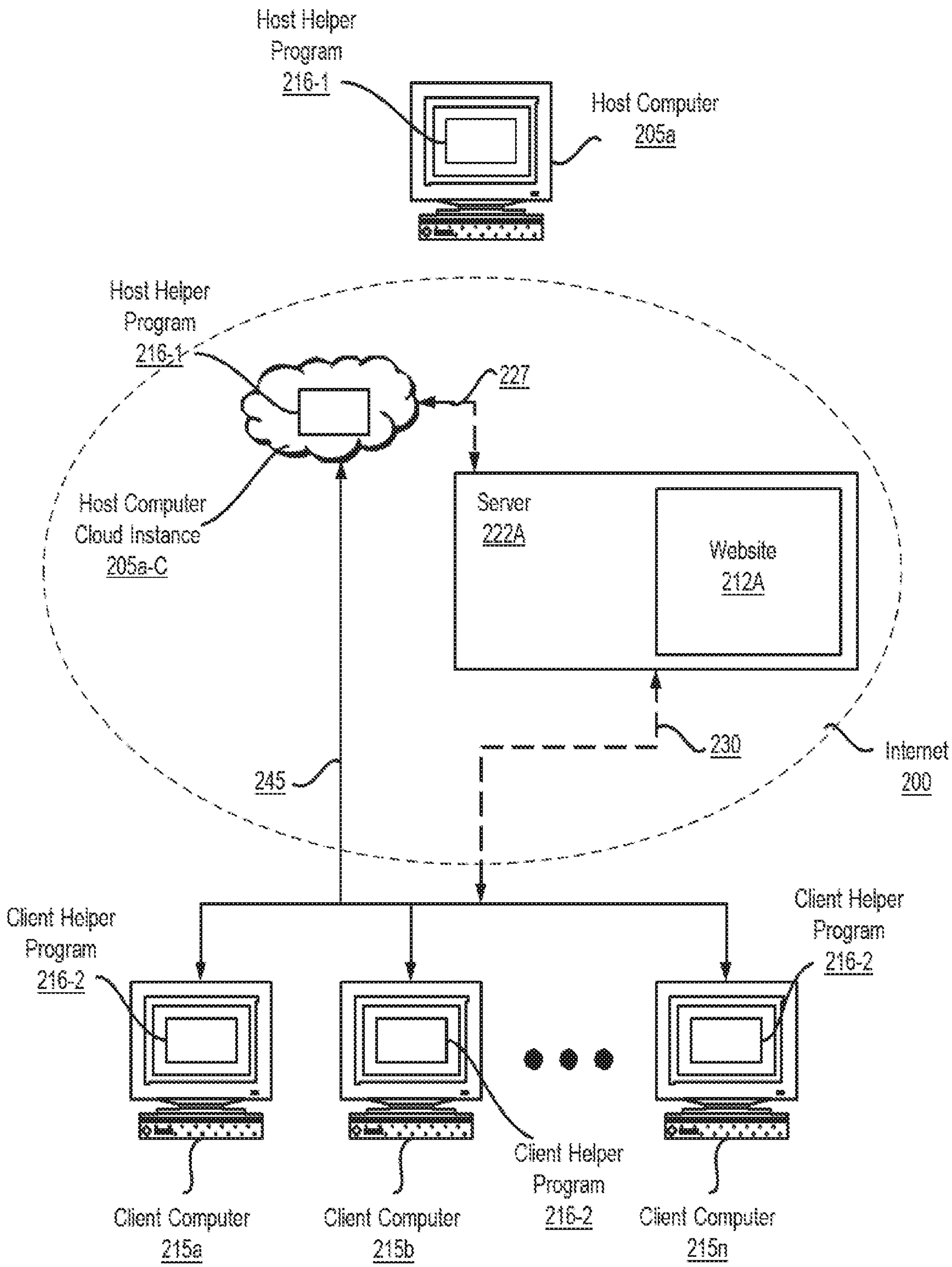
Figure 25C:
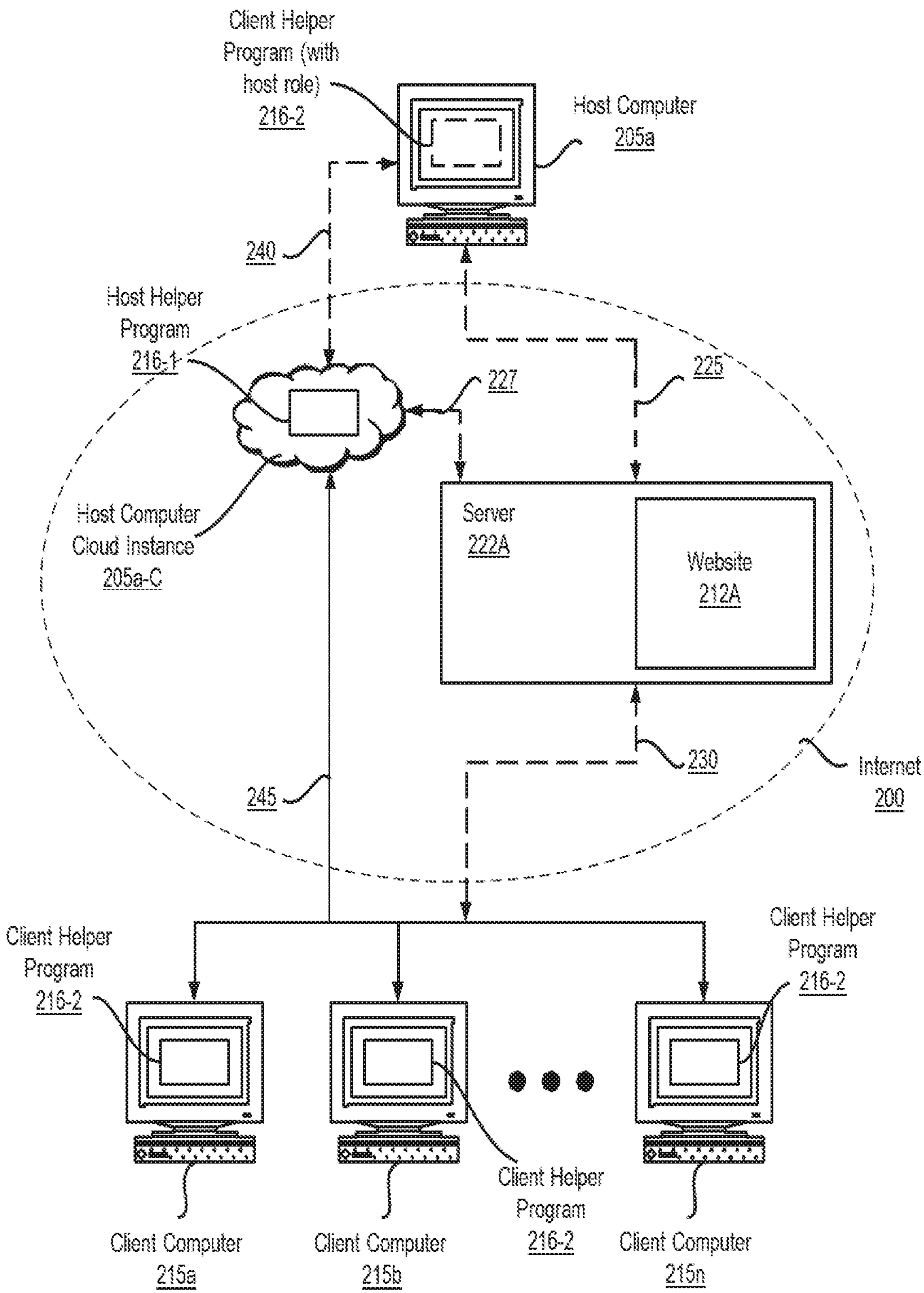

In additional embodiment of the present invention, the direct network connections using cloud instance illustrated in FIG. 25A and the accompanying methods described herein are adapted as illustrated in FIG. 25C. In one embodiment illustrated in FIG. 25C, the host computer cloud instance 205*a*-C is single hardware implemented into software running on top of single or multiple computers; and the single hardware is a powerful general purpose computer meeting the hardware and bandwidth requirements specified by the host helper program 216-1 for the Internet application service. For example, if the host helper program 216-1 is the Moodle learning management system Internet application (from the Australian company Moodle Pty Ltd.), the hardware and bandwidth requirements for 100 concurrent users are:

Ubuntu 14.04 64-bit server (operating system)
4 GB of memory (8 GB is better) with swap enabled
Dual-core 2.8 GHz CPU (or faster)
80 GB of free disk space (or more) SCSI hard drive
100 Mbits/sec bandwidth (symmetrical).

Para [0227] shows that if the host helper program 216-1 is Moodle LMS, for maximum 100 users, single (virtualized)-(1X)-hardware (illustrated in FIG. 39A's Table-2) is recommended and is shown as (host-computer-cloud-instance)-"1X-(H/W)-Instance" (in FIG. 39B's Table-2's row-E-and-column-III).

As illustration of the Moodle Internet application service's virtualized-hardware, FIG. 39A shows tables of number of (virtualized)-hardware (implemented in host computer cloud instance 205-C) for maximum Moodle users from 100 to 400,000, if host helper program is Moodle learning management system Internet application. FIG. 39A allows the server 222A (and/or computing cloud 198 in FIG. 26C) dynamically or via prior-planning to have the needed bandwidth and computing resources for the host computer cloud instance 205-C, when varying numbers (from one to 400,000) of the client computers 215 are joining the Moodle learning management system Internet application hosted by the host computer 205, as explained below.

It is noted that in scaling-up to support 100+ client computers 215 (to join the Moodle learning management system hosted by the host computer 205, in addition to number of hardware, needed bandwidth and other computing resources,) the software (e.g. Moodle) must support (and should be tested, if possible, to support) the higher number of 100+ client computers 215.

As illustrated in Tables 1-and-2 (of FIG. 39A), the host computer cloud instance 205-C (in FIG. 24A) would implement-(virtualize) above (Para [0227]'s) single-(1X)-hardware in software and run on top of a single physical computer, for maximum concurrent users of 100 (including host computer cloud instance 205-C (in FIG. 24A)). When the host computer 205 (in FIG. 24A) requests to start a new Internet application service, the server 222A requests a computing cloud 198 to launch-or-assign the host computer cloud instance 205-C.

FIG. 39A's Table-1's row-C for "1X-to-4000X"-single-hardware" (for virtualized-hardware implemented in host computer cloud instance 205-C, using Table-1's note-(a)'s linear formula) illustrates that as number-of-users increases from 100 concurrent users (in row-B-and-column-l) to 400,000 concurrent users (in row-B-and-column-X), the number of hardware needs to increase (using linear formula) from 1X (row-C-and-column-III) to 4000X (row-C-and-column-X) respectively:

Table-1's note-(a): "Linear" formula for # of hardware (implemented in cloud instance)="Maximum # of concurrent users expected"/100.

Implementing FIG. 39B's Table-1's row-C's "1X, 2X, 4X, , , , 100X, 400X, 4000X"-hardware (in Table-1's row-C-and-columns-III-to-X respectively) is shown in FIG. 39B's Table-2's rows-E-to-M respectively.

(i). FIG. 39B's Table-2's row-E illustrates implementing-(virtualizing) (Para [0227]'s) 1X-hardware (using Table-1's "Linear" formula, and row-C's "1X"-hardware (in Table-1's row-C-and-column-III), and "1X-hardware (from FIG. 39A's Table-2)"):

100 (maximum users); 1X-hardware implemented: 1X-(H/W)-Instance (instance-name in Table-2's row-E-and-column-III, for easy-reference in patent-application); (in row-E-and-columns-I-to-II respectively).

Virtualized-H/W-Implemented: 2 CPU (core); 8 Gigabyte (Memory); 80 GB (Disk): 100 Mbits/sec. (Bandwidth); (in row-E-and-columns-IV-to-VII respectively);

=1*1X-hardware (from FIG. 39A's Table-2)

=1*"2 CPU (core); 8 GB (Memory); 80 GB (Disk); 100 Mbits/sec. (Bandwidth)"

(ii) FIG. 39B's Table-2's row-F illustrates implementing-(virtualizing) 2X-hardware (using Table-'s "Linear" formula, and row-C's "2X"-hardware (in Table-1's row-C-and-column-IV), and "1X-hardware (from FIG. 39A's Table-2)":

200 (maximum users); 2X-hardware implemented; 2X-(H/W)-Instance (instance-name in Table-2's row-F-and-column-III, for easy-reference in patent-application); (in row-F-and-columns-I-to-III respectively).

Virtualized-H/W-Implemented: 4 CPU (core): 16 Gigabyte (Memory); 160 GB (Disk); 200 Mbits/sec. (Bandwidth); (in FIG. 39B's Table-2's row-F-and-columns-IV-to-VII respectively);

=2*1X-hardware (from FIG. 39A's Table-2)

=2*"2 CPU (core); 8 GB (Memory); 80 GB (Disk); 100 Mbits/sec. (Bandwidth)"

(iii) FIG. 39B's Table-2's row-G illustrates implementing-(virtualizing) 4X-hardware (using Table-1's "Linear" formula, and row-C's "4X"-hardware (in Table-1's row-C-and-column-IV), and "1X-hardware (from FIG. 39A's Table-2)":

400 (maximum users); 4X-hardware implemented; 4X-(H/W)-Instance (instance-name in Table-2's row-G-and-column-III, for easy-reference in patent-application): (in row-G-and-columns-I-to-III respectively).

Virtualized-H/W-Implemented: 8 CPU (core); 32 Gigabyte (Memory); 320 GB (Disk); 400 Mbits/sec. (Bandwidth); (in FIG. 39B's Table-2's row-G-and-columns-IV-to-VII respectively);

=4*1X-hardware (from FIG. 39A's Table-2)

=4*"2 CPU (core); 8 GB (Memory); 80 GB (Disk): 100 Mbits/sec. (Bandwidth)"

(iv) FIG. 39B's Table-2's row-H illustrates implementing-(virtualizing) 8X-hardware (using Table-1's "Linear" formula, and FIG. 39A's Table-2's "1X-hardware", and FIG. 39A's Table-3's "8X-hardware")":

800 (maximum users); 8X-hardware implemented: 8X-(H/W)-Instance (instance-name in Table-2's row-H-and-column-III, for easy-reference in patent-application); (in row-H-and-columns-I-to-III respectively).

Virtualized-H/W-Implemented: 16 CPU (core); 64 Gigabyte (Memory); 640 GB (Disk); 800 Mbits/sec. (Bandwidth); (in FIG. 39B's Table-2's row-H-and-columns-IV-to-VII respectively);

=8*1X-hardware (from FIG. 39A's Table-2)

=8*"2 CPU (core); 8 GB (Memory); 80 GB (Disk); 100 Mbits/sec. (Bandwidth)"

(v) FIG. 39B's Table-2's row-1 illustrates implementing-(virtualizing) 20X-hardware (using Table-'s "Linear" formula, and row-C's "20X"-hardware (in Table-1's row-C-and-column-VI), and "1X-hardware (from FIG. 39A's Table-2)":

2,000 (maximum users): 20X-hardware implemented; 20X-(H/W)-Instance (instance-name in Table-2's row-I-and-column-III, for easy-reference in patent-application): (in row-I-and-columns-I-to-III respectively).

Virtualized-H/W-Implemented: 40 CPU (core); 160 Gigabyte (Memory): 1,600 GB (Disk): 2,000 Mbits/sec. (Bandwidth): (in FIG. 39B's Table-2's row-I-and-columns-IV-to-VII respectively);

=20*1X-hardware (from FIG. 39A's Table-2)

=20*"2 CPU (core); 8 GB (Memory); 80 GB (Disk); 100 Mbits/sec. (Bandwidth)"

(vi) FIG. 39B's Table-2's row-J illustrates implementing-(virtualizing) 40X-hardware (using Table-1's "Linear" formula, and row-C's "40X"-hardware (in Table-1's row-C-and-column-VII), and "1X-hardware (from FIG. 39A's Table-2)":

4,000 (maximum users): 40X-hardware implemented: 40X-(H/W)-Instance (instance-name in Table-2's row-J-and-column-III, for easy-reference in patent-application): (in row-J-and-columns-I-to-III respectively).

Virtualized-H/W-Implemented: 80 CPU (core); 320 Gigabyte (Memory); 3,200 GB (Disk); 4,000 Mbits/sec. (Bandwidth); (in FIG. 39B's Table-2's row-J-and-columns-IV-to-VII respectively):

=40*1X-hardware (from FIG. 39A's Table-2)

=40*"2 CPU (core); 8 GB (Memory): 80 GB (Disk); 100 Mbits/sec. (Bandwidth)"

(vii) FIG. 39B's Table-2's row-K illustrates implementing-(virtualizing) 100X-hardware (using Table-'s "Linear" formula, and row-C's "100X"-hardware (in Table-1's row-C-and-column-VIII), and "1X-hardware (from FIG. 39A's Table-2)":

10,000 (maximum users): 100X-hardware implemented: 100X-(H/W)-Instance (instance-name in Table-2's row-K-and-column-III, for easy-reference in patent-application); (in row-K-and-columns-I-to-Ill respectively).

Virtualized-H/W-Implemented: 200 CPU (core): 800 Gigabyte (Memory): 8,000 GB (Disk); 10,000 Mbits/sec. (Bandwidth): (in FIG. 39B's Table-2's row-K-and-columns-IV-to-VII respectively):

=100*1X-hardware (from FIG. 39A's Table-2)

=100*"2 CPU (core): 8 GB (Memory): 80 GB (Disk); 100 Mbits/sec. (Bandwidth)"

(viii) FIG. 39B's Table-2's row-L illustrates implementing-(virtualizing) 400X-hardware (using Table-1's "Linear" formula, and row-C's "400X"-hardware (in Table-1's row-C-and-column-IX), and "IX-hardware (from FIG. 39A's Table-2)":

40,000 (maximum users): 400X-hardware implemented: 400X-(H/W)-Instance (instance-name in Table-2's row-L-and-column-III, for easy-reference in patent-application): (in row-L-and-columns-I-to-III respectively).

Virtualized-H/W-Implemented: 800 CPU (core); 3,200 Gigabyte (Memory); 32,000 GB (Disk), 40,000 Mbits/sec. (Bandwidth): (in FIG. 39B's Table-2's row-L-and-columns-IV-to-VII respectively);

=400*1X-hardware (from FIG. 39A's Table-2)

=400*2 CPU (core); 8 GB (Memory); 80 GB (Disk); 100 Mbits/sec. (Bandwidth)"

(ix) FIG. 39B's Table-2's row-M illustrates implementing-(virtualizing) 4,000X-hardware (using Table-1's "Linear" formula, and row-C's "4,000X"-hardware (in Table-1's row-C-and-column-X), and "1X-hardware (from FIG. 39A's Table-2)":

400,000 (maximum users); 4,000X-hardware implemented: 4000X-(H/W)-Instance (instance-name in Table-2's row-M-and-column-III, for easy-reference in patent-application): (in row-M-and-columns-I-to-III respectively).

Virtualized-H/W-Implemented: 8,000 CPU (core): 32,000 Gigabyte (Memory); 320,000 GB (Disk); 400,000 Mbits/sec. (Bandwidth): (in FIG. 39B's Table-2's row-M-and-columns-IV-to-VII respectively);

=4,000*1X-hardware (from FIG. 39A's Table-2)

=4,000*"2 CPU (core); 8 GB (Memory); 80 GB (Disk): 100 Mbits/sec. (Bandwidth)"

(x) in FIG. 39B's Table-2's row-N: "Contact vendor to pre-arrange, if # of (1X)-H/W>=100X".

It is noted in scaling-up to support very large number (e.g. 2,000+) client computers 215 (to join the Internet application service hosted by the host computer 205, in addition to number of hardware, needed bandwidth and other computing resources, the software (e.g. Moodle) must support (and should be tested, if possible, to support) the very large number (e.g. 2,000+) client computers.

Referring to FIG. 39C (for ("Not-Decrease"-or)-Increase-H/W), (it is obvious that) one-skilled-in-relevant-art (using software-and-database to increase #-of-(1/X)-H/W in host-computer-cloud-instance 205-C) may use-as-examples) Para [0228A]-(i)-to-(v) below (and Para [0226C]-to-[0226K] and-FIG. 39B's-Tables-1-and-2) to "Increase-H/W-Level in (Not-Decrease-or)-Increase-(Virtualized)-(1X)-H/W-(in-Instance) in FIG. 39C's rows-B-to-K-and-columns-V-to-VIII for its (max-#-of-attendees and) host-computer-cloud-instance(s) (in (rows-B-to-K-and)-column-III respectively), as illustrated in following examples in [0228A]-(i)-to-(v), and more examples in Para [0228A]-(vi) below:

(i) as a first example, one-skilled-in-relevant-art (using software-and-database to increase #-of-(1/X)-H/W) in host-computer-cloud-instance 205-C) may: (a) Apply "Linear" formula (from FIG. 39B's Table 1), and use FIG. 40A's-step-5720 (and Para [0291C] lines 5-to-9) to add #-of-(1X)-hardware; and (b) Multiply 1X-H/W (in FIG. 39B's Table 2's row-E-and-column-II) by 1st-Level-Increase-in-#-(of-(1X)-H/W) (which is "IX"-(H/W) in FIG. 39C's row-B-and-column-V) to-ADD-to "(Begin)-#-of-(1X)-H/W" in FIG. 39C's row-B-and-column-III (which is "IX"-(H/W)) to-become "(Final)-#-of-(1X)-H/W" in FIG. 39C's row-B-and-column-VII (which is "2X"-(H/W)); and (c) then (Final)-Host-Computer-Cloud-Instance is "2X-(H/W)-Instance" for (Final)-Max-#-Users of 50 (in FIG. 39C's row-B-and-columns-VI-and-VIII respectively); and (d) "2X"-(H/W) (in-CPU/Memory/Disk/Bandwidth)="8-CPU-(core), 16-GB-memory, 1,000-GB-Disk, 200 Mbits/sec-Bandwidth" (in FIG. 39B's Table-2's row-F-and-columns-IV-to-VII);

(ii) as a second example, one-skilled-in-relevant-art (using software-and-database to increase #-of-(1/X)-H/W) in host-computer-cloud-instance 205-C) may: (a) Apply "Linear" formula (from FIG. 39B's Table 1), and use FIG. 40A's-step-5720 (and Para [0291A] lines 2-to-5) to add #-of-(1/X)-hardware; and (b) Multiply 1X-H/W (in FIG. 39B's Table 2's row-E-and-column-II) by 3rd-Level-Increase-in-#-(of-(1X)-H/W) (which is "4X"-(H/W) in FIG. 39C's row-D-and-column-V) to-ADD-to "(Begin)-#-of-(1X)-H/W" in FIG. 39C's row-D-and-column-III (which is "4X"-(H/W)) to-become "(Final)-#-of-(1X)-H/W" in FIG. 39C's row-D-and-column-VII (which is "8X"-(H/W)); and (c) then (Final)-Host-Computer-Cloud-Instance is "8X-(H/W)-Instance" for (Final)-Max-#-Users of 200 (in FIG. 39C's row-D-and-columns-V-and-VIII respectively); and (d) "8X"-(H/W) (in-CPU/Memory/Disk/Bandwidth)="32-CPU-(core), 64-GB-memory, 4,000-GB-Disk, 80 Mbits/sec-Bandwidth" (in FIG. 39B's Table-2's row-H-and-columns-IV-to-VII):

(iii) as a third example, one-skilled-in-relevant-art (using software-and-database to increase #-of-(1/X)-H/W) in host-computer-cloud-instance 205-C) may: (a) Apply "Linear" formula (from FIG. 39B's Table 1), and use FIG. 40A's-step-5720 (and Para [0150C] lines 5-to-9) to add #-of-(1/X)-hardware; and (b) Multiply 1X-HLW (in FIG. 39B's Table 2's row-E-and-column-II) by 5th-Level-Increase-in-#-(of-(1X)-H/W) (which is "20X"-(H/W) in FIG. 39C's row-F-and-column-V) to-ADD-to "(Begin)-#-of-(1X)-H/W" in FIG. 39C's row-F-and-column-III (which is "20X"-(H/W)) to-become "(Final)-#-of-(1X)-H/W" in FIG. 39C's row-F-and-column-VII (which is "40X"-(H/W)); and (c) then (Final)-Host-Computer-Cloud-Instance is "40X-(H/W)-Instance" for (Final)-Max-#-Users of 1,000 (in FIG. 39C's row-F-and-columns-VI-and-VIII respectively): and (d) "40X"-(H/W) (in-CPU/Memory/Disk/Bandwidth)

="160-CPU-(core), 320-GB-memory, 20,000-GB-Disk, 4,000 Mbits/sec-Bandwidth" (in FIG. 39B's Table-2's row-J-and-columns-IV-to-VII);

(iv) as a fourth example, one-skilled-in-relevant-art (using software-and-database to increase #-of-(1/X)-H/W) in host-computer-cloud-instance 205-C) may: (a) Apply "Linear" formula (from FIG. 39B's Table 1), and use FIG. 40A's-step-5720 (and Para [0291C] lines 5-to-9) to add #-of-(1/X)-hardware: and (b) Multiply 1X-H/W (in FIG. 39B's Table 2's row-E-and-column-11) by (n–2)th-Level-Increase-in-#-(of-(1X)-H/W) (which is "300X"-(H/W) in FIG. 39C's row-I-and-column-V) to-ADD-to "(Begin)-#-of-(1X)-H/W" in FIG. 39C's row-I-and-column-III (which is "100X"-(H/W)) to-become "(Final)-#-of-(1X)-H/W" in FIG. 39C's row-I-and-column-VII (which is "100X"-(H/W)); and (c) then (Final)-Host-Computer-Cloud-Instance is "400X-(H/W)-Instance" for (Final)-Max-#-Users of 10,000 (in FIG. 39C's row-I-and-columns-VI-and-VIII respectively): and (d) "400X"-(H/W) (in-CPU/Memory/Disk/Bandwidth)="1,600-CPU-(core), 3,200-GB-memory, 200,000-GB-Disk, 40,000 Mbits/sec-Bandwidth" (in FIG. 39B's Table-2's row-L-and-columns-IV-to-VII);

(v) as a fifth example, one-skilled-in-relevant-art (using software-and-database to increase #-of-(1/X)-H/W) in host-computer-cloud-instance 205-C) may: (a) Apply "Linear" formula (from FIG. 39B's Table 1), and use FIG. 40A's-step-5720 (and Para [0291C] lines 5-to-9) to add #-of-(1/X)-hardware: and (b) Multiply 1X-H/W (in FIG. 39B's Table 2's row-E-and-column-11) by (n)th-Level-Increase-in-#-(of-(1X)-H/W) (which is "36,000X"-(H/W) in FIG. 39C's row-K-and-column-V) to-ADD-to "(Begin)-#-of-(1X)-H/W" in FIG. 39C's row-K-and-column-III (which is "4,000X"-(H/W)) to-become "(Final)-#-of-(1X)-H/W" in FIG. 39C's row-K-and-column-VII (which is "40000X"-(H/W)); and (c) then (Final)-Host-Computer-Cloud-Instance is "40000X-(H/W)-Instance" for (Final)-Max-#-Users of 1,000,000 (in FIG. 39C's row-K-and-columns-VI-and-VIII respectively); and (d) "40,000X"-(H/W) (in-CPU/Memory/Disk/Bandwidth)="16,000-CPU-(core), 32,000-GB-memory, 2,000,000-GB-Disk, 400,000 Mbits/sec-Bandwidth" (in FIG. 39B's Table-2's row-N-and-columns-IV-to-VII):

(vi) as more example(s), one-skilled-in-relevant-art may use not-less-than-one-(consecutive)-rows of 1st-to-(n)th-"Increase-H/W-Level"-(rows-B-to-J in FIG. 39C) (and as-examples this Para [0228A]-(i)-to-(v)) to increase #-of-(1/X)-H/W in (H/W)-instance (in FIG. 39C's column-IV):

- e.g. use 2nd-and-3rd-"Increase-H/W-Level"-(two-consecutive-rows-C-and-D) to increase #-of-(1/X)-H/W in cloud-instance from 2X-H/W (in row-C-and-column-III) to 8X-H/W (in row-D-and-column-VII);
- e.g. use 3rd-and-4th-and-5th-and-6th-"Increase-H/W-Level"-(four-consecutive-rows-D-to-G) to increase #-of-(1/X)-H/W in cloud-instance from 4X-H/W (in row-D-and-column-III) to 100X-H-W (in row-G-and-column-VII);
- e.g. use (n–1)th-and-(n)th-"Increase-H/W-Level"-(two-consecutive-rows-I-and-K) to increase #-of-(1/X)-H/W in cloud-instance from 100X-H/W (in row-I-and-column-III) to 4,000X-H/W (in row-J-and-column-VII);

etc.

Referring to FIG. 39D (for ("Not-Decrease"-or)-Keep-SAME-H/W)), please note that "(Not-Decrease-or)-keep-SAME/Not-Change"-virtualized-(1X)-hardware (illustrated in FIG. 39D):

Keep-SAME-(1X)-H/W (in "Not-Decrease"-virtualized-hardware) (illustrated in FIG. 39D) has: (a). same-#-of-(1X)-H/W (in columns-III-and-V-and-VII) in Begin-and-Final host-computer-cloud-instance (in columns-IV-and-VI) respectively; and (b) SAME-("#-of-(H/W)", e.g. 1X-(H/W), 2X-(H/W), . . . 40000X-(H/W), in)-INSTANCE in Begin-and-Final host-computer-cloud-instance (in columns-IV-and-VI) respectively.

Figure 28:
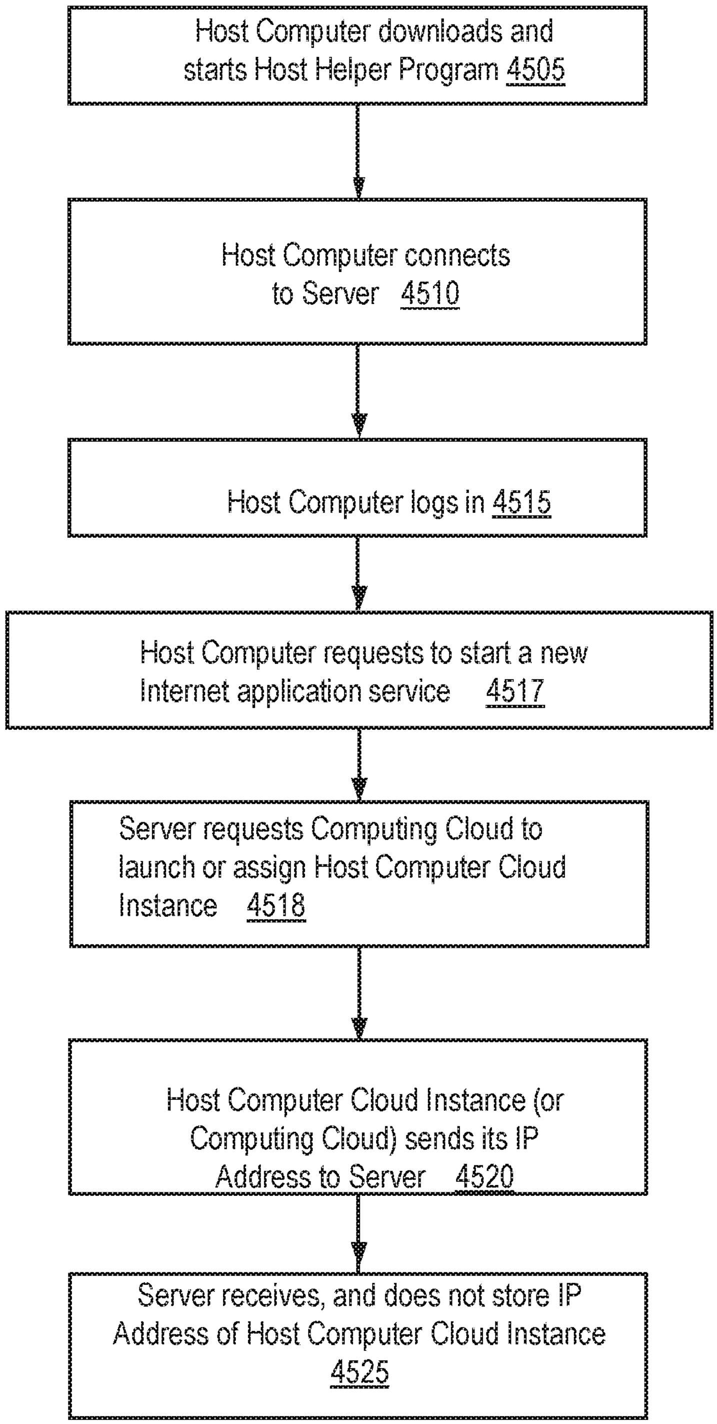
Figure 40A:
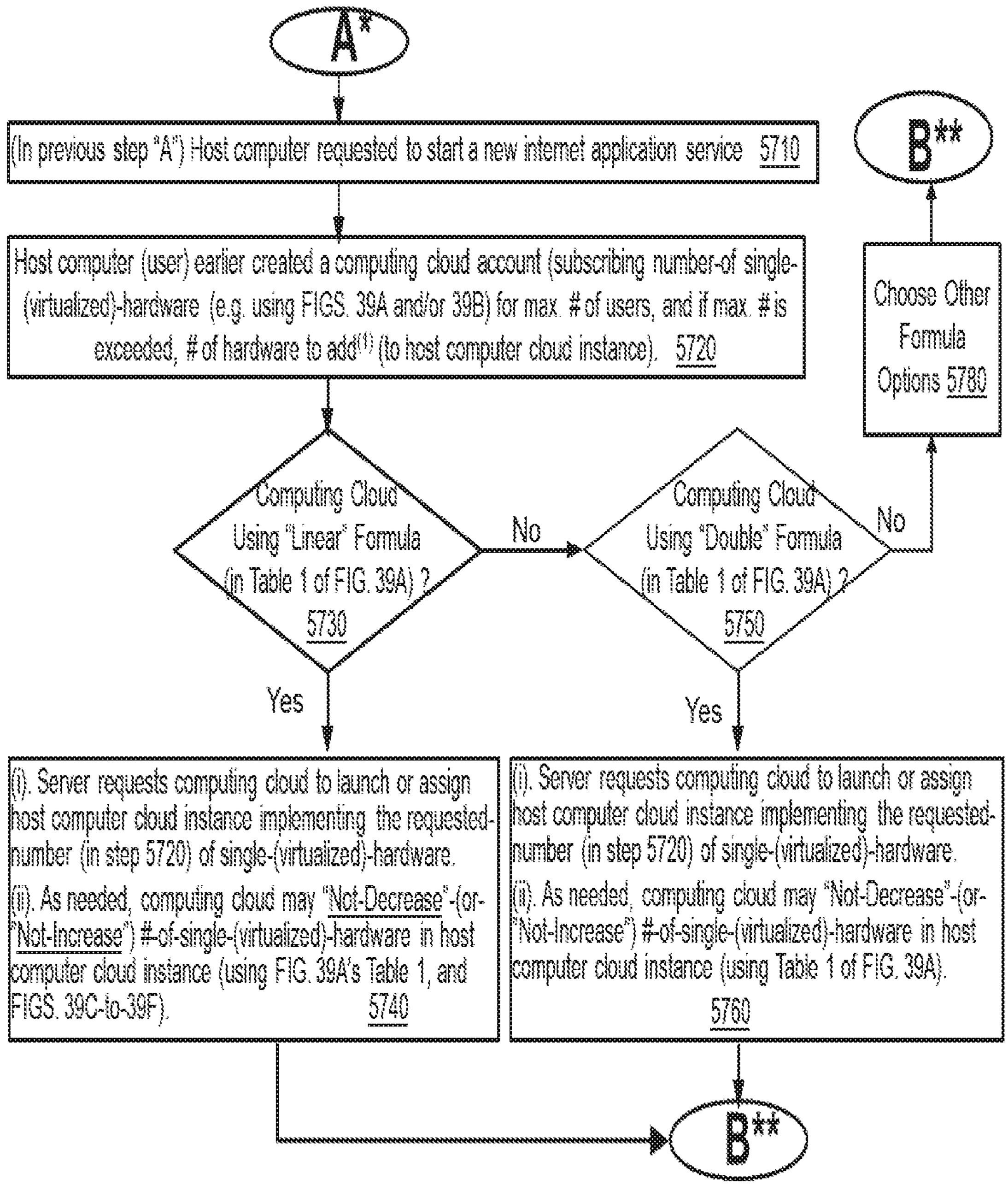
FIG. 40A are flowcharts illustrating providing direct network connections using cloud instance for Internet application service over a computer network in accordance with another embodiment of the present invention.
Figure 40B:
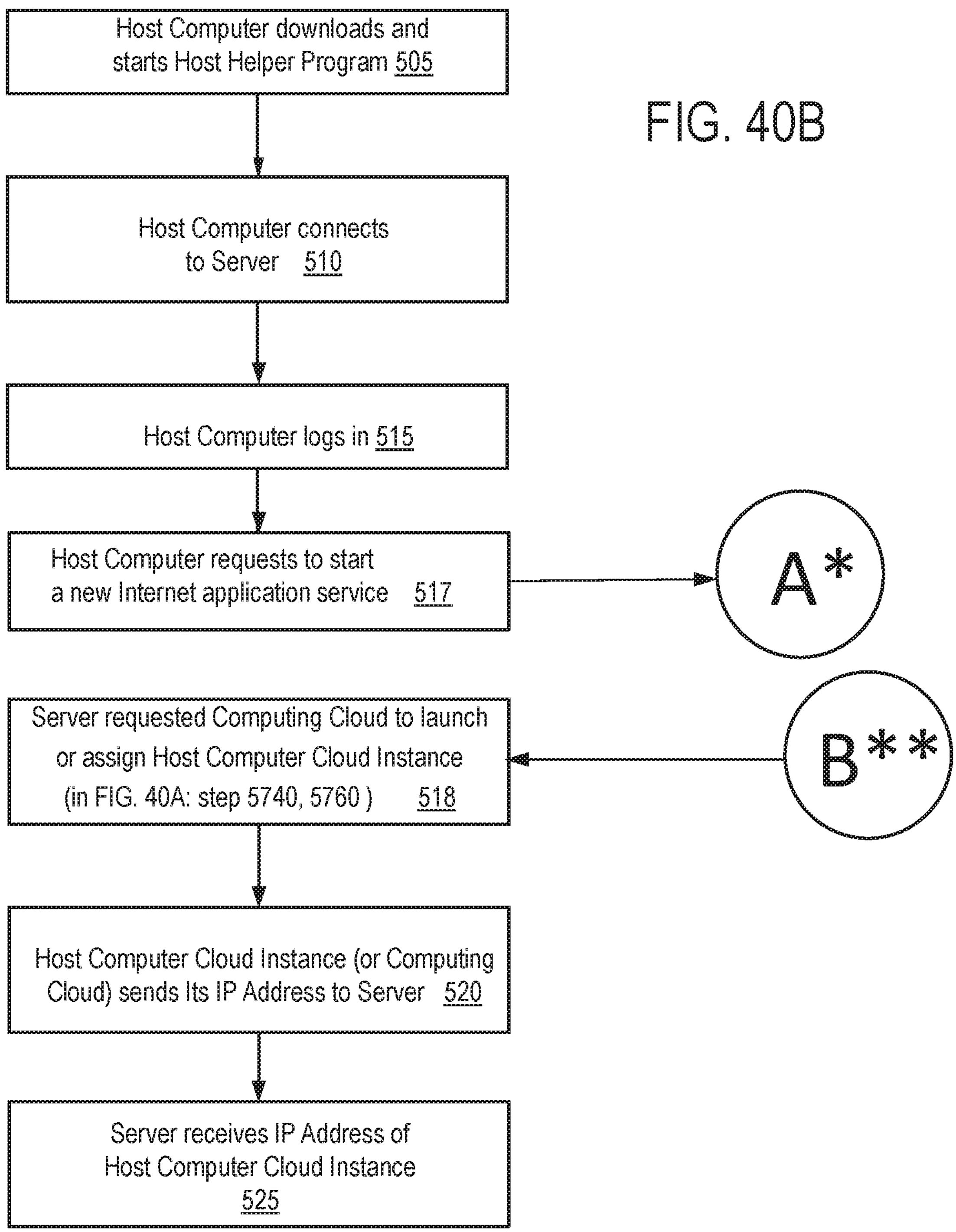
FIGS. 40B, 40E, 40F, 40G. 40C, and 40D are flowcharts illustrating providing direct network connections using cloud instance for Internet application service over a computer network in accordance with another embodiment of the present invention.
Figure 40C:
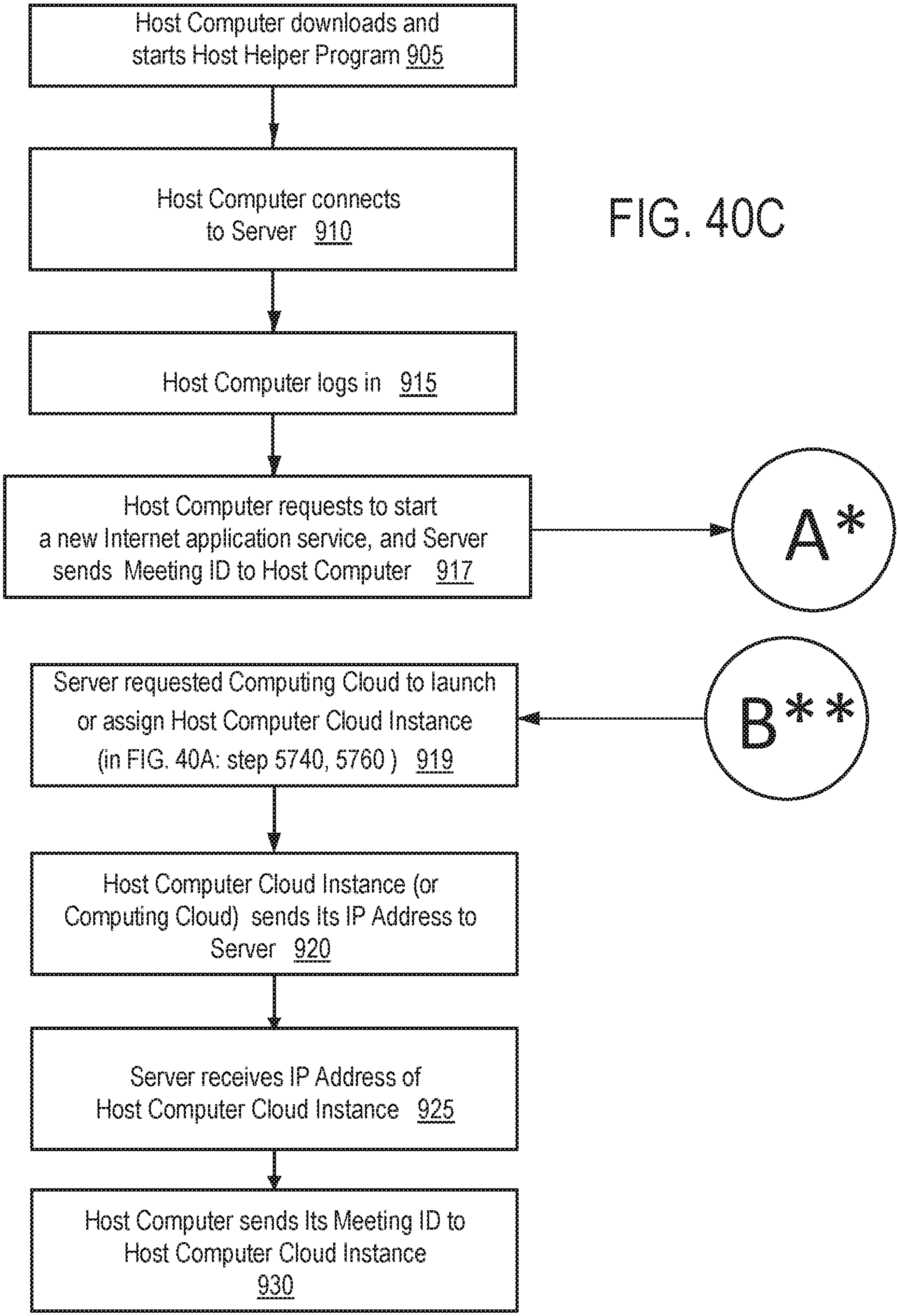
Figure 40D:
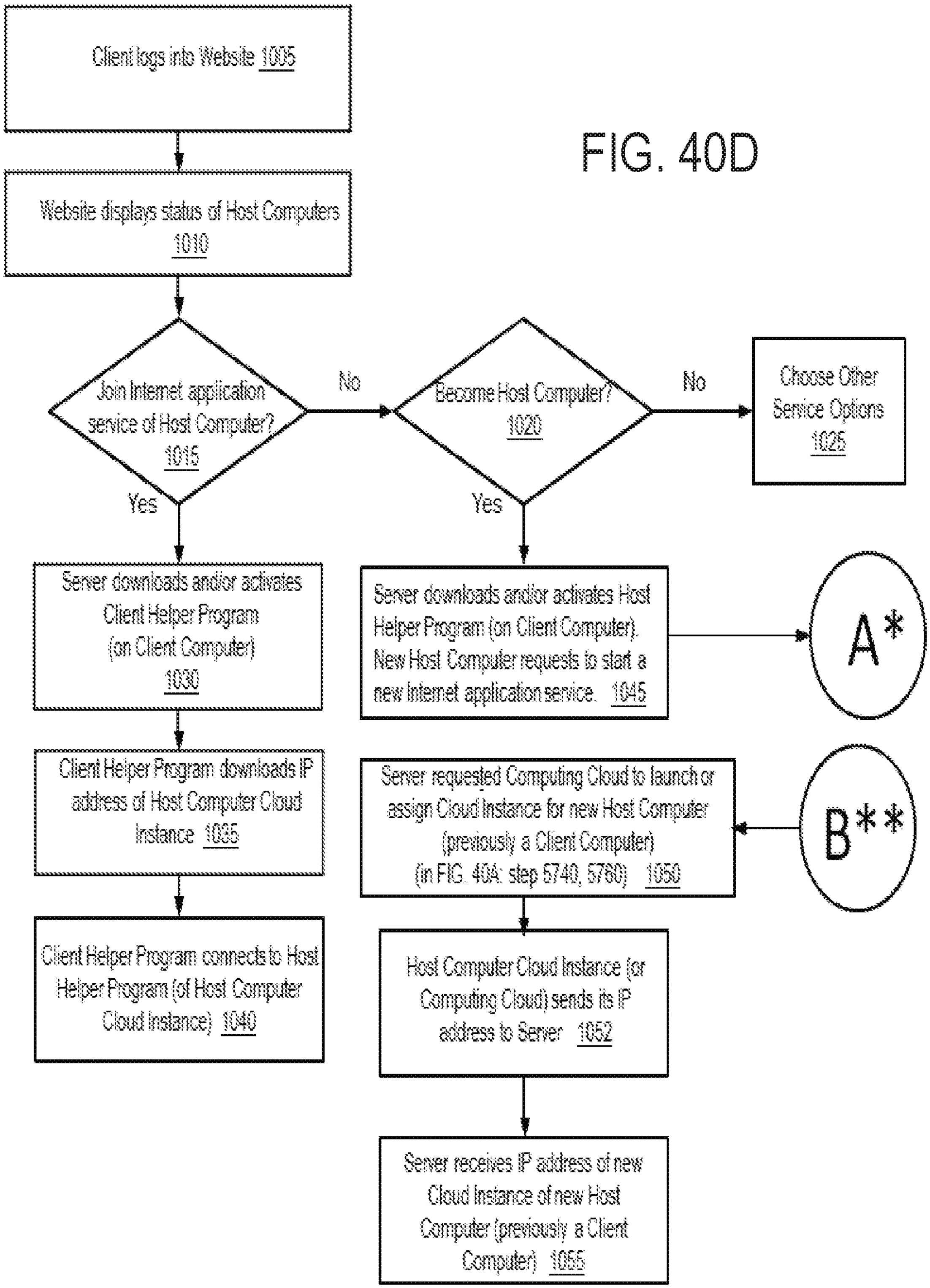

Keep-SAME-(1X)-H/W (in "Not-Decrease"-virtualized-hardware) (illustrated in FIG. 39D) are-(or-may-be-regarded-as) default-(first-step)-Keep-SAME-H/W, when computing cloud 198 launches cloud instances, e.g. in step 4518 in FIG. 28, and step 919 in FIG. 40C, and in Para [0291E]'s lines-2-to-5: "(i) Server 222A (FIG. 24A) requests computing cloud 198 to launch-or-assign host computer cloud instance 205-C (FIG. 24A) implementing (virtualizing) the requested (and subscribed in step 5720 in FIG. 40A) ("Linear" Formula) number of single-(virtualized)-hardware on software". FIG. 39D illustrates ("Not-Decrease"-or)-Keep-SAME-virtualized-(1X)-hardware.

"Not-Increase"-Virtualized-Hardware (in Cloud Instance)

Referring to FIG. 39E (for ("Not-increase"-or)-Decrease-H/W), one-skilled-in-relevant-art (using software-and-database to decrease #-of-(1/X)-H/W in host-computer-cloud-instance 205-C) may use-(leverage-"Increase-H/W"-disclosure-for-use-in-"Decrease-H/W"-here-in-Para-[0228C])-and-leverage-from Para [0228C]-(i)-to-(v) below (and Para [226C]-to-[0226K] and-FIG. 39B's-Tables-1-and-2) to-(leverage-and) "Decrease-H/W-Level in (Not-Increase-or)-Decrease-(Virtualized)-(1X)-H/W-(in-Instance) in FIG. 39E's rows-B-to-K-and-columns-V-to-VIII for its (max-#-of-attendees and) host-computer-cloud-instance(s) (in (rows-B-to-K-and)-column-III respectively), as illustrated in following five (5) examples in Para [0228C]-(i)-to-(v), and more examples in [0228C]-(vi) below:

(i) as a first example, one-skilled-in-relevant-art (leveraging-(and-modifying/editing/changing) one's-software-and-database-(e.g.-(developed-by-one-(not-shown))-from-Para-[0228A]-(i) above) to decrease #-of-(1/X)-H/W) in host-computer-cloud-instance 205-C) may: (a) Apply "Linear" formula (from FIG. 39B's Table 1), and leverage-(disclosure-of) FIG. 40A's-step-5720 (and Para [0291C] lines 5-to-9) to change-disclosure-of/from-"add"-to-"DECREASE" #-of-(1X)-hardware (and to change "maximum-number-of-concurrent-users is exceeded" to "(minimum)-number-of-concurrent-users is BELOW-FLOOR-number"): and (b) Multiply IX-H/W (in FIG. 39B's Table 2's row-E-and-column-II) by (n)th-Level-Decrease-in-#-(of-(1X)-H/W) (which is "36,000X"-(H/W) in FIG. 39E's row-B-and-column-V) to-DECREASE "(Begin)-#-of-(1X)-H/W" in FIG. 39E's row-B-and-column-III (which is "40,000X"-(H/W)) to-become "(Final)-#-of-(1X)-H/W" in FIG. 39E's row-B-and-column-VII (which is "4,000X"-(H/W)); and (c) then (Final)-Host-Computer-Cloud-Instance is "4000X-(H/W)-Instance" for (Final)-Max-#-Users of 100,000 (in FIG. 39E's row-B-and-columns-VI-and-VIII respectively): and (d) "4,000X"-(H/W) (in-CPU/Memory/Disk/Bandwidth)="16,000-CPU-(core), 32,000-GB-memory, 2,000,000-GB-Disk, 400,000 Mbits/sec-Bandwidth" (in FIG. 39B's Table-2's row-M-and-columns-IV-to-VII respectively);

(ii) as a second example, one-skilled-in-relevant-art (leveraging-(and-modifying/editing/changing) one's-software-and-database-(e.g.-(developed-by-one-(not-shown))-from-Para-[0228A]-(ii) above) to decrease #-of-(1/X)-H/W) in host-computer-cloud-instance 205-C) may: (a) Apply "Linear" formula (from FIG. 39B's Table 1), and leverage-(disclosure-of) FIG. 40A's-step-5720 (and Para [0291C] lines 5-to-9) to change-disclosure-of/from-"add"-to-"DECREASE" #-of-(1/X)-hardware (and to change "maximumnumber-of-concurrent-users is exceeded" to "(minimum)-number-of-concurrent-users is BELOW-FLOOR-number") and (b) Multiply 1X-H/W (in FIG. 39B's Table 2's row-E-and-column-II) by (n−2)th-Level-Decrease-in-#-(of-(1X)-H/W) (which is "300X"-(H/W) in FIG. 39E's row-D-and-column-V) g-DECREASE "(Begin)-#-of-(1X)-H/W" in FIG. 39E's row-D-and-column-III (which is "400X"-(H/W)) to-become "(Final)-#-of-(1X)-H/W" in FIG. 39E's row-D-and-column-VII (which is "00X"-(H/W)); and (c) then (Final)-Host-Computer-Cloud-Instance is "100X-(H/W)-Instance" for (Final)-Max-#-Users of 2,500 (in FIG. 39E's row-D-and-columns-VI-and-VIII respectively); and (d) "100X"-(H/W) (in-CPU/Memory/Disk/Bandwidth)="400-CPU-(core), 800-GB-memory, 50,000-GB-Disk, 10,000 Mbits/sec-Bandwidth" (in FIG. 39B's Table-2's row-K-and-columns-IV-to-VII respectively);

(iii) as a third example, one-skilled-in-relevant-art (leveraging-(and-modifying/editing/changing) one's-software-and-database-(e.g.-(developed-by-one-(not-shown))-from-Para-[0228A]-(iii) above) to decrease #-of-(1/X)-H/W) in host-computer-cloud-instance 205-C) may: (a) Apply "Linear" formula (from FIG. 39B's Table 1), and leverage-(disclosure-of) FIG. 40A's-step-5720 (and Para [0291C] lines 5-to-9) to change-disclosure-of/from-"add"-to-"DECREASE" #-of-(1/X)-hardware (and to change "maximum-number-of-concurrent-users is exceeded" to "(minimum)-number-of-concurrent-users is BELOW-FLOOR-number"); and (b) Multiply 1X-H/W (in FIG. 39B's Table 2's row-E-and-column-II) by (5th-Level-Decrease-in-#-(of-(1X)-H/W) (which is "20X"-(/W) in FIG. 39E's row-G-and-column-V) to-DECREASE "(Begin)-#-of-(1X)-H/W" in FIG. 39E's row-G-and-column-III (which is "40X"-(H/W)) to-become "(Final)-#-of-(1X)-H/W" in FIG. 39E's row-G-and-column-VII (which is "20X"-(H/W)); and (c) then (Final)-Host-Computer-Cloud-Instance is "20X-(H/W)-Instance" for (Final)-Max-#-Users of 500 (in FIG. 39E's row-G-and-columns-VI-and-VIII respectively); and (d) "20X"-(H/W) (in-CPU/Memory/Disk/Bandwidth)="80-CPU-(core), 160-GB-memory, 10,000-GB-Disk, 2,000 Mbits/sec-Bandwidth" (in FIG. 39B's Table-2s row-I-and-columns-IV-to-VII respectively);

(iv) as a fourth example, one-skilled-in-relevant-art (leveraging-(and-modifying/editing/changing) one's-software-and-database-(e.g.-(developed-by-one-(not-shown))-from-Para-[0228A]-(iv) above) to decrease #-of-(1/X)-H/W) in host-computer-cloud-instance 205-C) may: (a) Apply "Linear" formula (from FIG. 39B's Table 1), and leverage-(disclosure-of) FIG. 40A's-step-5720 (and Para [0291C] lines 5-to-9) to change-disclosure-of/from-"add"-to-"DECREASE" #-of-(1/X)-hardware (and to change "maximum-number-of-concurrent-users is exceeded" to "(minimum)-number-of-concurrent-users is BELOW-FLOOR-number"): and (b) Multiply 1X-H/W (in FIG. 39B's Table 2's row-E-and-column-II) by (3rd-Level-Decrease-in-#-(of-(1X)-H/W) (which is "4X"-(H/W) in FIG. 39E's row--and-column-V) to-DECREASE "(Begin)-#-of-(1X)-H/W" in FIG. 39E's row-I-and-column-III (which is "8X"-(H/W)) to-become "(Final)-#-of-(1X)-H/W" in FIG. 39E's row-I-and-column-VII (which is "4X"-(H/W)): and (c) then (Final)-Host-Computer-Cloud-Instance is "4X-(H/W)-Instance" for (Final)-Max-#-Users of 100 (in FIG. 39E's row-I-and-columns-VI-and-VIII respectively); and (d) "4X"-(HLW) (in-CPU/Memory/Disk/Bandwidth)="16-CPU-(core), 32-GB-memory, 2,000-GB-Disk, 400 Mbits/sec-Bandwidth" (in FIG. 39B's Table-2's row-G-and-columns-IV-to-VII respectively):

(v) as a fifth example, one-skilled-in-relevant-art (leveraging-(and-modifying/editing/changing) one's-software-and-database-(e.g.-(developed-by-one-(not-shown))-from-Para-[0228A]-(v) above) to decrease #-of-(1/X)-H/W) in host-computer-cloud-instance 205-C) may: (a) Apply "Linear" formula (from FIG. 39B's Table 1), and leverage-(disclosure-of) FIG. 40A's-step-5720 (and Para [0291C] lines 5-to-9) to change-disclosure-of/from-"add"-to-"DECREASE" #-of-(1/X)-hardware (and to change "maximum-number-of-concurrent-users is exceeded" to "(minimum)-number-of-concurrent-users is BELOW-FLOOR-number"): and (b) Multiply IX-H/W (in FIG. 39B's Table 2's row-E-and-column-1) by (1st-Level-Decrease-in-#-(of-(1X)-H/W) (which is "1X"-(H/W) in FIG. 39E's row-K-and-column-V) to-DECREASE "(Begin)-#-of-(1X)-H/W" in FIG. 39E's row-K-and-column-III (which is "2X"-(H/W)) to-become "(Final)-#-of-(1X)-H/W" in FIG. 39E's row-K-and-column-VII (which is "1X"-(H/W)); and (c) then (Final)-Host-Computer-Cloud-Instance is "1X-(H/W)-Instance" for (Final)-Max-#-Users of 25 (in FIG. 39E's row-K-and-columns-V-and-VIII respectively); and (d) "X"-(H/W) (in-CPU/Memory/Disk/Bandwidth)="4-CPU-(core), 8-GB-memory, 500-GB-Disk, 100 Mbits/sec-Bandwidth" (in FIG. 39B's Table-2's row-E-and-columns-IV-to-VII respectively).

(vi) as more example(s), one-skilled-in-relevant-art may use not-less-than-one-(consecutive)-rows of (n)th-to-1st-"Decrease-H/W-Level"-(rows-B-to-J in FIG. 39E) (and as-examples this Para [0228C]-(i)-to-(v)) to decrease #-of-(1/X)-H/W in (H/W)-instance (in FIG. 39E's column-IV):

e.g. use 2nd-and-3rd-"Decrease-H/W-Level"-(two-consecutive-rows-B-and-C) to decrease #-of-(1/X)-H/W in cloud-instance from 4000X-H/W (in row-B-and-column-III) to 100X-H/W (in row-C-and-column-VII):

e.g. use 6th-and-5th-and-4th-and-3rd-"Decrease-H/W-Level"-(four-consecutive-rows-E-to-H) to decrease #-of-(1/X)-H/W in cloud-instance from 100X-H/W (in row-E-and-column-III) to 4X-H/W (in row-H-and-column-VII):

e.g. use 2nd-and-st-"Decrease-H/W-Level"-(two-consecutive-rows-I-and-J) to decrease #-of-(1/X)-H/W in cloud-instance from 4X-H/W (in row--and-column-III) to 1X-H/W (in row-J-and-column-VII):

etc.

Referring to FIG. 39F (for ("Not-Increase"-or)-Keep-SAME-H/W)), please note that "(Not-Increase-or)-keep-SAME/Not-Change"-virtualized-(1X)-hardware (illustrated in FIG. 39F):

Keep-SAME-(1X)-H/W (in "Not-Increase"-virtualized-hardware) (illustrated in FIG. 39F) has: (a). same-#-of-(1X)-H/W (in columns-III-and-V-and-VII) in Begin-and-Final host-computer-cloud-instance (in columns-IV-and-VI) respectively: and (b) SAME-("#-of-(H/W)", e.g. 40000X-(H/W), 4000X-(H/W), . . . , 2X-(H/W), 1X-(H/W), in)-INSTANCE in Begin-and-Final host-computer-cloud-instance (in columns-IV-and-VI) respectively.

Keep-SAME-(1X)-H/W (in "Not-Increase"-virtualized-hardware) (illustrated in FIG. 39F) are-(or-may-also-be-regarded-as) default-(first-step)-Keep-SAME-H/W, when computing cloud 198 launches cloud instances, e.g. in step 4518 in FIG. 28, and step 919 in FIG. 40C, and in Para [0291E]'s lines-2-to-5: "(i) Server 222A (FIG. 24A) requests computing cloud 198 to launch-or-assign host computer cloud instance 205-C (FIG. 24A) implementing (virtualizing) the requested (and subscribed in step 5720 in FIG. 40A in FIG. 40A) ("Linear" Formula) number of single- (virtualized)-hardware on software". FIG. 39F illustrates ("Not-Increase"-or)-Keep-SAME-virtualized-(1X)-hardware.

Please note again that as illustrated in Para [0228C]-(i)-to-(v) and [0228D], for one-skilled-in-relevant-art (using software-and-database), "Not-Increase"-virtualized-(1X)-hardware in cloud-instance supported-by-"non-new"-("old")-matters-in Para [0228C]-to-[0228K] above means-(and-its-implementation-may-use):

(a) "(Not-Increase-or)-keep-SAME/Not-Change"-virtualized-(1X)-hardware (illustrated in FIG. 39F): Keep-SAME-H/W (in "Not-Increase"-virtualized-hardware) are default-(first-step)-Keep-SAME-H/W, when computing cloud 198 launches-or-assign cloud instances, e.g. in step 4518 in FIG. 28, and step 919 in FIG. 40C, and in Para [0291E]'s lines-2-to-5: "(i) Server 222A (FIG. 24A) requests computing cloud 198 to launch-or-assign host computer cloud instance 205-C (FIG. 24A) implementing (virtualizing) the requested (and subscribed in step 5720 in FIG. 40A) ("Linear" Formula) number of single-(virtualized)-hardware on software". FIG. 39F illustrates ("Not-Increase"-or)-Keep-SAME-virtualized-hardware: and/or (b) "(Not-Increase-or)-Decrease"-virtualized-(1X)-hardware (illustrated in FIG. 39E): After default-(first-step-Keep-SAME-H/W)-launch above Para [0228E]-(a), later as optional-2nd-step (not shown) "computing cloud 198 may decrease (using "Linear" Formula) single-(virtualized)-hardware in host computer cloud instance 205-C" (in Para [0291E]'s lines-6-to-9), e.g. as optional-2nd-step (not shown) in step 4518 in FIG. 28, and step 919 in FIG. 40C, and as illustrated in FIG. 39C to "(Not-Increase)-Decrease"-virtualized-hardware, as illustrated in FIG. 39E to "(Not-Increase)-decrease"-virtualized-(1X)-hardware.

Please note again that both Para [0228B] and [0228D] (and FIGS. 39D-(for-("Not-Decrease"-or)-Keep-SAME-H/W) and 39F-(for-("Not-Increase"-or)-Keep-SAME-H/W) respectively) describe-and-illustrate default-(first-step(s)-Keep-SAME-H/W, when computing cloud 198 launches cloud instances, e.g. in step 4518 in FIG. 28, and step 919 in FIG. 40C, and in Para [0291E]'s lines-2-to-5: ""(i) Server 222A (FIG. 24A) requests computing cloud 198 to launch-or-assign host computer cloud instance 205-C (FIG. 24A) implementing (virtualizing) the requested (and subscribed in step S720 in FIG. 40A) ("Linear" Formula) number of single-(virtualized)-hardware on software".

Process Considerations

Figure 26A:
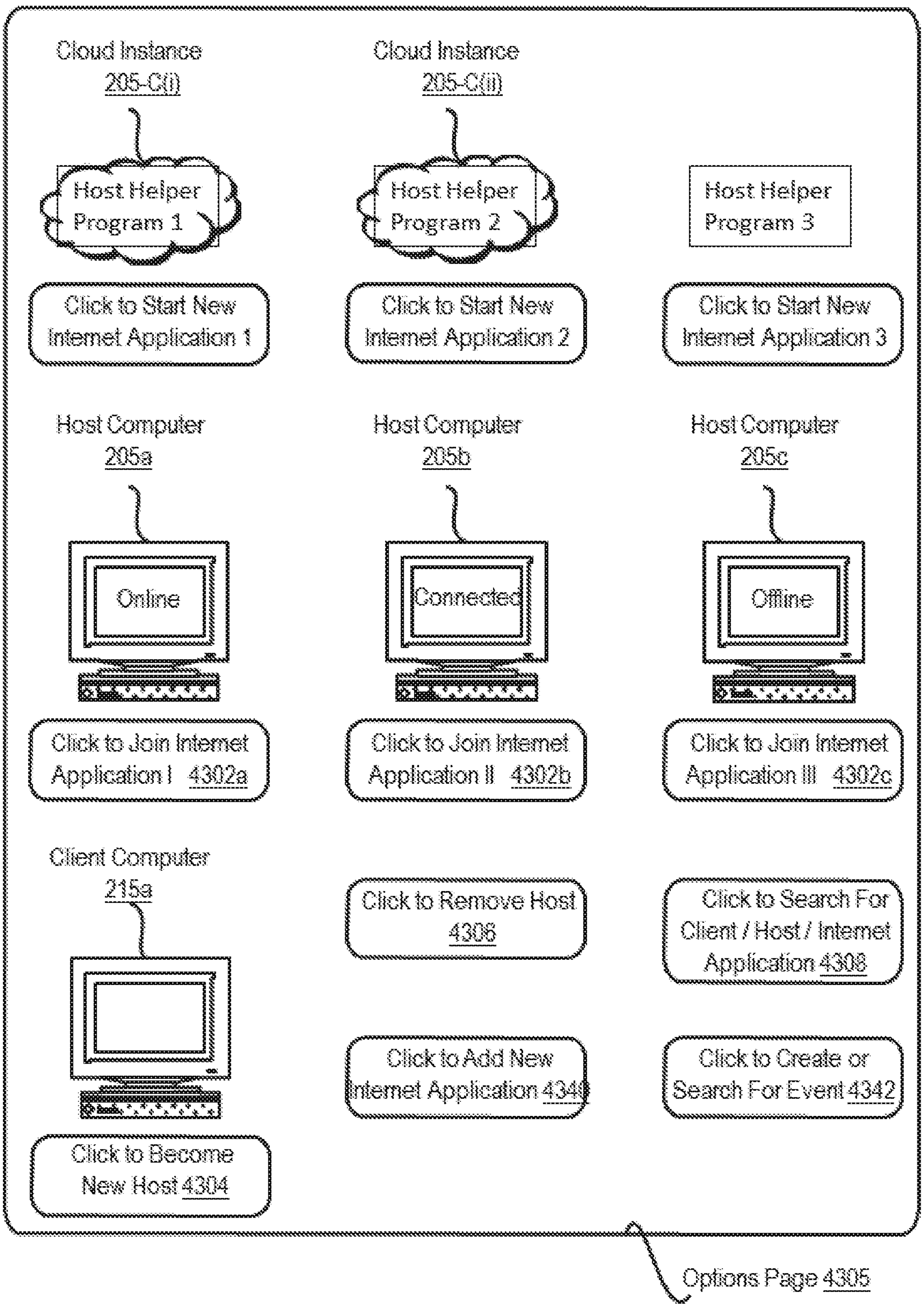
FIGS. 26A, 26B are snapshots of web pages hosted by a server in accordance with an embodiment of the present invention.

In one embodiment of the present invention, a website 212A provides multiple web pages which allow a user to utilize the services of a server 222A. When a user visits the website 212A via a web browser 218, the user may log into the website 212A by providing a username and an associated password in accordance with standard Internet techniques. After logging in, the user may select to use the services provided by the server 222A by interacting with an options page 4305. FIG. 26A illustrates an options page 4305 in accordance with one embodiment of the present invention. In one embodiment, an options page 4305 comprises a file in PHP. ASPX, or HTML format.

The options page 4305 provides selectable icons which correspond to services provided by the server 222A. In one embodiment, the options page 4305 lists one or more host helper programs 216-1 that the user may click to request to start a new Internet application service through the direct network connections using cloud instance for Internet application service according to embodiments of the present invention. In another embodiment, the options page 4305 lists one or more cloud instances 205-C (running respectively one or more host helper programs 216-1) that the user may click to request to start a new Internet application service through the direct network connections using cloud instance for Internet application service according to embodiments of the present invention. In one embodiment, the options page 4305 lists one or more host computers 205 that the user may request to join their Internet application service through the direct network connections using cloud instance for Internet application service according to embodiments of the present invention. Additionally, the options page 4305 presents the status of the selectable host computers 205*a*, 205*b*, 205*c*. In one embodiment, a host computer may have a status of connected, online, or offline. A host computer 205*c* may be offline because it does not have Internet connection or is not running. A host computer 205*a* that is "online" may be joined in Internet application service using the direct network connections using cloud instance for Internet application service according to embodiments of the present invention. A host computer 205*b* that is "connected" is already doing Internet application service using the direct network connections using cloud instance for Internet application service according to embodiments of the present invention. The user of a client computer 215 may select a host computer 205*a*, 205*b* that has a status of "online" or "connected" using the corresponding icon 4302*a*. 4302*b* to join their Internet application services with the host computer 205*a*, 205*b* according to the direct network connections using cloud instance for Internet application service in accordance with various embodiments of the present invention.

Additionally, the user may select to provide other client computers 215 Internet application service with the user's computer by itself becoming a host computer 205, using icon 4304. The user may also select to remove a host computer 205 from the list of accessible host computers 205 using icon 4306, or select to search for a not-displayed host computer 205 using icon 4308. Moreover, the user may select to create or search an event such as a Internet application service session using icon 4342. The options depicted in FIG. 26A and described above are provided for illustrative purposes only and are not intending to be limiting. Additional user-selectable options may be offered by a server 222A and/or presented on an options page 4305 of a website 212A.

Figure 26B:
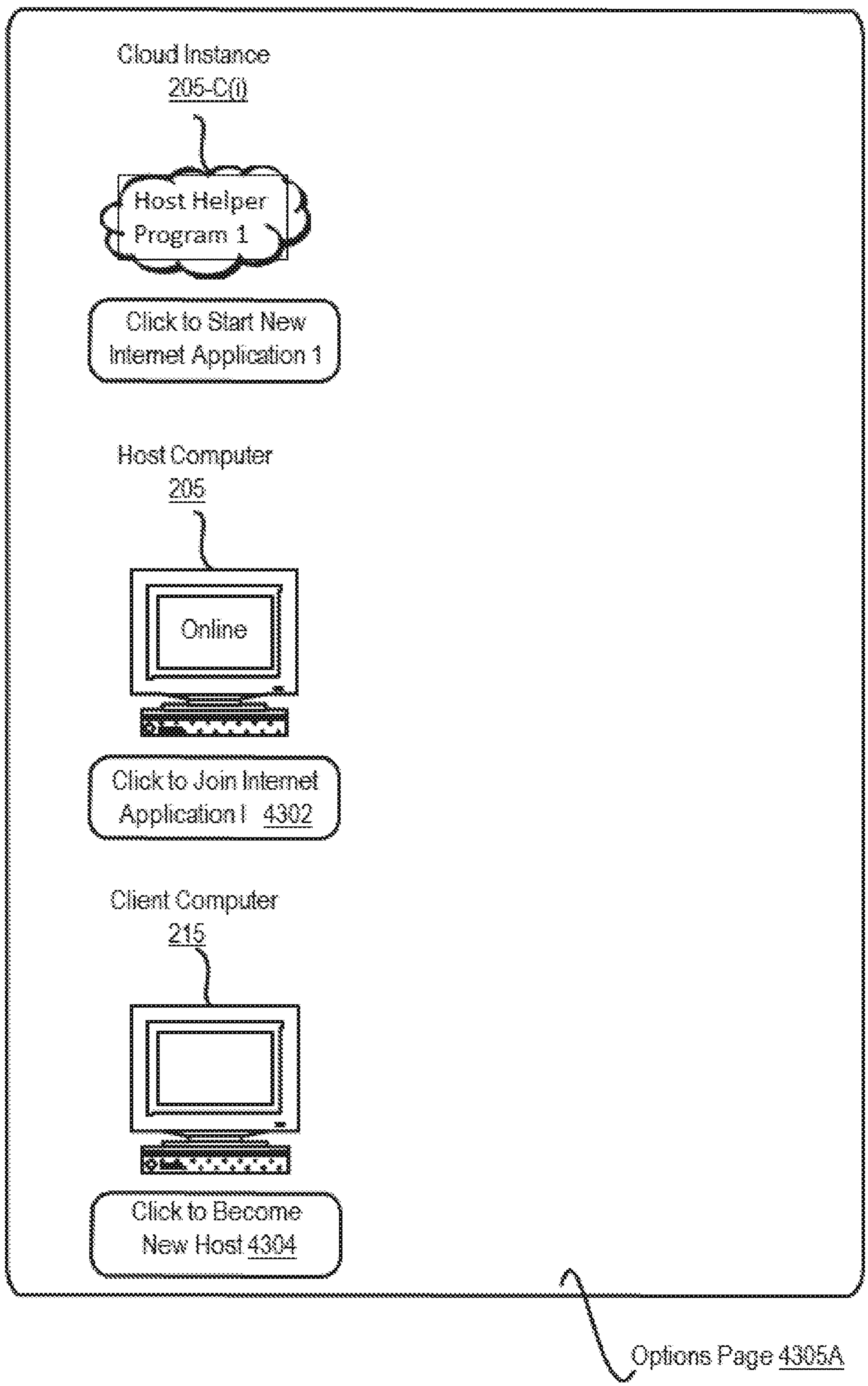
Figure 26C:
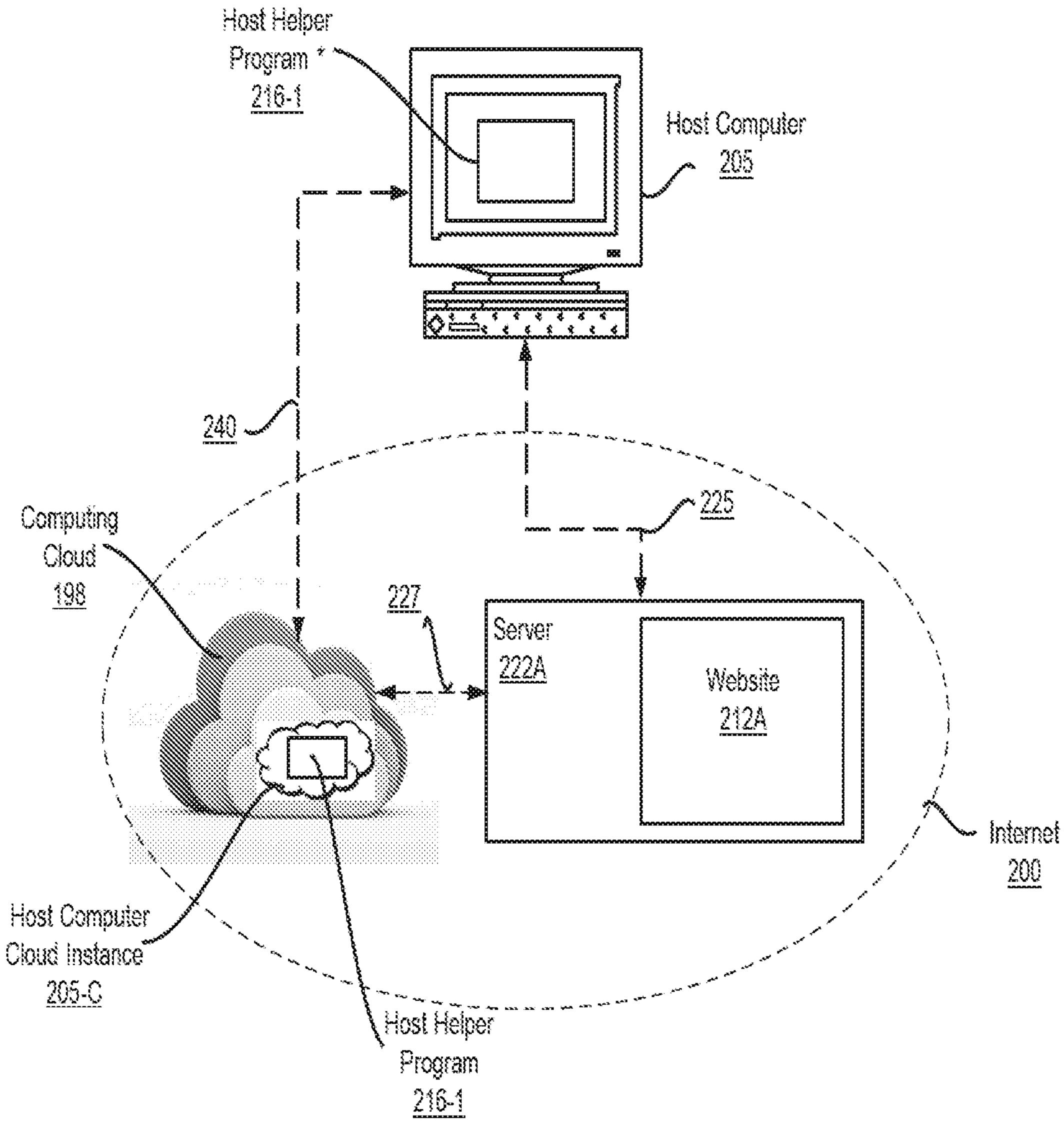
FIGS. 26C, 26D are block diagrams illustrating providing direct network connections using cloud instance for Internet application service over a computer network in accordance with another embodiment of the present invention.
Figure 26D:
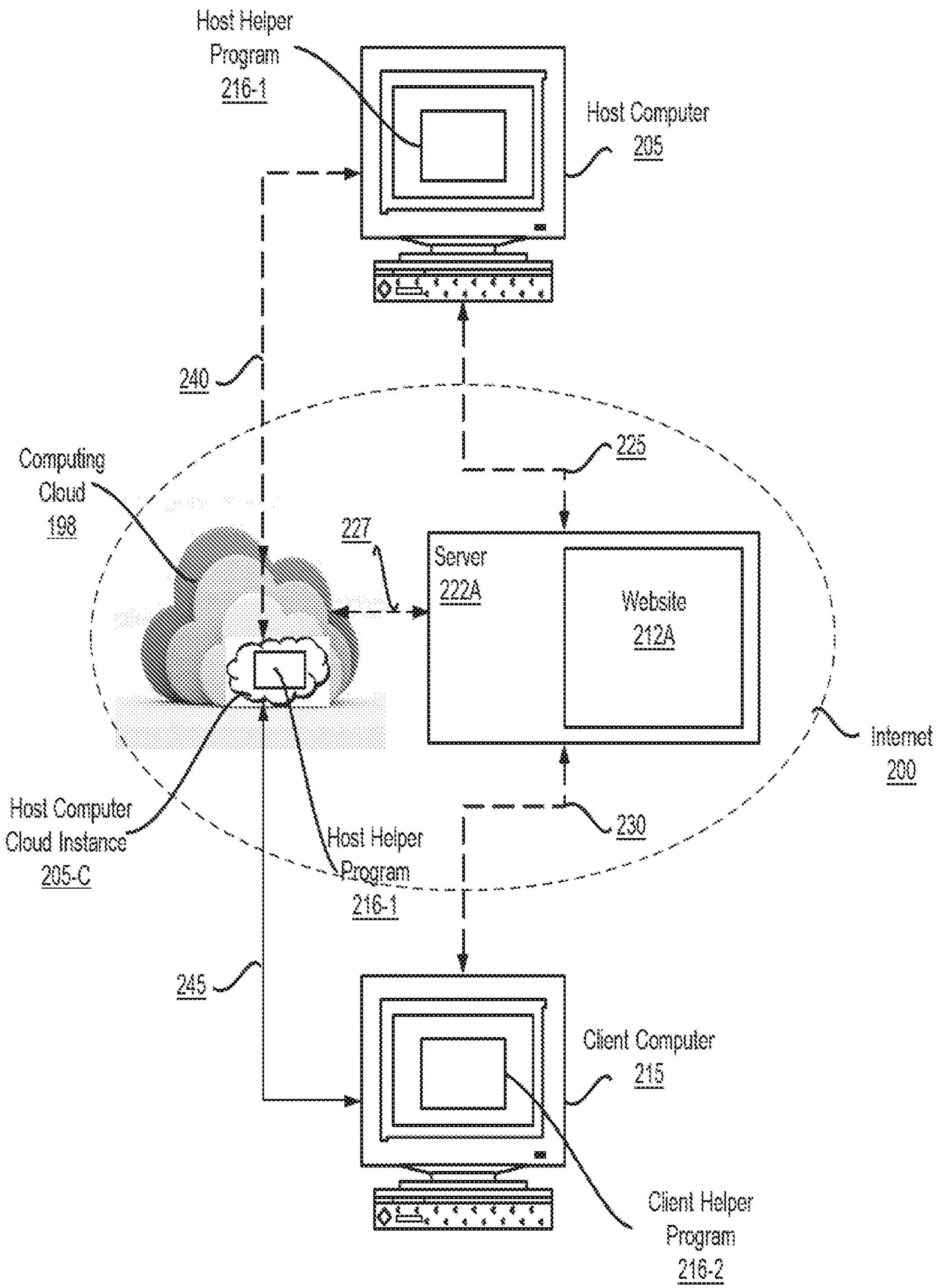
Figure 26E:
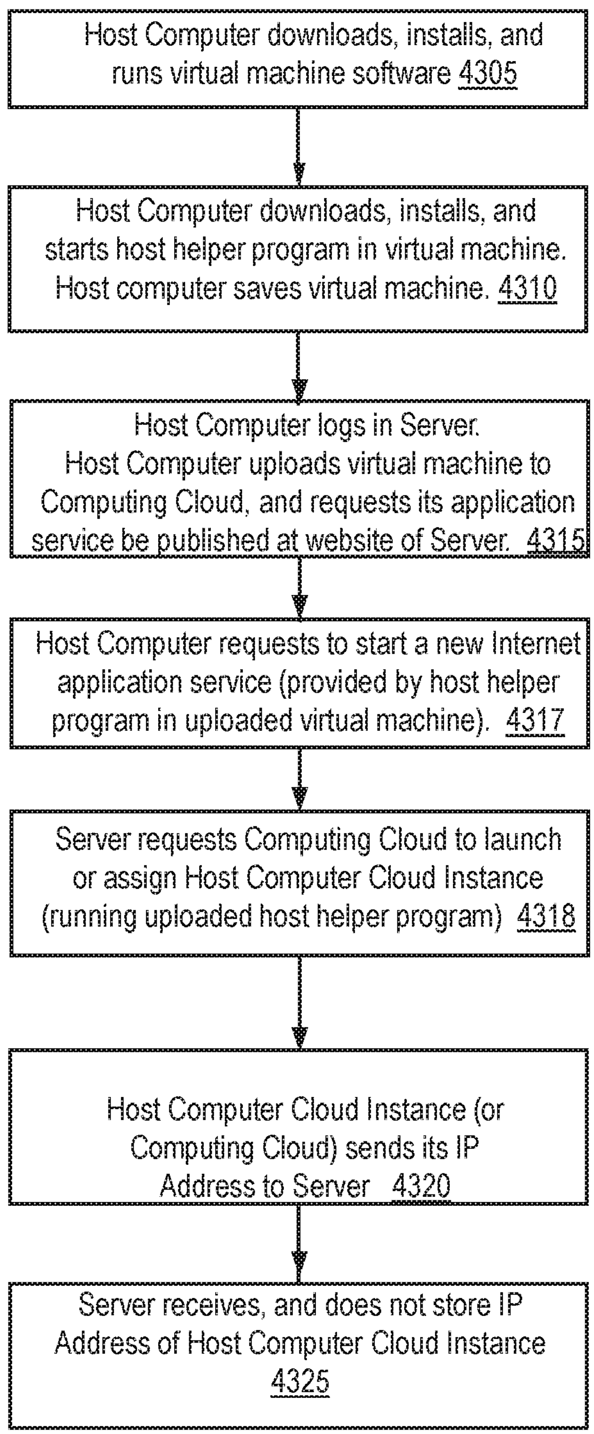
FIGS. 26E, 27A, 27B, 27C, 28, 29A, 29B, 29C are flowcharts illustrating providing direct network connections using cloud instance for multipoint meeting service over a computer network in accordance with another embodiment of the present invention.

FIG. 26E presents a flowchart of a process performed by a host computer 205 to provide direct network connections between cloud instance and computers over a computer network in accordance with an embodiment of the present invention. First, the host computer 205 downloads, installs, and runs 4305 virtual machine software. In one embodiment, the virtual machine software is VMWARE player or workstation described above. Next, the host computer 205 downloads, installs, and starts host helper program 216-1, e.g. Moodle learning management system Internet application (from the Australian company Moodle Pty Ltd.) described above, in its installed virtual machine. FIG. 26C illustrates in one embodiment the host helper program 216-1 running in installed virtual machine (virtual machine not shown) operating in the host computer 205. The host computer 205 saves 4310 (in FIG. 26E) the virtual machine (with its installed host helper program 216-1) in the host computer 205.

Note that FIG. 26C illustrates the host helper program 216-1 running in installed virtual machine (virtual machine not shown in FIG. 26C) operating in the host computer 205 in FIG. 26C. The host helper program 216-1 typically runs in the host computer 205 (e.g. in FIGS. 24A, 30A, and in most other FIGS.), which are different than FIG. 26C which illustrates the host helper program 216-1 running in installed virtual machine (virtual machine not shown in FIG. 26C) operating in the host computer 205 in FIG. 26C.

The host computer 205 next logs-in 4315 to a server 222A of a computing cloud 198, e.g. Amazon.com computing cloud, in FIG. 26C. The host computer 205 uploads 4315 its saved virtual machine (with its installed host helper program 216-1) to the computing cloud 198, and requests the Internet application service provided by its installed host helper program 216-1 be published 4315, e.g. via an options page 4305A illustrated in FIG. 26B. This host computer 205 or other host computer 205 may then visit options page 4305A (of a website 212A hosted by the server 222A) to request to start 4317 a new Internet application service (provided by the host helper program 216-1 in uploaded virtual machine. e.g. Moodle learning management system Internet application (from the Australian company Moodle Pty Ltd.).

The server 222A requests 4318 (in FIG. 26E) the computing cloud 198 (in FIG. 26D) to launch-or-assign 4318 host computer cloud instance 205-C (operating a copy of the uploaded virtual machine running installed host helper program 216-1 in uploaded virtual machine). The host computer cloud instance 205-C (in FIGS. 26C and 26D)) sends 4320 its IP address to the server 222A, which receives 4325 and does not store 4325 (but may store later, not shown) in FIG. 26E. The storing or not storing of the above received IP address in the server 222A is further described in Cases E to H in FIG. 50 and Para [0342A], [0343A], [0344A], and [0345A].

A client computer 215 in FIG. 26D may join the started Internet application service above (in FIG. 26E Step 4317, or on options page 4305A in FIG. 26B) using the process described in FIG. 27A, 27B, 27C, 29A, 29B, or 29C below.

Please note that in embodiments of the present invention, a computing cloud (requested by a server) to launch-or-assign a cloud instance for a first (host) computer (or a (second) client computer) means that (i) the computing cloud may launch a new cloud instance for the first computer (or for the client computer), or (ii) the computing cloud may assign an existing cloud instance (that meets the requirements-in-the-request, including hardware and bandwidth requirements (if any), of the server) for the first computer (or for the client computer) . . . for example in Para [0231D] and other Para such as Para [0082], [0121], [0124], [0129], . . . , [0222], [0291], [0318], [0445], . . . etc.

Figure 27A:
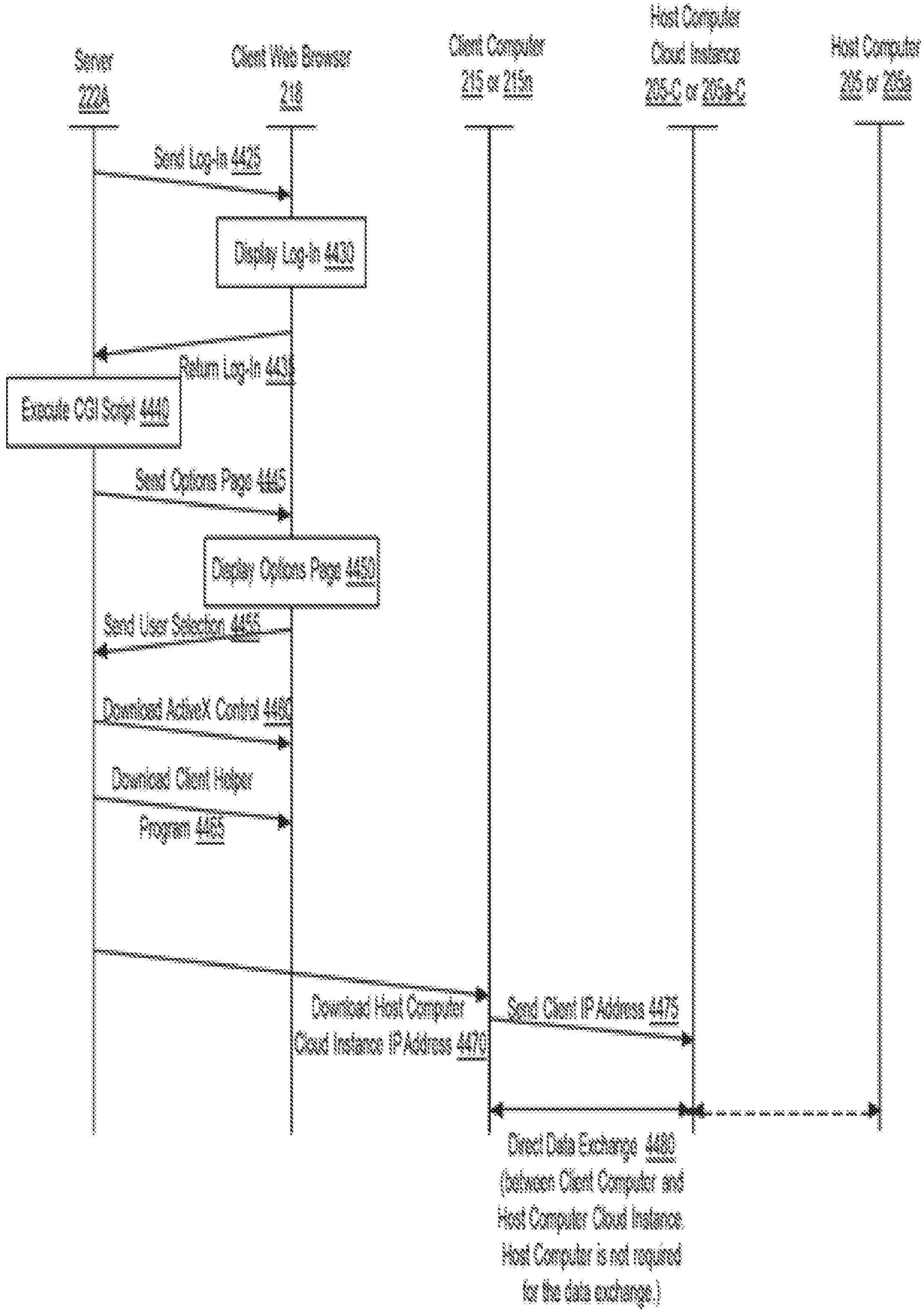

Referring now to FIG. 27A, a process corresponding to a direct network connections using cloud instance for providing Internet application service between a networked cloud instance and a networked computer is presented. The process illustrated in FIG. 27A corresponds to a direct network connections architecture including a host computer 205, a host computer cloud instance 205-C, a client computer 215 executing a client web browser 218, and a server 222A hosting a website 212A (FIG. 24A). When the client computer 215 accesses the website 212A via the client web browser 218, the server 222A sends 4425 a log-in form to the client web browser 218. In one embodiment, the log-in form comprises a web page file in PHP, ASPX, or HTML format. The client web browser 218 then displays 4430 the log-in form (not shown herein). Once the log-in form is completed, client web browser 218 returns 4435 the completed log-in form to the server 222A.

In one embodiment, the return 4435 of the completed log-in form causes the server 222A to execute 4440 a designated common gateway interface (CGI) script. In one embodiment, the CGI script may include commands implemented in the PERL programming language which cause the server 222A to send 4445 an options page 4305A (FIG. 26B) to the client web browser 218. The client web browser 218 then displays 4450 the options page 4305A, allowing an option to be selected. As explained above, the user of the client computer 215 may select the icon 4302 to join the Internet application service of the host computer 205 or other icons (not-shown) for other options (e.g. those icons on options page 4305 in FIG. 26A). The user selection is then sent 4455 to the server 222A. Based on the selection, an ActiveX control is downloaded 4460 to the client web browser 218 from the server 222A.

If the selection is to join Internet application service of a host computer 205, an ActiveX control will be downloaded 4460 to: (i) download 4465 a client helper program 216-2 to the client computer 215, (ii) download 4470 the IP address of the host computer cloud instance 205-C to the client computer 215, and (iii) using the downloaded 4470 IP address of the host computer cloud instance 205-C, connect a client helper program 216-2 on the client computer 215 to a host helper program 216-1 on the host computer cloud instance 205-C. Connecting the two host/client helper programs 216-1, 216-2 includes the client computer 215 sending 4475 the IP address of the client computer 215 to the host computer cloud instance 205-C. Once the helper program 216-2 on the client computer 215 and the helper program 216-1 on the host computer cloud instance 205-C are connected, data may be exchanged 4480 directly between the host computer cloud instance 205-C and the client computer 215 via the direct connection 245, without any data passing through the server 222A. The host computer 205 is not needed for the data exchange 4480.

Figure 24B:
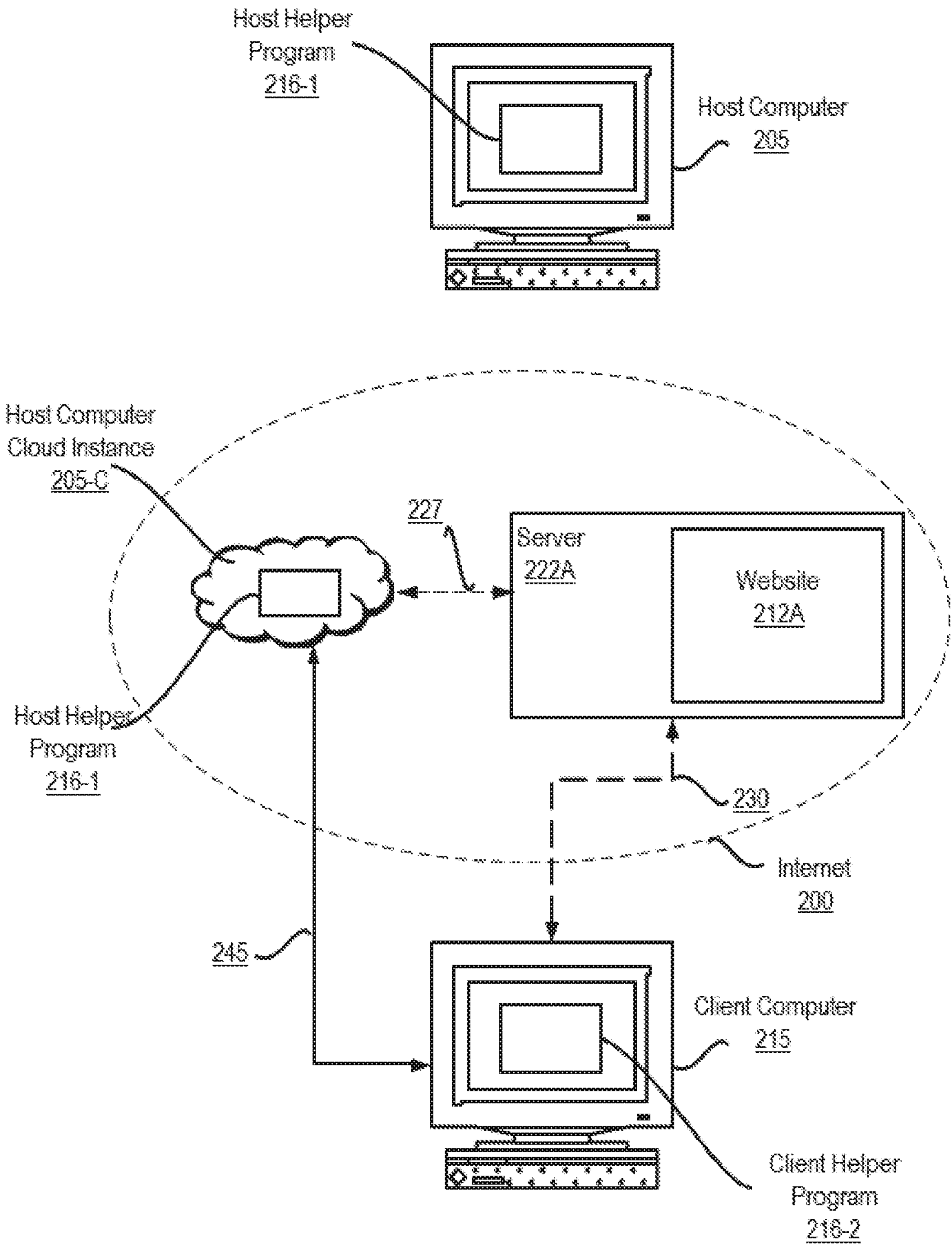
Figure 25D:
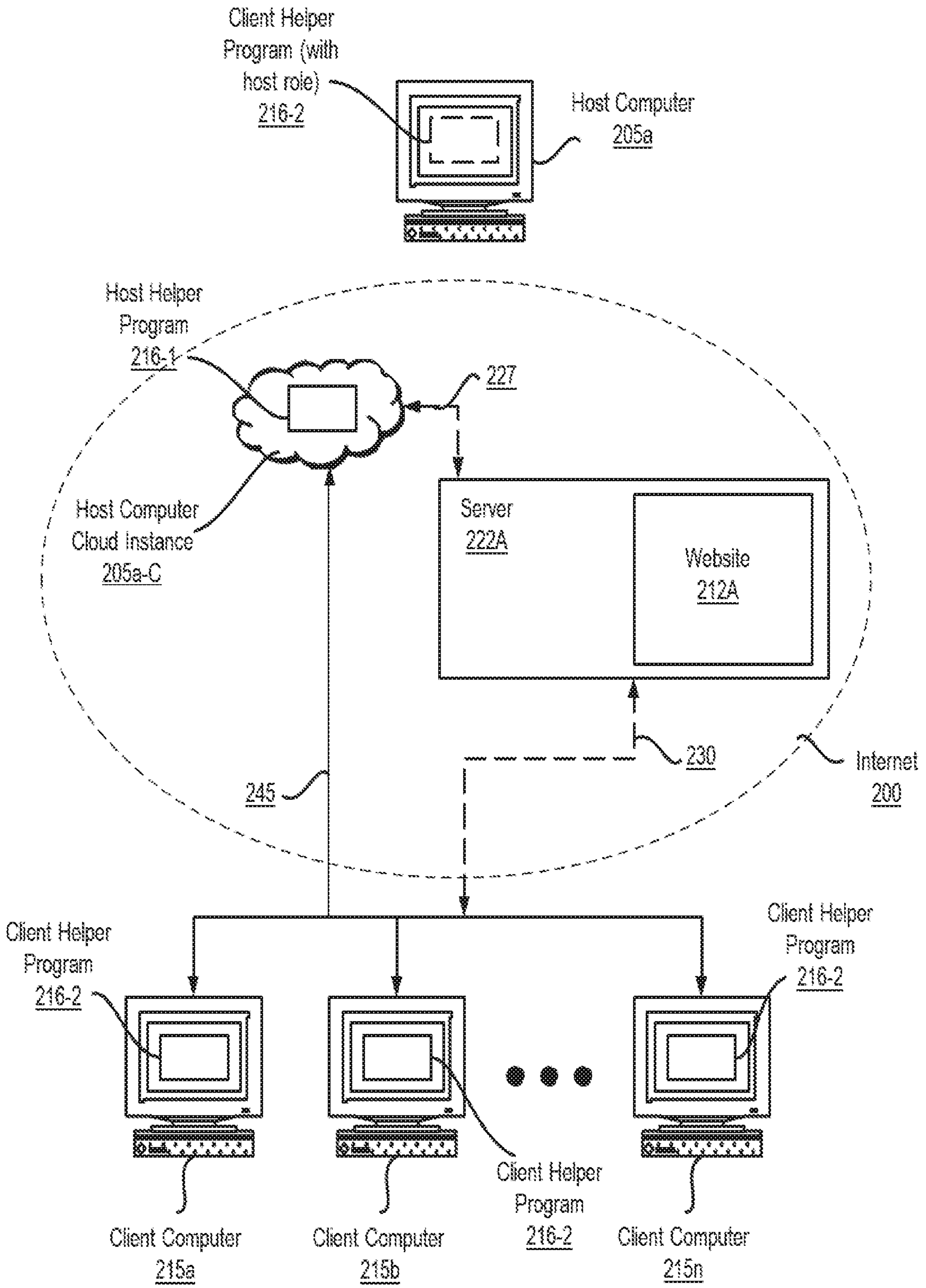

Please note: data exchange 4480 (in FIG. 27A) and FIGS. 24B, 25B, and 25D illustrate that after the Internet application services are started 4517 (in FIG. 28), and after the server 222A receives 4525 (in FIG. 28) the IP address of the host computer cloud instances 205-C, 205*a*-C (in FIGS. 24B and 25B respectively), the host computers 205, 205*a* (in FIGS. 24B and 25B respectively) are not needed to be communicatively linked 240 with the host computer cloud instance 205-C, 205*a*-C or linked 225 with the server 222A respectively (for the client computers 215, 215*a* . . . , 215*n* (in FIGS. 24B and 25B respectively) to use the Internet application services of the host computer cloud instances 205-C, 205*a*-C). Please further note: communication links 225, 240 appear in FIGS. 24A, 25A, and 25C, and do not appear in FIGS. 24B, 25B, and 25D.

Thus, in accordance with embodiments of the present invention, FIGS. 24A, 24B, 25A, 25B, 25D, 26E, 27A, 28, and 29A above illustrate creating direct network connections for Internet application service between the client computer 215, 215*n* (in FIGS. 24B and 25B respectively) and the host computer cloud instance 205-C, 205*a*-C (in FIGS. 24B and 25B respectively) via the Internet (including how to start the host computer cloud instance 205-C, 205*a*-C in FIGS. 24B and 25B respectively).

In some embodiments, rather than downloading 4465 a client helper program 216-2 to the client computer 215, 215*n*, the downloaded 4460 ActiveX control may activate a client helper program 216-2 already present on the client computer 215, 215*n* (not shown herein). In some embodiments, the client helper program 216-2 is an Internet browser such as Internet Explorer or Firefox.

In another embodiment, if the selection is to become a new host, a process slightly different from that depicted in FIG. 27A takes place. Specifically, upon receiving the client computer 215, 215*n* request to become a new host, the server 222A requests a computing cloud (e.g. computing cloud 198 in FIG. 26D) to launch-or-assign (not shown) a host computer cloud instance 205-C, 205*a*-C for the client computer 215, 215*n*. An ActiveX control is downloaded 4460 to download (not shown) a host helper program 216-1 to the client computer 215, 215*n*. At this point, the client computer 215, 215*n* is now also acting as a host computer 205, 205*a*. Accordingly, the IP address of the client's host computer cloud instance 205-C, 205*a*-C is sent (not shown) to the server 222A. The server 222A receives (not shown) the IP address of the client's host computer cloud instance 205-C, 205*a*-C so that it may later be provided to other client computers 215*a*, 215*b*, . . . etc. which request it. The server 222A also sends (not shown) the IP address of the client computer 215, 215*n* (now a new host computer 205, 205*a*) to the client's host computer cloud instance 205-C, 205*a*-C, which is communicatively coupled (not shown) to the client computer 215, 215*n* (now the new host computer 205, 205*a*) via a direct connection.

It is noted that the IP address of the client computer 215, 215*n* may be sent to the host computer 205, 205*a* and/or the host computer cloud instance 205-C, 205*a*-C using indirect connection 225, 230, or indirect connection 227, 230 (instead of using direct network connection 240, 245 in FIG. 24A and FIG. 25A) in further embodiments of the current invention.

Figure 27B:
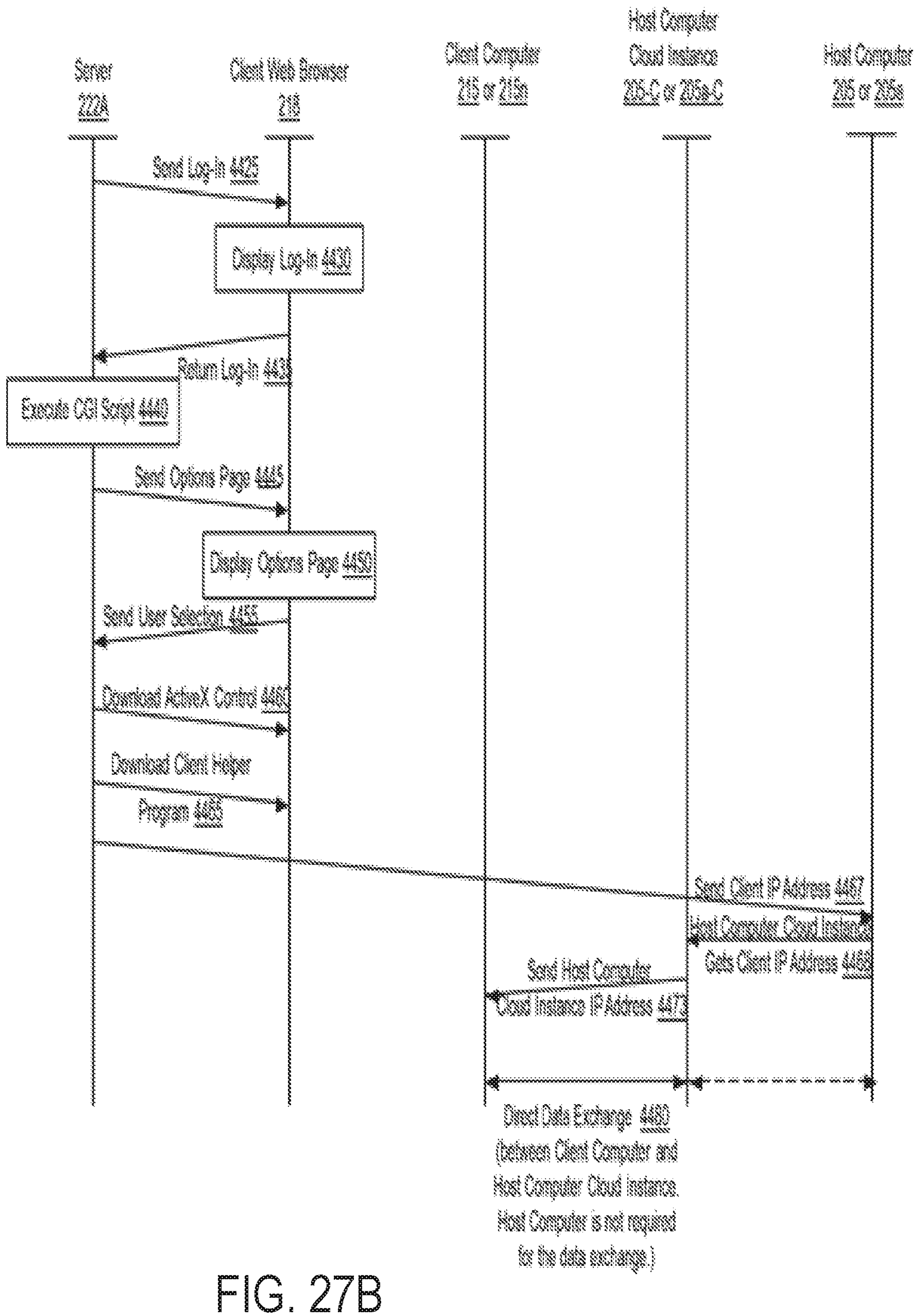

In an embodiment of the current invention illustrated in FIG. 27B, which FIG. 27B is similar to FIG. 27A, but in FIG. 27B the server 222A sends 4467 (using indirect connection 225, 230 in FIG. 24A and FIG. 25A) the IP address of the client computer 215, 215*n* to the host computer 205, 205*a*, which is communicatively coupled to the host computer cloud instance 205-C, 205*a*-C. The host computer cloud instance 205-C, 205*a*-C therefore also gets 4468 the IP address of the client computer 215, 215*n*. The host computer cloud instance 205-C, 205*a*-C then sends 4473 the host computer cloud instance IP address to the client computer 215, 215*n*. Direct data exchange 4480 can then occur, using direct network connection 245 in FIG. 24B and FIG. 25B, between the client computer 215, 215*n* and the host computer cloud instance 205-C, 205*a*-C, and without going through the server 222A. The host computer 205, 205*a* (in FIG. 24B and FIG. 25B) is not needed for the direct data exchange 4480 (in FIG. 27B).

Figure 27C:
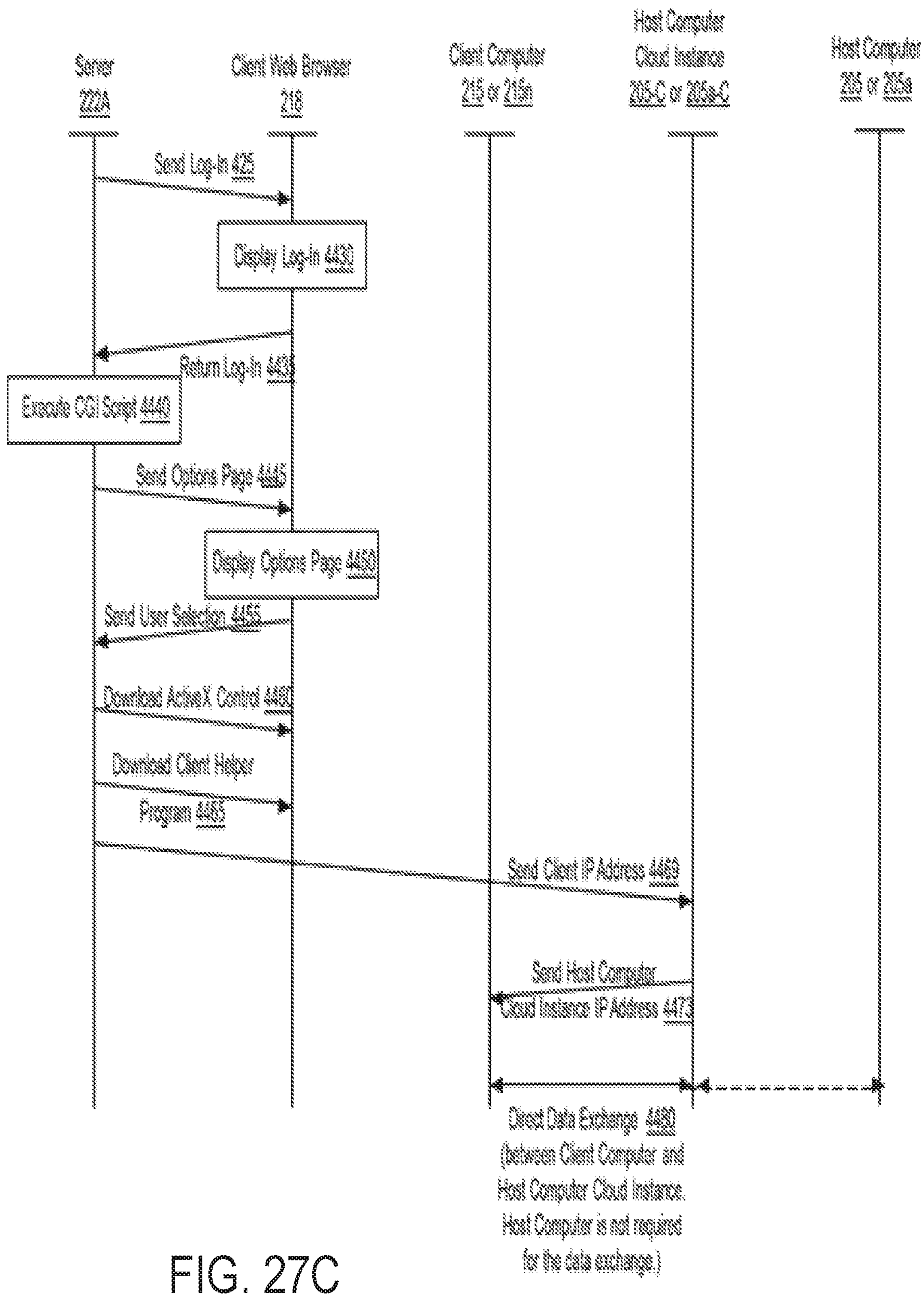

In another embodiment of the current invention illustrated in FIG. 27C, which FIG. 27C is similar to FIG. 27A, but in FIG. 27C the server 222A sends 4469 (using indirect connection 227, 230 in FIG. 25A) the IP address of the client computer 215, 215*n* to the host computer cloud instance 205-C, 205*a*-C which may be (but not required in FIGS. 24B, 25B and 27C to be) communicatively coupled to the host computer 205. The host computer cloud instance 205-C, 205*a*-C then sends 4473 the host computer cloud instance 205-C, 205*a*-C IP address to the client computer 215, 215*n*. Direct data exchange 4480 can then occur, using direct network connection 245 in FIG. 24A and FIG. 25B, between the client computer 215, 215*n* and the host computer cloud instance 205-C, 205*a*-C, and without going through the server 222A. The host computer 205, 205*a* (in FIGS. 24B and 25B respectively) is not needed for the direct data exchange 4480 (in FIG. 27C).

FIG. 28 presents a flowchart of a process performed by a host computer 205, 205*a* to provide direct network connections between cloud instance and computers over a computer network in accordance with an embodiment of the present invention. First, the host computer 205, 205*a* downloads and starts 4505 the host helper program 216-1. In one embodiment, the host helper program 216-1 is the Moodle learning management system (running on Linux-Apache-MySQL-PHP solution stack) Internet application (from the Australian company Moodle Pty Ltd.). The host computer 205, 205*a* then connects 4510 to a server 222A.

Once the host computer 205, 205*a* is connected 4510 to the server 222A, the host computer 205, 205*a* logs in 4515 to a website 212A hosted by the server 222A. The host computer 205, 205*a* requests to start a new Internet application service in step 4517. The server 222A then requests a computing cloud 198 (in FIG. 26D) to launch-or-assign a host computer cloud instance 205-C, 205*a*-C for the host computer 205, 205*a* in step 4518. The host computer cloud instance 205-C, 205*a*-C sends its IP address in step 4520 to the server 222A, which receives it and does not store it (but may store later, not shown) in step 4525 for later distribution to client computer 215, 215*n*. The storing or not storing of the above received IP address in the server 222A is further described in Cases E to H in FIG. 50 and Para [0342A], [0343A], [0344A], and [0345A].

Figure 29A:
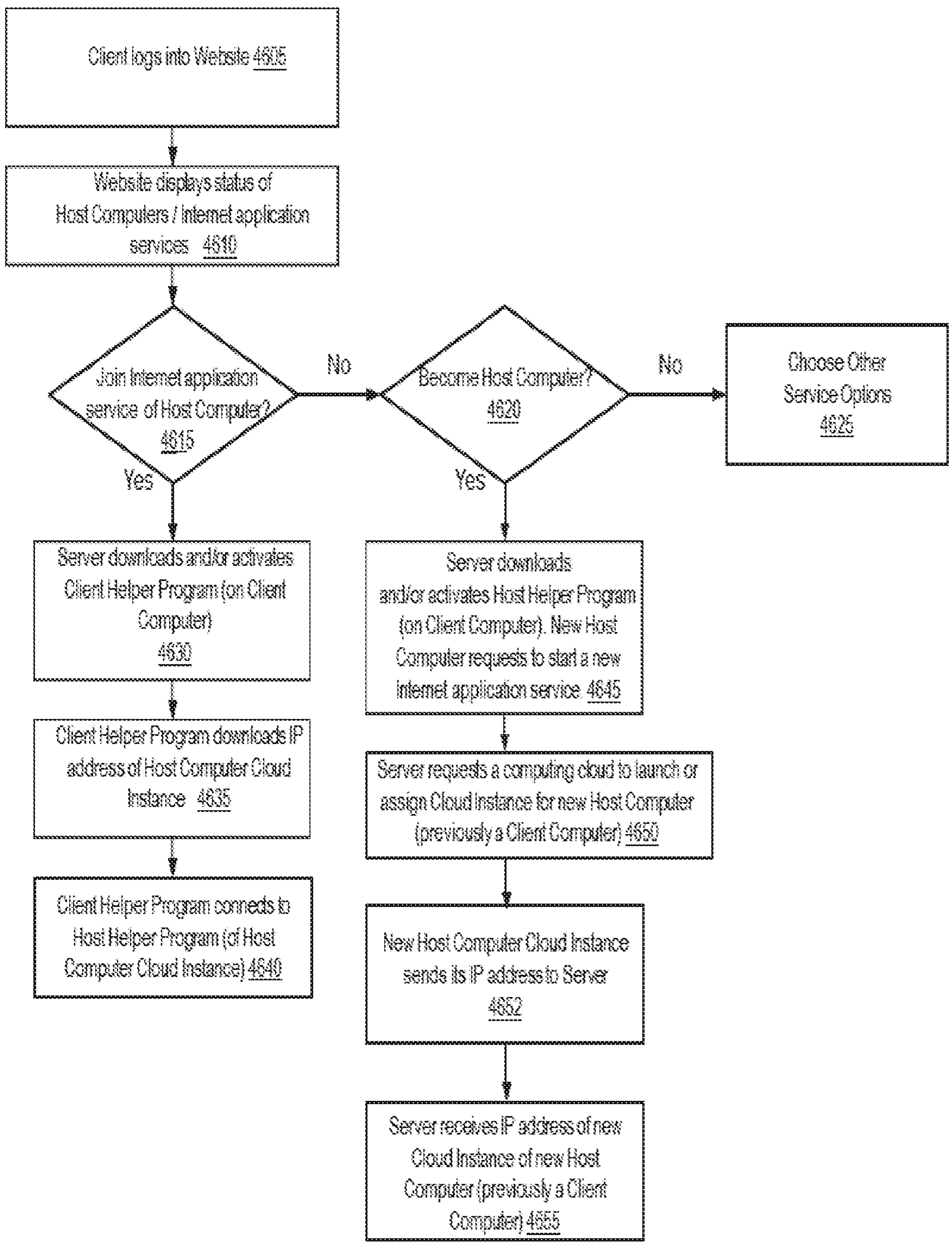

FIG. 29A presents a flowchart of a process performed by a client computer 215, 215*n* to provide direct network connections between cloud instance and computers over a computer network in accordance with an embodiment of the present invention. The client computer 215, 215*n* logs in 4605 to a website 212A hosted by a server 222A. The website 212A then displays 4610 the status of one or more host computers 205, 205*a*. In one embodiment, the status of one or more host computers 205, 205*a* are displayed on an options page 4305 such as that depicted in FIG. 26A.

If the client computer 215, 215*n* selects to join the Internet application service of a host computer 205, 205*a* at step 4615, the server 222A downloads and/or activates 4630 a client helper program 216-2 on the client computer 215, 215*n*. The client computer 215, 215*n* then requests (not shown) to join the Internet application of host computer 205, 205*a*. The client helper program 216-2 then downloads 4635 (from the server 222A) the IP address of the selected host computer cloud instance 205-C, 205*a*-C. Using the downloaded 4635 IP address of the host computer cloud instance 205-C, 205*a*-C, the client helper program 216-2 connects 4640 to a host helper program 216-1 on the host computer cloud instance 205-C, 205*a*-C. Further data exchange 4480 (in FIG. 27A) for Internet application service between the host computer cloud instance 205-C. 205*a*-C and the client computer 215, 215*n* occurs via the direct connection 245 (FIG. 24A and FIG. 25A) using the two host/client helper programs 216-1, 216-2, without going through the server 222A. The host computer 205, 205*a* is not needed (illustrated in FIG. 24B and FIG. 25B) for data exchange 4480 (in FIG. 27A).

If the client computer 215 selects to become a host computer 205 (step 4615—No and step 4620—Yes in FIG. 29A), the server 222A downloads and/or activates 4645 a host helper program 216-1 on the client computer 215, 215*n*. The new host helper program 216-1 requests 4645 to start a new Internet application service. The server 222A also requests a computing cloud 198 (in FIG. 26D) to launch-or-assign 4650 a host computer cloud instance 205-C, 205*a*-C for the new host computer 205, 205*a* (previously a client computer 215, 215*n*). The host computer cloud instance 205-C, 205*a*-C then sends 4652 its IP address to the server 222A, where it is received 4655 for future distribution to one or more other client computers 215*a*, 215*b*, . . . etc.

Finally, the user may choose 4625 other service options other than joining Internet application service of a host computer or becoming a host computer (step 4615—No, and step 4620—No).

In some cases, a host computer 205 may have a dynamic IP address, complicating the creation of a direct network connection using cloud instance. For example, the host computer 205, 205*a* may be coupled to the Internet through an Internet service provider ("ISP"). Often, an ISP has a limited number of Internet connections and therefore a limited number of IP addresses it may allocate at any one time. Thus, when a host computer 205, 205*a* connects to the Internet through an ISP, it is dynamically assigned a new IP address each time it connects. The present invention solves the problem of dynamic IP address and sends (to the server 222A) the host computer cloud instance 205-C, 205*a*-C IP address each time a host computer cloud instance 205-C, 205*a*-C is launched-or-assigned by the computing cloud 198 upon a request by the server 222A.

It is noted that the IP address of the client computer 215, 215*n* may be sent to the host computer 205, 205*a* and/or the host computer cloud instance 205-C, 205*a*-C using indirect connection 225, 230, or indirect connection 227, 230 (instead of using direct network connection 240, 245 in FIG. 24A and FIG. 25A) in further embodiments of the current invention.

Figure 29B:
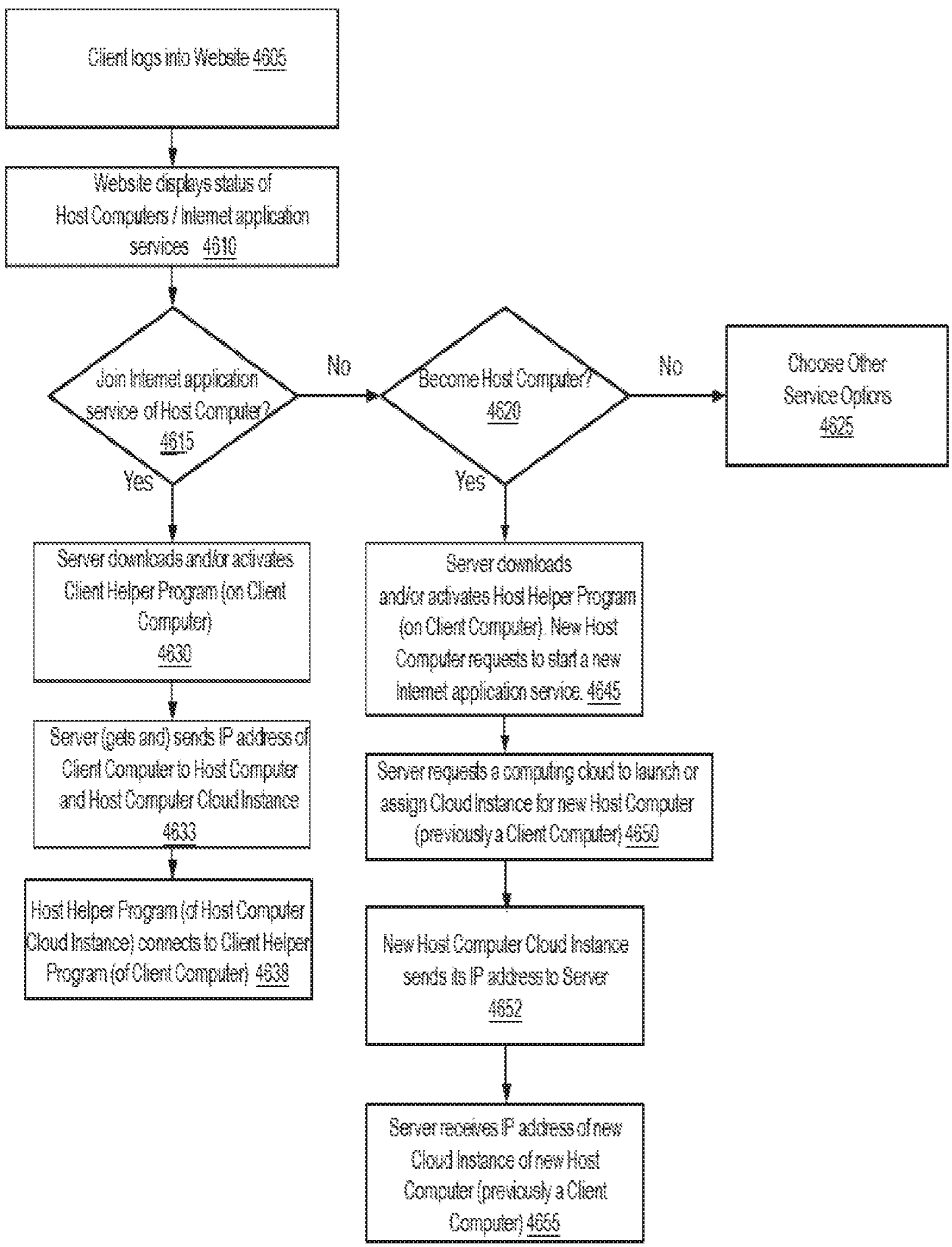

In an embodiment of the current invention illustrated in FIG. 29B, which FIG. 29B is similar to FIG. 29A, but in FIG. 29B the server 222A (gets 4605 and) sends 4633 (using indirect connection 225, 230 in FIG. 24A and FIG. 25A) the IP address of the client computer 215, 215*n* to the host computer 205, 205*a* and the host computer cloud instance 205-C, 205*a*-C, which are communicatively coupled to each other. The host helper program 216-1 (of the host computer cloud instance 205-C, 205*a*-C) then connects 4638 to the client helper program 216-2 (of the client computer 215, 215*n*). Direct data exchange 4480 in FIG. 27B can then occur, using direct network connection 245 in FIGS. 24B and 25B, between the client computer 215*n* and the host computer cloud instance 205*a*-C, and without going through the server 222A The host computer 205, 205*a* (in FIGS. 24B and 25B) is not needed for direct data exchange 4480 (in FIG. 27B).

Figure 29C:
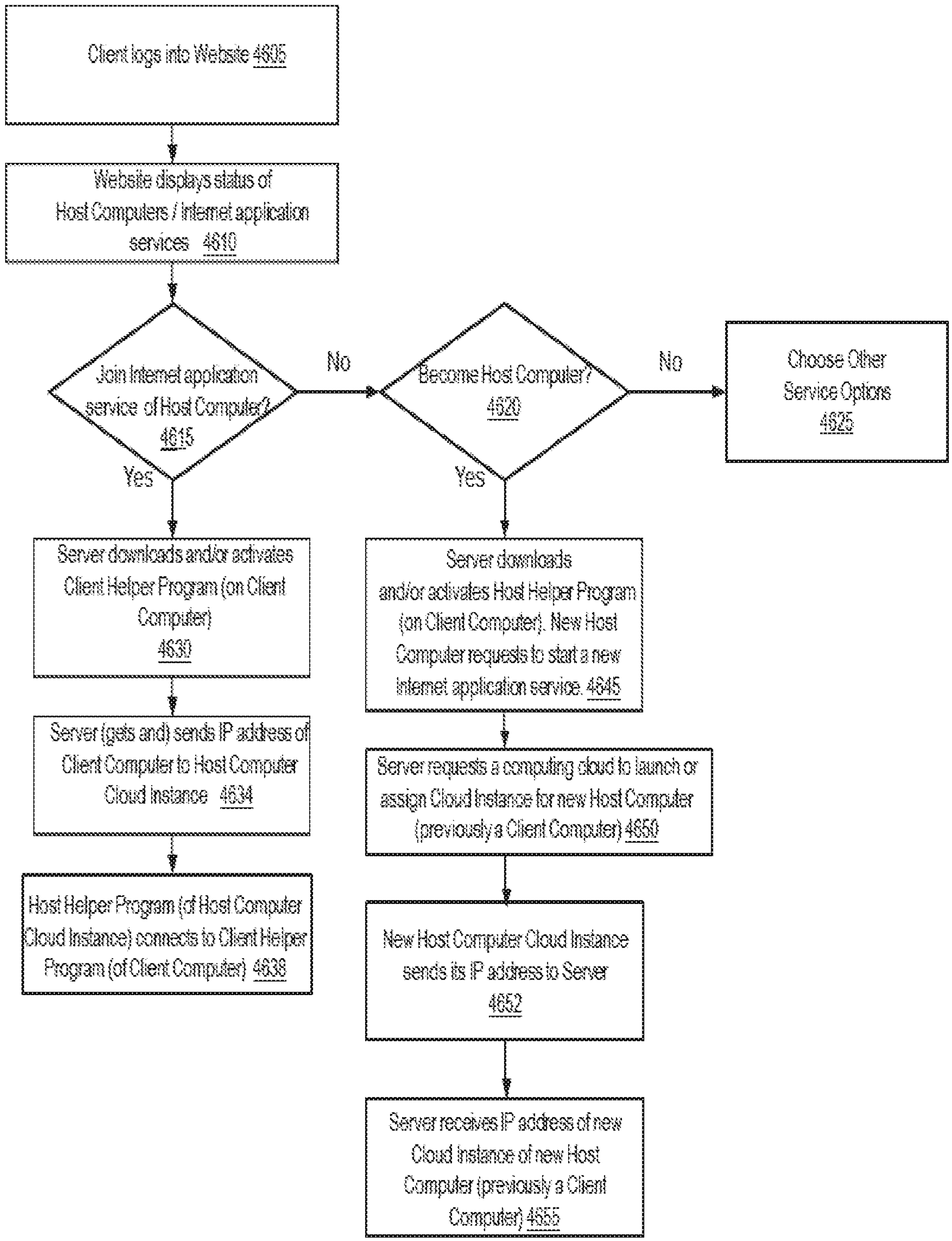

In another embodiment of the current invention illustrated in FIG. 29C, which FIG. 29C is similar to FIG. 29A, but in FIG. 29C the server 222A (gets 4605 and) sends 4634 (using indirect connection 227, 230 in FIG. 25A) the IP address of the client computer 215, 215*n* to the host computer cloud instance 205-C, 205*a*-C, which may be (but not required in FIGS. 24B, 25B and 29C to be) communicatively coupled to the host computer 205, 205*a*. The host helper program 216-1 (of the host computer cloud instance 205-C, 205*a*-C) then connects 4638 to the client helper program 216-2 (of the client computer 215, 215*n*). Direct data exchange 4480 in FIG. 27C can then occur, using direct network connection 245 in FIGS. 24B and 25B, between the client computer 215, 215*n* and the host computer 205, 205*a*, using the host computer cloud instance 205-C, 205*a*-C, and without going through the server 222A. The host computer 205, 205*a* (in FIGS. 24B and 25B respectively) is not needed for direct data exchange 4480 (in FIG. 27C).

Private Network Considerations (Adapted for Internet Application Service)

A host computer 205 may reside on a private network (e.g., an internal network for a company or organization). The Internet Assigned Numbers Authority ("IANA") allocates a designated set of IP addresses for private networks, and routers on the Internet are configured to discard any data packets associated with IP addresses from that designated set. Private networks typically include a computer network security barer, commonly called a "firewall," to prevent unauthorized intrusion into the private network. As such, the IP address of a host computer 205 on a private network is not unique (i.e., other computers on private networks elsewhere globally may have the same IP address) and not accessible from the public Internet.

Figure 30A:
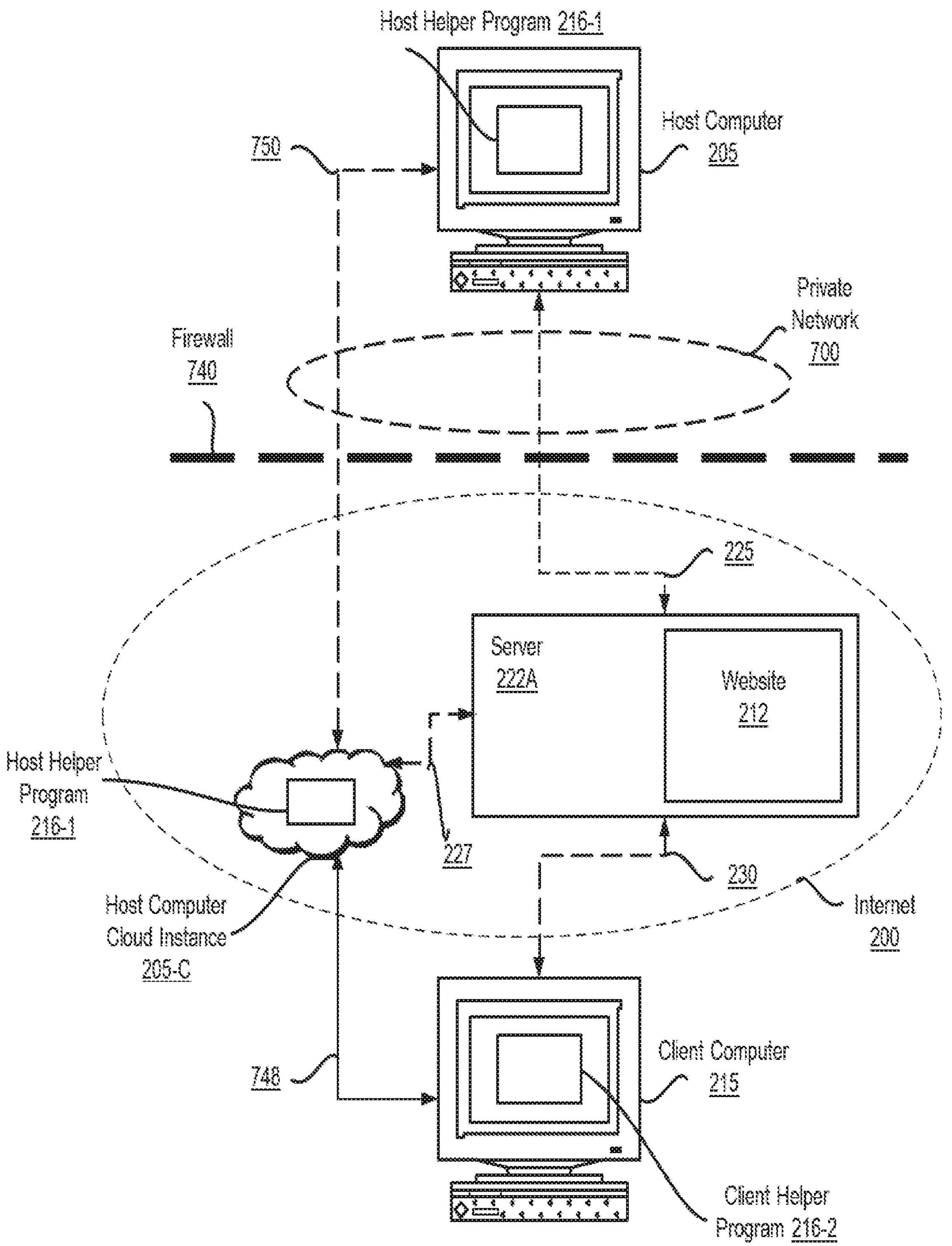
FIGS. 30A, 30B are block diagrams illustrating providing direct network connections using cloud instance for Internet application service over a computer network in accordance with another embodiment of the present invention.

FIG. 30A illustrates a direct network connection using cloud instance, in accordance with one embodiment of the present invention, suitable for providing a direct network connection when one of the networked computers does not have a unique, publicly accessible IP address. The embodiment depicted in FIG. 30A includes a host computer 205, a client computer 215, a server 222A hosting a website 212A, a firewall 740, and a host computer cloud instance 205-C. The host computer 205 is connected to the Internet 200 through a private network 700. The private network 700 is protected by the firewall 740. Thus, the host computer 205 and the client computer 215 are both connected to the Internet 200, but are separated by the firewall 740.

In one embodiment, the direct network connection using cloud instance depicted in FIG. 30A functions largely as the direct network connection using cloud instance described above in reference to FIG. 24A. Specifically, the host computer cloud instance 205-C has a unique, publicly accessible IP address. The host computer 205 may be able to access the host computer cloud instance 205-C and form a network connection 750. Thus, the host computer cloud instance 205-C double duties provides a unique, publicly accessible IP address by which a client computer 215 outside of the private network 700 may join the Internet application service of the host computer 205 via a direct network connection 748 using the host computer cloud instance 205-C.

In one embodiment, when the host computer 205 accesses the website 212A to request starting a new Internet application service, the server 222A requests a computing cloud 198 (not shown) to launch-or-assign the host computer cloud instance 205-C. The host computer cloud instance 205-C is communicatively coupled to the host computer 205. When a client computer 215 subsequently accesses the website 212A and selects to join the Internet application service of the host computer 205, the server 222A sends to the client computer 215 the IP address of the host computer cloud instance 205-C via a network connection 230. Once the client computer has the IP address of the host computer cloud instance 205-C, it may send data to the host computer cloud instance 205-C via a direct network connection 748. Moreover, the client computer 215 sends to the host computer cloud instance 205-C the IP address of the client computer 215 itself through the direct network connection 748. In other words, while the IP address of host computer cloud instance 205-C is sent to the client computer 215 through the server 222A via the indirect connections 225, 230, the IP address of the client computer 215 is sent to the host computer cloud instance 205-C via the direct connection 748. Thus, the client computer 215 and the host computer cloud instance 205-C are able to obtain one another's IP addresses and create a direct network connection 748. From this point onwards, the server 222A is not involved in communicating data between host computer 205 and client computer 215, and subsequent data exchange between the host computer cloud instance 205-C and the client computer 215 takes place via the direct network connection 748, and the host computer 205 is not needed for the data exchange. For the purpose of clarity, further details of a process for establishing a direct network connection using cloud instance with a host computer 205 on a private network 700 are provided below with reference to FIGS. 31A, 32, and 33A.

It should be noted that the host computer cloud instance 205-C provides double duties functions related to actively hosting an Internet application service session, including importantly forming a bridge between the non-accessible private network 700 and the public Internet 200, to facilitate data exchange.

In some embodiments, the direct network connection using cloud instance architectures depicted by FIG. 7, FIG. 2C, FIG. 2D, FIG. 2E, FIG. 25A, FIG. 25C and FIG. 30A are adapted using the above-described techniques to provide Internet application services for multiple host computers 205 on private networks and/or multiple client computers 215. In such embodiments, the host computer cloud instance 205-C may need to distinguish between multiple host computers 205 to ensure that data is transmitted only to one or more proper destinations.

The server 222A may send a unique meeting ID corresponding to an Internet application service between the host computer 205 and the client computer 215 to the client computer 215 along with the IP address of the host computer cloud instance 205-C. The client computer 215 may then send to the host computer cloud instance 205-C the unique meeting ID along with the IP address of the client computer 215. In one embodiment, the server 222A also sends the unique meeting ID to the host computer 205, which in turn sends it to the host computer cloud instance 205-C. The host computer cloud instance 205-C may store both the unique meeting ID and the associated IP address of the host computer 205 in a look-up table. Thus, when a client computer 215 sends data to a host computer 205 via the direct network connection 748 using the host computer cloud instance 205-C, as illustrated in FIG. 30A, it may designate the data as corresponding to the particular meeting ID, allowing the host computer cloud instance 205-C, using the look-up table, to transmit the data to the appropriate host computer 205.

Typically, a private network with a firewall 740 will also have a SOCKS proxy executing between the client web browser 218 and the server. In such an embodiment, the CGI script executed by the server is forced to download the IP address of the SOCKS proxy rather than the IP address of the host computer 205. To resolve this issue, a name registration daemon is provided by the server which registers the IP address and port number of each host computer 205 or client computer 215. When the host/client helper programs 216-1, 216-2 start on host and client computers 205, 215 respectively, the two host/client helper programs 216-1, 216-2 connect to the daemon, allowing the daemon to register the IP addresses of the host and client computers 205, 215 respectively.

Figure 31A:
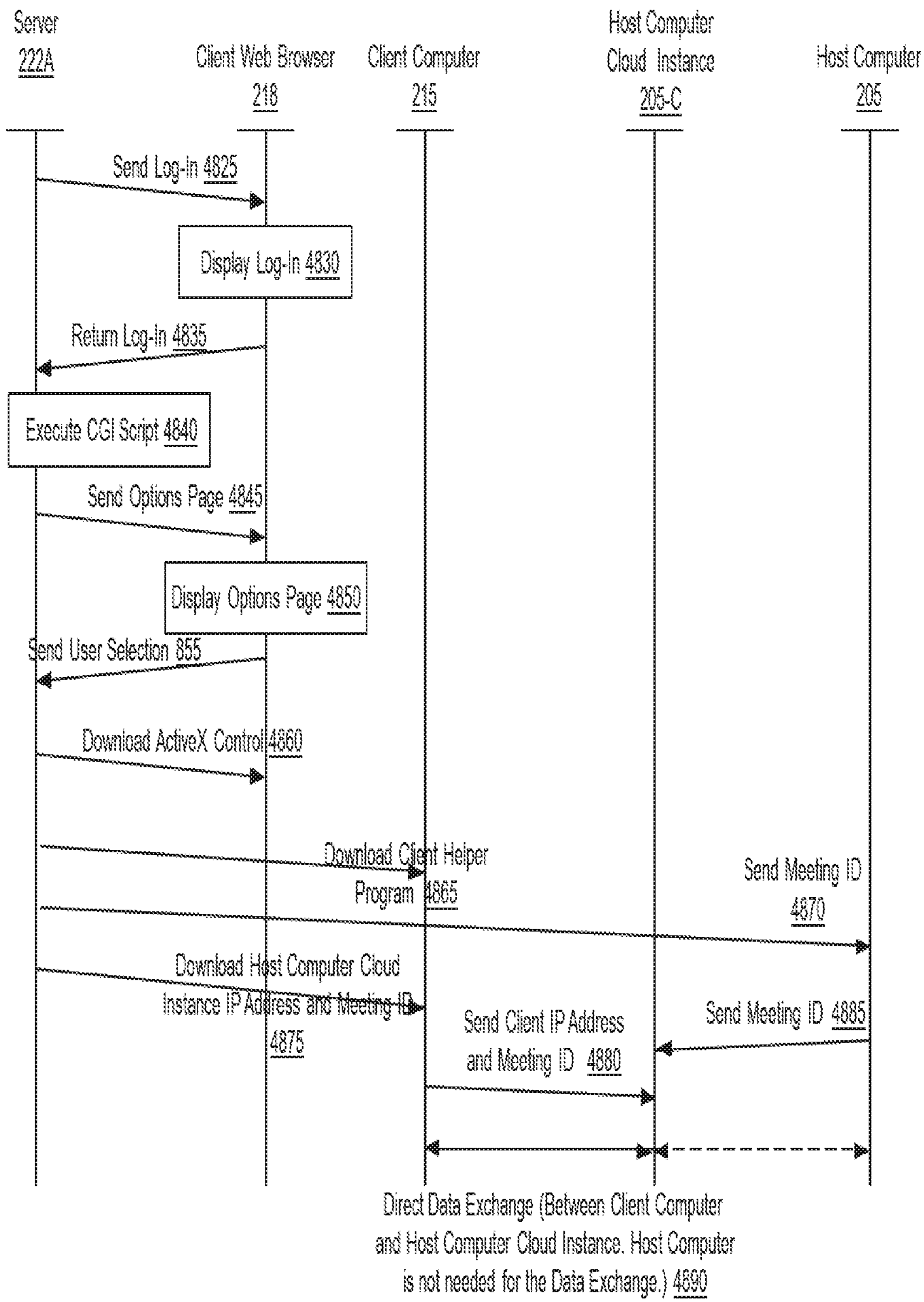
FIGS. 31A, 31B, 31C, 32, 33A, 33B, 33C are flowcharts illustrating providing direct network connections using cloud instance for Internet application service over a computer network in accordance with another embodiment of the present invention.

Referring now to FIG. 31A, a process is illustrated for providing a direct network connection using cloud instance for Internet application service between a client computer 215 and a host computer 205 on a private network in accordance with one embodiment of the present invention. The process illustrated in FIG. 31A is adapted from FIG. 8A. Specifically, the event diagram of FIG. 31A corresponds to a direct network connection using cloud instance for Internet application service with a host computer 205 on a private network 700. When a host computer 205 is on a private network 700, a unique meeting ID is sent 4870 by the server 222A to the host computer 205. The unique meeting ID is also downloaded 4875 from the server 222A by the client computer 215 along with the IP address of the host computer cloud instance 205-C. Then, the IP address of the client computer 215 and the meeting ID are sent 4880 by the client computer 215 to the host computer cloud instance 205-C, which is communicatively coupled to the host computer 205. The host computer 205 also sends 4885 the meeting ID to the host computer cloud instance 205-C. From this point onwards, data may be exchanged 4890 between the client computer 215 and the host computer cloud instance 205-C via the direct network connection 748, and the host computer 205 is not needed for the data exchange 4890; and the host computer cloud instance 205-C acts as a bridge between the private network 700 and the Internet 200, and as illustrated in FIG. 30A. When client computer 215 sends data to the host computer cloud instance 205-C, it may designate the data as corresponding to the particular meeting ID, allowing the host computer cloud instance 205-C, using the look-up table, to differentiate the data as for the appropriate Internet application service (running inside the host computer cloud instance 205-C) of the host computer 205.

Figure 30B:
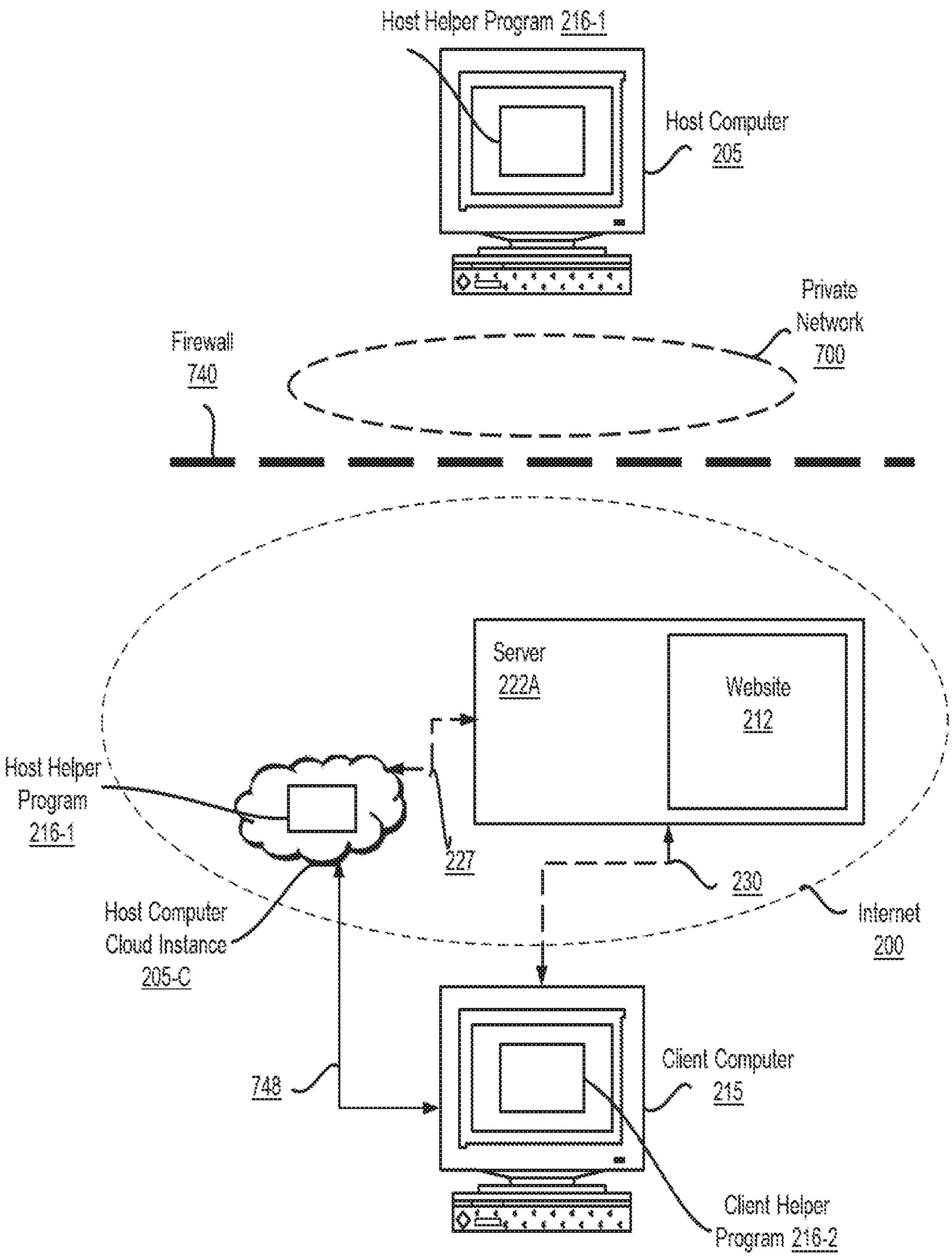

Please note: data exchange 4890 (in FIG. 31A) and FIG. 30B illustrate that after the Internet application service is started 4919 (in FIG. 32), and after the server 222A receives 4925 (in FIG. 32) the IP address of the host computer cloud instance 205-C, the host computer 205 is not needed to be communicatively linked 750 with the host computer cloud instance 205-C or linked 225 with the server 222A respectively (for the client computer 215 to use the Internet application service of the host computer cloud instance 205-C). Please further note: communication links 225, 750 appear in FIG. 30A, and do not appear in FIG. 30B.

Thus, in accordance with an embodiment of the present invention, FIGS. 30A, 30B, 31A, 32, and 33A above illustrate creating direct network connections for Internet application service between the client computer 215 and the host computer cloud instance 205-C via the Internet (including how to start the host computer cloud instance 205-C).

It is noted that the IP address of the client computer 215 may be sent to the host computer 205 and/or the host computer cloud instance 205-C using indirect connection 225, 230, or indirect connection 227, 230 (instead of using direct network connection 748, 750 in FIG. 30A) in further embodiments of the current invention.

Figure 31B:
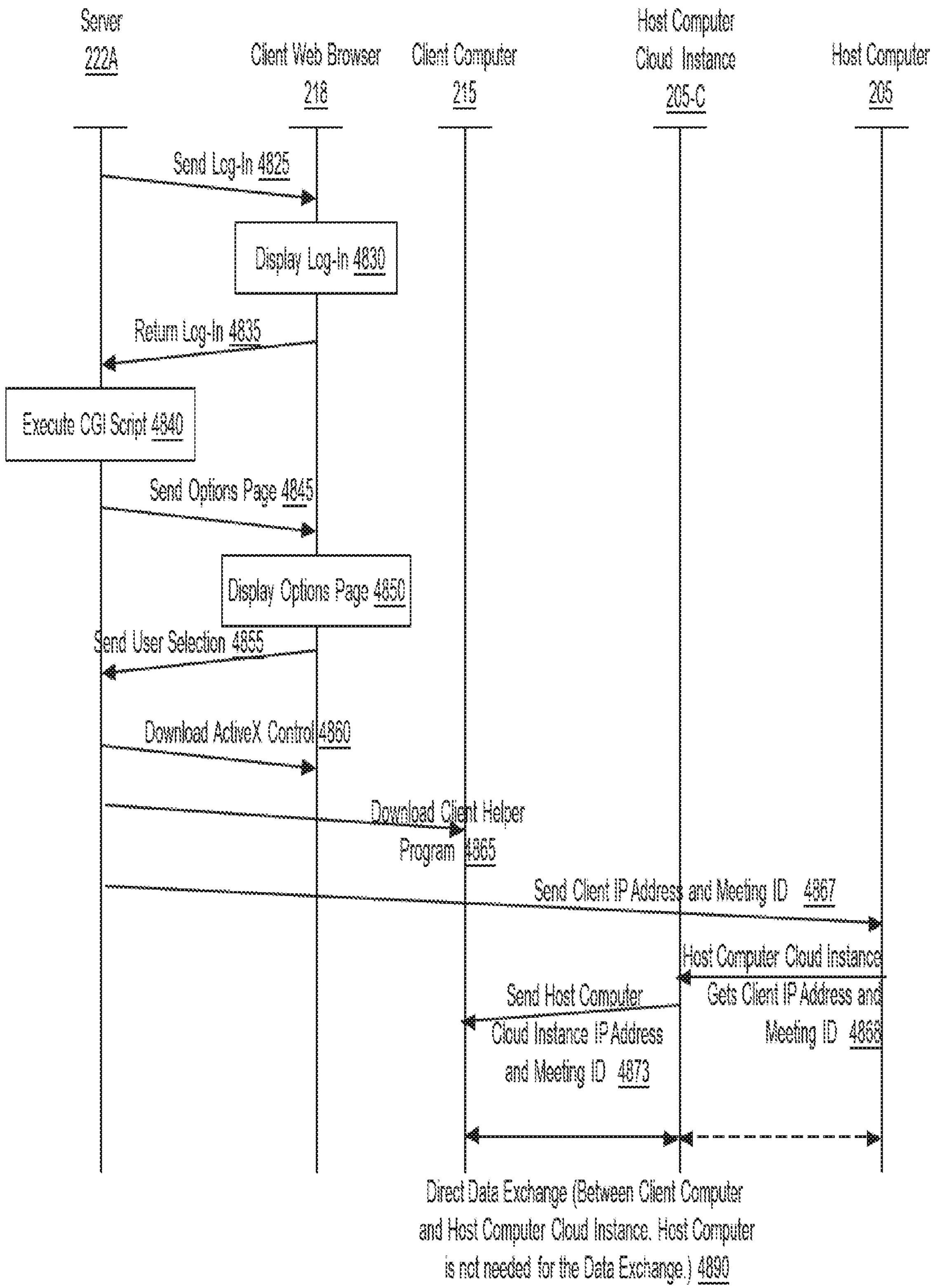

In an embodiment of the current invention illustrated in FIG. 31B, which FIG. 31B is similar to FIG. 31A, but in FIG. 31B the server 222A sends 4867 (using indirect connection 225, 230 in FIG. 30A) the IP address of the client computer 215 and meeting ID to the host computer 205, which is communicatively coupled to the host computer cloud instance 205-C. The host computer cloud instance 205-C therefore also gets 4868 the IP address of the client computer 215 and meeting ID. The host computer cloud instance 205-C then sends 4873 its IP address and the meeting ID to client computer 215. Direct data exchange 4890 can then occur, using direct network connection 748 in FIG. 30A, between client computer 215 and the host computer cloud instance 205-C, and without going through the server 222A. The host computer 205 (in FIG. 25B) is not needed for direct data exchange 4890 (in FIG. 31B).

Figure 31C:
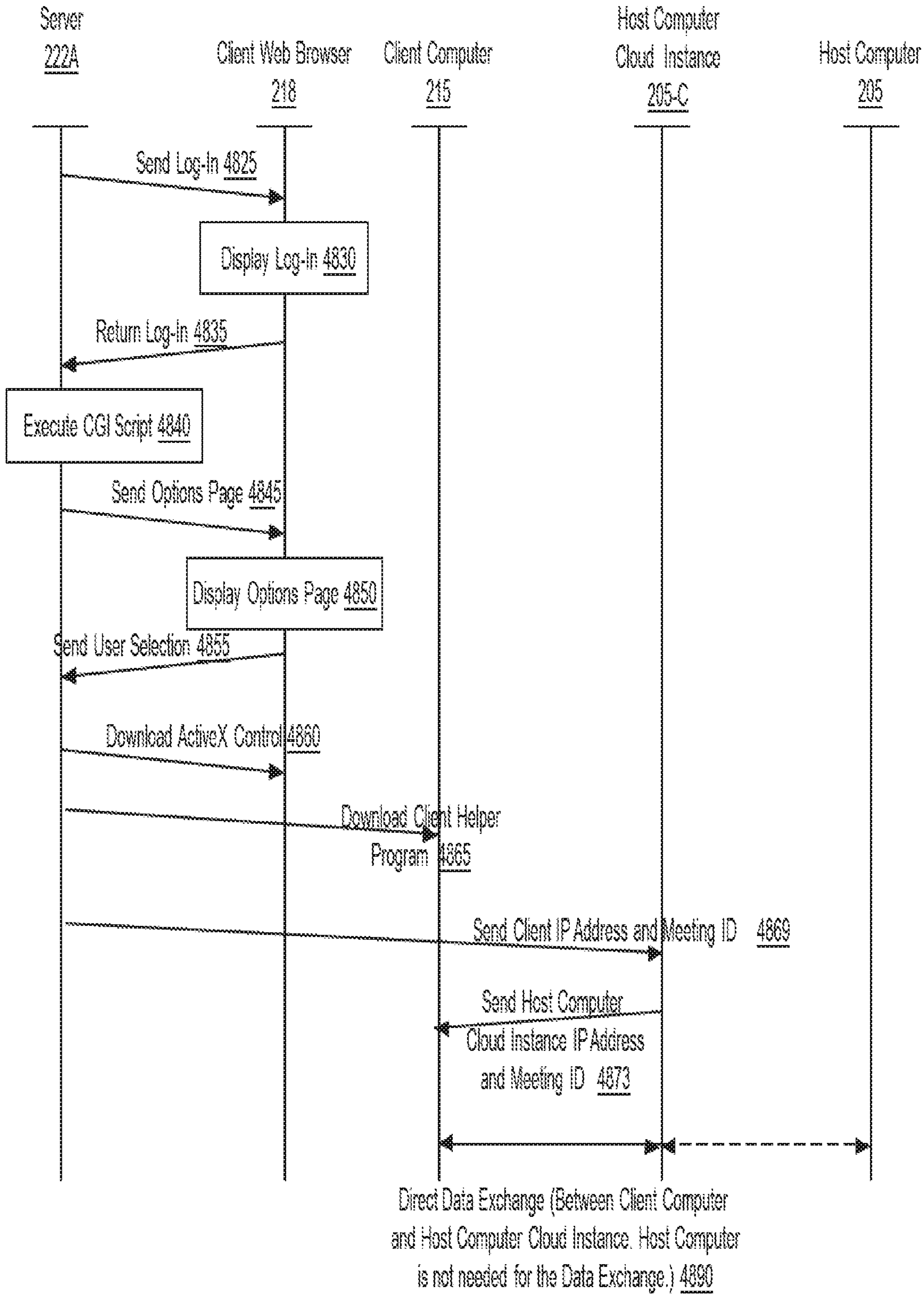

In another embodiment of the current invention illustrated in FIG. 31C, which FIG. 31C is similar to FIG. 31A, but in FIG. 31C the server 222A sends 4869 (using indirect connection 227, 230 in FIG. 30A) the IP address of the client computer 215 and meeting ID to the host computer cloud instance 205-C, which may be (but not required in FIGS. 30B and 31C to be) communicatively coupled to the host computer 205. The host computer cloud instance 205-C then sends 4873 its IP address and the meeting ID to client computer 215. Direct data exchange 4890 can then occur, using direct network connection 748 in FIG. 30B, between client computer 215 and host computer cloud instance 205-C, and without going through the server 222A. The host computer 205 (in FIG. 25B) is not needed for direct data exchange 4890 (in FIG. 31C).

Figure 32:
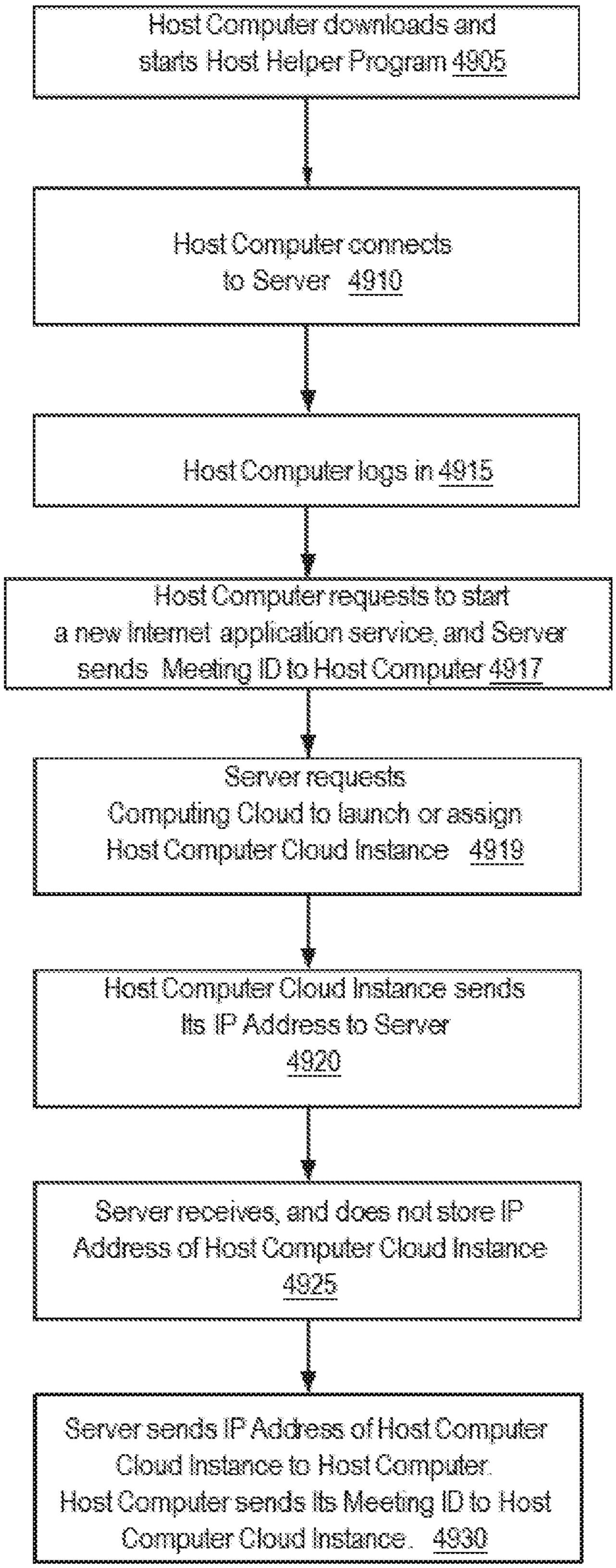

FIG. 32 presents a flowchart of a process performed by a host computer 205 on a private network 700 to provide direct network connections using cloud instance for Internet application service between computers over a computer network in accordance with an embodiment of the present invention. First, the host computer 205 downloads and starts 4905 the host helper program 216-1. In one embodiment, the host helper program 216-1 is the Moodle learning management system (running on Linux-Apache-MySQL-PHP solution stack) Internet application (from the Australian company Moodle Pty Ltd.). The host computer 205 then connects 4910 to the server 222A. The host computer 205 logs in 4915 to a website 212A hosted by the server 222A. This allows a website 212A hosted by the server 222A to accurately reflect the status of the host computer 205 on an options page 4305 (in FIG. 26A). The host computer 205 requests 4917 to start a new Internet application service, and the server 222A sends 4917 a unique meeting ID to the host computer 205. The server 222A requests 4919 a computing cloud 198 (not shown) to launch-or-assign a host computer cloud instance 205-C. The host computer cloud instance 205-C sends 4920 its IP address to the server 222A. The server 222A receives 4925 and does not store 4925 (but may store later, not shown) the IP address of the host computer cloud instance 205-C, and sends 4930 the IP address of the host computer cloud instance 205-C to the host computer 205. Finally, the host computer 205 sends 4930 its meeting ID to the host computer cloud instance 205-C. The storing or not storing of the above received IP address in the server 222A is further described in Cases E to H in FIG. 50 and Para [0342A], [0343A], [0344A], and [0345A].

Figure 33A:
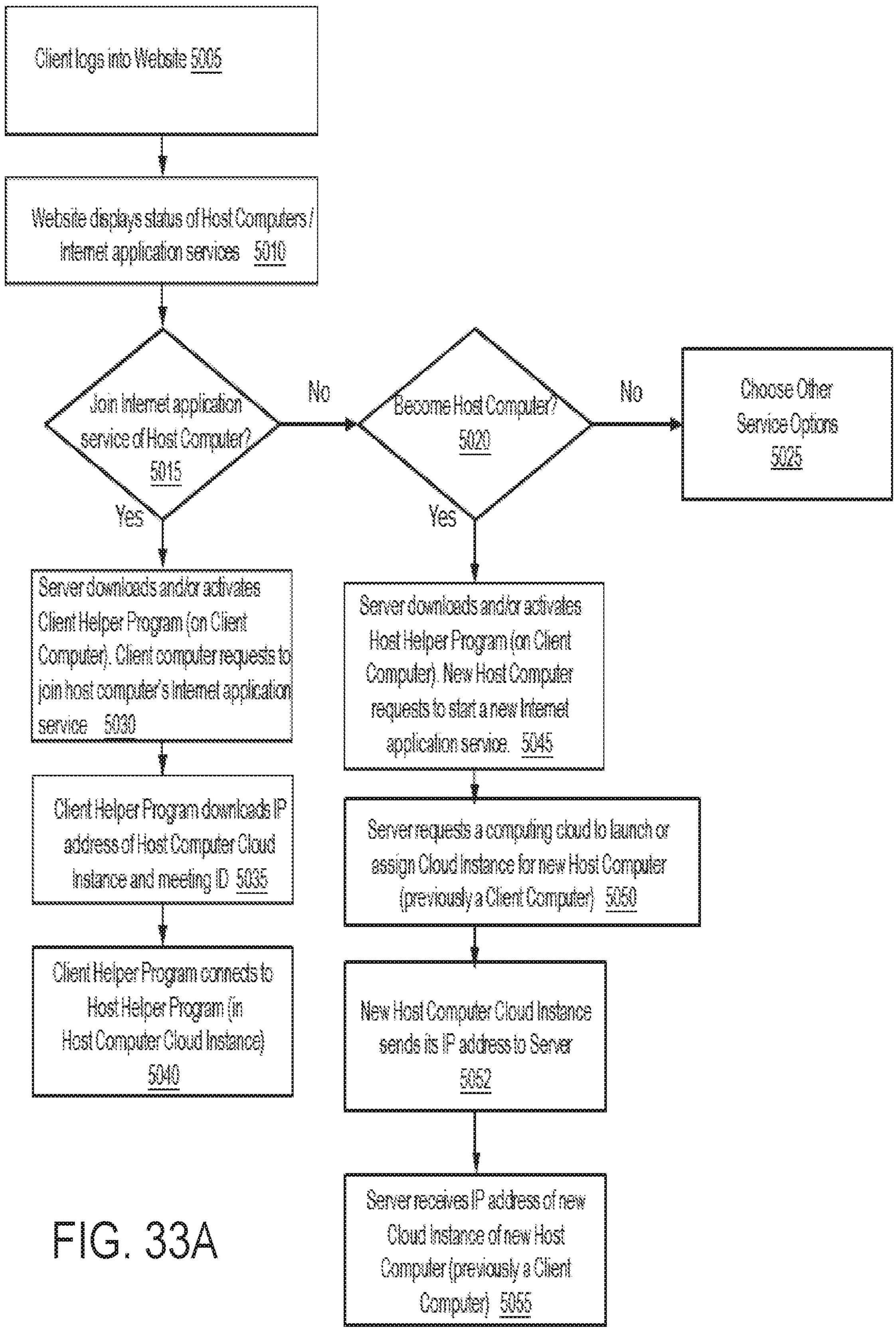

FIG. 33A presents a flowchart of a process performed by a client computer 215 to provide a direct network connection using cloud instance for Internet application service with a host computer 205 on a private network in accordance with an embodiment of the present invention. The process illustrated in FIG. 33A is adapted from FIG. 10A. Since the host computer 205 is in a private network communicating with the public Internet network 200 through the host computer cloud instance 205-C, when the client helper program 216-2 downloads 5035 the IP address of the host computer cloud instance 205-C, a unique meeting ID is also downloaded. As explained above, when client computer 215 sends data to the host computer cloud instance 205-C, it may designate the data as corresponding to the unique meeting ID, allowing the host computer cloud instance 205-C, using a look-up table, to differentiate the data as for the appropriate Internet application service (running inside the host computer cloud instance 205-C) of the host computer 205.

A host computer cloud instance 205-C may reside on a private network (e.g., an internal network for a company or organization) for security reasons, and have additional benefit of saving one public IP address for each host computer cloud instance 205-C residing on a private network. The Internet Assigned Numbers Authority ("IANA") allocates a designated set of IP addresses for private networks, and routers on the Internet are configured to discard any data packets associated with IP addresses from that designated set. Private networks typically include a computer network security barrier, commonly called a "firewall," to prevent unauthorized intrusion into the private network. As such, the IP address of a host computer cloud instance 205-C on a private network is not unique (i.e., other computers on private networks elsewhere globally may have the same IP address) and not accessible from the public Internet.

It is noted that the IP address of the client computer 215 may be sent to the host computer 205 and/or the host computer cloud instance 205-C using indirect connection 225, 230, or indirect connection 227, 230 (instead of using direct network connection 748, 750 in FIG. 30A) in further embodiments of the current invention.

Figure 33B:
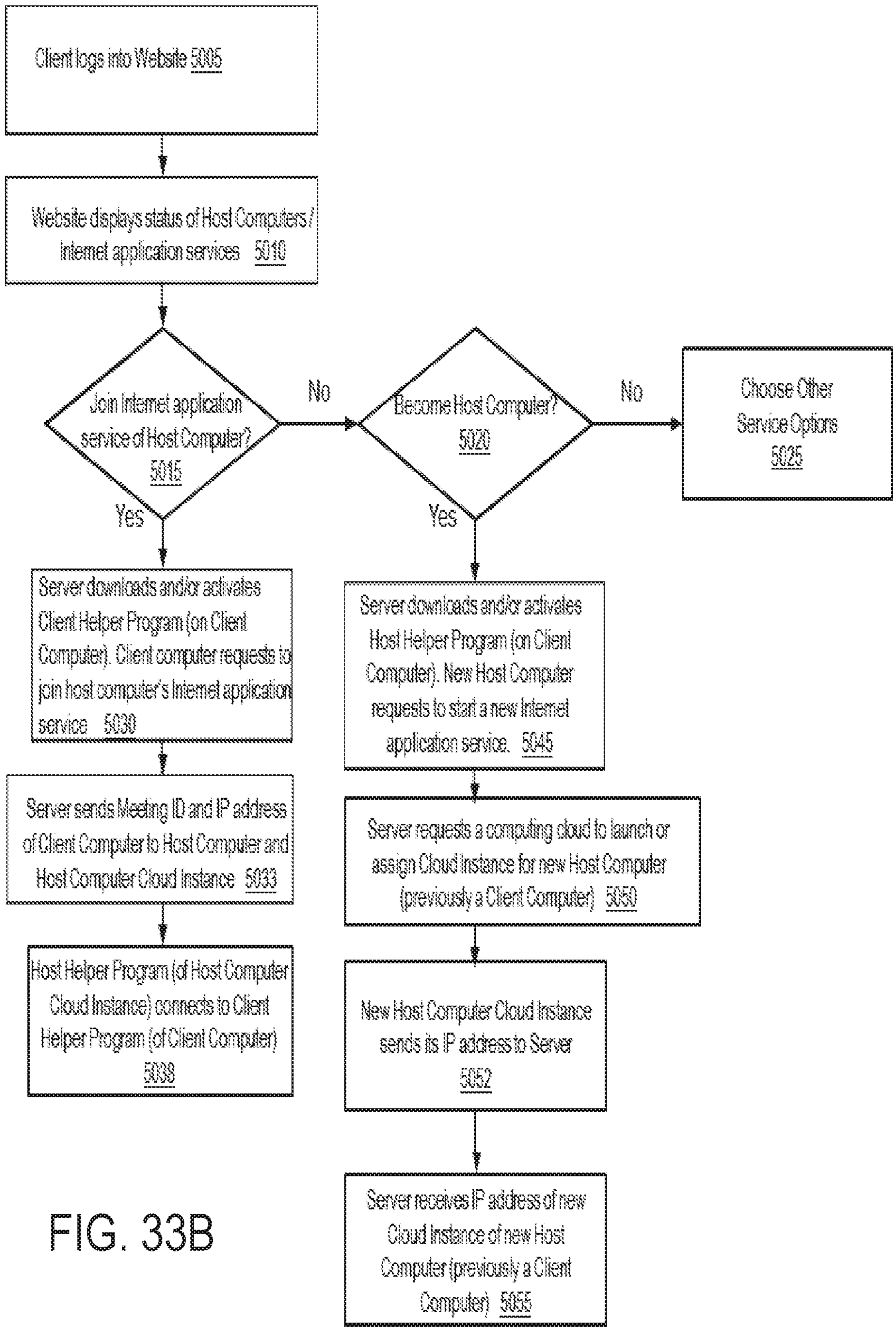

In an embodiment of the current invention illustrated in FIG. 33B, which FIG. 33B is similar to FIG. 33A, but in FIG. 33B the server 222A sends 5033 (using indirect connection 225, 230 in FIG. 30A) the IP address of the client computer 215 and the meeting ID to the host computer 205 and the host computer cloud instance 205-C, which are communicatively coupled to each other. The host helper program 216-1 (of the host computer cloud instance 205-C) then connects 5038 to the client helper program 216-2 (of the client computer 215). Direct data exchange 4890 (in FIG. 31B can then occur, using direct network connection 748, 750 in FIG. 30A, between the client computer 215 and the host computer cloud instance 205-C, and without going through the server 222A. The host computer 205 (in FIG. 30B) is not needed for direct data exchange 4890 (in FIG. 31B).

Figure 33C:
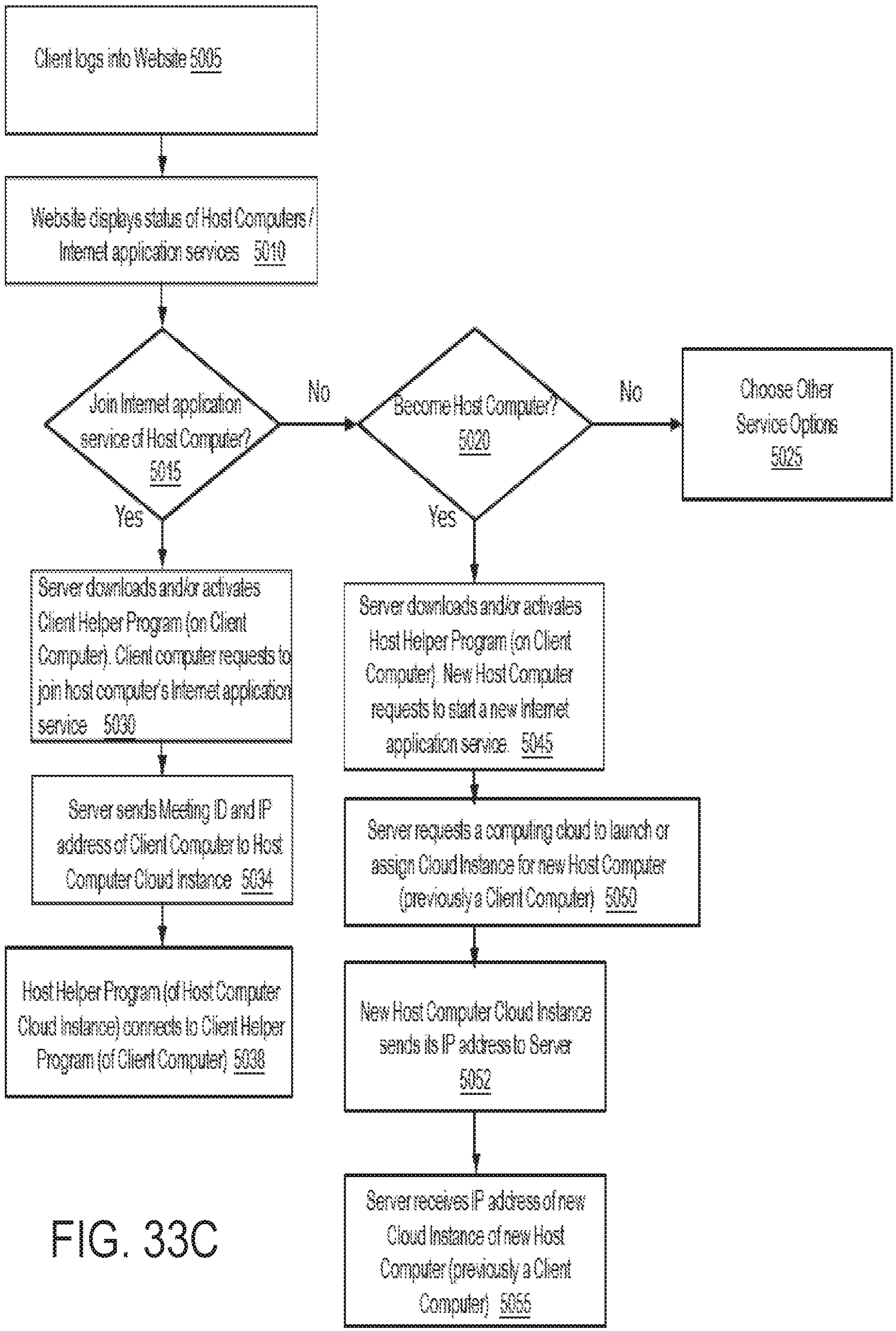

In another embodiment of the current invention illustrated in FIG. 33C, which FIG. 33C is similar to FIG. 33A, but in FIG. 33C the server 222A sends 5034 (using indirect connection 227, 230 in FIG. 30A) the IP address of the client computer 215 and the meeting ID to the host computer cloud instance 205-C, which may be (but not required in FIGS. 30B and 33C to be) communicatively coupled to the host computer 205. The host helper program 216-1 (of the host computer cloud instance 205-C) then connects 5038 to the client helper program 216-2 (of the client computer 215). Direct data exchange 4890 (in FIG. 31C can then occur, using direct network connection 748 in FIG. 30B, between client computer 215 and host computer cloud instance 205-C, and without going through the server 222A. The host computer 205 (in FIG. 30B) is not needed for direct data exchange 4890 (in FIG. 31C).

Figure 34A:
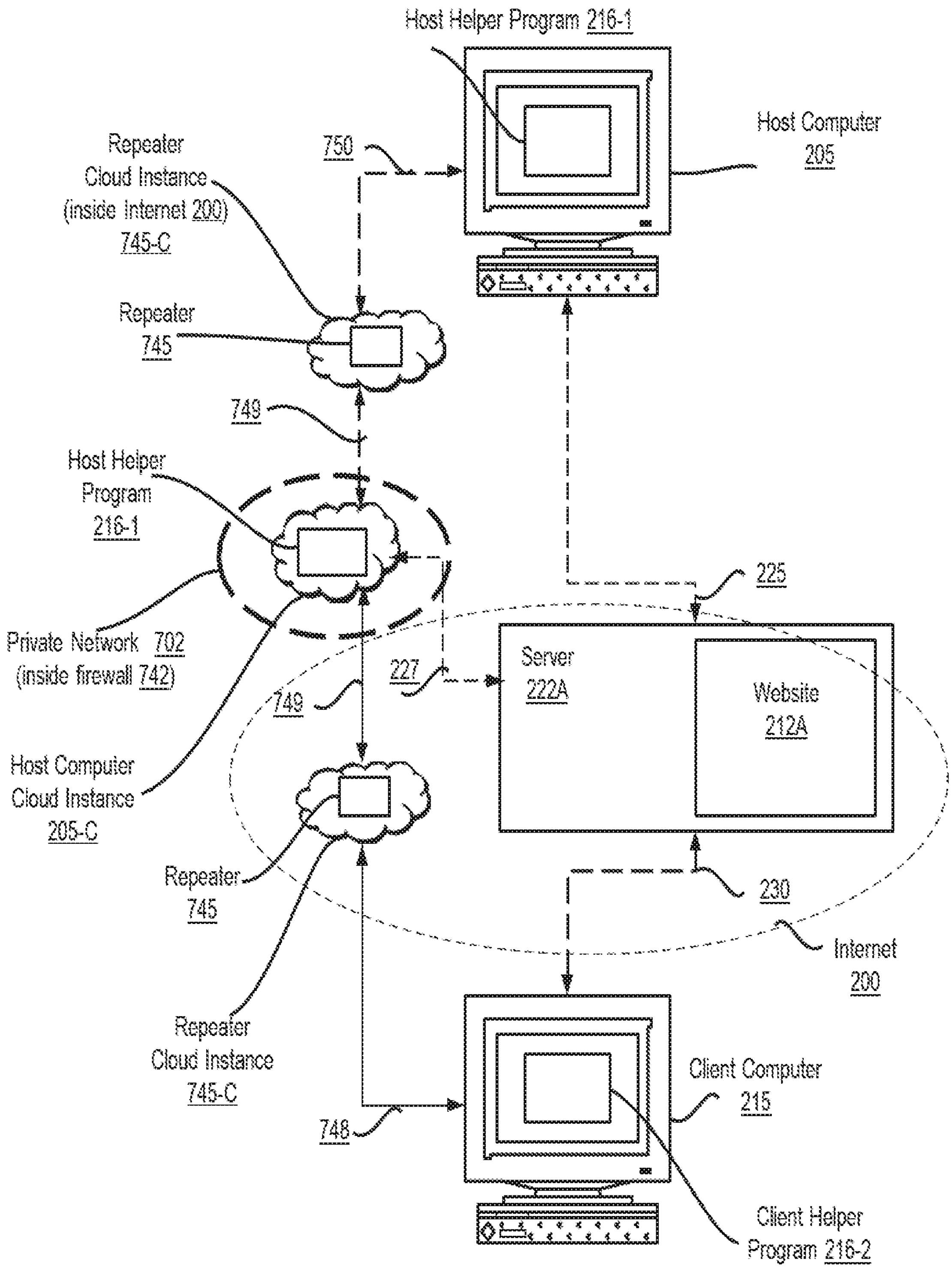
FIGS. 34A, 34B are block diagrams illustrating providing direct network connections using cloud instance for Internet application service over a computer network in accordance with another embodiment of the present invention.

FIG. 34A illustrates a direct network connection using cloud instance, in accordance with one embodiment of the present invention, suitable for providing a direct network connection when one of the networked cloud instances does not have a unique, publicly accessible IP address. The embodiment depicted in FIG. 34A includes a host computer 205, a client computer 215, a server 222A hosting a website 212A, a firewall 740, and a host computer cloud instance 205-C (in private network 702). The host computer cloud instance 205-C is connected to the Internet 200 through a private network 702. The private network 702 is protected by the firewall 742. Thus, the host computer cloud instance 205-C and the client computer 215 are both connected to the Internet 200, but are separated by the firewall 742.

In one embodiment, the direct network connection using cloud instance depicted in FIG. 34A functions largely as the direct network connection using cloud instance described above in reference to FIG. 30A, with a few modifications. Specifically, a repeater 745 (not shown) or a repeater cloud instance 745-C (shown) is added which has a unique, publicly accessible IP address. The repeater 745 (not shown) or a repeater cloud instance 745-C (shown) may be provided by a vendor (e.g. computing cloud vendor) providing Internet application services using the server 222A. The host computer cloud instance 205-C may be able to access the repeater 745 (not shown) or a repeater cloud instance 745-C (shown) and form a network connection 749 (in FIG. 34A). Thus, the repeater 745 (not shown) or the repeater cloud instance 745-C (shown) provides a unique, publicly accessible IP address (for the host computer cloud instance 205-C on private network 702) by which a client computer 215 outside of the private network 702 may join the Internet application service of the host computer 205 via direct network connections 748, 749, 750 using the host computer cloud instance 205-C (in private network 702), and the repeater 745 (not shown) or the repeater cloud instance 745-C (shown).

In one embodiment, when the host computer 205 accesses the website 212A to request starting a new Internet application service, the server 222A requests a computing cloud 198 (not shown) to launch-or-assign the host computer cloud instance 205-C, which computing cloud 198 chooses to do it in private network 702. The host computer cloud instance 205-C (in private network 702) is communicatively coupled to the host computer 205, using the repeater 745 (not shown) or the repeater cloud instance 745-C (shown). When a client computer 215 subsequently accesses the website 212A and selects to join the Internet application service of the host computer 205, the server 222A sends to the client computer 215 the public IP address of the repeater 745 (not shown) or of the repeater cloud instance 745-C (shown), and the private IP address of the host computer cloud instance 205-C (in private network 702) via a network connection 230. Once the client computer 215 has the public IP address of the repeater cloud instance 745-C and the private IP address of the host computer cloud instance 205-C, it may send data to the host computer cloud instance 205-C (in private network 702) via direct network connections 748, 749. Moreover, the client computer 215 sends to the host computer cloud instance 205-C the IP address of the client computer 215 itself through the direct network connections 748, 749. In other words, while the IP address of host computer cloud instance 205-C is sent to the client computer 215 through the server 222A via the indirect connections 225, 230, the IP address of the client computer 215 is sent to the host computer cloud instance 205-C via the direct connections 748, 749. Thus, the client computer 215 and the host computer cloud instance 205-C are able to obtain one another's IP addresses and create direct network connections 748, 749. From this point onwards, the server 222A is not involved in communicating data between host computer cloud instance 205-C (in private network 702) and client computer 215, and subsequent data exchange between the host computer cloud instance 205-C and the client computer 215 takes place via the direct network connection 748, 749, and the host computer 205 is not needed for the data exchange. For the purpose of clarity, further details of a process for establishing a direct network connection using host computer cloud instance 205-C on a private network 702 are provided below with reference to FIGS. 35A, 36, and 37A.

In some embodiments, the direct network connection using cloud instance architectures depicted by FIG. 7, FIG. 2C, FIG. 2D, FIG. 2E, FIG. 25A. FIG. 25C, FIG. 30A, and FIG. 34A are adapted using the above-described techniques to provide Internet application services for multiple host computers cloud instances 205-C on private networks. In such embodiments, the repeater 745 or repeater cloud instance 745-C may need to distinguish between multiple host computer cloud instances 205-C to ensure that data is transmitted only to one or more proper destinations.

The server 222A may send to the client computer 215 a unique meeting ID, the public IP address of the repeater 745 (not shown) or of the repeater cloud instance 745-C (shown), and the private IP address of the host computer cloud instance 205-C (in private network 702). The client computer 215 may then send to the repeater 745 (not shown) or of the repeater cloud instance 745-C (shown) the unique meeting ID along with the IP address of the client computer 215. In one embodiment, the server 222A also sends the unique meeting ID to the host computer 205, which in turn sends it to the host computer cloud instance 205-C, and the repeater 745 (not shown) or of the repeater cloud instance 745-C (shown). The repeater 745 (not shown) or of the repeater cloud instance 745-C (shown) may store both the unique meeting ID and the associated IP address of the host computer cloud instance 205-C in a look-up table. Thus, when a client computer 215 sends data to a host computer cloud instance 205-C (in private network 702) via the direct network connections 748, 749 using the repeater 745 (not shown) or of the repeater cloud instance 745-C (shown), as illustrated in FIG. 34A, it may designate the data as corresponding to the particular meeting ID, allowing the repeater 745 (not shown) or of the repeater cloud instance 745-C (shown), using the look-up table, to transmit the data to the appropriate host computer cloud instance 205-C (in private network 702 in FIG. 34A).

FIG. 34A is adapted from FIG. 30A and illustrates a direct network connection using host computer cloud instance 205-C (in a private network 702) for Internet application service between a client computer 215 and a host computer 205, in accordance with one embodiment of the present invention.

Figure 35A:
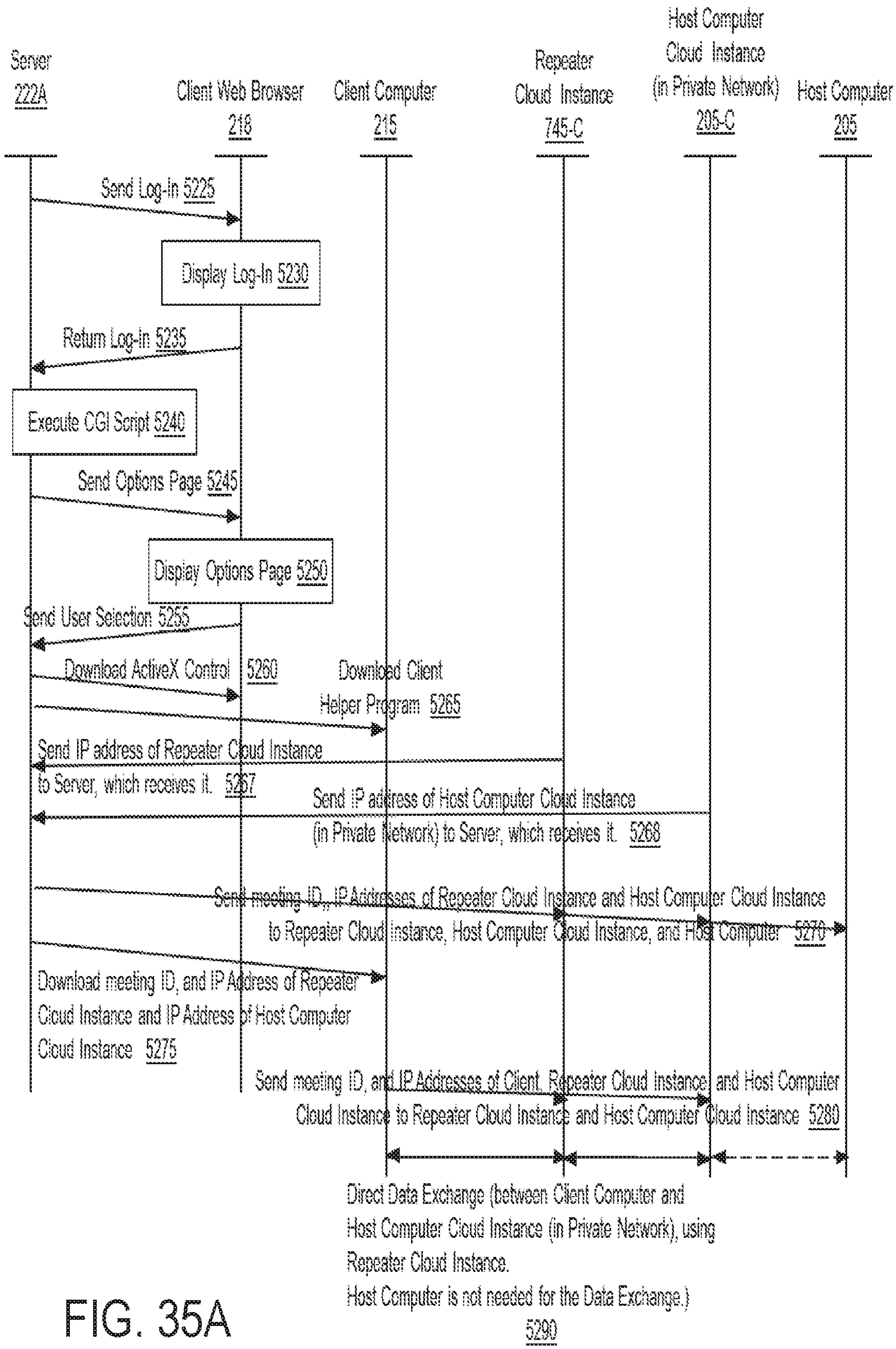
FIGS. 35A, 35B, 35C, 36, 37A, 37B, 37C are flowcharts illustrating providing direct network connections using cloud instance for Internet application service over a computer network in accordance with another embodiment of the present invention.

Referring now to FIG. 35A, a process is illustrated for providing a direct network connection using cloud instance (on a private network 702) for Internet application service between a client computer 215 and a host computer 205 in accordance with one embodiment of the present invention. The process illustrated in FIG. 35A is adapted from FIG. 31A. Specifically, the event diagram of FIG. 35A corresponds to a direct network connection using cloud instance (on a private network 702) for Internet application service with a host computer 205. When a host computer cloud instance 205-C is on a private network 702, a unique meeting ID is assigned and sent 5270 by the server 222A to the repeater cloud instance 745-C, the host computer cloud instance 205-C, and the host computer 205. The unique meeting ID is also downloaded 5275 from the server 222A by the client computer 215 along with the public IP address of the repeater cloud instance 745-C and the private IP address of the host computer cloud instance 205-C. Then, the IP address of the client computer 215 and the meeting ID are sent 5280 by the client computer 215 to the repeater cloud instance 745-C and the host computer cloud instance 205-C, which is communicatively coupled to the host computer 205. From this point onwards, data may be exchanged 5290 between the client computer 215 and the host computer cloud instance 205-C (using the repeater cloud instance 745-C) via the direct network connections 748, 749 (in FIG. 34A), and the host computer 205 is not needed for the data exchange 5290. As explained above, when client computer 215 sends data to the host computer cloud instance 205-C, it may designate the data as corresponding to the particular meeting ID, allowing the repeater cloud instance 745-C, using the look-up table described above, to transmit the data to the appropriate host computer cloud instance 205-C.

Figure 34B:
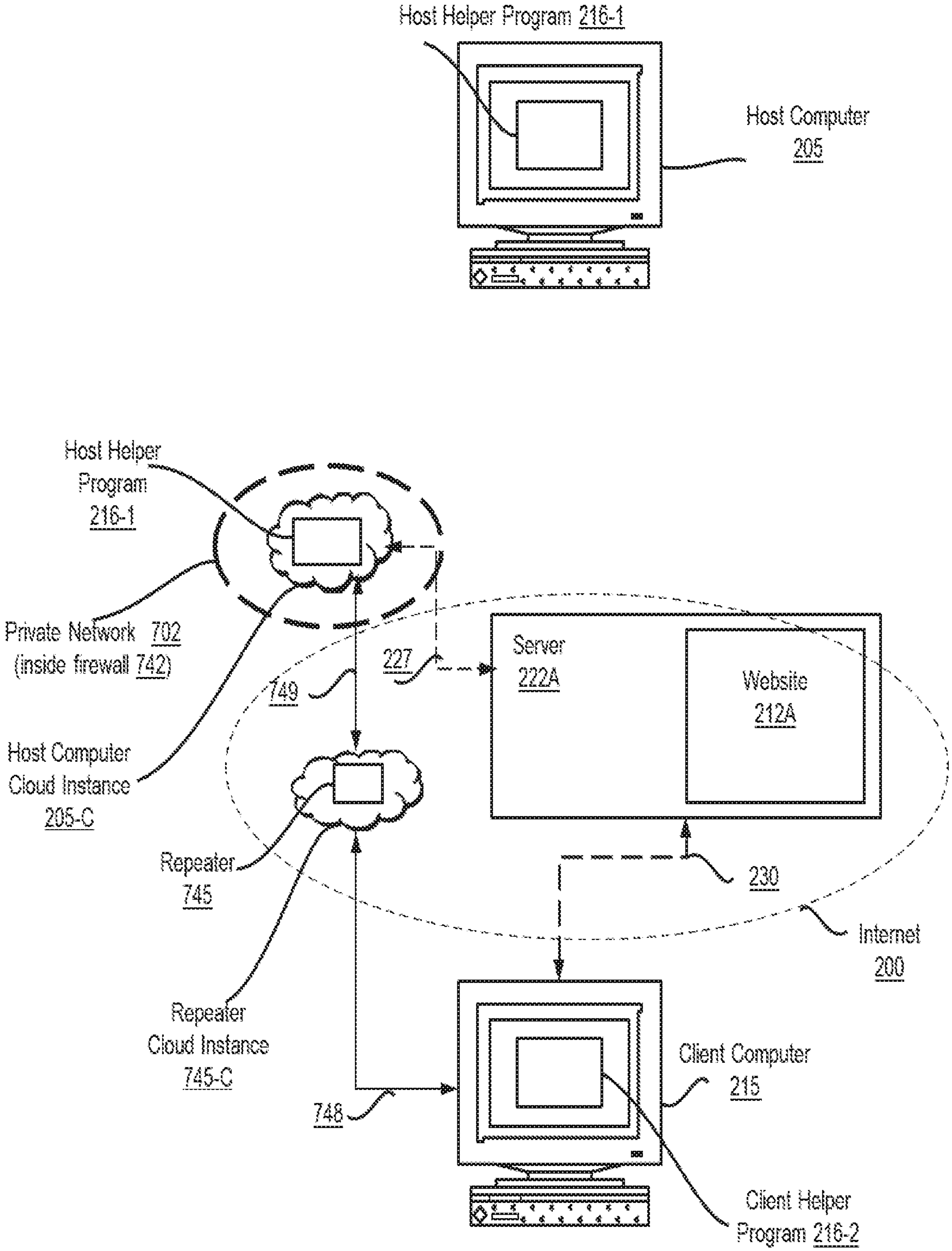

Please note: data exchange 5290 (in FIG. 35A) and FIG. 34B illustrate that after the Internet application service is started 5319 (in FIG. 36), and after the server 222A receives 5320 (in FIG. 36) the IP address of the host computer cloud instance 205-C, the host computer 205 is not needed to be communicatively linked 750 with the repeater cloud instance 745-C (or linked 749 with the host computer cloud instance 205-C) or linked 225 with the server 222A respectively (for the client computer 215 to use the Internet application service of the host computer cloud instance 205-C). Please further note: communication links 225, 750 appear in FIG. 34A, and do not appear in FIG. 34B.

Thus, in accordance with an embodiment of the present invention, FIGS. 34A, 34B, 35A, 36, and 37A above illustrate creating direct network connections for Internet application service between the client computer 215 and the host computer cloud instance 205-C (in private network 702) via the Internet (including how to start the host computer cloud instance 205-C).

It is noted that the IP address of the client computer 215 may be sent to the host computer 205 and/or the host computer cloud instance 205-C using indirect connection 225, 230, or indirect connection 227, 230 (instead of using direct network connection 748, 749, 750 in FIG. 34A) in further embodiments of the current invention.

Figure 35B:
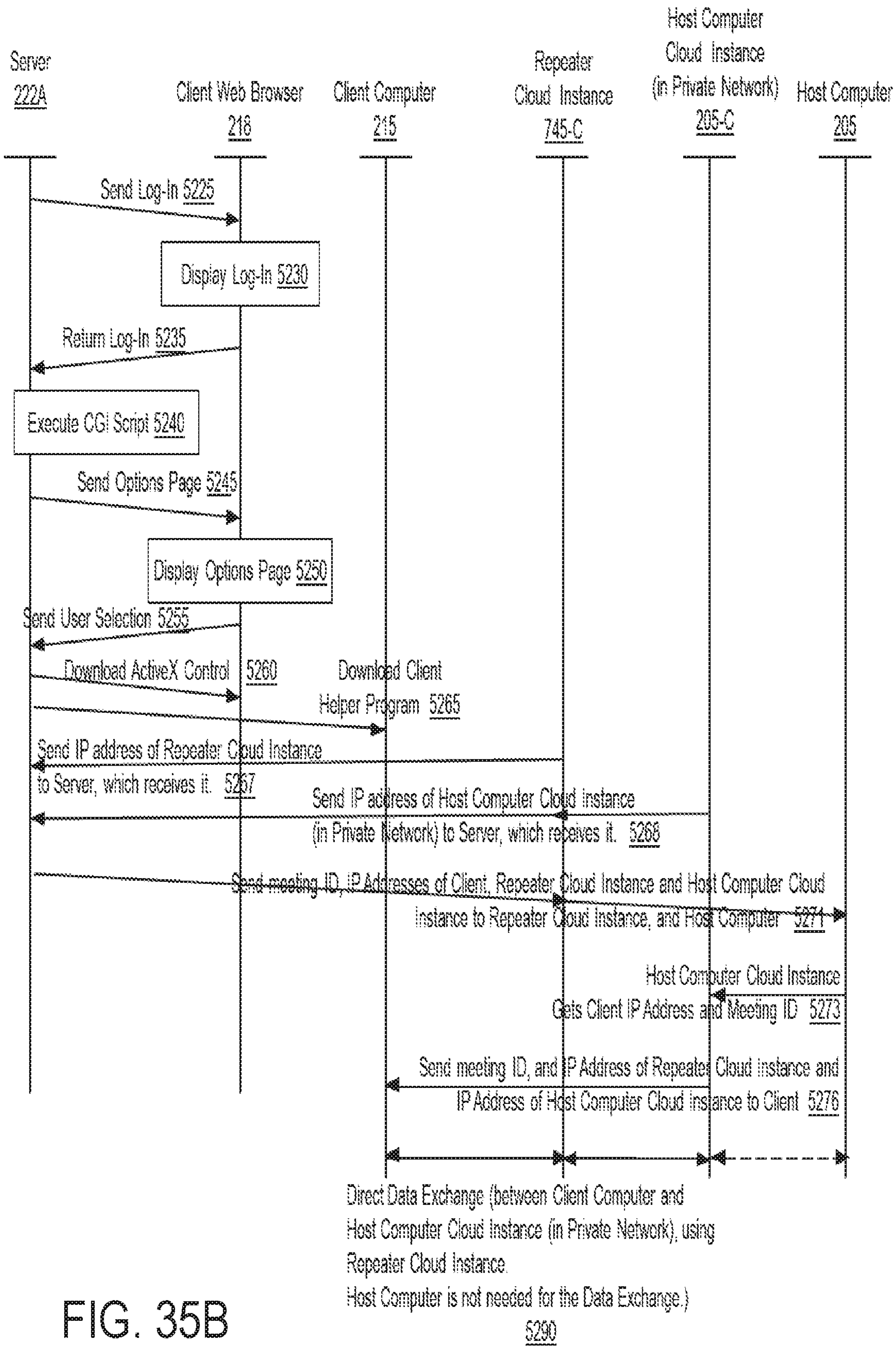

In an embodiment of the current invention illustrated in FIG. 35B, which FIG. 35B is similar to FIG. 35A, but in FIG. 35B the server 222A sends 5271 (using indirect connection 225, 230 in FIG. 34A) the IP address of the client computer 215 and meeting ID to the host computer 205, which is communicatively coupled to the host computer cloud instance 205-C. The host computer cloud instance 205-C therefore also gets 5273 the IP address of the client computer 215 and meeting ID. The host computer cloud instance 205-C then (using repeater cloud instance 745-C) sends 5276 its IP address and the meeting ID to client computer 215. Direct data exchange 5290 (using repeater cloud instance 745-C) can then occur, using direct network connection 748, 749 in FIG. 34B, between client computer 215 and host computer cloud instance 205-C, and without going through the server 222A. The host computer 205 (in FIG. 34B) is not needed for direct data exchange 5290 in FIG. 35B (which uses direct network connection 748, 749 in FIG. 34B).

Figure 35C:
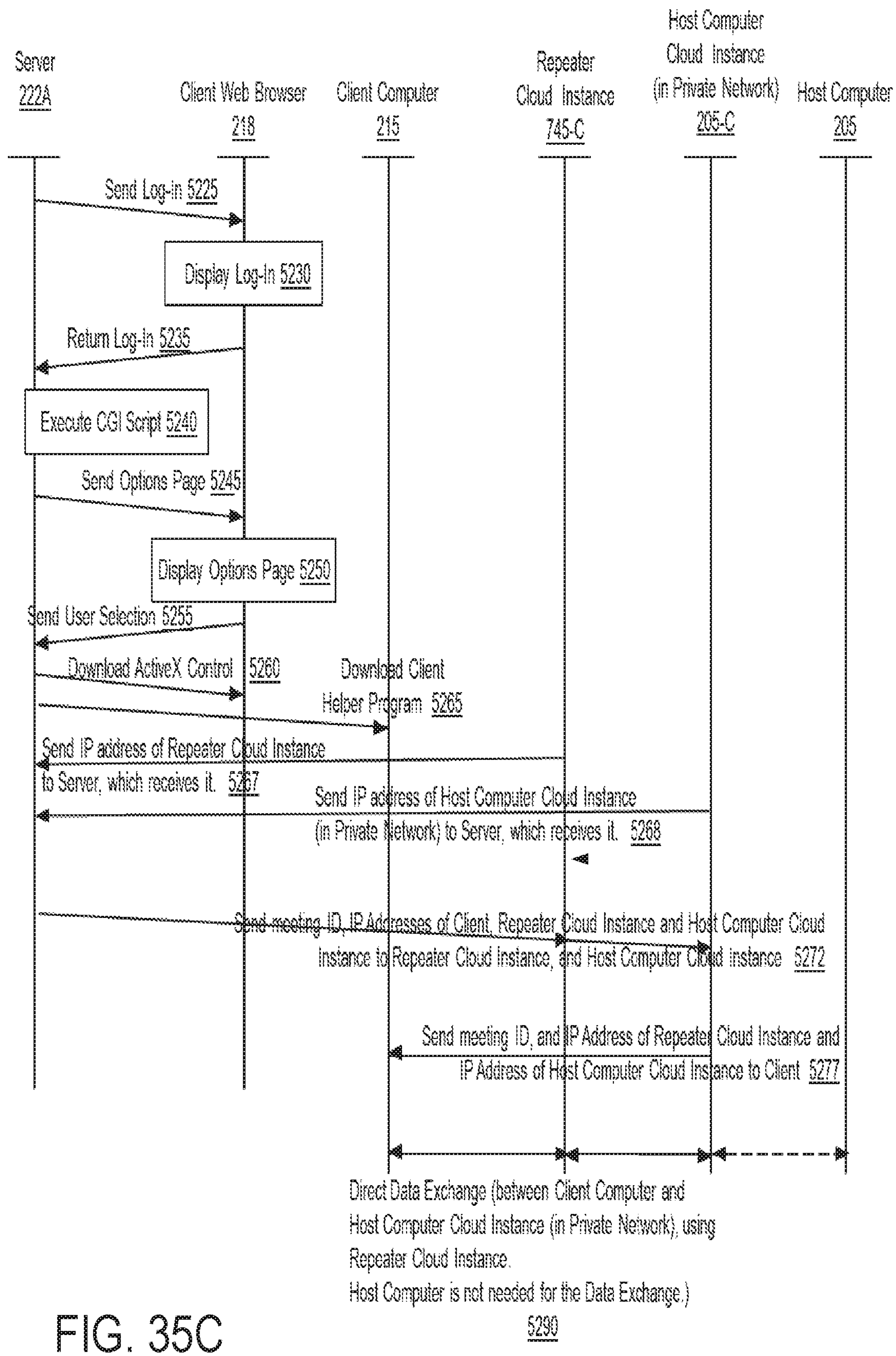

In another embodiment of the current invention illustrated in FIG. 35C, which FIG. 35C is similar to FIG. 35A, but in FIG. 35C the server 222A sends 5272 (using indirect connection 227, 230 in FIG. 34A) the IP address of the client computer 215 and meeting ID to the host computer cloud instance 205-C, which may be (but not required in FIGS. 34B and 35C to be) communicatively coupled to the host computer 205. The host computer cloud instance 205-C then sends 5277 its IP address and the meeting ID to client computer 215. Direct data exchange 5290 can then occur, using direct network connection 748, 749 in FIG. 34B, between client computer 215 and host computer cloud instance 205-C, and without going through the server 222A. The host computer 205 (in FIG. 34B) is not needed for direct data exchange 5290 in FIG. 35C (which uses direct network connection 748, 749 in FIG. 34B).

Figure 36:
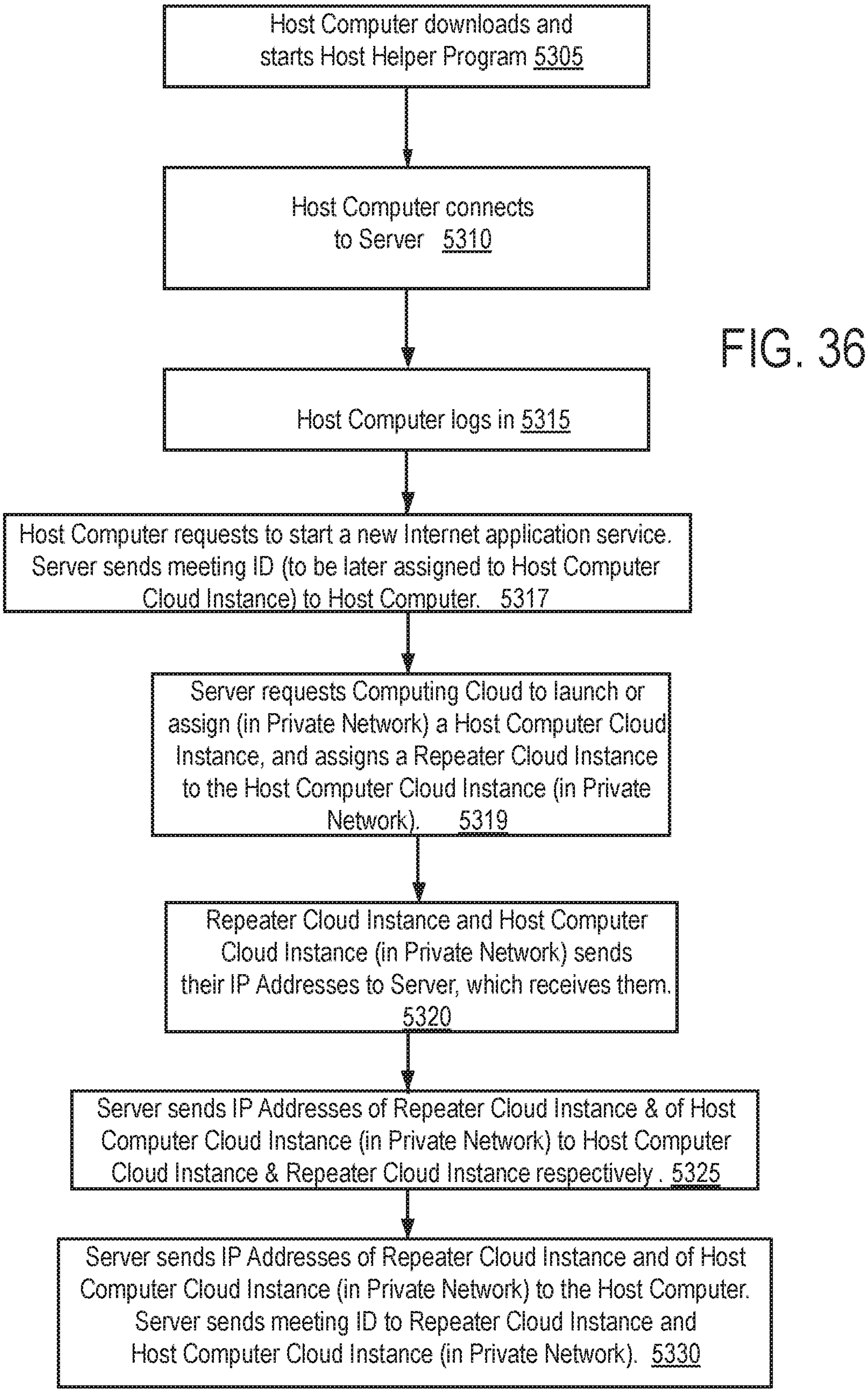

FIG. 36 is adapted from FIG. 32 and presents a flowchart of a process performed by a host computer 205 to provide direct network connections using cloud instance (in a private network 702 in FIG. 34A) for Internet application service between computers over a computer network in accordance with an embodiment of the present invention. First, the host computer 205 downloads and starts 5305 the host helper program 216-1. In one embodiment, the host helper program 216-1 is the Moodle learning management system (running on Linux-Apache-MySQL-PHP solution stack) Internet application (from the Australian company Moodle Pty Ltd.). The host computer 205 then connects 5310 to the server 222A. The host computer 205 logs in 5315 to a website 212A hosted by the server 222A. This allows a website 212A hosted by the server 222A to accurately reflect the status of the host computer 205 on an options page 4305 (in FIG. 26A). The host computer 205 requests 5317 to start a new Internet application service, and the server 222A sends 5317 a unique meeting ID (to be later assigned 5317 to host computer cloud instance 205-C) to the host computer 205. The server 222A requests 5319 a computing cloud (not shown) to launch-or-assign a host computer cloud instance 205-C (in a private network 702 in FIG. 34A), and assigns a repeater cloud instance 745-C (in FIG. 34A) to the host computer cloud instance 205-C (in private network 702 in FIG. 34A). The repeater cloud instance 745-C provides a public IP address for the host computer cloud instance 205-C (in private network 702) so that the latter can be accessed from the Internet 200. The repeater cloud instance 745-C and the host computer cloud instance 205-C (in private network 702) send 5320 their IP addresses to the server 222A, which receives 5320 them. The server 222A then sends 5325 IP addresses of repeater cloud instance 745-C and of host computer cloud instance 205-C (in private network 702) to host computer cloud instance 205-C and repeater cloud instance 745-C respectively. The server 222A sends 5330 the public IP address of the repeater cloud instance 745-C and private IP address of the host computer cloud instance 205-C (in private network 702) to the host computer 205. The server 222A also sends 5330 the meeting ID to the repeater cloud instance 745-C and the host computer cloud instance 205-C.

Figure 37A:
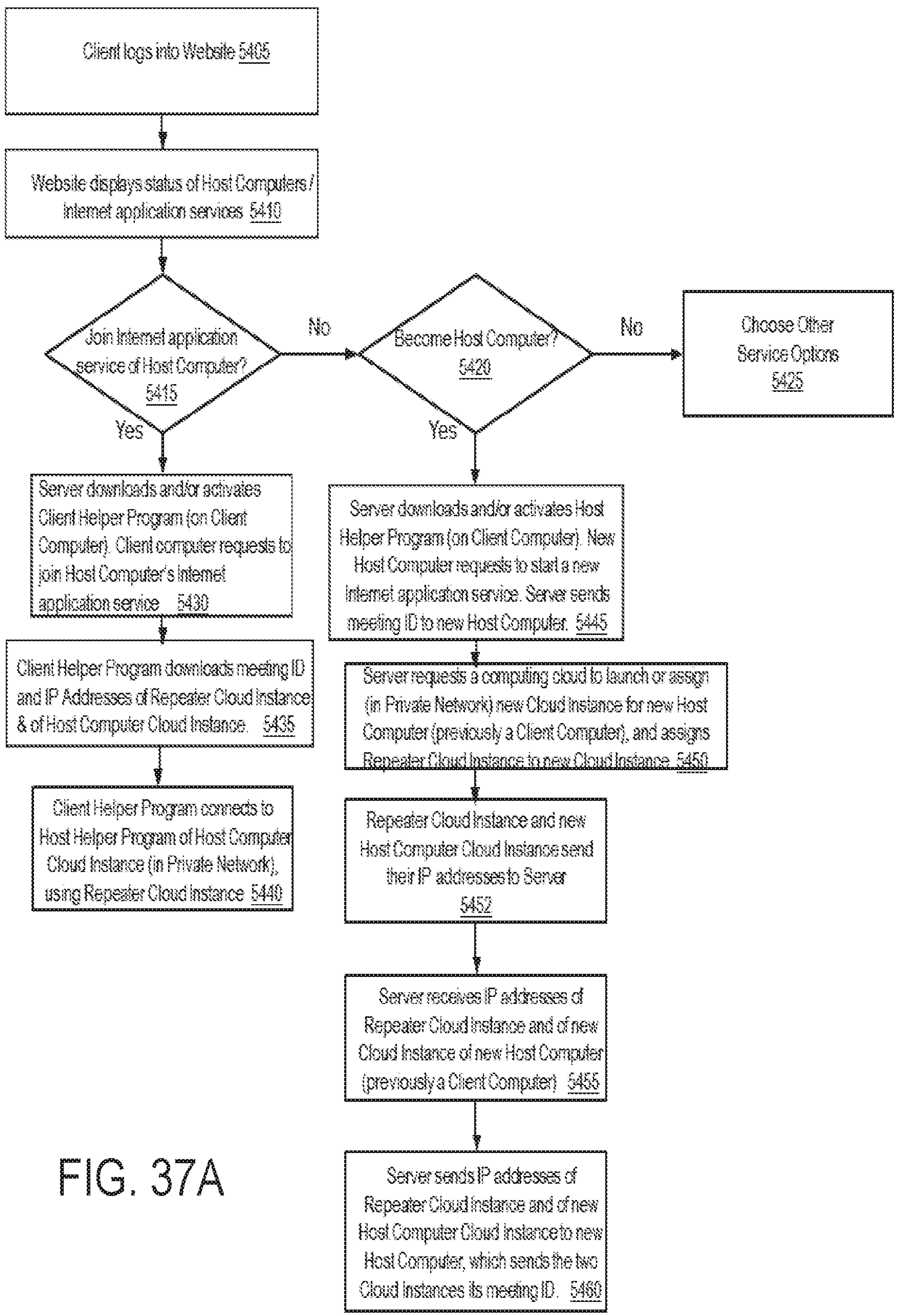

FIG. 37A is adapted from FIG. 33A and presents a flowchart of a process performed by a client computer 215 to provide a direct network connection using host computer cloud instance (in a private network 702 in FIG. 34A) for Internet application service with a host computer 205 in accordance with an embodiment of the present invention. Since the host computer cloud instance 205-C is in a private network 702 communicating with the public Internet network 200 through the repeater cloud instance 745-C, when the client helper program 216-2 downloads 5435 the public IP address of repeater cloud instance 745-C and private IP address of the host computer cloud instance 205-C (in private network 702 in FIG. 34A), a unique meeting ID is also downloaded. As explained above, when client computer 215 sends data to a host computer cloud instance 205-C, it may designate the data as corresponding to the unique meeting ID, allowing the repeater cloud instance 745-C, using a look-up table, to differentiate the data as for the appropriate Internet application service (running inside the host computer cloud instance 205-C) of the host computer 205.

It is noted that the IP address of the client computer 215 may be sent to the host computer 205 and/or the host computer cloud instance 205-C using indirect connection 225, 230, or indirect connection 227, 230 (instead of using direct network connection 748, 749, 750 in FIG. 34A) in further embodiments of the current invention.

Figure 37B:
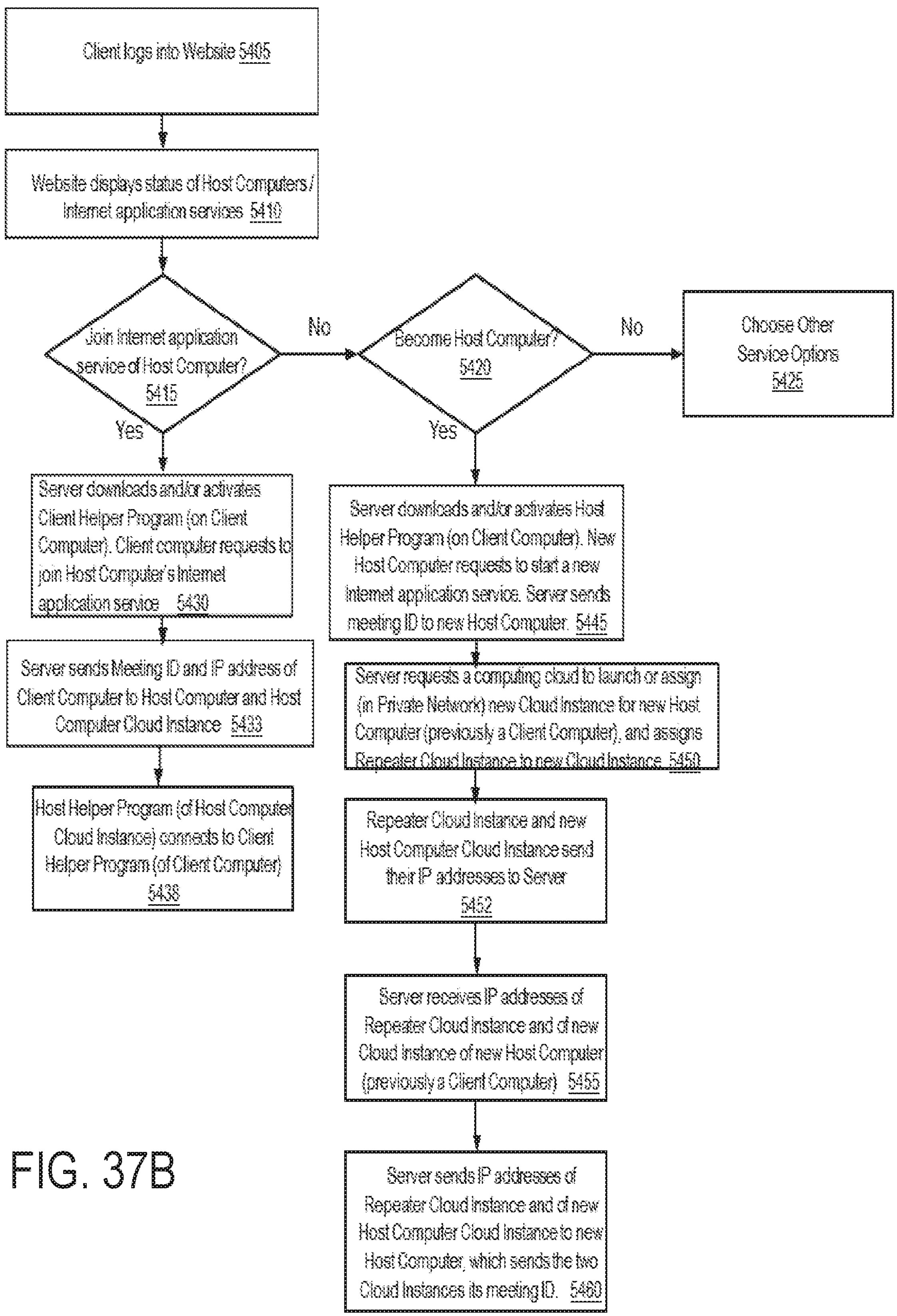

In an embodiment of the current invention illustrated in FIG. 37B, which FIG. 37B is similar to FIG. 37A, but in FIG. 37B the server 222A sends 5433 (using indirect connection 225, 230 in FIG. 34A) the IP address of the client computer 215 and the meeting ID to the host computer 205 and the host computer cloud instance 205-C, which are communicatively coupled to each other. The host helper program 216-1 (of the host computer cloud instance 205-C) then (using repeater cloud instance 745-C) connects 5438 to the client helper program 216-2 (of the client computer 215). Direct data exchange (5290 in FIG. 35B ) can then occur, using (repeater cloud instance 745-C and) direct network connection 748, 749 in FIG. 34B, between the client computer 215 and the host computer cloud instance 205-C, and without going through the server 222A. The host computer 205 (in FIG. 34B) is not needed for direct data exchange 5290 in FIG. 35B (which uses direct network connection 748, 749 in FIG. 34B).

Figure 37C:
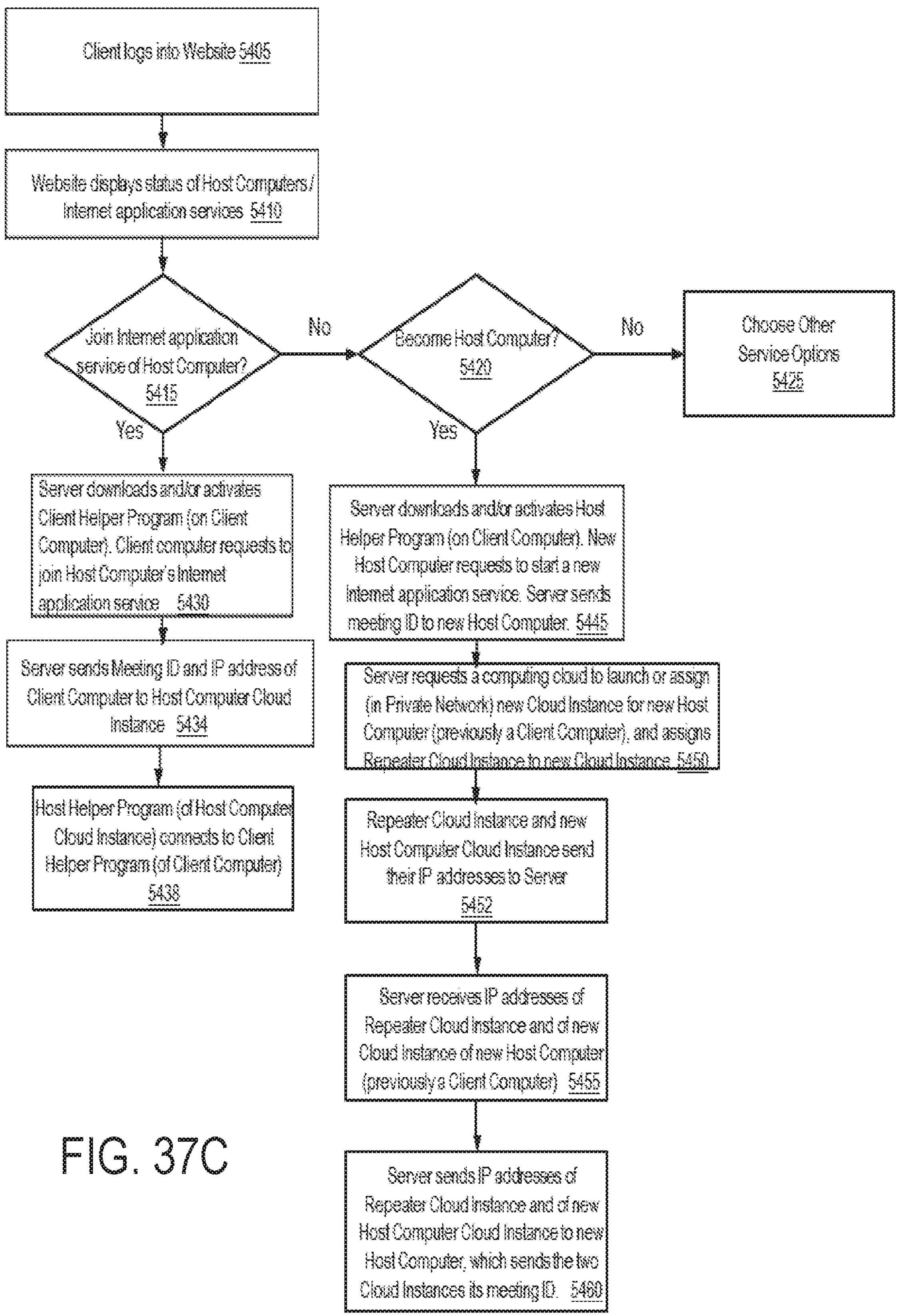

In another embodiment of the current invention illustrated in FIG. 37C, which FIG. 37C is similar to FIG. 37A, but in FIG. 37C the server 222A sends 5434 (using indirect connection 227, 230 in FIG. 34A) the IP address of the client computer 215 and the meeting ID to the host computer cloud instance 205-C, which may be (but not required in FIGS. 34B and 37C to be) communicatively coupled to the host computer 205. The host helper program 216-1 (of the host computer cloud instance 205-C) then (using repeater cloud instance 745-C) connects 5438 to the client helper program 216-2 (of the client computer 215). Direct data exchange (5290 in FIG. 35C) can then occur, using (repeater cloud instance 745-C and) direct network connection 748, 749 in FIG. 34B, between client computer 215 and host computer cloud instance 205-C, and without going through the server 222A. The host computer 205 (in FIG. 34B) is not needed for direct data exchange 5290 in FIG. 35C.

Figure 38A:
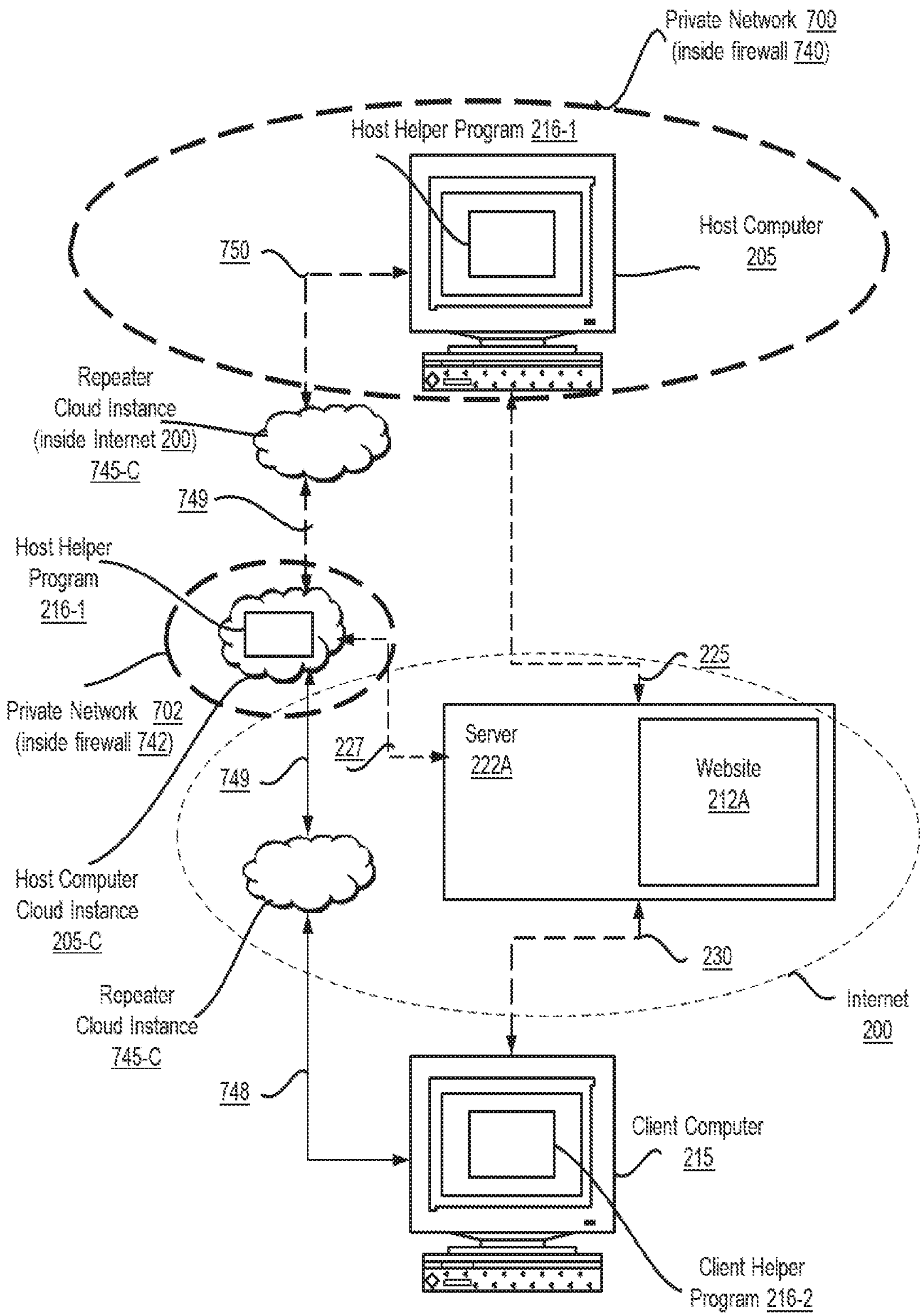
FIG. 38A, 38B are block diagrams illustrating providing direct network connections using cloud instance for Internet application service over a computer network in accordance with another embodiment of the present invention.

FIG. 38A is adapted from FIG. 34A and illustrates a direct network connection using host computer cloud instance 205-C (in a private network 702) for Internet application service between a client computer 215 and a host computer 205 in a private network 700, in accordance with one embodiment of the present invention, suitable for providing a direct network connection when one of the networked computers does not have a unique, publicly accessible IP address. The only change in FIG. 38A from FIG. 34A is that the host computer 205 is in a private network 700 in FIG. 38A.

For the purpose of clarity, further details of a process for establishing a direct network connection using host computer cloud instance 205-C on a private network 702 for Internet application service between a client computer 215 and a host computer 205 in a private network 700, in accordance with one embodiment of the present invention, are provided above with reference to FIGS. 35A, 36, and 37A. In other words, FIGS. 35A, 36, and 37A can also be used with FIG. 38A, as FIGS. 35A, 36, and 37A use meeting ID and use repeater cloud instance 745-C which provides a bridge for host computer 205 between the private network 700 and the Internet 200, as explained above for the host computer cloud instance 205-C (in private network 702).

FIG. 40A is a flowchart illustrating how steps 5710 to 5780 (in FIG. 40A) can be added to FIGS. 40B. 40C, 40D, 40E, 40F, and 40G respectively, to have the server 222A to request a computing cloud (not shown) to launch-or-assign the host computer cloud instance 205-C:

(a). Step 5710 (FIG. 40A): In previous step "A" in FIGS. 40B, 40C, 40D, 40E, 40F, and 40G respectively, host computer 205 (FIG. 24A) requested to start a new Internet application service:

(b). Step 5720 (FIG. 40A): User (not shown) of host computer 205 (FIG. 24A) previously created a computing cloud account (subscribing a number-of single-(virtualized)-hardware (defined in FIGS. 39A and 39B). User may use (Tables-1-to-3 in) FIG. 39A, and/or Tables-1-and-2 in FIG. 39B or similar data from computing cloud vendor).

The host computer 205 (or server 222A or a computing cloud 198 (in FIG. 26D)) may specify the maximum number of concurrent-users in step 5720, and using Table 1 of FIG. 39A, specifies the number of single hardware (implemented in software) for the server 222A to request a computing cloud 198 (in FIG. 26D) to launch in the host computer cloud instance 205-C. The host computer 205 (or server 222A or a computing cloud 198 (in FIG. 26D)) may also specify in the same step 5720 when the maximum number of concurrent users is exceeded, the number of single hardware (implemented in software) to add to host computer cloud instance 205-C.

The default case is that the server 222A (or a computing cloud 198 (in FIG. 26D)) will use the linear formula in Table (1) of FIG. 39A to start with one single hardware (implemented in software) in the host computer cloud instance 205-C, and when the new user in step 5820 (in FIG. 41A) exceeds the maximum concurrent user number (for the then current number of single hardware), server 222A or a computing cloud 198 (in FIG. 26D) then: (i) add 10% of the then current number of single hardware (rounded up-to next integer) to the host computer cloud instance 205-C, if the host computer 205 does not specify anything in step 5720 (in FIG. 40A), or (ii) as illustrated in FIG. 39C: "(Moodle)-("Not-Decrease"-or)-Increase-(Virtualized)-(1X)-H/W-(in-Instance).

(c). Step 5740 (FIG. 40A): if (in step 5730) computing cloud 198 (in FIG. 26D) uses "Linear" Formula (in Table 1 of FIG. 39A), then: (i) Server 222A (FIG. 24A) requests computing cloud 198 to launch-or-assign host computer cloud instance 205-C (FIG. 24A) implementing (virtualizing) the requested (and subscribed in step S720 in FIG. 40A in FIG. 40A) ("Linear" Formula) number of single-(virtualized)-hardware on software: and (ii) (if needed) computing cloud 198 may "Not-Decrease"-(or-"Not-Increase") #-of-single-(virtualized)-hardware in host computer cloud instance 205-C (using FIG. 39A's Table 1, and FIGS. 39C-&-39D and 39E-&-39F respectively).

(d). Step 5760 (FIG. 40A): if (in step 5750) computing cloud 198 (in FIG. 26D) uses "Double" Formula (in Table 1 of FIG. 39A), then: (i) Server 222A (FIG. 24A) requests computing cloud 198 (in FIG. 26D) to launch-or-assign host computer cloud instance 205-C (FIG. 24A) implementing (virtualizing) the requested (and subscribed in step 5720) ("Double" Formula) number of single-(virtualized)-hardware on software: and (ii) (using software and database) computing cloud 198 (in FIG. 26D) may increase-(or-decrease) (not-shown) (using "Double" Formula) single-(virtualized)-hardware in host computer cloud instance 205-C.

(e). Step 5780 (FIG. 40A): Computing cloud 198 may also use other formula (not shown), other than Linear or Double Formula (to add single-(virtualized)-hardware to host computer cloud instance 205-C).

Table 1 of FIG. 39A also shows that for very large Internet application service (e.g. 10000 or more concurrent users) requiring 100 or more single hardware (more than 100X) in year 2015, the cloud vendor should be contacted to pre-arrange the hardware capacity, etc. When in doubt, it is wise to contact the cloud vendor or technical experts to ask questions (to make sure that the Internet-application clients' high-performance-expectations of successful Internet application service are met), as the then current cloud technologies, e.g. in year 2015, may not be advanced enough yet to provide Internet application service for the requested maximum number of concurrent users, e.g. 400,000 concurrent users in year 2015.

Figure 41A:
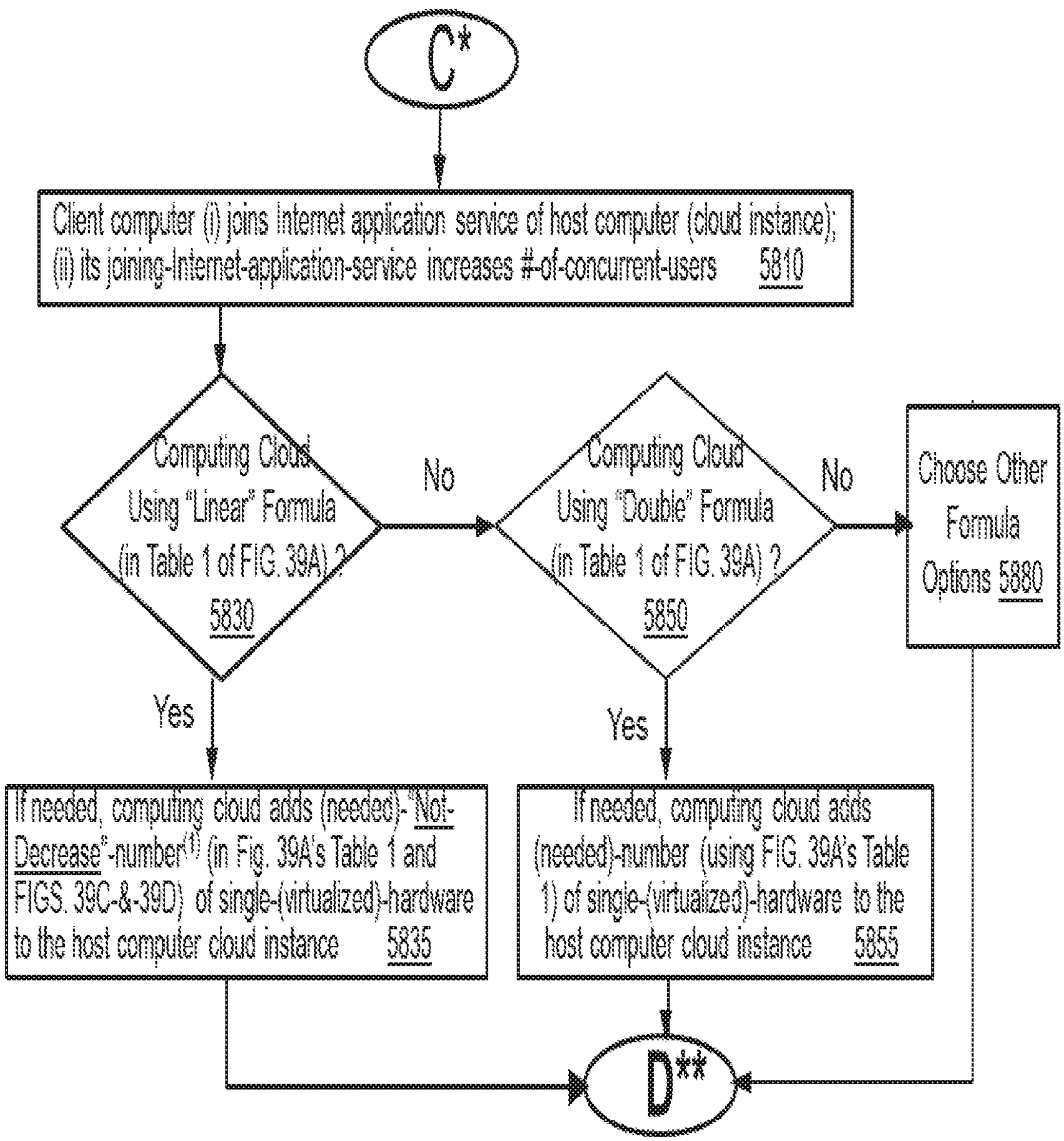
FIGS. 41A, 41B, 41C are flowcharts illustrating providing direct network connections using cloud instance for Internet application service over a computer network in accordance with another embodiment of the present invention.
Figure 41B:
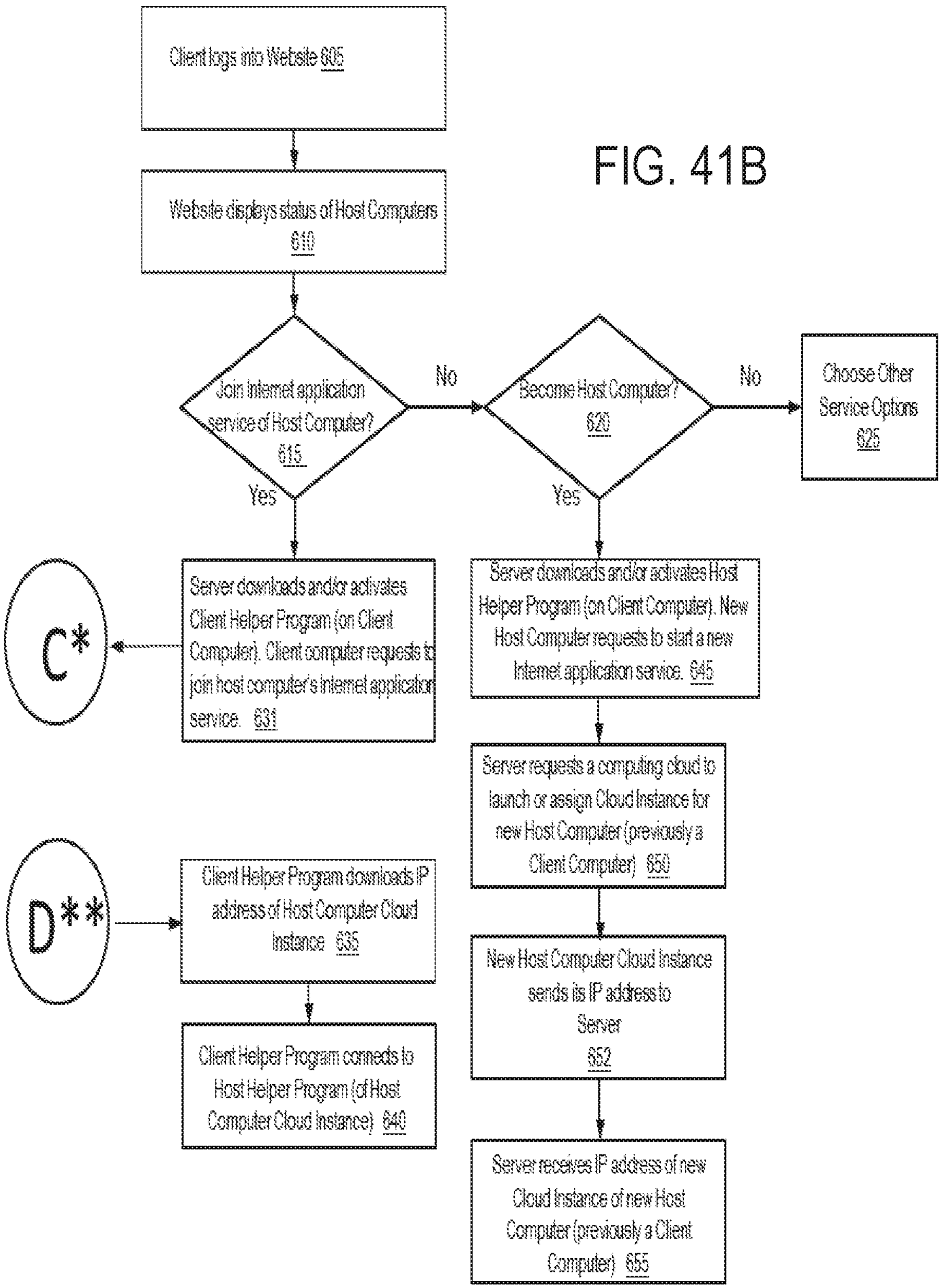
Figure 41C:
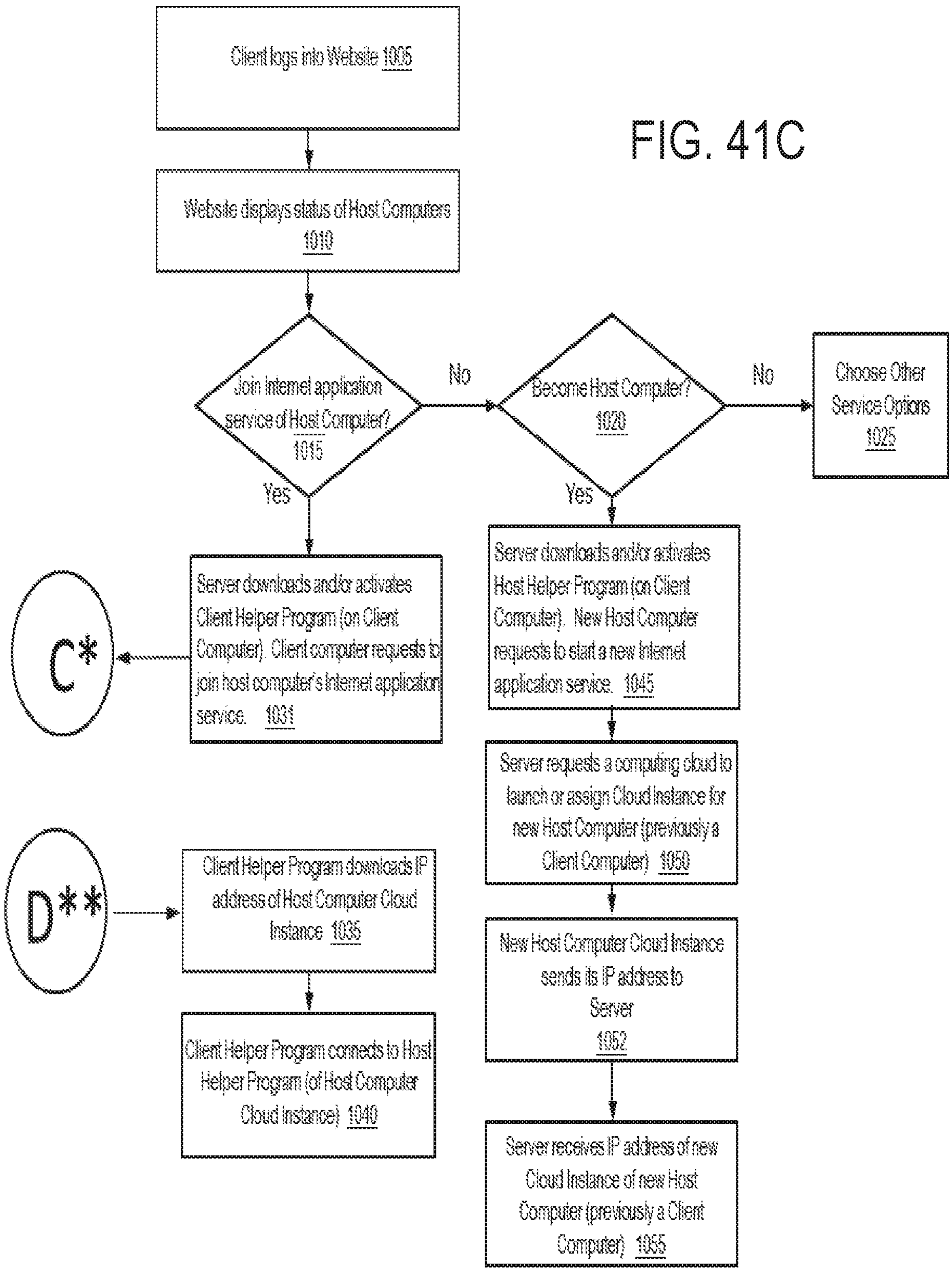
Figure 49A:
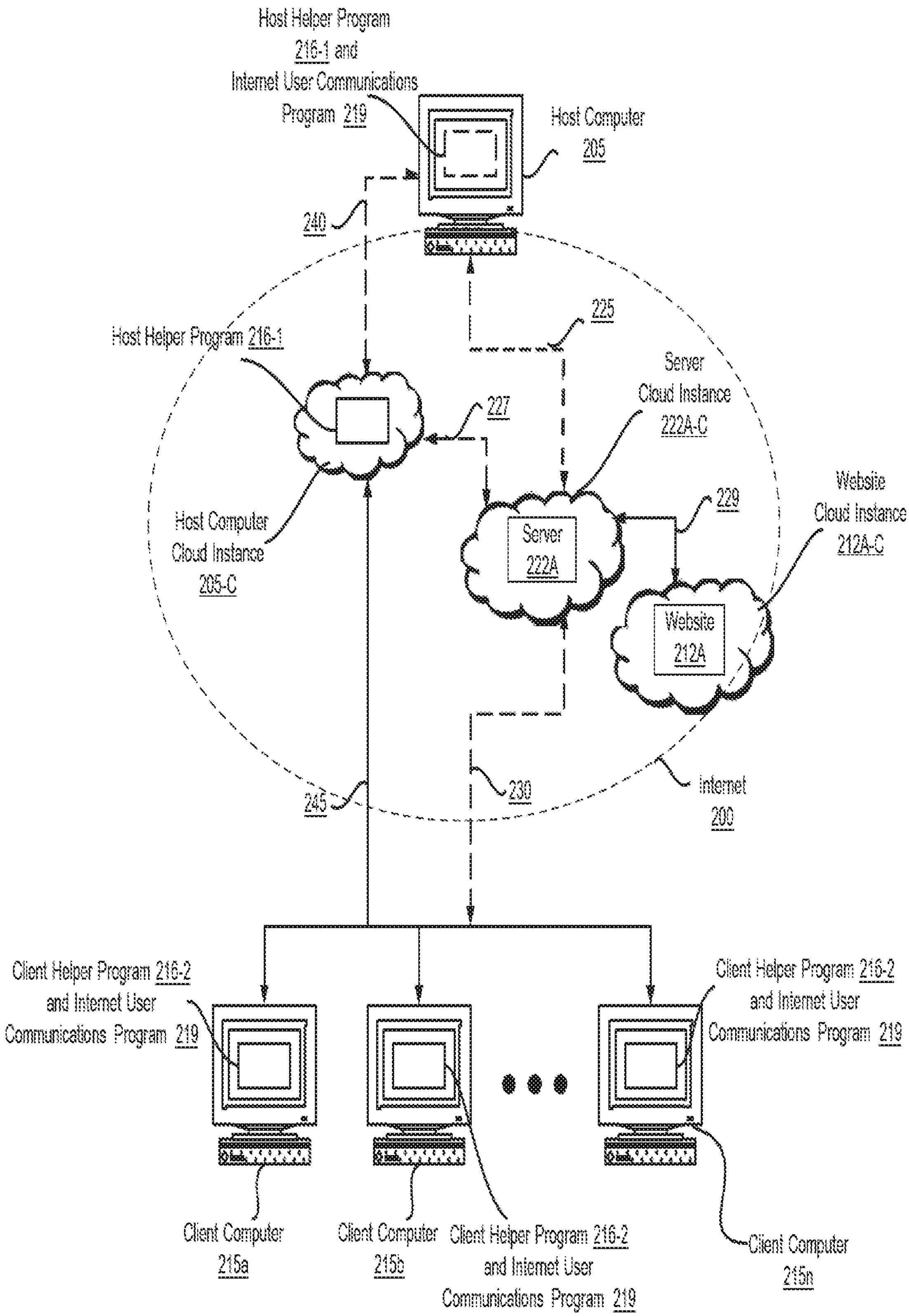
FIGS. 49A, 49B are block diagrams illustrating providing direct network connections using cloud instance for Internet application service over a computer network in accordance with another embodiment of the present invention.
Figure 49B:
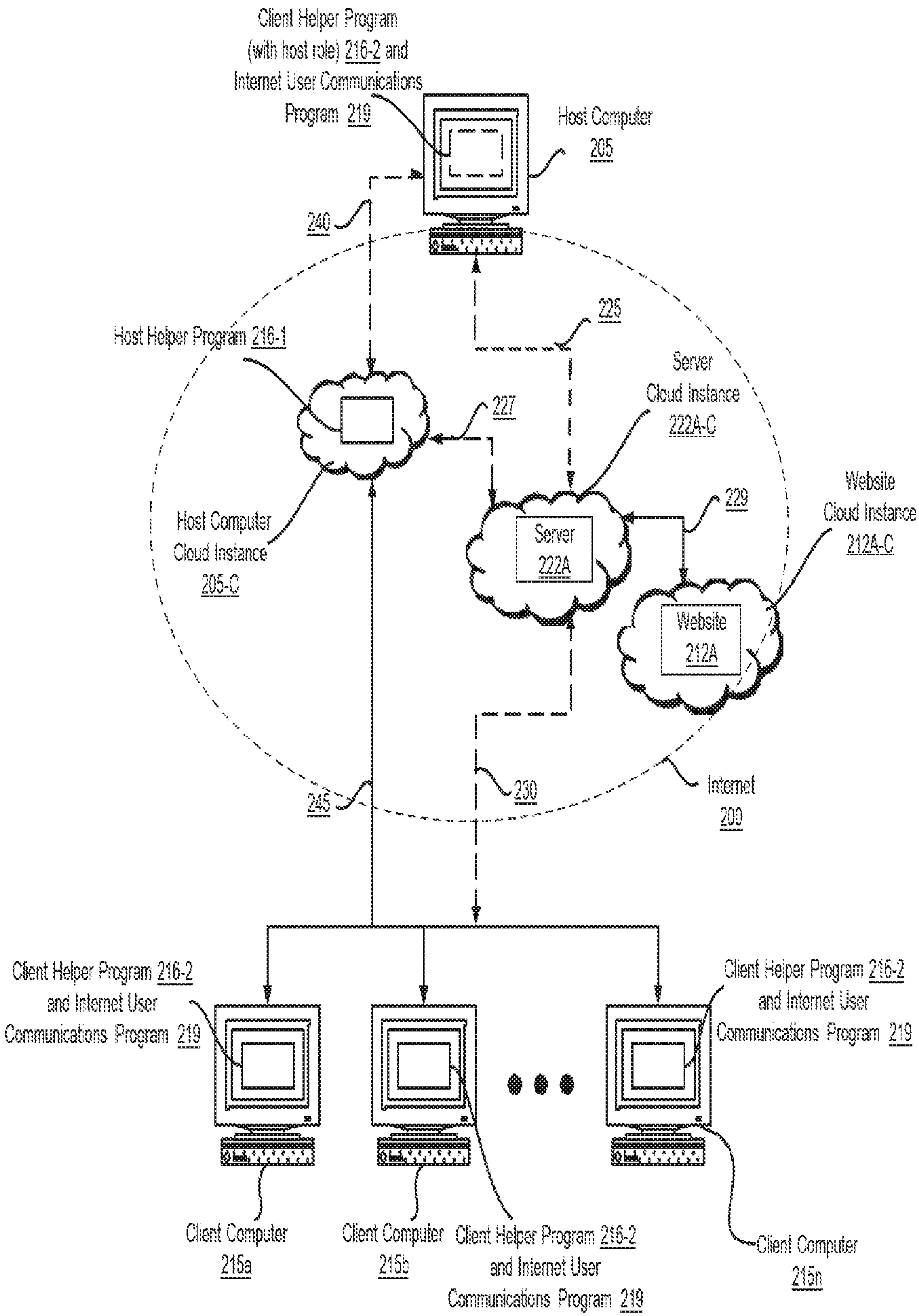

It should be noted that the server cloud instance 222A-C and website cloud instance 212A-C in FIGS. 49A and 49B below can also dynamically or pre-arrange to have almost any bandwidth and hardware capacity (to be implemented in software) to support large numbers of host computers 205 and client computers 215, using methods (not shown) analogous to that for host computer cloud instance 205-C detailed in FIGS. 39A, 40A, and 41A.

FIGS. 40B, 40C, 40D, 40E, 40F, and 40G are flowcharts illustrating how steps 5710 to 5780 (from FIG. 40A) can be added to FIGS. 40B, 40C, 40D, 40E, 40F, and 40G respectively, in accordance with an embodiment of the present invention.

It is noted that the IP address of the client computer 215 may be sent to the host computer 205 and/or the host computer cloud instance 205-C using indirect connection 225, 230, or indirect connection 227, 230 (instead of using direct network connection 748, 749, 750 in FIG. 38A) in further embodiments of the current invention illustrated in FIGS. 40F and 40G respectively and described below.

Figure 38B:
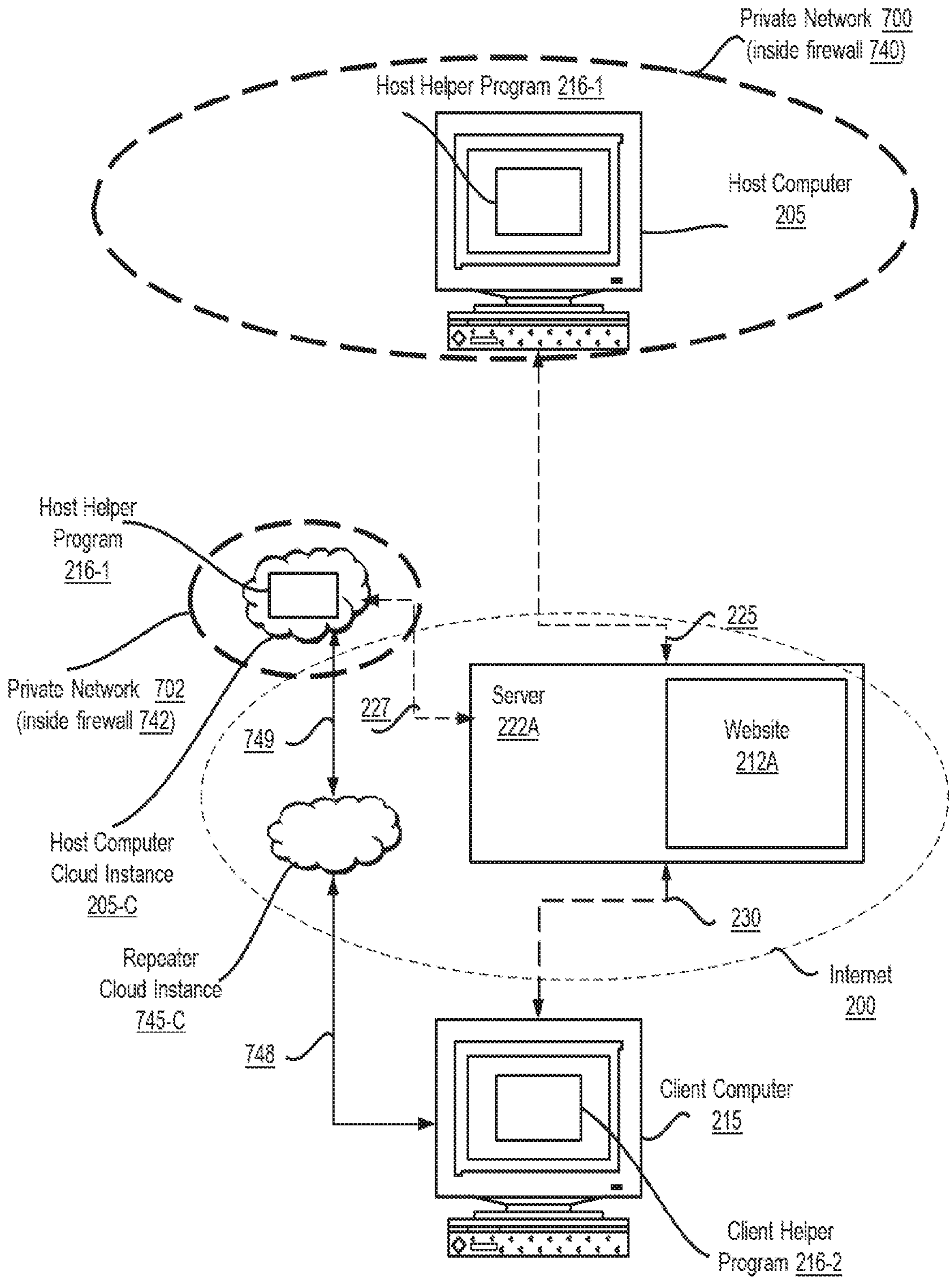
Figure 40E:
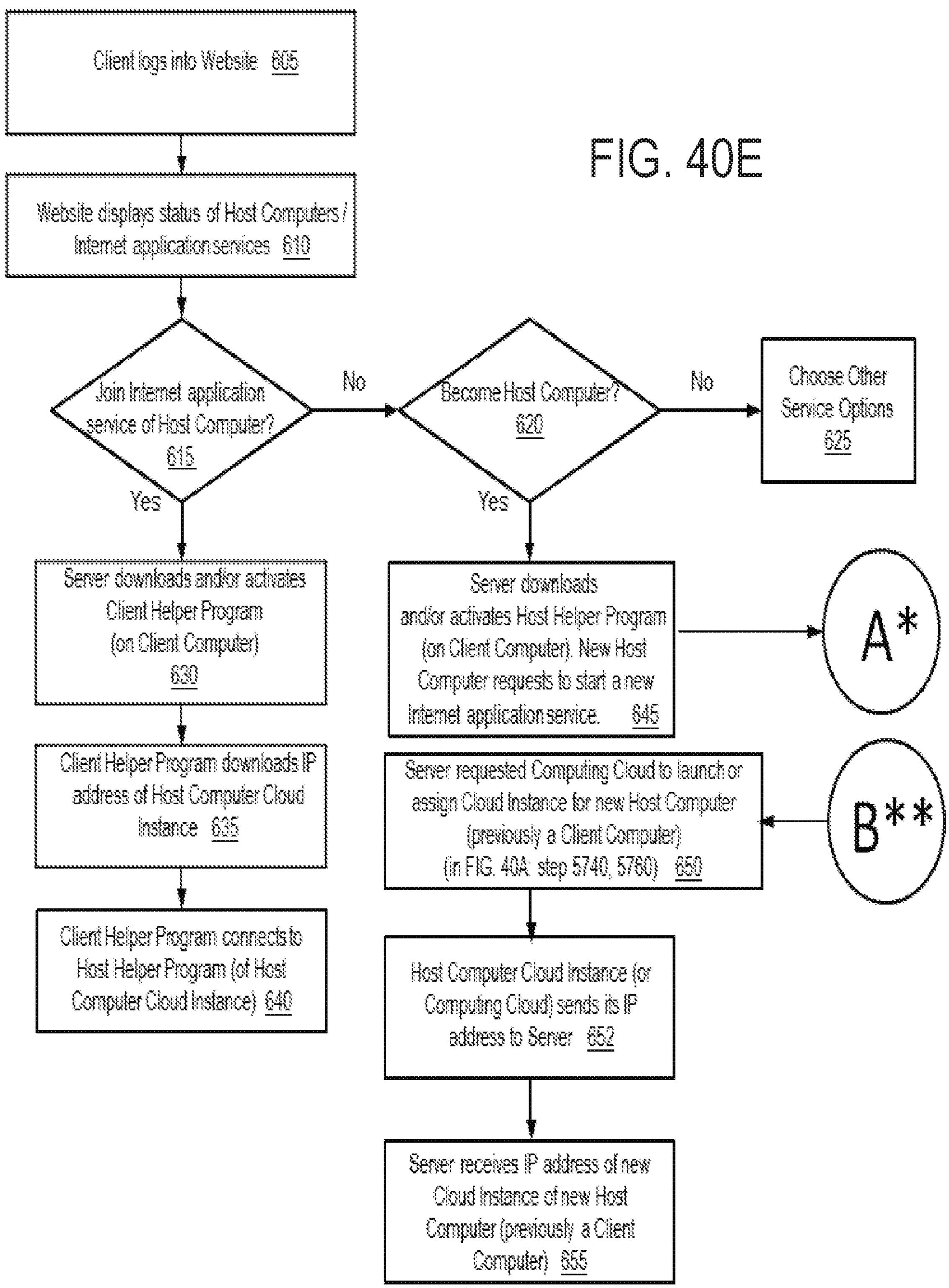
Figure 40F:
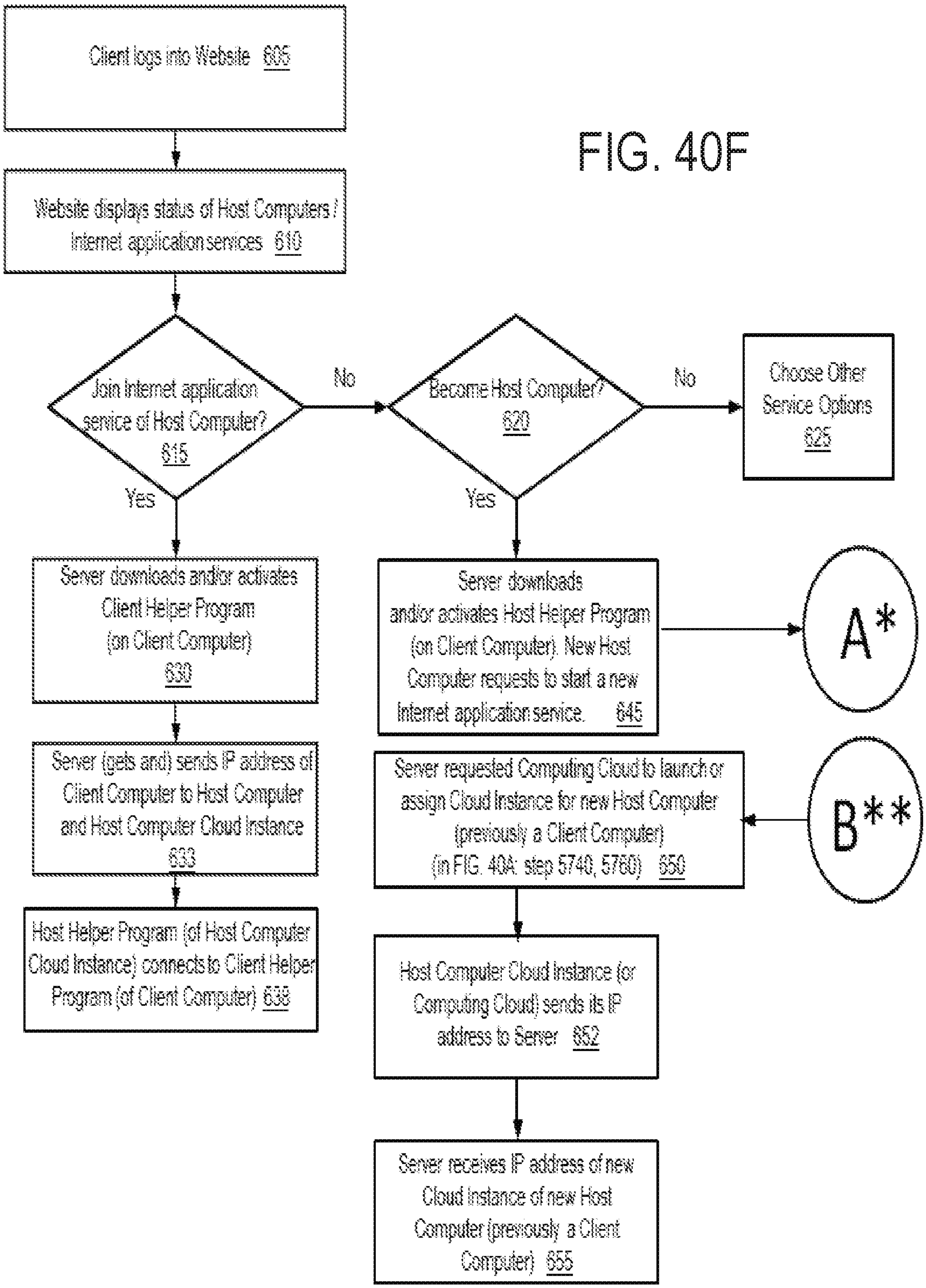

In an embodiment of the current invention illustrated in FIG. 40F, which FIG. 40F is similar to FIG. 40E, but in FIG. 40F the server 222A (gets 605 and) sends 633 (using indirect connection 225, 230 in FIG. 38A) the IP address of the client computer 215 to the host computer 205 and the host computer cloud instance 205-C, which are communicatively coupled to each other. The host helper program 216-1 (of the host computer cloud instance 205-C) then connects 638 to the client helper program 216-2 (of the client computer 215). Direct data exchange (not shown) can then occur, using direct network connection 748, 749 in FIG. 38B, between the client computer 215 and the host computer cloud instance 205-C, and without going through the server 222A. The host computer 205 (in FIG. 38B) is not needed for direct data exchange (not shown).

Figure 40G:
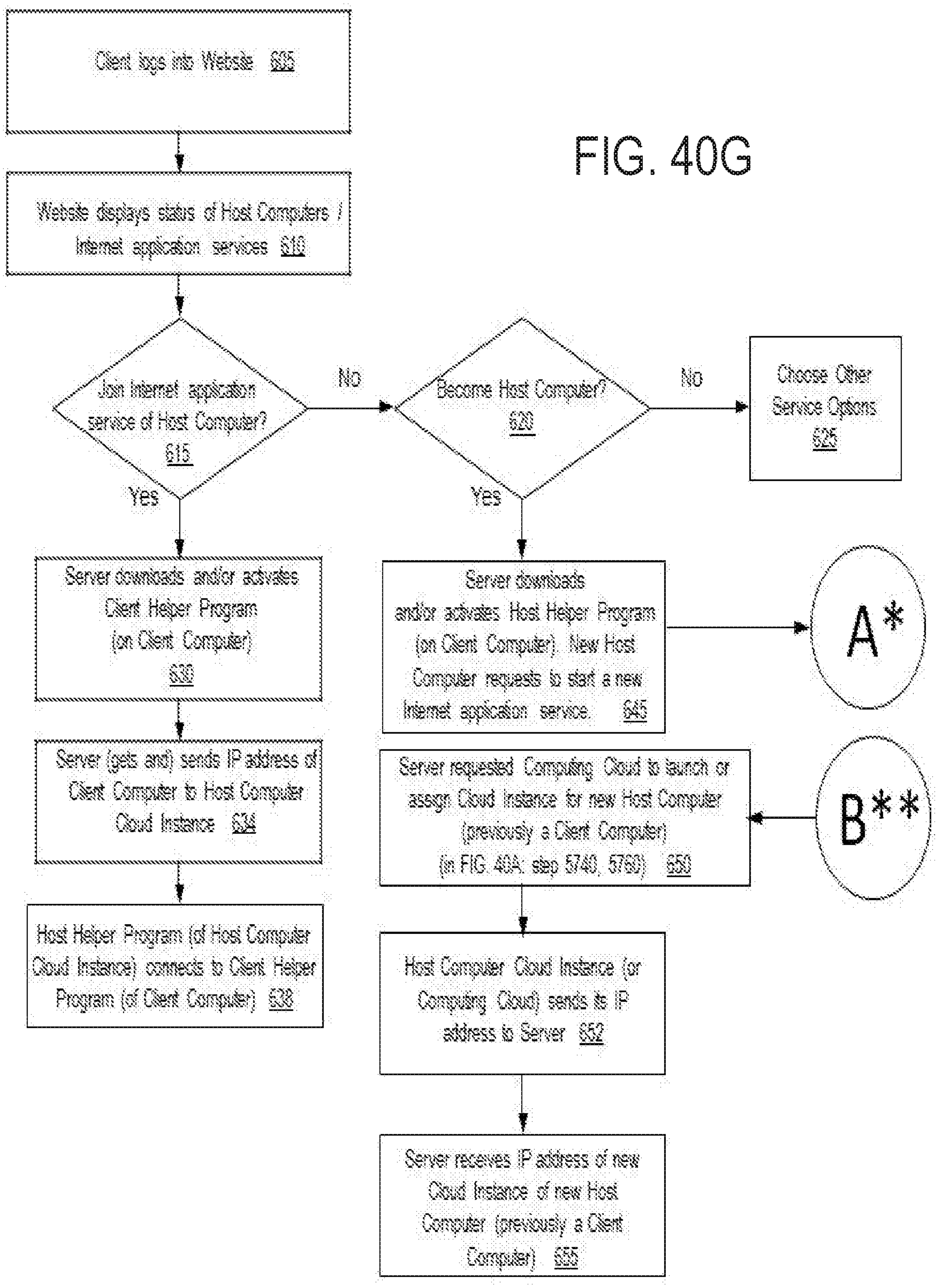

In another embodiment of the current invention illustrated in FIG. 40G, which FIG. 40G is similar to FIG. 40E, but in FIG. 40G the server 222A (gets 605 and) sends 634 (using indirect connection 227, 230 in FIG. 38A) the IP address of the client computer 215 to the host computer cloud instance 205-C, which is communicatively coupled to the host computer 205. The host helper program 216-1 (of the host computer cloud instance 205-C) then connects 638 to the client helper program 216-2 (of the client computer 215). Direct data exchange (not shown) can then occur, using direct network connection 748, 749 in FIG. 38B, between the client computer 215 and the host computer cloud instance 205-C, and without going through the server 222A. The host computer 205 (in FIG. 38B) is not needed for direct data exchange (not shown).

Similar to FIG. 40A, FIGS. 41A, 41B, 41C, 41D, 41E, 41F, and 41G are flowcharts illustrating (when the client computer 215 requests to join Internet application service of the host computer 205,) how steps 5810 to 5880 (from FIG. 41A) can be added to FIGS. 41B, 41C, 41D, 41E, 41F, and 41G respectively, to:

(a). Step 5810 (FIG. 41A): Client computer 215 (FIG. 24A): (i) joins Internet application service of host computer (cloud instance 205-C): (ii) its joining-Internet-application-service increases #-of-concurrent-users (of Internet application service).

(b). Step 5835 (FIG. 41A): If "Yes" in step 5830, (if needed) computing cloud 198 (in FIG. 26D) adds (needed)-"Not-Decrease"-number (in FIG. 39A's Table 1 (using "Linear" formula) and FIGS. 39C-&-39D) of single-(virtualized)-hardware to the host computer cloud instance 205-C.

(c). Step 5880 (FIG. 41A): Computing cloud 198 (in FIG. 26D) may also use other formula (not shown), other than Linear or Double Formula (to add single-(virtualized)-hardware to host computer cloud instance 205-C).

Figure 42A:
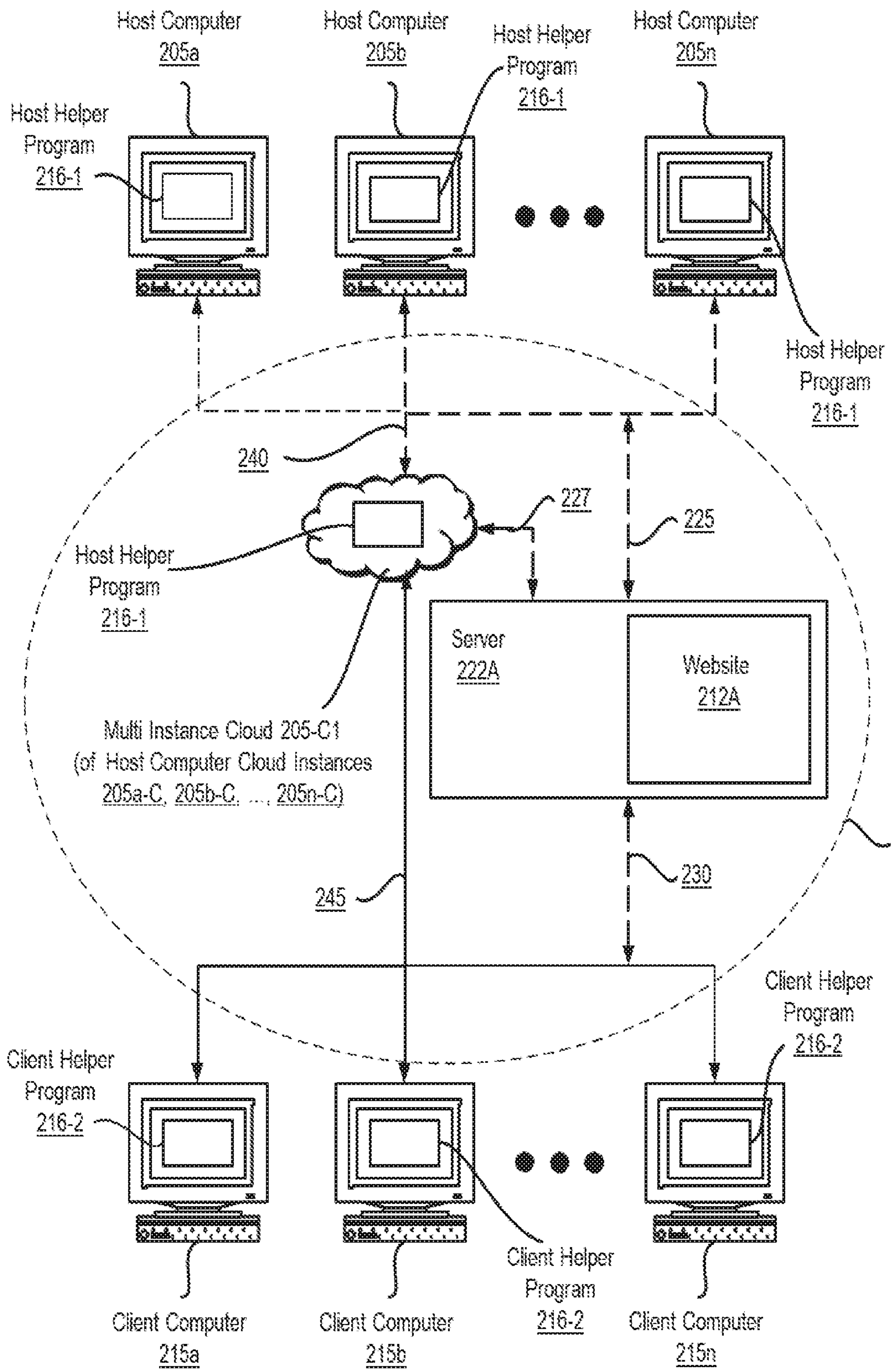
FIGS. 42A, 42B, 42C are block diagrams illustrating providing direct network connections using cloud instance for Internet application service over a computer network in accordance with another embodiment of the present invention.

FIG. 42A is a block diagram illustrating providing direct network connections using a multi instance cloud 205-C1 (of host computer cloud instances 205*a*-C, 205*b*-C, . . . , 205*n*-C) for Internet application service over a computer network in accordance with another embodiment of the present invention. The host computer cloud instance 205-C in FIGS. 2A, 2C, 2D, 2E, 7, 24A, 25A, 25C, 30A, 34A, and 38A may be a single instance cloud 205-C or in a multi instance cloud 205-C1 (illustrated in FIG. 42A) or the host computer cloud instance 205-C may be a tenant in a multi tenancy cloud 205-C2 (illustrated in FIG. 42B) and described below.

Internet Application Service Multi Instance or Multi Tenancy Considerations

Think of the cloud as a single entity comprising the data shared across multiple hardware machines (virtualized). The cloud juggles resources between the different hardware machines while communicating with remote (hardware) machines (e.g. client computers 215). In a multi-instance cloud, entirely separate instances (that is, separate copies of defined data items (such as separate copies of virtual machines (e.g. VMWare player or workstation), each with (its) installed software (e.g. host helper program 216-1)) are run parallel to one another, e.g. as host computer cloud instances 205*a*-C, 205*b*-C, . . . , 205*n*-C.

A multi tenancy cloud refers to a software architecture in which a single instance of software runs on a hardware machine and serves multiple tenants. A tenant is a group of users who share a common access with specific privileges to the software instance. With a multi-tenant architecture, a software application is designed to provide every tenant a dedicated share of the instance—including its data, configuration, user management, tenant individual functionality and non-functional properties. Multi-tenancy contrasts with multi-instance architectures, where separate software instances operate on behalf of different tenants.

Although the single-instance cloud shouldn't get bogged down while servicing requests as long as the hardware has adequate resources and speed, additional cloud instances in:
(i) the multi instance (computing) cloud 205-C1 in FIG. 42A (with its host computer cloud instances 205*a*-C, 205*b*-C, . . . , 205*n*-C); and
(ii) the multi tenancy (computing) cloud 205-C2 in FIG. 42B (with its host computer cloud tenants 205*a*-C, 205*b*-C, . . . , 205*n*-C) can help to speed up the overhead associated with interfacing the remote machines, e.g. client computers 215, with which the (multi instance or multi tenancy) computing cloud 205-C1 or 205-C2 communicates.

In spite of the difference between "cloud instance" (e.g. in FIG. 42A) and "cloud tenant" (e.g. in FIG. 42B) described in Para [0300] above, use of the term "cloud instance" in the specifications, diagrams, claims, and embodiments of this invention also means "cloud tenant" for the purpose of this invention, i.e. "cloud instance" and "cloud tenant" are used interchangeably herein.

Similarly, in spite of the difference between "multi instance cloud" (e.g. in FIG. 42A) and "multi tenancy cloud" (e.g. in FIG. 42B) described in Para [0300] above, use of the term "multi instance cloud" in the specifications, diagrams, claims, and embodiments of this invention also means "multi tenancy cloud" for the purpose of this invention, i.e. "multi instance cloud" and "multi tenancy cloud" are used interchangeably herein.

Similarly, in spite of the difference (not shown) between "multi instance repeater cloud" (e.g. in FIG. 59A) and "multi tenancy repeater cloud" (not shown), use of the term "multi instance repeater cloud" in the specifications, diagrams, claims, and embodiments of this invention also means "multi tenancy repeater cloud" for the purpose of this invention, i.e. "multi instance repeater cloud" and "multi tenancy repeater cloud" are used interchangeably herein.

In other words, the current invention title: "Direct Network Connections Using Cloud Instance for Multipoint Meeting Service" may also be titled: "Direct Network Connections Using Cloud Tenant for Multipoint Meeting Service", because the current invention applies to both titles, and the non-obviousness, inventive steps, novelty, and/or creativity in the current invention applies to both titles above.

In some embodiments, the direct network connection using cloud instance architectures depicted by FIGS. 2A, 2C, 2D, 2E, 7, 24A, 25A, 25C, 30A, 34A, and 38A are adapted using the above-described techniques for multiple host computers cloud instances 205*a*-C, 205*b*-C, . . . , 205*n*-C in multi instance cloud 205-C1 and/or multi tenancy cloud 205-C2. In such embodiments, the multi instance cloud 205-C1 and/or multi tenancy cloud 205-C2 may need to distinguish between multiple host computer cloud instances or tenants 205*a*-C, 205*b*-C, . . . , 205*n*-C in FIG. 42A or FIG. 42B respectively to ensure that data is transmitted only to one or more proper destinations. For example, the popular cloud computing offering, Amazon EC2, provides an external and internal IP address for its cloud instances or tenants, so the computing cloud Amazon EC2 may need to distinguish between multiple host computer cloud instances or tenants 205*a*-C, 205*b*-C, . . . , 205*n*-C in FIG. 42A or FIG. 42B respectively to ensure that data is transmitted only to one or more proper destinations. For some computing clouds, the internal IP address may be a private network IP address to save on the public IP address resource.

Figure 42B:
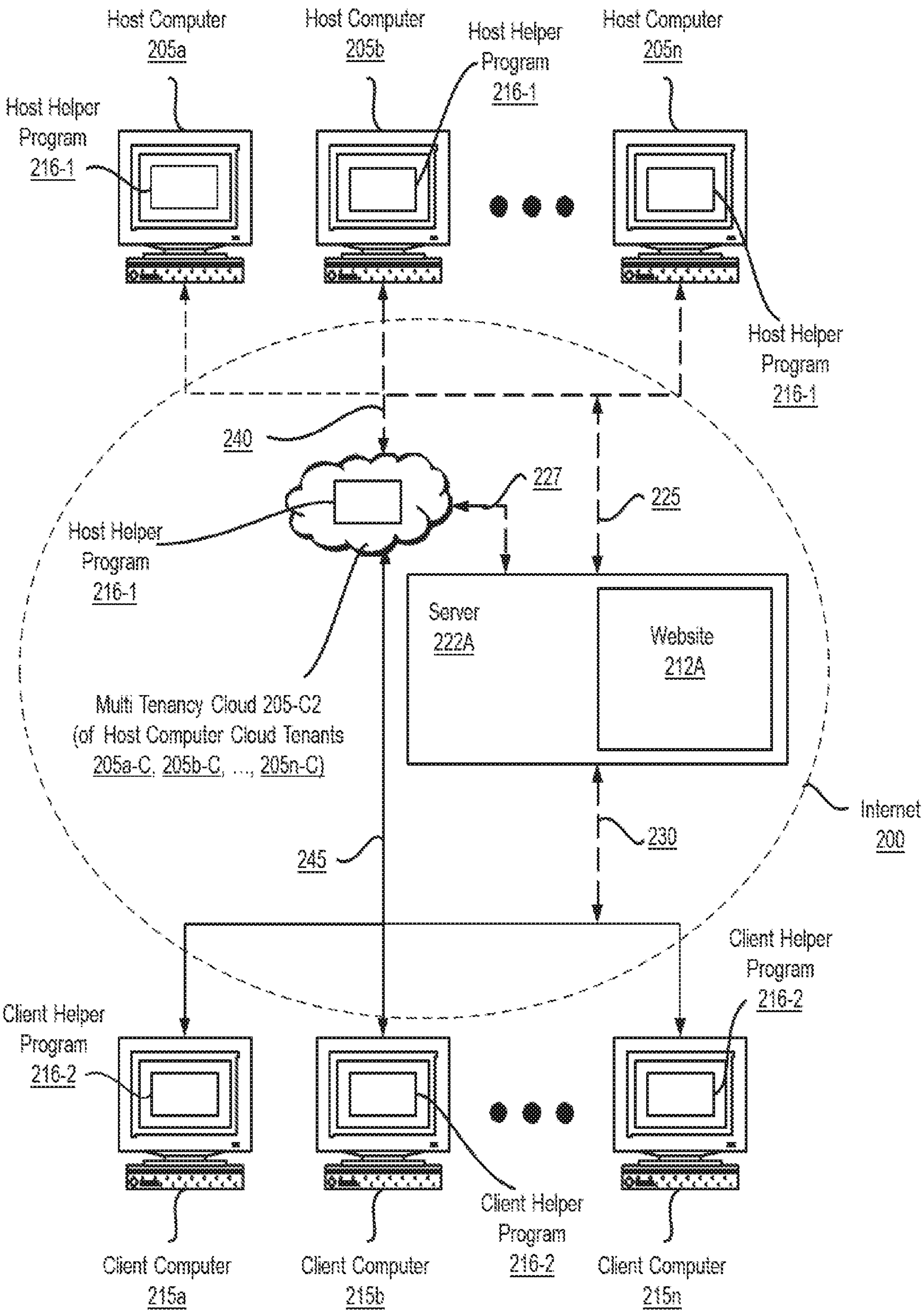
Figure 43A:
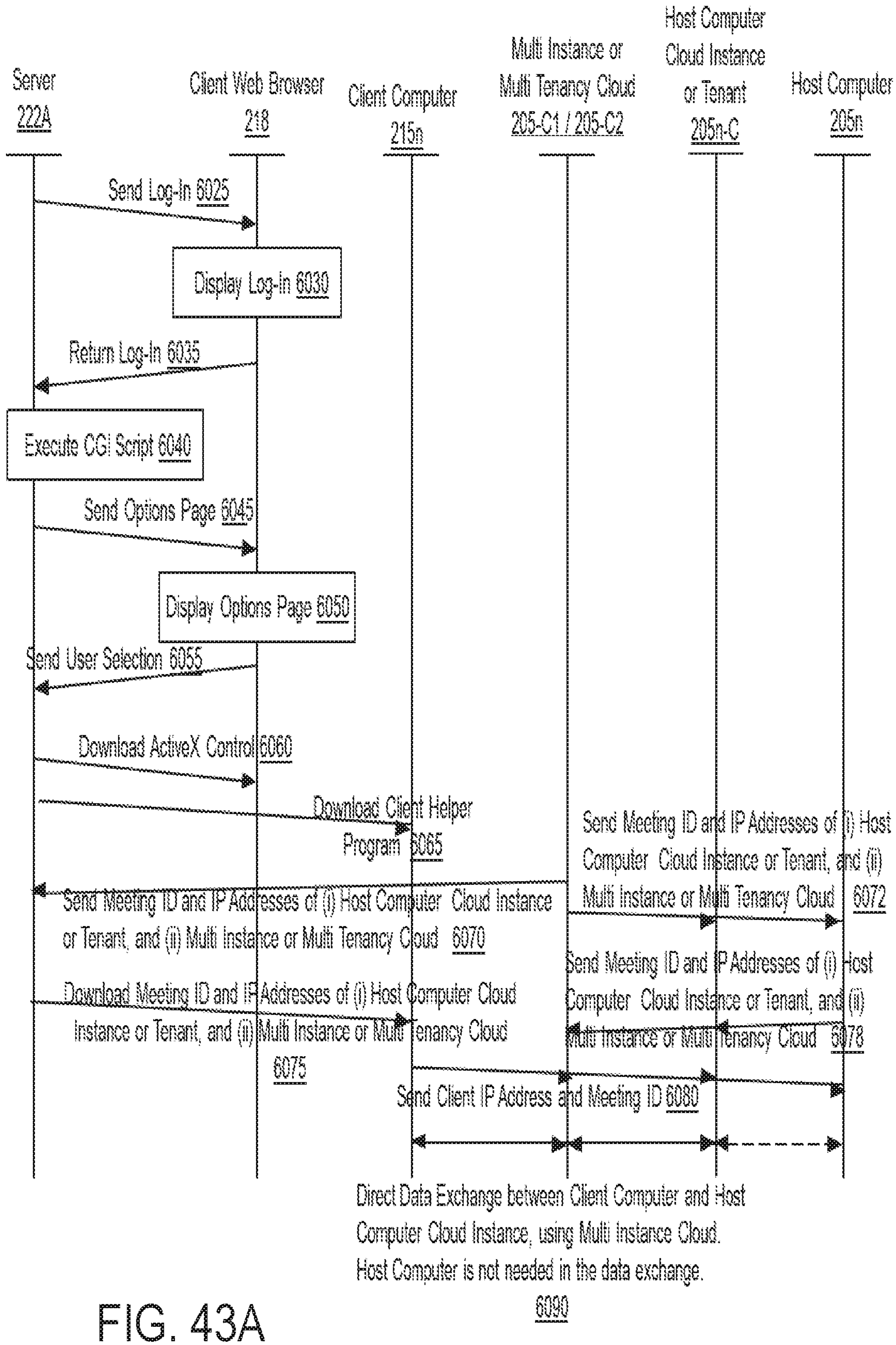
FIGS. 43A, 43B, 43C are flowcharts illustrating providing direct network connections using cloud instance for Internet application service over a computer network in accordance with another embodiment of the present invention.

Referring to FIG. 43A, the multi instance or multi tenancy cloud 205-C1 or 205-C2 respectively may assign 6070 and send 6070 a unique meeting ID (along with the IP addresses of (i) host computer cloud instance or tenant 205*n*-C, and (ii) multi instance or multi tenancy cloud 205-C1 or 205-C2 respectively) to the server 222A, which receives them. The multi instance or multi tenancy cloud 205-C1 or 205-C2 respectively also sends 6072 the meeting ID (along with the IP addresses of (i) host computer cloud instance or tenant 205*n*-C, and (ii) multi instance or multi tenancy cloud 205-C1 or 205-C2 respectively) to the host computer cloud instance or tenant 205*n*-C, which is communicatively coupled to the host computer 205*n*. The server 222A then sends 6075 the unique meeting ID and IP address of the host computer cloud instance or tenant 205*n*-C to the client computer 215*n* along with the IP address of the multi instance or multi tenancy cloud 205-C1 or 205-C2 respectively (of host computer cloud instance or tenant 205*n*-C). The client computer 215*n* may then send 6080 to the multi instance or multi tenancy cloud 205-C1 or 205-C2 respectively and the host computer cloud instance or tenant 205*n*-C the unique meeting ID along with the IP address of the client computer 215. In one embodiment, the host computer 205*n* also previously sends 6078 the unique meeting ID (along with the IP addresses of (i) host computer cloud instance or tenant 205*n*-C, and/or (ii) multi instance or multi tenancy cloud 205-C1 or 205-C2 respectively) to the multi instance cloud 205-C1 or multi tenancy cloud 205-C2 and the host computer cloud instance or tenant 205*n*-C (which is communicatively coupled to the host computer 205*n*). The multi instance cloud 205-C1 or multi tenancy cloud 205-C2 may store both the unique meeting ID and the associated IP addresses of the host computer 205*n* and of the host computer cloud instance or tenant 205*n*-C in a look-up table. Thus, when a client computer 215 sends data 6080 to the host computer cloud instance or tenant 205*n*-C (and/or the host computer 205*n*) via the direct network connection 240, 245 (in FIG. 42A or FIG. 42B respectively) using the multi instance or multi tenancy cloud 205-C2 or 205-C2 respectively, as illustrated in FIG. 42A or FIG. 42B respectively, it may designate the data as corresponding to the particular meeting ID, allowing the multi instance cloud 205-C1 or multi tenancy cloud 205-C2, using the look-up table, to transmit the data to the appropriate host computer cloud instance or tenant 205*n*-C. From this point on, the client computer 215 and the host computer cloud instance or tenant 205*n*-C can exchange data 6090 via a direct network connection 245 using the multi instance cloud 205-C1 or multi tenancy cloud 205-C2, independent of the server 222A and the host computer 205*n*. The host computer 205*n* is not needed for the data exchange 6090. The host computer 205*n* is only needed to request the server 222A to start (not shown) the Internet application service, and is not needed for the data exchange 6090 (in FIG. 43A) between the host computer cloud instance or tenant 205*n*-C and the client computer 215*n*.

Figure 42C:
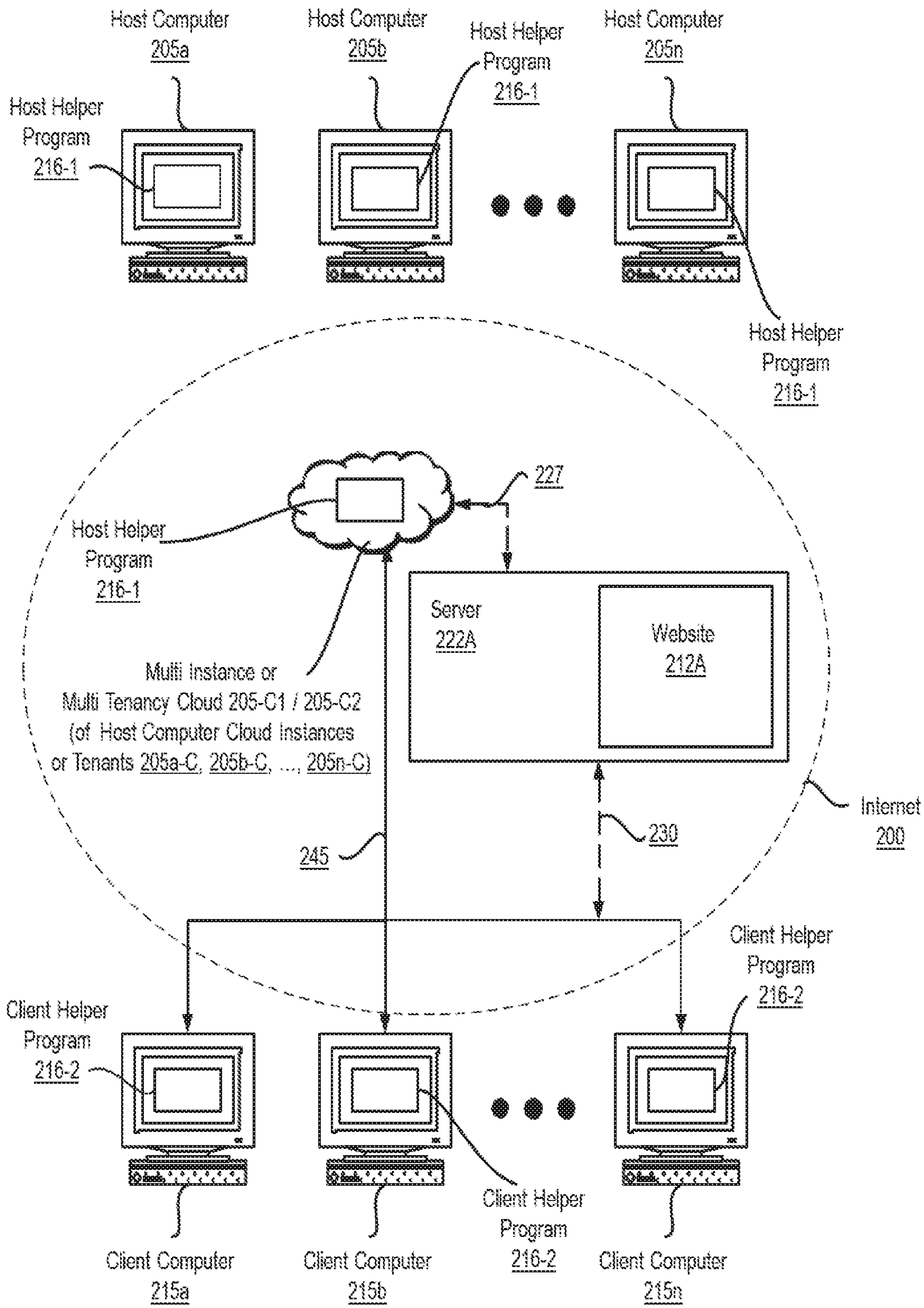

Please note: data exchange 6090 (in FIG. 43A) and FIG. 42C illustrate that after the Internet application services are started (not shown), and after the server 222A receives (not shown) the IP addresses (and the unique meeting ID) of the host computer cloud instance or tenant 205*n*-C, the host computer 205*n* is not needed to be communicatively linked 240 with the host computer cloud instance or tenant 205*n*-C or linked 225 with the server 222A respectively (for the client computer 215*n* to use the Internet application service of the host computer cloud instance or tenant 205*n*-C). Please further note: communication links 225, 240 appear in FIGS. 42A, 42B and do not appear in FIG. 42C.

It is noted that the IP address of the client computer 215*n* may be sent to the host computer 205*n* and/or the host computer cloud instance or tenant 205*n*-C using indirect connection 225, 230, or indirect connection 227, 230 (instead of using direct network connection 240, 245 in FIG. 42A or FIG. 42B) in further embodiments of the current invention illustrated in FIGS. 43B and 43C respectively and described below.

Figure 43B:
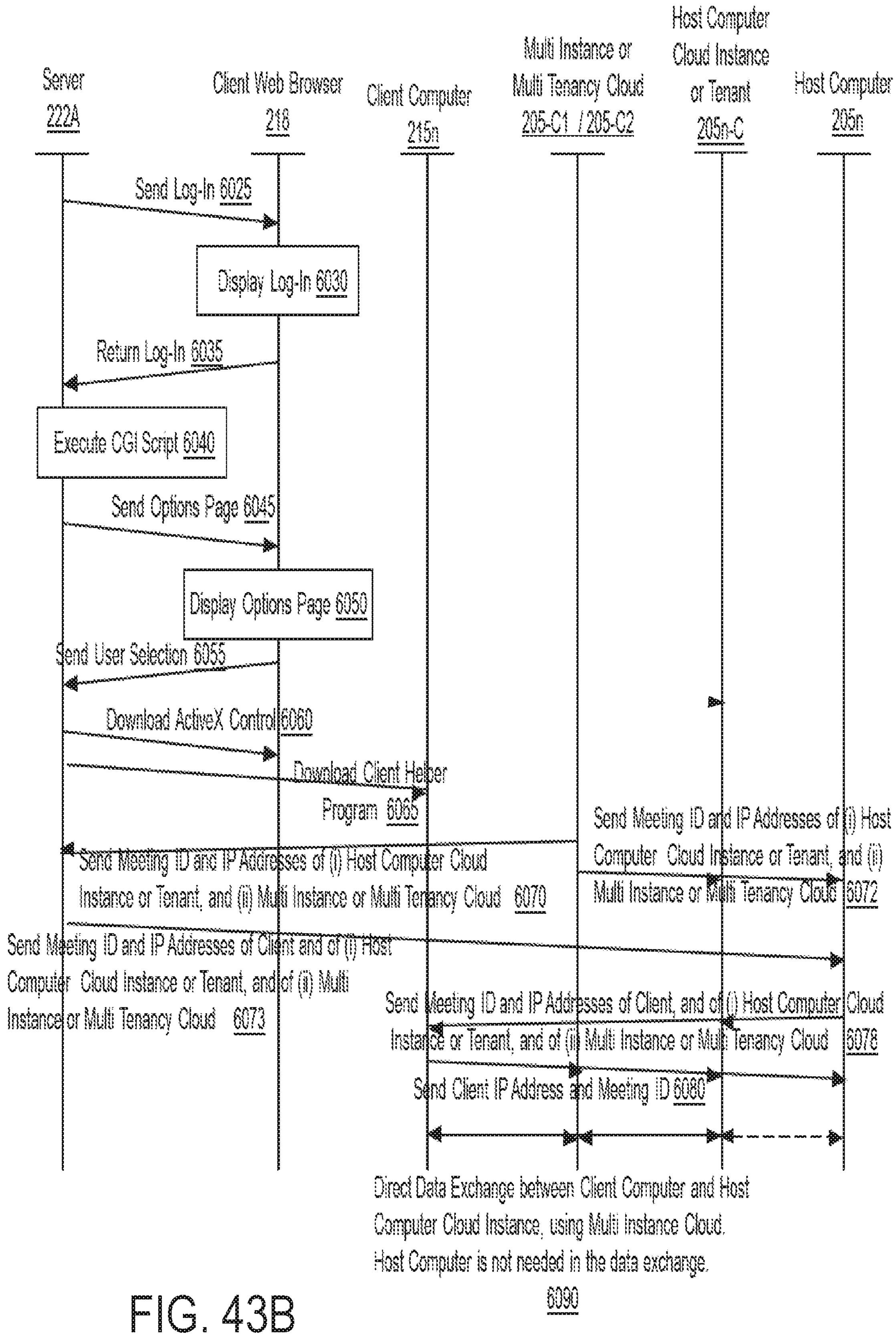

In an embodiment of the current invention illustrated in FIG. 43B, which FIG. 43B is similar to FIG. 43A, but in FIG. 43B the server 222A sends 6073 (using indirect connection 225, 230 in FIG. 42A or FIG. 42B) the IP address of the client computer 215*n* and meeting ID (along with the IP Addresses of (i) host computer cloud instance or tenant 205*n*-C, and (ii) multi instance or multi tenancy cloud 205-C1 or 205-C2 respectively (of host computer cloud instance or tenant 205*n*-C)) to the host computer 205*n*, which is communicatively coupled to the host computer cloud instance or tenant 205*n*-C. The host computer cloud instance or tenant 205*n*-C therefore also gets 6073 the IP address of the client computer 215*n* and meeting ID, along with the IP Address of multi instance or multi tenancy cloud 205-C1 or 205-C2 respectively (of host computer cloud instance or tenant 205*n*-C). The host computer 205*n* then sends 6078 the meeting ID to client computer 215, along with the IP Addresses of (i) host computer cloud instance or tenant 205*n*-C, and (ii) multi instance or multi tenancy cloud 205-C1 or 205-C2 respectively (of host computer cloud instance or tenant 205*n*-C). Direct data exchange 6090 can then occur, using (multi instance or multi tenancy cloud 205-C1 or 205-C2, and) direct network connection 245 in FIG. 42C, between client computer 215*n* and host computer cloud instance or tenant 205*n*-C, and without going through server 222A. Host computer 205*n* is not needed for the direct data exchange 6090 (in FIG. 43B) between client computer 215*n* and host computer cloud instance or tenant 205*n*-C.

Figure 43C:
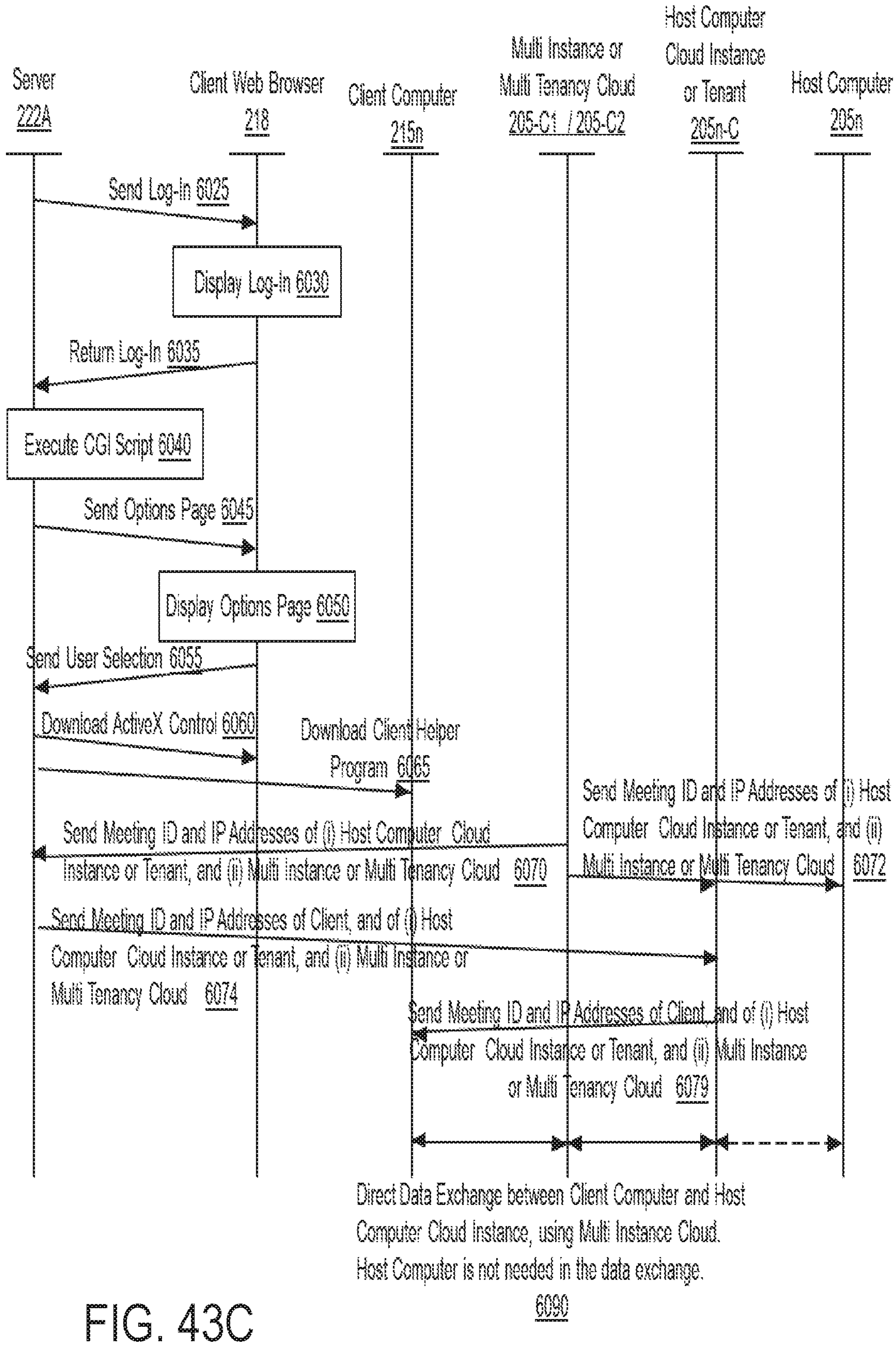

In another embodiment of the current invention illustrated in FIG. 43C, which FIG. 43C is similar to FIG. 43A, but in FIG. 43C the server 222A sends 6074 (using indirect connection 227, 230 in FIG. 42A or FIG. 42B) the IP address of the client computer 215*n* and meeting ID (along with the IP Addresses of (i) host computer cloud instance or tenant 205*n*-C, and (ii) multi instance or multi tenancy cloud 205-C1 or 205-C2 respectively (of host computer cloud instance or tenant 205*n*-C)) to the host computer cloud instance or tenant 205*n*-C, which may be (but not required in FIGS. 42C and 43C to be) communicatively coupled to the host computer 205*n*. The host computer cloud instance or tenant 205*n*-C then sends 6079 the meeting ID to client computer 215*n*, along with the IP Addresses of (i) host computer cloud instance or tenant 205*n*-C, and (ii) multi instance or multi tenancy cloud 205-C1 or 205-C2 respectively (of host computer cloud instance or tenant 205*n*-C). Direct data exchange 6090 can then occur, using (multi instance or multi tenancy cloud 205-C1 or 205-C2 respectively (of host computer cloud instance or tenant 205*n*-C, and) direct network connection 245 in FIG. 42C, between client computer 215*n* and host computer cloud instance or tenant 205*n*-C, and without going through server 222A. Host computer 205*n* is not needed for the direct data exchange 6090 (in FIG. 43C) between client computer 215*n* and host computer cloud instance or tenant 205*n*-C.

Thus, in accordance with embodiments of the present invention, FIGS. 42A 42B, 42C, 43A, 43B, and 43C above illustrate creating direct network connections for Internet application service between the client computer 215*n* and the host computer cloud instance or tenant 205*n*-C via the Internet.

Client computer 215 checks can be a feature of host computer 205 helper program 216-1 to allow client computers 215*a*, 215*b*, . . . , 215*n* to verify that they have the needed hardware, software and bandwidth to join the Internet application services of the host computers 205*a*, 205*b*, . . . , 205*n*. For BigBlueButton (which is a multipoint meeting application and also an Internet application), a client computer 215 may do client check by visiting URL: http://demo.bigbluebutton.org/check/. Other host helper programs 216-1 may have other procedures to perform their client checks, if any.

FIG. 44 illustrates the results of a client check by a host helper program 216-1, e.g. BigBlueButton host helper program 216-1, for a client computer 215, before the client computer 215 joins the Internet application service of a host computer 205.

For example, the items checked in FIG. 44 include Java enabled, browser, client check version, cookie enabled, download speed, flash version, etc. ; and the results are "Java is disabled in your browser", Firefox 38.0, 0.9.0-28, true, "1.774 Mbps (2.273 MB in 10 seconds)", 17.0.0.188, etc., respectively; and the status includes warning for Java enabled, so that the user may take note, provide remedy to correct the status, and enable Java in its Firefox 38.0 browser, to allow proper performance and user experience when its client computer 215 joins the Internet application service of the host computer cloud instance 205-C.

FIG. 45 illustrates, as non-exhaustive examples, five other cases of client computer checks, their client computer check results/status, and possible client software-as-a-service provided by client software-as-a-service helper program 216-3 (in FIG. 2F, and in client computer cloud instances 215*a*-C, 215*b*-C, . . . , 215*n*-C in FIG. 46), to allow client computers 215*a*, 215*b*, . . . , 215*n* to have better performance and user experiences, in Internet application services with host computer cloud instances 205*a*-C, 205*b*-C, . . . , 205*n*-C.

Figure 46:
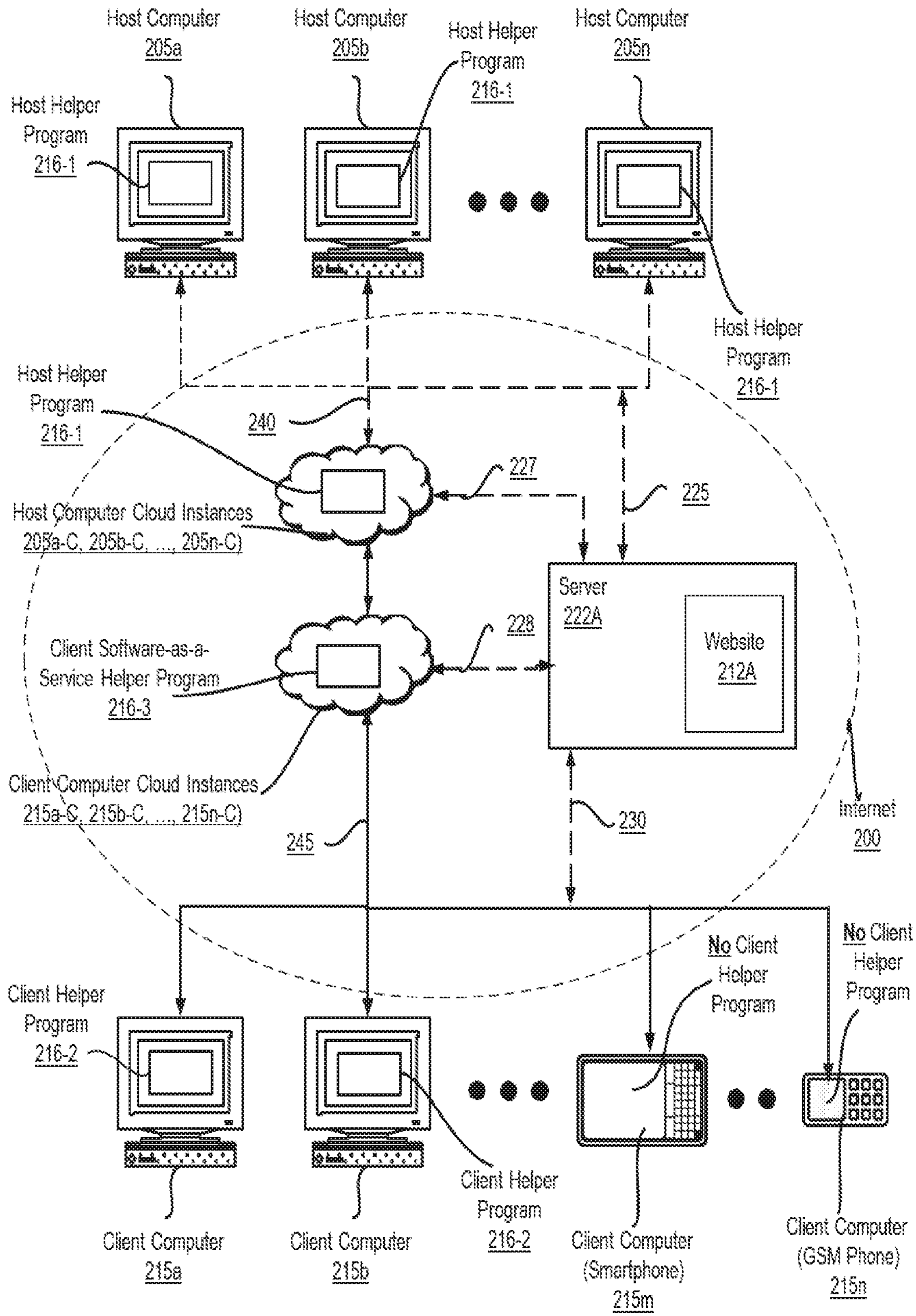
FIG. 46 is a block diagram illustrating providing direct network connections using cloud instance for Internet application service over a computer network in accordance with another embodiment of the present invention.

For example, case in FIG. 45 is client check for client computer 215*a* in FIG. 46; the client check item is audio, and the client check result/status is "No audio (sound card missing)"; and the client software-as-a-service could be "Instant speech-to-text translation" provided by the client software-as-a-service helper program 216-3 of the client computer cloud instance 215*a*-C in FIG. 46.

As another example, cases 2 and 3 in FIG. 45 are client checks for client computer 215*b* in FIG. 46; the client check items are bandwidth and client OS support, and the client check results/status are "Below recommended" and "Not supported" respectively; and the client software-as-a-service could be "More data compression" and "Interpreter to support non-supported OS" respectively, provided by the client software-as-a-service helper program 216-3 of the client computer cloud instance 215*b*-C in FIG. 46.

As another example, case 4 in FIG. 45 is client check for client computer 215*m* in FIG. 46: the client check item is client language, and the client check result/status is "Client language different"; and the client software-as-a-service could be "Instant language translation" provided by the client software-as-a-service helper program 216-3 of the client computer cloud instance 215*m*-C in FIG. 46.

As a further example, case 5 in FIG. 45 is client check for client computer (GSM phone) 215*n* in FIG. 46, where the client computer (GSM phone) 215*n* sends an SMS message with meeting ID and password, if any, to the server 222A to join the Internet application service; the client check item is non-intelligent phone, and the client check result/status is "Not supported"; and the client software-as-a-service could be "Audio-only to GSM etc. legacy phones" provided by the client software-as-a-service helper program 216-3 of the client computer cloud instance 215*n*-C in FIG. 46.

Referring to FIG. 46, in still another embodiment of the present invention, the client computers 215*a*, 215*b*, . . . , 215*n* when doing their client checks reveal needs for one or more client software-as-a-service (some of which are illustrated above) in them, and thus in in their joining-Internet-application-service requests to server 222A may include requests for one or more client software-as-a-service for their Internet application services respectively. The server 222A then requests a computing cloud (not shown) to launch-or-assign client computer cloud instances 215*a*-C, 215*b*-C, . . . , 215*n*-C to provide these client software-as-a-service for these client computers 215*a*, 215*b*, . . . , 215*n* respectively.

Figure 47A:
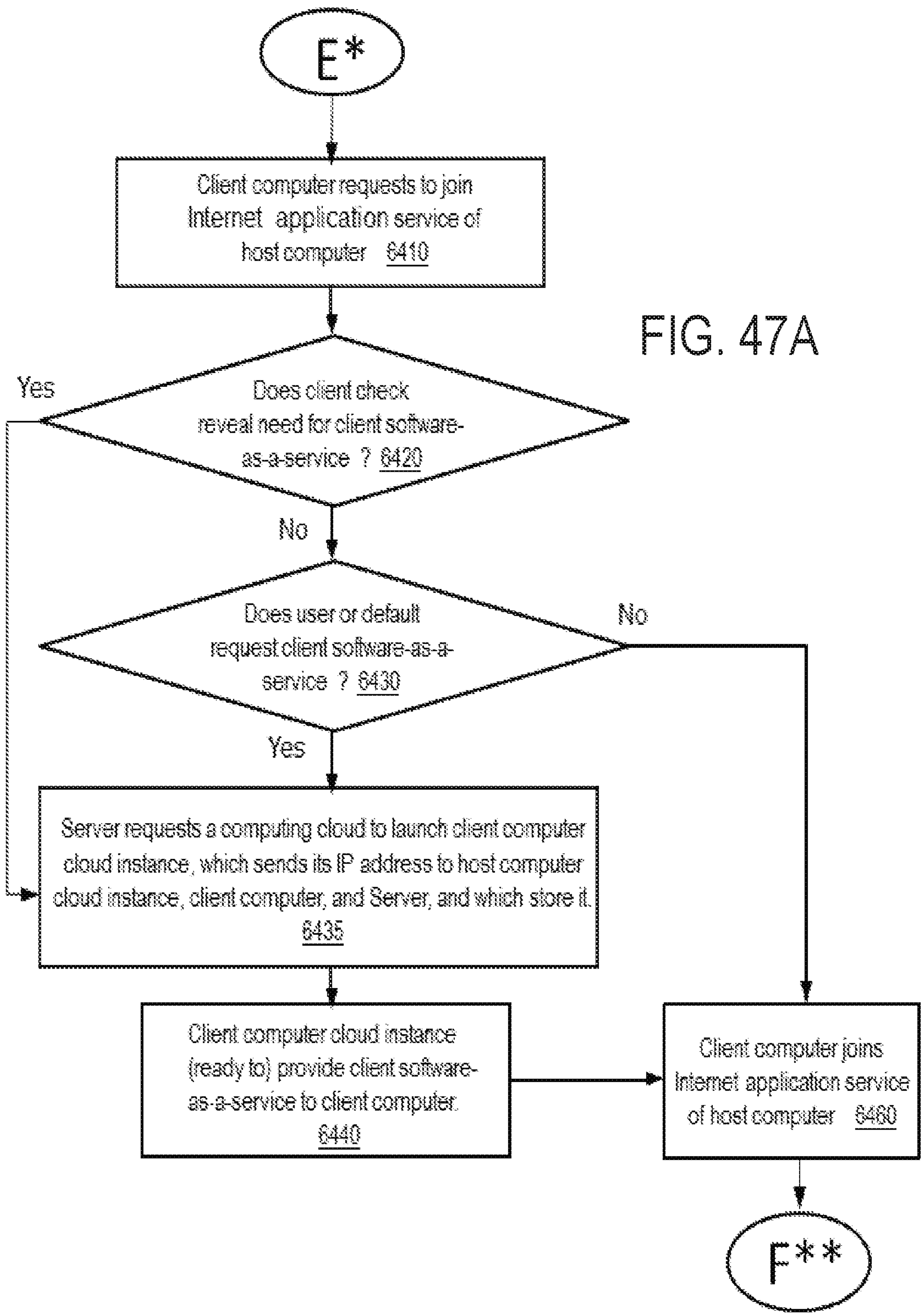
FIG. 47A are flowcharts illustrating providing direct network connections using cloud instance for Internet application service over a computer network in accordance with another embodiment of the present invention.
Figure 47B:
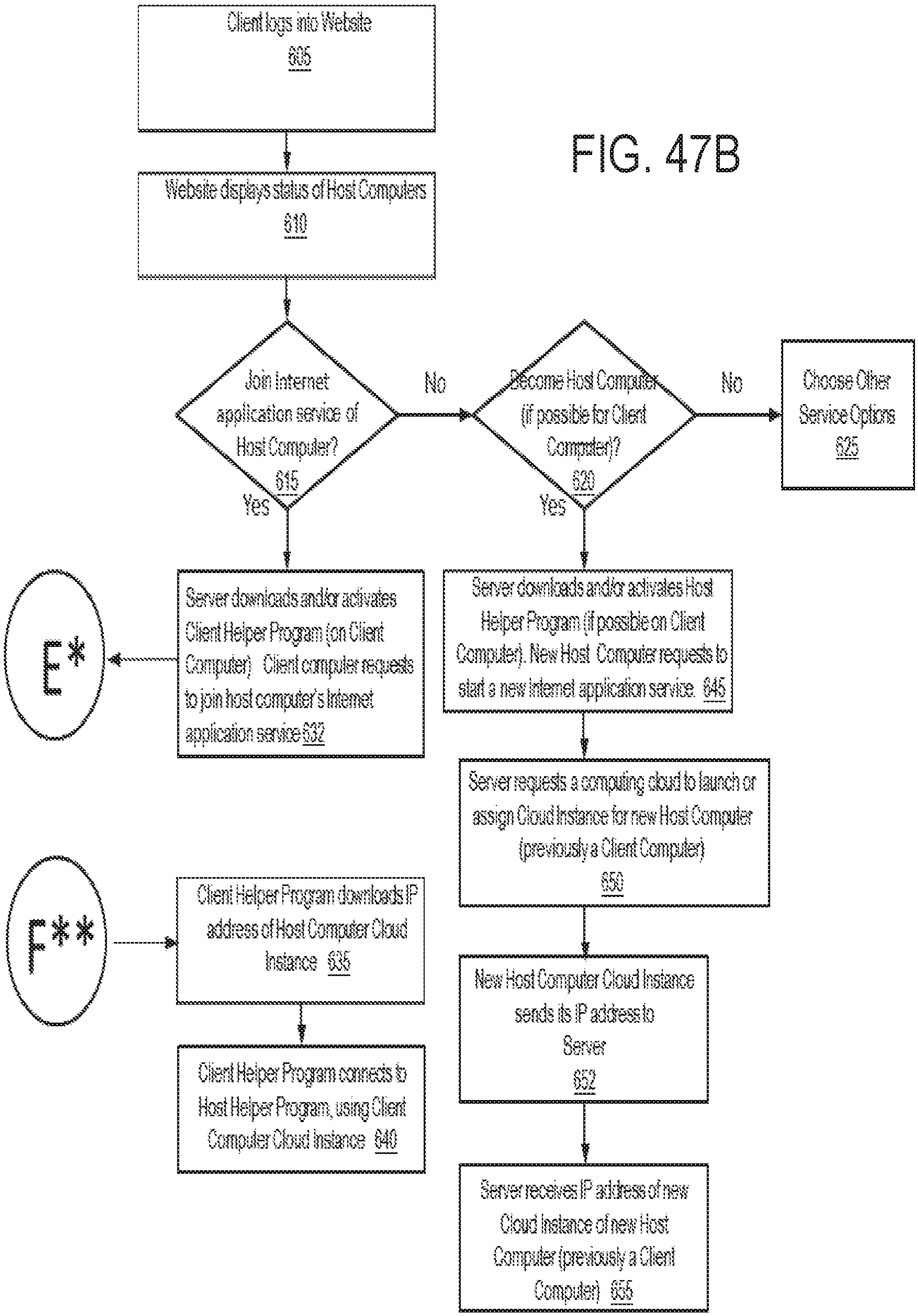
FIGS. 47B, 47C are flowcharts illustrating providing direct network connections using cloud instance for Internet application service over a computer network in accordance with another embodiment of the present invention.
Figure 47C:
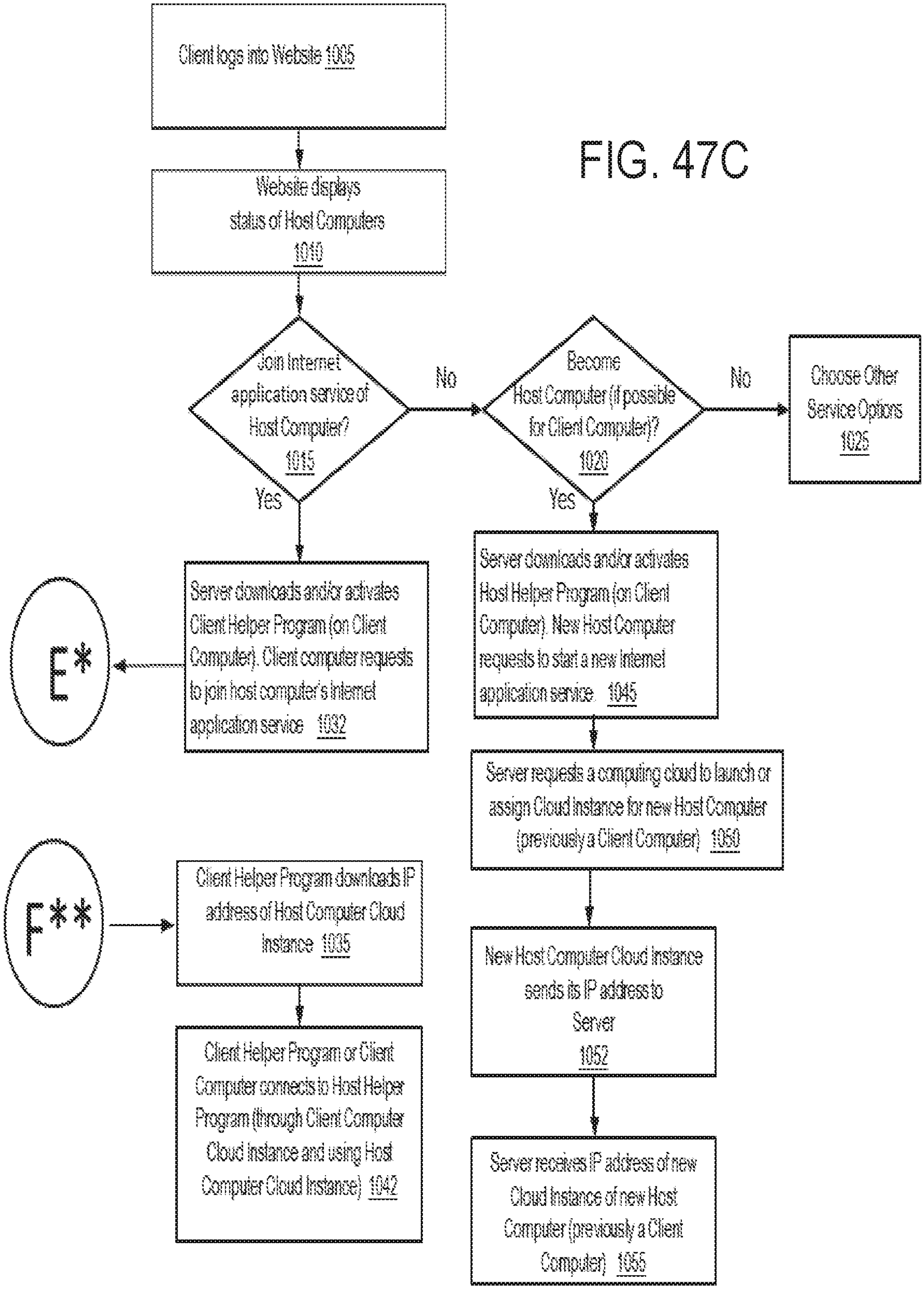
Figure 48A:
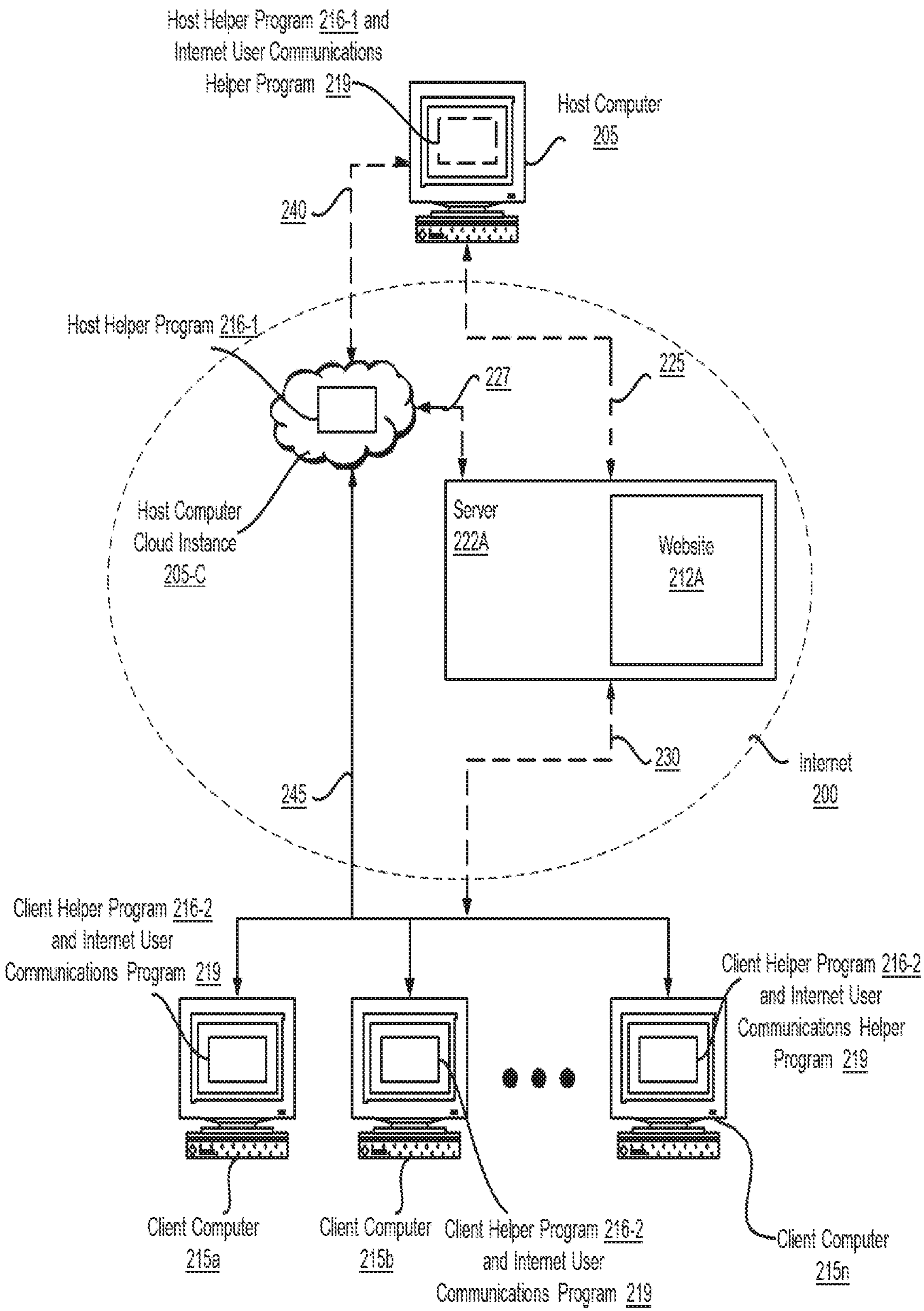
FIGS. 48A, 48B, 48E, 48F are block diagrams illustrating providing direct network connections using cloud instance for Internet application service over a computer network in accordance with another embodiment of the present invention.
Figure 48B:
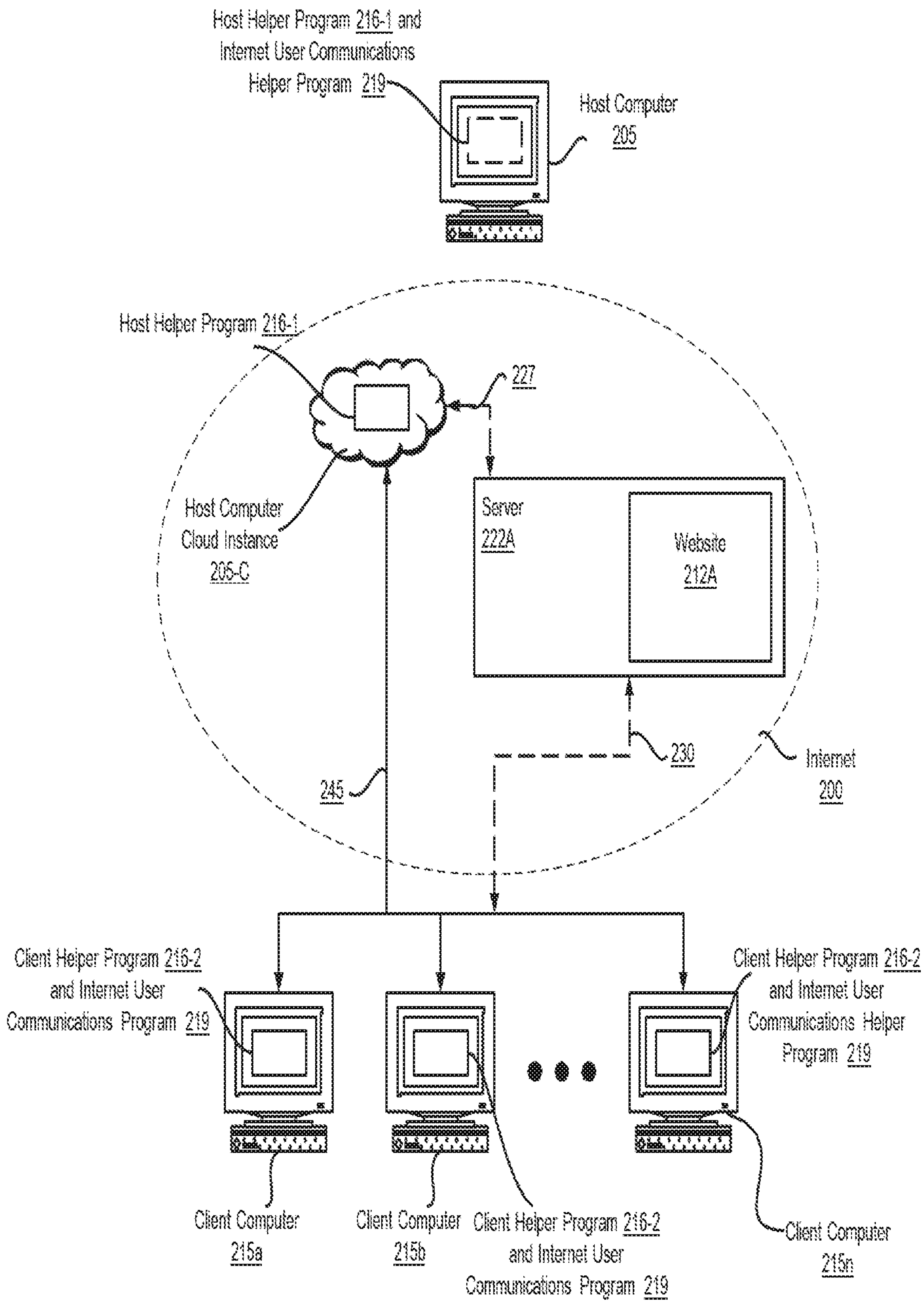
Figure 48C:
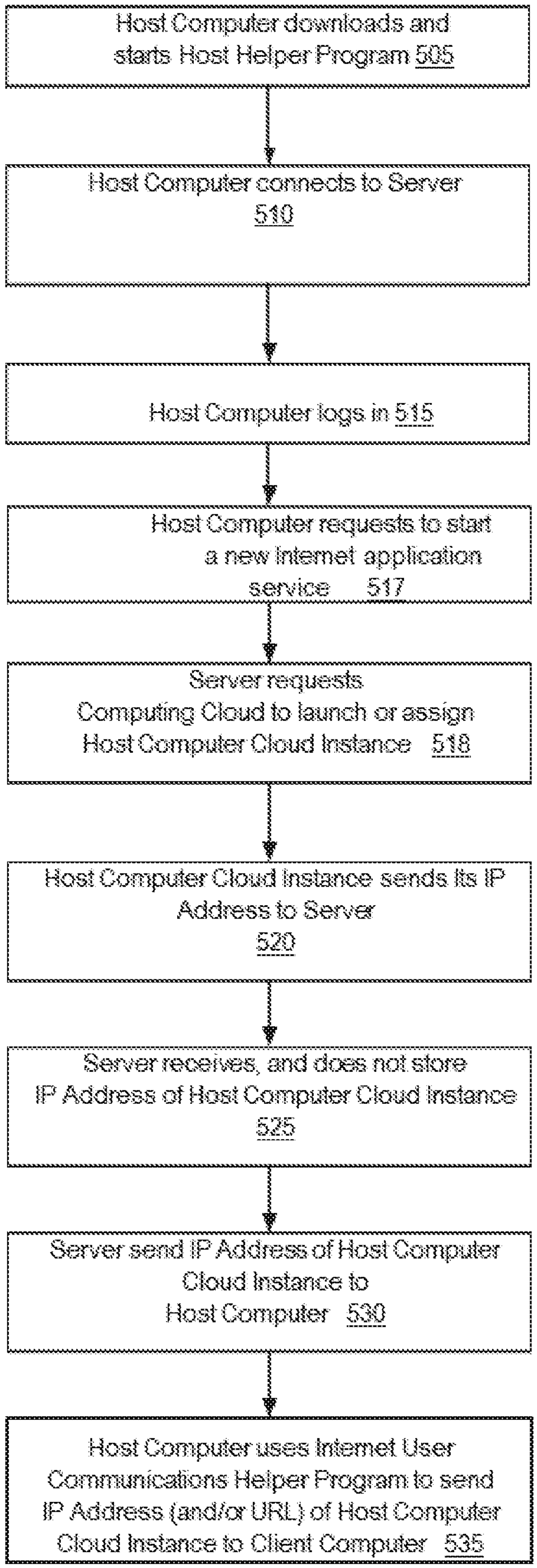
FIGS. 48C, 48D are flowcharts illustrating providing direct network connections using cloud instance for Internet application service over a computer network in accordance with another embodiment of the present invention.
Figure 48D:
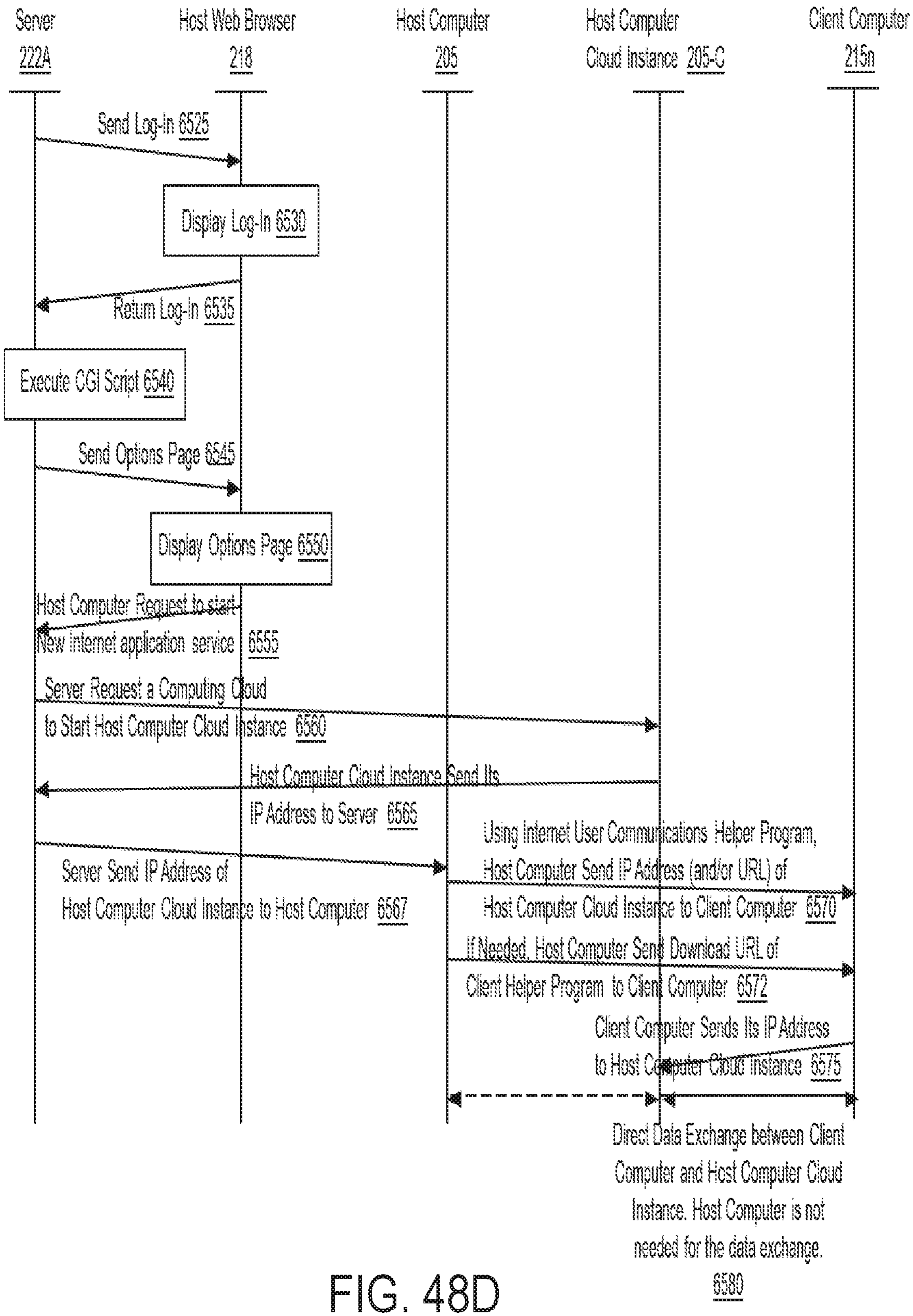
Figure 48E:
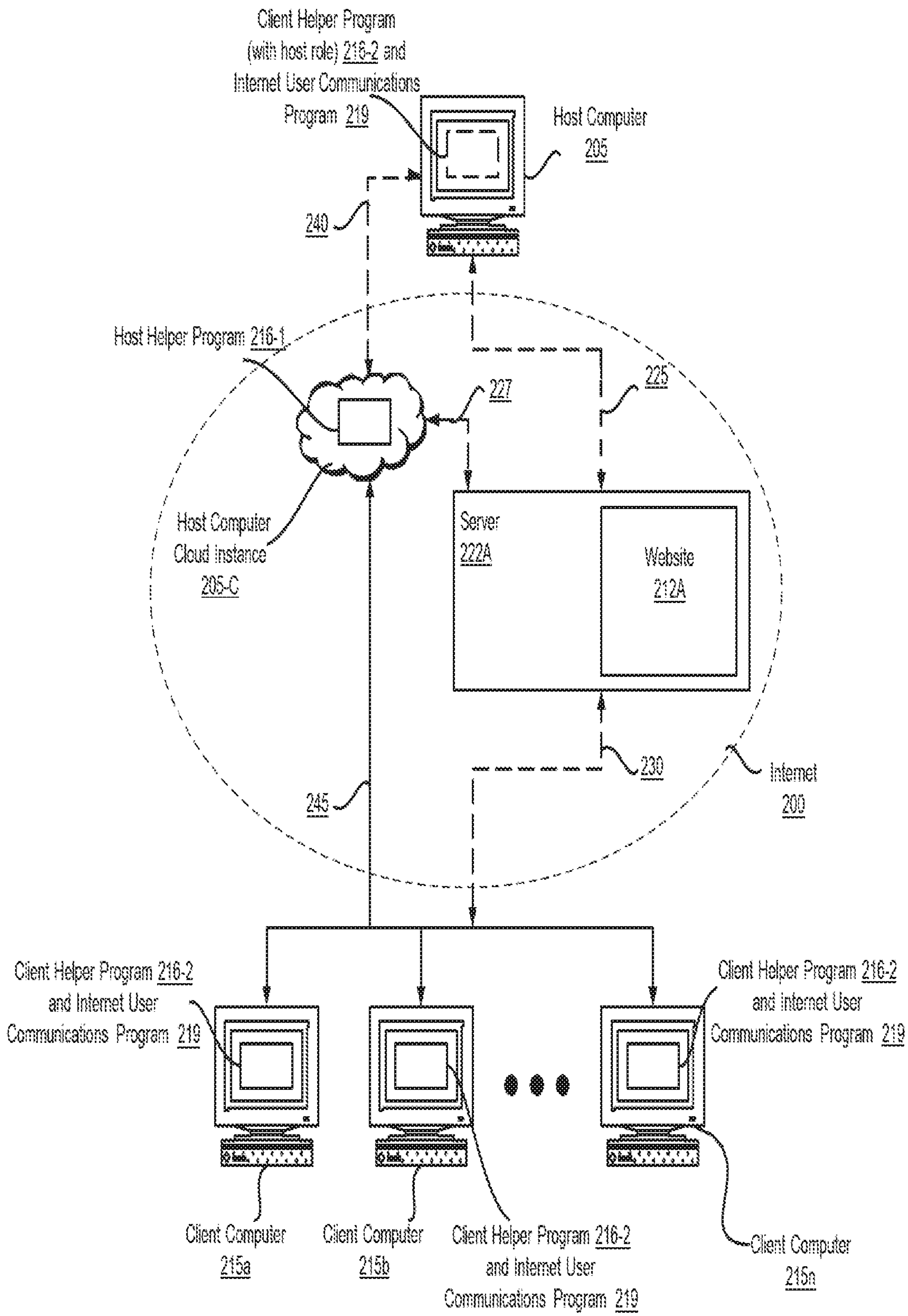
Figure 48F:
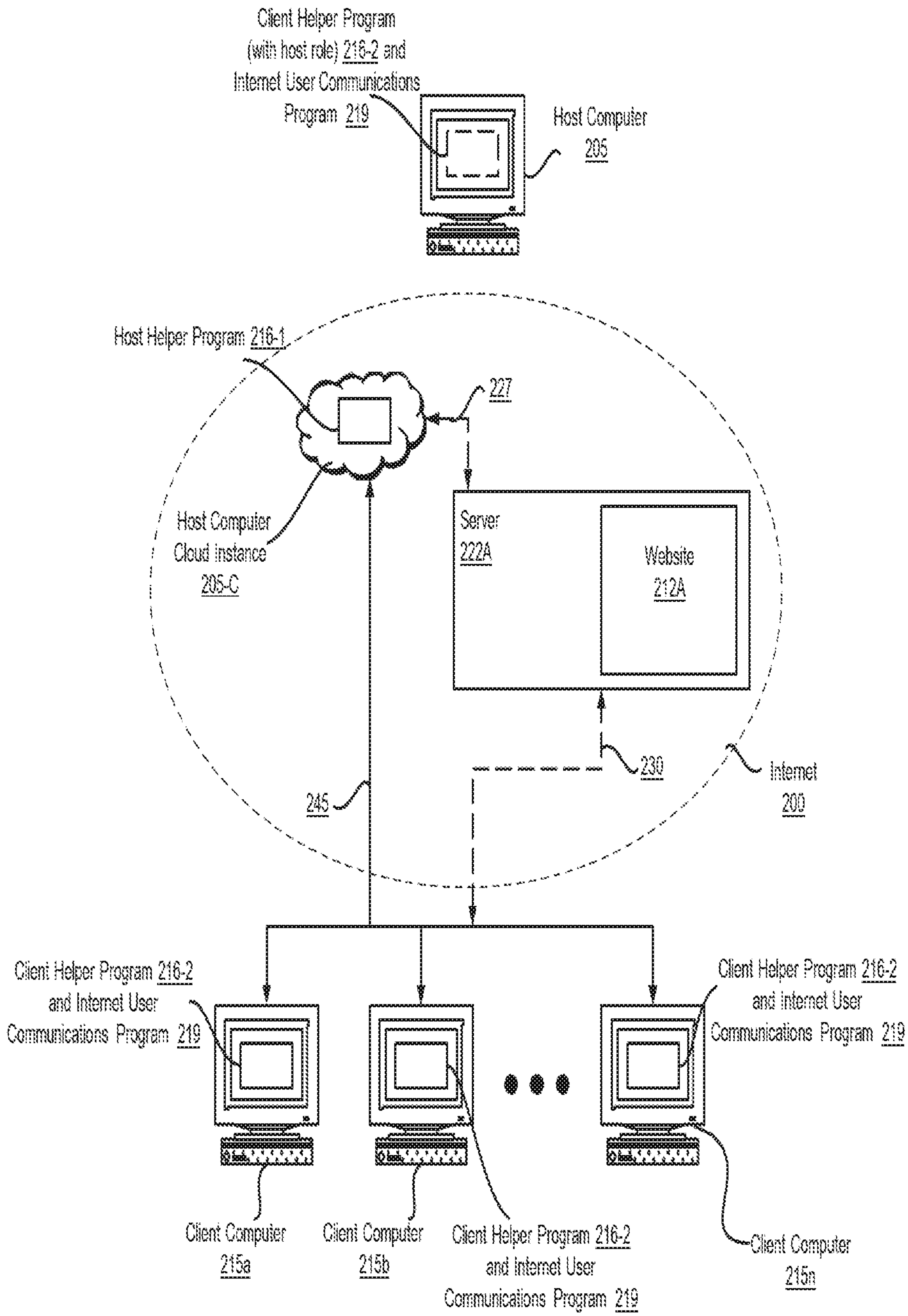

FIGS. 47A, 47B, and 47C are flowcharts illustrating how a client computer 215 can add steps 6410 to 6460 (from FIG. 47A) in FIGS. 47B, and 47C respectively, to request the server 222A to request a computing cloud (not shown) to launch-or-assign a client computer cloud instance 215-C to provide one or more needed client software-as-a-service for the client computer 215, for Internet application service over a computer network 200 in accordance with an embodiment of the present invention.

Internet User Communications Helper Program Considerations for Internet Application Services The optional Internet user communications helper program 219 in FIG. 2B is an optional software application to allow an Internet user to use the host computer 205 or the client computer 215 to communicate with another Internet user. The Internet user communications helper program 219 may include any conventional instant messenger application, email application, online social networking service application, website live-chat application, or any Internet communications program that can send the IP address of host computer cloud instance 205-C to the client computer 215 to join the Internet application service. Examples of Internet user communications helper program 219 include instant messenger application such as Skype from Microsoft Corporation, email application such as Hotmail from Microsoft Corporation, online social networking service application such as Facebook from Facebook, Inc., or website live-chat application such as Zopim or Zendesk Chat from Zendesk Singapore Pte. Ltd.

It should be noted that the host computer 205 and the client computer 215 may use the Internet user communications helper program 219 to communicate; and a host computer 205 may invite a client computer 215 to join its Internet application service by sending or forwarding, via the Internet user communications helper program 219, the IP address of its host computer cloud instance 205-C to the client computer 215, after its host computer cloud instance 205-C is started, as described below.

In additional embodiment of the present invention using the Internet user communications helper program 219, the direct network connections using cloud instance illustrated in FIGS. 20A to 20D, and the accompanying methods described herein are adapted as illustrated in FIGS. 65A, 65B, 65E, 65F, 65C, and 65D.

In one embodiment illustrated in FIG. 65A, the host computer 205 uses an Internet user communications helper program 219 to communicate with a client computer 215*n*. Steps 505 to 525 in FIG. 65C remain essentially unchanged from those in FIG. 20C. Steps 530, 535 are edited in the flowchart in FIG. 65C (adapted from FIG. 20C) wherein the server 222A sends (step 530 in FIG. 65C) the IP address of host computer cloud instance 205-C to host computer 205; and the host computer 205 invites the client computer 215*n* to join its Internet application service by sending (step 535 in FIG. 65C), via the Internet user communications helper program 219, the IP address (and/or, as described below in an example, the uniform resource locator (URL) of the host helper program 216-1) of host computer cloud instance 205-C to the client computer 215*n*; and the IP address of the host computer cloud instance 205-C enables the client computer 215*n*, using the client helper program 216-2, to directly exchange data with the host computer cloud instance 205-C, using direct connections 240, 245 and without passing through the server 222A and the host computer 205 is not needed for the data exchange. If needed, the host computer 205 would have sent 6572 (in FIG. 65D) download URL of the client helper program 216-2, via the Internet user communications helper program 219, to the client computer 215*n* for the latter to download the client helper program 216-2 and use the IP address of the host computer cloud instance 205-C (to connect to its host helper program 216-1) to join the Internet application service of host computer cloud instance 205-C.

The Internet user communications helper program 219 may include any conventional instant messenger application, email application, online social networking service application, website live-chat application, or any Internet communications program that can send the IP address of host computer cloud instance 205-C to the client computer 215 to join the Internet application service. Examples of Internet user communications helper program 219 include instant messenger application such as Skype from Microsoft Corporation, email application such as Hotmail from Microsoft Corporation, online social networking service application such as Facebook from Facebook, Inc., or website live-chat application such as Zopim or Zendesk Chat from Zendesk Singapore Pte. Ltd.

Typically, the client helper program 216-2 has much lower hardware and bandwidth requirements compared to the hardware and bandwidth requirements for the host helper program 216-1. Thus, as illustrated in FIG. 65E, in a further embodiment, the host computer 205 may use the client helper program 216-2 (with host-role), allowing the host computer 205 to remain a host while not needing to meet the high hardware and bandwidth requirements for some host helper program 216-1.

In accordance with additional embodiment of the present invention using the Internet user communications helper program 219, the event diagram in FIG. 20D (illustrating a process for providing direct network connections using cloud instance) is adapted as illustrated in FIG. 65D.

Referring to FIG. 65D, after host computer 205 logs in steps 6525 to 6550 at the server 222A, the host computer 205 requests 6555 the server 222A to start a new Internet application service. The server 222A requests a computing cloud 198 (not shown) to launch-or-assign a host computer cloud instance 205-C; and the host computer cloud instance 205-C sends 6565 its IP address to the server 222A. The server 222A receives 525 and does not store 525 in FIG. 65C (but may store later, not shown) the IP address of the host computer cloud instance 205-C, and then sends 6567 the IP address of the host computer cloud instance 205-C to the host computer 205.

The host computer 205 can use an Internet user communications helper program 219 to communicate with a client computer 215; and the host computer 205 invites the client computer 215 to join its Internet application by sending 6570, via the Internet user communications helper program 219, the IP address (and/or, as described below in an example, the uniform resource locator (URL) of the host helper program 216-1) of host computer cloud instance 205-C to the client computer 215, which then send 6575 the latter's client computer IP address to the host computer cloud instance 205-C. Using the client helper program 216-2 (and the IP address of host computer cloud instance 205-C), the client computer 215 then directly exchange data 6580 with the host computer cloud instance 205-C (running the host helper program 216-1), using direct connections 240, 245 and without passing through the server 222A. The host computer 205 is not needed in the data exchange 6580.

Please note: data exchange 6580 (in FIG. 65D) and FIGS. 65B, 65F illustrate that after the Internet application service is started 518 (in FIG. 65C), and after the server 222A receives 525 and does not store 525 in FIG. 65C (but may store later, not shown) the IP address of the host computer cloud instance 205-C, the host computer 205 is not needed to be communicatively linked 240 with the host computer cloud instance 205-C or linked 225 with the server 222A respectively (for the client computer 215 to use the Internet application service of the host computer cloud instance 205-C). Please further note: communication links 225, 240 appear in FIGS. 65A. 65E, and do not appear in FIGS. 65B, 65F.

Thus, in accordance with an embodiment of the present invention, FIGS. 65A, 65B, 65E, 65F, 65C, and 65D above illustrate creating direct network connections for Internet application service between the client computer 215*n* and the host computer cloud instance 205-C via the Internet (including how to launch-or-assign the host computer cloud instance 205-C).

As an example and referencing FIG. 65D, the host computer 205 can run Moodle learning management system Internet application described above (as the host computer helper program 216-1), and uses Microsoft's Skype (as the Internet user communications helper program 219) to communicate with a client computer 215*n*. The host computer 205 uses a Microsoft Skype instant message to invite the client computer 215*n* to join its Moodle Internet application, and sends 6570 the IP address (and/or the uniform resource locator (URL) of the host helper program 216-1) of the host computer cloud instance 205-C to the client computer 215*n*. Please note that Internet user communications helper program 219 such as Microsoft's Skype typically uses URL (uniform resource locator) instead of IP address in its user-messages, since for a user, URL (such as http://www.MyExample.com) is more user-friendly than an IP address (such as http://101.102.103.104).

The client computer 215*n* uses the above URL (of the host helper program 216-1 of the host computer cloud instance 205-C, in the Skype instant message received from the host computer 205) to join the Internet application service of the host computer cloud instance 205-C, and also the client computer 215*n* sends 6575 its IP address to the host computer cloud instance 205-C. Using an Internet browser such as Firefox (as the client helper program 216-2 for Moodle) and the IP address of the host computer cloud instance 205-C, the client computer 215 then directly exchange data 6580 with the host computer cloud instance 205-C (running Moodle Internet application as the host helper program 216-1), using direct connection 245 and without passing through the server 222A. The host computer 205 is not needed for the data exchange 6580.

If needed, the host computer 205 would have sent 6572 download URL information of the client helper program 216-2, via the Internet user communications helper program 219, to the client computer 215 for the latter to download the client helper program 216-2 and to use the IP address of the host computer cloud instance 205-C (to connect to the latter's host helper program 216-1) to join the Internet application service of host computer cloud instance 205-C. If the client computer 215 can use the web browser 218 in FIG. 2B as the client helper program 216-2, e.g. in Moodle learning management system Internet application, the host computer 205 would not need to send 6572 download URL of the client helper program 216-2, to the client computer 215.

Virtual Machines Considerations for Internet Application Services

A virtual machine (VM) is an emulation of a computer system. A virtual machine (VM) is an operating system OS or application environment that is installed on software which imitates dedicated hardware. The end user has the same experience using a virtual machine as they would have using dedicated hardware.

Specialized software can create virtual machines to emulate the PC host/client or server's CPU, memory, hard disk, network and other hardware resources completely, enabling the virtual machines to share the resources. Virtualization saves costs by reducing the need for physical hardware systems, and can improve system reliability when virtualization is used for hardware systems connected in a network. Virtual machines more efficiently use hardware, which lowers the quantities of hardware and associated maintenance costs, and reduces power and cooling demand.

Examples of popular specialized software for virtual machines include VMWare products from VMWare, Inc. For example, VMWare products such as VMWare player or workstation can create virtual machines to emulate completely the computing device 201 illustrated in FIG. 2B, the server 222 illustrated in FIG. 2G. As another example, if the host helper program 216-1 is Moodle learning management system (running on Linux-Apache-MySQL-PHP solution stack) Internet application from the Australian company Moodle Pty Ltd., VMWare products can create virtual machines to emulate the host helper program 216-1 (Moodle learning management system) hardware requirements:

Ubuntu 14.04 64-bit server (operating system)
4 GB of memory (8 GB is better) with swap enabled
Dual-core 2.8 GHz CPU (or faster)
80 GB of free disk space (or more) SCSI drive.
100 Mbits/sec bandwidth (symmetrical)

Virtual machines can be exported to and saved in computing clouds. A computing cloud can later launch (in step 518 in FIGS. 40B and 65C, and step 4919 in FIG. 32 and step 919 in FIG. 40C) the saved virtual machines to run copies (of the saved virtual machines) as cloud instances for use by users. For example, VMWare virtual machines can be exported to (via Internet, and saved in special format in) Amazon's EC2 computing cloud, to later launch copies (of the saved virtual machines) and run as cloud instances (of the saved virtual machines in special format) at the users' request. As another example, if the host helper program 216-1 is Moodle learning management system. VMWare virtual machines emulating its above hardware requirements can be exported to (via Internet, and saved in special format in) Amazon's EC2 computing cloud; an Amazon EC2 computing cloud then launches (in step 518 in FIGS. 40B and 65C, and step 4919 in FIG. 32 and step 919 in FIG. 40C) a cloud instance of (a copy of) the above saved virtual machine (for the Moodle learning management system (running on Linux-Apache-MySQL-PHP solution stack) Internet application) to start the new Internet application service for the user.

Server and Cloud Instances for Internet Application Services

It is noted that cloud instances can be used to implement (in software) the server 222A and/or website 212A in accordance with another embodiment of the present invention. FIGS. 49A and 49B are block diagrams similar to FIGS. 65A and 65E, but server cloud instance 222A-C and/or website cloud instance 212A-C are used instead of server 222A and/or website 212A (e.g. in FIG. 65E), respectively.

The server cloud instance 222A-C and website cloud instance 212A-C (in FIGS. 49A and 49B) have advantages compared to the server 222A and the website 212A (e.g. in FIG. 65E), respectively: and these advantages are similar to those advantages for the host computer cloud instance 205-C compared to the host computer 205 described above.

For example, the bandwidth and computing resources available at the server 222A and the website 212A (e.g. in FIG. 65E) cannot easily change, when large numbers (e.g. hundred thousand(s)) of the host computers 205 and the client computers 215 attempt to set-up Internet application service, which will significantly and adversely affect the performance of the server and website services provided by the server 222A and the website 212A, because large numbers of the host client computers 205 and the client computers 215 now have to share the limited bandwidth and computing resources available at the server 222A and the website 212A. The server cloud instance 222A-C and the website cloud instance 212A-C in FIGS. 49A and 49B can dynamically or pre-arrange to have almost any bandwidth and hardware quantity (implemented in software) to support large numbers of the host computers 205 and the client computers 215, using methods (not shown) analogous to that for the host computer cloud instance 205-C detailed in FIGS. 39A, 40A, 40B to 40G, 41A, and 41B to 41C.

It is noted that cloud instances (not shown) can be used to implement (in software) the host computer 205 and/or client computer 215*n* in accordance with another embodiment of the present invention. The cloud instance advantages compared to using hardware for the host computer 205 and/or using hardware for the client computer 215*n* are similar to those advantages for the host computer cloud instance 205-C compared to the host computer 205 described above (e.g. advantages for virtual machines compared to hardware in Para [0334]).

Host Computer and Client Computer Connection Information, and their Storage in Server It is also noted although the disclosure herein makes references in some embodiments to receiving the connection information, e.g. IP address, of the host computer cloud instance 205-C in the server 222A, an embodiment of the current invention may store or not store the connection information of (i) the host computer 205, and/or (ii) host computer cloud instance 205-C, and/or (iii) URL forward to host computer cloud instance 205-C, and/or (iv) client computer 215, and/or (v) URL forward to client computer 215 in the server 222A.

FIG. 50 is similar to FIG. 22, and illustrates how an embodiment of the current invention (e.g. illustrated in FIGS. 24A, 25A, 25C, 42A, etc.) may implement the following twelve (12) cases: Case A to Case L of:

(i). how the IP address and/or URL of the host computer 205 and the client computer 215, and (ii) how the IP address and/or URL of the host computer cloud instance 205-C and the client computer 215, and (iii) (illustrated in FIGS. 80A and 80B below) how the IP address and/or URL to forward to "IP-address-and/or-URL" of the host computer cloud instance 205-C and the client computer 215, are or are not stored in the server 222A:

In Case A in FIG. 50, the connection information (i.e. IP address and/or URL) of both the host computer 205 and the client computer 215 are not stored in the server 222A.

In Case E in FIG. 50, the connection information (i.e. IP address and/or URL) of both the host computer cloud instance 205-C and the client computer 215 are not stored in the server 222A.

In Case I in FIG. 50, the connection information (i.e. IP address and/or URL) to forward to "IP-address-and/or-URL" of both the host computer cloud instance 205-C and the client computer 215 (illustrated in FIGS. 80A and 80B below) are not stored in the server 222A.

In Case B, the connection information of the host computer 205 is not stored in the server 222A, and the connection information of the client computer 215 is stored in the server 222A.

In Case F, the connection information of the host computer cloud instance 205-C is not stored in the server 222A, and the connection information of the client computer 215 is stored in the server 222A.

In Case J in FIG. 50, (i) the connection information (i.e. IP address and/or URL) to forward to "IP-address-and/or-URL" of the host computer cloud instance 205-C is not stored in the server 222A, and (ii) the connection information (i.e. IP address and/or URL) to forward to "IP-address-and/or-URL" of the client computer 215 (illustrated in FIGS. 80A and 80B below) is stored in the server 222A.

In Case C, the connection information of the host computer 205 is stored in the server 222A, and the connection information of the client computer 215 is not stored in the server 222A.

In Case G, the connection information of the host computer cloud instance 205A is stored in the server 222A, and the connection information of the client computer 215 is not stored in the server 222A.

In Case K in FIG. 50, (i) the connection information (i.e. IP address and/or URL) to forward to "IP-address-and/or-URL" of the host computer cloud instance 205-C is stored in the server 222A, and (ii) the connection information (i.e. IP address and/or URL) to forward to "IP-address-and/or-URL" of the client computer 215 (illustrated in FIGS. 80A and 80B below) is not stored in the server 222A.

In Case D, the connection information of both the host computer 205 and the client computer 215 are stored in the server 222A.

In Case H, the connection information of both the host computer cloud instance 205-C and the client computer 215 are stored in the server 222A.

In Case I in FIG. 50, the connection information (i.e. IP address and/or URL) to forward to "IP-address-and/or-URL" of both the host computer cloud instance 205-C and the client computer 215 (illustrated in FIGS. 80A and 80B below) are stored in the server 222A.

It is noted that in above Case A, Case E, and Case I in FIG. 50, by not storing any-and-all of the connection information (i.e. IP address and/or URL) of (i) the host computer 205, and/or of (ii) the client computer 215, and/or of (iii) the host computer cloud instance 205-C. and/or of (iv) IP address and/or URL to forward to "IP-address-and/or-URL" of the host computer cloud instance 205-C, and/or of (v) IP address and/or URL to forward to "IP-address-and/or-URL" of the client computer 215, in the server 222A, reduce privacy concerns and reduce risk of the host computer 205 and the client computer 215, etc. to Internet hacker attacks and security breaches. In addition, this beneficially reduces the computing requirements of the server 222A, particularly as additional host and client computers 205, 215 respectively utilize the Internet application services offered by the server 222A, as described in detail below.

In a conventional three-tier architecture such as that depicted FIG. 11A, the server 120 obtains and stores both the IP address of the host computer 205 and the IP address of the client computer 215, etc. However, as described above in Case A, Case E, and Case I in FIG. 50, the server 222A does not store any of the connection information (i.e. IP address and/or URL) of Internet resources of:

(i) the host computer 205, (ii) the client computer 215, (iii) the host computer cloud instance 205-C, (iv) IP address and/or URL to forward to "IP-address-and/or-URL" of the host computer cloud instance 205-C, and (v) IP address and/or URL to forward to "IP-address-and/or-URL" of the client computer 215.

This beneficially reduces the computing requirements of the server 222A, particularly as additional host and client computers 205, 215 respectively utilize the Internet application services offered by the server 222A. As an illustrative example for Case A, it may be assumed that each host computer 205 has Internet application service with ten-thousand client computers 215. If there are one-thousand host computers 205 utilizing the server 222A, the server 222A receives but not store any of one-thousand connection information (IP address and/or URL, one per host computer cloud instance 205-C). However, in a conventional three-tier architecture such as that depicted in FIG. 1A, a server 120 would need to store ten-million and one thousand connection information (i.e. IP address and/or URL, for each host computer 205: one for the host computer 205 plus ten thousands for the ten thousands client computers 215). Other sic (6) Cases B, C, E, F, G, I, J, K in FIG. 50 have similar storage reduction (possibly in less amounts) advantages as that for the Case A in above example. Other computing resource requirements for the nine (9) Cases A. B, C, and E, F, G, and I, J. K may scale similarly to the above example, thereby making direct network connections using cloud instance in accordance with the present invention well suited to accommodating large numbers of host computers 205 and client computers 215.

Similarly in above nine Cases A, B, C, and E, F. G, and I. J, K in FIG. 50, by not storing one or more of the connection information (i.e. IP address and/or URL of Internet resources listed in Para [0347] (i) to (v) above) in the server 222A, reduces privacy concerns and reduces risk of these Internet resources listed in Para [0347] (i) to (v) above to Internet hacker attacks and security breaches.

In above Cases D, H, L in FIG. 50, by storing all of the available connection information (i.e. IP address and/or URL of Internet resources listed in Para [0347] (i) to (v) above) in the server 222A, these three (3) Cases D, H, L do not reduce privacy concerns and do not reduce risk of them to Internet hacker attacks and security breaches. In addition, these three (3) Cases D, H, L do not reduce the computing requirements of the server 222A (compared to conventional three-tier architecture such as that depicted FIG. 11A).

Above twelve Cases A, B, C, D, . . . to L (of how the connection information. i.e. IP address and/or URL of Internet resources listed in Para [0347] (i) to (v) above, are or are not stored in the server 222A) can be used in embodiments of the current invention (e.g. from FIGS. 24A, 25A, 25C, 42A, etc.) to provide direct network connections using cloud instance for Internet application service over a computer network.

Unique Sub-Domain Address as Alias for Cloud Instance URL

When a computing cloud launches a new cloud instance, the computing cloud assigns a cloud instance URL or an I.P. address to the cloud instance so that a user may access the cloud instance. However these URLs or I.P. addresses are not user-friendly. A user may create a CNAME record (Canonical Name record) in DNS (Domain Name System) to redirect a user-friendly and unique sub-domain address to the cloud instance URL or I.P. address. A CNAME record specifies that a domain name (e.g. a unique sub-domain address) is an alias for another domain (e.g. a cloud instance URL) or I.P. address.

In this way, a host computer 205 may specify a user-friendly and unique sub-domain address to point transparently to the host computer cloud instance 205-C, i.e. setting up a sub domain address to point transparently to the URL of the host computer cloud instance 205-C, so it isn't simply a redirection, and so that the host computer 205 may use the user-friendly and unique sub-domain address to communicate 240 with its host computer cloud instance 205-C. Examples of sub-domain addresses are illustrated in column B of FIG. 51A and Para [0354] to [0357] below.

For a multi instance cloud and/or a multi tenancy cloud, as explained above in some embodiments of the current invention, the multi instance cloud 205-C and/or multi tenancy cloud 205-C2 (not shown) may need to distinguish between multiple host computer cloud instances 205*a*-C, 205*b*-C, . . . 205*n*-C in FIG. 14 above to ensure that data is transmitted only to one or more proper destinations. For example, the popular cloud computing offering, Amazon EC2, provides an external and internal IP address for its cloud instances, so Amazon EC2 may need to distinguish between multiple host computer cloud instances or tenants 205*a*-C, 205*b*-C, . . . , 205*n*-C in FIG. 42A or FIG. 42B respectively to ensure that data is transmitted only to one or more proper destinations. The latter data is ensured to transmit only to one or more proper destinations, in some embodiments of the current invention, by having the server 222A assign 6070 (in FIGS. 43A, 43B, 43C above) and send a unique meeting ID to the host computer 205*n* and/or host computer cloud instance 205*n*-C, and following the accompanying methods described above in steps 6070 to 6090 in FIGS. 43A, 43B, 43C.

Now referring to FIG. 51A and FIG. 51B, the five examples of cases I to V illustrate the use of five unique user-friendly sub-domain addresses as aliases for the URLs of the five different host computer cloud instances 205-C (hosted by the popular Amazon computing cloud):

- As examples in cases I to V in FIGS. 51A and 51B, the sub-domain addresses are user-friendly, unique, and do not change over time.
- As an example in case I, the sub-domain address "test.moodlecloud.com" is user-friendly, unique, and unchanging alias for the I.P. address: "54.201.157.224" and the URL: "us-moodlecloud-100165812.us-west-2.elb.amazonaws.com" of a host computer cloud instance 205-C (not shown, and for illustration, using non-Amazon-provided unique ID example: Ia1B2c3)
- As another example in case II, the sub-domain address "test1.moodlecloud.com" is user-friendly, unique, and unchanging alias for the I.P. address: "52.64.64.171" and the URL: "au-moodlecloud-1086023927.ap-southeast-2.elb.amazonaws.com" of another host computer cloud instance 205-C (not shown, and using non-Amazon-provided unique ID example: IIX0y9z)
- As examples in cases I to V, the connection information (i.e. IP address and/or URL) of the host computer cloud instances 205-C (not shown) are not user-friendly, not unique, and may change over time, as the computing cloud operation requirements can require their changes over time, as underlying physical hardware and network change over time.
- For example in cases IV and V, the two I.P. addresses were the same (in early September, 2015): 54.68.74.224. For example in case II, the I.P. address changed from "52.64.64.171" in early September 2015 to a different I.P. address: "54.252.168.98" by mid-September 2015. For example in cases I, III, IV, and V, Amazon uses the same URL: "us-moodlecloud-100165812.us-west-2.elb.amazonaws.com" which URL is thus not unique.
- As examples in cases I to V, the non-Amazon-provided unique IDs when used with the I.P. addresses and/or the URLs would allow Amazon to distinguish between cases I to V; and using unique IDs allow a computing cloud to distinguish between multiple host computer cloud instances 205a-C, 205b-C, . . . , 205n-C in FIG. 14 to ensure that data is transmitted only to one or more proper destinations.

Above examples of cases I to V (of using sub-domain address as alias for the connection information, i.e. IP address and/or URL, of the host computer cloud instance 205-C, and/or using unique ID for the connection information of the host computer 205 and of the host computer cloud instance 205-C) can be adapted and used in an embodiment of the current invention (e.g. from FIGS. 24A, 25A, 25C, 42A, etc.) to provide direct network connections using cloud instance for Internet application service over a computer network.

Figure 52A:
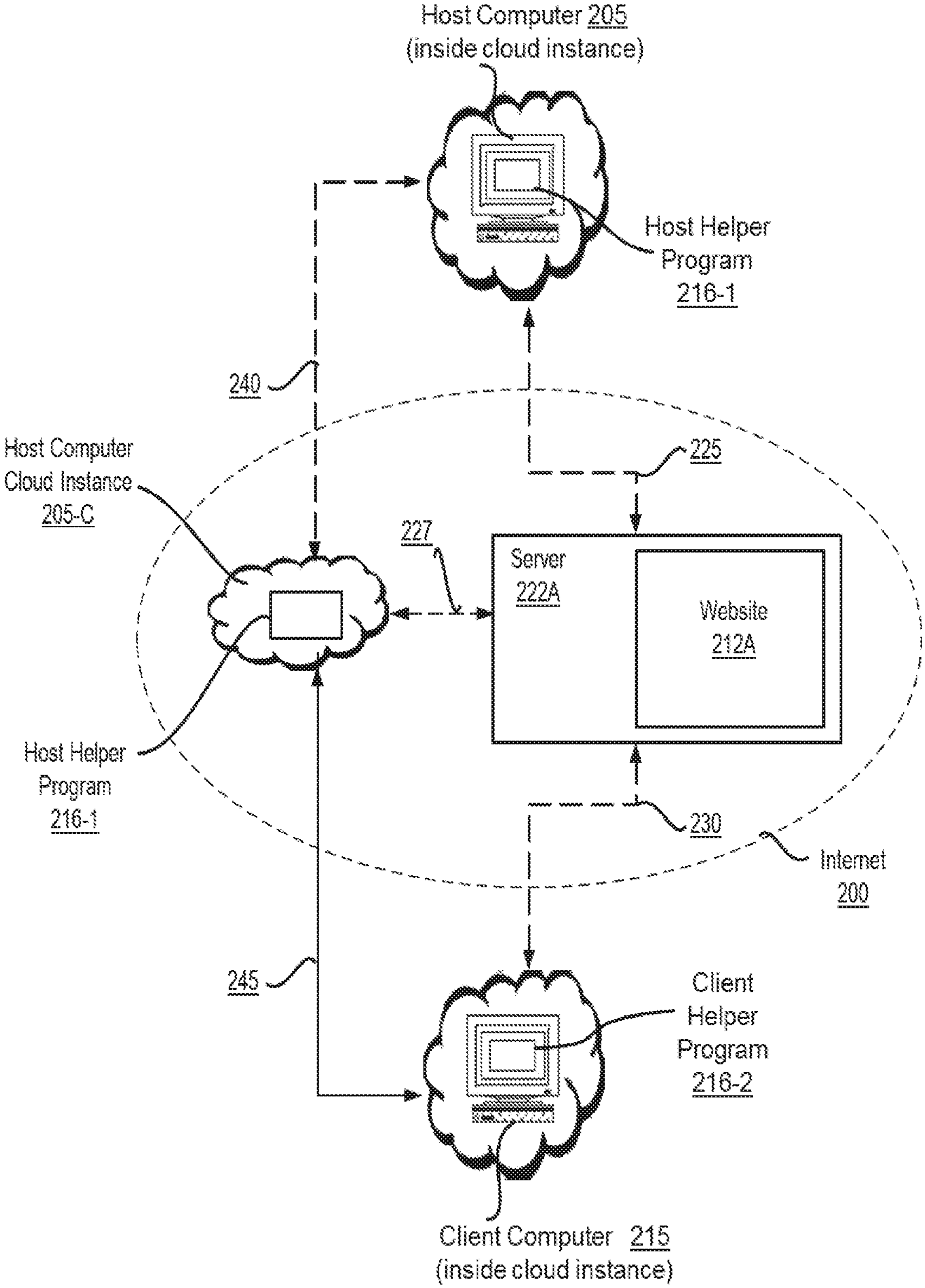
FIGS. 52A, 52B are block diagrams illustrating providing direct network connections using cloud instance for Internet application service over a computer network in accordance with another embodiment of the present invention.
Figure 52B:
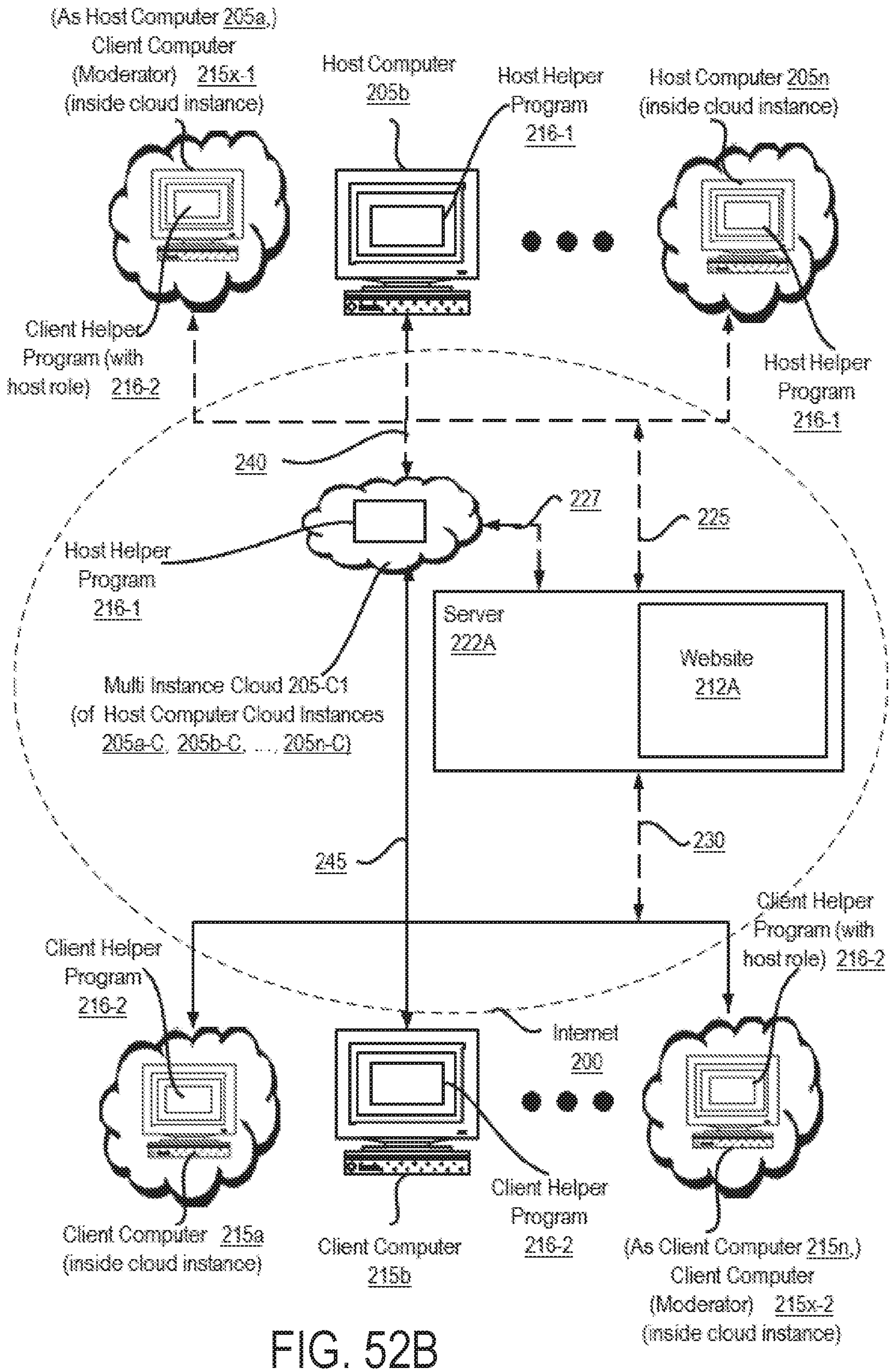

FIGS. 52A and 52B are adapted from FIGS. 2A and 14 respectively, and illustrate that the host computer 205 and/or the client computer 215 may be cloud instances (i.e. software implemented in hardware), in accordance with an embodiment of the current invention, providing direct network connections using cloud instance for Internet application service over a computer network. For example, (in place of the host computer 205a,) the client computer (moderator) 215x-1 (running the client helper program (with host role) 216-2 in FIG. 52B) is adapted from client computer (moderator) 215x (from FIG. 59A) to be inside a cloud instance (e.g. illustrated in FIG. 2F). As another example, (in place of the client computer 215n,) the client computer (moderator) 215x-2 (running the client helper program (with host role) 216-2 in FIG. 52B) is adapted from the client computer (student) 215n (from FIG. 59B) to be inside a cloud instance (e.g. illustrated in FIG. 2F), and illustrates that:

- this invention can be used to implement three-tier architecture (in FIG. 11A) such as multipoint meeting, e.g. BigBlueButton, as the two-tier architecture (in FIG. 59B) of Internet cloud application service, by using the client computer (moderator) 215x-2 (running the client helper program (with host role) 216-2, and (the client computer (moderator) 215x-2) replacing or substituting for the client computer 215n) illustrated in FIG. 52B.
- In addition, if the client helper program (with host role) 216-2 in Para [0362A] can be run together (i.e. side-by-side) with the host helper program 216-1, then a host computer cloud instance 205-C (e.g. 205a-C in FIG. 52B) may run BOTH the host helper program 216-1 and the client helper program (with host role) 216-2 to implement the three-tier architecture (in FIG. 11A) as the two-tier architecture (illustrated in FIG. 59B) of Internet cloud application service, in accordance with an embodiment of the current invention, providing direct network connections using cloud instance for Internet application service over a computer network.
- Using BigBlueButton multipoint meeting as an illustrative example for Para [0362B], the client helper program (with host role) 216-2 for BigBlueButton is the web browser 218 (in FIG. 2F) such as Internet Explorer, which (web browser 218 in FIG. 2F) can be run together (i.e. side-by-side) with the BigBlueButton host helper program 216-1 in a host computer cloud instance 205-C (e.g. 205n-C in FIGS. 52B and/or 59B). Hence using BigBlueButton multipoint meeting as an illustrative example, this invention can be used to implement three-tier architecture (in FIG. 11A) such as multipoint meeting, e.g. BigBlueButton, as the two-tier architecture (illustrated in FIG. 59B) of Internet cloud application service, in accordance with an embodiment of the current invention, providing direct network connections using cloud instance for Internet application service over a computer network.

Figure 53A:
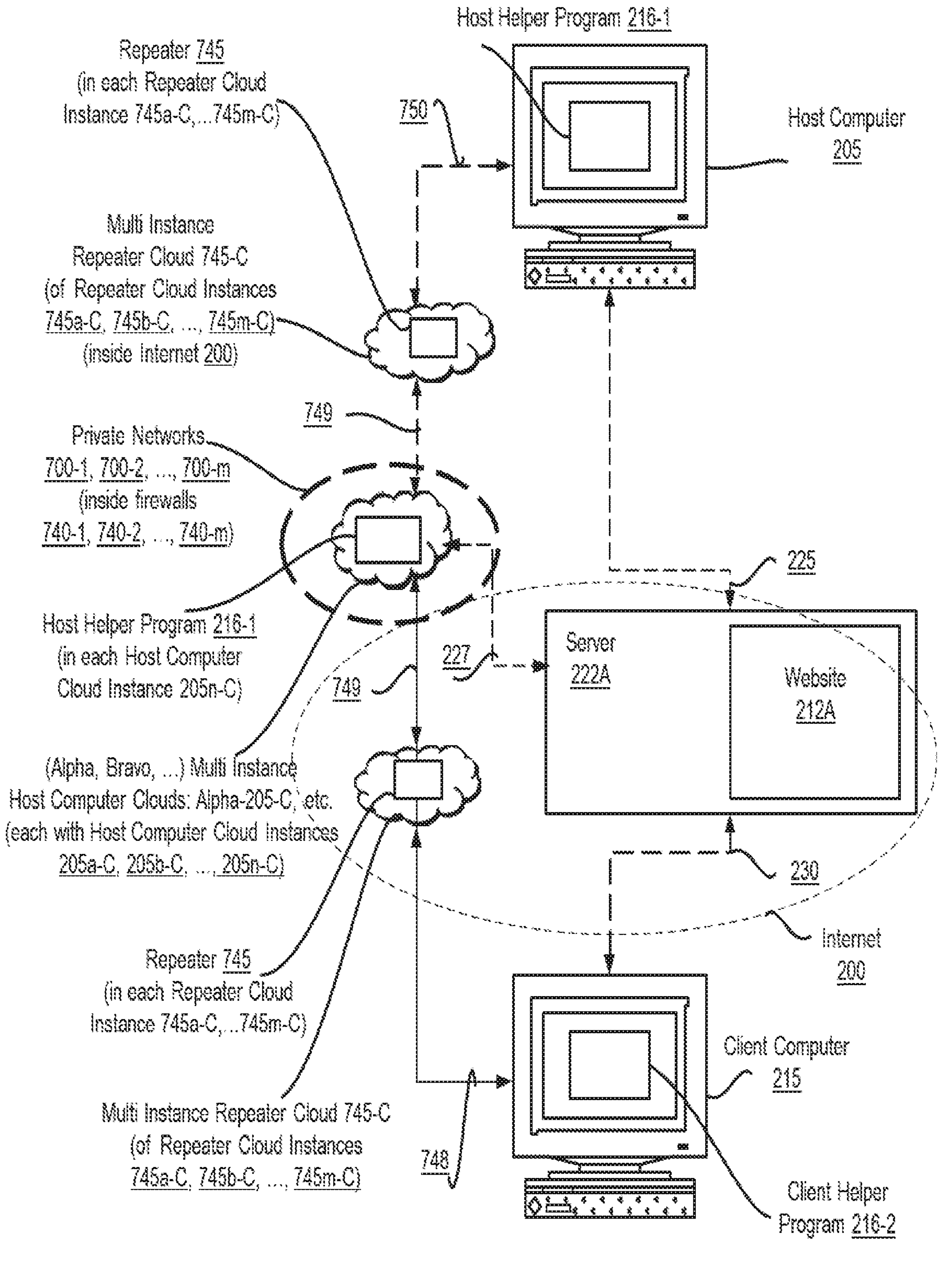

FIG. 53A is adapted from FIG. 34A and illustrates a direct network connection using host computer cloud instance 205n-C (in a private network 700-n) for Internet application service between a client computer 215 and a host computer 205, in accordance with one embodiment of the present invention. FIG. 53A is further described in FIGS. 54A, 54B, and 89 below.

Note that the computer cloud provider (not shown) uses more-than-one or multiple computing clouds (e.g. Alpha-205-C, Bravo-205-C, Charlie-205-C, Delta-205-C, . . . , Mike-205-C) in FIGS. 53A, 53B and FIG. 54A, 54B.

FIGS. 54A, 54B, 89 are tables illustrating examples of multi-instance repeater cloud, repeater cloud instance, multi-instance host computer cloud, host computer cloud instance, sub-domain address, and unique ID (or meeting ID, assigned by server 222A or cloud-provider (not shown)) for a computing-cloud-provider.

Note that the computer cloud provider (not shown) uses more-than-one or multiple computing clouds (e.g. Alpha-205-C, Bravo-205-C, Charlie-205-C, Delta-205-C, . . . , Mike-205-C) in FIGS. 53A, 53B and FIG. 54A, 54B.

Figure 68A:
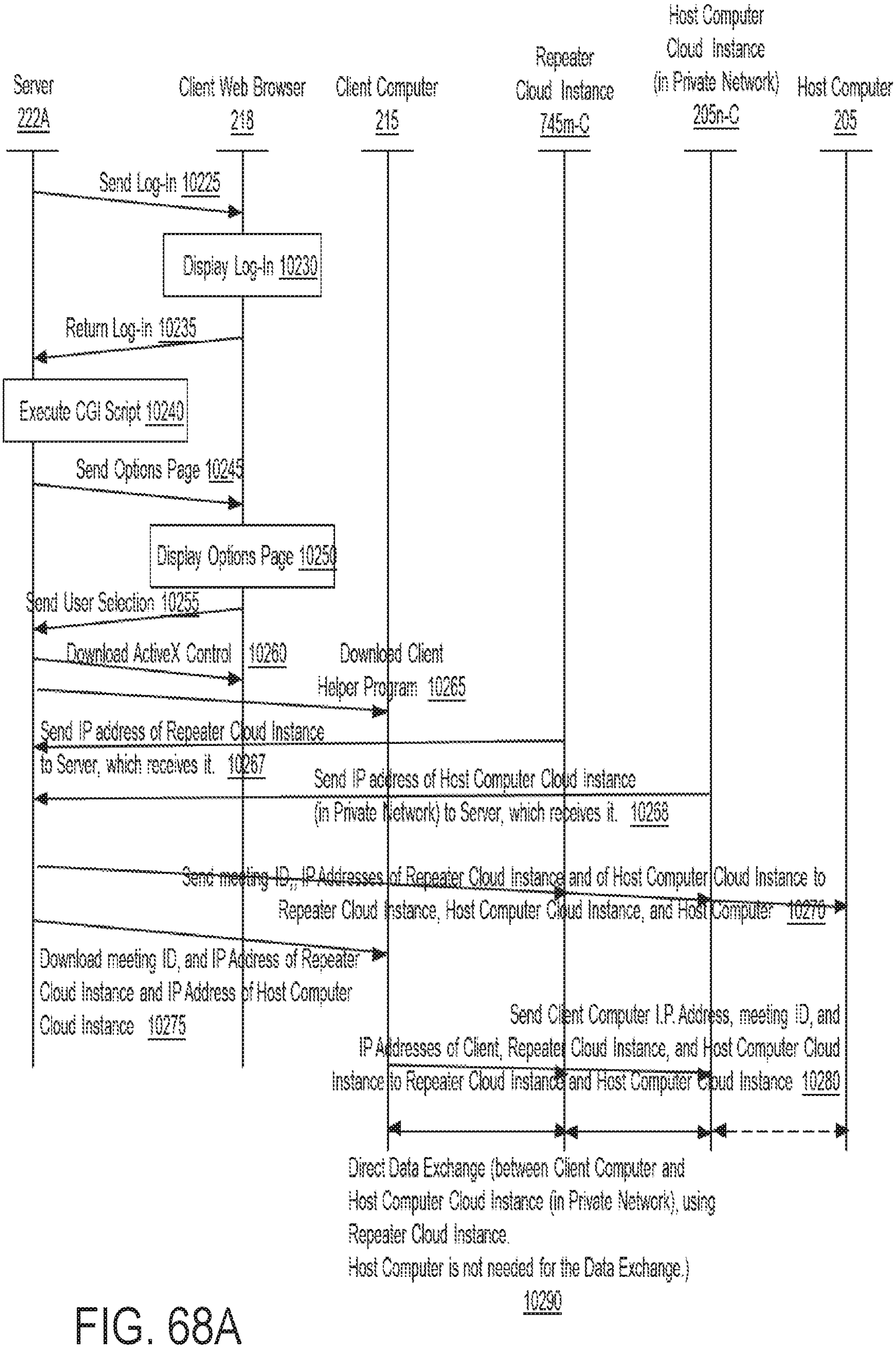
FIGS. 68A, 68B, 68C, 69, 70A, 70B, 70C are flowcharts illustrating providing direct network connections using cloud instance for Internet application service over a computer network in accordance with an embodiment of the present invention.
Figure 68B:
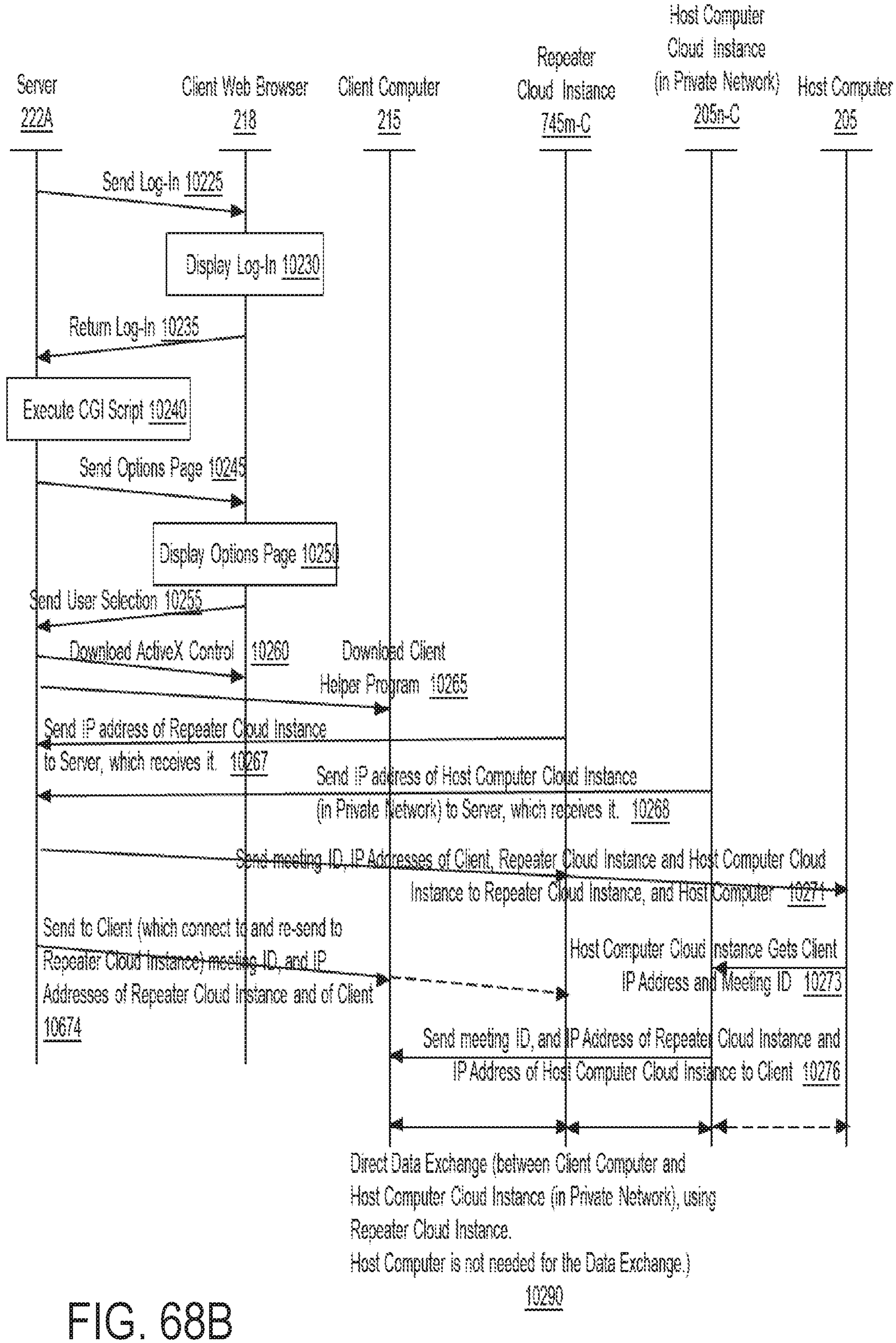

Now referring to FIGS. 51A and 51B, the five examples of cases I to V illustrate the use of five unique user-friendly sub-domain addresses as aliases for the URLs of the five different host computer cloud instances 205-C (hosted by the popular Amazon computing cloud):

- As examples in cases I to V in FIGS. 51A and 68B, the sub-domain addresses are user-friendly, unique, and do not change over time.
- As an example in case I, the sub-domain address “test.moodlecloud.com” is user-friendly, unique, and unchanging alias for the I.P. address: “54.201.157.224” and the URL: “us-moodlecloud-100165812.us-west-2.elb.amazonaws.com” of a host computer cloud instance 205-C (not shown, and for illustration, using non-Amazon-provided unique ID example: Ia1B2c3)
- As another example in case II, the sub-domain address “test1.moodlecloud.com” is user-friendly, unique, and unchanging alias for the I.P. address: “52.64.64.171” and the URL: “au-moodlecloud-1086023927.ap-southeast-2.elb.amazonaws.com” of another host computer cloud instance 205-C (not shown, and using non-Amazon-provided unique ID example: IIX0y9z)
- As examples in cases I to V, the connection information (i.e. IP address and/or URL) of the host computer cloud instances 205-C (not shown) are not user-friendly, not unique, and may change over time, as the computing cloud operation requirements can require their changes over time, as underlying physical hardware and network change over time.
- For example in cases IV and V, the two I.P. addresses were the same (in early September, 2015): 54.68.74.224. For example in case II, the I.P. address changed from “52.64.64.171” in early September 2015 to a different I.P. address: “54.252.168.98” by mid-September 2015. For example in cases I, III, IV, and V, Amazon uses the same URL: “us-moodlecloud-100165812.us-west-2.elb.amazonaws.com” which URL is thus not unique.
- As examples in cases I to V, the non-Amazon-provided unique IDs when used with the I.P. addresses and/or the URLs would allow Amazon to distinguish between cases I to V; and using unique IDs allow a computing cloud to distinguish between multiple host computer cloud instances 205*a*-C. 205*b*-C, . . . , 205*n*-C in FIG. 14 to ensure that data is transmitted only to one or more proper destinations.

Above examples of cases I to V (of using sub-domain address as alias for the connection information, i.e. IP address and/or URL, of the host computer cloud instance 205-C, and/or using unique ID for the connection information of the host computer 205 and of the host computer cloud instance 205-C) can be adapted and used in an embodiment of the current invention (e.g. from FIGS. 24A, 25A, 25C. 42A, etc.) to provide direct network connections using cloud instance for Internet application service over a computer network.

Figure 56A:
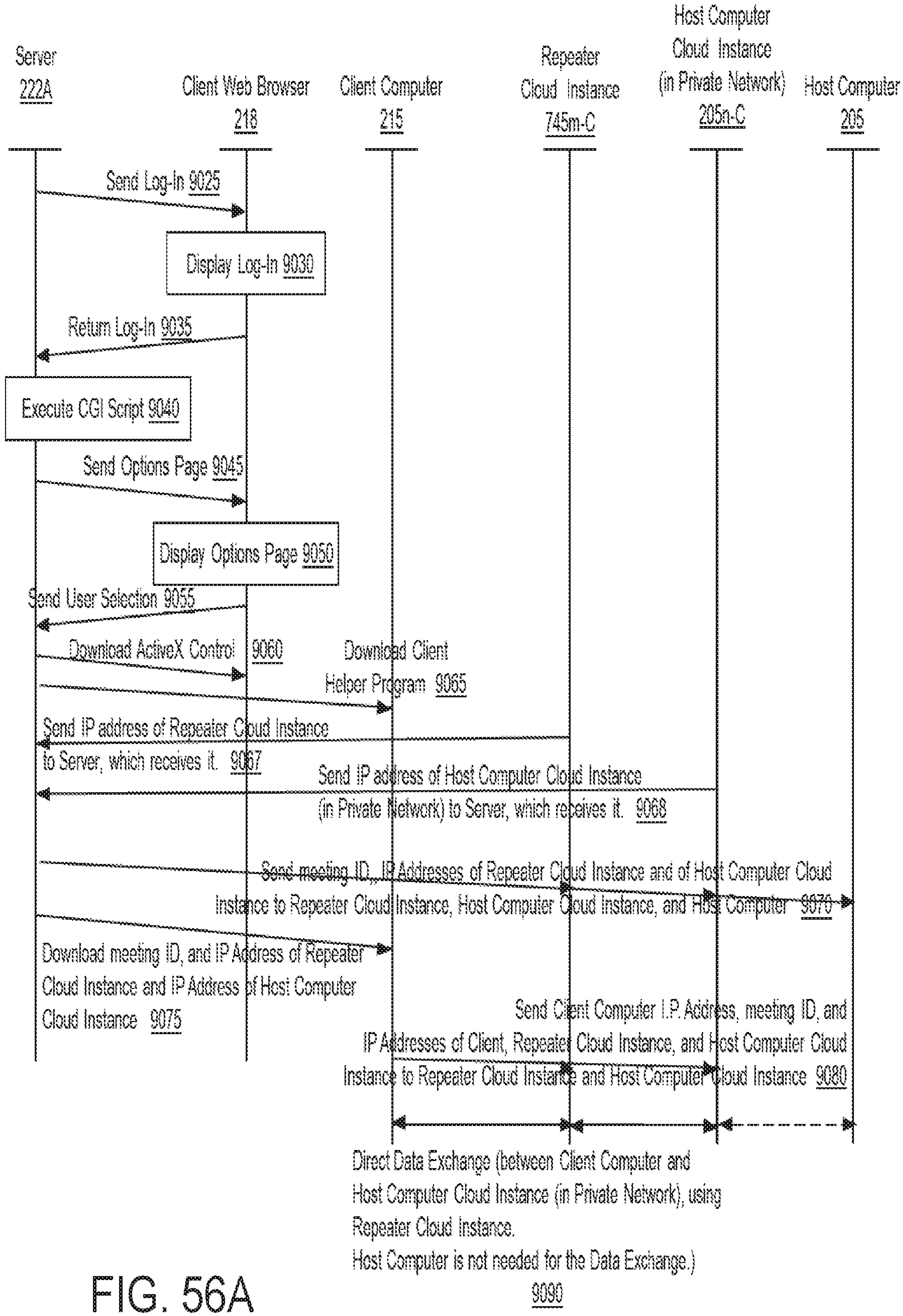
FIGS. 56A, 56B, 56C, 57, 58A, 58B, 58C are flowcharts illustrating providing direct network connections using cloud instance for Internet application service over a computer network in accordance with an embodiment of the present invention.

Referring now to FIG. 56A, a process is illustrated for providing a direct network connection using cloud instance (on a private network 700-*n*) for Internet application service between a client computer 215 and a host computer 205 in accordance with one embodiment of the present invention. The process illustrated in FIG. 56A is adapted from FIG. 35A. Specifically, the event diagram of FIG. 56A corresponds to a direct network connection using cloud instance (on a private network 700-*n*) for Internet application service with a host computer 205. When a host computer cloud instance 205-C is on a private network 700-*n*, a unique meeting ID is sent 9070 by the server 222A to the repeater cloud instance 745*m*-C, the host computer cloud instance 205*n*-C, and the host computer 205. The unique meeting ID is also downloaded 9075 from the server 222A by the client computer 215 along with the public IP address of the repeater cloud instance 745*m*-C and the private IP address of the host computer cloud instance 205*n*-C. Then, the IP address of the client computer 215 and the meeting ID are sent 9080 by the client computer 215 to the repeater cloud instance 745*m*-C and the host computer cloud instance 205*n*-C, which is communicatively coupled to the host computer 205. From this point onwards, data may be exchanged 9090 between the client computer 215 and the host computer cloud instance 205*n*-C (using the repeater cloud instance 745*m*-C) via the direct network connections 748, 749 (in FIG. 53A), and the host computer 205 is not needed for the data exchange 9090. As explained above, when client computer 215 sends data to the host computer cloud instance 205*n*-C, it may designate the data as corresponding to the particular meeting ID, allowing the repeater cloud instance 745*m*-C, using the look-up table described above, to transmit the data to the appropriate host computer cloud instance 205*n*-C.

It is noted that the IP address of the client computer 215 may be sent to the host computer 205 and/or the host computer cloud instance 205*n*-C using indirect connection 225, 230, or indirect connection 227, 230 (instead of using direct network connection 748, 749, 750 in FIG. 53A) in further embodiments of the current invention.

Figure 56B:
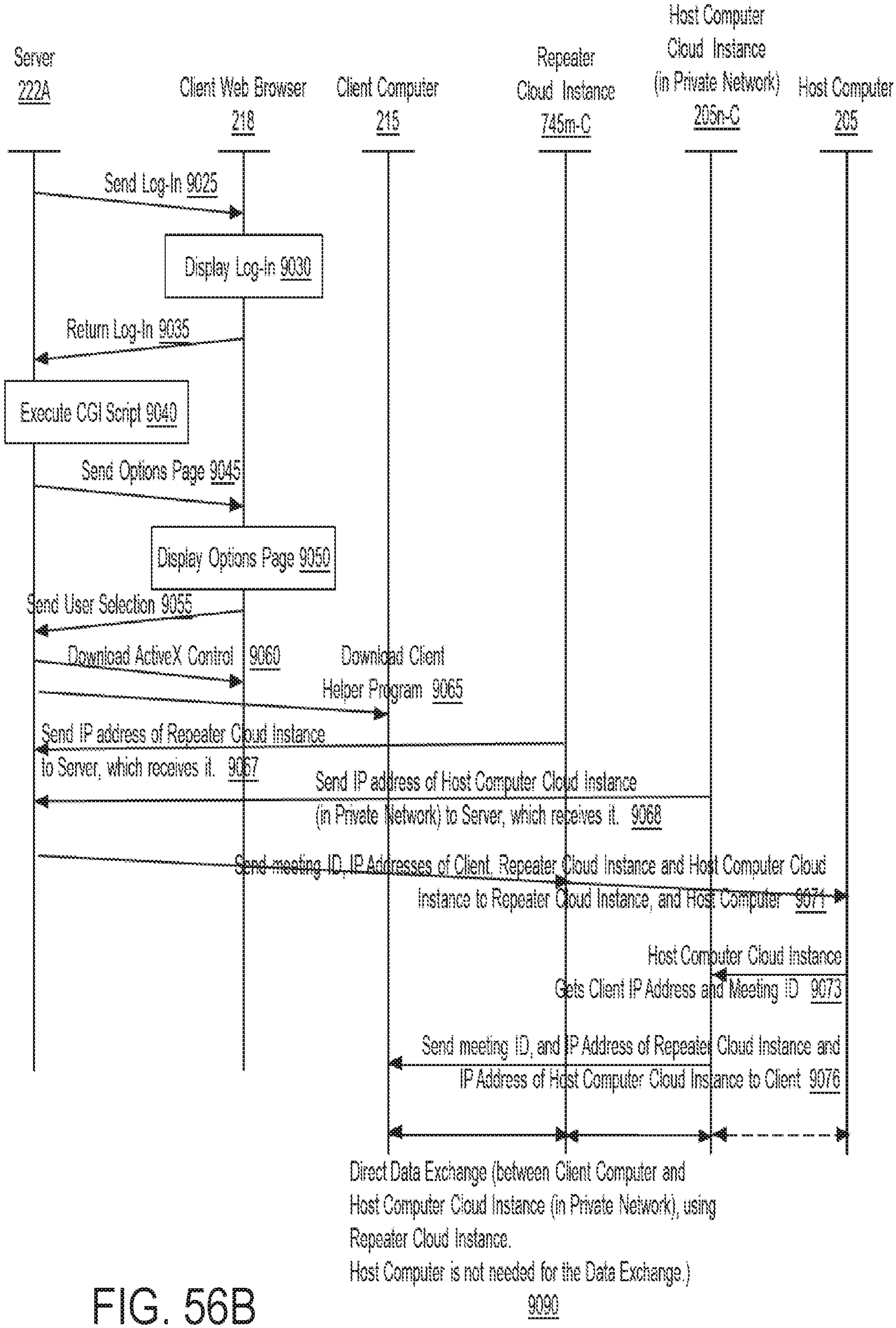

In an embodiment of the current invention illustrated in FIG. 56B, which FIG. 56B is similar to FIG. 56A, but in FIG. 56B the server 222A sends 9071 (using indirect connection 225, 230 in FIG. 53A) the IP address of the client computer 215 and meeting ID to the host computer 205, which is communicatively coupled to the host computer cloud instance 205*n*-C. The host computer cloud instance 205*n*-C therefore also gets 9073 the IP address of the client computer 215 and meeting ID. The host computer cloud instance 205*n*-C then (using repeater cloud instance 745*m*-C) sends 9076 its IP address and the meeting ID to client computer 215. Direct data exchange 9090 can then occur, using direct network connection 748, 749 in FIG. 53B, between client computer 215 and host computer cloud instance 205*n*-C (using the repeater cloud instance 745*m*-C), and without going through the server 222A. The host computer 205 (in FIG. 53B) is not needed for direct data exchange 9090 in FIG. 56B (which uses direct network connection 748, 749 in FIG. 53B).

Figure 56C:
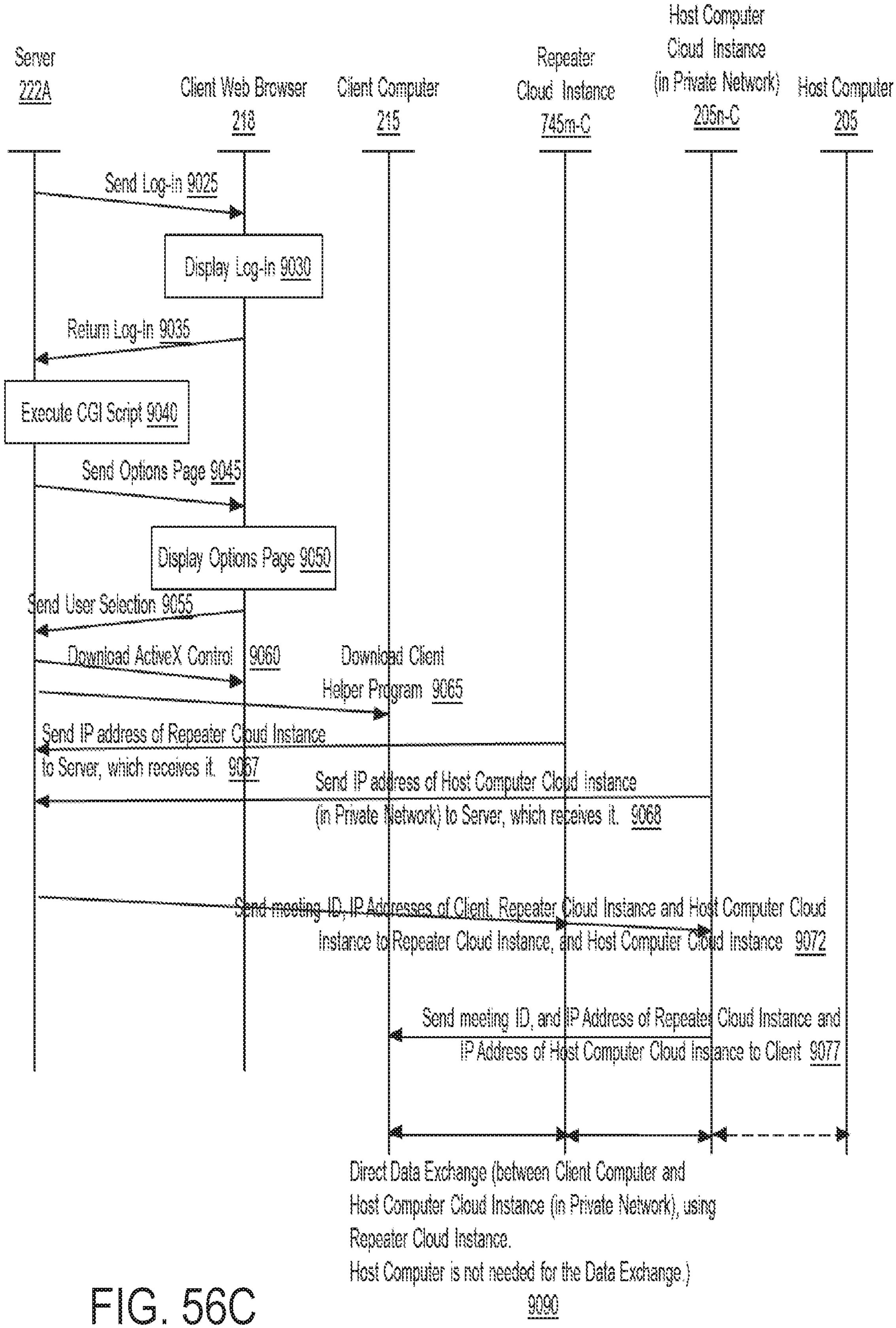

In another embodiment of the current invention illustrated in FIG. 56C, which FIG. 56C is similar to FIG. 56A, but in FIG. 56C the server 222A sends 9072 (using indirect connection 227, 230 in FIG. 53A) the IP address of the client computer 215 and meeting ID to the host computer cloud instance 205*n*-C, which is communicatively coupled to the host computer 205. The host computer cloud instance 205*n*-C then (using repeater cloud instance 745*m*-C) sends 9077 its IP address and the meeting ID to client computer 215. Direct data exchange 9090 can then occur using direct network connection 748, 749 in FIG. 53B, between client computer 215 and host computer cloud instance 205*n*-C (using the repeater cloud instance 745*m*-C), and without going through the server 222A. The host computer 205 (in FIG. 53B) is not needed for direct data exchange 9090 in FIG. 56C (which uses direct network connection 748, 749 in FIG. 53B).

Figure 57:
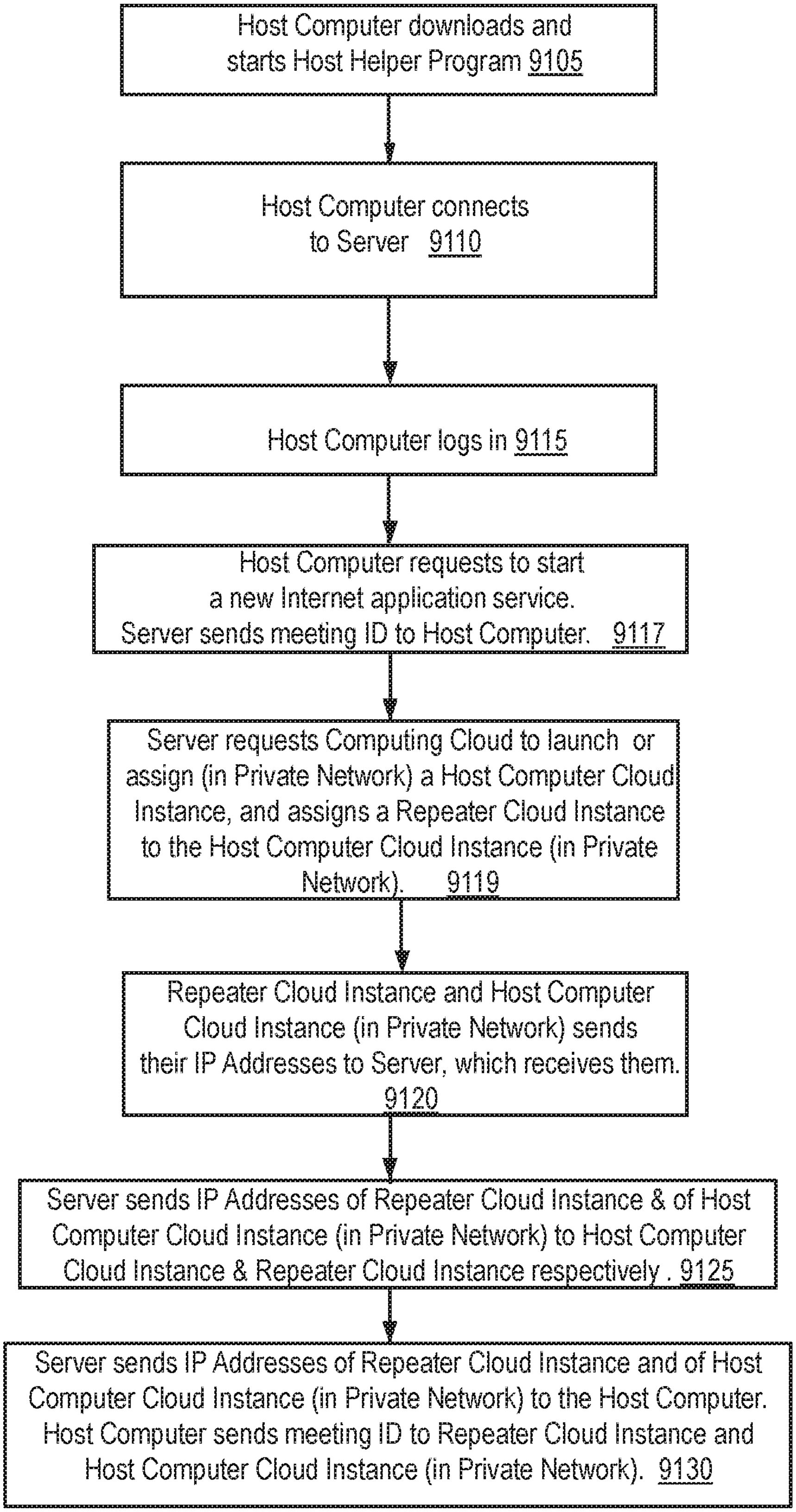

FIG. 57 is adapted from FIG. 36 and presents a flowchart of a process performed by a host computer 205 to provide direct network connections using cloud instance (in a private network 700-*n* in FIG. 53A) for Internet application service between computers over a computer network in accordance with an embodiment of the present invention. First, the host computer 205 downloads and starts 9105 the host helper program 216-1. In one embodiment, the host helper program 216-1 is the Moodle learning management system (running on Linux-Apache-MySQL-PHP solution stack) Internet application (from the Australian company Moodle Pty Ltd.). The host computer 205 then connects 9110 to the server 222A. The host computer 205 logs in 9115 to a website 212A hosted by the server 222A. This allows a website 212A hosted by the server 222A to accurately reflect the status of the host computer 205 on an options page 4305 (in FIG. 26A). The host computer 205 requests 9117 to start a new Internet application service, and the server 222A sends 9117 a unique meeting ID to the host computer 205. The server 222A requests 9119 a computing cloud (not shown) to launch-or-assign a host computer cloud instance 205*n*-C (in a private network 700-*n* in FIG. 53A), and assigns a repeater cloud instance 745*m*-C (in FIG. 53A) to the host computer cloud instance 205*n*-C (in private network 700-*n* in FIG. 53A). The repeater cloud instance 745*m*-C provides a public IP address for the host computer cloud instance 205*n*-C (in private network 700-*n*) so that the latter can be accessed from the Internet 200. The repeater cloud instance 745*m*-C and the host computer cloud instance 205*n*-C (in private network 700-*n*) send 9020 their IP addresses to the server 222A, which receives 9120 them. The server 222A then sends 9125 IP addresses of repeater cloud instance 745*m*-C and of host computer cloud instance 205*n*-C (in private network 702) to host computer cloud instance 205*n*-C and repeater cloud instance 745*m*-C respectively. The server 222A sends 9130 the public IP address of the repeater cloud instance 745*m*-C and private IP address of the host computer cloud instance 205*n*-C (in private network 700-*n*) to the host computer 205, which in turn sends 9130 its meeting ID to the repeater cloud instance 745*m*-C and the host computer cloud instance 205*n*-C.

Figure 58A:
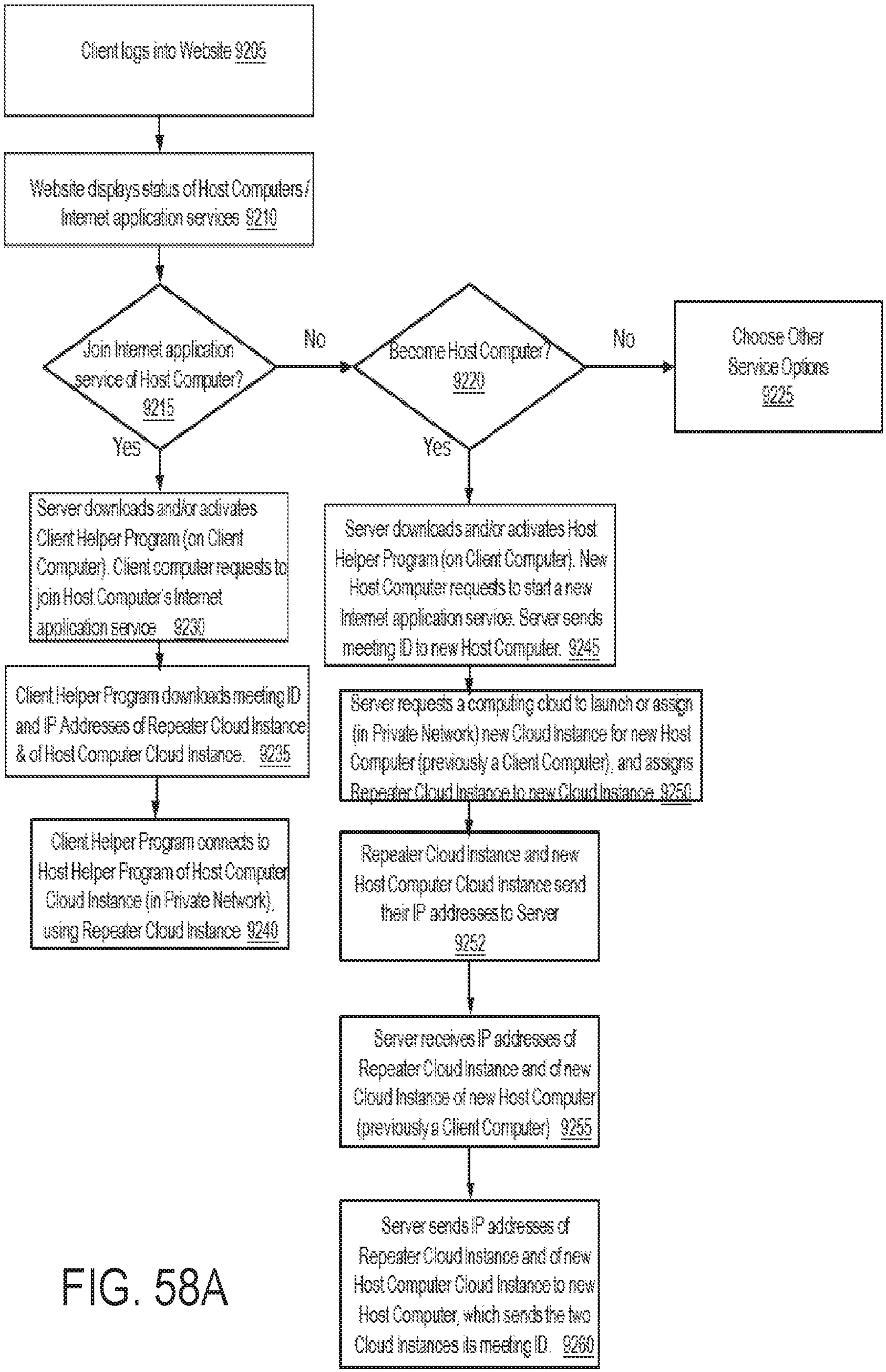

FIG. 58A is adapted from FIG. 37A and presents a flowchart of a process performed by a client computer 215 to provide a direct network connection using host computer cloud instance (in a private network 700-*n* in FIG. 53A) for Internet application service with a host computer 205 in accordance with an embodiment of the present invention. Since the host computer cloud instance 205*n*-C is in a private network 700-*n* communicating with the public Internet network 200 through the repeater cloud instance 745*m*-C, when the client helper program 216-2 downloads 9235 the public IP address of repeater cloud instance 745*m*-C and private IP address of the host computer cloud instance 205*n*-C (in private network 700-*n* in FIG. 53A), a unique meeting ID is also downloaded. As explained above, when client computer 215 sends data to a host computer cloud instance 205*n*-C, it may designate the data as corresponding to the unique meeting ID, allowing the repeater cloud instance 745*m*-C, using a look-up table, to differentiate the data as for the appropriate Internet application service (running inside the host computer cloud instance 205*n*-C) of the host computer 205.

It is noted that the IP address of the client computer 215 may be sent to the host computer 205 and/or the host computer cloud instance 205-C using indirect connection 225, 230, or indirect connection 227, 230 (instead of using direct network connection 748, 749, 750 in FIG. 53A) in further embodiments of the current invention.

Figure 58B:
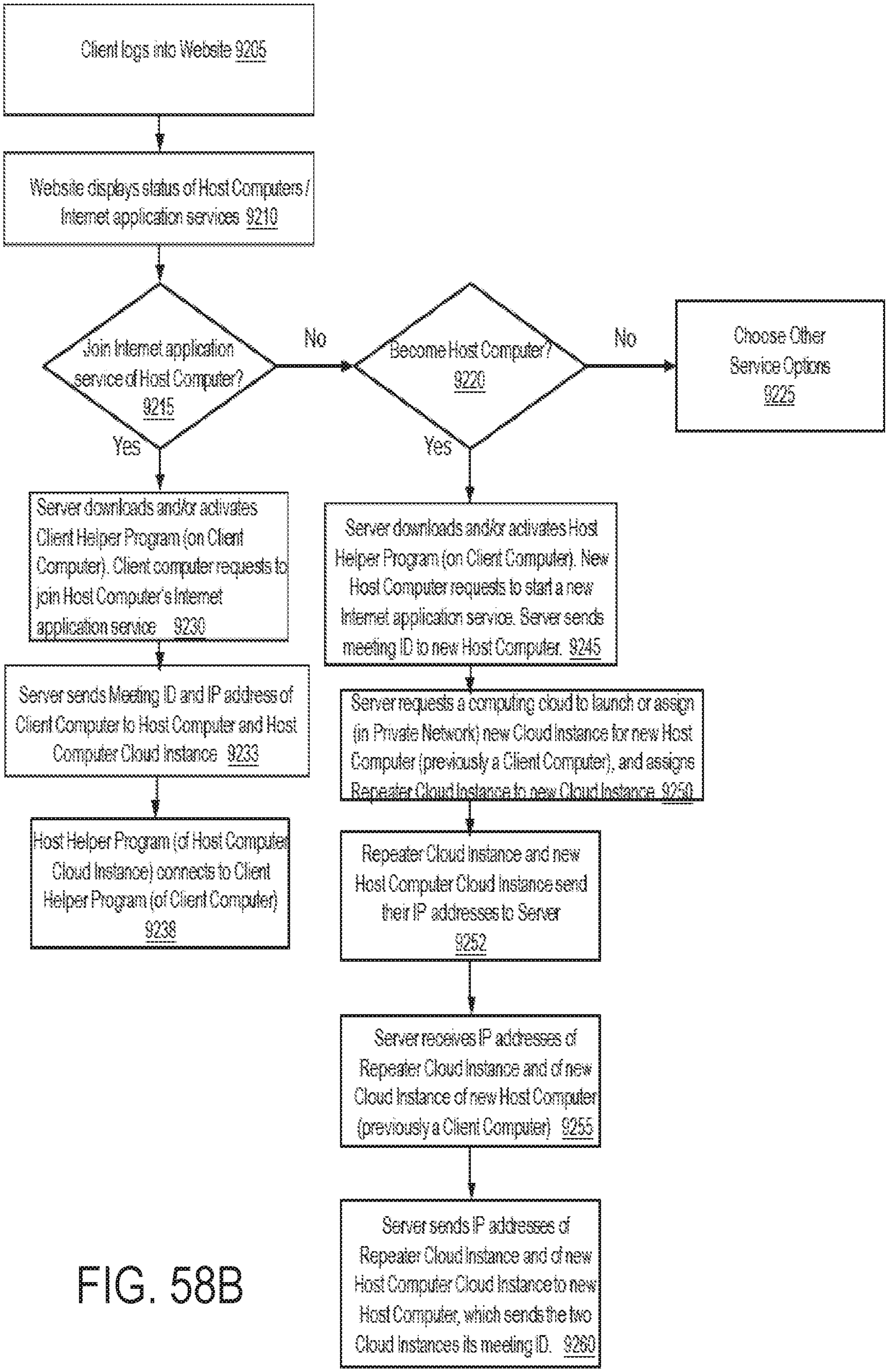

In an embodiment of the current invention illustrated in FIG. 58B, wich FIG. 58B is similar to FIG. 58A, but in FIG. 58B the server 222A sends 9233 (using indirect connection 225, 230 in FIG. 53A) the IP address of the client computer 215 and the meeting ID to the host computer 205 and the host computer cloud instance 205*n*-C, which are communicatively coupled to each other. The host helper program 216-1 (of the host computer cloud instance 205*n*-C) then connects 9238 to the client helper program 216-2 (of the client computer 215). Direct data exchange (step 9090 in FIG. 56B) can then occur, using direct network connection 748, 749 in FIG. 53B, between the client computer 215 and the host computer cloud instance 205*n*-C, and without going through the server 222A. The host computer 205 (in FIG. 53B) is not needed for direct data exchange 9090 in FIG. 56B (which uses direct network connection 748, 749 in FIG. 53B).

Figure 58C:
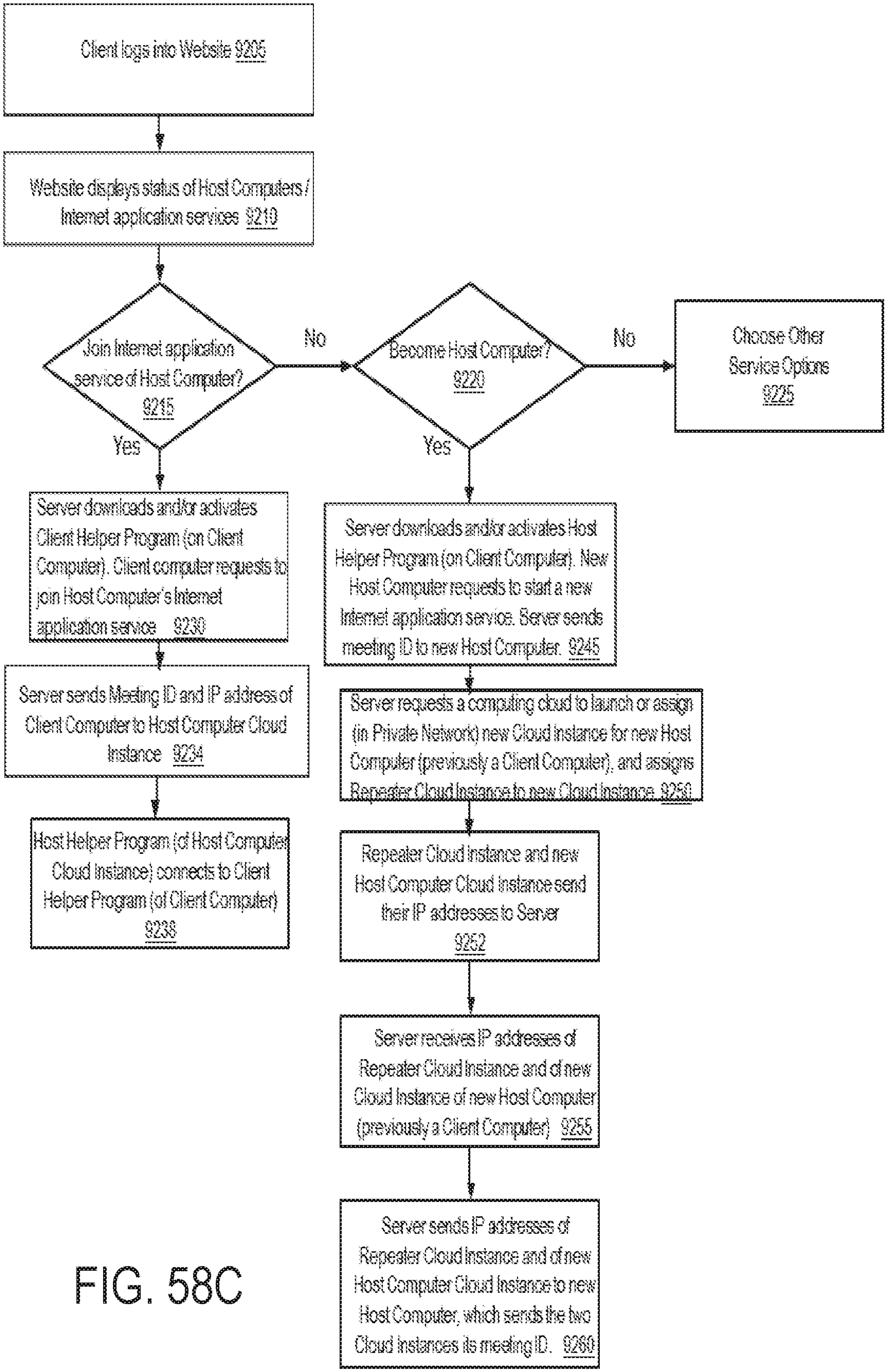

In another embodiment of the current invention illustrated in FIG. 58C, which FIG. 58C is similar to FIG. 58A, but in FIG. 58C the server 222A sends 9234 (using indirect connection 227, 230 in FIG. 53A) the IP address of the client computer 215 and the meeting ID to the host computer cloud instance 205*n*-C, which is communicatively coupled to the host computer 205. The host helper program 216-1 (of the host computer cloud instance 205*n*-C) then connects 9238 to the client helper program 216-2 (of the client computer 215). Direct data exchange (step 9090 in FIG. 56C) can then occur, using direct network connection 748, 749 in FIG. 53B, between client computer 215 and host computer cloud instance 205*n*-C, and without going through the server 222A. The host computer 205 (in FIG. 53B) is not needed for direct data exchange 9090 in FIG. 56C (which uses direct network connection 748, 749 in FIG. 53B).

Please note: data exchange 9090 (in FIG. 56A) and FIG. 53B illustrate that after the Internet application service is started 9119 (in FIG. 57), and after the server 222A receives 9120 (in FIG. 57) the IP address of the host computer cloud instance 205*n*-C, the host computer 205 is not needed to be communicatively linked 750 with the multi-instance repeater-cloud 745-C (or linked 749 with the host computer cloud instance 205*n*-C) or linked 225 with the server 222A respectively (for the client computer 215 to use the Internet application service of the host computer cloud instance 205*n*-C). Please further note: communication links 225, 750 appear in FIG. 53A, and do not appear in FIG. 53B.

Thus, in accordance with embodiments of the present invention. FIGS. 53A, 53B, 56A, 56B, 56C, 57, 58A, 58B and 58C above illustrate creating direct network connections for Internet application service between the client computer 215 and the host computer cloud instance 205*n*-C via the Internet (including how to start the host computer cloud instance 205*n*-C).

Figure 59A:
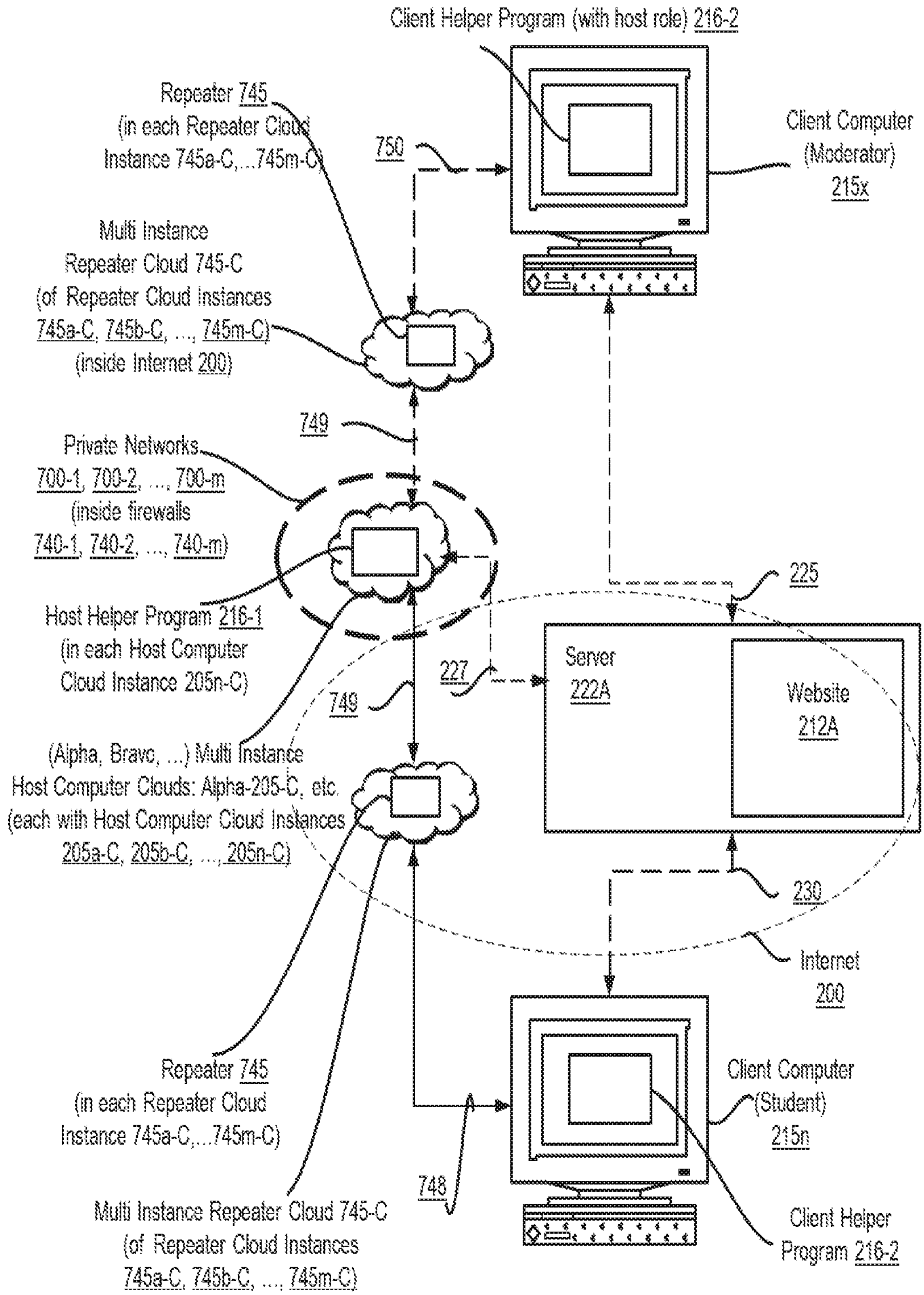
FIGS. 59A, 59B are block diagrams illustrating providing direct network connections using cloud instance for Internet application service over a computer network in accordance with another embodiment of the present invention.

FIG. 59A is adapted from FIG. 53A and illustrates a direct network connection using host computer cloud instance 205*n*-C (in a private network 700-*n*) for Internet application service between a client computer 215 and a client computer (moderator) 215*x* running client helper program (with host role) 216-2.

Figure 60A:
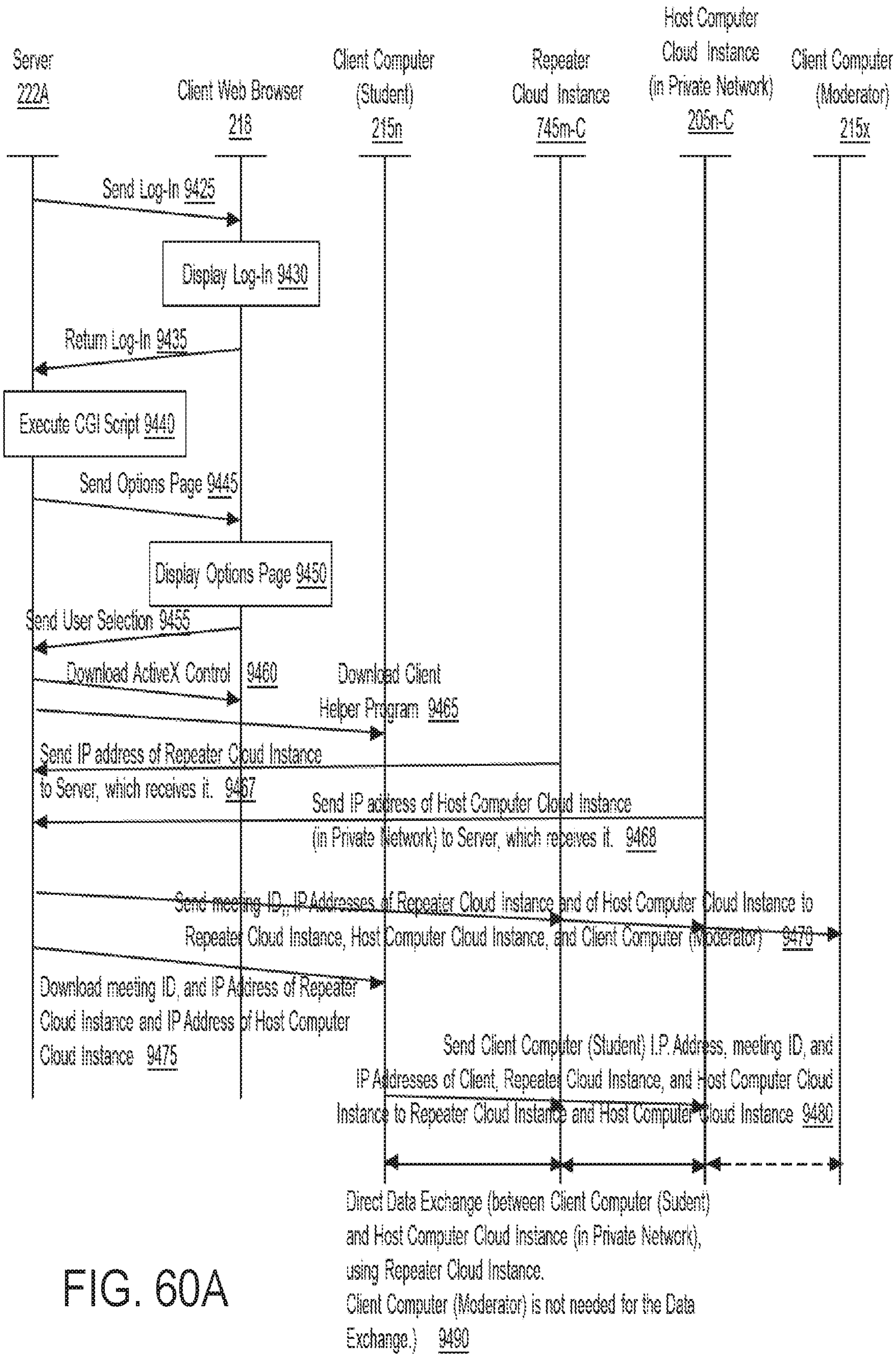
FIGS. 60A, 60B, 60C, 61, 62A, 62B, 62C are flowcharts illustrating providing direct network connections using cloud instance for Internet application service over a computer network in accordance with an embodiment of the present invention.
Figure 61:
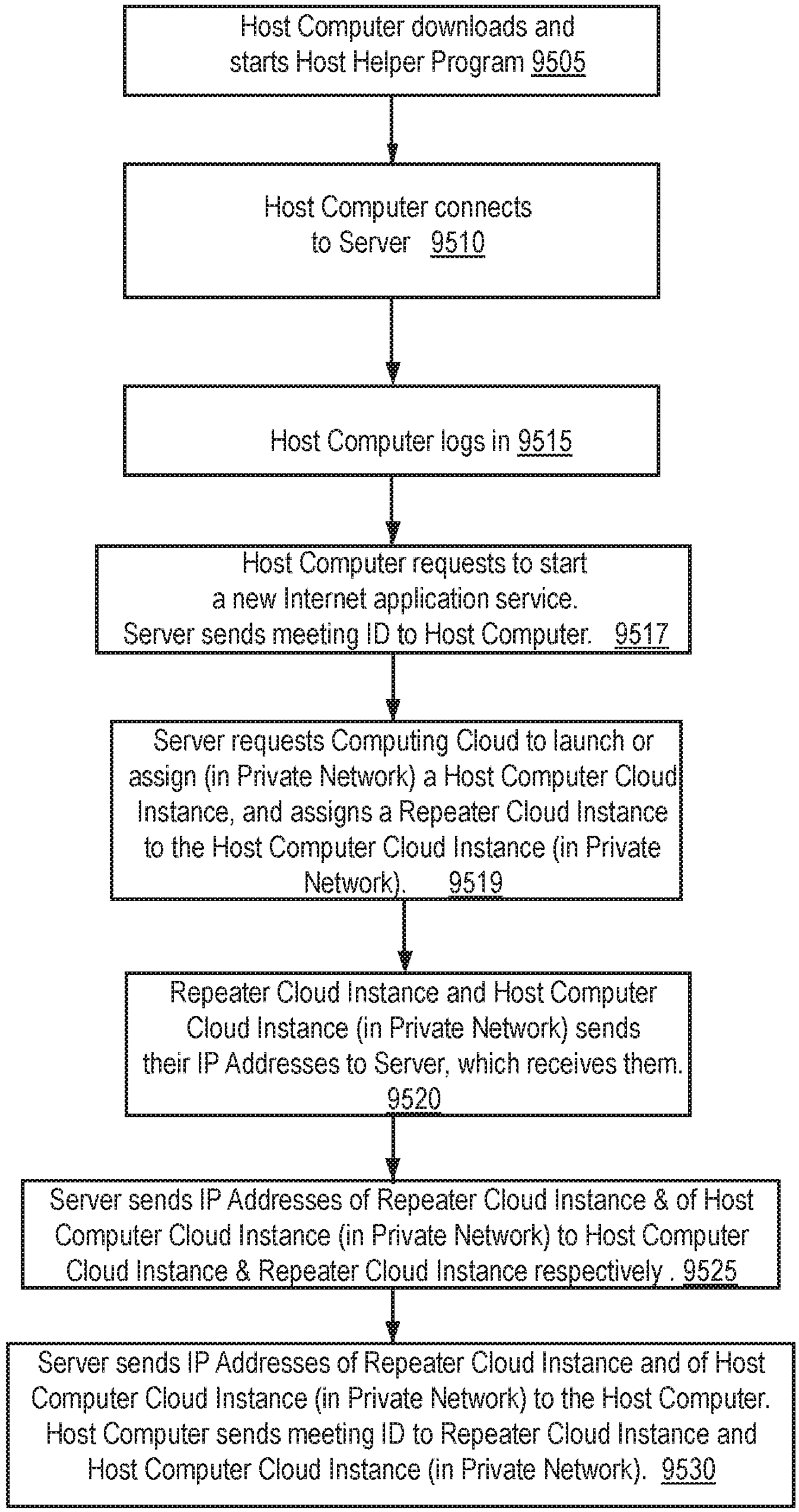

For the purpose of clarity, further details of a process for establishing a direct network connection using host computer cloud instance 205-C on a private network 700-*n* for Internet application service between a client computer 215 and a client computer (moderator) 215*x* running client helper program (with host role) 216-2, in accordance with one embodiment of the present invention, are provided above with reference to FIGS. 60A. 61, and 96A. In other words, FIGS. 60A, 61, and 96A use meeting ID and use repeater cloud instance 745*m*-C which provides a bridge between client computer (moderator) 215*x* running client helper program (with host role) 216-2 and the host computer cloud instance 205*n*-C (in private network 700-*n*).

It is noted that the IP address of the client computer 215*n* may be sent to the client computer 215*x* (moderator, with host role, in FIG. 59A) and/or the host computer cloud instance 205*n*-C using indirect connection 225, 230, or indirect connection 227, 230 (instead of using direct network connection 748, 749, 750 in FIG. 59A) in further embodiments of the current invention.

Figure 59B:
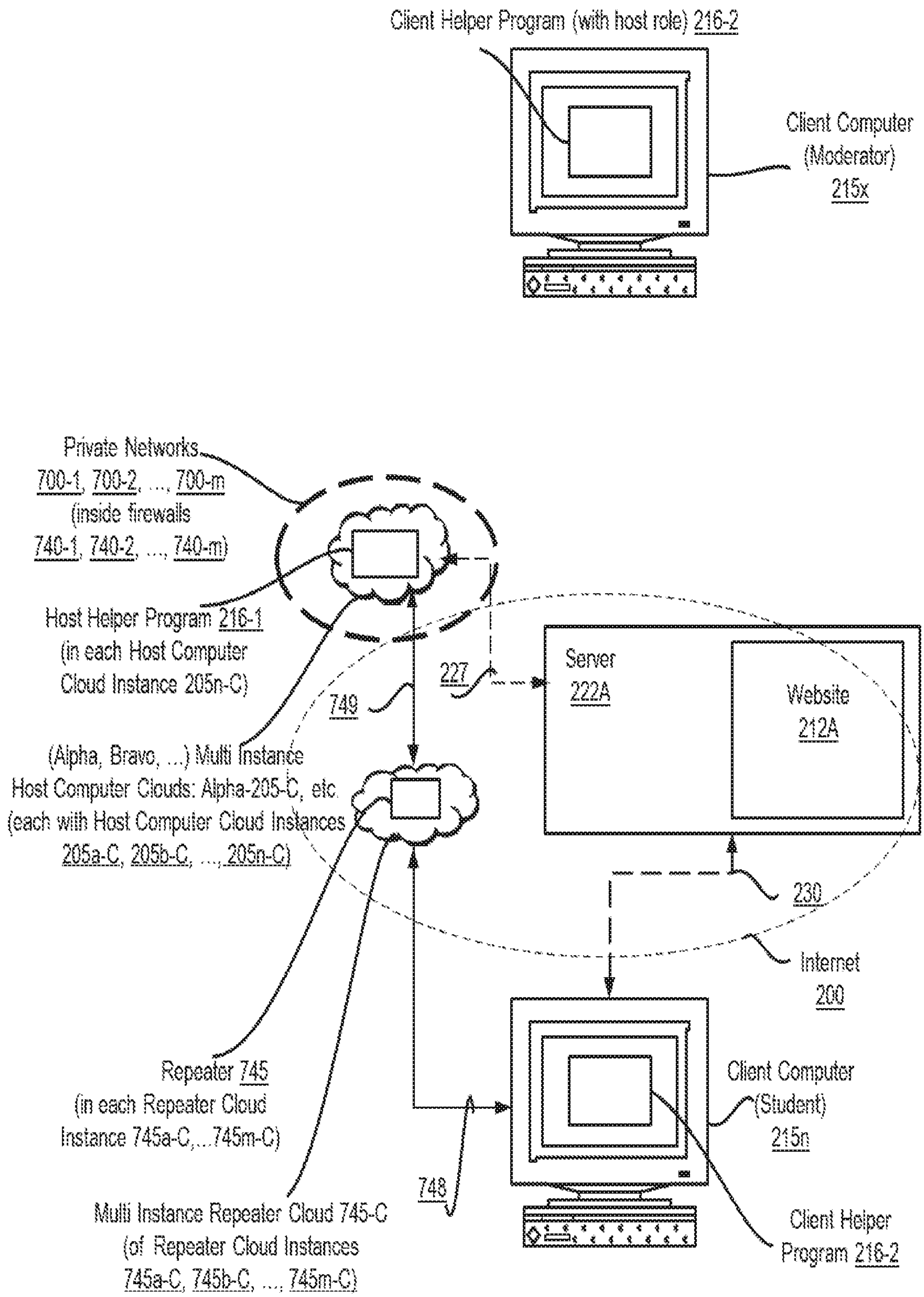
Figure 60B:
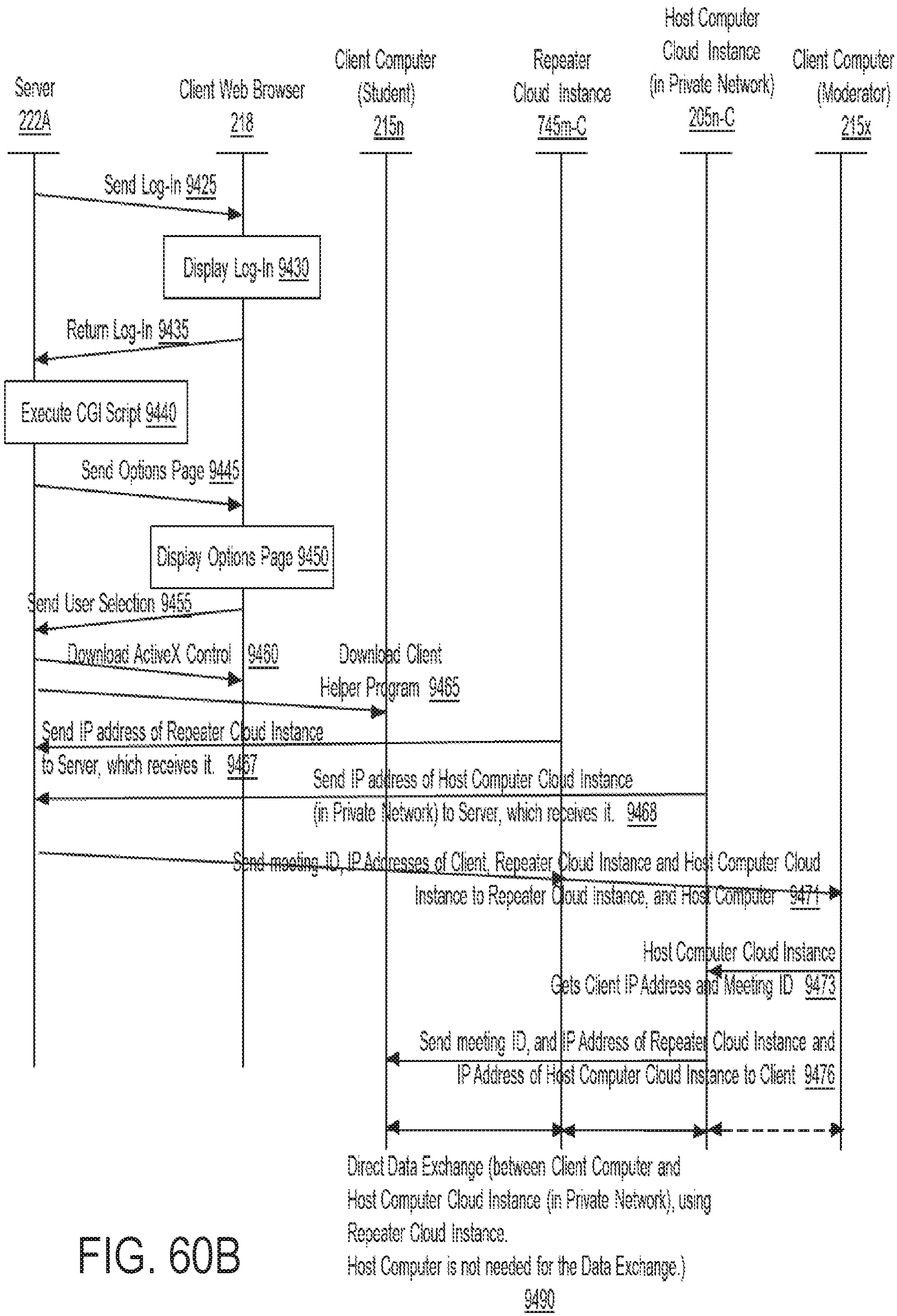

In an embodiment of the current invention illustrated in FIG. 60B, which FIG. 60B is similar to FIG. 60A, but in FIG. 60B the server 222A sends 9471 (using indirect connection 225, 230 in FIG. 59A) the IP address of the client computer 215*n* and meeting ID to the client computer 215*x* (moderator, with host role, in FIG. 59A), which is communicatively coupled to the host computer cloud instance 205*n*-C. The host computer cloud instance 205*n*-C therefore also gets 9473 the IP address of the client computer 215*n* and meeting ID. The host computer cloud instance 205*n*-C then (using repeater cloud instance 745*m*-C) sends 9476 its IP address and the meeting ID to client computer 215*n*. Direct data exchange 9490 can then occur, using direct network connection 748, 749 in FIG. 59B, between client computer 215*n* and host computer cloud instance 205*n*-C, and without going through the server 222A. The client computer 215*x* (moderator, with host role, in FIG. 59B) is not needed for direct data exchange 9490 in FIG. 60B (which uses direct network connection 748, 749 in FIG. 59B).

Figure 60C:
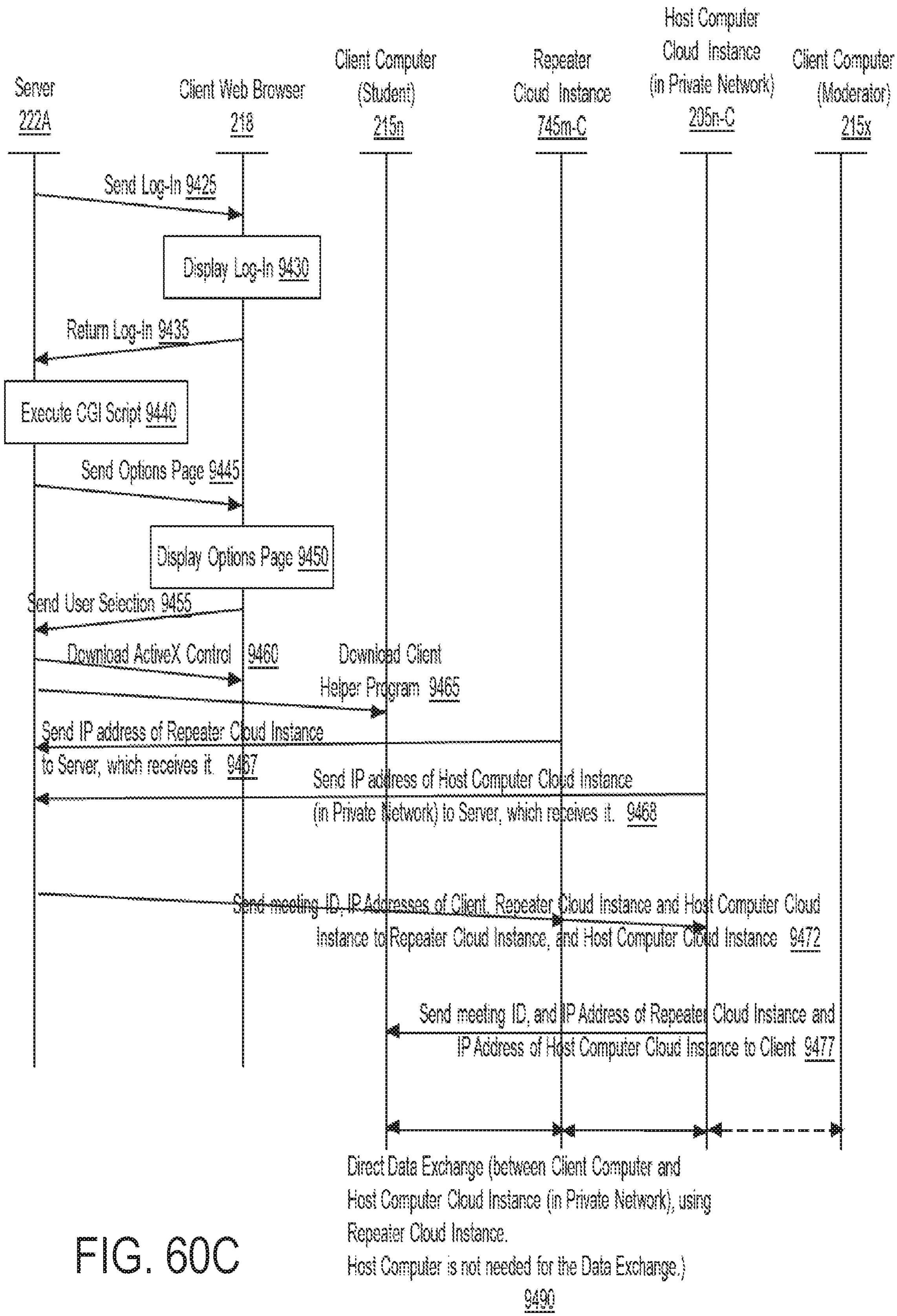

In another embodiment of the current invention illustrated in FIG. 60C, which FIG. 60C is similar to FIG. 60A, but in FIG. 60C the server 222A sends 9472 (using indirect connection 227, 230 in FIG. 59A) the IP address of the client computer 215*n* and meeting ID to the host computer cloud instance 205*n*-C, which is communicatively coupled to the client computer 215*x* (moderator, with host role, in FIG. 59A). The host computer cloud instance 205*n*-C then (using repeater cloud instance 745*m*-C) sends 9477 its IP address and the meeting ID to client computer 215*n*. Direct data exchange 9490 can then occur using direct network connection 748, 749 in FIG. 59B, between client computer 215*n* and host computer cloud instance 205*n*-C, and without going through the server 222A. The client computer 215*x* (moderator, with host role, in FIG. 59B) is not needed for direct data exchange 9490 in FIG. 60C (which uses direct network connection 748, 749 in FIG. 59B).

Please note: data exchange 9490 (in FIG. 60A) and FIG. 59B illustrate that after the Internet application service is started 9519 (in FIG. 61), and after the server 222A receives 9520 (in FIG. 61) the IP address of the host computer cloud instance 205*n*-C, the client computer (moderator) 215*x* is not needed to be communicatively linked 750 with the multi-instance repeater-cloud 745-C (or linked 749 with the host computer cloud instance 205*n*-C) or linked 225 with the server 222A respectively (for the client computer (student) 215*n* to use the Internet application service of the host computer cloud instance 205*n*-C). Please further note: communication links 225, 750 appear in FIG. 59A, and do not appear in FIG. 59B.

Figure 62A:
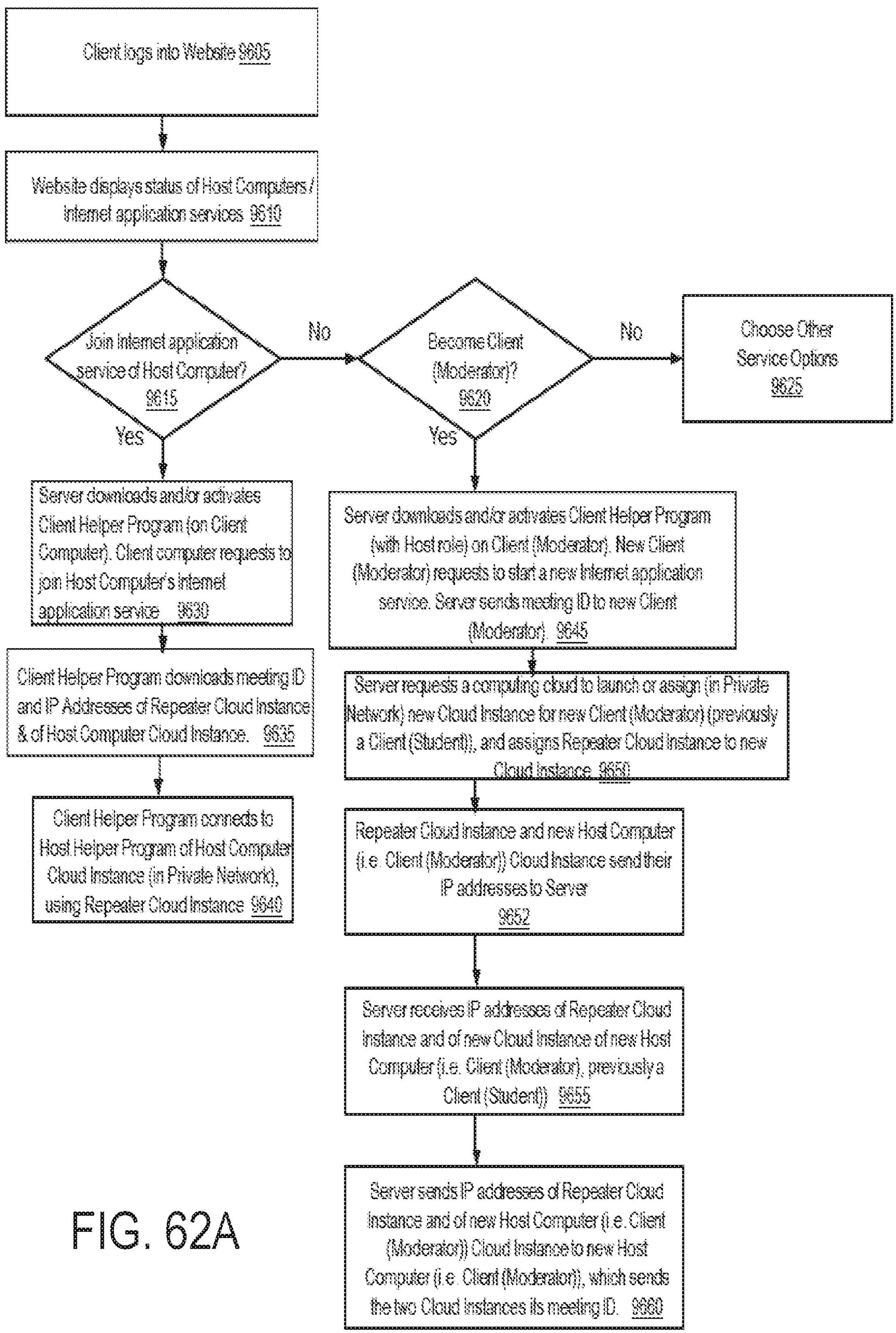
Figure 62B:
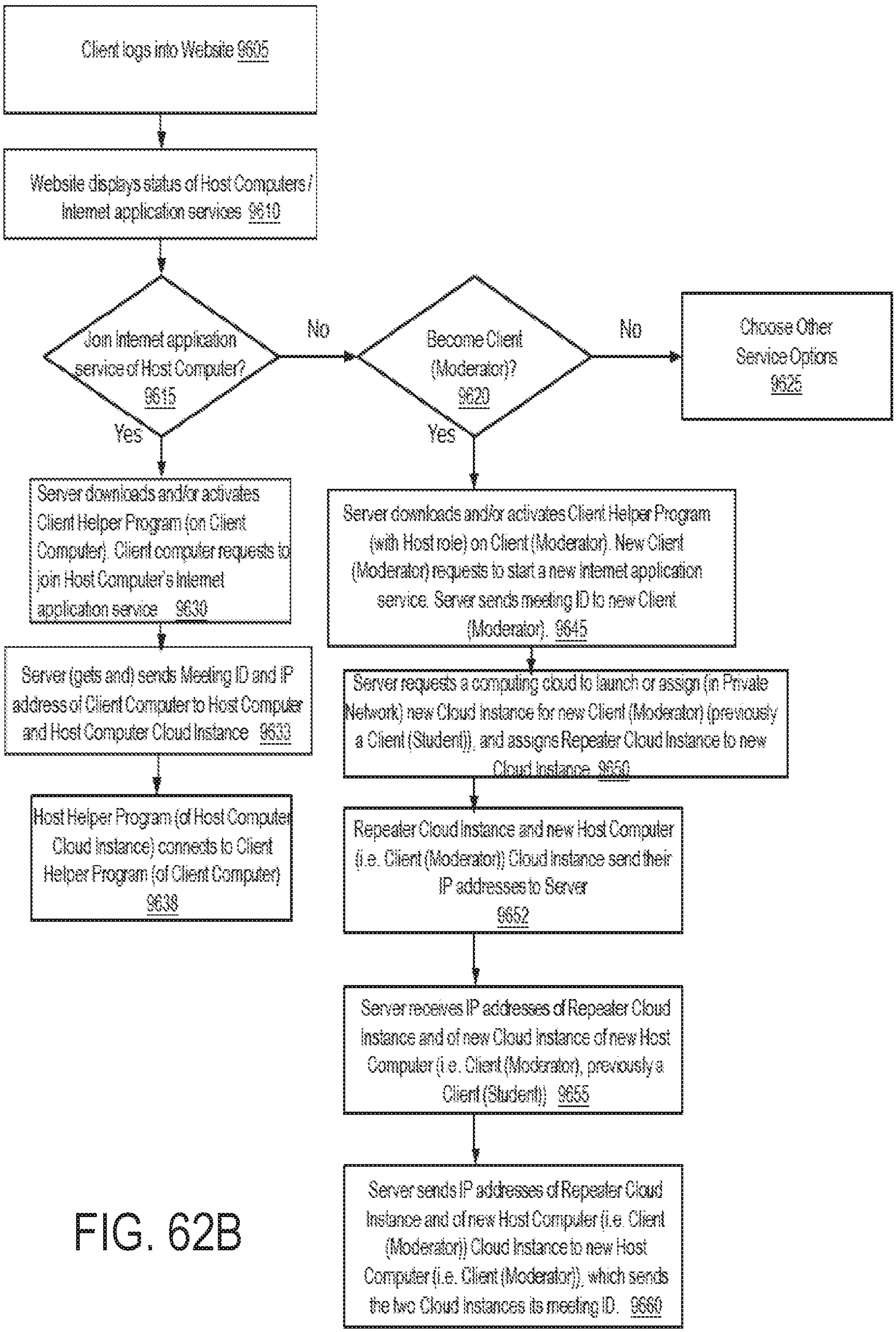

Referring to FIG. 62B, in an embodiment of the current invention illustrated in FIG. 62B, which FIG. 62B is similar to FIG. 62A, but in FIG. 62B the server 222A (gets 9605 and) sends 9633 (using indirect connection 225, 230 in FIG. 59A) the IP address of the client computer 215*n* and the meeting ID to the client computer 215*x* (moderator, with host role, in FIG. 59A) and the host computer cloud instance 205*n*-C, which are communicatively coupled to each other. The host helper program 216-1 (of the host computer cloud instance 205*n*-C) then connects 9638 to the client helper program 216-2 (of the client computer 215*n*). Direct data exchange 9490 (in FIG. 60B) can then occur, using direct network connection 748, 749 in FIG. 59B, between the client computer 215*n* and the host computer cloud instance 205*n*-C, and without going through the server 222A. The client computer 215*x* (moderator, with host role, in FIG. 59B) is not needed for direct data exchange 9490 in FIG. 60B.

Figure 62C:
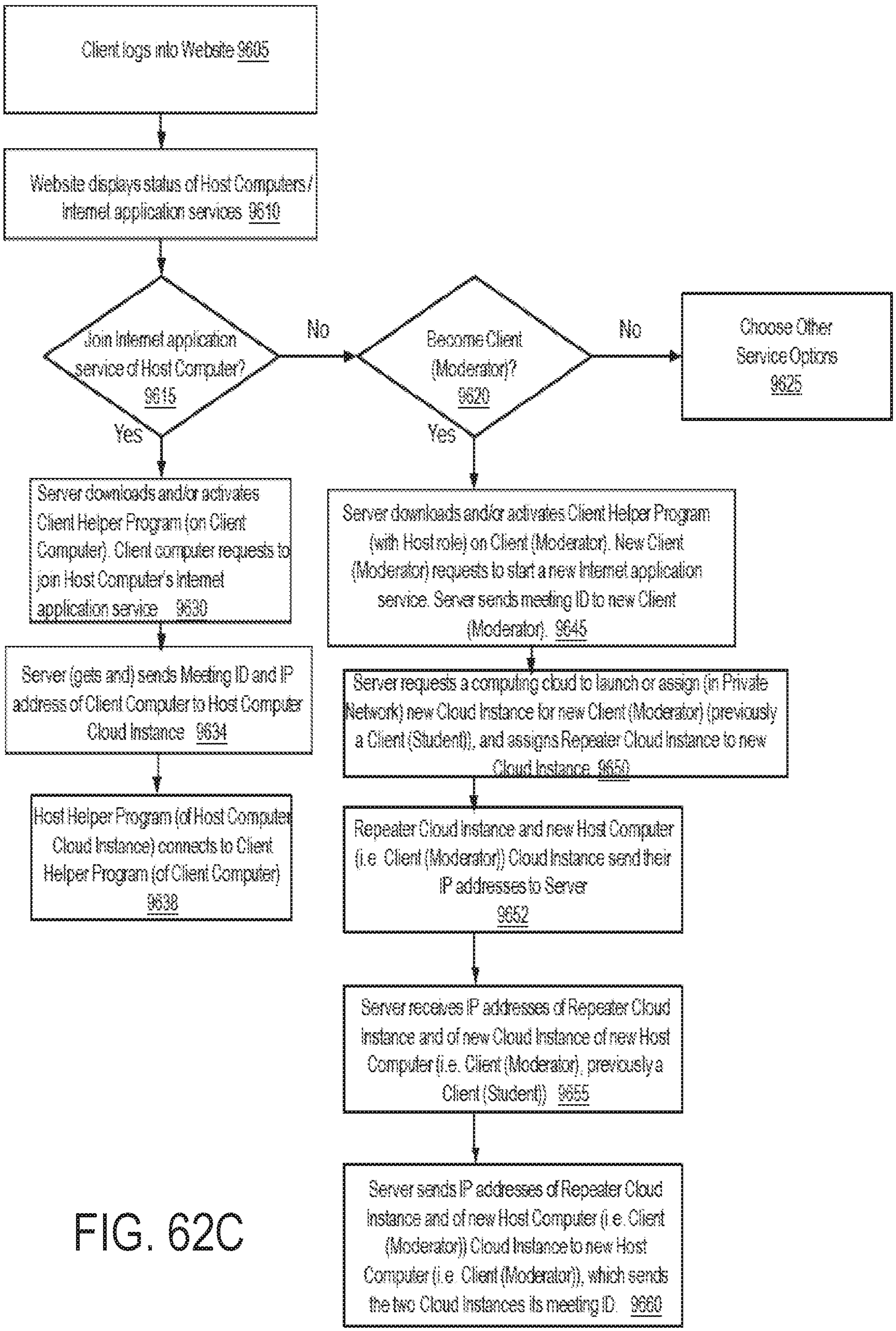

In another embodiment of the current invention illustrated in FIG. 62C, which FIG. 62C is similar to FIG. 62A, but in FIG. 62C the server 222A (gets 9605 and) sends 9634 (using indirect connection 227, 230 in FIG. 59A) the IP address of the client computer 215*n* and the meeting ID to the host computer cloud instance 205*n*-C, which is communicatively coupled to the client computer 215*x* (moderator, with host role, in FIG. 59A). The host helper program 216-1 (of the host computer cloud instance 205*n*-C) then connects 9638 to the client helper program 216-2 (of the client computer 215*n*). Direct data exchange 9490 (in FIG. 60C) can then occur, using direct network connection 748, 749 in FIG. 59B, between client computer 215*n* and host computer cloud instance 205*n*-C, and without going through the server 222A. The client computer 215*x* (moderator, with host role, in FIG. 59B) is not needed for direct data exchange 9490 in FIG. 60C (which uses direct network connection 748, 749 in FIG. 59B).

Thus, in accordance with embodiments of the present invention. FIGS. 59A, 59B, 60A, 60B, 60C, 61, 62A, 62B, and 62C above illustrate creating direct network connections for Internet application service between the client computer (student) 215*n* and the host computer cloud instance 205*n*-C via the Internet (including how to start the host computer cloud instance 205*n*-C).

Figure 63A:
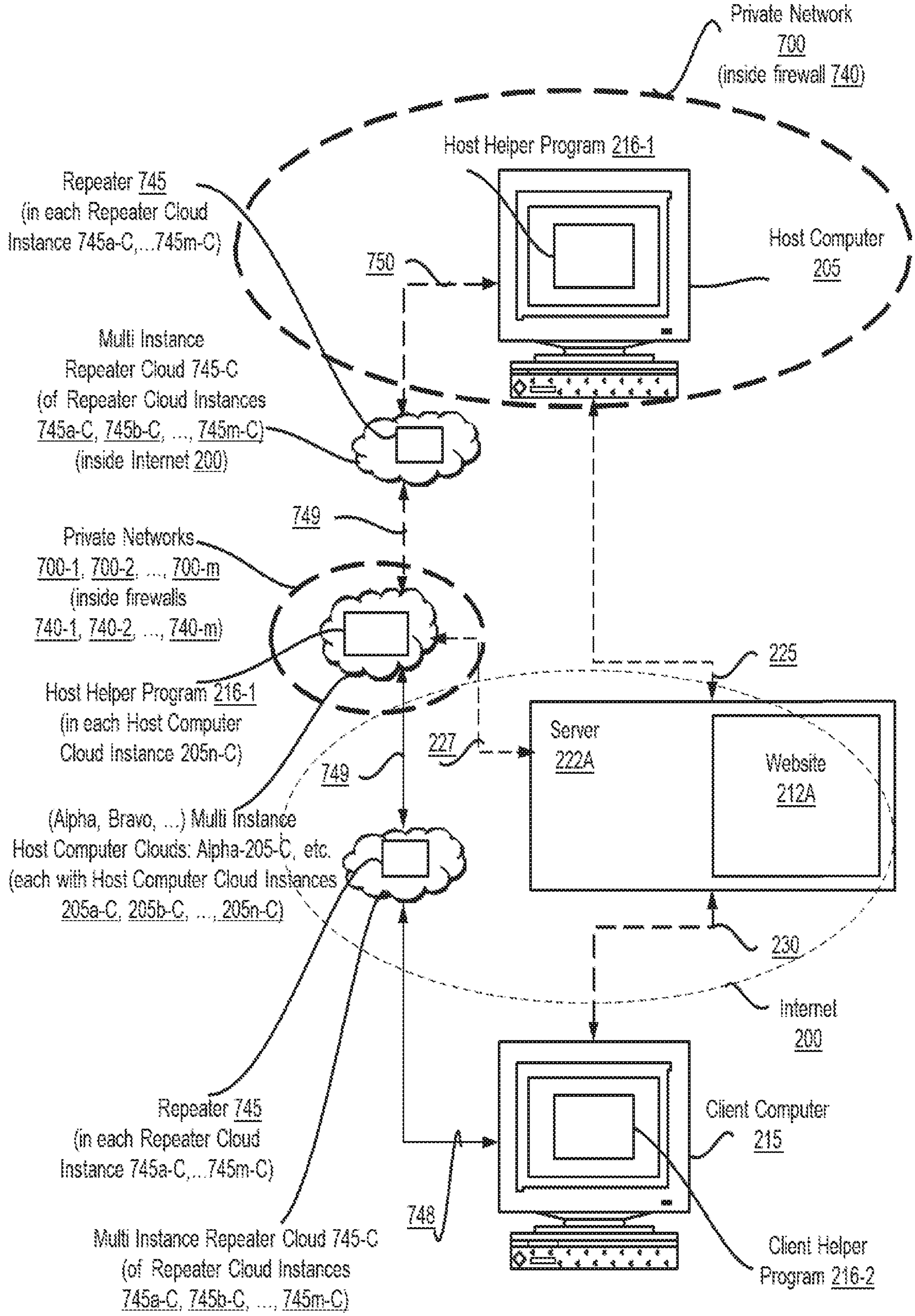
FIGS. 63A, 63B are block diagrams illustrating providing direct network connections using cloud instance for Internet application service over a computer network in accordance with another embodiment of the present invention.

FIG. 63A is adapted from FIG. 53A and illustrates a direct network connection using host computer cloud instance 205-C (in a private network 700-*n*) for Internet application service between a client computer 215 and a host computer 205 in a private network 700, in accordance with one embodiment of the present invention, suitable for providing a direct network connection when one of the networked computers does not have a unique, publicly accessible IP address. The only change in FIG. 63A from FIG. 53A is that the host computer 205 is in a private network 700 in FIG. 63A.

For the purpose of clarity, further details of a process for establishing a direct network connection using host computer cloud instance 205*n*-C on a private network 700-*n* for Internet application service between a client computer 215 and a host computer 205 in a private network 700, in accordance with one embodiment of the present invention, are provided below with reference to FIGS. 64A, 99, and 100A. In other words, FIGS. 64A, 99, and 100A use meeting ID and use repeater cloud instance 745*m*-C which provides a bridge for host computer 205 between the private network 700 and the Internet 200, as explained above for the host computer cloud instance 205*n*-C (in private network 700-*n*).

It is noted that the IP address of the client computer 215 may be sent to the host computer 205 and/or the host computer cloud instance 205*n*-C using indirect connection 225, 230, or indirect connection 227, 230 (instead of using direct network connection 748, 749, 750 in FIG. 63A) in further embodiments of the current invention.

Figure 63B:
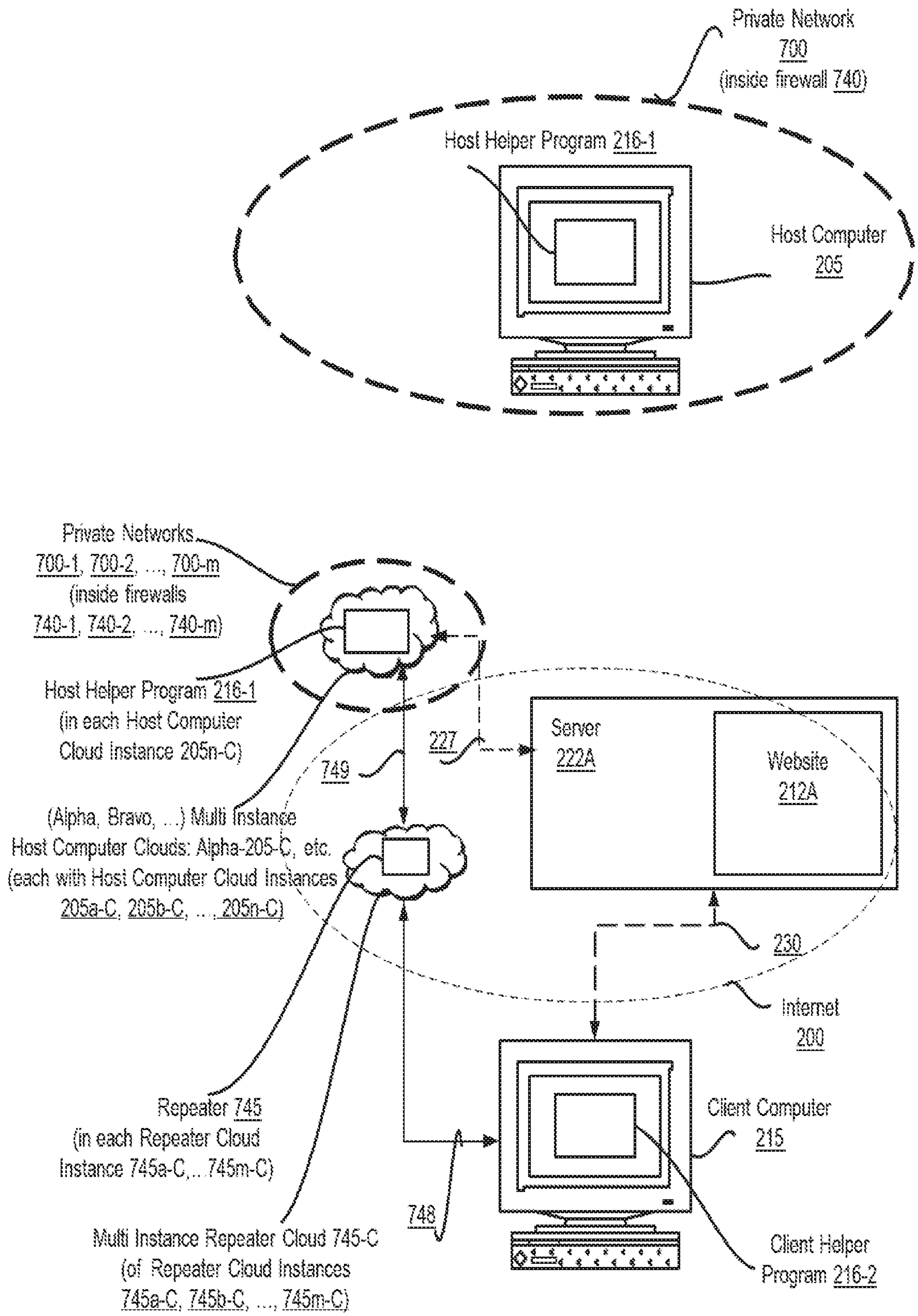
Figure 64A:
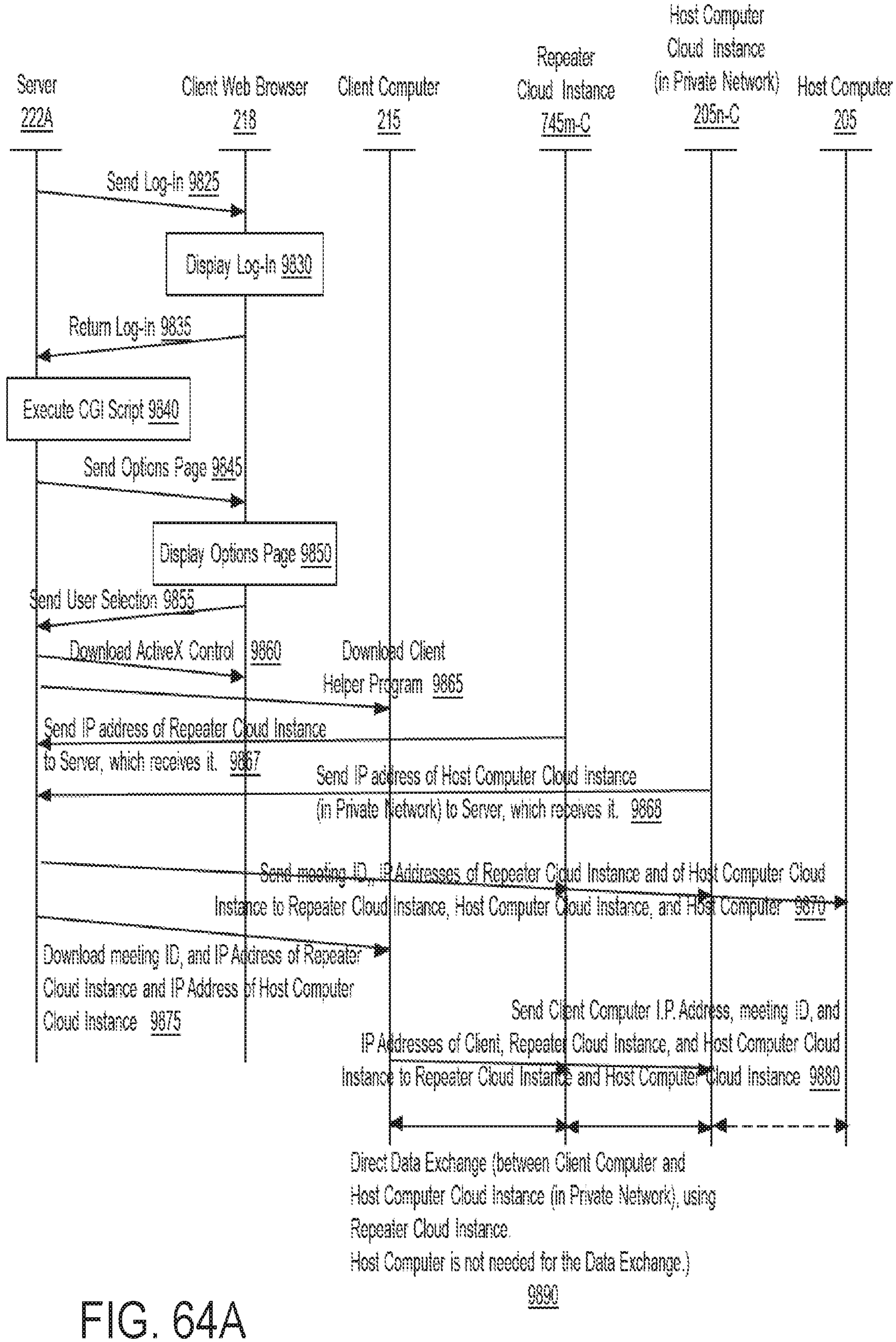
FIGS. 64A, 64B, 64C, 65, 66A, 66B, 66C are flowcharts illustrating providing direct network connections using cloud instance for Internet application service over a computer network in accordance with an embodiment of the present invention.
Figure 64B:
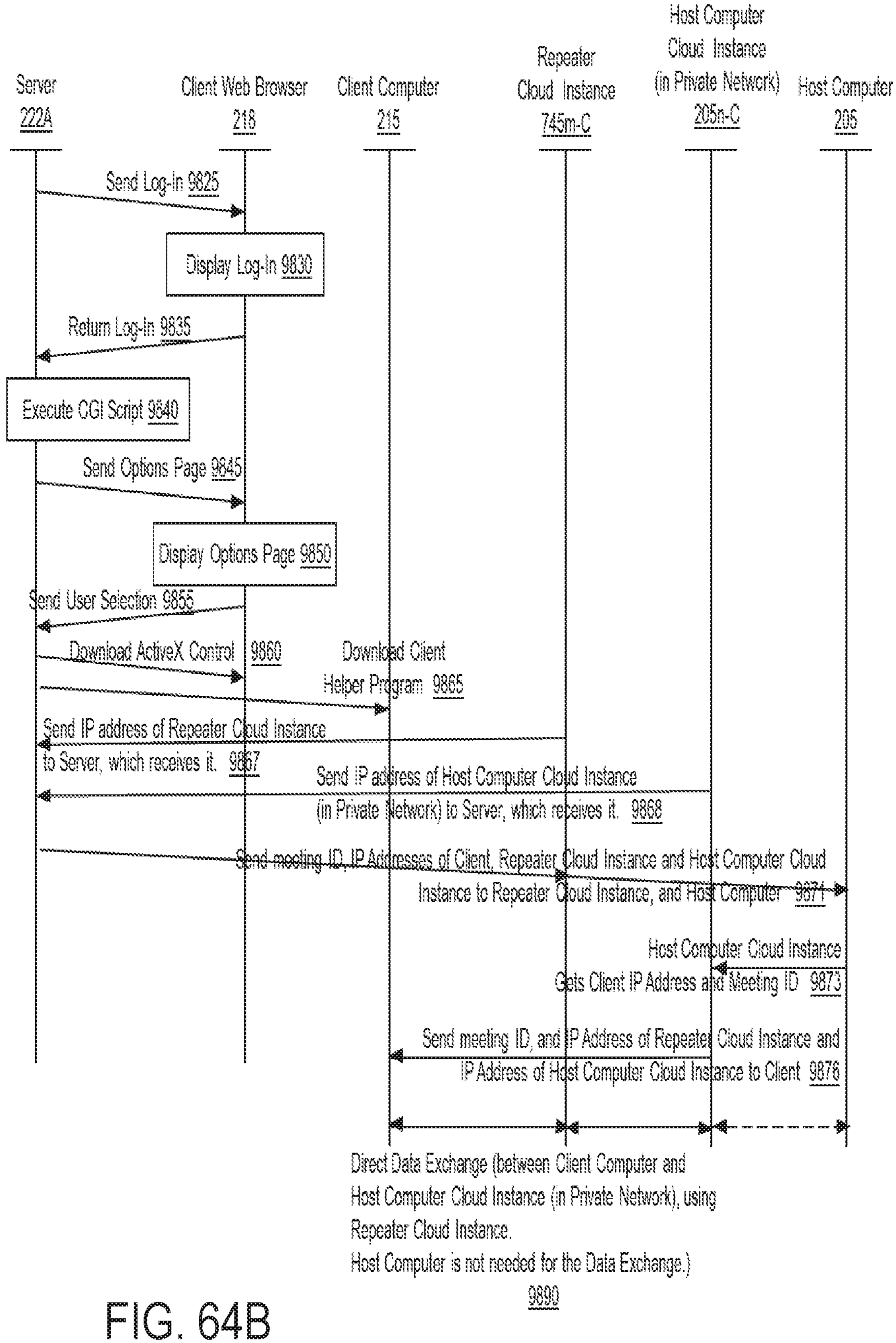

In an embodiment of the current invention illustrated in FIG. 64B, which FIG. 64B is similar to FIG. 64A, but in FIG. 64B the server 222A sends 9871 (using indirect connection 225, 230 in FIG. 63A) the IP address of the client computer 215 and meeting ID to the host computer 205, which is communicatively coupled to the host computer cloud instance 205*n*-C. The host computer cloud instance 205*n*-C therefore also gets 9873 the IP address of the client computer 215 and meeting ID. The host computer cloud instance 205*n*-C then (using repeater cloud instance 745*m*-C) sends 9876 its IP address and the meeting ID to client computer 215. Direct data exchange 9890 can then occur, using direct network connection 748, 749 in FIG. 63B, between client computer 215 and host computer cloud instance 205*n*-C, and without going through the server 222A. The host computer 205 (in FIG. 63B) is not needed for direct data exchange 9890 in FIG. 64B.

Figure 64C:
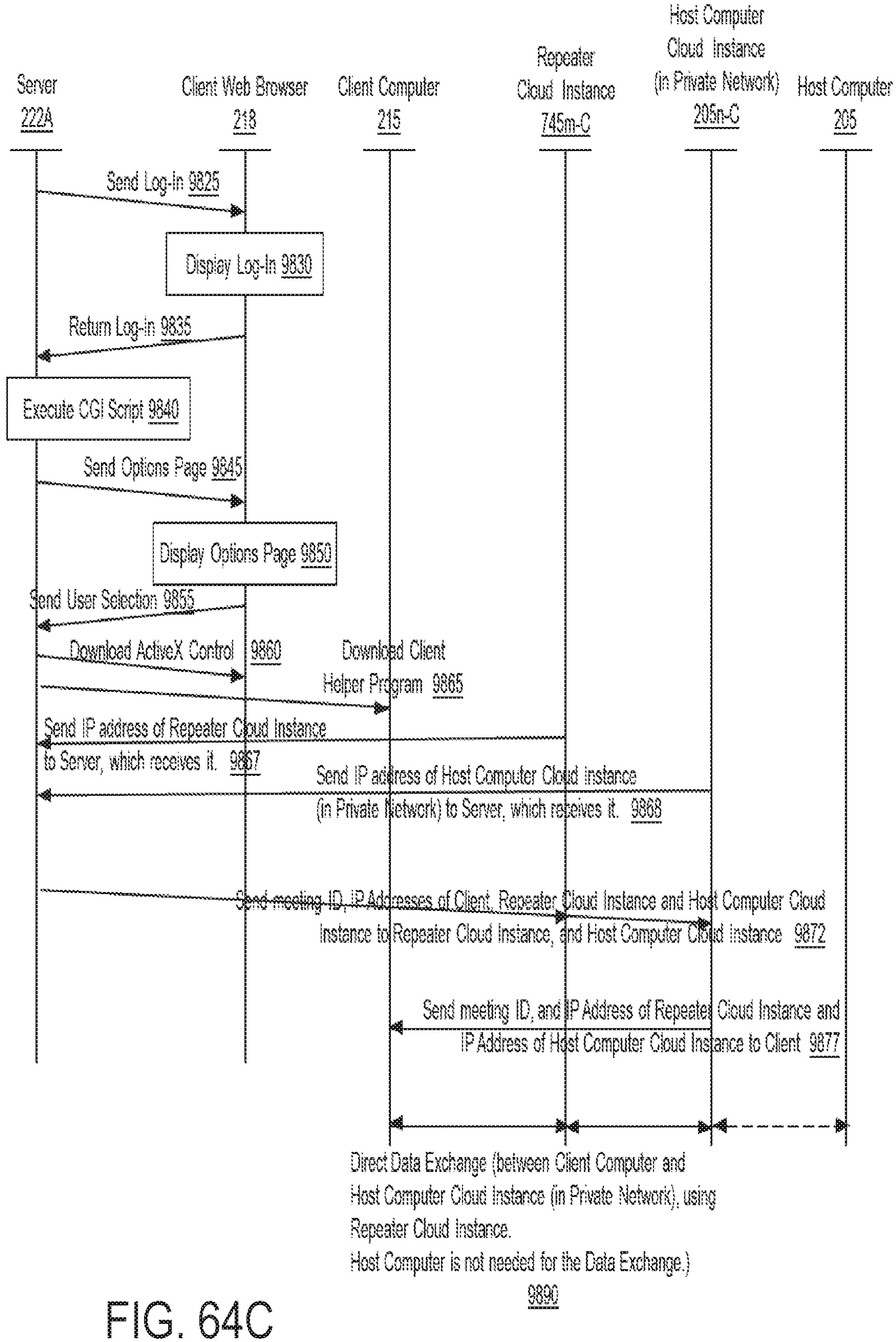
Figure 65:
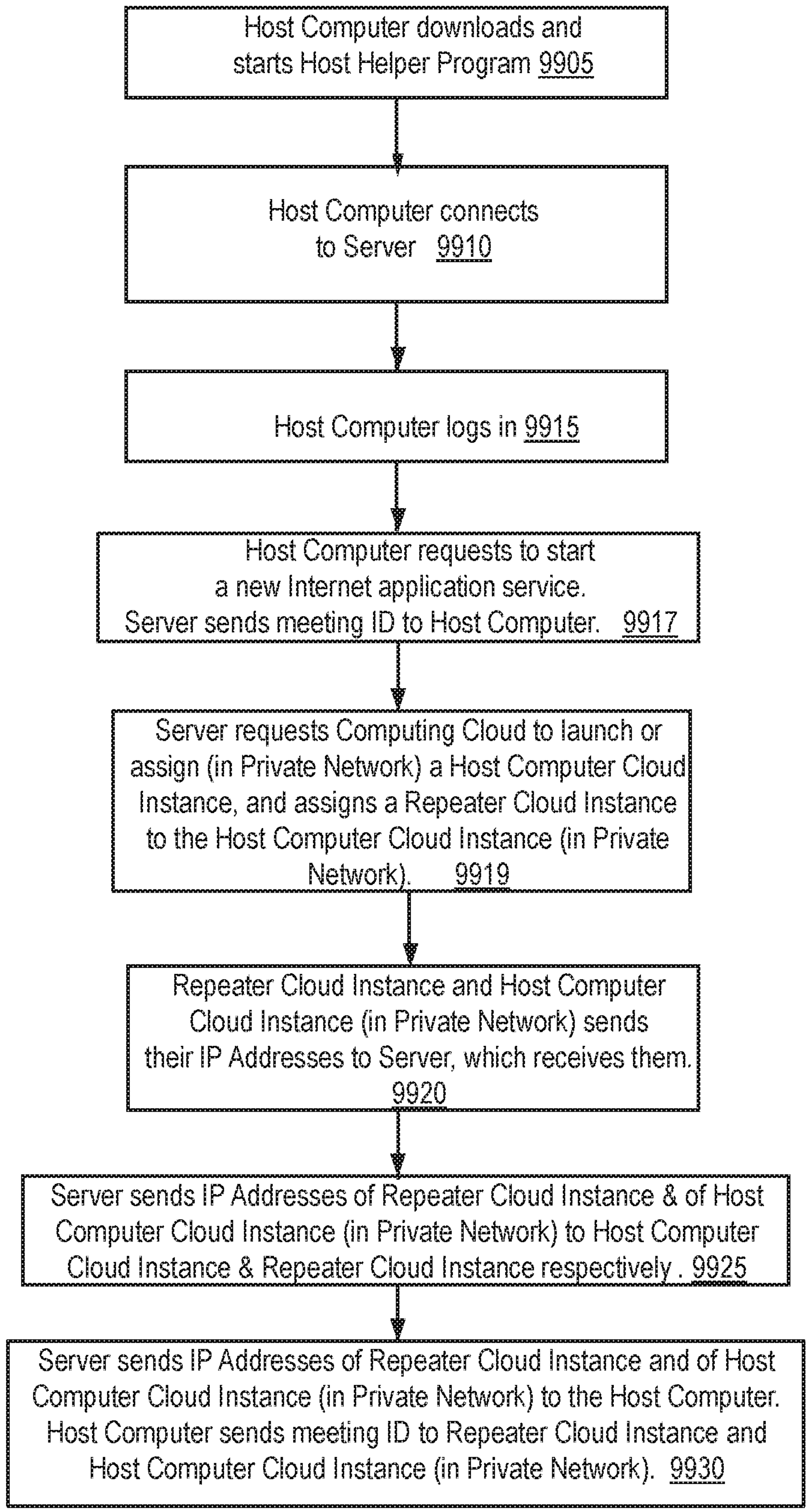

In another embodiment of the current invention illustrated in FIG. 64C, which FIG. 64C is similar to FIG. 64A, but in FIG. 64C the server 222A sends 9872 (using indirect connection 227, 230 in FIG. 53A) the IP address of the client computer 215 and meeting ID to the host computer cloud instance 205*n*-C, which is communicatively coupled to the host computer 205. The host computer cloud instance 205*n*-C then (using repeater cloud instance 745*m*-C) sends 9877 its IP address and the meeting ID to client computer 215. Direct data exchange 9890 can then occur, using direct network connection 748, 749 in FIG. 63B, between client computer 215 and host computer cloud instance 205*n*-C, and without going through the server 222A. The host computer 205 (in FIG. 63B) is not needed for direct data exchange 9890 in FIG. 64C.

Please note: data exchange 9890 (in FIGS. 64A, 64B, and 64C) and FIG. 63B illustrate that after the Internet application service is started 9919 (in FIG. 65), and after the server 222A receives 9920 (in FIG. 65) the IP addresses of the repeater cloud instance 745*m*-C and of the host computer cloud instance 205*n*-C (in private network), the host computer 205 is not needed to be communicatively linked 225, 750 with the server 222A or with the host computer cloud instance 205*n*-C respectively (for the client computer 215 to use the Internet application service of the host computer cloud instance 205*n*-C). Please further note: communication links 225, 750 appear in FIG. 63A, and do not appear in FIG. 63B.

It is noted that the IP address of the client computer 215 may be sent to the host computer 205 and/or the host computer cloud instance 205-C using indirect connection 225, 230, or indirect connection 227, 230 (instead of using direct network connection 748, 749, 750 in FIG. 63A) in further embodiments of the current invention.

Figure 66A:
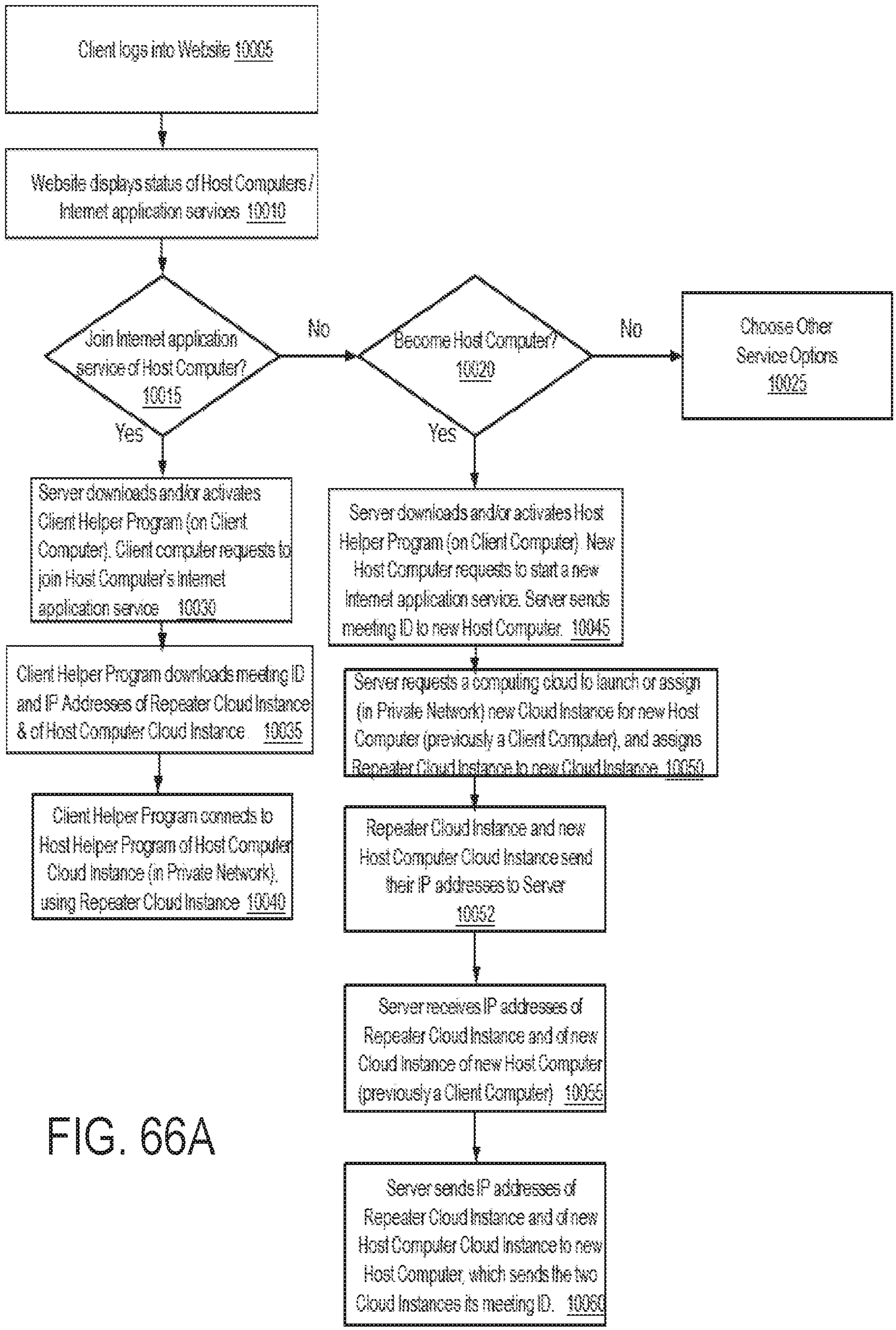
Figure 66B:
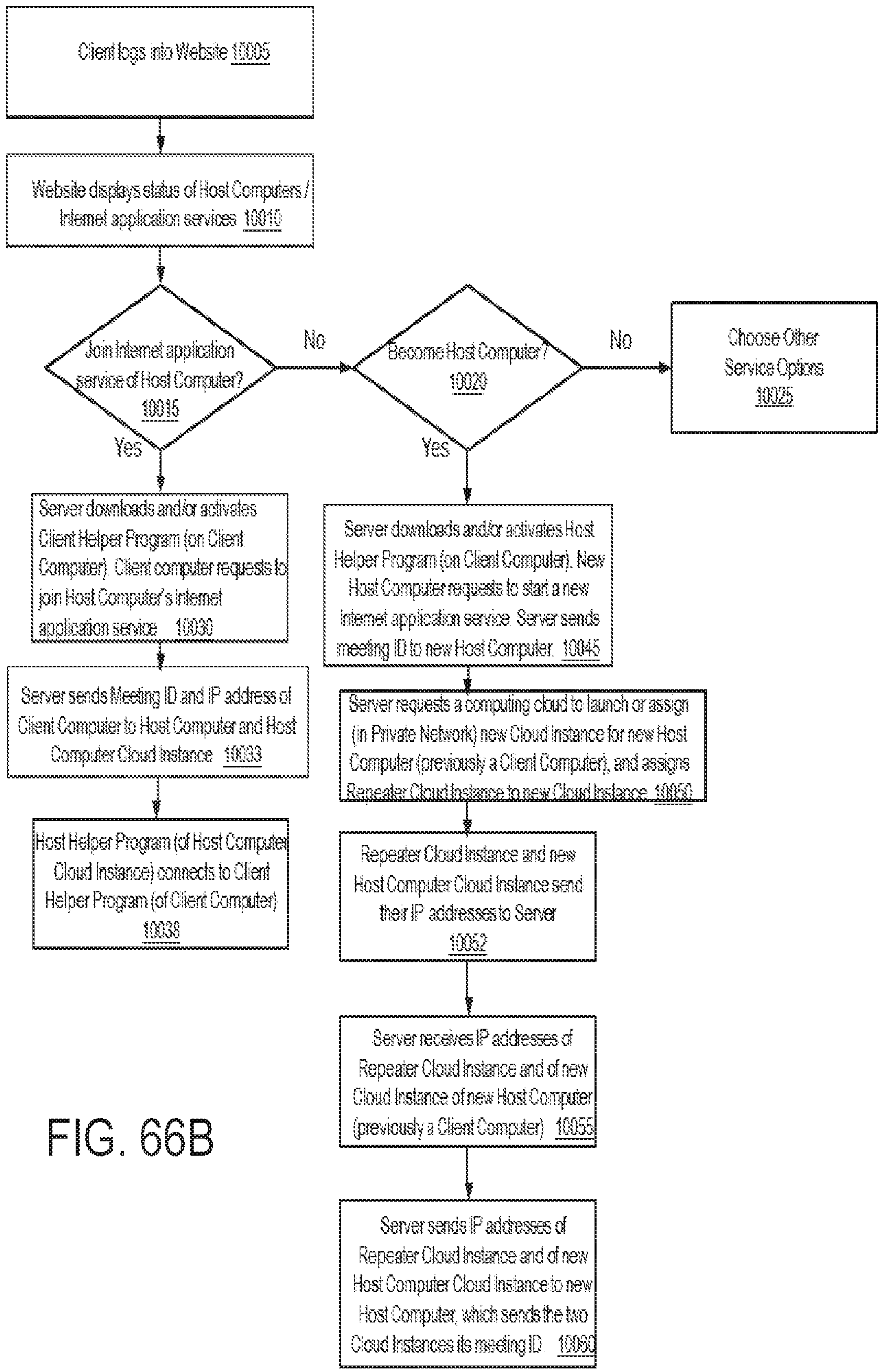

In an embodiment of the current invention illustrated in FIG. 66B, which FIG. 66B is similar to FIG. 66A, but in FIG. 66B the server 222A sends 10033 (using indirect connection 225, 230 in FIG. 63A) the IP address of the client computer 215 and the meeting ID to the host computer 205 and the host computer cloud instance 205_n_-C, which are communicatively coupled to each other. The host helper program 216-1 (of the host computer cloud instance 205_n_-C) then connects 10038 to the client helper program 216-2 (of the client computer 215). Direct data exchange 9890 (in FIG. 64B) can then occur, using direct network connection 748, 749 in FIG. 63B, between the client computer 215 and the host computer cloud instance 205_n_-C, and without going through the server 222A. The host computer 205 (in FIG. 63B) is not needed for direct data exchange 9890 in FIG. 64B.

Figure 66C:
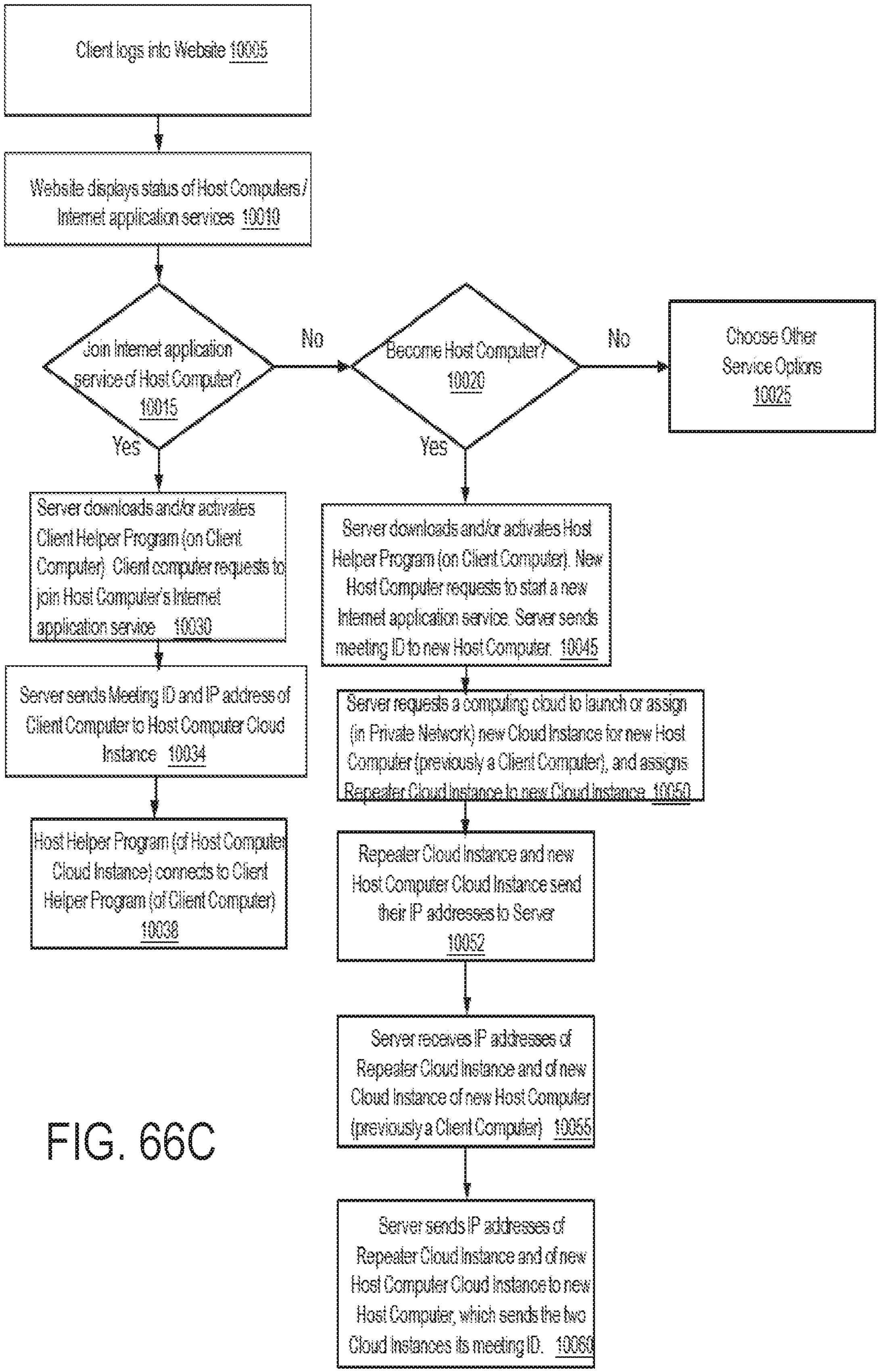

In another embodiment of the current invention illustrated in FIG. 66C, which FIG. 66C is similar to FIG. 66A, but in FIG. 66C the server 222A sends 10034 (using indirect connection 227, 230 in FIG. 63A) the IP address of the client computer 215 and the meeting ID to the host computer cloud instance 205_n_-C, which is communicatively coupled to the host computer 205. The host helper program 216-1 (of the host computer cloud instance 205_n_-C) then connects 10038 to the client helper program 216-2 (of the client computer 215). Direct data exchange 9890 (in FIG. 64C) can then occur, using direct network connection 748, 749 in FIG. 63B, between client computer 215 and host computer cloud instance 205_n_-C, and without going through the server 222A. The host computer 205 (in FIG. 63B) is not needed for direct data exchange 9890 in FIG. 64C.

Thus, in accordance with embodiments of the present invention, FIGS. 63A, 63B, 64A, 64B, 64C, 65, 66A, 66B, and 66C above illustrate creating direct network connections for Internet application service between the client computer 215 and the host computer cloud instance 205_n_-C via the Internet (including how to start the host computer cloud instance 205_n_-C).

Figure 67A:
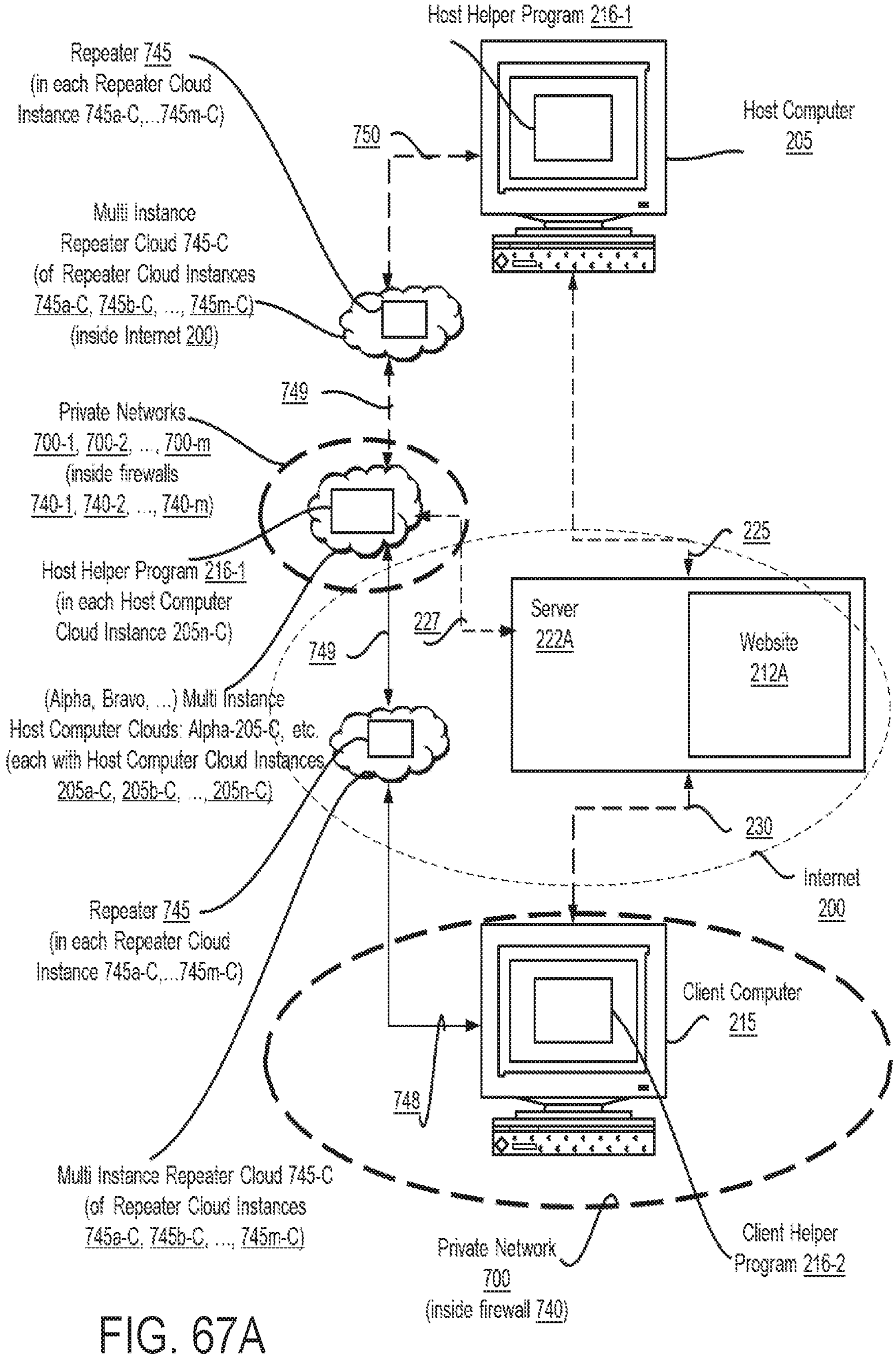
FIGS. 67A, 67B are block diagrams illustrating providing direct network connections using cloud instance for Internet application service over a computer network in accordance with another embodiment of the present invention.

FIG. 67A is adapted from FIG. 63A and illustrates a direct network connection using host computer cloud instance 205_n_-C (in a private network 700-_n_) for Internet application service between a client computer 215 (in a private network 700) and a host computer 205, in accordance with one embodiment of the present invention, suitable for providing a direct network connection when one of the networked computers does not have a unique, publicly accessible IP address. The only change in FIG. 67A from FIG. 63A is that the client computer 215 (in lieu of the host computer 205) is in a private network 700 in FIG. 67A.

Figure 69:
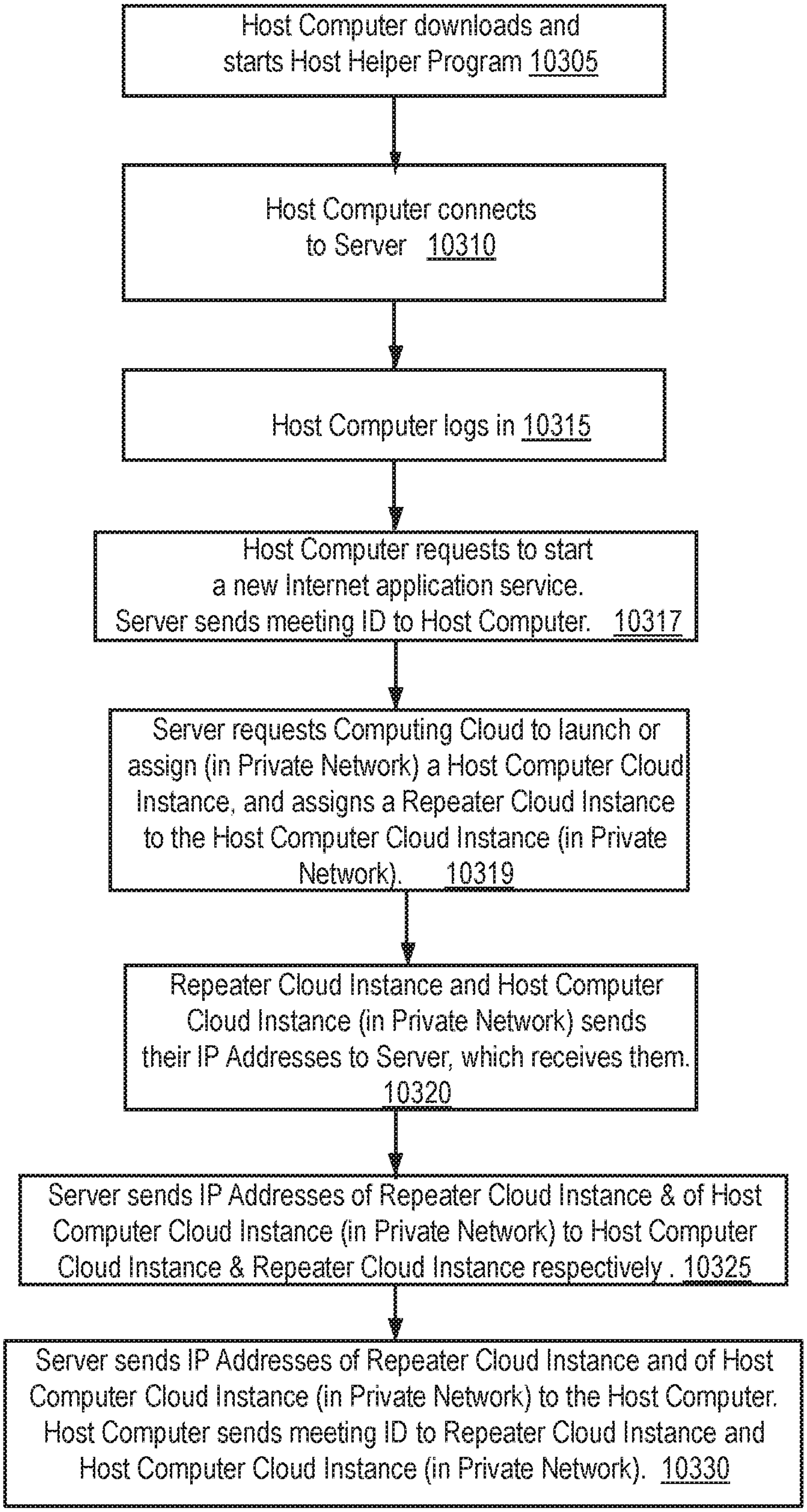

For the purpose of clarity, further details of a process for establishing a direct network connection using host computer cloud instance 205_n_-C on a private network 700-_n_ for Internet application service between a client computer 215 in a private network 700 and a host computer 205, in accordance with one embodiment of the present invention, are provided below with reference to FIGS. 68A, 69, and 104A. In other words, FIGS. 68A, 69, and 104A use meeting ID and use repeater cloud instance 745_m_-C which provides a bridge for client computer 215 between the private network 700 and the Internet 200, as explained above for the host computer cloud instance 205_n_-C (in private network 700-_n_).

It is noted that the IP address of the client computer 215 may be sent to the host computer 205 and/or the host computer cloud instance 205_n_-C using indirect connection 225, 230, or indirect connection 227, 230 (instead of using direct network connection 748, 749, 750 in FIG. 67A) in further embodiments of the current invention.

Figure 67B:
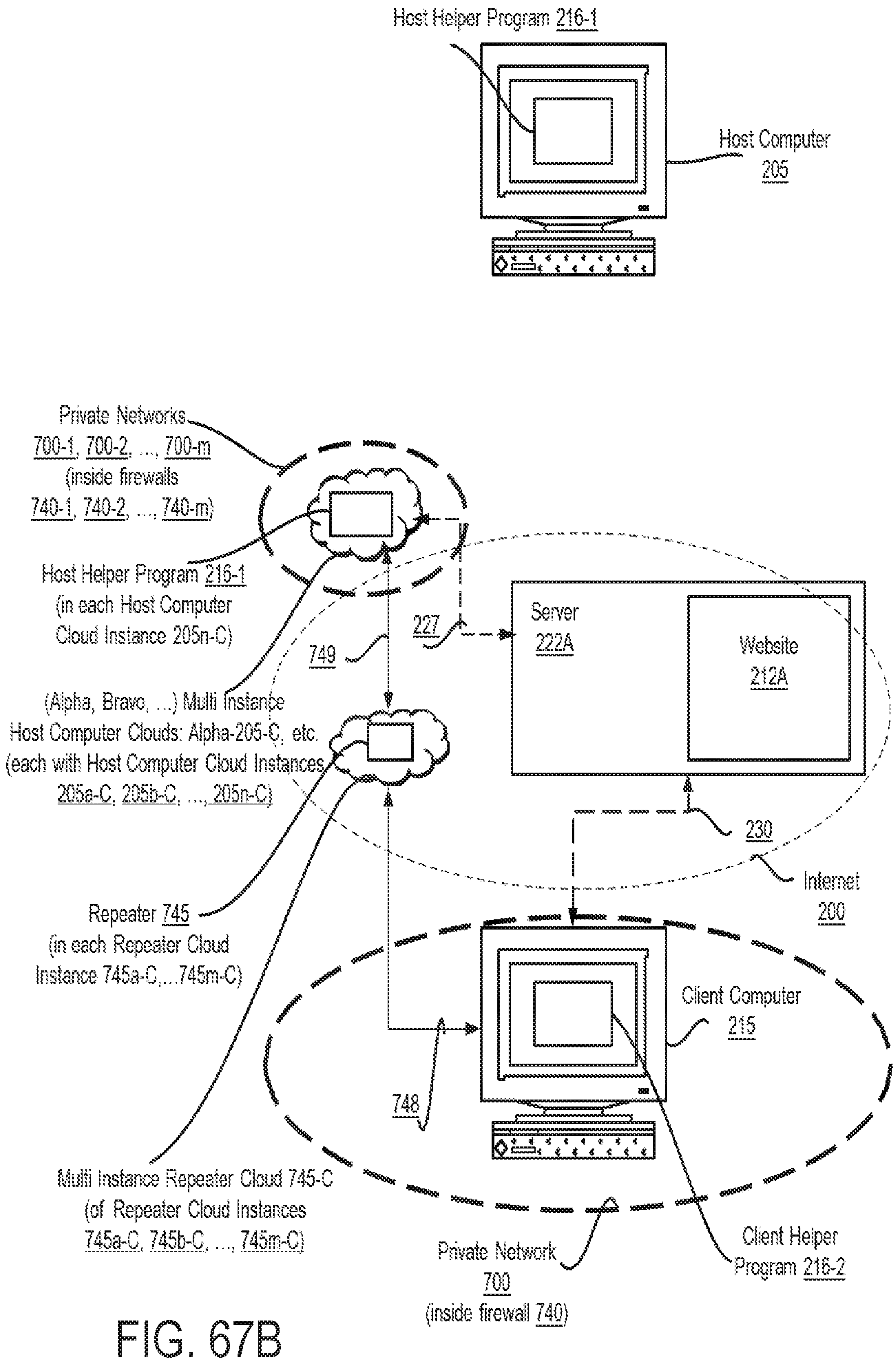

In an embodiment of the current invention illustrated in FIG. 68B, which FIG. 68B is similar to FIG. 68A, but in FIG. 68B the server 222A sends 10271 (using indirect connection 225, 230 in FIG. 67A) the IP address of the client computer 215 and meeting ID to the host computer 205, which is communicatively coupled to the host computer cloud instance 205_n_-C. The host computer cloud instance 205_n_-C therefore also gets 10273 the IP address of the client computer 215 and meeting ID. In an embodiment of the current invention, the server 222A sends 10274 to the client computer 215 (which connect 10274 to and re-send 10274 to repeater cloud instance 745_m_-C) the meeting ID, and IP addresses of repeater cloud instance 745_m_-C and of client computer 215, to allow the repeater cloud instance 745_m_-C (now connected to the client computer 215) to act as a bridge for the client computer 215 (in a private network 700 in FIG. 67A) to connect to the Internet 200 (FIG. 67A). The host computer cloud instance 205_n_-C then (using repeater cloud instance 745_m_-C now connected to client computer 215) sends 10276 its IP address and the meeting ID to client computer 215. Direct data exchange 10290 can then occur, using direct network connection 748, 749 in FIG. 67B, between client computer 215 and host computer cloud instance 205_n_-C, and without going through the server 222A. The host computer 205 (in FIG. 67B) is not needed for direct data exchange 10290 in FIG. 68B.

Figure 68C:
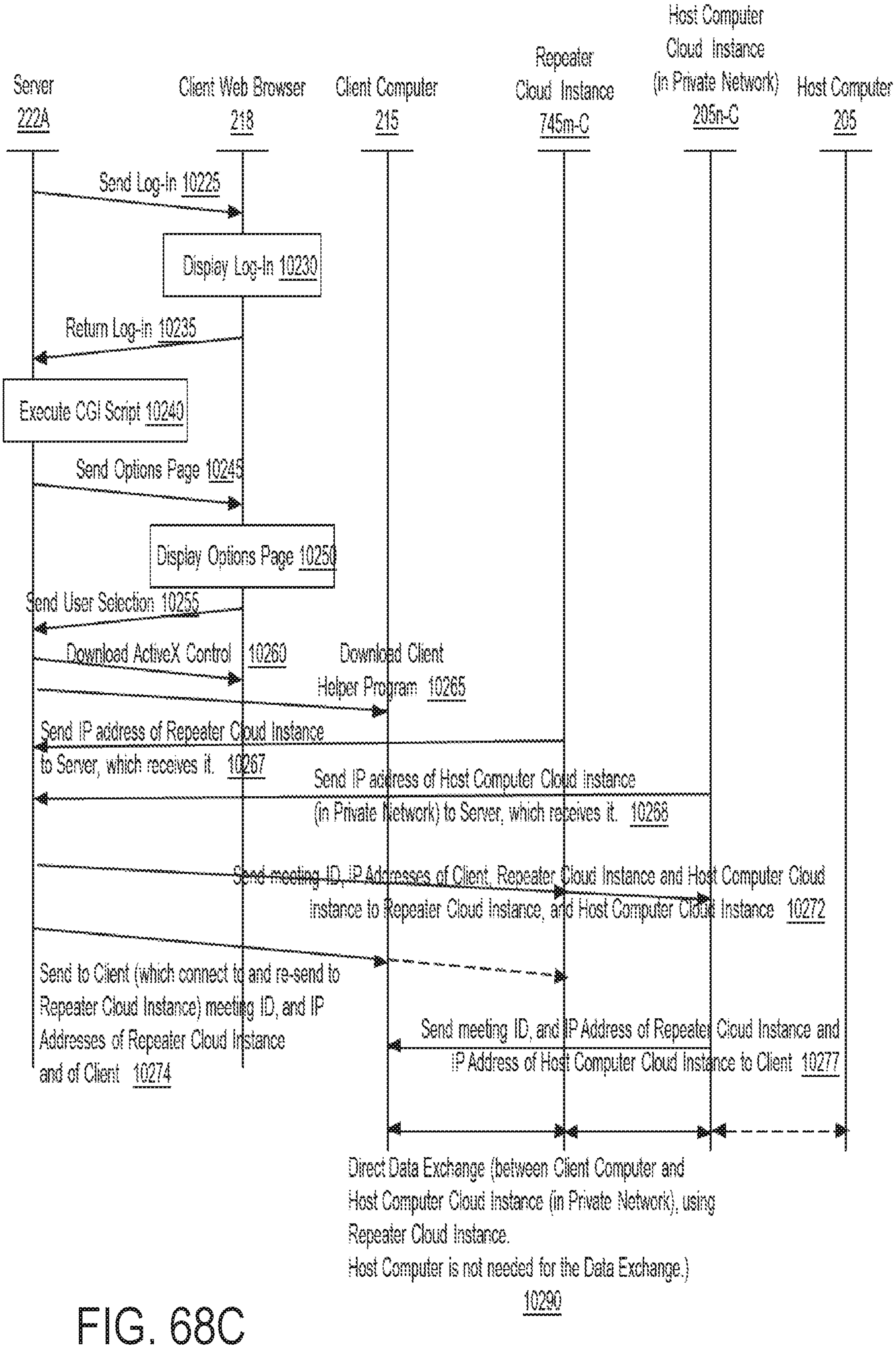

In another embodiment of the current invention illustrated in FIG. 68C, which FIG. 68C is similar to FIG. 68A, but in FIG. 68C the server 222A sends 10272 (using indirect connection 227, 230 in FIG. 67A) the IP address of the client computer 215 and meeting ID to the host computer cloud instance 205_n_-C, which is communicatively coupled to the host computer 205. In an embodiment of the current invention, the server 222A sends 10274 to the client computer 215 (which connect 10274 to and re-send 10274 to repeater cloud instance 745_m_-C) the meeting ID, and IP addresses of repeater cloud instance 745_m_-C and of client computer 215, to allow the repeater cloud instance 745_m_-C (now connected to the client computer 215) to act as a bridge for the client computer 215 (in a private network 700 in FIG. 67A) to connect to the Internet 200 (FIG. 67A). The host computer cloud instance 205_n_-C then (using repeater cloud instance 745_m_-C now connected to client computer 215) sends 10277 its IP address and the meeting ID to client computer 215. Direct data exchange 10290 can then occur, using direct network connection 748, 749 in FIG. 67B, between client computer 215 and host computer cloud instance 205_n_-C, and without going through the server 222A. The host computer 205 (in FIG. 67B) is not needed for direct data exchange 10290 in FIG. 68C.

Please note: data exchange 10290 (in FIGS. 68A, 68B, and 68C) and FIG. 67B illustrate that after the Internet application service is started 10319 (in FIG. 69), and after the server 222A receives 10320 (in FIG. 69) the IP addresses of the repeater cloud instance 745_m_-C and of the host computer cloud instance 205_n_-C (in private network), the host computer 205 is not needed to be communicatively linked 225, 750 with the server 222A or with the host computer cloud instance 205$n$-C respectively (for the client computer 215 to use the Internet application service of the host computer cloud instance 205$n$-C). Please further note: communication links 225, 750 appear in FIG. 67A, and do not appear in FIG. 67B.

Figure 70A:
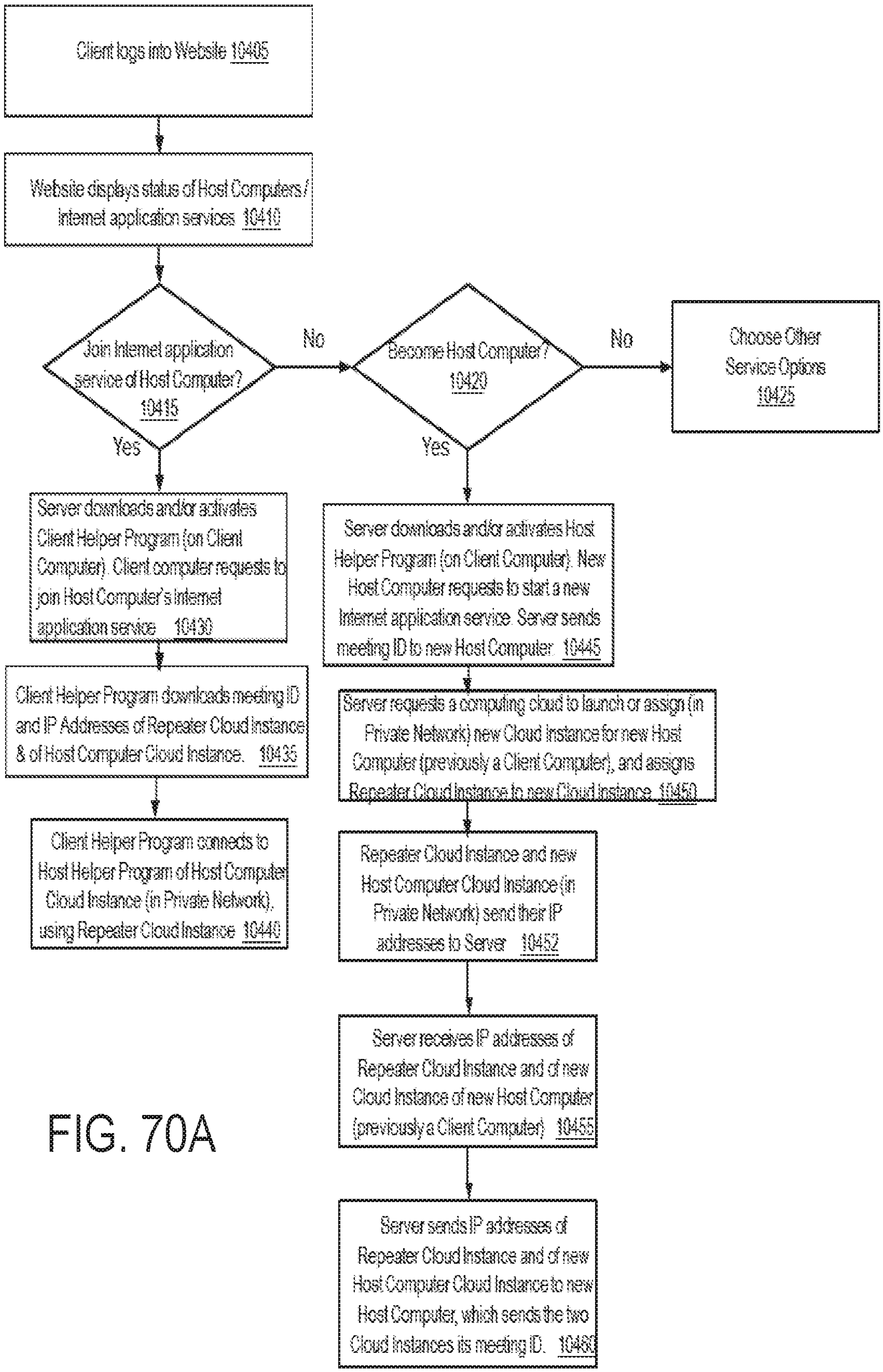
Figure 70B:
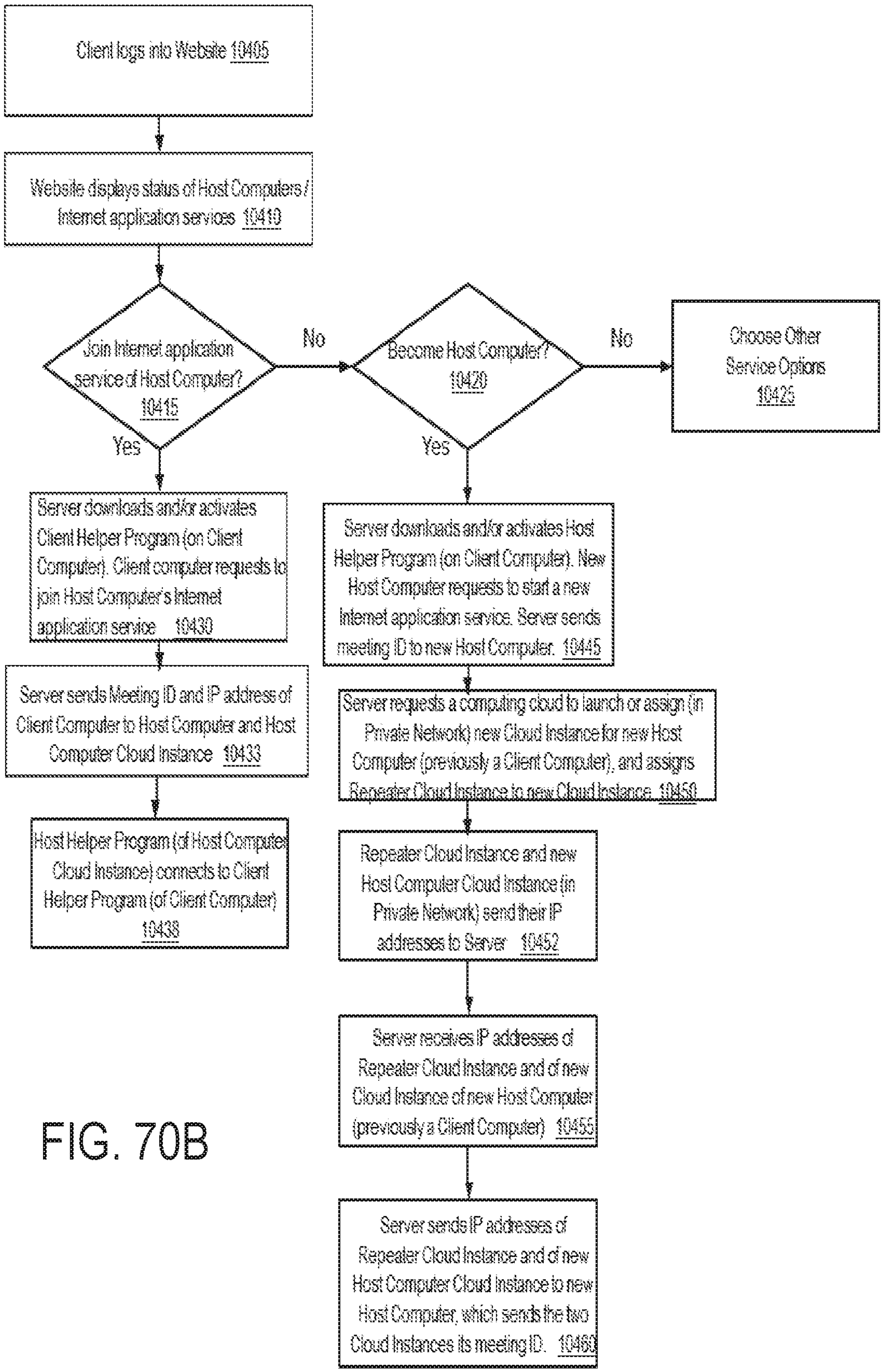

Referring to FIG. 70B, in an embodiment of the current invention illustrated in FIG. 70B, which FIG. 70B is similar to FIG. 70A, but in FIG. 70B the server 222A sends 10433 (using indirect connection 225, 230 in FIG. 67A) the IP address of the client computer 215 and the meeting ID to the host computer 205 and the host computer cloud instance 205$n$-C, which are communicatively coupled to each other. The host helper program 216-1 (of the host computer cloud instance 205$n$-C) then connects 10438 to the client helper program 216-2 (of the client computer 215). Direct data exchange 10290 (in FIG. 68B) can then occur, using direct network connection 748, 749 in FIG. 67B, between the client computer 215 and the host computer cloud instance 205$n$-C, and without going through the server 222A. The host computer 205 (in FIG. 67B) is not needed for direct data exchange 10290 in FIG. 68B.

Figure 70C:
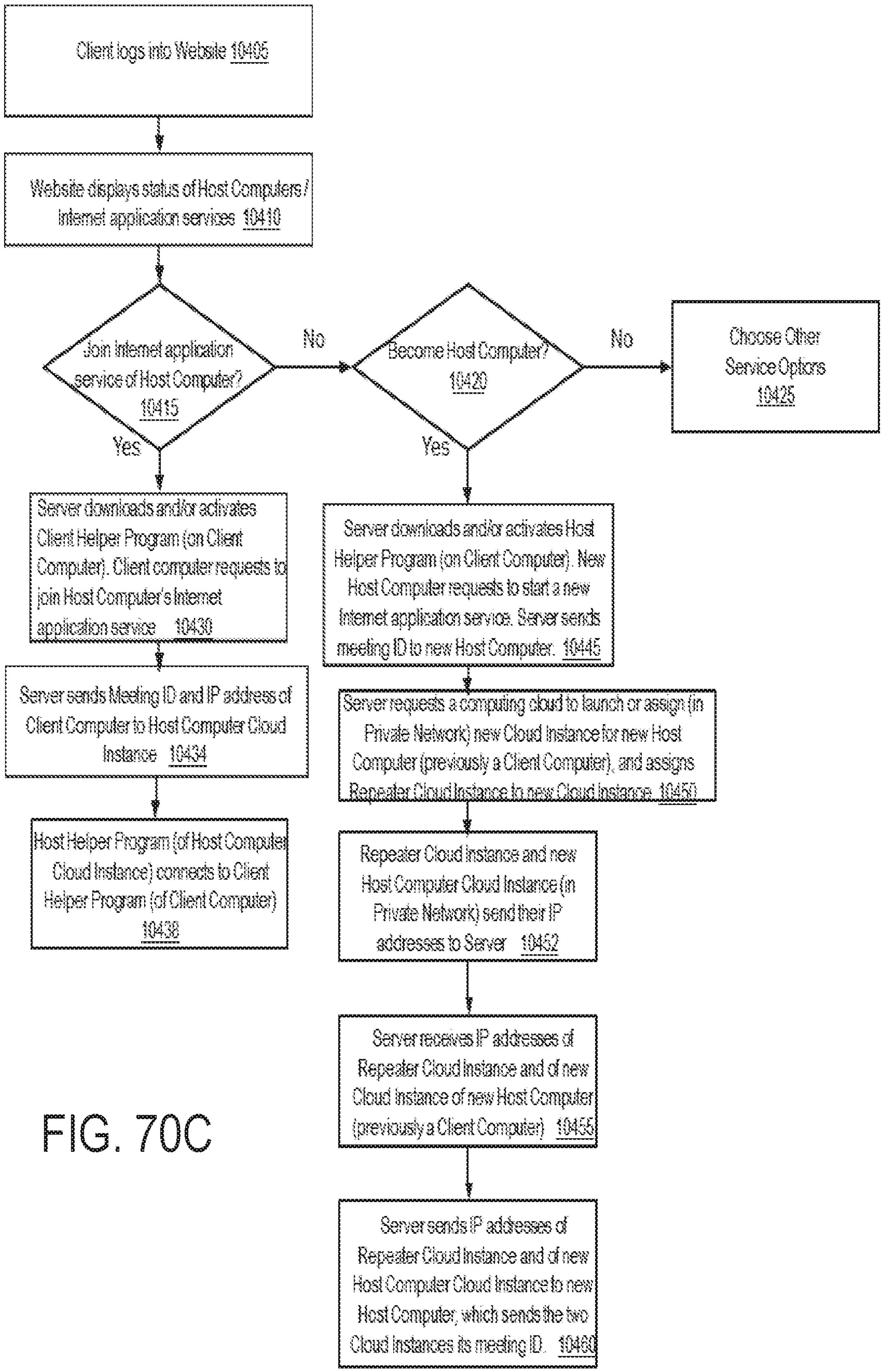

In another embodiment of the current invention illustrated in FIG. 70C, which FIG. 70C is similar to FIG. 70A, but in FIG. 70C the server 222A sends 10434 (using indirect connection 227, 230 in FIG. 67A) the IP address of the client computer 215 and the meeting ID to the host computer cloud instance 205$n$-C, which is communicatively coupled to the host computer 205. The host helper program 216-1 (of the host computer cloud instance 205$n$-C) then connects 10438 to the client helper program 216-2 (of the client computer 215). Direct data exchange 10290 (in FIG. 68C) can then occur, using direct network connection 748, 749 in FIG. 67B, between client computer 215 and host computer cloud instance 205$n$-C, and without going through the server 222A. The host computer 205 (in FIG. 67B) is not needed for direct data exchange 10290 in FIG. 68C.

Thus, in accordance with an embodiment of the present invention, FIGS. 67A, 67B, 68A, 68B, 68C, 69, 70A, 70B, and 70C above illustrate creating direct network connections for Internet application service between the client computer 215 and the host computer cloud instance 205$n$-C via the Internet (including how to start the host computer cloud instance 205$n$-C).

Figure 71A:
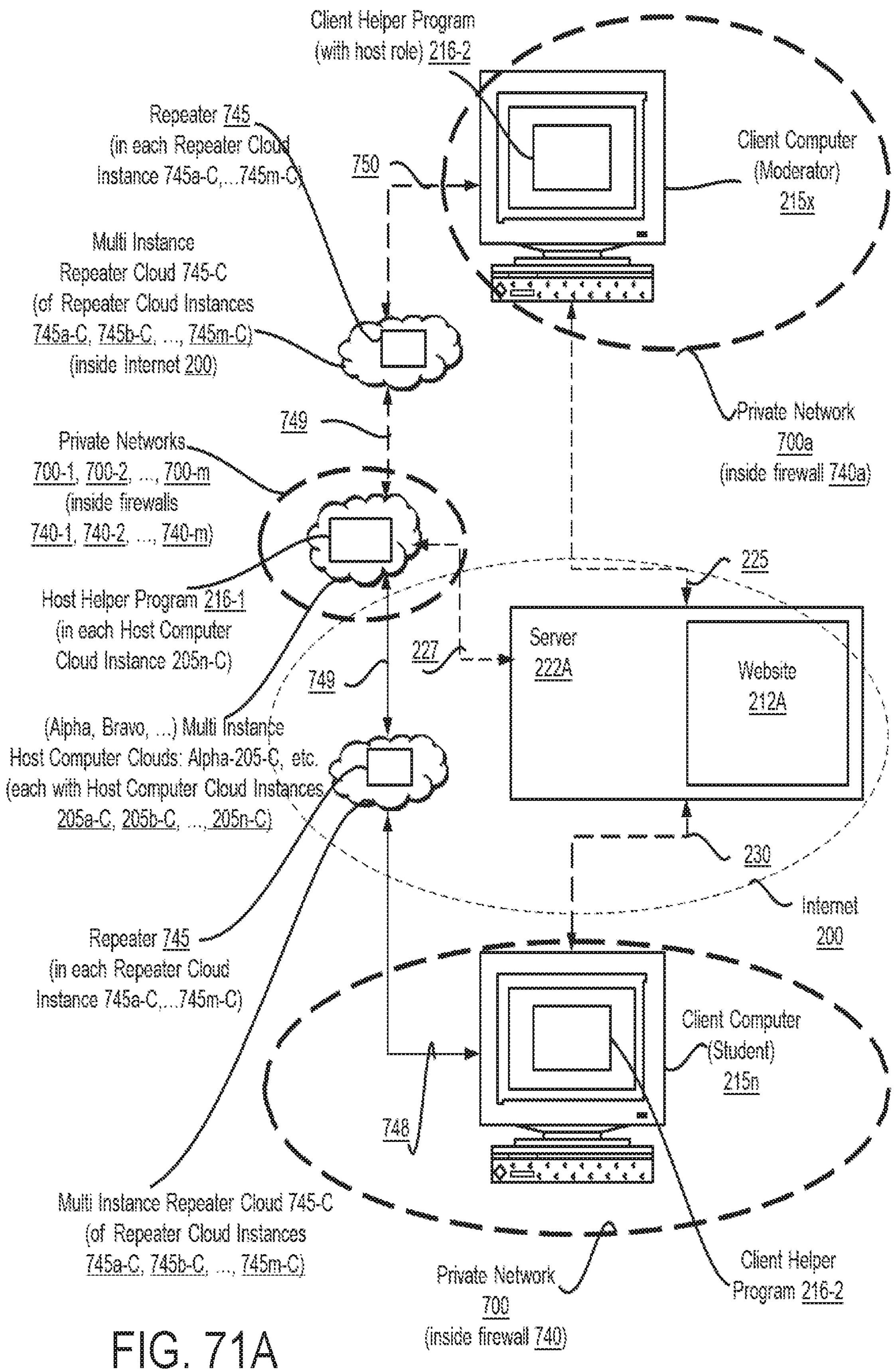
FIGS. 71A, 71B are block diagrams illustrating providing direct network connections using cloud instance for Internet application service over a computer network in accordance with another embodiment of the present invention.

FIG. 71A is adapted from FIG. 59A and illustrates a direct network connection using host computer cloud instance 205$n$-C (in a private network 700-$n$) for Internet application service between a client computer 215 in a private network 700$b$ and a client computer (moderator) 215$x$ running client helper program (with host role) 216-2 in a private network 700$a$.

Figure 72A:
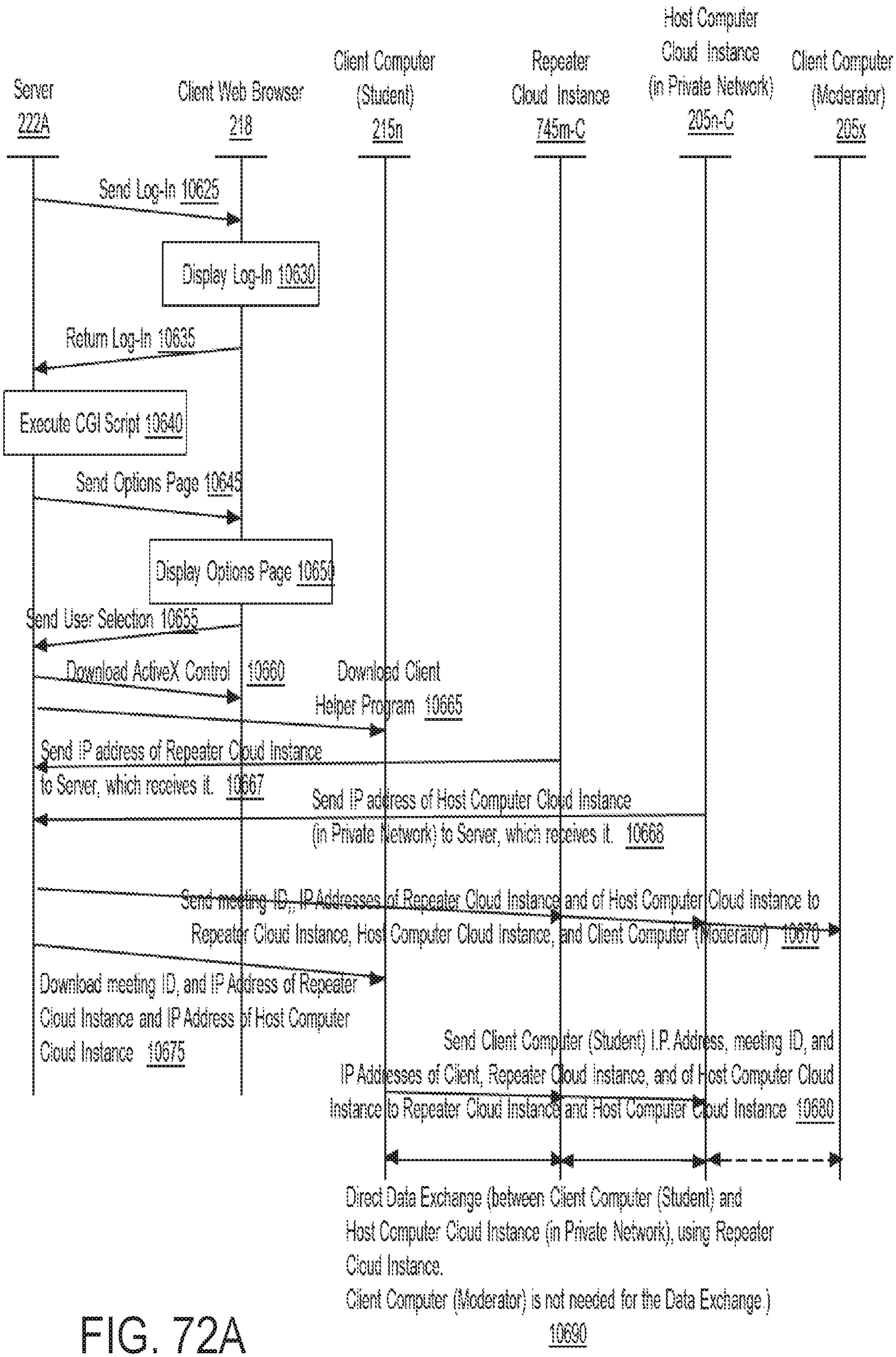
FIGS. 72A, 72B, 72C, 73, 74A, 74B, 74C are flowcharts illustrating providing direct network connections using cloud instance for Internet application service over a computer network in accordance with an embodiment of the present invention.
Figure 73:
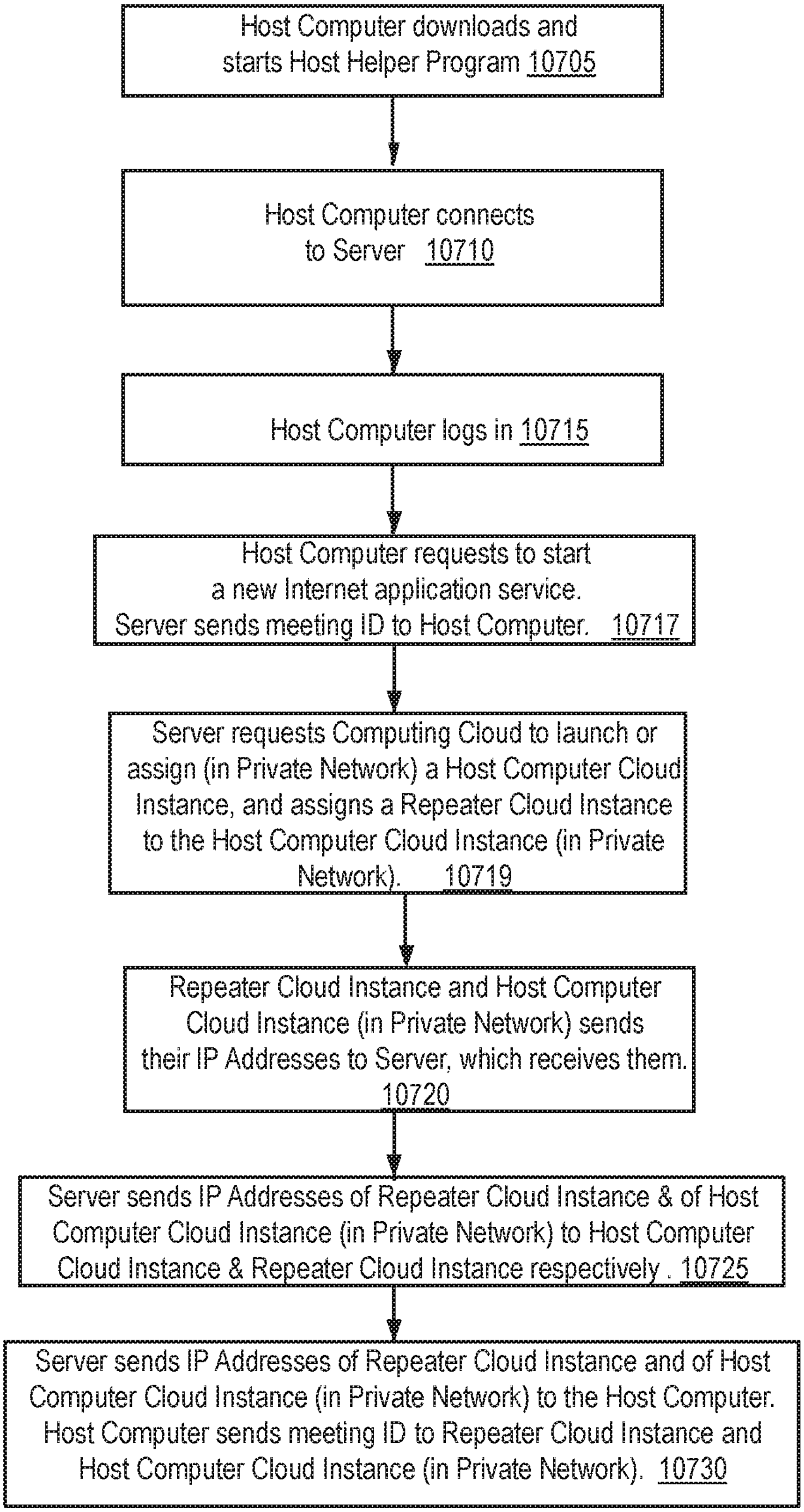
Figure 74A:
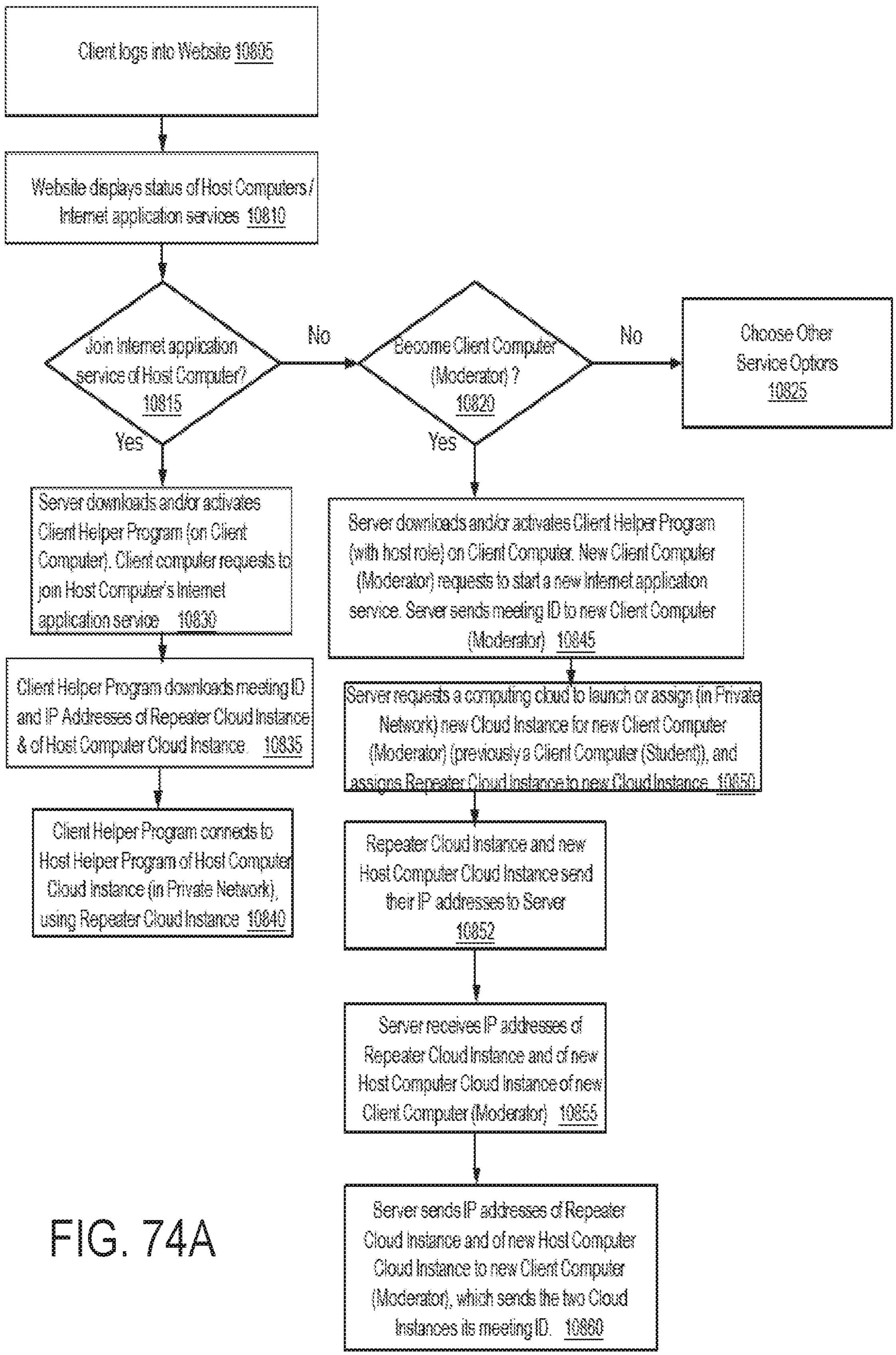
Figure 74B:
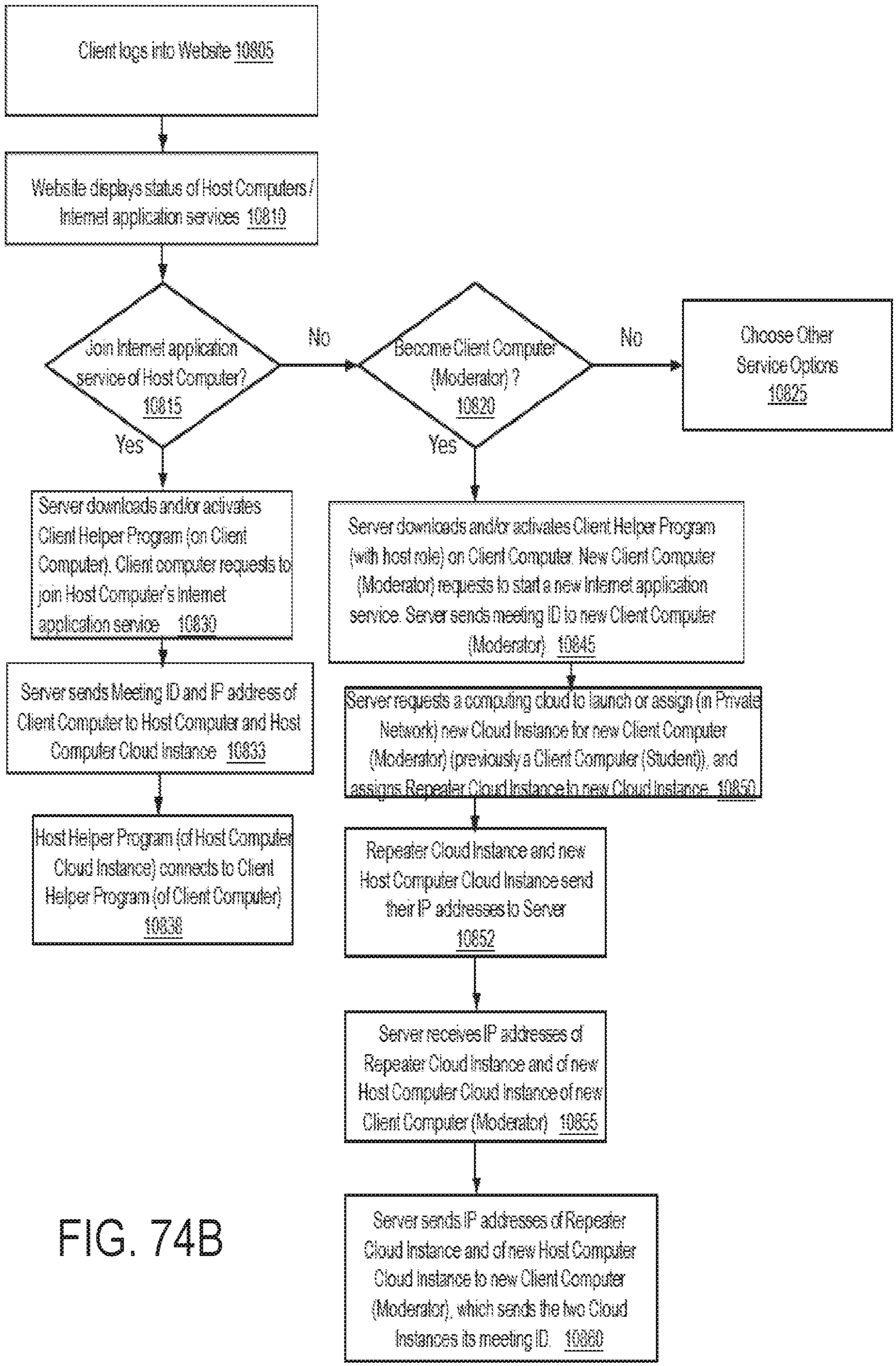
Figure 74C:
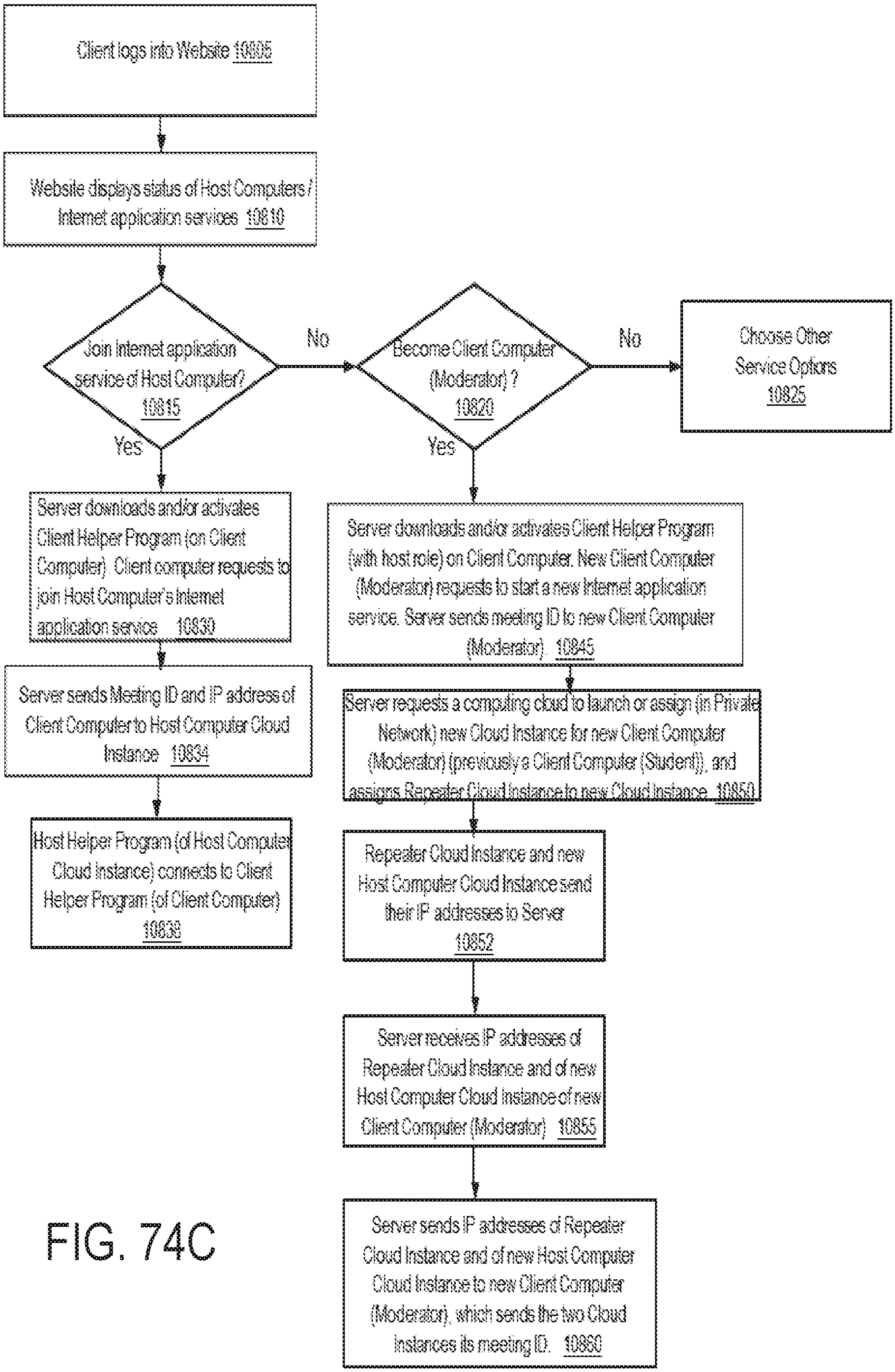

For the purpose of clarity, further details of a process for establishing a direct network connection using host computer cloud instance 205$n$-C on a private network 700-$n$ for Internet application service between a client computer (student) 215$n$ in a private network 700$b$ and a client computer (moderator) 215$x$ running client helper program (with host role) 216-2 in a private network 700$a$, in accordance with one embodiment of the present invention, are provided above with reference to FIGS. 72A, 73, and 108A. In other words, FIGS. 72A, 73, and 108A use meeting ID and use repeater cloud instance 745$m$-C which provide bridges for (i) the client computer (moderator) 215$x$ running client helper program (with host role) 216-2 in a private network 700$a$ and the host computer cloud instance 205$n$-C (in private network 700-$n$), and (ii) the client computer (student) 215$n$ in a private network 700$b$ and the host computer cloud instance 205$n$-C (in private network 700-$n$).

It is noted that the IP address of the client computer 215$n$ may be sent to the client computer 215$x$ (moderator, with host role, in FIG. 71A) and/or the host computer cloud instance 205$n$-C using indirect connection 225, 230, or indirect connection 227, 230 (instead of using direct network connection 748, 749, 750 in FIG. 71A) in further embodiments of the current invention.

Figure 71B:
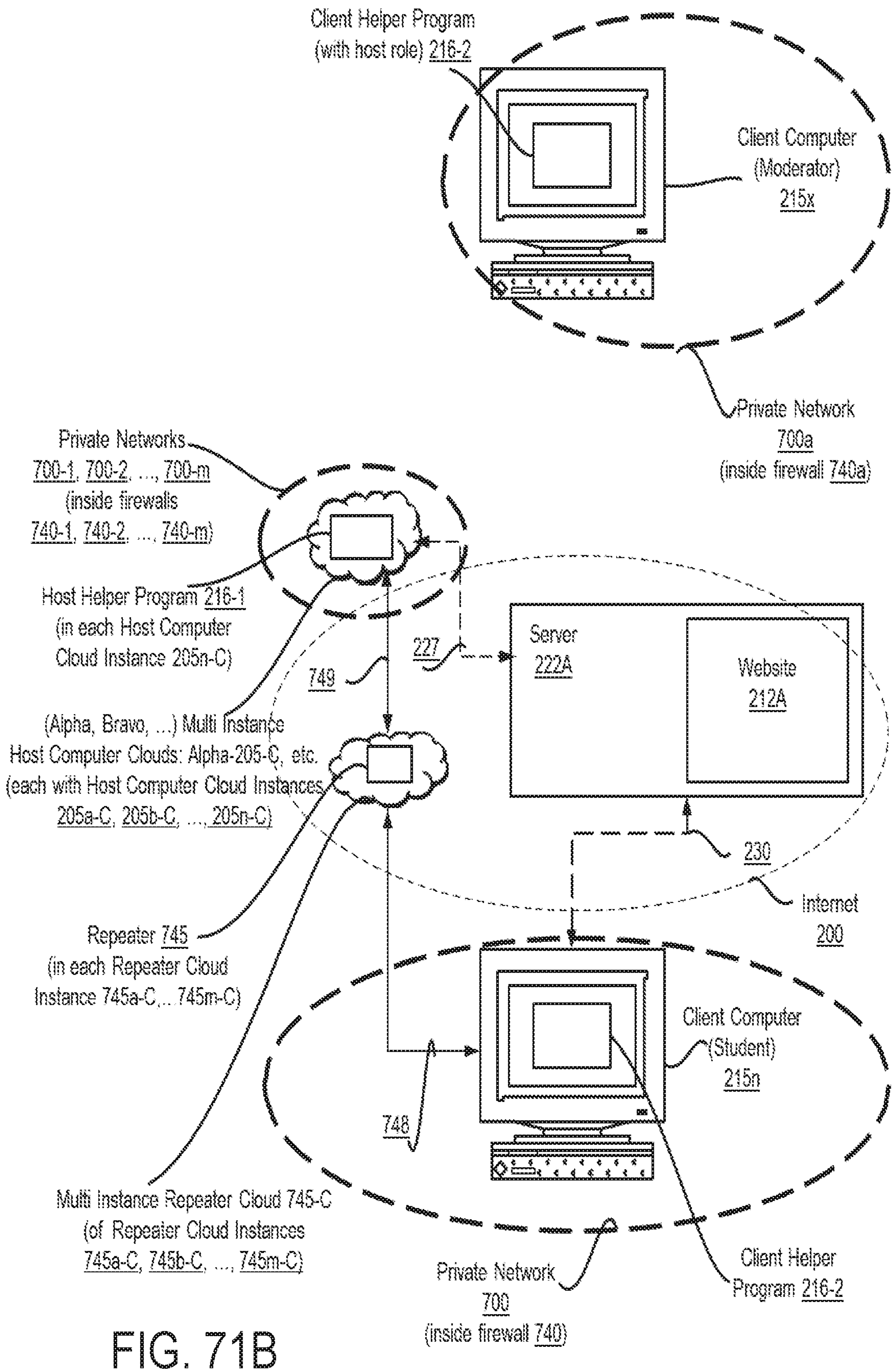
Figure 72B:
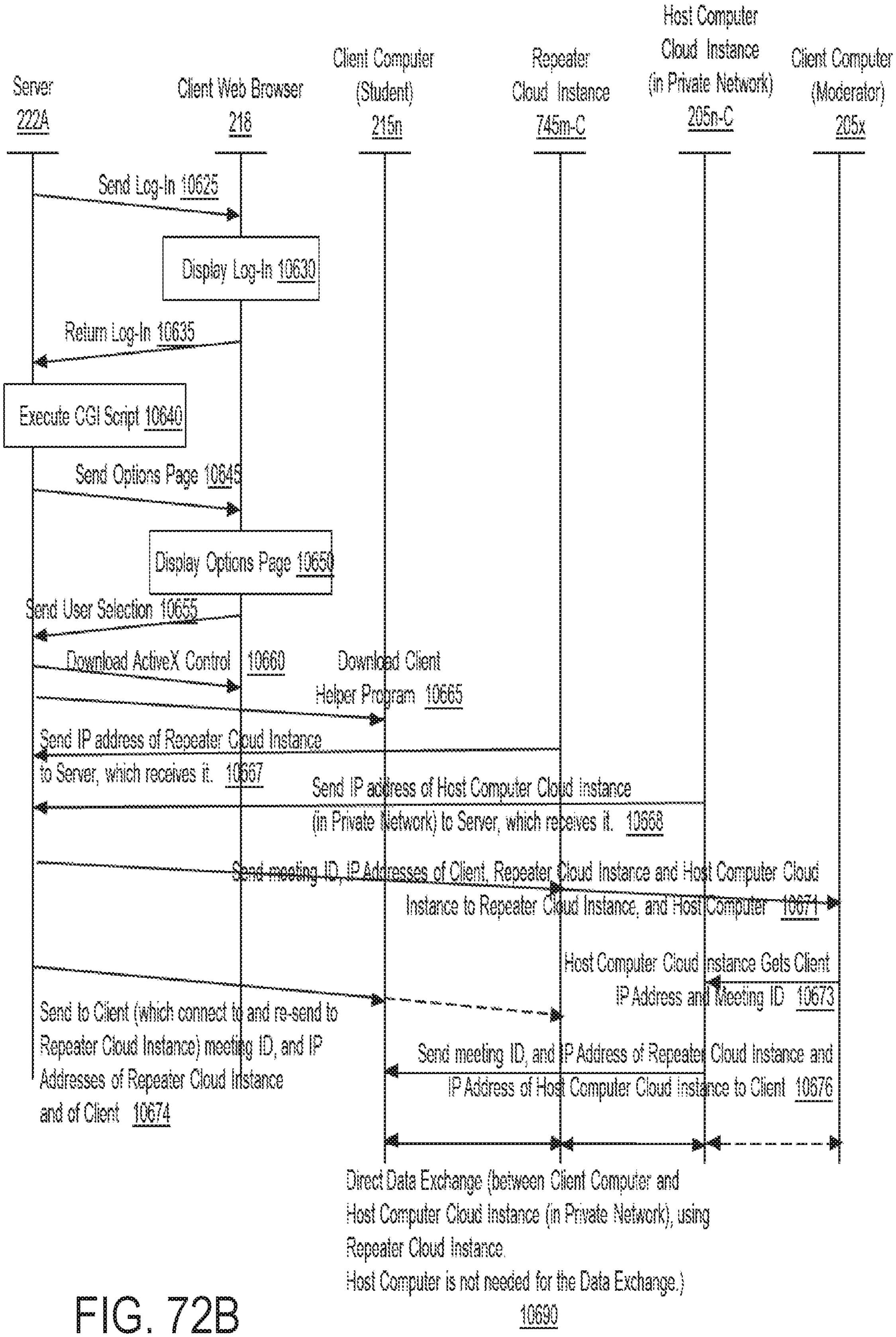

In an embodiment of the current invention illustrated in FIG. 72B, wich FIG. 72B is similar to FIG. 72A, but in FIG. 72B the server 222A sends 10671 (using indirect connection 225, 230 in FIG. 71A) the IP address of the client computer 215$n$ and meeting ID to the client computer 215$x$ (moderator, with host role, in FIG. 71A), which is communicatively coupled to the host computer cloud instance 205$n$-C. The host computer cloud instance 205$n$-C therefore also gets 10673 the IP address of the client computer 215 and meeting ID. In an embodiment of the current invention, the server 222A sends 10674 to the client computer 215$n$ (which connect 10674 to and re-send 10674 to repeater cloud instance 745$m$-C) the meeting ID, and IP addresses of repeater cloud instance 745$m$-C and of client computer 215$n$, to allow the repeater cloud instance 745$m$-C (now connected to the client computer 215$n$) to act as a bridge for the client computer 215$n$ (in a private network 700$b$ in FIG. 71A) to connect to the Internet 200 (FIG. 71A). The host computer cloud instance 205$n$-C then (using repeater cloud instance 745$m$-C now connected to client computer 215$n$) sends 10676 its IP address and the meeting ID to client computer 215$n$. Direct data exchange 10690 can then occur, using direct network connection 748, 749 in FIG. 71B, between client computer 215$n$ and host computer cloud instance 205$n$-C, and without going through the server 222A. The client computer 215$x$ (moderator, with host role, in FIG. 71B) is not needed for direct data exchange 10690 in FIG. 72B.

Figure 72C:
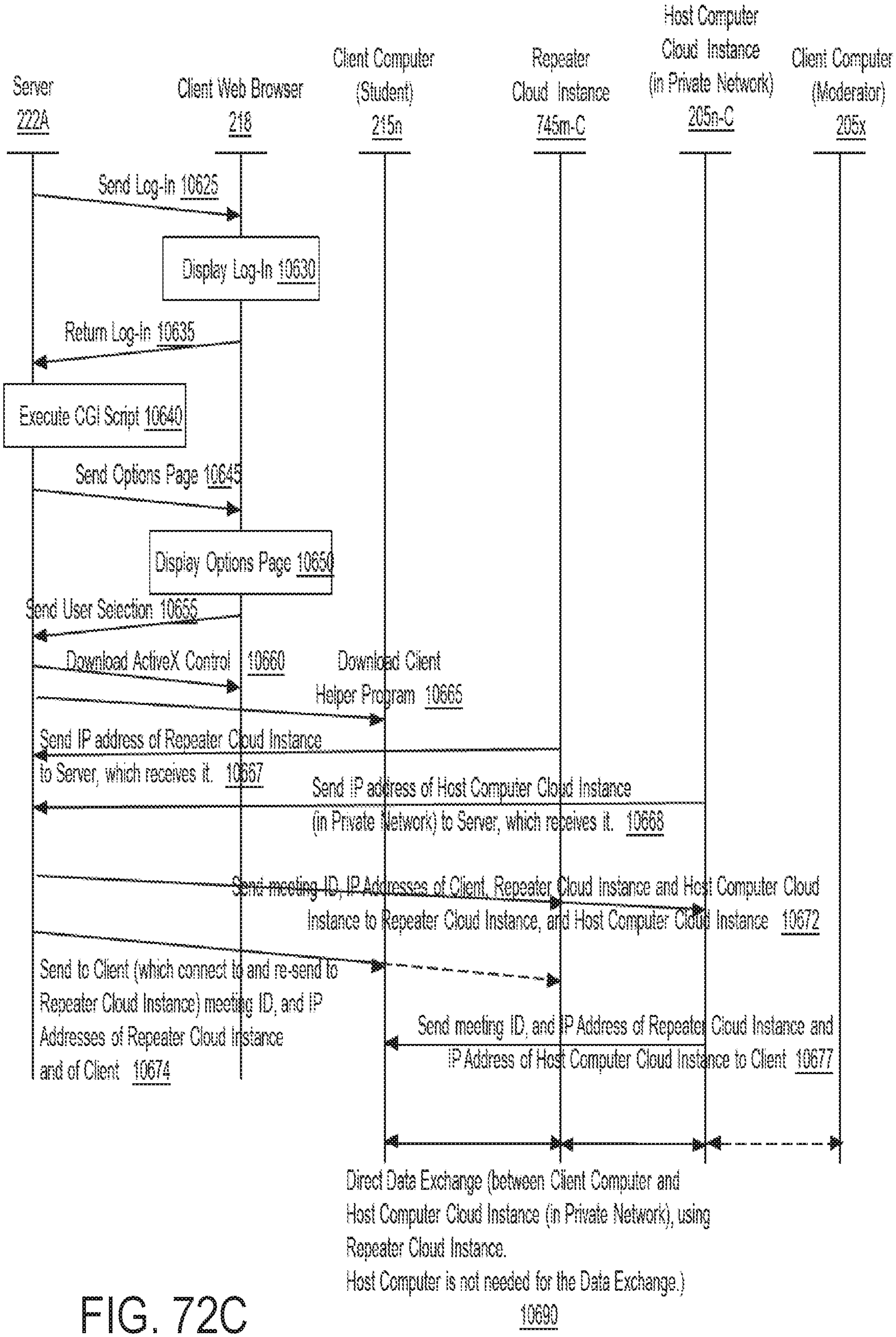

In another embodiment of the current invention illustrated in FIG. 72C, which FIG. 72C is similar to FIG. 72A, but in FIG. 72C the server 222A sends 10672 (using indirect connection 227, 230 in FIG. 71A) the IP address of the client computer 215$n$ and meeting ID to the host computer cloud instance 205$n$-C, which is communicatively coupled to the client computer 215$x$ (moderator, with host role, in FIG. 71A). In an embodiment of the current invention, the server 222A sends 10674 to the client computer 215$n$ (which connect 10674 to and re-send 10674 to repeater cloud instance 745$m$-C) the meeting ID, and IP addresses of repeater cloud instance 745$m$-C and of client computer 215$n$, to allow the repeater cloud instance 745$m$-C (now connected to the client computer 215$n$) to act as a bridge for the client computer 215$n$ (in a private network 700$b$ in FIG. 71A) to connect to the Internet 200 (FIG. 71A). The host computer cloud instance 205$n$-C then (using repeater cloud instance 745$m$-C now connected to client computer 215$n$) sends 10677 its IP address and the meeting ID to client computer 215$n$. Direct data exchange 10690 can then occur, using direct network connection 748, 749 in FIG. 71B, between client computer 215$n$ and host computer cloud instance 205$n$-C, and without going through the server 222A. The client computer 215$x$ (moderator, with host role, in FIG. 71B) is not needed for direct data exchange 10690 in FIG. 72C.

Please note: data exchange 10690 (in FIGS. 72A, 72B, and 72C) and FIG. 71B illustrate that after the Internet application service is started 10719 (in FIG. 107), and after the server 222A receives 10720 (in FIG. 107) the IP addresses of the repeater cloud instance 745$m$-C and of the host computer cloud instance 205$n$-C (in private network), the client computer (moderator) 215$x$ is not needed to be communicatively linked 225, 750 with the server 222A or with the host computer cloud instance 205$n$-C respectively (for the client computer (student) 215$n$ to use the Internet application service of the host computer cloud instance 205$n$-C). Please further note: communication links 225, 750 appear in FIG. 71A, and do not appear in FIG. 71B.

Thus, in accordance with embodiments of the present invention, FIGS. 71A, 71B, 72A, 72B, 72C, 107, 108A, 108B, and 108C above illustrate creating direct network connections for Internet application service between the client computer 215$n$ and the host computer cloud instance 205$n$-C via the Internet (including how to start the host computer cloud instance 205$n$-C).

More on URL Forward or Redirect to Another URL

Figure 75C:
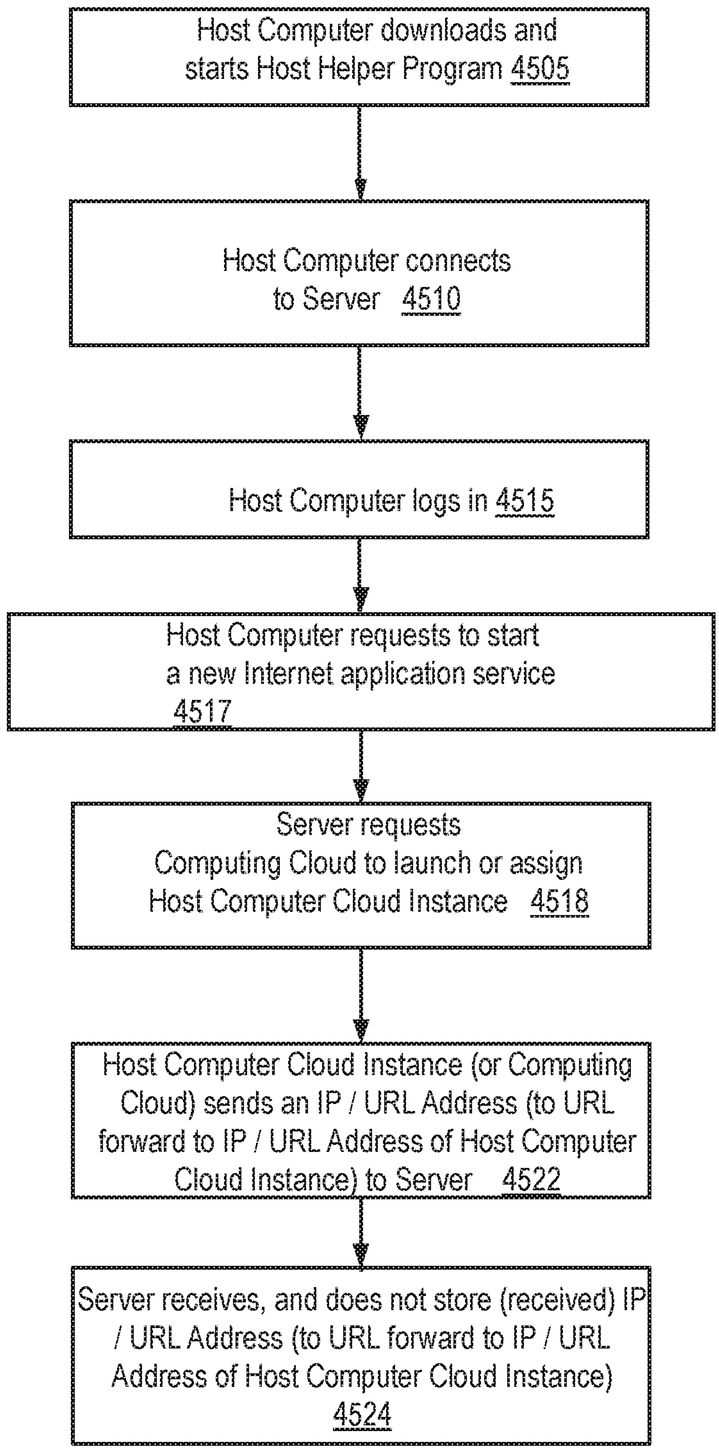
FIGS. 75C, 76A, 76B are flowcharts illustrating providing direct network connections using cloud instance for Internet application service over a computer network in accordance with an embodiment of the present invention.

Now referring to FIG. 75A, the six cases of examples "1" to "6" illustrate (cloud) URL forward or redirect to another URL in September 2015 in Hong Kong (The (cloud) URL forward may be different at other times and/or places to allow cloud dynamic resource allocation.):

In example "1" (row "b" of FIG. 75A), URL: "http://test.moodlecloud.com" (row "b", column "B"), when entered in address bar of an Internet browser, is URL forwarded by a server (not shown) to URL: "http://us-moodlecloud-100165812.us-west-2.elb.amazonaws.com" (row "b", column "C").

It is noted that server doing URL forward in example "I" above may or may not be same as the server 222A referred to in this invention.

In example "2" (row "c" of FIG. 75A), URL: "http://test1.moodlecloud.com" (row "c", column "B"), when entered in address bar of an Internet browser, is URL forwarded by a server (not shown) to URL: "http://au-moodlecloud-1086023927.ap-southeast-2.elb.amazonaws.com" (row "c", column "C").

It is noted that server doing URL forward in example "2" above may or may not be server 222A referred to in this invention.

In example "3" (row "d" of FIG. 75A), URL: "http://moodle.moodlecloud.com" (row "d", column "B"), when entered in address bar of an Internet browser, is URL forwarded by a server (not shown) to URL: "http://au-moodlecloud-1086023927.ap-southeast-2.elb.amazonaws.com" (row "c", column "C").

It is noted that server doing URL forward in example "3" above may or may not be same as the server 222A referred to in this invention.

In example "4" (row "e" of FIG. 75A), URL: "http://www.google.com" (row "e", column "B"), when entered in address bar of an Internet browser, is URL forwarded by a server (not shown) to URL: "http://www.google.com.hk/?gfe_rd=cr&ei=KAWCV-ncPNPC8gfthbz4DA" (row "e", column "C").

It is noted that server doing URL forward in example "4" above may or may not be same as the server 222A referred to in this invention.

In example "5" (row "f" of FIG. 75A), URL: "http://ldrv.ms/w/s!Ak-sYjFXEtpAgxJSqb2Yyytxg_Re" (row "f", column "B"), when entered in address bar of an Internet browser, is URL forwarded by a server (not shown) to URL: "http://onedrive.live.com/view.aspx?resid=40DA12573162AC4F!402&ithint=file%2cdocx&app=Word&authkey=!AFKpvZjLK3G-D9F4" (row "f" column "C")").

It is noted that server doing URL forward in example "5" above may or may not be same as the server 222A referred to in this invention.

In example "6" (row "g" of FIG. 75A), URL: "http://drv.ms/b/s!AksYjFXEtpAgxTKHmxDUjEFiHbQ" (row "f", column "B"), when entered in address bar of an Internet browser, is URL forwarded by a server (not shown) to URL: "http://onedrive.live.com/?authkey=%21AMoebENSMQWIdtA&cid=40DA125731-62AC4F&id=40DA12573162AC4F%21404&pard=40DA12573162AC4F%21238&o=OneUp" (row "g", column "C")").

It is noted that server doing URL forward in example "6" above may or may not be same as the server 222A referred to in this invention.

URL forward can be adapted and used in an embodiment of the current invention (e.g. illustrated in FIGS. 75C, 110A, 110B) to provide direct network connections using cloud instance for Internet application service over a computer network.

Technically, URL forward is performed on server (e.g. server 222A) side and URL redirect is performed on client (e.g. client computer 215) side. When an URL is forwarded, the server (e.g. server 222A) forwards the URL request to another server, and allows it to handle the request. This can be totally transparent as far as the client (e.g. client computer 215) is concerned and the forwarded-URL can even be masked. For example, if URL: http://example.com is forwarded to URL: http://example.net, the client will still see http://example.com in the address bar (of its Internet browser) whilst it actually browses http://example.net.

When an URL is redirected, a response is issued back to the client (e.g. client computer 215) telling it to go elsewhere. For example, if the client navigates to http://example.com and one URL redirects it to http://example.net, one generally sends a 30x (301, 302, etc.) http status code response with the address one want it to go to. The client's browser then makes a second request to http://example.net and navigates there manually. The client will see http://example.net (changed from http://example.com) in the address bar (of its Internet browser). Forwarding an URL is equivalent to redirecting an URL. They are the same concept. One can use the words interchangeably.

Comparing URL to IP address, it is noted that:

(i). An IP address just specifies the location while an URL specifies location, protocol, and specific resource:

(ii). URL requires a DNS server while an IP address doesn't;

(iii). URLs are unlimited while IP addresses are limited;

(iv). IP addresses and URLs have a one to many relationship. For purpose of this invention, I.P. address is equivalent to URL and they may be used interchangeably in the specifications, diagrams, claims, and embodiments of this invention.

Use of the term "uniform resource locator (URL) forward" in the specifications, diagrams, claims, and embodiments of this invention also means "internet protocol (I.P. or IP) address forward", i.e. IP address forward and URL forward may be used interchangeably herein.

It is noted that IP forwarding is IP routing and (IP forwarding) technically is not identical to internet protocol (I.P. or IP) address forward used in this invention, It is noted that an I.P./URL address may be forwarded to I.P./URL address of a host computer cloud instance 205-C. An example is illustrated in an embodiment of the current invention in FIG. 75C, which is adapted from FIG. 28. New steps 4522 and 4524 are added in FIG. 75C to have host computer cloud instance 205-C (in FIG. 24A) sending 4522 (in FIG. 75C) an I.P./URL address (to URL forward to the I.P./URL address of host computer cloud instance 205-C) to server 222A (in FIG. 24A), which receives 4524 it and does not store 4524 it in FIG. 75C (but may store later, not shown). Steps 4520 and 4525 (from FIG. 28) are deleted from FIG. 75C. The storing or not storing of the above received I.P./URL address in the server 222A is further described in Cases I to L in FIG. 50 and Para [0342B], [0343B], [0344B], and [0345B].

Similarly, it is noted that an I.P./URL address may be I.P./URL forwarded to I.P./URL address of a client computer 215 in further embodiments of the current invention illustrated in FIGS. 76A and 76B and described below.

Figure 76A:
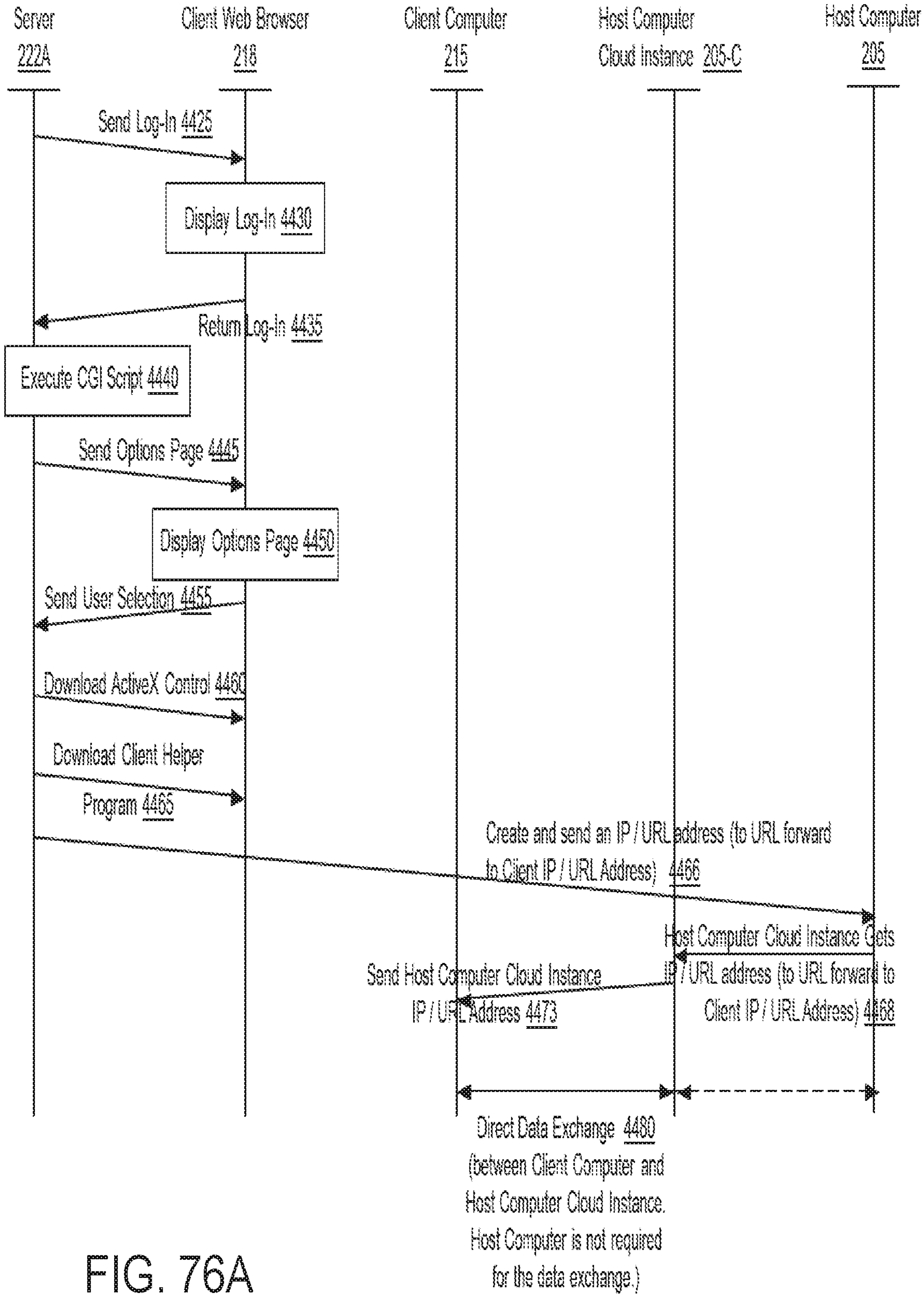

An example illustrating an I.P./URL address forwarding to I.P./URL address of a client computer 215 is in an embodiment of the current invention in FIG. 76A, which is adapted from FIG. 27B. New step 4466 is added to FIG. 76A to have server 222A (in FIGS. 24A and 76A) creating 4466 and sending 4466 (in FIG. 76A) an I.P./URL address (to URL forward to I.P. address of client computer 215) to host computer 205, which is communicatively coupled to host computer cloud instance 205-C. Thus, host computer cloud instance 205-C gets in new step 4468 (in FIG. 76A) above I.P./URL address (to URL forward to I.P./URL address of client computer 215). Step 4467 (from FIG. 27B) is deleted from FIG. 76A.

Figure 76B:
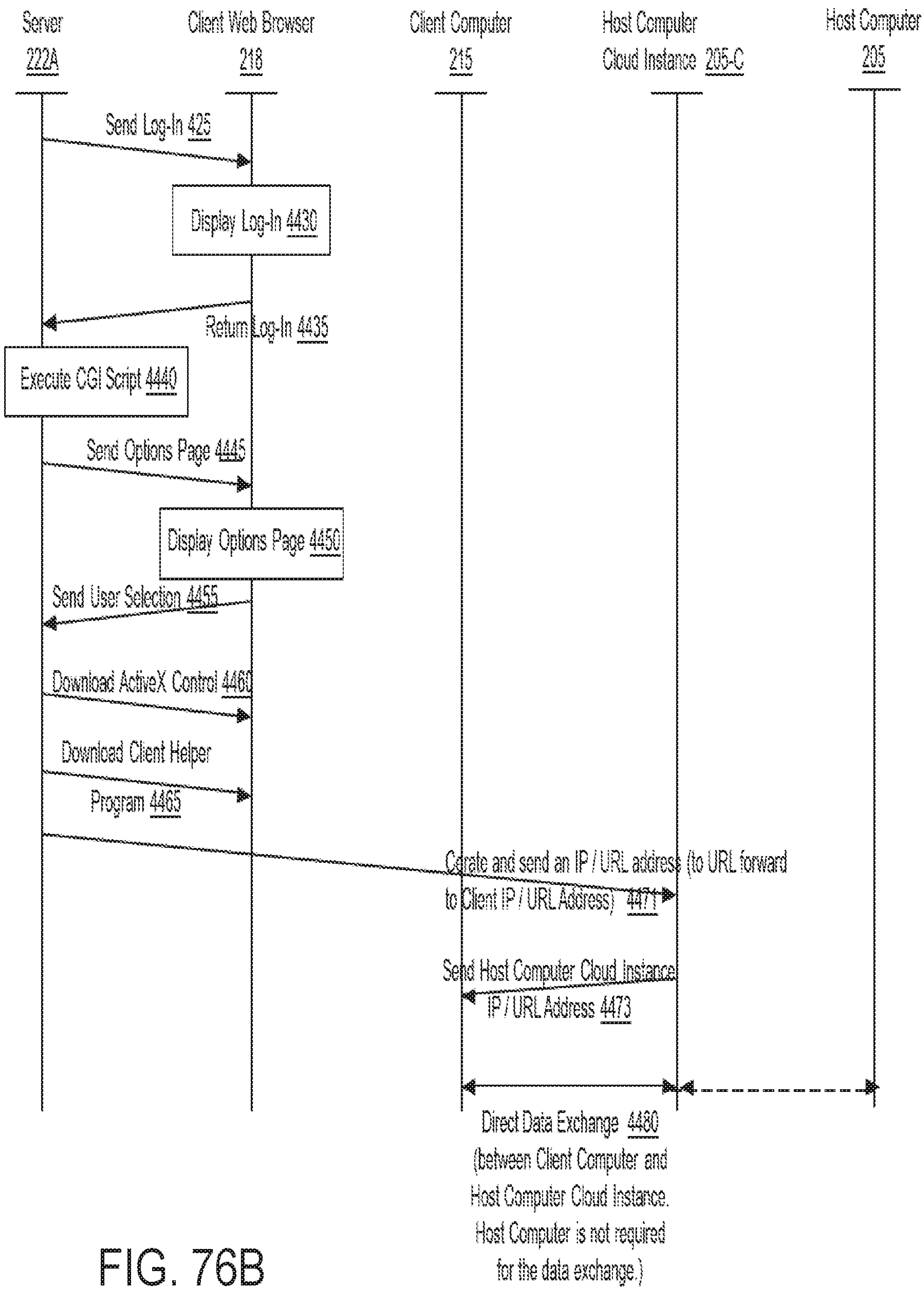

Another example illustrating an I.P./URL address URL forwarding to I.P./URL address of a client computer 215 is in further embodiment of the current invention in FIG. 76B, which is adapted from FIG. 27C. New step 4471 is added to FIG. 76B to have server 222A (in FIGS. 24A and 76B) creating 4471 and sending 4471 (in FIG. 76B) an I.P./URL address (to URL forward to I.P./URL address of client computer 215) to host computer cloud instance 205-C. Step 4469 (from FIG. 27C) is deleted from FIG. 76B.

Advantages of URL Forward Include:

1. "Single URL forward to multiple URLs" allows support of popular Internet application service by multiple host computer cloud instances 205-C (with different URLs).

E.G.: Example "3" (row d) in FIG. 75A, in Hong Kong in July 2016, URL: "www.google.com" got forwarded to a Hong Kong Google cloud URL: https://www.google.com.hk/?gfe_rd=cr&ei=KAWCV-ncPNPC8gfthbz4DA so that by URL forward of "www.google.com" to many Google host computer cloud instances 205-C, the many many millions of Google users (using client computers 215) can be supported (without degradation of Google search service performance globally).

2. URL forward allows dynamic cloud resource allocation (using example "3" (row d) in FIG. 75A in Para [0435] above).

Other reasons to do URL forward are: for URL shortening; to prevent broken links when web pages are moved; to allow multiple domain names belonging to the same owner to refer to a single web site: to guide navigation into and out of a website; for privacy protection: and for less innocuous purposes such as phishing attacks.

It is noted that URL forward can be more than one level. i.e. URL-1st-Level may be forwarded to URL-2nd-Level, which in turn is forwarded to URL-3rd-Level, . . . etc., until the last URL forward is for URL-nth-Level, which (URL-nth-Level's) URL forward is URL address of host computer cloud instance 205-C in an embodiment of the present invention, as illustrated in FIG. 75B.

The advantages of multiple level URL forward are similar to that for (single level) URL forward above in Para [0434], [0435], [0436], [0437].

More on Cloud Instance for Internet Application Service, e.g. Website Service

Internet application services, e.g. website, database, email, etc., use clouds to support up-to many many millions of Internet users (using client computers 215), because of the many advantages of clouds over hardware and software explained above. Further embodiments of the current invention (using examples of clouds running Internet application services, e.g. websites, email, etc.,) are illustrated in FIGS. 77A to 77B, and 78A to 78G and described below.

Figure 77A:
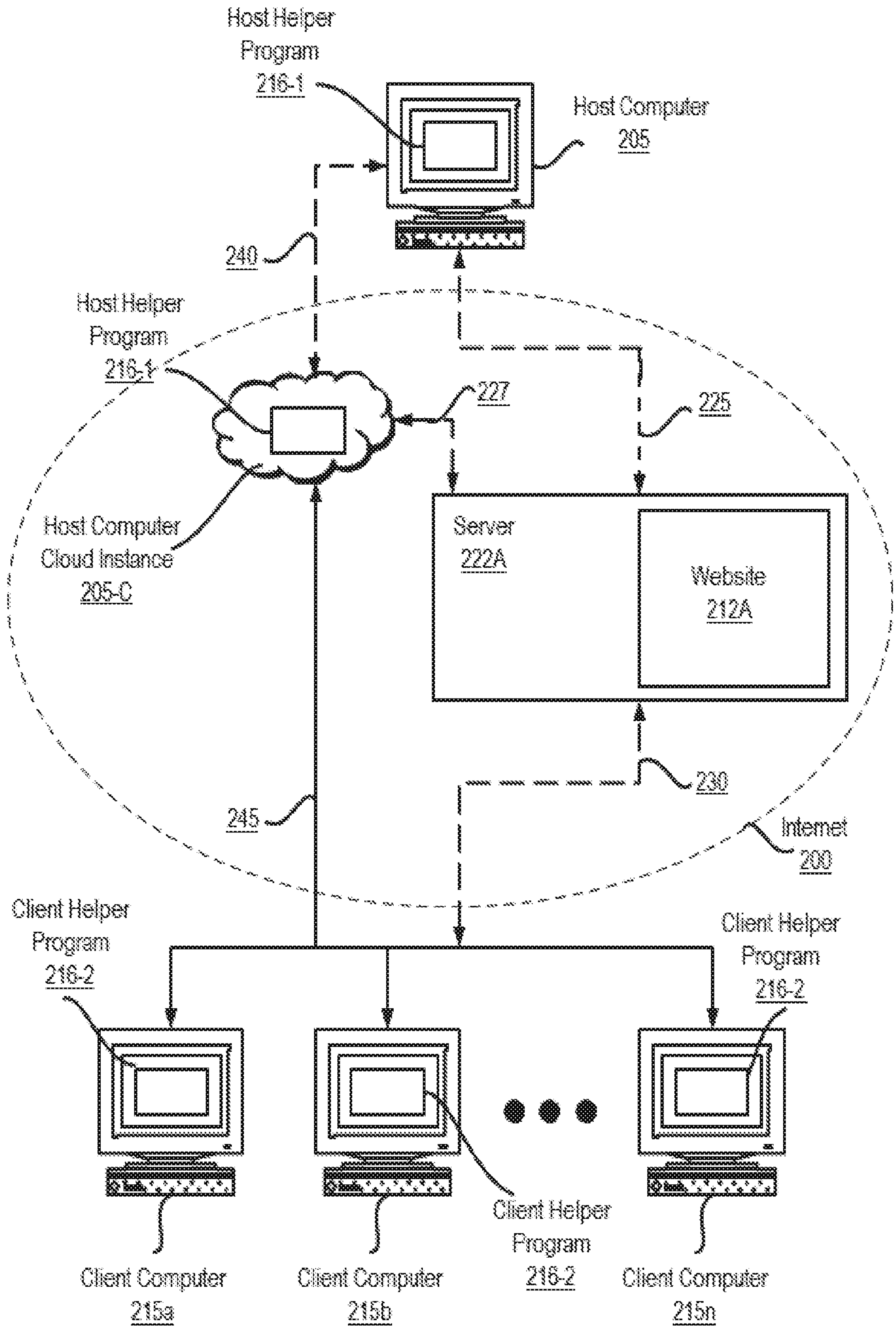
FIG. 77A is a block diagram illustrating providing direct network connections using cloud instance for Internet application service over a computer network in accordance with another embodiment of the present invention.
Figure 77B:
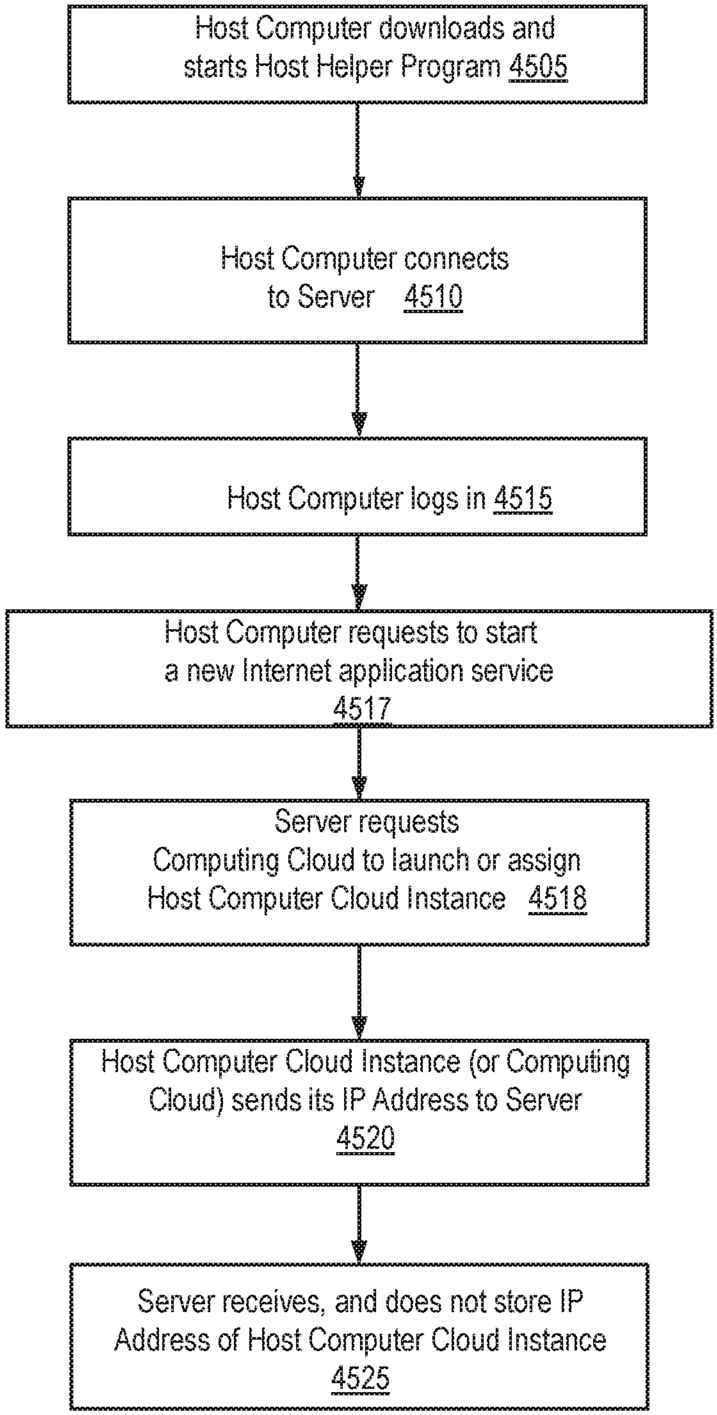
FIG. 77B is a flowchart illustrating providing direct network connections using cloud instance for Internet application service over a computer network in accordance with an embodiment of the present invention.

FIGS. 77A and 77B are an embodiment of the present invention and illustrate how a host computer 205 can start a host computer cloud instance 205-C to provide Internet application service (by host helper program 216-1) to client computer 215*n* using client helper program 216-2 to do Internet application service.

FIG. 77A is adapted from FIG. 25A and illustrates an embodiment of the current invention to create direct network connections using cloud instance for Internet application services within computer networks.

FIG. 77B is adapted from FIG. 28, and illustrates an embodiment of the present invention and how a host computer 205 (in FIG. 77A, e.g. a Google.com webmaster) can:

(i) request 4517 (in FIG. 77B) a server 222A to start a new Internet application service (e.g. website service using the popular L.A.M.P,: Linux, Apache, MySQL, and PHP), and (ii) Server 222A requests 4518 (in FIG. 77B) a computing cloud (e.g. a Google computing cloud) to launch-or-assign a host computer cloud instance 205-C to provide Internet application service (by host helper program 216-1, e.g. above L.A.M.P. website software) to client computer 215*n* (e.g. Internet users visiting Google.com website) using client helper program 216-2 (e.g. Internet browser such as Firefox) to do Internet application service (e.g. Google Internet search using Google-Internet-search software at Google.com), and (iii) Host computer cloud instance 205-C (or computing cloud 198) sends 4520 (in FIG. 77B) its IP address to server 222A, which receives 4525 it (in FIG. 77B), and does not store 4525 it (but may store later, not shown) in FIG. 77B. The storing or not storing of the above received IP address in the server 222A is further described in Cases E to H in FIG. 50 and Para [0342A], [0343A], [0344A], and [0345A].

Figure 78A:
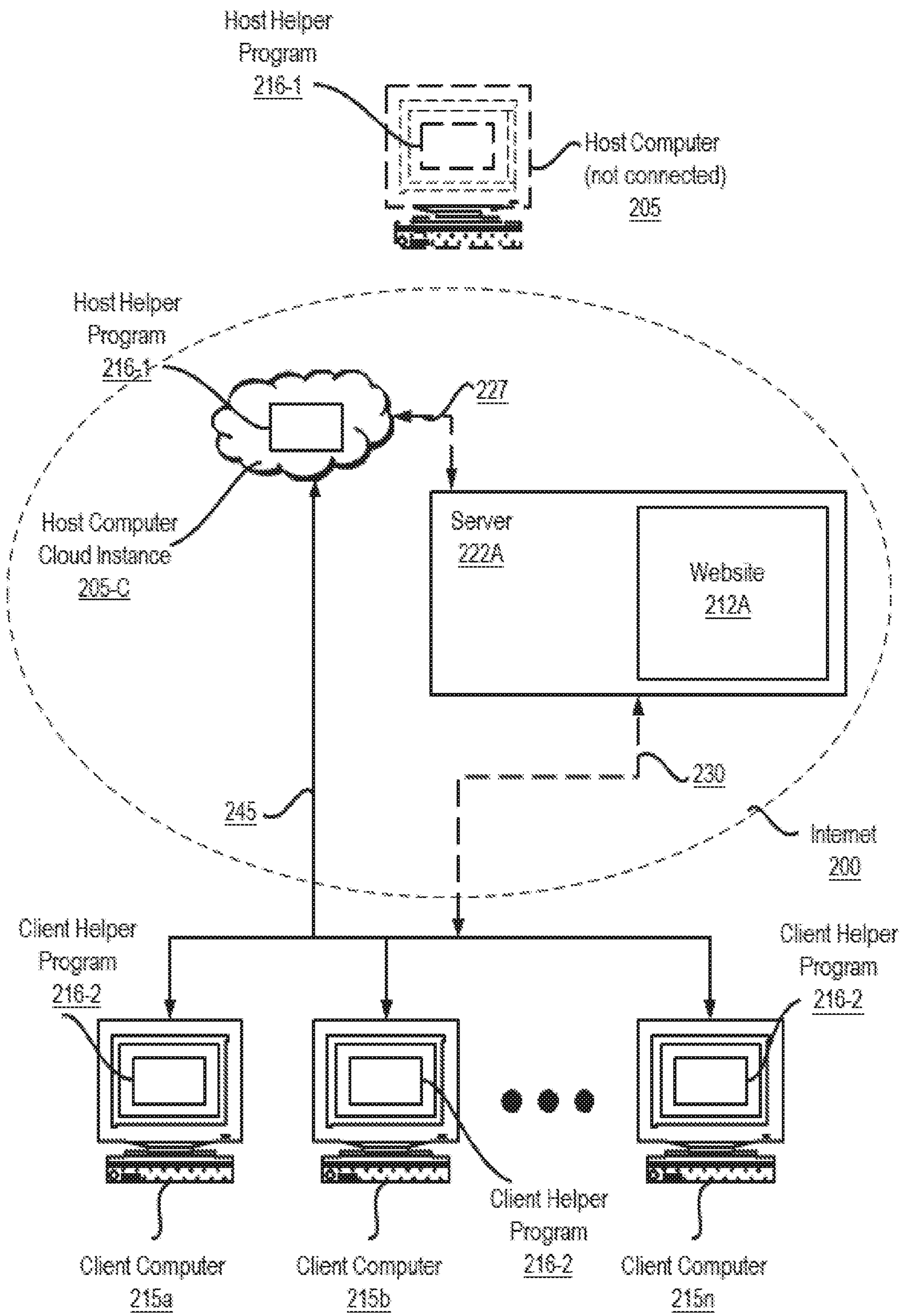
FIG. 78A is a block diagram illustrating providing direct network connections using cloud instance for Internet application service over a computer network in accordance with another embodiment of the present invention.

FIGS. 78A to 78G are embodiments of the current invention and illustrate that after a host computer cloud instance 205-C is started in FIGS. 77A and 77B above, the host computer 205 (e.g. Google.com webmaster) is not needed (and is not needed to connect to any network) in FIG. 78A for the host computer cloud instance 205-C (e.g. Google.com website cloud instance) to provide Internet application service (e.g. Google.com website service) by host helper program 216-1 (e.g. L.A.M.P. or other Google.com website software or Google Internet search software) to client computer 215*n* (e.g. many many millions of Internet users doing Google Internet search at Google.com), as described below.

FIG. 78A is adapted from FIG. 25B and illustrates a further embodiment of the present invention to create direct network connections using cloud instance for Internet application services within computer networks.

Figure 78B:
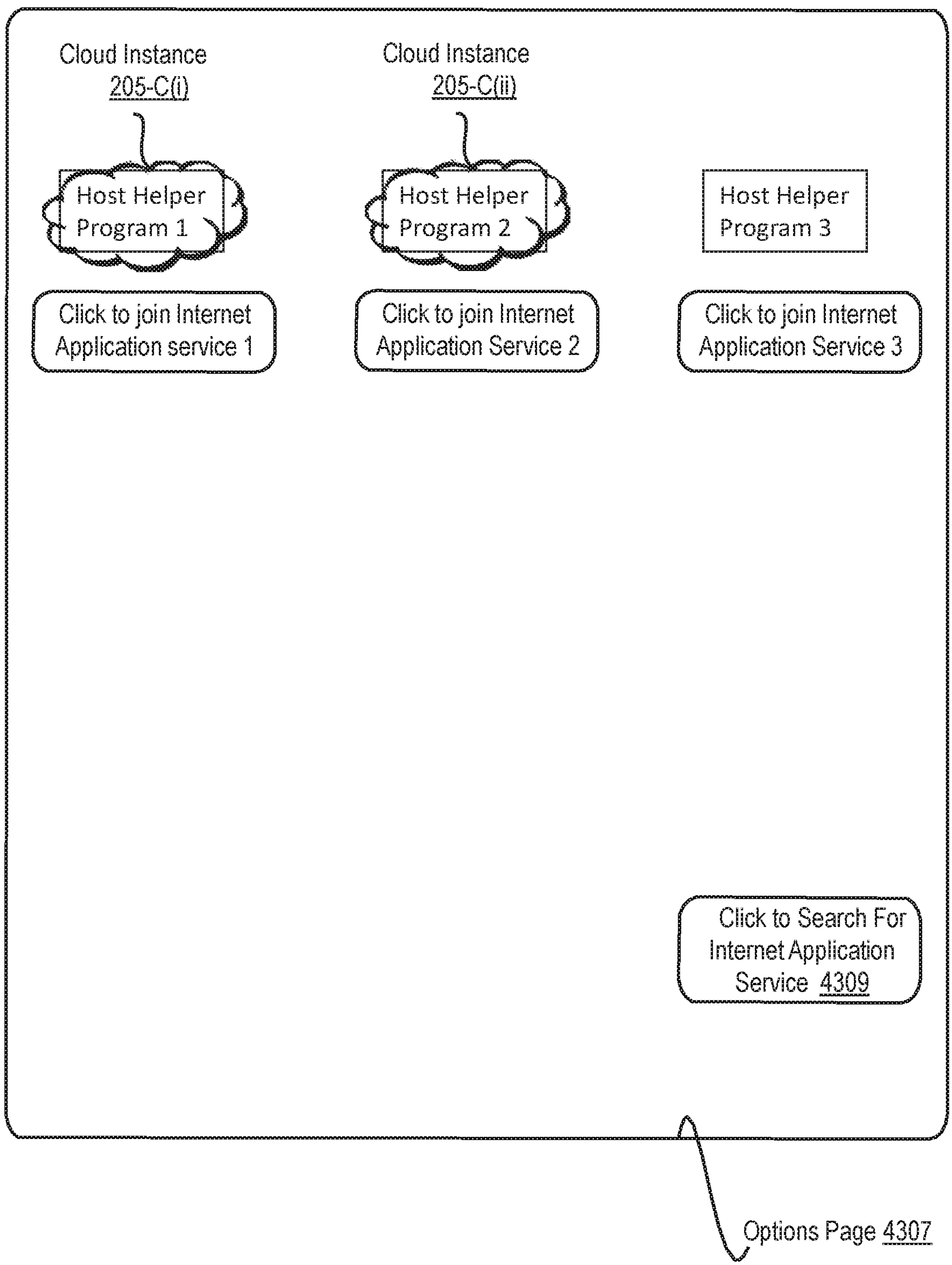
FIG. 78B is a snapshot of a web page hosted by a server in accordance with an embodiment of the present invention.

FIG. 78B is adapted from FIG. 26A, and illustrates how a client computer 215*n* (in FIG. 78A, e.g. Internet user) may (select and click to) join Internet application service (e.g. website service) provided by host computer cloud instance 205-C (e.g. cloud instance 205-C (i) in options page 4307 in FIG. 78B).

The options page 4307 in FIG. 78B provides selectable icons which correspond to Internet application services provided by the website 212A (and supported by the server 222A). In one embodiment, the options page 4307 (in FIG. 78B) lists one or more host helper programs 216-1 (e.g. host helper program 1) that the client computer 215*n* (in FIG.

78A, e.g. Internet user) may click to join the Internet application service (e.g. Google.com website service) of the host helper programs 216-1 (e.g. "host helper program 1" such as L.A.M.P. website software) through the direct network connections using cloud instance for Internet application service according to embodiments of the present invention.

In another embodiment, the options page 4307 (in FIG. 78B) lists one or more host computer cloud instance 205-C (e.g. cloud instance 205-C (ii)) running respectively one or more host helper programs 216-1 (e.g. host helper program 2) that the client computer 215*n* (e.g. Internet user) may click to join the Internet application service (e.g. Internet email such as Gmail) of the host computer cloud instance 205-C (e.g. cloud instance 205-C (ii)) through the direct network connections using cloud instance for Internet application service according to embodiments of the present invention.

The options depicted in FIG. 78B and described above are provided for illustrative purposes only and are not intending to be limiting. Additional user-selectable options may be offered by a server 222A and/or presented on an options page 4307 (in FIG. 78B) of a website 212A.

Figure 78C:
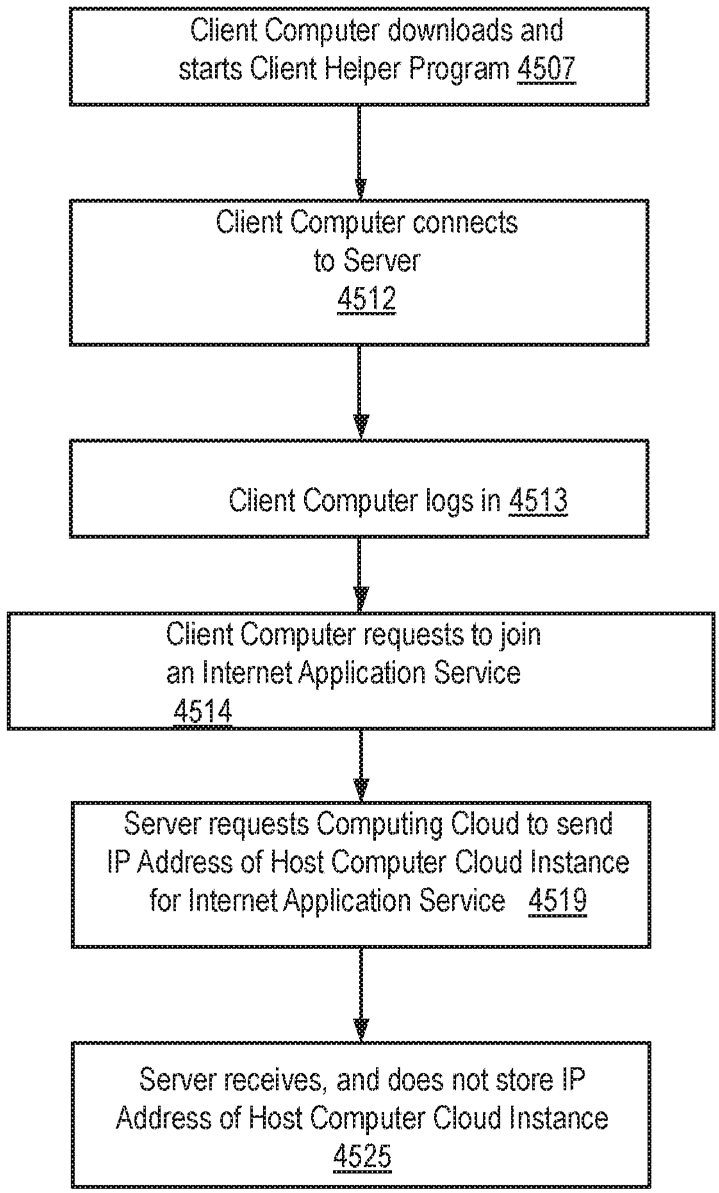
FIGS. 78C to 78G are flowcharts illustrating providing direct network connections using cloud instance for Internet application service over a computer network in accordance with an embodiment of the present invention.

FIG. 78C is adapted from FIG. 28, and illustrates an embodiment of the present invention and how client computer 215*n* (in FIG. 78A, e.g. Internet users) may join an Internet (cloud) application service by:

(i) (client computer 215*n*) requests 4514 in FIG. 78C (to a website 212A and/or a server 222A in FIG. 78A) to join an Internet application service (e.g. website service, selected from choices in options page 4307 in FIG. 78B).

It is noted that the client computer 215*n* request 4514 (FIG. 78C) to join an Internet (cloud) application service may be a sub-domain URL address (entered into the address bar of an Internet browser), which may then be forwarded to a host computer cloud instance 205-C URL address providing the requested Internet application service.

For example, Internet user on Jul. 11, 2016 in Hong Kong entering (in the address bar of an Internet browser) sub-domain URL address: "www.google.com" (to visit Google website to do Google Internet search) got URL forwarded to a Google website cloud URL: https://www.google.com.hk/?gfe_rd=cr&ei=KAWCV-ncPNPC8gfthbz4DA (ii) Server 222A (in FIG. 78A) requests 4519 (in FIG. 78C) a computing cloud (e.g. Google computing cloud, not shown, or computing cloud 198 in FIG. 26D) to send IP address of selected Internet application service (e.g. website service) provided by selected host computer cloud instance (e.g. cloud instance 205-C (ii) in options page 4307 in FIG. 78B).

(iii) Server 222A receives 4525 and does not store 4525 (but may store later, not shown) in FIG. 78C IP address of host computer cloud instance 205-C (e.g. Google website cloud URL above).

Figure 78D:
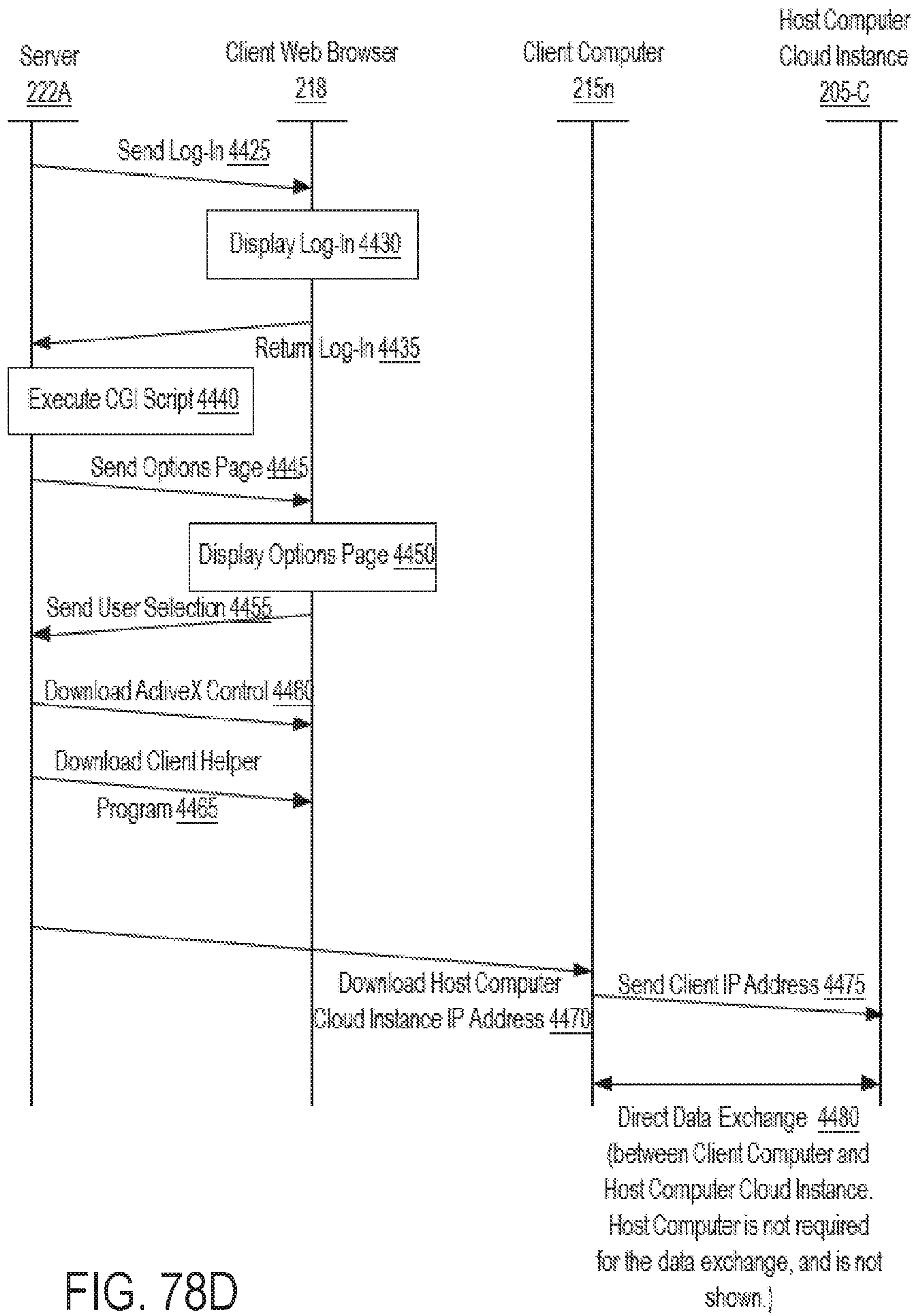

FIG. 78D is adapted from FIG. 27A and illustrates an embodiment of the present invention and how client computer 215*n* (in FIG. 78A, e.g. Internet users) may join an Internet (cloud) application service (e.g. website service), described below and much repeated from that for FIG. 27A above.

Referring now to FIG. 78D, a process corresponding to a direct network connections using cloud instance for providing Internet application service between a networked cloud instance and a networked computer is presented. The process illustrated in FIG. 78D corresponds to a direct network connections architecture including a host computer cloud instance 205-C, a client computer 215*n* executing a client web browser 218, and a server 222A hosting a website 212A (FIG. 78A). The host computer 205-C (e.g. Google.com webmaster, if present) is (not shown and) not needed to connect to the network. When the client computer 215*n* (e.g. Internet user) accesses the website 212A (e.g. Google website at URL: http://www.Google.com) via the client web browser 218 (e.g. Firefox), the server 222A (e.g. Google server at Google.com) sends 4425 (in FIG. 78D) a log-in form to the client web browser 218. In one embodiment, the log-in form comprises a web page file in PHP, ASPX, or HTML format. The client web browser 218 then displays 4430 (in FIG. 78D) the log-in form (not shown). Once the log-in form is completed, client web browser 218 returns 4435 (in FIG. 78D) the completed log-in form to the server 222A.

In one embodiment, the return 4435 of the completed log-in form causes the server 222A to execute 4440 (FIG. 78D) a designated common gateway interface (CGI) script. In one embodiment, the CGI script may include commands implemented in the PERL programming language which cause the server 222A to send 4445 (FIG. 78D) an options page 4307 (FIG. 78B) to the client web browser 218. The client web browser 218 then displays 4450 (in FIG. 78D) the options page 4307, allowing an option to be selected. As explained above, the client computer 215*n* may select to join the Internet application service (e.g. website service) of a host computer cloud instance 205-C (e.g. Google.com website cloud instance) or other icons for other options. The client computer 215*n* (e.g. Internet user) selection is then sent 4455 (FIG. 78D) to the server 222A. Based on the selection, an ActiveX control may be downloaded 4460 (FIG. 78D) to the client web browser 218 from the server 222A (e.g. Google server at Google.com).

If the selection is to join Internet application service (e.g. website service) of a host computer cloud instance 205-C (e.g. Google website cloud instance), an ActiveX control may be downloaded 4460 (FIG. 78D) to: (i) download 4465 (FIG. 78D) a client helper program 216-2 to the client computer 215*n* (e.g. Internet user), (ii) download 4470 (FIG. 78D) the IP address of the host computer cloud instance 205-C (e.g. Google.com website cloud instance URL above when accessed in Hong Kong on Jul. 11, 2016: https://www.google.com.hk/?gfe_rd=cr&ei=KAWCV-ncPNPC8gfthbz4DA) to the client computer 215*n* (e.g. Internet user using a Windows PC running Firefox), and (iii) using the downloaded 4470 (FIG. 78D) IP address of the host computer cloud instance 205-C, connect a client helper program 216-2 (e.g. Internet browser Firefox) on the client computer 215*n* to a host helper program 216-1 (e.g. L.A.M.P. website software or Google.com Internet search software) on the host computer cloud instance 205-C (e.g. Google.com website cloud instance). Connecting the two host/client helper programs 216-1, 216-2 includes the client computer 215*n* sending 4475 (in FIG. 78D) the IP address of the client computer 215*n* to the host computer cloud instance 205-C. Once the client helper program 216-2 (e.g. Firefox) on the client computer 215*n* (e.g. Internet user) and the host helper program 216-1 (e.g. Google.com website software or Google.com Internet search software) on the host computer cloud instance 205-C (e.g. Google.com website cloud instance) are connected, data (e.g. Google.com Internet search data) may be exchanged 4480 (in FIG. 78D) directly between the host computer cloud instance 205-C (e.g. Google.com website cloud instance) and the client computer 215*n* (e.g. Internet user) via the direct connection 245 (in FIG. 78A), without any data passing through the server 222A (e.g. Google server at Google.com). The host computer 205 (e.g. Google.com website webmaster, if present) is not needed for the data exchange 4480 (FIG. 78D).

It is noted that the IP address of the client computer 215*n* may be sent to the host computer cloud instance 205-C using indirect connection 227, 230 (instead of using direct network connection 245 in FIG. 78A) in further embodiments of the current invention.

Figure 78E:
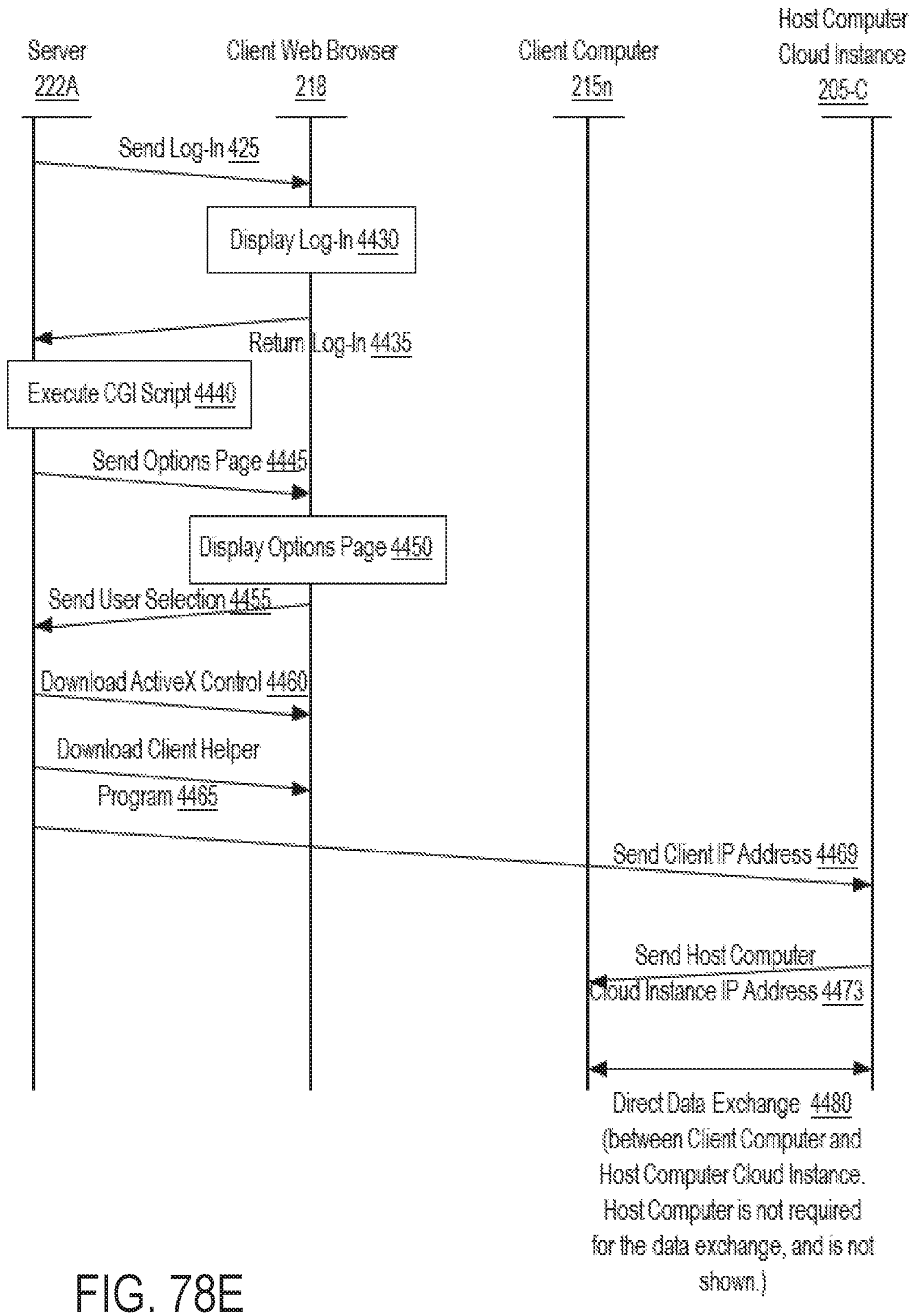

In a further embodiment of the current invention illustrated in FIG. 78E, which FIG. 78E is similar to FIG. 78D, but in FIG. 78E the server 222A sends 4469 (in FIG. 78E) using indirect connection 227, 230 (in FIG. 78A) the IP address of the client computer 215*n* to the host computer cloud instance 205-C. The host computer cloud instance 205-C then sends 4473 (in FIG. 78E) IP address of host computer cloud instance 205-C to the client computer 215*n*. Direct data exchange 4480 (in FIG. 78E) can then occur, using direct network connection 245 in FIG. 78A, between the client computer 215*n* and the host computer cloud instance 205-C, and without going through the server 222A. The host computer 205 (in FIG. 78A) is not needed for the direct data exchange 4480 (in FIG. 78E).

Figure 78F:
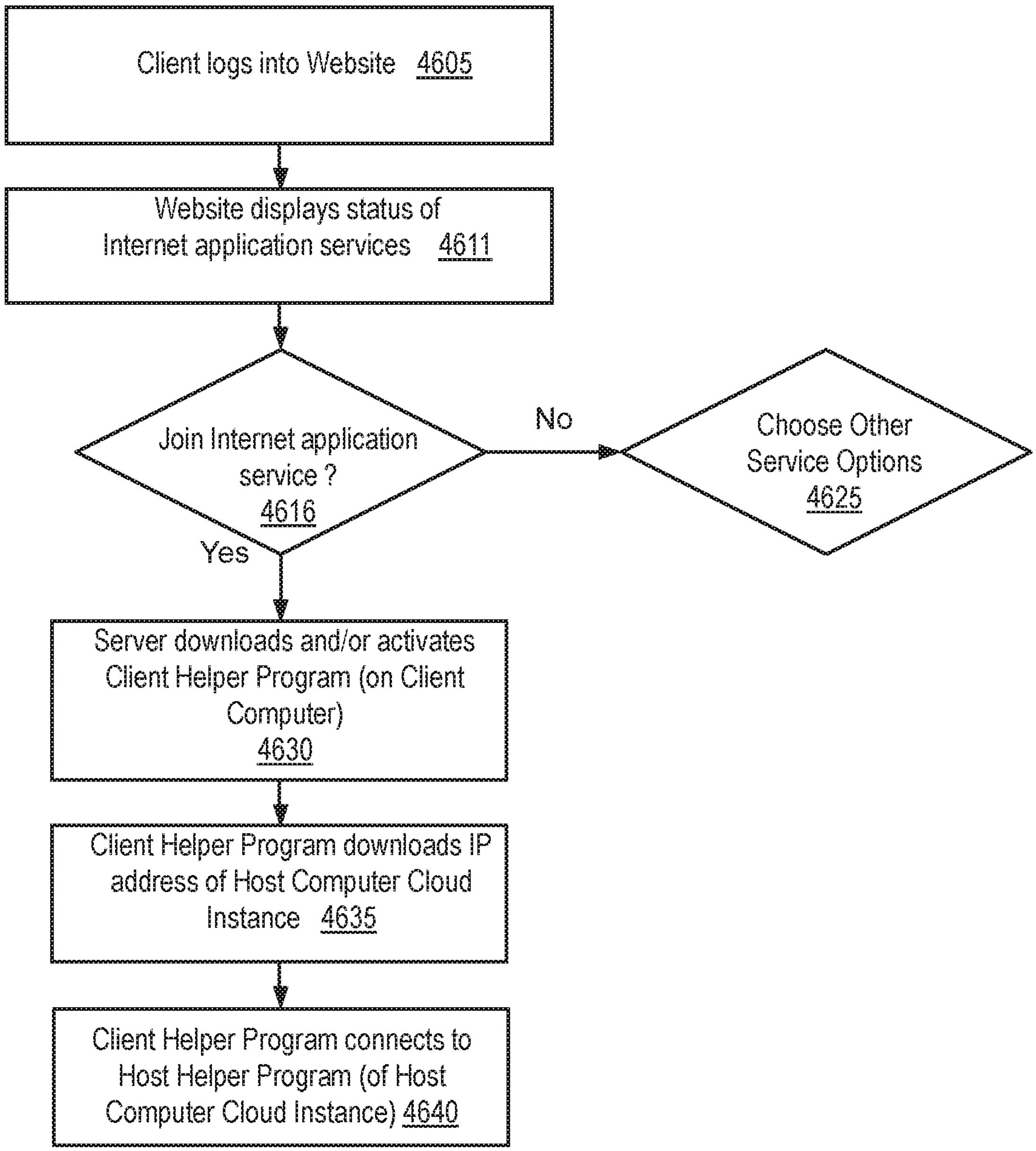

FIG. 78F is adapted from FIG. 29A and illustrates an embodiment of the present invention and how client computer 215*n* (in FIG. 78A, e.g. Internet user) may join an Internet (cloud) application service (e.g. website service), described below and adapted from that for FIG. 29A.

FIG. 78F presents a flowchart of a process (performed by a client computer 215*n* (in FIG. 78A)) to provide direct network connections between host computer cloud instance 205-C (FIG. 78A) and computers over a computer network in accordance with an embodiment of the present invention. The client computer 215*n* (e.g. Internet user) logs in 4605 (FIG. 78F) to a website 212A (e.g. Google website Google.com) hosted by a server 222A (e.g. Google server at Google.com) in FIG. 78A The website 212A then displays 4611 (in FIG. 78F) the status of one or more Internet application services (not shown). In one embodiment, the selection of one or more Internet application services are displayed on an options page 4307 such as that depicted in FIG. 78B.

If the client computer 215*n* (e.g. Internet user) selects to join the Internet application service (e.g. website service) of a host computer cloud instance 205-C (e.g. Google.com website cloud instance) at step 4616 (in FIG. 78F), the server 222A (e.g. Google server at Google.com) downloads and/or activates 4630 (FIG. 78F) a client helper program 216-2 (e.g. Internet browser) on the client computer 215*n* (e.g. Internet user using a Windows PC). The client computer 215*n* (e.g. Internet user) then requests (not shown) to join the Internet application service (e.g. website service) of host computer cloud instance 205-C (e.g. Google.com website cloud instance). The client helper program 216-2 (e.g. Internet browser Firefox) then downloads 4635 the IP address of the selected host computer cloud instance 205-C (e.g. Google.com website cloud instance URL above: https:/www.google.com.hk/?gfe_rd=cr&ei=KAWCV-ncPNPC8gfthbz4DA). Using the downloaded 4635 (in FIG. 78F) IP address of the host computer cloud instance 205-C, the client helper program 216-2 (e.g. Firefox) connects 4640 to a host helper program 216-1 (e.g. L.A.M.P. software or Google.com Internet search software) of the host computer cloud instance 205-C (e.g. Google.com website cloud instance). Further data exchange 4480 (in FIG. 78D) for Internet application service (e.g. website service) between the host computer cloud instance 205-C (e.g. Google.com website cloud instance) and the client computer 215*n* (e.g. Internet user using Windows PC) occurs via the direct connection 245 (in FIG. 78A) using the two host/client helper programs 216-1, 216-2 respectively, without going through the server 222A (e.g. Google server at Google.com). The host computer 205 (if present, e.g. Google.com website webmaster) is not needed for data exchange 4480 (e.g. data exchange between Google.com website cloud instance and Internet user using Windows PC) in FIG. 78D.

Finally, the client computer 215*n* may choose 4625 (FIG. 78F) other service options other than joining Internet application service of a host computer instance 205-C (step 4616—No).

It is noted that the IP address of the client computer 215*n* may be sent to the host computer cloud instance 205-C using indirect connection 227, 230 (instead of using direct network connection 245 in FIG. 78A) in further embodiment of the current invention.

Figure 78G:
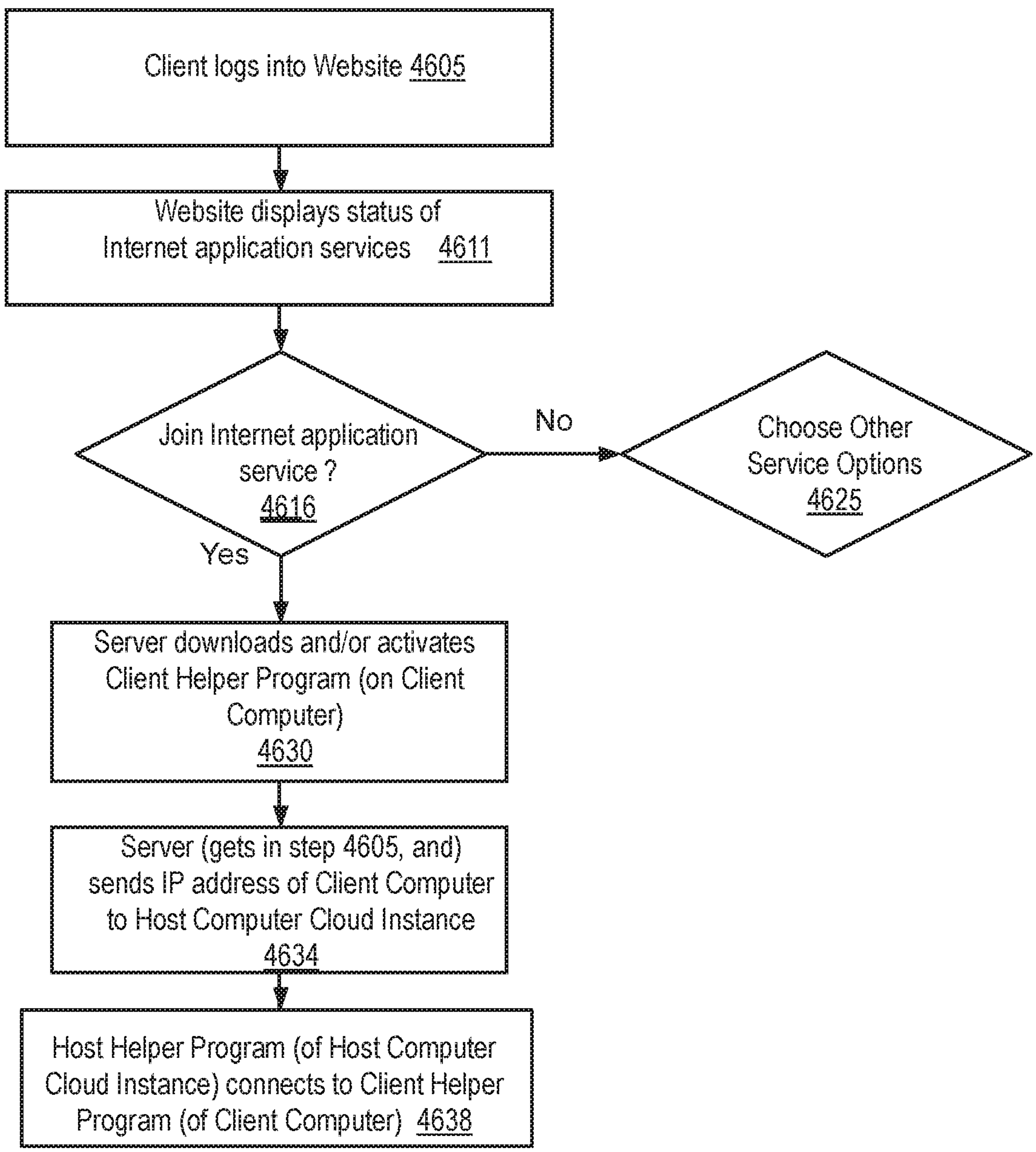

In further embodiment of the current invention illustrated in FIG. 78G, which FIG. 78G is similar to FIG. 78F, but in FIG. 78G the server 222A (e.g. Google server at Google.com) gets 4605 and sends 4634 in FIG. 78G (using indirect connection 227, 230 in FIG. 78A) the IP address of the client computer 215*n* (e.g. Internet user using Windows PC) to the host computer cloud instance 205-C (e.g. Google.com website cloud instance). The host helper program 216-1 (of the host computer cloud instance 205-C) then connects 4638 to the client helper program 216-2 (of the client computer 215*n*). Direct data exchange 4480 in FIG. 78E can then occur, using direct network connection 245 in FIG. 78A, between the client computer 215*n* and the host computer cloud instance 205-C, and without going through the server 222A. The host computer 205 (if present) is not needed for direct data exchange 4480 (in FIG. 78E).

It is noted that even though Google.com is used above as an example in embodiments of the present invention in FIGS. 78A to 78G. Google.com may or may not do anything described above or in FIGS. 78A to 78G, and in particular:

(a) Google.com may or may not use L.A.M.P. website software (but would use some other website software) at Google.com website; and (b) Google.com likely does not use direct network connection 245 in FIG. 78A to send 4475 (in FIG. 78D) and (does not use direct network connection 245 in FIG. 78A) to send 4635 (in FIG. 78F) the IP address of the client computer 215*n* to the host computer cloud instance 205-C (but could use it in the future with this invention disclosure).

(c) Google.com likely use indirect connection 227, 230 (instead of using direct network connection 245 in FIG. 78A) to send 4469, 4473 (in FIG. 78E) and send 4634, 4638 (FIG. 78G) the IP address of the client computer 215*n* to the host computer cloud instance 205-C (but could use direct network connection 245 in FIG. 78A in the future with this invention disclosure).

In situations (e.g. above (a) to (c), and possibly in other situations) where Google.com does not do everything described in above Google.com examples or in FIGS. 78A to 78G, Google.com would be used as a hypothetical example for embodiments of the present invention.

Figure 79A:
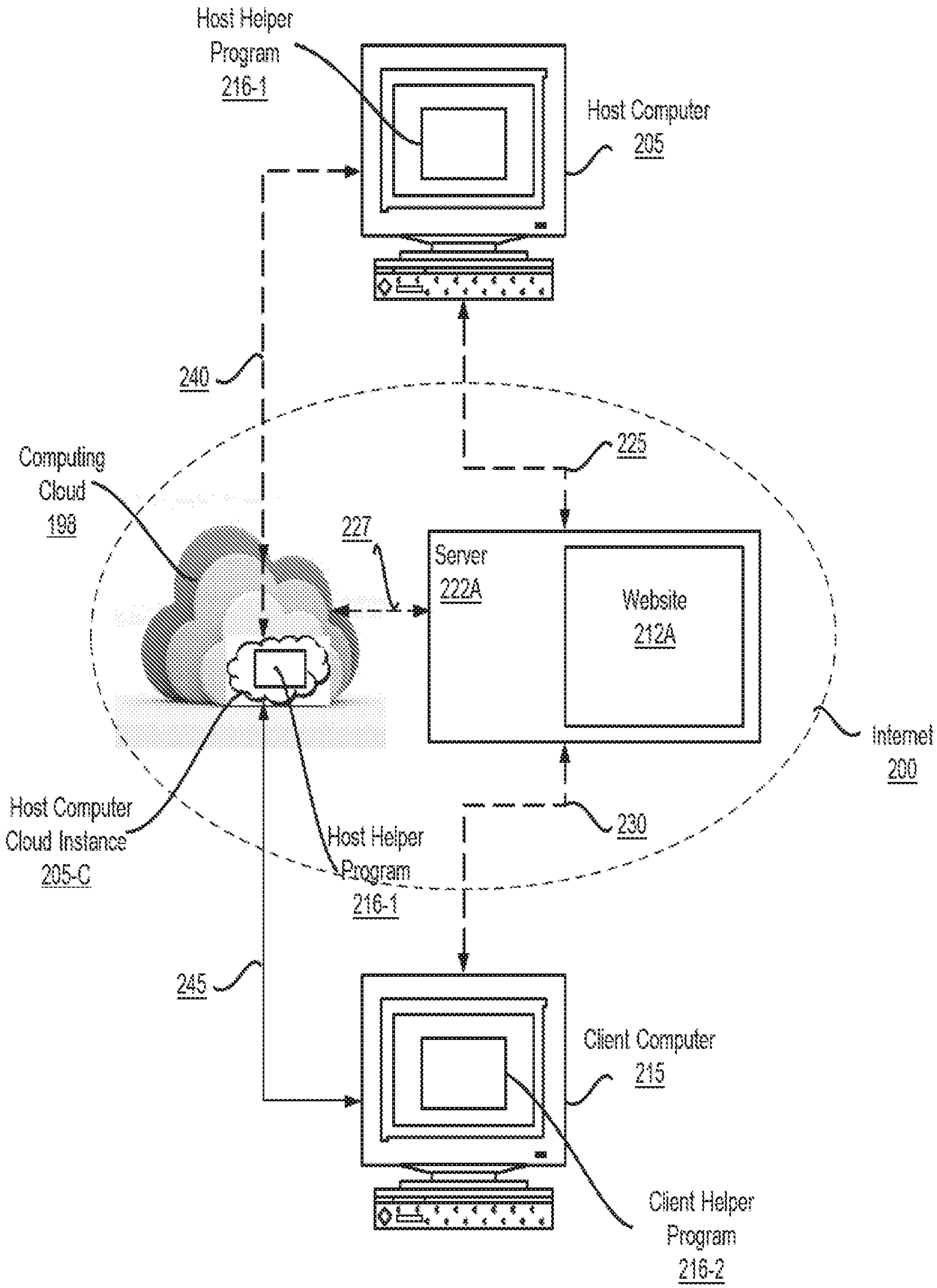
FIG. 79A shows block diagrams illustrating providing direct network connections using cloud instance for Internet application service over a computer network in accordance with another embodiment of the present invention.
Figure 79B:
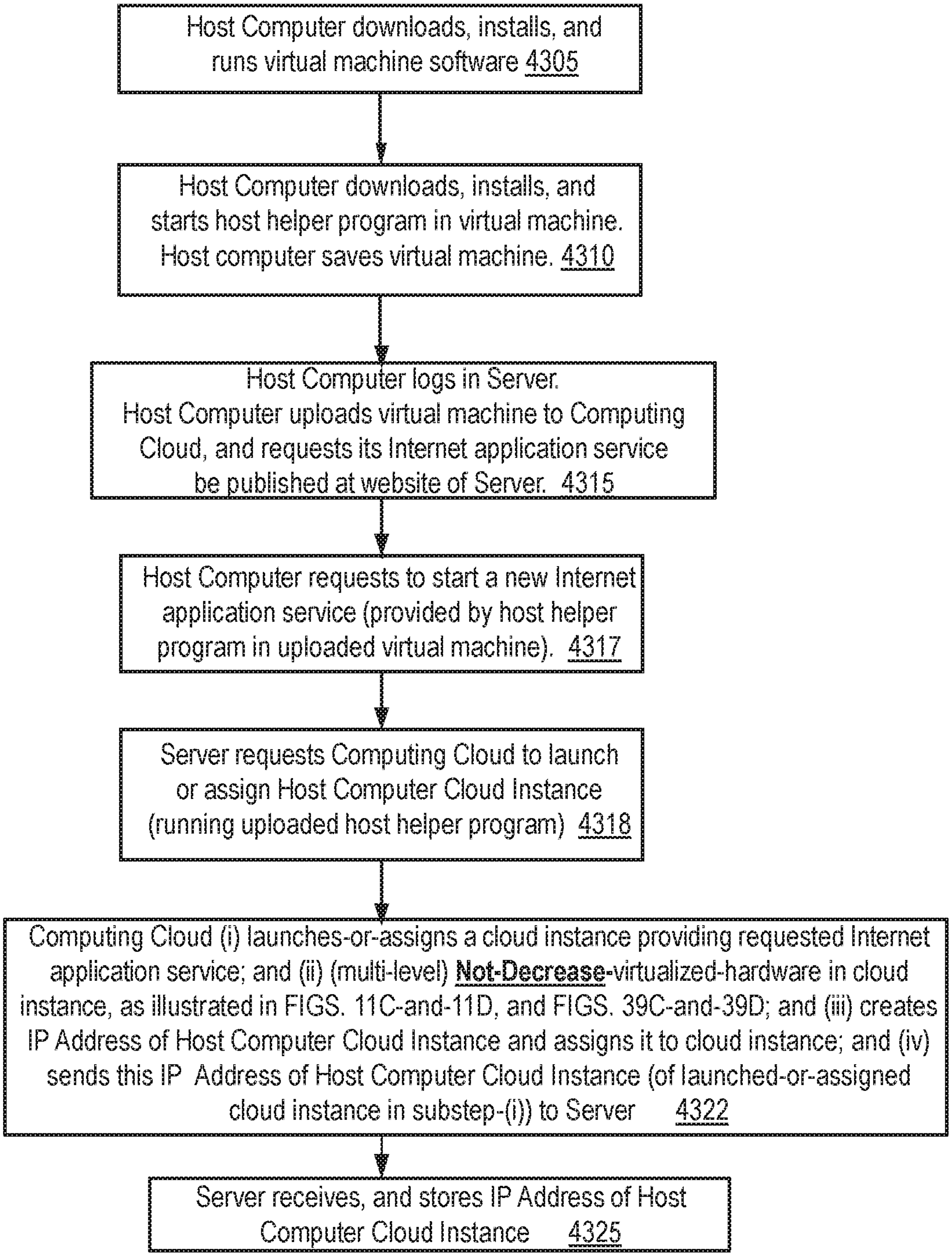
FIGS. 79B and 79C are flowcharts illustrating providing direct network connections using cloud instance for Internet application service over a computer network in accordance with an embodiment of the present invention.

FIG. 79A is copied from FIG. 26D. FIG. 79B is edited from FIG. 26E, and presents a flowchart of a process performed by a host computer 205 to provide direct network connections between cloud instance and computers over a computer network in accordance with an embodiment of the present invention. FIG. 79B's change from FIG. 26E is that FIG. 79B's step-4322 (is edited from FIG. 26E's step-4320, and) incorporates references to "Not-Decrease"-(Virtualized)-(1X)-Hardware-(in-Cloud-Instance) (illustrated in FIGS. 11C-and-11D, and in FIGS. 39C-and-39D).

In step-4322 (in FIG. 79B), computer cloud 198 (in FIG. 79A):

(i) launches-or-assigns a cloud instance providing requested Internet application service (in step-4317 in FIG. 79B): and (ii) (multi-level) "Not-Decrease"-(Virtualized)-(1X)-Hardware-(in-Cloud-Instance), as illustrated in FIGS. 11C-and-11D, and in FIGS. 39C-and-39D; and (iii) creates IP address of host computer cloud instance 205-C (in FIG. 79A) and assigns it to cloud-instance (launched-or-assigned in step-4322 (*i*) in FIG. 79B); and (iv) sends 4322 (*iv*) this IP address of host computer cloud instance 205-C (of launched-or-assigned cloud instance in step-4322 (*i*) in FIG. 79B) to server 222A.

Figure 79C:
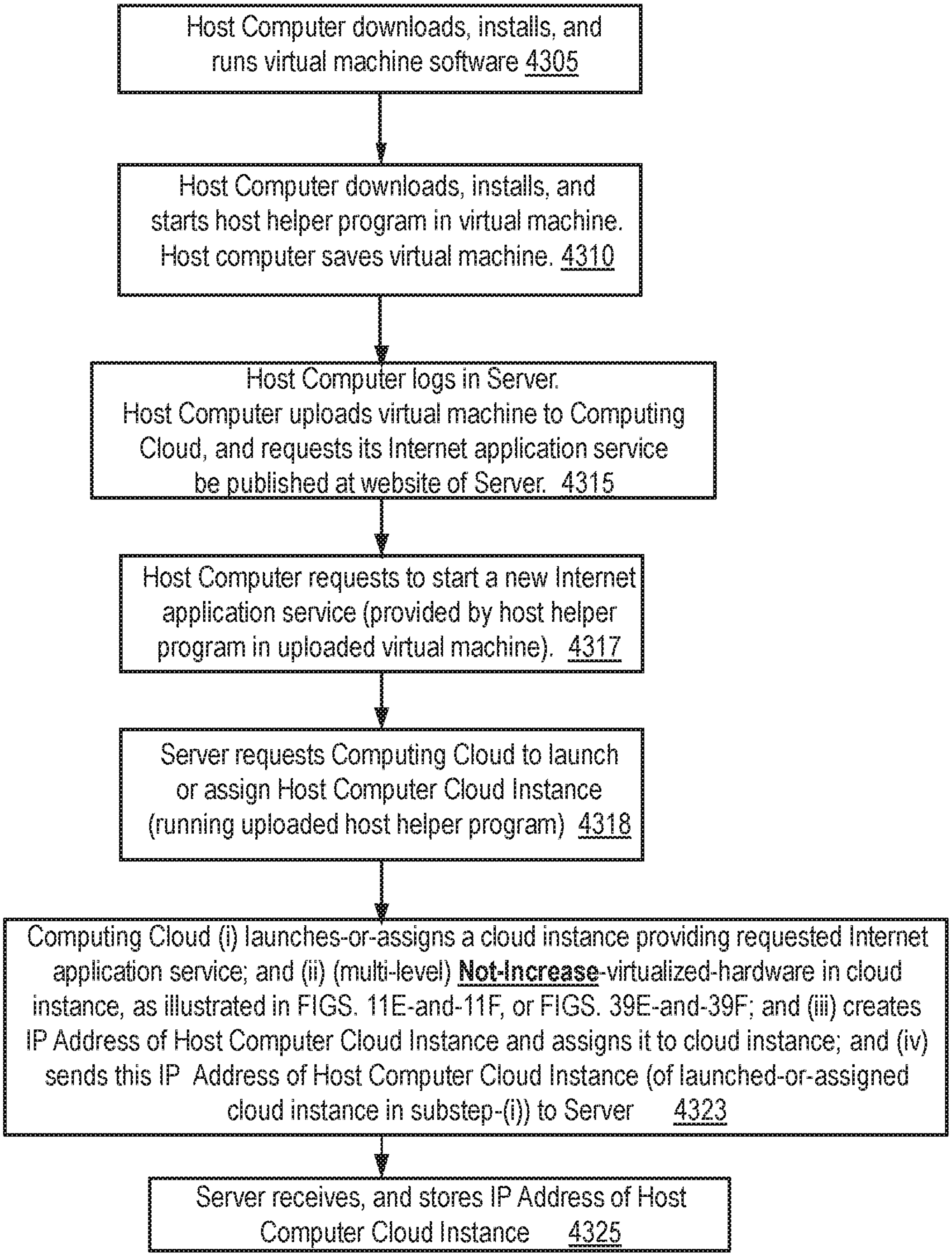

(Similar to FIG. 79B,) FIG. 79C is also edited from FIG. 26E. FIG. 79C's change from FIG. 26E is that FIG. 79C's step-4323 (is edited from FIG. 26E's step-4320, and) incorporates references to "Not-Increase"-(Virtualized)-(1X)-Hardware-(in-Cloud-Instance) (illustrated in FIGS. 11E-and-11F, and in FIGS. 39E-and-39F).

In step-4323 (in FIG. 79C), computer cloud 198 (in FIG. 79A):

(i) launches-or-assigns a cloud instance providing requested Internet application service (in step-4317 in FIG. 79C); and (ii) (multi-level) "Not-Increase"-(Virtualized)-(1X)-Hardware-(in-Cloud-instance), as illustrated in FIGS. 11E-and-11F, and in FIGS. 39E-and-39F; and (iii) creates IP address of host computer cloud instance 205-C (in FIG. 79A) and assigns it to cloud-instance (launched-or-assigned in step-4323(*i*) in FIG. 79C); and (iv) sends 4323(*iv*) this IP address of host computer cloud instance 205-C (of launched-or-assigned cloud instance in step-4323(*i*) in FIG. 79C) to server 222A.

It is noted that a cloud instance, e.g. host computer cloud instance 205-C, can be stopped, and/or restarted (not shown) by its computing cloud. For example, one can stop and restart one's Amazon Elastic Compute Cloud (Amazon EC2) instance, e.g. host computer cloud instance 205-C, if it has an Amazon Elastic Block Store (Amazon EBS) volume as its root device.

It is also noted that a cloud instance, e.g. host computer cloud instance 205-C, can be stopped, and/or saved, and then restarted (not shown) by its computing cloud. For example, Amazon EBS provides persistent block level storage volumes for use with Amazon EC2 instances in the Amazon Web Services (AWS) Cloud, e.g. host computer cloud instance 205-C, to stop and save Amazon EC2 instances (onto Amazon EBS persistent block level storage volumes) and then later restart (saved) Amazon EC2 cloud instances.

ADDITIONAL CONSIDERATIONS

It is noted that in one embodiment, the processes described herein are configured for operation as software or a computer program product. The software can be stored as instructions in a computer readable medium such as a memory 204 or a storage module (or device) 206 and is executable. The instructions (e.g., steps) of the process may also be configured as one or more hardware or software modules that are configured to perform the function or functions described herein.

It is also noted that although the disclosure herein makes references in some embodiments to a client computer 215 sending to a host computer cloud instance 205-C the IP address of the client computer 215 via a direct network connection 245, the principles disclosed herein are also applicable to a client computer 215 sending to a host computer cloud instance 205-C the IP address of the client computer 215 via an indirect network connection 225, 230 (e.g. in FIG. 2A) or via an indirect network connection 227, 230 (e.g. in FIG. 2A).It is noted that although the disclosure herein makes references in some embodiments to using multi instance computing cloud to provide direct network connections for Internet application service over a computer network, the principles disclosed herein are also applicable to using multi tenancy computing cloud to provide direct network connections for Internet application service over a computer network.

It is noted that although the disclosure herein makes references in some embodiments to using a computing cloud to provide direct network connections for Internet application service over a computer network, the principles disclosed herein are also applicable to using more-than-one or multiple computing clouds (illustrated in FIGS. 53A, 53B and FIGS. 54A, 54B and described in Para [0363], [0364]) to provide direct network connections for Internet application service over a computer network.

It is noted that although the disclosure herein makes references in some embodiments to using Amazon EC2, Microsoft, and Google cloud offerings to provide direct network connections for Internet application service over a computer network, the principles disclosed herein are also applicable to (i) using other Amazon, Microsoft, and Google computing cloud offerings (not shown), and (ii) other computing-cloud-providers' (e.g. IBM, Oracle, Alibaba, etc.) computing cloud offerings (not shown), and (iii) internal company cloud providers' (e.g. of top Global 2000 companies, etc.) public-and-private computing cloud offerings (not shown) to provide direct network connections for Internet application service over a computer network.

It is also noted that although the disclosure herein makes references in some embodiments to interaction between a host computer 205 and a client computer 215, the principles disclosed herein are applicable to any configuration in which two computing devices are communicatively coupled to a network. For example, in some embodiments there may be communications between a first computing device and a second computing device wherein the first device can be any computing type device (e.g., a server computer system, a personal computer, a desktop computer, a laptop computer, a (computing) notebook, a personal digital assistant, a gaming device, a smart phone, a computing device in Internet of Things (IoT), etc.) and the second device can be any computing device (e.g. a server computer system, a personal computer, a desktop computer, a laptop computer, a (computing) notebook, a personal digital assistant, a gaming device, a smart phone, a computing device in Internet of Things, etc.), of which one device may be a host and the other device may be a client, or the devices may be peers (e.g., peer to peer connection).

In addition, the two computing devices may or may not be communicatively coupled to each other at any time, or at all. For example, a first computing device (e.g. Google.com webmaster) communicatively coupled to a network may request a server to start an Internet application service (e.g. website, data base, operating system, desktop applications, software infrastructure, developer tools, business software, etc.) when the second computing device (e.g. Internet user) is not communicatively coupled to the network. After the server has started the Internet application service on a cloud instance, the first computing device may be communicatively decoupled from the network. At a later time, a second computing device may be communicatively coupled to the network and requests the server to join the Internet application service (provided by the cloud instance) started earlier by the first computing device (e.g. Google.com webmaster), and the first computing device is not needed (to be coupled to the network) when the second computing device joins the Internet application service on the cloud instance.

Upon reading this disclosure, those of ordinary skill in the art will appreciate still additional alternative structural and functional designs for a system and a process for Internet application service (including multipoint meeting) via direct network connections using cloud instance between computers through the disclosed principles of the present invention. Thus, while particular embodiments and applications of the present invention have been illustrated and described, it is to be understood that the present invention is not limited to the precise construction and components disclosed herein and (it is to be understood) that various modifications, changes and variations which will be apparent to those skilled in the art may be made in the arrangement, operation and details of the method and apparatus of the present invention disclosed herein without departing from the spirit and scope of the present invention as defined in the appended claims.

The invention claimed is:

1. A computer-implemented method used in a server for facilitating Internet application service between one or more first computers and one or more second computers coupled to a network, the method comprising the steps of:

receiving, by the server, from one of the first computers a request to start a new Internet application service; and requesting, by the server (and responsive to said request from said one of the first computers to start said new Internet application service), to a computing cloud to send to the server, a first internet protocol (IP) address corresponding to a cloud instance (providing said Internet application service) of said one of the first computers, wherein said cloud instance of said one of the first computers is communicatively coupled to said one of the first computers; and said requesting (by the server to said computing cloud to send to the server, a first internet protocol (IP) address corresponding to a cloud instance (providing said Internet application service) of said one of the first computers) enables said computing cloud to operate:

(i) (said requesting by the server to said computing cloud enables said computing cloud) to launch a cloud instance providing said Internet application service (requested by said one of the first computers); and (ii) (said request by the server to said computing cloud enables said computing cloud) to create and assign a first internet protocol (IP) address to said cloud instance (launched by said computing cloud, and providing said Internet application service requested by said one of the first computers); and (iii) (said request by the server to said computing cloud enables said computing cloud) to have said cloud instance identified by said first IP address communicatively coupled to said one of the first computers; and (iv) (said request by the server to said computing cloud enables said computing cloud) to send (by said computing cloud) to the server said first IP address (corresponding to said cloud instance of said one of the first computers providing said Internet application service), (said-computing-cloud) responsive to said computing cloud receiving said request, from the server, to send to the server the first IP address corresponding to a cloud instance providing said Internet application service of said one of the first computers; and receiving, by the server (and responsive to the server requesting said computing cloud to send to the server IP address corresponding to a cloud instance providing said Internet application service requested by said one of the first computers), from said computing cloud said first internet protocol (IP) address corresponding to said cloud instance of said one of the first computers providing said Internet application service; and storing, by the server, said first internet protocol (IP) address (received from said computing cloud, and) corresponding to said cloud instance providing said Internet application service requested by said one of the first computers.

2. The method of claim 1, further comprising the step of:

receiving, by the server, from one of the second computers a request to join said Internet application service of said cloud instance (identified by said first IP address) of said one of the first computers; and receiving, by the server, from said one of the second computers a second internet protocol (IP) address corresponding to said one of the second computers.

3. The method of claim 2, further comprising the steps of:

sending, by the server, to said one of the second computers said first IP address corresponding to said cloud instance of said one of the first computers providing said Internet application service, responsive to the server receiving said request from said one of the second computers to join said Internet application service; and said first IP address enabling said one of the second computers to directly connect to said cloud instance, identified by said first IP address, of said one of the first computers providing said Internet application service; and said first IP address (corresponding to said cloud instance providing said Internet application service of said one of the first computers) enabling said one of the second computers (using said first IP address) to send data directly to said cloud instance (identified by said first IP address) of said one of the first computers, and (said first IP address) enabling said one of the second computers to receive data directly from said cloud instance (identified by said first IP address) of said one of the first computers, via a direct network connection between said first IP address corresponding to said cloud instance of said one of the first computers and said second IP address corresponding to said one of the second computers.

4. The method of claim 2, further comprising the steps of:

connecting, by the server, to said first IP address corresponding to said cloud instance of said one of the first computers providing said Internet application service, responsive to receiving, by the server, a request from said one of the second computers to join said Internet application service of said cloud instance (identified by said first IP address) of said one of the first computers; and sending, by the server, to said first IP address (corresponding to said cloud instance of said one of the first computers said second IP address corresponding to said one of the second computers, responsive to the server receiving said request from said one of the second computers to join said Internet application service; and said second IP address enabling said cloud instance (identified by said first IP address) of said one of the first computers, using said second IP address, to directly connect to said one of the second computers identified by said second IP address; and said second IP address enabling said cloud instance (identified by said first IP address) of said one of the first computers to send data directly to said one of the second computers, and (said second IP address) enabling said cloud instance (identified by said first IP address) of said one of the first computers to receive data directly from said one of the second computers, via a direct network connection between said first IP address corresponding to said cloud instance of said one of the first computers and said second IP address corresponding to said one of the second computers.

5. The method of claim 2, wherein receiving, by the server, said request from said one of the second computers to join said Internet application service comprises the steps of:

hosting, by the server, a website displaying a list of one or more Internet application services (including said Internet application service of said cloud instance (identified by said first IP address) of said one of the first computers) available; and receiving, by the server, from said one of the second computers a request to join said Internet application service (identified by said first IP address) of said one of the first computers.

6. The method of claim 2, wherein receiving said request from said one of the second computers to join said Internet application service comprises the step of:

receiving, by the server, from said one of the second computers a sub-domain uniform resource locator (URL) to URL forward to said first IP address corresponding to said cloud instance of said one of the first computers providing said Internet application service.

7. The method of claim 1, wherein receiving said request from said one of the first computers to start said new Internet application service comprises the steps of:

hosting, by the server, a website displaying a list of one or more of the host helper programs available for the first computers; and receiving, by the server, from said one of the first computers a selection of one or more of said host helper programs to use to request by the server to said computing cloud to launch a cloud instance (of said one of the first computers) to provide said Internet application service_(using said selection-of-one-or-more-of-said-host-helper-programs selected by said one of the first computers).

8. The method of claim 1, further comprising the steps of:

hosting, by the server, a website displaying a list of one or more of the cloud instances running one or more of the host helper programs available for the first computers; and receiving, by the server, from said one of the first computers a selection of one or more of said cloud instances running one or more of said host helper programs to use, by the server, (to request said computing cloud to launch said-selection-of-said-one-or-more-cloud-instances) to provide said Internet application service (requested by said one of the first computers, and running said-one-or-more-of-said-host-helper-programs).

9. The method of claim 2, wherein said computing cloud is a multi instance cloud, and further comprising the steps of:

receiving, by the server, from said multi instance cloud a unique identifier for said cloud instance (identified by said first IP address) of said one of the first computers; and sending, by the server, to said one of the second computers (said first IP address and) said unique identifier for said cloud instance (identified by said first IP address) of said one of the first computer; and said unique identifier corresponding to said cloud instance (identified by said first IP address) of said one of the first computers (and said first IP address) enabling said one of the second computers to send data directly, using said multi instance cloud (and said unique identifier and said first IP address), to said cloud instance (identified by said first IP address) of said one of the first computers; and said unique identifier corresponding to said cloud instance (identified by said first IP address) of said one of the first computers (and said first IP address) enabling said one of the second computers to receive data directly, using said multi instance cloud (and said unique identifier and said first IP address), from said cloud instance (identified by said first IP address, and providing said Internet application service) of said one of the first computers, via a direct network connection between said first IP address corresponding to said cloud instance of said one of the first computers (using said unique identifier and said second IP address and said multi instance cloud) and said second IP address corresponding to said one of the second computers (using said unique identifier and said first IP address and said multi instance cloud).

10. The method of claim 2, wherein said computing cloud is a multi instance cloud, and further comprising the steps of:

receiving, by the server, from said multi instance cloud a unique identifier for said cloud instance (identified by said first IP address) of said one of the first computers; and sending, by the server, to said first IP address (corresponding to said cloud instance of said one of the first computer (i) said unique identifier for said cloud instance (identified by said first IP address) of said one of the first computer, and (ii) said second IP address corresponding to said one of the second computers, responsive to the server receiving said request from said one of the second computers to join said Internet application service (of said cloud instance (identified by said first IP address) of said one of the first computers); and said second IP address (corresponding to said one of the second computers) and said unique identifier enabling said cloud instance (identified by said first IP address) of said one of the first computers to directly connect to said one of the second computers identified by said second IP address; and said second IP address (corresponding to said one of the second computers) and said unique identifier corresponding to said cloud instance (identified by said first IP address) of said one of the first computers enabling said cloud instance (identified by said first IP address) of said one of the first computers (using said unique identifier and said second IP address and said multi instance cloud) to send data directly to said one of the second computers; and said second IP address (corresponding to said one of the second computers) and said unique identifier corresponding to said cloud instance (identified by said first IP address) of said one of the first computers enabling said cloud instance (identified by said first IP address) of said one of the first computers to receive data directly (using said unique identifier and said second IP address and said multi instance cloud) from said one of the second computers, via a direct network connection between said first IP address corresponding to said cloud instance of said one of the first computers (using said unique identifier and said second IP address and said multi instance cloud) and said second IP address corresponding to said one of the second computers (using said unique identifier and said first IP address and said multi instance cloud).

11. The method of claim 2, wherein said computing cloud is a multi tenancy cloud, and further comprising the steps of:

receiving, by the server, from said multi tenancy cloud a unique identifier for said cloud tenant (identified by said first IP address) of said one of the first computers; and sending, by the server, to said one of the second computers (said first IP address and) said unique identifier for said cloud tenant (identified by said first IP address) of said one of the first computer; and (said first IP address and) said unique identifier corresponding to said cloud tenant (identified by said first IP address) of said one of the first computers enabling said one of the second computers to send data directly, using said unique identifier and said first IP address and said multi tenancy cloud, to said cloud tenant (identified by said first IP address) of said one of the first computers; and (said first IP address and) said unique identifier corresponding to said cloud instance (identified by said first IP address, and providing said Internet application service) of said one of the first computers enabling said one of the second computers to receive data directly, using said unique identifier and said first IP address and said multi tenancy cloud, from said cloud tenant (identified by said first IP address) of said one of the first computers, via a direct network connection between said first IP address corresponding to said cloud tenant of said one of the first computers (using said unique identifier and said second IP address and said multi tenant cloud) and said second IP address corresponding to said one of the second computers (using said unique identifier and said first IP address and said multi tenant cloud).

12. The method of claim 2, wherein said computing cloud is a multi tenancy cloud, and further comprising the steps of:

receiving, by the server, from said multi tenancy cloud a unique identifier for said cloud tenant (identified by said first IP address) of said one of the first computers; and sending, by the server, to said cloud tenant (identified by said first IP address) of said one of the first computer (i) said unique identifier for said cloud tenant (identified by said first IP address) of said one of the first computer, and (ii) said second IP address corresponding to said one of the second computers, responsive to the server receiving said request from said one of the second computers to join said Internet application service; and (said unique identifier and) said second IP address (corresponding to said one of the second computers) enabling said cloud tenant (identified by said first IP address) of said one of the first computers to directly connect to said one of the second computers identified by said second IP address; and said second IP address (corresponding to said one of the second computers) and said unique identifier corresponding to said cloud tenant (identified by said first IP address) of said one of the first computers enabling said cloud tenant (identified by said first IP address) of said one of the first computers to directly send data, using said unique identifier and said second IP address and said multi tenant cloud, to said one of the second computers; and said second IP address (corresponding to said one of the second computers) and said unique identifier corresponding to said cloud tenant (identified by said first IP address) of said one of the first computers enabling said cloud tenant (identified by said first IP address) of said one of the first computers to receive data directly, using said unique identifier and said second IP address and said multi tenant cloud, from said one of the second computers, via a direct network connection between said first IP address corresponding to said cloud tenant of said one of the first computers (using said unique identifier and said second IP address and said multi tenant cloud) and said second IP address corresponding to said one of the second computers (using said unique identifier and said first IP address and said multi tenant cloud).

13. The method of claim 1, wherein the server is inside a cloud instance of a computing cloud.

14. The method of claim 1, wherein said first IP address of said cloud instance of said one of the first computers is a publicly accessible IP address corresponding to a repeater to which said cloud instance of said one of the first computers is communicatively coupled.

15. The method of claim 14, further comprising the steps of:

assigning, by the server, a unique identifier to said cloud instance of said one of the first computers, wherein said cloud instance (of said one of the first computers) is communicatively coupled to said repeater with the publicly accessible IP address of said first IP address; and sending, by the server, to said one of the second computers said unique identifier (of said cloud instance of said one of the first computers) and said first IP address being-(of) said publicly accessible IP address corresponding to said repeater; and said unique identifier corresponding to said cloud instance of said one of the first computers (and said first IP address being-(of) said publicly accessible IP address corresponding to said repeater) enabling said one of the second computers directly connecting to the repeater identified by said first IP address and enabling sending, by said one of the second computers, the unique identifier assigned to said cloud instance of said one of the first computers directly to the repeater; and said unique identifier corresponding to said cloud instance of said one of the first computers (and said first IP address being-(of) said publicly accessible IP address corresponding to said repeater) enabling said one of the second computers to send data directly, using said repeater and said unique identifier and said first IP address, to said cloud instance of said one of the first computers; and said unique identifier corresponding to said cloud instance of said one of the first computers (and said first IP address being-(of) said publicly accessible IP address corresponding to said repeater) enabling said one of the second computers to receive data directly, using said repeater, from said cloud instance of said one of the first computers, via a direct network connection between said first IP address (wherein said first IP address being-(of) said publicly accessible IP address corresponding to said repeater, and using said repeater and said unique identifier corresponding to said cloud instance of said one of the first computers) and said second IP address corresponding to said one of the second computers.

16. The method of claim 1, wherein said cloud instance (identified by said first IP address) of said one of the first computers is communicatively coupled to said one of the first computers; and said cloud instance (identified by said first IP address) of said one of the first computers being coupled to the network enables said one of the first computers to decouple from the network.

17. A computer-implemented method used in a computing cloud running on top of one or more data-center computers for facilitating Internet application service between one or more first computers and one or more second computers coupled to a network, the method comprising the steps of:

receiving, by said computing cloud, a request from a server to send to said server an Internet protocol (IP) address corresponding to (a cloud instance providing) an Internet application service, (said server) responsive to said server receiving a request from one of the first computers to start (for use by Internet users) said Internet application service (provided by a cloud instance of said computing cloud); and launching, by said computing cloud, a cloud instance providing said Internet application service (in-response-to said-requested-starting by said one of the first computers), (said-computing-cloud responsive to said computing cloud receiving said request, from said server, to send to said server an Internet protocol (IP) address corresponding to (a cloud instance providing) said Internet application service (in-response-to said-requested-starting by said one of the first computers), wherein:

(i) said computing cloud creates and assigns a first internet protocol (IP) address to said cloud instance (launched by said computing cloud, and providing said Internet application service in-response-to said-requested-starting by said one of the first computers); and (ii) said computing cloud have said-cloud-instance communicatively coupled to said-one-of-the-first-computers, wherein said-cloud-instance is identified by said first IP address and is providing-said-Internet-application-service (in-response-to said-requested-starting-(of-said-Internet-application-service)-(at-said-website-of-said-server) by-said-one-of-the-first-computers); and (iii) (said request by said server to said computing cloud enables said computing cloud to) send (by said computing cloud) to said server said first IP address corresponding to said cloud instance providing said Internet application service (in-response-to said-requested-starting by said one of the first computers), (said-computing-cloud) responsive to said computing cloud receiving said request, from said server, to send to said server an IP address corresponding (to a cloud instance providing) said Internet application service in-response-to said-requested-starting by said one of the first computers; and said first IP address, sent by said computing cloud and to said server, enables said server to receive and to store (by said server) said first IP address corresponding to said cloud instance of said one of the first computers providing said Internet application service (in-response-to said-requested-starting by said one of the first computers).

18. The method of claim 17, wherein sending by said computing cloud to said server said first IP address corresponding to said cloud instance (providing said Internet application service in-response-to said-requested-starting (at a website of said server) by said one of the first computers further comprises the steps of:

said computing cloud imports a virtual machine, from said one of the first computers, with an installed host helper program to provide said Internet application service of said cloud instance (identified by said first IP address) of said one of the first computers; and said computing cloud launches said cloud instance (identified by said first IP address, and of said one of the first computers) by starting and operating said imported virtual machine (imported from said one of the first computers, and running said installed host helper program to provide said Internet application service); and said computing cloud sends to said server said first IP address corresponding to said cloud instance (launched by said computing cloud and providing said Internet application service) of said one of the first computers, (said-computing-cloud) responsive to said computing cloud receiving said request, from said server, to send to said server an IP address corresponding to a cloud instance (providing said Internet application service in-response-to said-requested-starting (at a website of said server) by said one of the first computers); and (said request, from said server, to send to said server said (first) IP address enables) receiving, by said server (and responsive to said server requesting said computing cloud to send to said server an IP address corresponding to a cloud instance providing said Internet application service of said one of the first computers), from said computing cloud said first IP address corresponding to said cloud instance of said one of the first computers providing said Internet application service; and (said request, from said server, to send to said server said (first) IP address enables:) (i) (enables) storing, by said server, said first IP address corresponding to said cloud instance providing said Internet application service of said one of the first computers, and (ii) (enables) starting said Internet application service (in-response-to said-requested-starting by said one of the first computers) at a website of said server.

19. The method of claim 18, wherein said starting of said Internet application service (requested by said one of the first computers) at said website of said server enables, and further comprising:

(a)(i) (said starting of said Internet application service) enables receiving, at said website and by said server, from one of the second computers a request to join said Internet application service provided by said cloud instance (identified by said first IP address) of said-one-of-the-first-computers; and (a)(ii) (said starting of said Internet application service) enables receiving, at said website and by said server, from said one of the second computers a second internet protocol (IP) address corresponding to said one of the second computers; and (b)(i) said computing cloud send to said server said first IP address corresponding to said cloud instance (providing said Internet application service of said one of the first computers) enables said server to send to said one of the second computers said first IP address corresponding to said cloud instance (providing said Internet application service) of said one of the first computers, (said server) responsive to said server receiving said request from said one of the second computers to join said Internet application service; and (b)(ii) (said computing cloud sending to said server said first IP address, (which "said-computing-cloud-sending-to-said-server said-first-IP-address" enables said server) to send "said-first-IP-address" to said one of the second computers, which) said first IP address enables said one of the second computers to directly connect to said cloud instance (identified by said first IP address) of said one of the first computers, (said one of the second computers) responsive to said one of the second computers receiving, from said server (responsive to said server receiving said request, from said one of the second computers, to join said Internet application service), said first IP address corresponding to said cloud instance (providing said Internet application service) of said one of the first computers; and said first IP address enables said one of the second computers to send data directly to said cloud instance (identified by said first IP address) of said one of the first computers, and enables said one of the second computers to receive data directly from said cloud instance (identified by said first IP address) of said one of the first computers, via a direct network connection between said first IP address corresponding to said cloud instance of said one of the first computers and said second IP address corresponding to said one of the second computers.

20. The method of claim 18, wherein said starting of said Internet application service (requested by said one of the first computers) at said website of said server enables, and further comprising steps of:

(a)(i) (said starting of said Internet application service) enables receiving, at said website and by said server, from one of the second computers a request to join said Internet application service provided by said cloud instance (identified by said first IP address) of said-one-of-the-first-computers; and (a)(ii) (said starting of said Internet application service) enables receiving, at said website and by said server, from said one of the second computers a second internet protocol (IP) address corresponding to said one of the second computers; and (b) said cloud instance sending to said server said first internet protocol (IP) address corresponding to said cloud instance (providing said Internet application service of said one of the first computers) enables said server to send to said cloud instance (identified by said first IP address) of said one of the first computers said second IP address corresponding to said one of the second computers, (said server) responsive to said server receiving a request from said one of the second computers to join said Internet application service; and receives, by said cloud instance (identified by said first IP address) of said one of the first computers and from said server, said second internet protocol (IP) address corresponding to said one of the second computers, (said server) responsive to said server receiving a request from said one of the second computers to join said Internet application service; and connect, by said cloud instance identified by said first IP address and using said second IP address corresponding to said one of the second computers, directly to said one of the second computers identified by said second IP address; and said second IP address enables said cloud instance (identified by said first IP address) of said one of the first computers to send data directly to said one of the second computers, and enables said cloud instance (identified by said first IP address) of said one of the first computers to receive data directly from said one of the second computers, via a direct network connection between said first IP address corresponding to said cloud instance of said one of the first computers and said second IP address corresponding to said one of the second computers.

21. The method of claim 20, wherein said cloud instance (identified by said first IP address) of said one of the first computers sends data directly to said one of the second computers (identified by said second IP address), and receives data directly from said one of the second computers (identified by said second IP address), via a direct network connection between said first IP address corresponding to said cloud instance of said one of the first computers and said second IP address corresponding to said one of the second computers.

22. The method of claim 17, wherein said computing cloud launches said cloud instance of said one of the first computers.

23. The method of claim 17, wherein said computing cloud stops said cloud instance (identified by said first IP address) of said one of the first computers.

24. The method of claim 23, wherein said computing cloud saves said stopped cloud instance (identified by said first IP address) of said one of the first computers in said computing cloud storage.

25. The method of claim 24, wherein said computing cloud restarts said saved cloud instance (identified by said first IP address) of said one of the first computers from said computing cloud storage.

26. The method of claim 17, wherein said cloud instance (identified by said first IP address) of said one of the first computers is communicatively coupled to said one of the first computers and to the network; and said cloud instance (identified by said first IP address) of said one of the first computers being communicatively coupled to said one of the first computers enables said one of the first computers decouple from the network.

27. A computer-implemented method used in one or more first computers for facilitating Internet application service between said one or more first computers and one or more second computers coupled to a network, the method comprising the steps of:

uploading, by said one of the first computers a virtual machine with an installed host helper program (for use by an Internet application service) to a computing cloud; and requesting, by said one of the first computers, to said computing cloud to start (for use by Internet users) said Internet application service (provided by a cloud instance of said computing cloud, and using said host helper program) at a website of a server, and:

(a). (said requesting, by said one of the first computers, to said computing cloud to start (at said website of said server) said Internet application service (of said one of the first computers) for use by Internet users) enables said server to start (for use by Internet users) said Internet application service at said website of said server; and (said requesting, by said one of the first computers, to said computing cloud to start said Internet application service (of said one of the first computers) for use by Internet users at said website of said server) enable said server to request (by said server) to said computing cloud to send to said server, a Internet Protocol (IP address corresponding to a cloud instance of said one of the first computers providing said Internet application service (using said host helper program), wherein said cloud instance of said one of the first computers is communicatively coupled to said one of the first computers; and (said requesting, by said one of the first computers, to said computing cloud to start said Internet application service at said website of said server enables) said server to request said computing cloud to send to said server, an IP address corresponding to a cloud instance (providing said Internet application service) of said one of the first computers, which (said server's request) enables said computing cloud to operate:

(b)(i) ((said requesting, by said one of the first computers, to said computing cloud to start said Internet application service at said website of said server enables) said requesting by said server to said computing cloud which (said server's request) enables said computing cloud) to launch a cloud instance providing said Internet application service (started by said one of the first computers and using said host helper program); and (b)(ii) ((said requesting, by said one of the first computers, to said computing cloud to start said Internet-application service at said website of said server enables) said request by said server to said computing cloud which (said server's request) enables said computing cloud) to create and assign a first internet protocol (IP) address to said cloud instance (created by said computing cloud and providing said Internet application service (using said host helper program, and) requested by said one of the first computers); and (b)(iii). ((said requesting, by said one of the first computers, to said computing cloud to start said Internet application service at said website of said server enables) said request by said server to said computing cloud which (said server's request) enables said computing cloud) to have said-cloud-instance communicatively coupled to said-one-of-the-first-computers, wherein said-cloud-instance is identified by said first IP address and is providing-said-Internet-application-service (in-response-to said-requested-starting-(of-said-Internet-application-service)-(at-said-website-of-said-server) by-said-one-of-the-first-computers); and (b)(iv) ((said requesting, by said one of the first computers, to said computing cloud to start said Internet application service at said website of said server enables) said request by said server to said computing cloud which (said server's request) enables said computing cloud) to send (by said computing cloud) to said server said first IP address (corresponding to said cloud instance of said one of the first computers providing said Internet application service), (said-computing-cloud) responsive to said computing cloud receiving said request, from said server, to send to said server an Internet protocol (IP) address corresponding to (a cloud instance providing) said Internet application service requested by said one of the first computers; and (said requesting, by said one of the first computers, to said computing cloud to start said Internet application service at said website of said server enables) said request, by said server and to said computing cloud, to send to said server said first IP address (corresponding to said cloud instance providing said Internet application service requested by said one of the first computers) which (said server's request) enables said server to receive-and-save (by said server and from said computing cloud) said first IP address corresponding to said cloud instance of said one of the first computers providing said Internet application service.

28. The method of claim 27, and further comprising the steps of, and wherein:

(a) (said requesting, by said-one-of-the-first-computers, to said computing cloud (to start said Internet application service (using said host helper program of said-one-of-the-first-computers) for use by Internet users at said website of said server) enables said server to start said Internet application service at said website of said server; and (a)(i) (said requesting, by said-one-of-the-first-computers, to said-computing-cloud (to start said-Internet-application-service for use by Internet users at said website of said-server) enables) receiving, at said website and by said server, from one of the second computers a request to join said Internet application service (using said host helper program) provided by a cloud instance of said-one-of-the-first-computers; and (a)(ii) (said requesting, by said-one-of-the-first-computers, to said-computing-cloud (to start said-Internet-application-service for use by Internet users at said website of said-server) enables) receiving, at said website and by said server, from said one of the second computers a second internet protocol (IP) address corresponding to said one of the second computers; and (b)(i) (said requesting, by said one of the first computers, to said computing cloud to start said Internet application service at said website of said server enables said server to request said computing cloud to send to said server, a first IP address corresponding to a cloud instance (providing said Internet application service) of said one of the first computers, which (said server's request) enables said first IP address (corresponding to said cloud instance (of said one of the first computers) and providing said Internet application service in-response-to said-requested-starting by said one of the first computers), to receive by said server and from said computing cloud, and (which receipt of said first IP address by said server)) enables said server to send to said one of the second computers said first IP address corresponding to said cloud instance of said one of the first computers providing said Internet application service (using said host helper program), (said server also) responsive to said server receiving said request from said one of the second computers to join said Internet application service provided by said cloud instance of-(and-in-response-to said-requested-starting-by) said one of the first computers; and (b)(ii) said first IP address enables said one of the second computers to directly connect to said cloud instance (identified by said first IP address) of said one of the first computers providing said Internet application service, (said one of the second computers) responsive to said one of the second computers receiving said first IP address from said server responsive to said server receiving said request from said one of the second computers to join said Internet application service provided by said cloud instance of said one of the first computers; and (b)(iii) said first IP address enables said one of the second computers to send data directly to said cloud instance (identified by said first IP address) of said one of the first computers, and enables said one of the second computers to receive data directly from said cloud instance (identified by said first IP address) of said one of the first computers, via a direct network connection between said first IP address corresponding to said cloud instance of said one of the first computers and said second IP address corresponding to said one of the second computers.

29. The method of claim 27, wherein:

(a) said requesting, by said-one-of-the-first-computers, to said computing cloud (to start said Internet application service (using said host helper program of said-one-of-the-first-computers) for use by Internet users at said website of said server) enables said server to start said Internet application service at said website of said server; and further comprising the steps of:

(a)(i) (said requesting, by said-one-of-the-first-computers, to said-computing-cloud (to start said-Internet-application-service for use by Internet users at said website of said-server) enables) receiving, at said website and by said server, from one of the second computers a request to join said Internet application service (using said host helper program) provided by a cloud instance of said-one-of-the-first-computers; and (a)(ii) (said requesting, by said-one-of-the-first-computers, to said-computing-cloud (to start said-Internet-application-service for use by Internet users at said website of said-server) enables) receiving, at said website and by said server, from said one of the second computers a second internet protocol (IP) address corresponding to said one of the second computers; and further comprising the steps of:

(b). said first IP address (corresponding to a cloud instance launched by said computing cloud and providing said Internet application service in-response-to said-requested-starting by said one of the first computers), received by said server and from said computing cloud, enables said server to send said second IP address (corresponding to said one of the second computers) to said first IP address corresponding to said cloud instance of said one of the first computers, (said server) responsive to said server receiving a request from said one of the second computers to join said Internet application service provided by said cloud instance (identified by said first IP address) of said one of the first computers; and said second IP address enables said cloud instance (identified by said first IP address) of said one of the first computers to connect (using said second IP address corresponding to said one of the second computers) directly to said one of the second computers identified by said second IP address; and said second IP address enables said cloud instance (identified by said first IP address) of said one of the first computers to send data directly to said one of the second computers, and enables said cloud instance (identified by said first IP address) of said one of the first computers to receive data directly from said one of the second computers (identified by said second IP address), via a direct network connection between said first IP address corresponding to said cloud instance of said one of the first computers and said second IP address corresponding to said one of the second computers.

30. The method of claim 27, further comprising the step of:

said cloud instance (identified by said first IP address) of said one of the first computers is communicatively coupled to said one of the first computers and to the network; and said cloud instance (identified by said first IP address) of said one of the first computers being communicatively coupled to said one of the first computers enables said one of the first computers decouple from the network.

31. A computer-implemented method used in a server for facilitating Internet application service between one or more first computers and one or more second computers coupled to a network, the method comprising the steps of:

receiving, by the server, from one of the first computers a request to start a new Internet application service; and requesting, by the server (and responsive to said request from said one of the first computers to start said new Internet application service), to a computing cloud to send to the server, a internet protocol (IP) address corresponding to a cloud instance (providing said Internet application service) of said one of the first computers, wherein said cloud instance of said one of the first computers is communicatively coupled to said one of the first computers; and said requesting (by the server to said computing cloud to send to the server, an Internet protocol (IP) address corresponding to a cloud instance (providing said Internet application service) of said one of the first computers) enables said computing cloud to operate:

(i) (said requesting by the server to said computing cloud enables said computing cloud) to launch a cloud instance providing said Internet application service (requested by said one of the first computers); and (ii) (said request by the server to said computing cloud enables said computing cloud) to launch and assign a first internet protocol (IP) address to said cloud instance (launched by said computing cloud, and providing said Internet application service requested by said one of the first computers); and (iii). (said request by the server to said computing cloud enables said computing cloud) to have said-cloud-instance communicatively coupled to said-one-of-the-first-computers, wherein said-cloud-instance is identified by said first IP address and is providing said Internet application service requested by said one of the first computers; and (iv) (said request by the server to said computing cloud enables said computing cloud) to send (by said computing cloud) to the server said first IP address (corresponding to said cloud instance of said one of the first computers providing said Internet application service), (said-computing-cloud) responsive to said computing cloud receiving said request, from the server, to send to the server an IP address corresponding to a cloud instance providing said Internet application service requested by said one of the first computers; and receiving-and-storing, by the server (and responsive to the server requesting said computing cloud to send to the server an IP address corresponding to a cloud instance providing said Internet application service requested by said one of the first computers), from said computing cloud said first internet protocol (IP) address corresponding to said cloud instance of said one of the first computers providing said Internet application service.

32. The method of claim 31, further comprising the step of:

receiving, by the server, from one of the second computers a request to join said Internet application service of said cloud instance (identified by said first IP address) of said one of the first computers; and receiving, by the server, from said one of the second computers a second IP address corresponding to said one of the second computers.

33. The method of claim 32, further comprising the steps of:

sending, by the server, to said one of the second computers said first IP address corresponding to said cloud instance of said one of the first computers providing said Internet application service, responsive to the server receiving said request from said one of the second computers to join said Internet application service; and said first IP address, received from the server, enabling said one of the second computers to connect directly to said first IP address (corresponding to said cloud instance of said one of the first computers providing said Internet application service); and said first IP address (received from the server) enabling said one of the second computers to send data directly to said cloud instance (identified by said first IP address) of said one of the first computers, and (said first IP address) enabling said one of the second computers to receive data directly from said cloud instance (identified by said first IP address) of said one of the first computers, via a direct network connection between said first IP address corresponding to said cloud instance of said one of the first computers and said second IP address corresponding to said one of the second computers.

34. The method of claim 32, further comprising the steps of:

connecting, by the server, to said first IP address (corresponding to said cloud instance of said one of the first computers providing said Internet application service), responsive to receiving, by the server, a request from said one of the second computers to join said Internet application service of said cloud instance (identified by said first IP address) of said one of the first computers; and sending, by the server, to said first IP address (corresponding to said cloud instance of said one of the first computers) said second IP address corresponding to said one of the second computers, responsive to the server receiving said request from said one of the second computers to join said Internet application service; and said second IP address enabling said cloud instance (identified by said first IP address) of said one of the first computers, using said second IP address, to connect directly to said one of the second computers identified by said second IP address; and said second IP address enabling said cloud instance (identified by said first IP address) of said one of the first computers to send data directly to said one of the second computers, and (said second IP address) enabling said cloud instance (identified by said first IP address) of said one of the first computers to receive data directly from said one of the second computers, via a direct network connection between said first IP address corresponding to said cloud instance of said one of the first computers and said second IP address corresponding to said one of the second computers.

35. The method of claim 32, wherein receiving, by the server, said request from said one of the second computers to join said Internet application service comprises the steps of:

hosting, by the server, a website displaying a list of one or more Internet application services (including said Internet application service of said cloud instance (identified by said first IP address) of said one of the first computers) available; and receiving, by the server, from said one of the second computers a selection of one or more of said Internet application services (including said Internet application service of said cloud instance (identified by said first IP address) of said one of the first computers) to join.

36. The method of claim 32, wherein receiving said request from said one of the second computers to join said Internet application service comprises the step of:

receiving, by the server, from said one of the second computers a sub-domain uniform resource locator (URL) to URL forward to said first IP address corresponding to said cloud instance of said one of the first computers providing said Internet application service.

37. The method of claim 31, wherein receiving (by the server) said request from said one of the first computers to start said new Internet application service comprises the steps of:

hosting, by the server, a website displaying a list of one or more of the host helper programs available for the first computers; and receiving, by the server, from said one of the first computers a selection of one or more of said host helper programs to use) to request by the server to said computing cloud to launch a cloud instance (running said selected-one-or-more of said host helper programs) to provide said Internet application service.

38. The method of claim 31, wherein said computing cloud is a multi instance cloud, and further comprising the steps of:

receiving, by the server, from said multi instance cloud a unique identifier for said cloud instance (identified by said first IP address) of said one of the first computers; and sending, by the server, to said one of the second computers (said-first IP address and) said unique identifier for said cloud instance (identified by said first IP address) of said one of the first computer; and (said first IP address and) said unique identifier corresponding to said cloud instance (identified by said first IP address) of said one of the first computers enabling said one of the second computers to send data directly, using said multi instance cloud (and said first IP address and said unique identifier), to said cloud instance (identified by said first IP address) of said one of the first computers; and (said first IP address and) said unique identifier corresponding to said cloud instance (identified by said first IP address) of said one of the first computers enabling said one of the second computers to receive data directly, using said multi instance cloud (and said first IP address and said unique identifier), from said cloud instance (identified by said first IP address) of said one of the first computers, via a direct network connection between said first IP address corresponding to said cloud instance of said one of the first computers (using said multi instance cloud and said second IP address and said unique identifier) and said second IP address corresponding to said one of the second computers (using said multi instance cloud and said first IP address and said unique identifier).

39. The method of claim 31, wherein said cloud instance (identified by said first IP address) of said one of the first computers is communicatively coupled to said one of the first computers; and said cloud instance (identified by said first IP address) of said one of the first computers being coupled to the network enables said one of the first computers to decouple from the network.

40. A computer-implemented method used in a computing cloud running on top of one or more data-center computers for facilitating Internet application service between one or more first computers and one or more second computers coupled to a network, the method comprising the steps of:

receiving, by said computing cloud, a request from a server to send to said server an internet protocol (IP) address corresponding to (a cloud instance providing) an Internet application service, (said server) responsive to said server receiving a request from one of the first computers to start (for use by Internet users) said Internet application service (provided by a cloud instance of said one of the first computers) at a website of said server; and launching, by said computing cloud, a cloud instance providing said Internet application service (in-response-to said-starting by said one of the first computers), (said-computing-cloud responsive to said computing cloud receiving said request, from said server, to send to said server an internet protocol (IP) address corresponding to (a cloud instance providing) said Internet application service (in-response-to said-requested-starting by said one of the first computers), wherein:

(i) said computing cloud creates and assigns a first internet protocol (IP) address to said cloud instance (launched by said computing cloud, and providing said Internet application service in-response-to said-requested-starting by said one of the first computers); and (ii). said computing cloud have said-cloud-instance communicatively coupled to said-one-of-the-first-computers, wherein said-cloud-instance is identified by said first IP address and is providing said-Internet-application-service (in-response-to said-requested-starting-(of-said-Internet-application-service)-(at-said-website-of-said-server) by-said-one-of-the-first-computers); and sending, by said computing cloud, to said server said first internet protocol (IP) address, responsive to said computing cloud receiving said request, from said server, to send to said server an internet protocol (IP) address corresponding to said Internet application service (in-response-to said-requested-starting by said one of the first computers); and said first IP address, sent by said computing cloud and to said server, enables said server to receive and to store (by said server) said first IP address corresponding to said cloud instance of said one of the first computers providing said Internet application service, (said computing cloud) responsive to said computing cloud receiving said request (from said server) to send to said server an Internet protocol (IP) address corresponding to said Internet application service (in-response-to said-requested-starting by said one of the first computers.

41. The method of claim 40, wherein sending by said computing cloud said first IP address corresponding to said cloud instance (providing said Internet application service in-response-to said-requested-starting (at a website of said server) by said one of the first computers) further comprises the steps of:

said computing cloud imports a virtual machine, from said one of the first computers, with an installed host helper program to provide said Internet application service of said cloud instance (identified by said first IP address) of said one of the first computers; and said computing cloud launches said cloud instance (identified by said first IP address and of said one of the first computers) by starting and operating said imported virtual machine (imported from said one of the first computers, and using said installed host helper program to provide said Internet application service), and assign said first IP address to the launched said cloud instance (of said one of the first computers); and said computing cloud sends to said server said first IP address corresponding to said cloud instance of said one of the first computers providing said Internet application service, (said-computing-cloud) responsive to said computing cloud receiving said request, from said server, to send to said server an IP address corresponding to a cloud instance (providing said Internet application service in-response-to said-requested-starting (at a website of said server), said request-(to-said-computing-cloud), from said server, enables receiving (by said server and) from said computing cloud said first IP address corresponding to said cloud instance providing said Internet application service requested-by-(and-of) said one of the first computers); and (said request, from said server, to send to said server said (first) IP address enables) (i) (enables) storing, by said server, said first IP address corresponding to said cloud instance providing said Internet application service of said one of the first computers), and (ii) (enables) (said-server)-starting said Internet application service (in-response-to said-requested-starting by said one of the first computers) at said website of said server.

42. The method of claim 41, wherein said starting of said Internet application service (requested by said one of the first computers) at said website of said server enables, and further comprising the steps of:

(a)(i) (said starting of said Internet application service) enables receiving, at said website and by said server, from one of the second computers a request to join said Internet application service provided by said cloud instance (identified by said first IP address) of said-one-of-the-first-computers; and (a)(ii) (said starting of said Internet application service) enables receiving, at said website and by said server, from said one of the second computers a second internet protocol (IP) address corresponding to said one of the second computers; and (b)(i) said computing cloud send to said server said first IP address corresponding to said cloud instance providing said Internet application service requested-by-(and of said one of the first computers)

enables said server to send to said one of the second computers said first IP address corresponding to said cloud instance providing said Internet application service of said one of the first computers, said server responsive to said server receiving said request from said one of the second computers to join said Internet application service; and (b)(ii) (said computing cloud sending to said server said first IP address, (which enables said server) to send (said first IP address) to said one of the second computers, which said first IP address) enables said one of the second computers to connect directly to said first IP address corresponding to said cloud instance of said one of the first computers, (said one of the second computers) responsive to said one of the second computers receiving from said server said first IP address corresponding to said cloud instance (providing said Internet application service) of said one of the first computers; and said first IP address enables said one of the second computers to send data directly to (said first IP address corresponding to) said cloud instance of said one of the first computers, and (said first IP address) enables said one of the second computers to receive data directly from said cloud instance (identified by said first IP address) of said one of the first computers, via a direct network connection between said first IP address corresponding to said cloud instance of said one of the first computers and said second IP address corresponding to said one of the second computers.

43. The method of claim 41, wherein said starting of said Internet application service (requested by said one of the first computers) at said website of said server enables, and further comprising the steps of:

(a)(i) (said starting of said Internet application service) enables receiving, at said website and by said server, from one of the second computers a request to join said Internet application service provided by said cloud instance (identified by said first IP address) of said-one-of-the-first-computers; and (a)(ii) (said starting of said Internet application service) enables receiving, at said website and by said server, from said one of the second computers a second internet protocol (IP) address corresponding to said one of the second computers; and said computing cloud send to said server said first IP address corresponding to said clod instance providing said Internet application service requested-by-(and of said one of the first computers)

enables said server to send to said first IP address corresponding to said cloud instance providing said Internet application service of said one of the first computers) said second IP address corresponding to said one of the second computers, said server responsive to said server receiving a request from said one of the second computers to join said Internet application service; and receives, by said cloud instance (identified by said first IP address) of said one of the first computers and from said server, said second IP address corresponding to said one of the second computers, (said server) responsive to said server receiving a request from said one of the second computers to join said Internet application service; and connect, by said cloud instance identified by said first IP address and using said second IP address corresponding to said one of the second computers, directly to said one of the second computers identified by said second IP address; and said second IP address enables said cloud instance (identified by said first IP address of said one of the first computers to send data directly to said one of the second computers, and enables said cloud instance (identified by said first IP address) of said one of the first computers to receive data directly from said one of the second computers, via a direct network connection between said first IP address corresponding to said cloud instance of said one of the first computers and said second IP address corresponding to said one of the second computers.

44. The method of claim 43, wherein said cloud instance (identified by said first IP address) of said one of the first computers sends data directly to said one of the second computers (identified by said second IP address), and receives data directly from said one of the second computers (identified by said second IP address), via a direct network connection between said first IP address corresponding to said cloud instance of said one of the first computers and said second IP address corresponding to said one of the second computers.

45. The method of claim 40, wherein said cloud instance (identified by said first IP address) of said one of the first computers is communicatively coupled to said one of the first computers and to the network; and said cloud instance (identified by said first IP address) of said one of the first computers being communicatively coupled to said one of the first computers enables said one of the first computers decoupling from the network.

* * * * *